US008841881B2

(12) United States Patent
Failing

(10) Patent No.: US 8,841,881 B2
(45) Date of Patent: Sep. 23, 2014

(54) ENERGY TRANSFER WITH VEHICLES

(76) Inventor: Bryan Marc Failing, Morgan Hill, CA (US)

(*) Notice: Subject to any disclaimer, the term of this patent is extended or adjusted under 35 U.S.C. 154(b) by 564 days.

(21) Appl. No.: 13/015,986

(22) Filed: Jan. 28, 2011

(65) Prior Publication Data

US 2011/0298422 A1 Dec. 8, 2011

Related U.S. Application Data

(60) Provisional application No. 61/350,771, filed on Jun. 2, 2010.

(51) Int. Cl.
| *H02J 7/00* | (2006.01) |
| *H02J 9/00* | (2006.01) |
| *H02J 1/00* | (2006.01) |
| *B60L 3/00* | (2006.01) |
| *G06Q 20/10* | (2012.01) |
| *B60L 11/18* | (2006.01) |
| *H02J 5/00* | (2006.01) |
| *H02J 3/38* | (2006.01) |
| *H02J 3/32* | (2006.01) |
| *H02J 3/00* | (2006.01) |

(52) U.S. Cl.
CPC ............... *G06Q 20/10* (2013.01); *Y02T 90/163* (2013.01); *B60L 3/00* (2013.01); *Y02T 10/7088* (2013.01); *Y02T 90/14* (2013.01); *H02J 5/005* (2013.01); *Y02T 90/128* (2013.01); *Y02E 60/721* (2013.01); *H02J 3/381* (2013.01); *B60L 11/1838* (2013.01); *H02J 3/32* (2013.01); *Y02T 10/7005* (2013.01); *B60L 11/1842* (2013.01); *Y04S 10/126* (2013.01); *H02J 3/008* (2013.01)

USPC ............. 320/109; 320/108; 320/138; 307/65; 307/81

(58) Field of Classification Search
USPC .............. 320/108, 109, 138; 180/65.1, 65.21, 180/65.265–65.31; 307/43, 64–68, 80–81
See application file for complete search history.

(56) References Cited

U.S. PATENT DOCUMENTS

| 3,979,650 | A | 9/1976 | Jamison et al. |
| 4,024,448 | A | 5/1977 | Christianson et al. |
| 4,052,655 | A | 10/1977 | Vizza |
| 4,072,927 | A | 2/1978 | O'Neil |
| 4,081,737 | A | 3/1978 | Miyahara |
| 4,110,732 | A | 8/1978 | Jarocha et al. |
| 4,139,071 | A | 2/1979 | Tackett |
| 4,148,008 | A | 4/1979 | Lusk et al. |
| 4,158,802 | A | 6/1979 | Rose, II |
| 4,223,255 | A | 9/1980 | Goldman et al. |

(Continued)

FOREIGN PATENT DOCUMENTS

| EP | 1038830 | 9/2000 |
| EP | 2295282 | 3/2011 |

(Continued)

OTHER PUBLICATIONS

U.S. Notice of Allowance, U.S. Appl. No. 13/016,017, mailed Mar. 14, 2014.

(Continued)

*Primary Examiner* — Richard V Muralidar

(57) ABSTRACT

A method, computer-readable medium, system, and apparatus for improving energy transfer with a vehicle are disclosed.

42 Claims, 39 Drawing Sheets

(56) References Cited

U.S. PATENT DOCUMENTS

| | | |
|---|---|---|
| 4,229,728 A | 10/1980 | Tremba |
| 4,258,304 A | 3/1981 | Bourke |
| 4,272,755 A | 6/1981 | Broetto |
| 4,300,120 A | 11/1981 | Surman |
| 4,308,492 A | 12/1981 | Mori et al. |
| 4,338,587 A | 7/1982 | Chiappetti |
| 4,345,197 A | 8/1982 | Wheadon et al. |
| 4,347,472 A | 8/1982 | Lemelson |
| 4,361,202 A | 11/1982 | Minovitch |
| 4,383,210 A | 5/1983 | Wilkinson |
| 4,476,947 A | 10/1984 | Rynbrandt |
| 4,496,896 A | 1/1985 | Melocik et al. |
| 4,504,761 A | 3/1985 | Triplett |
| 4,510,484 A | 4/1985 | Snyder |
| 4,525,662 A | 6/1985 | Kato et al. |
| 4,532,418 A | 7/1985 | Meese et al. |
| 4,542,462 A | 9/1985 | Morishita et al. |
| 4,588,939 A | 5/1986 | Yoshiyuki et al. |
| 4,667,141 A | 5/1987 | Steele |
| 4,731,547 A | 3/1988 | Alenduff et al. |
| 4,737,761 A | 4/1988 | Dosjoub et al. |
| 4,749,873 A | 6/1988 | Mutoh et al. |
| 4,911,217 A | 3/1990 | Dunn et al. |
| 4,947,151 A | 8/1990 | Rosenberger |
| 4,966,034 A | 10/1990 | Bock et al. |
| 5,006,843 A | 4/1991 | Hauer |
| 5,049,802 A | 9/1991 | Mintus et al. |
| 5,072,380 A | 12/1991 | Randelman et al. |
| 5,150,034 A | 9/1992 | Kyoukane et al. |
| 5,157,319 A | 10/1992 | Klontz et al. |
| 5,157,321 A | 10/1992 | Kato et al. |
| 5,184,058 A | 2/1993 | Hesse et al. |
| 5,196,845 A | 3/1993 | Myatt |
| 5,202,617 A | 4/1993 | Nor |
| 5,204,819 A | 4/1993 | Ryan |
| 5,220,268 A | 6/1993 | Rose et al. |
| 5,229,703 A | 7/1993 | Harris |
| 5,252,078 A | 10/1993 | Langenbahn |
| 5,254,935 A | 10/1993 | Vercesi et al. |
| 5,263,565 A | 11/1993 | Wilkinson |
| 5,264,776 A | 11/1993 | Hulsey |
| 5,272,431 A | 12/1993 | Nee |
| 5,281,792 A | 1/1994 | Lee et al. |
| 5,281,904 A | 1/1994 | Tomkins |
| 5,297,664 A | 3/1994 | Tseng et al. |
| 5,301,096 A | 4/1994 | Klontz et al. |
| 5,306,999 A | 4/1994 | Hoffman |
| 5,311,973 A | 5/1994 | Tseng et al. |
| 5,315,227 A | 5/1994 | Pierson et al. |
| 5,319,299 A | 6/1994 | Maehara |
| 5,323,098 A | 6/1994 | Hamaguchi et al. |
| 5,323,099 A | 6/1994 | Bruni et al. |
| 5,323,737 A | 6/1994 | Farrell |
| 5,327,065 A | 7/1994 | Bruni et al. |
| 5,327,066 A | 7/1994 | Smith |
| 5,341,083 A | 8/1994 | Klontz et al. |
| 5,341,280 A | 8/1994 | Divan et al. |
| 5,349,535 A | 9/1994 | Gupta |
| 5,351,187 A | 9/1994 | Hassett |
| 5,352,982 A | 10/1994 | Nakazawa et al. |
| 5,369,352 A | 11/1994 | Toepfer et al. |
| 5,369,353 A | 11/1994 | Erdman |
| 5,371,454 A | 12/1994 | Marek |
| 5,375,335 A | 12/1994 | Friton et al. |
| 5,382,948 A | 1/1995 | Richmond |
| 5,408,209 A | 4/1995 | Tanzer et al. |
| 5,412,304 A | 5/1995 | Abbott |
| 5,412,323 A | 5/1995 | Kato et al. |
| 5,413,493 A | 5/1995 | Hoffman |
| 5,422,624 A | 6/1995 | Smith |
| 5,429,524 A | 7/1995 | Wakata et al. |
| 5,433,623 A | 7/1995 | Wakata et al. |
| 5,434,493 A | 7/1995 | Woody et al. |
| 5,444,352 A | 8/1995 | Hutchings |
| 5,448,152 A | 9/1995 | Albright |
| 5,455,466 A | 10/1995 | Parks et al. |
| 5,457,378 A | 10/1995 | Woody |
| 5,458,496 A | 10/1995 | Itou et al. |
| 5,461,298 A | 10/1995 | Lara et al. |
| 5,461,299 A | 10/1995 | Bruni |
| 5,462,439 A | 10/1995 | Keith |
| 5,463,303 A | 10/1995 | Hall et al. |
| 5,467,006 A | 11/1995 | Sims |
| 5,473,938 A | 12/1995 | Handfield et al. |
| 5,477,122 A | 12/1995 | Hall et al. |
| 5,481,176 A | 1/1996 | DeBiasi et al. |
| 5,483,143 A | 1/1996 | Hall et al. |
| 5,487,002 A | 1/1996 | Diller et al. |
| 5,488,285 A | 1/1996 | Hosobuchi |
| 5,498,948 A | 3/1996 | Bruni et al. |
| 5,499,185 A | 3/1996 | Tanzer et al. |
| 5,503,059 A | 4/1996 | Pacholok |
| 5,506,489 A | 4/1996 | Abbott et al. |
| 5,521,443 A | 5/1996 | Imura et al. |
| 5,521,838 A | 5/1996 | Rosendahl |
| 5,523,666 A | 6/1996 | Hoelzl et al. |
| 5,528,113 A | 6/1996 | Boys et al. |
| 5,539,296 A | 7/1996 | Ito |
| 5,545,046 A | 8/1996 | Masuda et al. |
| 5,545,966 A | 8/1996 | Ramos et al. |
| 5,548,200 A | 8/1996 | Nor et al. |
| 5,549,443 A | 8/1996 | Hammerslag |
| 5,556,284 A | 9/1996 | Itou et al. |
| 5,557,268 A | 9/1996 | Hughes et al. |
| 5,563,491 A | 10/1996 | Tseng |
| 5,565,755 A | 10/1996 | Keith |
| 5,568,036 A | 10/1996 | Hulsey et al. |
| 5,572,109 A | 11/1996 | Keith |
| 5,573,090 A | 11/1996 | Ross |
| 5,577,920 A | 11/1996 | Itou et al. |
| 5,581,171 A | 12/1996 | Kerfoot et al. |
| 5,583,418 A | 12/1996 | Honda et al. |
| 5,594,315 A | 1/1997 | Ramos et al. |
| 5,594,317 A | 1/1997 | Yeow et al. |
| 5,594,318 A | 1/1997 | Nor et al. |
| 5,596,258 A | 1/1997 | Kimura et al. |
| 5,596,261 A | 1/1997 | Suyama |
| 5,598,084 A | 1/1997 | Keith |
| 5,600,222 A | 2/1997 | Hall et al. |
| 5,606,237 A | 2/1997 | Biasotti et al. |
| 5,608,306 A | 3/1997 | Rybeck et al. |
| 5,614,808 A | 3/1997 | Konoya et al. |
| 5,617,003 A | 4/1997 | Odachi et al. |
| 5,623,194 A | 4/1997 | Boll et al. |
| 5,625,272 A | 4/1997 | Takahashi |
| 5,627,448 A | 5/1997 | Okada et al. |
| 5,627,752 A | 5/1997 | Buck et al. |
| 5,629,606 A | 5/1997 | Asada |
| 5,633,577 A | 5/1997 | Matsumae et al. |
| 5,635,693 A | 6/1997 | Benson et al. |
| 5,635,817 A | 6/1997 | Shiska |
| 5,637,977 A | 6/1997 | Saito et al. |
| 5,642,270 A | 6/1997 | Green et al. |
| 5,646,500 A | 7/1997 | Wilson |
| 5,654,621 A | 8/1997 | Seelig |
| 5,656,916 A | 8/1997 | Hotta |
| 5,656,923 A | 8/1997 | Schultz et al. |
| 5,657,233 A | 8/1997 | Cherrington et al. |
| 5,661,391 A | 8/1997 | Ito et al. |
| 5,663,496 A | 9/1997 | Handfield et al. |
| 5,669,470 A | 9/1997 | Ross |
| 5,670,860 A | 9/1997 | Conrady et al. |
| 5,684,379 A | 11/1997 | Svedoff |
| 5,684,380 A | 11/1997 | Woody et al. |
| 5,696,367 A | 12/1997 | Keith |
| 5,703,461 A | 12/1997 | Minoshima et al. |
| 5,703,462 A | 12/1997 | Woody et al. |
| 5,708,427 A | 1/1998 | Bush |
| 5,710,502 A | 1/1998 | Poumey |
| 5,710,556 A | 1/1998 | Nishimura et al. |
| 5,711,558 A | 1/1998 | Woody |
| 5,711,648 A | 1/1998 | Hammerslag |
| 5,714,864 A | 2/1998 | Rose et al. |
| 5,719,483 A | 2/1998 | Abbott et al. |

(56) References Cited

U.S. PATENT DOCUMENTS

| | | |
|---|---|---|
| 5,741,966 A | 4/1998 | Handfield et al. |
| 5,749,984 A | 5/1998 | Frey et al. |
| 5,751,135 A | 5/1998 | Fukushima et al. |
| 5,757,595 A | 5/1998 | Ozawa et al. |
| 5,777,565 A | 7/1998 | Hayashi et al. |
| 5,778,326 A | 7/1998 | Moroto et al. |
| 5,788,033 A | 8/1998 | Lucking et al. |
| 5,790,976 A | 8/1998 | Boll et al. |
| 5,793,306 A | 8/1998 | Vershinin et al. |
| 5,803,215 A | 9/1998 | Henze et al. |
| 5,816,643 A | 10/1998 | Itou et al. |
| 5,820,395 A | 10/1998 | Hashizawa |
| 5,821,638 A | 10/1998 | Boys et al. |
| 5,821,728 A | 10/1998 | Schwind |
| 5,821,731 A | 10/1998 | Kuki et al. |
| 5,831,841 A | 11/1998 | Nishino |
| 5,839,085 A | 11/1998 | Yoshikawa et al. |
| 5,845,268 A | 12/1998 | Moore |
| 5,847,537 A | 12/1998 | Parmley, Sr. |
| 5,850,135 A | 12/1998 | Kuki et al. |
| 5,852,394 A | 12/1998 | Watanabe et al. |
| 5,880,536 A | 3/1999 | Mardirossian |
| 5,883,492 A | 3/1999 | Koenck |
| 5,889,386 A | 3/1999 | Koenck |
| 5,903,064 A | 5/1999 | Norberg |
| 5,903,134 A | 5/1999 | Takeuchi |
| 5,907,231 A | 5/1999 | Watanabe et al. |
| RE36,225 E | 6/1999 | Harris |
| 5,909,099 A | 6/1999 | Watanabe et al. |
| 5,909,100 A | 6/1999 | Watanabe et al. |
| 5,917,307 A | 6/1999 | Watanabe et al. |
| 5,926,004 A | 7/1999 | Henze |
| 5,927,938 A | 7/1999 | Hammerslag |
| 5,929,599 A | 7/1999 | Watanabe et al. |
| 5,936,381 A | 8/1999 | Suh |
| 5,941,328 A | 8/1999 | Lyons et al. |
| 5,951,229 A | 9/1999 | Hammerslag |
| 5,952,813 A | 9/1999 | Ochiai |
| 5,956,259 A | 9/1999 | Hartsell, Jr. et al. |
| 5,982,139 A | 11/1999 | Parise |
| 5,983,347 A | 11/1999 | Brinkmeyer et al. |
| 5,984,706 A | 11/1999 | Kakuta et al. |
| 6,006,148 A | 12/1999 | Strong |
| 6,011,320 A | 1/2000 | Miyamoto et al. |
| 6,018,293 A | 1/2000 | Smith |
| 6,026,868 A | 2/2000 | Johnson, Jr. |
| 6,029,092 A | 2/2000 | Stein |
| 6,037,745 A | 3/2000 | Koike et al. |
| 6,046,510 A | 4/2000 | Kawanobe et al. |
| 6,049,191 A | 4/2000 | Terazoe et al. |
| 6,060,861 A | 5/2000 | Feng |
| 6,067,008 A | 5/2000 | Smith |
| 6,078,163 A | 6/2000 | Horie et al. |
| 6,081,205 A | 6/2000 | Williams |
| 6,084,318 A | 7/2000 | Mardirossian |
| 6,084,381 A | 7/2000 | Kajiura |
| 6,085,124 A | 7/2000 | Choi |
| 6,087,806 A | 7/2000 | Fujioka |
| 6,095,270 A | 8/2000 | Ishikawa |
| 6,100,603 A | 8/2000 | Gold |
| 6,100,663 A | 8/2000 | Boys et al. |
| 6,104,160 A | 8/2000 | Iwata et al. |
| 6,107,691 A | 8/2000 | Gore et al. |
| 6,114,834 A | 9/2000 | Parise |
| 6,123,569 A | 9/2000 | Fukushima et al. |
| 6,127,800 A | 10/2000 | Kuki et al. |
| 6,137,262 A | 10/2000 | Hauer |
| 6,147,473 A | 11/2000 | Koo |
| 6,150,794 A | 11/2000 | Yamada et al. |
| 6,154,005 A | 11/2000 | Hyogo et al. |
| 6,157,162 A | 12/2000 | Hayashi et al. |
| 6,175,212 B1 | 1/2001 | Oguri |
| 6,185,501 B1 | 2/2001 | Smith et al. |
| 6,194,854 B1 | 2/2001 | Uchibori et al. |
| 6,194,997 B1 | 2/2001 | Buchner et al. |
| 6,195,648 B1 | 2/2001 | Simon et al. |
| 6,198,251 B1 | 3/2001 | Landon |
| 6,208,040 B1 | 3/2001 | Mardirossian |
| 6,218,932 B1 | 4/2001 | Stippler |
| 6,225,776 B1 | 5/2001 | Chai |
| 6,239,577 B1 | 5/2001 | Koike et al. |
| 6,252,380 B1 | 6/2001 | Koenck |
| 6,253,980 B1 | 7/2001 | Murakami et al. |
| 6,275,143 B1 | 8/2001 | Stobbe |
| 6,281,660 B1 | 8/2001 | Abe |
| 6,291,969 B1 | 9/2001 | Kaneko |
| 6,297,614 B2 | 10/2001 | Hyogo |
| 6,300,742 B1 | 10/2001 | Hung |
| 6,300,882 B1 | 10/2001 | Inoue |
| 6,301,531 B1 | 10/2001 | Pierro et al. |
| 6,307,347 B1 | 10/2001 | Ronning |
| 6,307,349 B1 | 10/2001 | Koenck et al. |
| 6,310,464 B1 | 10/2001 | Koo |
| 6,310,465 B2 | 10/2001 | Najima |
| 6,316,908 B2 | 11/2001 | Kajiura |
| 6,317,338 B1 | 11/2001 | Boys |
| 6,320,351 B1 | 11/2001 | Ng et al. |
| 6,320,352 B2 | 11/2001 | Terazoe |
| 6,323,566 B1 | 11/2001 | Meier |
| 6,329,909 B1 | 12/2001 | Siedentop et al. |
| 6,334,354 B2 | 1/2002 | Vaughn et al. |
| 6,337,556 B2 | 1/2002 | Kutsuzawa |
| 6,342,845 B1 | 1/2002 | Hilliard et al. |
| 6,346,792 B1 | 2/2002 | Summerfield et al. |
| 6,351,098 B1 | 2/2002 | Kaneko |
| RE37,610 E | 3/2002 | Tsuchiya et al. |
| 6,356,049 B2 | 3/2002 | Oguri |
| 6,356,052 B2 | 3/2002 | Koike |
| 6,362,594 B2 | 3/2002 | Kajiura |
| 6,362,732 B1 | 3/2002 | Konchin et al. |
| 6,373,148 B1 | 4/2002 | Daiss et al. |
| 6,373,221 B1 | 4/2002 | Koike et al. |
| 6,373,380 B1 | 4/2002 | Robertson et al. |
| 6,380,701 B1 | 4/2002 | Kahlon et al. |
| 6,396,241 B1 | 5/2002 | Ramos et al. |
| 6,397,990 B1 | 6/2002 | Brien et al. |
| 6,405,106 B1 | 6/2002 | Sheth et al. |
| 6,412,604 B1 | 7/2002 | Schuster |
| 6,417,784 B1 | 7/2002 | Hilliard et al. |
| 6,421,600 B1 | 7/2002 | Ross |
| 6,445,084 B1 | 9/2002 | Daiss et al. |
| 6,448,740 B1 | 9/2002 | Kirkpatrick |
| 6,456,041 B1 | 9/2002 | Terada et al. |
| 6,456,047 B1 | 9/2002 | Gohara et al. |
| 6,458,000 B2 | 10/2002 | Shappell |
| 6,459,234 B2 | 10/2002 | Kajiura |
| 6,462,650 B1 | 10/2002 | Balzer et al. |
| 6,487,477 B1 | 11/2002 | Woestman et al. |
| 6,522,027 B1 | 2/2003 | Morillon et al. |
| 6,522,241 B1 | 2/2003 | Baudard |
| 6,525,510 B1 | 2/2003 | Ayano et al. |
| 6,525,672 B2 | 2/2003 | Chainer et al. |
| 6,535,133 B2 | 3/2003 | Gohara |
| 6,535,143 B1 | 3/2003 | Miyamoto et al. |
| 6,549,115 B1 | 4/2003 | Daiss et al. |
| 6,574,603 B1 | 6/2003 | Dickson et al. |
| 6,583,521 B1 | 6/2003 | Lagod et al. |
| 6,586,909 B1 | 7/2003 | Trepka |
| 6,605,922 B2 | 8/2003 | Tamai et al. |
| 6,609,419 B1 | 8/2003 | Bankart et al. |
| 6,611,210 B2 | 8/2003 | Hilliard et al. |
| 6,614,204 B2 | 9/2003 | Pellegrino et al. |
| 6,618,650 B1 | 9/2003 | Nakai et al. |
| 6,621,178 B1 | 9/2003 | Morillon |
| 6,624,611 B2 | 9/2003 | Kirmuss |
| 6,631,775 B1 | 10/2003 | Chaney |
| 6,636,145 B1 | 10/2003 | Murakami et al. |
| 6,650,086 B1 | 11/2003 | Chang |
| 6,657,535 B1 | 12/2003 | Magbie et al. |
| 6,657,556 B2 | 12/2003 | Ogura et al. |
| 6,662,642 B2 | 12/2003 | Breed et al. |
| 6,673,479 B2 | 1/2004 | McArthur et al. |
| 6,683,391 B1 | 1/2004 | Enoyoshi et al. |
| 6,684,156 B2 | 1/2004 | Fujimoto et al. |

(56) References Cited

U.S. PATENT DOCUMENTS

| | | |
|---|---|---|
| 6,686,724 B2 | 2/2004 | Coates et al. |
| 6,700,475 B1 | 3/2004 | Geber et al. |
| 6,703,929 B2 | 3/2004 | Baudard |
| 6,707,274 B1 | 3/2004 | Karr |
| 6,707,373 B2 | 3/2004 | Moreau |
| 6,710,575 B2 | 3/2004 | Youn |
| 6,727,800 B1 | 4/2004 | Dutu |
| 6,727,809 B1 | 4/2004 | Smith |
| 6,738,697 B2 | 5/2004 | Breed |
| 6,745,911 B1 | 6/2004 | Maestranzi |
| 6,747,437 B2 | 6/2004 | Chiu |
| 6,748,797 B2 | 6/2004 | Breed et al. |
| 6,766,949 B2 | 7/2004 | Terranova et al. |
| 6,768,413 B1 | 7/2004 | Kemmann et al. |
| 6,782,739 B2 | 8/2004 | Ratti et al. |
| 6,789,733 B2 | 9/2004 | Terranova et al. |
| 6,792,259 B1 | 9/2004 | Parise |
| 6,794,847 B2 | 9/2004 | Hosoda et al. |
| 6,794,849 B2 | 9/2004 | Mori et al. |
| 6,805,090 B2 | 10/2004 | Bertness et al. |
| 6,822,551 B2 | 11/2004 | Li et al. |
| 6,828,692 B2 | 12/2004 | Simon |
| 6,833,784 B1 | 12/2004 | Ishii et al. |
| 6,850,153 B1 | 2/2005 | Murakami et al. |
| 6,850,824 B2 | 2/2005 | Breed |
| 6,850,898 B1 | 2/2005 | Murakami et al. |
| 6,856,820 B1 | 2/2005 | Kolls |
| 6,864,804 B1 | 3/2005 | Allen et al. |
| 6,870,467 B2 | 3/2005 | Simon |
| 6,870,475 B2 | 3/2005 | Fitch et al. |
| 6,876,174 B1 | 4/2005 | Samittier Marti et al. |
| 6,879,889 B2 | 4/2005 | Ross |
| 6,882,904 B1 | 4/2005 | Petrie et al. |
| 6,906,495 B2 | 6/2005 | Cheng et al. |
| 6,912,503 B1 | 6/2005 | Quarendon et al. |
| 6,915,122 B2 | 7/2005 | Meradi |
| 6,917,180 B2 | 7/2005 | Harrison et al. |
| 6,924,621 B2 | 8/2005 | Jabaji et al. |
| 6,924,735 B2 | 8/2005 | Ueda et al. |
| 6,930,410 B2 | 8/2005 | Ikeda et al. |
| 6,941,197 B1 | 9/2005 | Murakami et al. |
| 6,946,816 B2 | 9/2005 | Pfab et al. |
| 6,947,881 B1 | 9/2005 | Murakami et al. |
| 6,954,007 B1 | 10/2005 | Meier et al. |
| 6,959,592 B2 | 11/2005 | Caretta |
| 6,975,092 B2 | 12/2005 | Edington et al. |
| 6,975,997 B1 | 12/2005 | Murakami et al. |
| 6,978,873 B2 | 12/2005 | Ishioka |
| 6,988,026 B2 | 1/2006 | Breed et al. |
| 6,996,458 B2 | 2/2006 | Pincu et al. |
| 7,002,265 B2 | 2/2006 | Potega |
| 7,005,959 B2 | 2/2006 | Amagasa et al. |
| 7,006,914 B1 | 2/2006 | Cahoon |
| 7,009,310 B2 | 3/2006 | Cheung et al. |
| 7,015,827 B2 | 3/2006 | Allen et al. |
| 7,021,132 B2 | 4/2006 | Nigon et al. |
| 7,027,890 B2 | 4/2006 | Wilson |
| 7,034,714 B2 | 4/2006 | Dunn et al. |
| 7,038,331 B2 | 5/2006 | Yasukura |
| 7,039,389 B2 | 5/2006 | Johnson, Jr. |
| 7,039,508 B2 | 5/2006 | Lin et al. |
| 7,042,196 B2 | 5/2006 | Ka-Lai et al. |
| 7,050,897 B2 | 5/2006 | Breed et al. |
| 7,063,146 B2 | 6/2006 | Schultz et al. |
| 7,068,991 B2 | 6/2006 | Parise |
| 7,071,840 B2 | 7/2006 | Allen et al. |
| 7,079,013 B2 | 7/2006 | Zimmer |
| 7,081,693 B2 | 7/2006 | Hamel et al. |
| 7,082,359 B2 | 7/2006 | Breed |
| 7,082,406 B1 | 7/2006 | Dickson |
| 7,089,099 B2 | 8/2006 | Shostak et al. |
| 7,091,839 B2 | 8/2006 | Situ et al. |
| 7,095,311 B2 | 8/2006 | Coates et al. |
| 7,096,727 B2 | 8/2006 | Adamson et al. |
| 7,096,984 B2 | 8/2006 | Ono et al. |
| 7,103,460 B1 | 9/2006 | Breed |
| 7,120,520 B2 | 10/2006 | Seto et al. |
| 7,129,834 B2 | 10/2006 | Naruse et al. |
| 7,138,728 B2 | 11/2006 | LeRow et al. |
| 7,141,321 B2 | 11/2006 | McArthur et al. |
| 7,142,951 B2 | 11/2006 | Pincu et al. |
| 7,146,258 B2 | 12/2006 | Pincu et al. |
| 7,146,853 B2 | 12/2006 | Fischer et al. |
| 7,150,187 B2 | 12/2006 | Caretta |
| 7,159,129 B2 | 1/2007 | Pincu et al. |
| 7,161,476 B2 | 1/2007 | Hardman et al. |
| 7,164,117 B2 | 1/2007 | Breed et al. |
| 7,164,211 B1 | 1/2007 | Tafoya et al. |
| 7,168,308 B2 | 1/2007 | Mancosu et al. |
| 7,170,201 B2 | 1/2007 | Hamel et al. |
| 7,173,348 B2 | 2/2007 | Voda et al. |
| 7,181,409 B1 | 2/2007 | Murakami et al. |
| 7,183,937 B2 | 2/2007 | Park et al. |
| 7,190,319 B2 | 3/2007 | Forster et al. |
| 7,193,334 B2 | 3/2007 | Hiramitsu et al. |
| 7,193,394 B2 | 3/2007 | Ueda et al. |
| 7,201,384 B2 | 4/2007 | Chaney |
| 7,208,912 B2 | 4/2007 | Ghabra et al. |
| 7,212,989 B1 | 5/2007 | Taniguchi |
| 7,215,240 B2 | 5/2007 | Uehara |
| 7,227,335 B2 | 6/2007 | Sakakibara et al. |
| 7,233,843 B2 | 6/2007 | Budhraja et al. |
| 7,233,857 B2 | 6/2007 | Cahoon |
| 7,239,110 B2 | 7/2007 | Cheng et al. |
| 7,245,043 B2 | 7/2007 | Voda et al. |
| 7,248,017 B2 | 7/2007 | Cheng et al. |
| 7,253,725 B2 | 8/2007 | Breed et al. |
| 7,254,994 B2 | 8/2007 | Schulze |
| 7,256,505 B2 | 8/2007 | Arms et al. |
| 7,256,516 B2 | 8/2007 | Buchanan et al. |
| 7,260,371 B1 | 8/2007 | Yones |
| 7,268,665 B2 | 9/2007 | Inagaki et al. |
| 7,274,169 B2 | 9/2007 | Burgan et al. |
| 7,274,975 B2 | 9/2007 | Miller |
| 7,292,137 B2 | 11/2007 | Gilbert et al. |
| 7,301,441 B2 | 11/2007 | Inada et al. |
| 7,301,442 B2 | 11/2007 | Kolpasky et al. |
| 7,309,966 B2 | 12/2007 | Wobben |
| 7,313,467 B2 | 12/2007 | Breed et al. |
| 7,317,262 B2 | 1/2008 | Nishijima et al. |
| 7,323,964 B1 | 1/2008 | Shyu et al. |
| 7,339,347 B2 | 3/2008 | Elder et al. |
| 7,358,701 B2 | 4/2008 | Field et al. |
| 7,361,998 B2 | 4/2008 | Hamel et al. |
| 7,363,806 B2 | 4/2008 | Huang et al. |
| 7,365,455 B2 | 4/2008 | Hamel et al. |
| 7,365,633 B2 | 4/2008 | Inoue et al. |
| 7,373,222 B1 | 5/2008 | Wright et al. |
| 7,373,713 B2 | 5/2008 | Forster et al. |
| 7,375,492 B2 | 5/2008 | Calhoon et al. |
| 7,376,631 B2 | 5/2008 | King et al. |
| 7,378,817 B2 | 5/2008 | Calhoon et al. |
| 7,379,800 B2 | 5/2008 | Breed |
| 7,388,349 B2 | 6/2008 | Elder et al. |
| 7,390,222 B2 | 6/2008 | Ciancanelli et al. |
| 7,402,978 B2 | 7/2008 | Pryor |
| 7,405,536 B2 | 7/2008 | Watts |
| 7,408,453 B2 | 8/2008 | Breed |
| 7,412,309 B2 | 8/2008 | Honda |
| 7,414,380 B2 | 8/2008 | Tang et al. |
| 7,415,332 B2 | 8/2008 | Ito et al. |
| 7,420,520 B2 | 9/2008 | Forster et al. |
| 7,421,321 B2 | 9/2008 | Breed et al. |
| 7,427,865 B2 | 9/2008 | Elder et al. |
| 7,429,801 B2 | 9/2008 | Adamson et al. |
| 7,429,805 B2 | 9/2008 | Hamel et al. |
| 7,430,462 B2 | 9/2008 | Chiu et al. |
| 7,430,471 B2 | 9/2008 | Simon |
| 7,436,150 B2 | 10/2008 | Daboussi |
| 7,439,851 B2 | 10/2008 | Fleury et al. |
| 7,439,928 B2 | 10/2008 | Forster et al. |
| 7,443,057 B2 | 10/2008 | Nunally |
| 7,444,192 B2 | 10/2008 | Dickinson et al. |
| 7,444,210 B2 | 10/2008 | Breed et al. |

(56) References Cited

U.S. PATENT DOCUMENTS

| | | |
|---|---|---|
| 7,450,790 B1 | 11/2008 | Jalali et al. |
| 7,451,839 B2 | 11/2008 | Perlman |
| 7,459,911 B2 | 12/2008 | Merkle |
| 7,462,951 B1 | 12/2008 | Baarman |
| 7,467,034 B2 | 12/2008 | Breed et al. |
| 7,471,066 B2 | 12/2008 | Ambrosio et al. |
| 7,477,039 B2 | 1/2009 | Rodarte |
| 7,486,045 B2 | 2/2009 | Yamaguchi et al. |
| 7,498,767 B2 | 3/2009 | Brown et al. |
| 7,498,768 B2 | 3/2009 | Stoschek et al. |
| 7,502,353 B2 | 3/2009 | Bolz |
| 7,508,091 B2 | 3/2009 | Binder |
| 7,515,034 B2 | 4/2009 | Inoue |
| 7,520,355 B2 | 4/2009 | Chaney |
| 7,521,890 B2 | 4/2009 | Lee et al. |
| 7,522,878 B2 | 4/2009 | Baarman |
| 7,525,283 B2 | 4/2009 | Cheng et al. |
| 7,525,284 B2 | 4/2009 | Iwane et al. |
| 7,525,286 B2 | 4/2009 | Wang |
| 7,525,290 B2 | 4/2009 | Miyata |
| 7,527,288 B2 | 5/2009 | Breed |
| 7,549,327 B2 | 6/2009 | Breed |
| 7,550,869 B2 | 6/2009 | Higuchi et al. |
| 7,550,943 B2 | 6/2009 | Spartano et al. |
| 7,554,288 B2 | 6/2009 | Gangstoe et al. |
| 7,554,316 B2 | 6/2009 | Stevens et al. |
| 7,555,370 B2 | 6/2009 | Breed et al. |
| 7,565,396 B2 | 7/2009 | Hoshina |
| 7,567,057 B2 | 7/2009 | Elder et al. |
| 7,567,919 B1 | 7/2009 | Koga |
| 7,573,373 B2 | 8/2009 | Nguyen |
| 7,582,979 B2 | 9/2009 | Oyobe et al. |
| 7,589,433 B2 | 9/2009 | Otani et al. |
| 7,590,472 B2 | 9/2009 | Hakim et al. |
| 7,595,606 B2 | 9/2009 | Loubeyre |
| 7,598,700 B2 | 10/2009 | Elder et al. |
| 7,602,142 B2 | 10/2009 | Weber et al. |
| 7,603,894 B2 | 10/2009 | Breed |
| 7,605,496 B2 | 10/2009 | Stevens et al. |
| 7,605,561 B2 | 10/2009 | Yamazaki et al. |
| 7,612,528 B2 | 11/2009 | Baarman et al. |
| 7,613,551 B2 | 11/2009 | Watanabe et al. |
| 7,613,924 B2 | 11/2009 | Shankar et al. |
| 7,617,394 B2 | 11/2009 | Tsuboka et al. |
| 7,622,891 B2 | 11/2009 | Cheng et al. |
| 7,622,897 B2 | 11/2009 | Eberhard et al. |
| 7,629,772 B2 | 12/2009 | Eberhard et al. |
| 7,629,773 B2 | 12/2009 | Eberhard et al. |
| 7,630,802 B2 | 12/2009 | Breed |
| 7,631,554 B2 | 12/2009 | Behrends et al. |
| 7,639,514 B2 | 12/2009 | Baarman |
| 7,640,185 B1 | 12/2009 | Giordano et al. |
| 7,642,670 B2 | 1/2010 | Rosendahl |
| 7,650,210 B2 | 1/2010 | Breed |
| 7,657,438 B2 | 2/2010 | Obayashi et al. |
| 7,663,502 B2 | 2/2010 | Breed |
| 7,667,348 B2 | 2/2010 | Konno et al. |
| 7,671,567 B2 | 3/2010 | Eberhard et al. |
| 7,672,756 B2 | 3/2010 | Breed |
| 7,675,261 B2 | 3/2010 | Elder et al. |
| 7,679,314 B2 | 3/2010 | Elder et al. |
| 7,679,336 B2 | 3/2010 | Gale et al. |
| 7,679,486 B2 | 3/2010 | Okada |
| 7,679,524 B2 | 3/2010 | Hofer et al. |
| 7,683,570 B2 | 3/2010 | Krauer et al. |
| 7,688,022 B2 | 3/2010 | Alvarez-Troncoso et al. |
| 7,688,024 B2 | 3/2010 | Kamaga |
| 7,692,366 B2 | 4/2010 | Thiesen |
| 7,692,404 B2 | 4/2010 | Harris |
| 7,692,430 B2 | 4/2010 | Emori et al. |
| 7,693,609 B2 | 4/2010 | Kressner et al. |
| 7,693,626 B2 | 4/2010 | Breed et al. |
| 7,698,078 B2 | 4/2010 | Kelty et al. |
| 7,698,219 B2 | 4/2010 | Kremen et al. |
| 7,705,602 B2 | 4/2010 | Bertness |
| 7,710,071 B2 | 5/2010 | Elizalde Rodarte |
| 7,714,536 B1 | 5/2010 | Silberg et al. |
| 7,714,537 B2 | 5/2010 | Cheng et al. |
| 7,715,187 B2 | 5/2010 | Hotelling et al. |
| 7,715,951 B2 | 5/2010 | Forbes, Jr. et al. |
| 7,719,232 B2 | 5/2010 | Kelty et al. |
| 7,725,348 B1 | 5/2010 | Allen et al. |
| 7,728,551 B2 | 6/2010 | Reed et al. |
| 7,728,717 B2 | 6/2010 | Rebholz-Goldmann |
| 7,734,500 B1 | 6/2010 | Allen et al. |
| 7,739,529 B2 | 6/2010 | Hardman et al. |
| 7,741,816 B2 | 6/2010 | Kelty et al. |
| 7,747,739 B2 | 6/2010 | Bridges et al. |
| 7,751,975 B2 | 7/2010 | Allen et al. |
| 7,755,329 B2 | 7/2010 | Kohn et al. |
| 7,760,080 B2 | 7/2010 | Breed et al. |
| 7,761,203 B2 | 7/2010 | Yamada |
| 7,764,197 B2 | 7/2010 | Allen et al. |
| 7,768,148 B2 | 8/2010 | Frias et al. |
| 7,768,229 B2 | 8/2010 | Zhang et al. |
| 7,778,746 B2 | 8/2010 | McLeod et al. |
| 7,781,942 B2 | 8/2010 | Hatano |
| 7,782,021 B2 | 8/2010 | Kelty et al. |
| 7,782,633 B2 | 8/2010 | Yamauchi et al. |
| 7,783,390 B2 | 8/2010 | Miller |
| 7,786,704 B2 | 8/2010 | Kelty et al. |
| 7,786,864 B1 | 8/2010 | Shostak et al. |
| 7,789,176 B2 | 9/2010 | Zhou |
| 7,791,217 B2 | 9/2010 | Kamaga |
| 7,792,613 B2 | 9/2010 | Kressner et al. |
| 7,795,840 B2 | 9/2010 | Vogel et al. |
| 7,795,841 B2 | 9/2010 | Matsumoto |
| 7,804,272 B2 | 9/2010 | Morita et al. |
| 7,804,274 B2 | 9/2010 | Baxter et al. |
| 7,804,845 B2 | 9/2010 | Alrabady |
| 7,821,227 B2 | 10/2010 | Howell et al. |
| 7,825,537 B2 | 11/2010 | Freer |
| 7,830,117 B2 | 11/2010 | Ambrosio et al. |
| 7,834,583 B2 | 11/2010 | Elder et al. |
| 7,838,142 B2 | 11/2010 | Scheucher |
| 7,839,027 B2 | 11/2010 | Shelton et al. |
| 7,839,117 B2 | 11/2010 | Elder et al. |
| 7,841,431 B2 | 11/2010 | Zhou |
| 7,844,370 B2 | 11/2010 | Pollack et al. |
| 7,847,518 B2 | 12/2010 | Ichikawa et al. |
| 7,859,171 B2 | 12/2010 | Micallef |
| 7,859,219 B2 | 12/2010 | Harris |
| 7,863,858 B2 | 1/2011 | Gangstoe et al. |
| 7,863,861 B2 | 1/2011 | Cheng et al. |
| 7,868,587 B2 | 1/2011 | Stevens et al. |
| 7,868,736 B2 | 1/2011 | Fukushima et al. |
| 7,869,576 B1 | 1/2011 | Rodkey et al. |
| 7,869,940 B2 | 1/2011 | Dare |
| 7,872,443 B2 | 1/2011 | Ward |
| 7,880,337 B2 | 2/2011 | Farkas |
| 7,880,436 B2 | 2/2011 | Fischer et al. |
| 7,880,594 B2 | 2/2011 | Breed et al. |
| 7,884,569 B2 | 2/2011 | Ward |
| 7,885,893 B2 | 2/2011 | Alexander |
| 7,886,166 B2 | 2/2011 | Shnekendorf et al. |
| 7,886,857 B2 | 2/2011 | Fujitake |
| 7,889,096 B2 | 2/2011 | Breed |
| 7,890,218 B2 | 2/2011 | Adams et al. |
| 7,899,588 B2 | 3/2011 | Soma et al. |
| 7,906,935 B2 | 3/2011 | Kissel, Jr. |
| 7,906,937 B2 | 3/2011 | Bhade et al. |
| 7,911,184 B2 | 3/2011 | Kohn |
| 7,912,625 B2 | 3/2011 | Cahoon |
| 7,916,467 B2 | 3/2011 | Hotelling et al. |
| 7,917,251 B2 | 3/2011 | Kressner et al. |
| 7,919,907 B2 | 4/2011 | Reichenbach et al. |
| 7,920,102 B2 | 4/2011 | Breed |
| 7,924,147 B2 | 4/2011 | Mathias et al. |
| 7,925,440 B2 | 4/2011 | Allen et al. |
| 7,928,693 B2 | 4/2011 | Hafner et al. |
| 7,928,699 B2 | 4/2011 | Kohn |
| 7,933,695 B2 | 4/2011 | Yamaguchi |
| 7,939,192 B2 | 5/2011 | Hermann |
| 7,940,028 B1 | 5/2011 | Hermann |

(56) References Cited

U.S. PATENT DOCUMENTS

| | | |
|---|---|---|
| 7,944,667 B2 | 5/2011 | Ouwerkerk |
| 7,948,207 B2 | 5/2011 | Scheucher |
| 7,948,208 B2 | 5/2011 | Partovi et al. |
| 7,949,435 B2 | 5/2011 | Pollack et al. |
| 7,950,570 B2 | 5/2011 | Marchasin et al. |
| 7,952,319 B2 | 5/2011 | Lowenthal et al. |
| 7,952,322 B2 | 5/2011 | Partovi et al. |
| 7,952,324 B2 | 5/2011 | Cheng et al. |
| 7,952,325 B2 | 5/2011 | Baxter et al. |
| 7,953,369 B2 | 5/2011 | Baarman |
| 7,956,570 B2 | 6/2011 | Lowenthal et al. |
| 7,957,846 B2 | 6/2011 | Hakim et al. |
| 7,984,774 B2 | 7/2011 | Ippolito |
| 7,984,852 B2 | 7/2011 | Outwater |
| 7,986,126 B1 | 7/2011 | Bucci et al. |
| 7,986,215 B2 | 7/2011 | Beehler et al. |
| 7,988,453 B2 | 8/2011 | Loo et al. |
| 7,989,986 B2 | 8/2011 | Baarman et al. |
| 7,991,665 B2 | 8/2011 | Hafner et al. |
| 7,994,908 B2 | 8/2011 | Tonegawa et al. |
| 7,996,098 B2 | 8/2011 | Dickinson et al. |
| 7,999,506 B1 * | 8/2011 | Hollar et al. ............... 320/104 |
| 7,999,665 B2 | 8/2011 | Chander et al. |
| 8,000,858 B2 | 8/2011 | Tonegawa et al. |
| 8,004,243 B2 | 8/2011 | Paryani et al. |
| 8,008,888 B2 | 8/2011 | Oyobe et al. |
| 8,010,812 B2 | 8/2011 | Forbes, Jr. et al. |
| 8,011,237 B2 | 9/2011 | Gao et al. |
| 8,011,255 B2 | 9/2011 | Arms et al. |
| 8,013,569 B2 | 9/2011 | Hartman |
| 8,013,570 B2 | 9/2011 | Baxter et al. |
| 8,013,611 B2 | 9/2011 | Elder et al. |
| 8,019,501 B2 | 9/2011 | Breed |
| 8,019,697 B2 | 9/2011 | Ozog |
| 8,022,667 B2 | 9/2011 | Anderson |
| 8,024,073 B2 | 9/2011 | Imes et al. |
| 8,024,084 B2 | 9/2011 | Breed |
| 8,025,118 B2 | 9/2011 | Scheucher |
| 8,025,526 B1 | 9/2011 | Tormey et al. |
| 8,026,632 B2 | 9/2011 | Cook et al. |
| 8,026,698 B2 | 9/2011 | Scheucher |
| 8,027,760 B2 | 9/2011 | Chattot |
| 8,030,882 B2 | 10/2011 | Ito et al. |
| 8,030,888 B2 | 10/2011 | Pandya et al. |
| 8,032,233 B2 | 10/2011 | Forbes, Jr. et al. |
| 8,035,255 B2 | 10/2011 | Kurs et al. |
| 8,035,340 B2 | 10/2011 | Stevens et al. |
| 8,035,341 B2 | 10/2011 | Genzel et al. |
| 8,036,788 B2 | 10/2011 | Breed |
| 8,039,995 B2 | 10/2011 | Stevens et al. |
| 8,042,631 B2 | 10/2011 | Grieve et al. |
| 8,044,786 B2 | 10/2011 | Berdichevsky et al. |
| 8,049,460 B2 | 11/2011 | Krauer et al. |
| 8,051,285 B2 | 11/2011 | Shankar et al. |
| 8,054,038 B2 | 11/2011 | Kelty et al. |
| 8,054,039 B2 | 11/2011 | Bauerle et al. |
| 8,054,048 B2 | 11/2011 | Woody et al. |
| 8,054,169 B2 | 11/2011 | Bettecken et al. |
| 8,058,836 B2 | 11/2011 | Ichikawa et al. |
| 8,058,841 B2 | 11/2011 | Chander et al. |
| 8,059,007 B2 | 11/2011 | Hermann et al. |
| 8,061,626 B2 | 11/2011 | Flick |
| 8,063,757 B2 | 11/2011 | Frey et al. |
| 8,069,100 B2 | 11/2011 | Taylor et al. |
| 8,072,182 B2 | 12/2011 | Vasilantone |
| 8,072,184 B2 | 12/2011 | Bhade et al. |
| 8,076,016 B2 | 12/2011 | Baglino et al. |
| 8,078,359 B2 | 12/2011 | Small et al. |
| 8,082,065 B2 | 12/2011 | Imes et al. |
| 8,082,743 B2 | 12/2011 | Hermann et al. |
| 8,084,154 B2 | 12/2011 | Scheucher |
| 8,084,991 B2 | 12/2011 | Yoda et al. |
| 8,085,034 B2 | 12/2011 | Sirton |
| 8,086,355 B1 | 12/2011 | Stanczak et al. |
| 8,089,747 B2 | 1/2012 | Storck et al. |
| 8,092,081 B2 | 1/2012 | Hermann et al. |
| 8,093,861 B2 | 1/2012 | Christensen |
| 8,097,984 B2 | 1/2012 | Baarman et al. |
| 8,098,041 B2 | 1/2012 | Kokotovich et al. |
| 8,098,044 B2 | 1/2012 | Taguchi |
| 8,099,195 B2 | 1/2012 | Imes et al. |
| 8,102,241 B2 | 1/2012 | Okada et al. |
| 8,102,248 B2 | 1/2012 | Yasuda et al. |
| 8,103,386 B2 | 1/2012 | Ichikawa et al. |
| 8,103,387 B2 | 1/2012 | Gothard |
| 8,103,389 B2 | 1/2012 | Golden et al. |
| 8,103,391 B2 | 1/2012 | Ferro et al. |
| 8,106,539 B2 | 1/2012 | Schatz et al. |
| 8,106,627 B1 | 1/2012 | Rossi |
| 8,108,076 B2 | 1/2012 | Imes et al. |
| 8,109,353 B2 | 2/2012 | Gurol et al. |
| 8,111,043 B2 | 2/2012 | Redmann |
| 8,111,143 B2 | 2/2012 | Tong et al. |
| 8,113,310 B2 | 2/2012 | Gurol et al. |
| 8,115,610 B2 | 2/2012 | Lionetti et al. |
| 8,116,681 B2 | 2/2012 | Baarman |
| 8,116,683 B2 | 2/2012 | Baarman |
| 8,116,915 B2 | 2/2012 | Kempton |
| 8,117,857 B2 | 2/2012 | Kelty et al. |
| 8,120,308 B2 | 2/2012 | Ward |
| 8,120,311 B2 | 2/2012 | Baarman et al. |
| 8,120,364 B2 | 2/2012 | Elder et al. |
| 8,121,741 B2 | 2/2012 | Taft et al. |
| 8,121,754 B2 | 2/2012 | Tyndall et al. |
| 8,125,099 B2 | 2/2012 | Flick |
| 8,125,180 B2 | 2/2012 | Grider et al. |
| 8,125,183 B2 | 2/2012 | Katsunaga |
| 8,125,324 B2 | 2/2012 | Frey et al. |
| 8,130,088 B2 | 3/2012 | Unno |
| 8,131,413 B2 | 3/2012 | Yuan |
| 8,131,486 B2 | 3/2012 | Leonard et al. |
| 8,135,614 B2 | 3/2012 | Allen et al. |
| 8,138,715 B2 | 3/2012 | Lowenthal et al. |
| 8,138,718 B2 | 3/2012 | Dower |
| 8,143,842 B2 | 3/2012 | Tyler et al. |
| 8,143,843 B2 | 3/2012 | Ichikawa |
| 8,150,573 B2 | 4/2012 | Shimizu et al. |
| 8,151,127 B2 | 4/2012 | Hardman et al. |
| 8,153,290 B2 | 4/2012 | Hermann et al. |
| 8,154,246 B1 | 4/2012 | Heitmann |
| 8,154,256 B2 | 4/2012 | Kreiner et al. |
| 8,164,301 B2 | 4/2012 | Uchida |
| 8,166,809 B2 | 5/2012 | Weston |
| 8,167,772 B2 | 5/2012 | Stoicoviciu et al. |
| 8,169,104 B2 | 5/2012 | Cunningham et al. |
| 8,169,183 B2 | 5/2012 | Obayashi |
| 8,169,185 B2 | 5/2012 | Partovi et al. |
| 8,169,186 B1 | 5/2012 | Haddad et al. |
| 8,169,311 B1 | 5/2012 | Breed |
| 8,169,340 B2 | 5/2012 | Oyobe et al. |
| 8,174,244 B2 | 5/2012 | Otake |
| 8,178,995 B2 | 5/2012 | Amano et al. |
| 8,179,086 B2 | 5/2012 | Nakaso et al. |
| 8,179,091 B2 | 5/2012 | Kissel, Jr. |
| 8,179,237 B2 | 5/2012 | Yoshizawa |
| 8,183,819 B2 | 5/2012 | Sugano |
| 8,183,821 B2 | 5/2012 | Sakurai |
| 8,183,826 B2 | 5/2012 | Tuffner et al. |
| 8,188,705 B2 | 5/2012 | Wakayama |
| 8,198,855 B2 | 6/2012 | Fukui et al. |
| 8,198,859 B2 | 6/2012 | Tyler et al. |
| 8,212,520 B2 | 7/2012 | Takada et al. |
| 8,212,527 B2 | 7/2012 | Zhang et al. |
| 8,220,568 B2 | 7/2012 | Stoicoviciu |
| 8,229,611 B2 | 7/2012 | Yamada |
| 8,229,616 B2 | 7/2012 | Aridome et al. |
| 8,232,671 B2 | 7/2012 | Andre et al. |
| 8,232,765 B2 | 7/2012 | Billmaier |
| 8,232,875 B2 | 7/2012 | Uchida |
| 8,234,027 B2 | 7/2012 | Yamada |
| 8,234,189 B2 | 7/2012 | Taylor et al. |
| 8,237,403 B2 | 8/2012 | Ishii |
| 8,240,406 B2 | 8/2012 | Stoicoviciu et al. |
| 8,244,422 B2 | 8/2012 | Fujitake |

(56) References Cited

U.S. PATENT DOCUMENTS

| | | | |
|---|---|---|---|
| 8,245,041 B2 | 8/2012 | Shankar et al. |
| 8,248,027 B2 | 8/2012 | Sakoda et al. |
| 8,249,933 B2 | 8/2012 | Sakakibara et al. |
| 8,250,398 B2 | 8/2012 | Solomon et al. |
| 8,258,743 B2 | 9/2012 | Tyler et al. |
| 8,258,744 B2 | 9/2012 | Ishii et al. |
| 8,258,746 B2 | 9/2012 | Kirchner |
| 8,259,423 B2 | 9/2012 | Gale et al. |
| 8,264,196 B2 | 9/2012 | Mera |
| 8,264,197 B2 | 9/2012 | Shimoyama |
| 8,266,075 B2 | 9/2012 | Ambrosio et al. |
| 8,266,465 B2 | 9/2012 | Hardman et al. |
| 8,269,452 B2 | 9/2012 | Watanabe |
| 8,274,378 B2 | 9/2012 | Flick |
| 8,274,379 B2 | 9/2012 | Flick |
| 8,278,875 B2 | 10/2012 | Hagenmaier, Jr. et al. |
| 8,278,881 B2 | 10/2012 | Woody et al. |
| 8,284,053 B2 | 10/2012 | DeLine |
| 8,289,144 B2 | 10/2012 | Zhu et al. |
| 8,290,648 B2 | 10/2012 | Yamada |
| 8,290,649 B2 | 10/2012 | Iwashita et al. |
| 8,292,052 B2 | 10/2012 | Bohori et al. |
| 8,294,415 B2 | 10/2012 | Fujitake |
| 8,294,419 B2 | 10/2012 | Sasaki |
| 8,294,420 B2 | 10/2012 | Kocher |
| 8,299,748 B2 | 10/2012 | Soma et al. |
| 8,299,754 B2 | 10/2012 | Hayashigawa et al. |
| 8,299,891 B2 | 10/2012 | Yamamoto et al. |
| 8,301,079 B2 | 10/2012 | Baarman |
| 8,301,080 B2 | 10/2012 | Baarman |
| 8,301,320 B2 | 10/2012 | Hyde et al. |
| 8,301,322 B2 | 10/2012 | Mitsutani |
| 8,301,365 B2 | 10/2012 | Niwa et al. |
| 8,304,935 B2 | 11/2012 | Karalis et al. |
| 8,305,032 B2 | 11/2012 | McKenna |
| 8,305,033 B2 | 11/2012 | Cavanaugh |
| 8,307,922 B2 | 11/2012 | Perlman et al. |
| 8,307,967 B2 | 11/2012 | Patwardhan |
| 8,310,108 B2 | 11/2012 | Inoue et al. |
| 8,311,690 B2 | 11/2012 | Tanaka |
| 8,315,561 B2 | 11/2012 | Baarman |
| 8,315,745 B2 | 11/2012 | Creed |
| 8,315,930 B2 | 11/2012 | Littrell |
| 8,317,000 B2 | 11/2012 | Miki |
| 8,319,358 B2 | 11/2012 | Curry et al. |
| 8,319,474 B2 | 11/2012 | Mitake et al. |
| 8,321,081 B2 | 11/2012 | Nakamura |
| 8,324,759 B2 | 12/2012 | Karalis et al. |
| 8,324,858 B2 | 12/2012 | Hill et al. |
| 8,324,859 B2 | 12/2012 | Rossi |
| 8,324,860 B2 | 12/2012 | Young et al. |
| 8,326,470 B2 | 12/2012 | Mirle |
| 8,326,485 B2 | 12/2012 | Hyde et al. |
| 8,330,414 B2 | 12/2012 | Takahashi et al. |
| 8,330,415 B2 | 12/2012 | Sato et al. |
| 8,330,594 B2 | 12/2012 | Suzuki et al. |
| 8,331,621 B1 | 12/2012 | Allen et al. |
| 8,332,078 B2 | 12/2012 | Narel et al. |
| 8,332,099 B2 | 12/2012 | Hyde et al. |
| 8,335,062 B2 | 12/2012 | Haines et al. |
| 8,338,990 B2 | 12/2012 | Baarman et al. |
| 8,344,686 B2 | 1/2013 | Gaul et al. |
| 8,346,166 B2 | 1/2013 | Baarman |
| 8,346,167 B2 | 1/2013 | Baarman |
| 8,346,401 B2 | 1/2013 | Pollack et al. |
| 8,350,525 B2 | 1/2013 | Handler |
| 8,350,527 B2 | 1/2013 | Ichikawa |
| 8,351,856 B2 | 1/2013 | Baarman |
| 8,352,095 B2 | 1/2013 | Kim et al. |
| 8,352,107 B2 | 1/2013 | Hyde et al. |
| 8,354,821 B2 | 1/2013 | Cheng et al. |
| 8,354,822 B2 | 1/2013 | Suzuki |
| 8,354,913 B2 | 1/2013 | Solomon et al. |
| 8,355,832 B2 | 1/2013 | Rosendahl |
| 8,355,965 B2 | 1/2013 | Yamada |
| 8,358,227 B2 | 1/2013 | Katrak et al. |
| 8,359,126 B2 | 1/2013 | Tate, Jr. et al. |
| 8,359,132 B2 | 1/2013 | Laberteaux et al. |
| 8,359,133 B2 | 1/2013 | Yu et al. |
| 8,362,651 B2 | 1/2013 | Hamam et al. |
| 8,364,609 B2 | 1/2013 | Ozog |
| 8,368,348 B2 | 2/2013 | Reddy |
| 8,368,349 B2 | 2/2013 | Zyren |
| 8,368,350 B2 * | 2/2013 | Iwanaga et al. ............... 320/109 |
| 8,368,351 B2 | 2/2013 | Zyren |
| 8,368,352 B2 | 2/2013 | Ichikawa et al. |
| 8,373,310 B2 | 2/2013 | Baarman et al. |
| 8,374,729 B2 | 2/2013 | Chapel et al. |
| 8,378,623 B2 | 2/2013 | Kusch et al. |
| 8,378,627 B2 | 2/2013 | Asada et al. |
| 8,378,628 B2 | 2/2013 | Ichikawa et al. |
| 8,380,380 B2 | 2/2013 | Sasaki |
| 8,384,344 B1 | 2/2013 | Rogers |
| 8,384,358 B2 | 2/2013 | Biondo et al. |
| 8,386,103 B2 | 2/2013 | Tran |
| 8,387,452 B2 | 3/2013 | Brusarosco et al. |
| 8,390,245 B2 | 3/2013 | Niwa et al. |
| 8,390,246 B2 | 3/2013 | Taguchi et al. |
| 8,390,247 B1 | 3/2013 | Harris et al. |
| 8,392,048 B2 | 3/2013 | Colarelli, III et al. |
| 8,392,101 B2 | 3/2013 | Hyde et al. |
| 8,393,423 B2 | 3/2013 | Gwozdek et al. |
| 8,396,624 B2 | 3/2013 | Hyde et al. |
| 8,400,017 B2 | 3/2013 | Kurs et al. |
| 8,400,106 B2 | 3/2013 | Midrouillet et al. |
| 8,400,107 B2 | 3/2013 | Taguchi et al. |
| 8,401,722 B2 | 3/2013 | Gale et al. |
| 8,405,345 B2 | 3/2013 | Suganuma et al. |
| 8,405,346 B2 | 3/2013 | Trigiani |
| 8,405,347 B2 | 3/2013 | Gale et al. |
| 8,405,360 B2 | 3/2013 | Young et al. |
| 8,407,144 B2 | 3/2013 | Roberts et al. |
| 8,410,369 B2 | 4/2013 | Kim et al. |
| 8,410,636 B2 | 4/2013 | Kurs et al. |
| 8,410,760 B2 | 4/2013 | Formanski et al. |
| 8,412,454 B2 | 4/2013 | Hyde et al. |
| 8,415,918 B2 | 4/2013 | Tonegawa |
| 8,415,919 B2 | 4/2013 | Saito et al. |
| 8,417,402 B2 | 4/2013 | Basir |
| 8,417,415 B2 | 4/2013 | Phelan |
| 8,417,598 B2 | 4/2013 | Pinkusevich et al. |
| 8,418,823 B2 | 4/2013 | Matsumura |
| 8,421,409 B2 | 4/2013 | Ichikawa |
| 8,421,410 B2 | 4/2013 | Takada et al. |
| 8,421,411 B2 | 4/2013 | Takada et al. |
| 8,421,592 B1 | 4/2013 | Gunasekara et al. |
| 8,423,209 B2 | 4/2013 | Ichikawa |
| 8,423,211 B2 | 4/2013 | Li |
| 8,423,223 B2 | 4/2013 | Nakamura et al. |
| 8,423,273 B2 | 4/2013 | Mineta |
| 8,427,103 B2 | 4/2013 | Ohtomo |
| 8,428,804 B2 | 4/2013 | Sakai et al. |
| 8,432,125 B2 | 4/2013 | Takada et al. |
| 8,432,131 B2 | 4/2013 | Lowenthal et al. |
| 8,432,175 B2 | 4/2013 | Hein |
| 8,433,471 B2 | 4/2013 | Christensen et al. |
| 8,437,882 B2 | 5/2013 | Craig et al. |
| 8,441,154 B2 | 5/2013 | Karalis et al. |
| 8,441,373 B2 | 5/2013 | Jonsson et al. |
| 8,442,698 B2 | 5/2013 | Fahimi et al. |
| 8,446,046 B2 | 5/2013 | Fells et al. |
| 8,446,124 B2 | 5/2013 | Nagy et al. |
| 8,447,543 B2 | 5/2013 | Dickinson et al. |
| 8,450,877 B2 | 5/2013 | Baarman et al. |
| 8,450,966 B2 | 5/2013 | Krauer et al. |
| 8,450,967 B2 | 5/2013 | Lowenthal et al. |
| 8,452,477 B2 | 5/2013 | Ergen et al. |
| 8,452,490 B2 | 5/2013 | Lakirovich et al. |
| 8,452,532 B2 | 5/2013 | Hyde et al. |
| 8,452,642 B2 | 5/2013 | Matsuyama |
| 8,452,661 B2 | 5/2013 | Karch et al. |
| 8,457,797 B2 | 6/2013 | Imes et al. |
| 8,457,821 B2 | 6/2013 | Shaffer |
| 8,457,873 B2 | 6/2013 | Hyde et al. |

(56) References Cited

U.S. PATENT DOCUMENTS

| | | |
|---|---|---|
| 8,459,213 B2 | 6/2013 | Moriarty et al. |
| 8,460,028 B2 | 6/2013 | Tormey et al. |
| 8,461,719 B2 | 6/2013 | Kesler et al. |
| 8,461,720 B2 | 6/2013 | Kurs et al. |
| 8,461,721 B2 | 6/2013 | Karalis et al. |
| 8,461,722 B2 | 6/2013 | Kurs et al. |
| 8,463,472 B2 | 6/2013 | Watanabe |
| 8,463,473 B2 | 6/2013 | Booth et al. |
| 8,463,483 B2 | 6/2013 | Welchko et al. |
| 8,466,583 B2 | 6/2013 | Karalis et al. |
| 8,466,654 B2 | 6/2013 | Cook et al. |
| 8,466,655 B2 | 6/2013 | Mitsutani |
| 8,466,660 B2 | 6/2013 | Iizuka et al. |
| 8,469,122 B2 | 6/2013 | Perlman et al. |
| 8,471,410 B2 | 6/2013 | Karalis et al. |
| 8,473,131 B2 | 6/2013 | Leary |
| 8,473,132 B2 | 6/2013 | Ichikawa et al. |
| 8,476,788 B2 | 7/2013 | Karalis et al. |
| 8,476,865 B2 | 7/2013 | Iwanaga et al. |
| 8,478,452 B2 | 7/2013 | Pratt et al. |
| 8,478,469 B2 | 7/2013 | Ueo et al. |
| 8,482,158 B2 | 7/2013 | Kurs et al. |
| 8,482,250 B2 | 7/2013 | Soar |
| 8,483,901 B2 | 7/2013 | Ichihara |
| 8,487,480 B1 | 7/2013 | Kesler et al. |
| 8,487,584 B2 | 7/2013 | Taylor-Haw et al. |
| 8,487,589 B2 | 7/2013 | Bohme et al. |
| 8,487,636 B2 | 7/2013 | Mitsutani et al. |
| 8,489,315 B2 | 7/2013 | Yamamoto |
| 8,493,022 B2 | 7/2013 | Bertness |
| 8,493,024 B2 | 7/2013 | Kissel, Jr. |
| 8,493,025 B2 | 7/2013 | Turner |
| 8,493,026 B2 | 7/2013 | Sahinoglu et al. |
| 8,497,601 B2 | 7/2013 | Hall et al. |
| 8,498,763 B2 | 7/2013 | Hafner et al. |
| 8,498,920 B2 | 7/2013 | Elam et al. |
| 8,499,910 B2 | 8/2013 | Hubner |
| 8,501,361 B2 | 8/2013 | Uemura et al. |
| 8,502,498 B2 | 8/2013 | Fecher |
| 8,502,499 B2 | 8/2013 | Xiao et al. |
| 8,502,500 B2 | 8/2013 | Baxter et al. |
| 8,504,219 B2 | 8/2013 | Kim et al. |
| 8,504,227 B2 | 8/2013 | Ichishi |
| 8,504,228 B2 | 8/2013 | Obayashi et al. |
| 8,508,077 B2 | 8/2013 | Stevens et al. |
| 8,508,185 B2 | 8/2013 | Basham et al. |
| 8,508,186 B2 | 8/2013 | Morita et al. |
| 8,508,348 B2 | 8/2013 | Suzuki et al. |
| 8,509,954 B2 | 8/2013 | Imes et al. |
| 8,509,957 B2 | 8/2013 | Tsuchiya |
| 8,509,976 B2 | 8/2013 | Kempton |
| 8,511,606 B1 | 8/2013 | Lutke et al. |
| 8,513,915 B2 | 8/2013 | Patel |
| 8,519,562 B2 | 8/2013 | Gibbs et al. |
| 8,519,839 B2 | 8/2013 | Mituta |
| 8,521,337 B1 | 8/2013 | Johnson |
| 8,525,470 B2 | 9/2013 | Gale et al. |
| 8,525,473 B2 | 9/2013 | Shimizu et al. |
| 8,525,480 B2 | 9/2013 | Anderson |
| 8,527,132 B2 | 9/2013 | Mineta |
| 8,527,134 B2 | 9/2013 | Huchard et al. |
| 8,531,162 B2 | 9/2013 | Hafner et al. |
| 8,531,284 B2 | 9/2013 | Liu |
| 8,532,839 B2 | 9/2013 | Drees et al. |
| 8,536,826 B2 | 9/2013 | Matsuoka et al. |
| 8,536,831 B2 | 9/2013 | Kanno |
| 8,536,833 B2 | 9/2013 | Ohnuki |
| 8,538,330 B2 | 9/2013 | Baarman |
| 8,538,621 B2 | 9/2013 | Ross et al. |
| 8,541,903 B2 | 9/2013 | Burk |
| 8,541,978 B2 | 9/2013 | Fukuo et al. |
| 8,543,247 B2 | 9/2013 | Boss et al. |
| 8,543,285 B2 | 9/2013 | Allen et al. |
| 8,544,622 B2 | 10/2013 | Vollenwyder et al. |
| 8,545,284 B2 | 10/2013 | Baarman et al. |
| 8,548,659 B2 | 10/2013 | Tanaka |
| 8,552,592 B2 | 10/2013 | Schatz et al. |
| 8,552,685 B2 | 10/2013 | Kanno |
| 8,558,504 B2 | 10/2013 | Brown et al. |
| 8,561,770 B2 | 10/2013 | Stoicoviciu |
| 8,564,241 B2 | 10/2013 | Masuda |
| 8,564,403 B2 | 10/2013 | Landau-Holdsworth et al. |
| 8,564,454 B2 | 10/2013 | Oizumi et al. |
| 8,565,930 B2 | 10/2013 | Miwa |
| 8,565,950 B2 | 10/2013 | Ishibashi |
| 8,569,914 B2 | 10/2013 | Karalis et al. |
| 8,571,731 B2 | 10/2013 | Hyde et al. |
| 8,571,740 B2 | 10/2013 | Hyde et al. |
| 8,571,791 B2 | 10/2013 | Hyde et al. |
| 8,573,994 B2 | 11/2013 | Kiko et al. |
| 8,575,897 B2 | 11/2013 | Masuda |
| 8,577,528 B2 | 11/2013 | Uyeki |
| 8,581,445 B2 | 11/2013 | Ichikawa |
| 8,583,551 B2 | 11/2013 | Littrell et al. |
| 8,587,153 B2 | 11/2013 | Schatz et al. |
| 8,587,154 B2 | 11/2013 | Fells et al. |
| 8,587,155 B2 | 11/2013 | Giler et al. |
| 8,588,985 B2 | 11/2013 | Stanczak et al. |
| 8,594,859 B2 | 11/2013 | Contreras Delpiano et al. |
| 8,594,871 B2 | 11/2013 | Uchida |
| 8,594,886 B2 | 11/2013 | Saito |
| 8,595,122 B2 | 11/2013 | Kamer et al. |
| 8,598,743 B2 | 12/2013 | Hall et al. |
| 8,600,556 B2 | 12/2013 | Nesler et al. |
| 8,600,564 B2 | 12/2013 | Imes et al. |
| 8,604,750 B2 | 12/2013 | Turner et al. |
| 8,604,751 B2 | 12/2013 | Mitsutani |
| 8,606,445 B2 | 12/2013 | Yaguchi et al. |
| 8,610,396 B2 | 12/2013 | Hunter et al. |
| 8,610,400 B2 | 12/2013 | Stevens et al. |
| 8,610,401 B2 | 12/2013 | Kim et al. |
| 8,610,554 B2 | 12/2013 | Liu |
| 8,611,824 B2 | 12/2013 | Ichikawa |
| 8,615,355 B2 | 12/2013 | Inbarajan et al. |
| 8,618,696 B2 | 12/2013 | Kurs et al. |
| 8,618,766 B2 | 12/2013 | Anderson et al. |
| 8,618,767 B2 | 12/2013 | Ishii et al. |
| 8,618,770 B2 | 12/2013 | Baarman |
| 8,618,771 B2 | 12/2013 | Ichikawa |
| 8,624,549 B2 | 1/2014 | Sridhar et al. |
| 8,626,344 B2 | 1/2014 | Imes et al. |
| 8,626,349 B2 | 1/2014 | Stanczak et al. |
| 8,627,906 B2 | 1/2014 | Lacour |
| 8,629,578 B2 | 1/2014 | Kurs et al. |
| 8,629,654 B2 | 1/2014 | Partovi et al. |
| 8,639,392 B2 | 1/2014 | Chassin |
| 8,639,409 B2 | 1/2014 | Ramaswamy et al. |
| 8,639,922 B2 | 1/2014 | Phatak |
| 8,643,253 B1 | 2/2014 | Micallef |
| 8,643,326 B2 | 2/2014 | Campanella et al. |
| 8,643,329 B2 | 2/2014 | Prosser et al. |
| 8,643,341 B2 | 2/2014 | Hamaguchi et al. |
| 8,648,566 B2 | 2/2014 | Billmaier |
| 8,648,700 B2 | 2/2014 | Gilbert |
| 8,653,698 B2 | 2/2014 | Baarman et al. |
| 8,653,788 B2 | 2/2014 | Masuda |
| 8,659,270 B2 | 2/2014 | Hermann et al. |
| 8,660,709 B2 | 2/2014 | Harvey et al. |
| 8,664,915 B2 | 3/2014 | Sutardja |
| 8,666,572 B2 | 3/2014 | Mitsutani |
| 8,669,676 B2 | 3/2014 | Karalis et al. |
| 8,674,549 B2 | 3/2014 | Teo et al. |
| 8,676,389 B2 | 3/2014 | Golden et al. |
| 8,676,401 B2 | 3/2014 | Asada et al. |
| 8,676,636 B2 | 3/2014 | Genschel et al. |
| 8,680,813 B2 | 3/2014 | Lowenthal et al. |
| 8,686,591 B2 | 4/2014 | Mitsutani |
| 8,686,598 B2 | 4/2014 | Schatz et al. |
| 8,686,687 B2 | 4/2014 | Rossi |
| 8,692,410 B2 | 4/2014 | Schatz et al. |
| 8,692,412 B2 | 4/2014 | Fiorello et al. |
| 8,692,513 B2 | 4/2014 | Gaul et al. |
| 8,694,185 B2 | 4/2014 | Sakamoto et al. |
| 8,698,346 B2 | 4/2014 | Kamaga |

(56) References Cited

U.S. PATENT DOCUMENTS

| | | |
|---|---|---|
| 8,698,451 B2 | 4/2014 | King et al. |
| 8,698,452 B2 | 4/2014 | Scheucher |
| 8,700,187 B2 | 4/2014 | Forbes, Jr. |
| 8,700,225 B2 | 4/2014 | Pratt et al. |
| 8,706,650 B2 | 4/2014 | Ozog |
| 8,710,372 B2 | 4/2014 | Karner |
| 8,710,795 B2 | 4/2014 | Scheucher |
| 8,710,796 B2 | 4/2014 | Muller et al. |
| 8,710,797 B2 | 4/2014 | Niwa |
| 8,710,798 B2 | 4/2014 | Turner |
| 8,716,902 B2 | 5/2014 | Rhodes et al. |
| 8,716,903 B2 | 5/2014 | Kurs et al. |
| 8,716,974 B2 | 5/2014 | Sakoda et al. |
| 8,716,976 B2 | 5/2014 | Kai et al. |
| 8,717,160 B2 | 5/2014 | Liu |
| 8,718,844 B2 | 5/2014 | Krause et al. |
| 8,718,856 B2 | 5/2014 | Leary |
| 8,723,366 B2 | 5/2014 | Fiorello et al. |
| 8,723,477 B2 | 5/2014 | Gaul et al. |
| 8,723,478 B2 | 5/2014 | Billmaier |
| 8,725,331 B2 | 5/2014 | Yoshida |
| 8,725,338 B2 | 5/2014 | Tanaka |
| 8,725,551 B2 | 5/2014 | Ambrosio et al. |
| 8,729,737 B2 | 5/2014 | Schatz et al. |
| 8,729,857 B2 | 5/2014 | Stahlin et al. |
| 8,729,859 B2 | 5/2014 | Cook et al. |
| 8,729,865 B2 | 5/2014 | Scheucher |
| 2001/0004201 A1 | 6/2001 | Kajiura |
| 2001/0012208 A1 | 8/2001 | Boys |
| 2002/0027501 A1 | 3/2002 | Yamanaka et al. |
| 2002/0067078 A1 | 6/2002 | Hogarth |
| 2002/0117897 A1 | 8/2002 | Takahashi |
| 2002/0130771 A1 | 9/2002 | Osborne et al. |
| 2002/0145404 A1 | 10/2002 | Dasgupta et al. |
| 2003/0011276 A1 | 1/2003 | Nowottnick |
| 2003/0102966 A1 | 6/2003 | Konchin et al. |
| 2003/0137277 A1 | 7/2003 | Mori et al. |
| 2003/0152088 A1 | 8/2003 | Kominami et al. |
| 2003/0200025 A1 | 10/2003 | Ross |
| 2003/0205619 A1 | 11/2003 | Terranova et al. |
| 2003/0209063 A1 | 11/2003 | Adamson et al. |
| 2003/0209064 A1 | 11/2003 | Adamson et al. |
| 2003/0230443 A1 | 12/2003 | Cramer et al. |
| 2004/0010358 A1 | 1/2004 | Oesterling et al. |
| 2004/0035617 A1 | 2/2004 | Chaney |
| 2004/0036354 A1 | 2/2004 | Kazmierczak |
| 2004/0069549 A1 | 4/2004 | Ono et al. |
| 2004/0070365 A1 | 4/2004 | Chiu |
| 2004/0164558 A1 | 8/2004 | Adamson et al. |
| 2004/0205032 A1 | 10/2004 | Routtenberg et al. |
| 2004/0230480 A1 | 11/2004 | Kanayama |
| 2004/0263099 A1 | 12/2004 | Maslov et al. |
| 2004/0267617 A1 | 12/2004 | Yanase |
| 2005/0001589 A1 | 1/2005 | Edington et al. |
| 2005/0052080 A1 | 3/2005 | Maslov et al. |
| 2005/0073395 A1 | 4/2005 | Choi |
| 2005/0146220 A1 | 7/2005 | Hamel et al. |
| 2005/0154508 A1 | 7/2005 | Honda |
| 2005/0163063 A1 | 7/2005 | Kuchler et al. |
| 2005/0178632 A1 | 8/2005 | Ross |
| 2005/0192727 A1 | 9/2005 | Shostak et al. |
| 2005/0200463 A1 | 9/2005 | Situ et al. |
| 2005/0274556 A1 | 12/2005 | Chaney |
| 2005/0285569 A1 | 12/2005 | Rao et al. |
| 2006/0005736 A1 | 1/2006 | Kumar |
| 2006/0028167 A1 | 2/2006 | Czubay et al. |
| 2006/0055513 A1 | 3/2006 | French et al. |
| 2006/0061322 A1 | 3/2006 | Yamazaki et al. |
| 2006/0089844 A1 | 4/2006 | Dickinson et al. |
| 2006/0226703 A1 | 10/2006 | Schreiber |
| 2006/0273756 A1 | 12/2006 | Bowling et al. |
| 2006/0284839 A1 | 12/2006 | Breed et al. |
| 2006/0287783 A1 | 12/2006 | Walker |
| 2007/0028958 A1 | 2/2007 | Retti |
| 2007/0050240 A1 | 3/2007 | Belani et al. |
| 2007/0052386 A1 | 3/2007 | Lin |
| 2007/0090810 A1 | 4/2007 | Dickinson et al. |
| 2007/0126395 A1 | 6/2007 | Suchar |
| 2007/0126561 A1 | 6/2007 | Breed |
| 2007/0131505 A1 | 6/2007 | Kim |
| 2007/0139012 A1 | 6/2007 | Hayashigawa |
| 2007/0170886 A1 | 7/2007 | Plishner |
| 2007/0203860 A1 | 8/2007 | Golden et al. |
| 2007/0205881 A1 | 9/2007 | Breed |
| 2007/0210935 A1 | 9/2007 | Yost et al. |
| 2007/0216348 A1 | 9/2007 | Shionoiri et al. |
| 2007/0251621 A1 | 11/2007 | Prost |
| 2007/0282495 A1 | 12/2007 | Kempton et al. |
| 2007/0284158 A1 | 12/2007 | Choi |
| 2008/0007202 A1 | 1/2008 | Pryor |
| 2008/0039979 A1 | 2/2008 | Bridges et al. |
| 2008/0040223 A1 | 2/2008 | Bridges et al. |
| 2008/0040263 A1 | 2/2008 | Pollack et al. |
| 2008/0040295 A1 | 2/2008 | Kaplan et al. |
| 2008/0040296 A1 | 2/2008 | Bridges et al. |
| 2008/0052145 A1 | 2/2008 | Kaplan et al. |
| 2008/0053716 A1 | 3/2008 | Scheucher |
| 2008/0065290 A1 | 3/2008 | Breed et al. |
| 2008/0067974 A1 | 3/2008 | Zhang et al. |
| 2008/0077286 A1 | 3/2008 | Oyobe et al. |
| 2008/0084138 A1 | 4/2008 | Micallef |
| 2008/0086240 A1 | 4/2008 | Breed |
| 2008/0111519 A1 | 5/2008 | Vasilantone |
| 2008/0113226 A1 | 5/2008 | Dasgupta et al. |
| 2008/0119966 A1 | 5/2008 | Breed et al. |
| 2008/0136371 A1 | 6/2008 | Sutardja |
| 2008/0140278 A1 | 6/2008 | Breed |
| 2008/0150490 A1 | 6/2008 | Koziara et al. |
| 2008/0154800 A1 | 6/2008 | Fein et al. |
| 2008/0154801 A1 | 6/2008 | Fein et al. |
| 2008/0167756 A1 | 7/2008 | Golden et al. |
| 2008/0179889 A1 | 7/2008 | Matsui |
| 2008/0203973 A1 | 8/2008 | Gale et al. |
| 2008/0218122 A1 | 9/2008 | Takano et al. |
| 2008/0221746 A1 | 9/2008 | Plishner |
| 2008/0272906 A1 | 11/2008 | Breed |
| 2008/0280192 A1 | 11/2008 | Drozdz et al. |
| 2008/0281663 A1 | 11/2008 | Hakim et al. |
| 2008/0297109 A1 | 12/2008 | Sandberg et al. |
| 2008/0304212 A1 | 12/2008 | Seff et al. |
| 2008/0312782 A1 | 12/2008 | Berdichevsky et al. |
| 2009/0010028 A1 | 1/2009 | Baarman et al. |
| 2009/0021213 A1 | 1/2009 | Johnson |
| 2009/0023056 A1 | 1/2009 | Adams et al. |
| 2009/0024255 A1 | 1/2009 | Penzenstadler et al. |
| 2009/0024458 A1 | 1/2009 | Palmer |
| 2009/0024545 A1 | 1/2009 | Golden et al. |
| 2009/0030712 A1 | 1/2009 | Bogolea et al. |
| 2009/0040029 A1 | 2/2009 | Bridges et al. |
| 2009/0043519 A1 | 2/2009 | Bridges et al. |
| 2009/0043520 A1 | 2/2009 | Pollack et al. |
| 2009/0057041 A1 | 3/2009 | Kamaga |
| 2009/0058371 A1 | 3/2009 | Nakajima et al. |
| 2009/0063228 A1 | 3/2009 | Forbes, Jr. |
| 2009/0063680 A1 | 3/2009 | Bridges et al. |
| 2009/0066287 A1 | 3/2009 | Pollack et al. |
| 2009/0079384 A1 | 3/2009 | Harris |
| 2009/0079389 A1* | 3/2009 | Ohtomo ................ 320/109 |
| 2009/0082957 A1 | 3/2009 | Agassi et al. |
| 2009/0088907 A1 | 4/2009 | Lewis et al. |
| 2009/0102433 A1 | 4/2009 | Kamaga |
| 2009/0102636 A1 | 4/2009 | Tranchina |
| 2009/0121659 A1 | 5/2009 | Oyobe et al. |
| 2009/0140698 A1 | 6/2009 | Eberhard et al. |
| 2009/0140700 A1 | 6/2009 | Eberhard et al. |
| 2009/0143929 A1 | 6/2009 | Eberhard et al. |
| 2009/0144150 A1 | 6/2009 | Sakakibara et al. |
| 2009/0149290 A1 | 6/2009 | Wallner et al. |
| 2009/0153099 A1 | 6/2009 | Mahawili |
| 2009/0167254 A1 | 7/2009 | Eberhard et al. |
| 2009/0174778 A1 | 7/2009 | Allen et al. |
| 2009/0177580 A1 | 7/2009 | Lowenthal et al. |
| 2009/0177595 A1 | 7/2009 | Dunlap et al. |
| 2009/0192927 A1 | 7/2009 | Berg et al. |

(56) References Cited

U.S. PATENT DOCUMENTS

| | | |
|---|---|---|
| 2009/0200988 A1 | 8/2009 | Bridges et al. |
| 2009/0210357 A1 | 8/2009 | Pudar et al. |
| 2009/0212637 A1 | 8/2009 | Baarman et al. |
| 2009/0222143 A1 | 9/2009 | Kempton |
| 2009/0224724 A1 | 9/2009 | Ma et al. |
| 2009/0228388 A1 | 9/2009 | Axelrod et al. |
| 2009/0228403 A1 | 9/2009 | Elam et al. |
| 2009/0251300 A1 | 10/2009 | Yasuda et al. |
| 2009/0259603 A1 | 10/2009 | Housh et al. |
| 2009/0287578 A1 | 11/2009 | Paluszek et al. |
| 2009/0299918 A1 | 12/2009 | Cook et al. |
| 2009/0302801 A1 | 12/2009 | Katsunaga |
| 2009/0313032 A1 | 12/2009 | Hafner et al. |
| 2009/0313033 A1 | 12/2009 | Hafner et al. |
| 2009/0313034 A1 | 12/2009 | Ferro et al. |
| 2009/0313098 A1 | 12/2009 | Hafner et al. |
| 2009/0313103 A1 | 12/2009 | Ambrosio et al. |
| 2009/0313104 A1 | 12/2009 | Hafner et al. |
| 2009/0313174 A1 | 12/2009 | Hafner et al. |
| 2009/0326725 A1 | 12/2009 | Carlson et al. |
| 2010/0006356 A1 | 1/2010 | Curry et al. |
| 2010/0010685 A1 | 1/2010 | Kang |
| 2010/0013435 A1 | 1/2010 | Tu |
| 2010/0017043 A1 | 1/2010 | Kressner et al. |
| 2010/0017045 A1 | 1/2010 | Nesler et al. |
| 2010/0017249 A1 | 1/2010 | Fincham et al. |
| 2010/0018785 A1 | 1/2010 | Samuel |
| 2010/0019723 A1 | 1/2010 | Ichikawa |
| 2010/0019734 A1 | 1/2010 | Oyobe et al. |
| 2010/0026243 A1 | 2/2010 | Tatsumi |
| 2010/0039062 A1 | 2/2010 | Gu et al. |
| 2010/0045232 A1 | 2/2010 | Chen et al. |
| 2010/0049396 A1 | 2/2010 | Ferro et al. |
| 2010/0049533 A1 | 2/2010 | Ferro et al. |
| 2010/0049610 A1 | 2/2010 | Ambrosio et al. |
| 2010/0049639 A1 | 2/2010 | Ferro et al. |
| 2010/0049737 A1 | 2/2010 | Ambrosio et al. |
| 2010/0057282 A1 | 3/2010 | Katrak et al. |
| 2010/0057306 A1 | 3/2010 | Ishii et al. |
| 2010/0065344 A1 | 3/2010 | Collings, III |
| 2010/0072946 A1 | 3/2010 | Sugano |
| 2010/0072953 A1 | 3/2010 | Mitsutani |
| 2010/0076878 A1 | 3/2010 | Burr et al. |
| 2010/0082277 A1 | 4/2010 | Ballard |
| 2010/0082464 A1 | 4/2010 | Keefe |
| 2010/0094496 A1 | 4/2010 | Hershkovitz et al. |
| 2010/0097036 A1 | 4/2010 | Wakayama |
| 2010/0103702 A1 | 4/2010 | Baarman |
| 2010/0106631 A1 | 4/2010 | Kurayama et al. |
| 2010/0106641 A1 | 4/2010 | Chassin et al. |
| 2010/0109604 A1 | 5/2010 | Boys et al. |
| 2010/0114800 A1 | 5/2010 | Yasuda et al. |
| 2010/0114801 A1 | 5/2010 | Plishner |
| 2010/0133916 A1 | 6/2010 | Sato |
| 2010/0134067 A1 | 6/2010 | Baxter et al. |
| 2010/0138093 A1 | 6/2010 | Oku et al. |
| 2010/0138363 A1 | 6/2010 | Batterberry et al. |
| 2010/0141203 A1 | 6/2010 | Graziano et al. |
| 2010/0145535 A1 | 6/2010 | Tyler et al. |
| 2010/0145837 A1 | 6/2010 | Graziano et al. |
| 2010/0145885 A1 | 6/2010 | Graziano et al. |
| 2010/0156193 A1 | 6/2010 | Rhodes et al. |
| 2010/0156349 A1 | 6/2010 | Littrell |
| 2010/0156355 A1 | 6/2010 | Bauerle et al. |
| 2010/0161393 A1 | 6/2010 | Littrell |
| 2010/0161469 A1 | 6/2010 | Littrell |
| 2010/0161480 A1 | 6/2010 | Littrell |
| 2010/0161481 A1 | 6/2010 | Littrell |
| 2010/0161482 A1 | 6/2010 | Littrell |
| 2010/0161517 A1 | 6/2010 | Littrell |
| 2010/0161518 A1 | 6/2010 | Littrell |
| 2010/0164439 A1 | 7/2010 | Ido |
| 2010/0171368 A1 | 7/2010 | Schatz et al. |
| 2010/0174667 A1 | 7/2010 | Vitale et al. |
| 2010/0179862 A1 | 7/2010 | Chassin et al. |
| 2010/0179893 A1 | 7/2010 | Burke et al. |
| 2010/0188042 A1 | 7/2010 | Yeh |
| 2010/0191585 A1 | 7/2010 | Smith |
| 2010/0198440 A1 | 8/2010 | Fujitake |
| 2010/0198751 A1 | 8/2010 | Jacobus |
| 2010/0201309 A1 | 8/2010 | Meek |
| 2010/0207572 A1 | 8/2010 | Kirby et al. |
| 2010/0207588 A1 | 8/2010 | Lowenthal et al. |
| 2010/0211340 A1 | 8/2010 | Lowenthal et al. |
| 2010/0211643 A1 | 8/2010 | Lowenthal et al. |
| 2010/0213898 A1 | 8/2010 | Hayashigawa |
| 2010/0217452 A1 | 8/2010 | McCord et al. |
| 2010/0217549 A1 | 8/2010 | Galvin et al. |
| 2010/0217651 A1 | 8/2010 | Crabtree et al. |
| 2010/0228415 A1 | 9/2010 | Paul |
| 2010/0231163 A1 | 9/2010 | Mashinsky |
| 2010/0231164 A1 | 9/2010 | Yang |
| 2010/0231340 A1 | 9/2010 | Fiorello et al. |
| 2010/0235006 A1 | 9/2010 | Brown |
| 2010/0235008 A1 | 9/2010 | Forbes, Jr. et al. |
| 2010/0235304 A1 | 9/2010 | Mikos |
| 2010/0241299 A1 | 9/2010 | Ito et al. |
| 2010/0241560 A1 | 9/2010 | Landau-Holdsworth et al. |
| 2010/0250043 A1 | 9/2010 | Scheucher |
| 2010/0250590 A1 | 9/2010 | Galvin |
| 2010/0256830 A1 | 10/2010 | Kressner et al. |
| 2010/0259110 A1 | 10/2010 | Kurs et al. |
| 2010/0262566 A1 | 10/2010 | Yamamoto |
| 2010/0268411 A1 | 10/2010 | Taguchi |
| 2010/0271172 A1 | 10/2010 | Takikita |
| 2010/0271192 A1 | 10/2010 | Mituta |
| 2010/0274570 A1 | 10/2010 | Proefke et al. |
| 2010/0274656 A1 | 10/2010 | Genschel et al. |
| 2010/0277121 A1 | 11/2010 | Hall et al. |
| 2010/0280675 A1 | 11/2010 | Tate, Jr. et al. |
| 2010/0283426 A1 | 11/2010 | Redmann |
| 2010/0283432 A1 | 11/2010 | Ellwanger et al. |
| 2010/0289331 A1 | 11/2010 | Shionoiri et al. |
| 2010/0292855 A1 | 11/2010 | Kintner-Meyer |
| 2010/0292877 A1 | 11/2010 | Lee |
| 2010/0301802 A1 | 12/2010 | Iida |
| 2010/0301810 A1 | 12/2010 | Biondo et al. |
| 2010/0306033 A1 | 12/2010 | Oved et al. |
| 2010/0308769 A1 | 12/2010 | Baba |
| 2010/0308939 A1 | 12/2010 | Kurs |
| 2010/0309778 A1 | 12/2010 | Young |
| 2010/0315197 A1 | 12/2010 | Solomon et al. |
| 2010/0318250 A1 | 12/2010 | Mitsutani |
| 2010/0320018 A1 | 12/2010 | Gwozdek et al. |
| 2010/0320964 A1 | 12/2010 | Lathrop et al. |
| 2010/0320966 A1 | 12/2010 | Baxter et al. |
| 2010/0328314 A1 | 12/2010 | Ellingham et al. |
| 2010/0332076 A1 | 12/2010 | Dickinson et al. |
| 2011/0001356 A1 | 1/2011 | Pollack |
| 2011/0003183 A1 | 1/2011 | Baglino et al. |
| 2011/0004358 A1 | 1/2011 | Pollack et al. |
| 2011/0004406 A1 | 1/2011 | Davis |
| 2011/0007824 A1 | 1/2011 | Bridges et al. |
| 2011/0010043 A1 | 1/2011 | Lafky |
| 2011/0010158 A1 | 1/2011 | Bridges |
| 2011/0010281 A1 | 1/2011 | Wass |
| 2011/0012563 A1 | 1/2011 | Paryani et al. |
| 2011/0013322 A1 | 1/2011 | Gale et al. |
| 2011/0014501 A1 | 1/2011 | Scheucher |
| 2011/0016063 A1 | 1/2011 | Pollack et al. |
| 2011/0017529 A1 | 1/2011 | Durney |
| 2011/0022254 A1 | 1/2011 | Johas Teener et al. |
| 2011/0022256 A1 | 1/2011 | Asada et al. |
| 2011/0025267 A1 | 2/2011 | Kamen et al. |
| 2011/0025556 A1 | 2/2011 | Bridges et al. |
| 2011/0029144 A1 | 2/2011 | Muller et al. |
| 2011/0029146 A1 | 2/2011 | Muller et al. |
| 2011/0029157 A1 | 2/2011 | Muzaffer |
| 2011/0029170 A1 | 2/2011 | Hyde et al. |
| 2011/0029187 A1 | 2/2011 | Hyde et al. |
| 2011/0029189 A1 | 2/2011 | Hyde et al. |
| 2011/0031047 A1 | 2/2011 | Tarr |
| 2011/0040666 A1 | 2/2011 | Crabtree et al. |
| 2011/0043161 A1 | 2/2011 | Artieda et al. |

(56) References Cited

U.S. PATENT DOCUMENTS

| | | |
|---|---|---|
| 2011/0043165 A1 | 2/2011 | Kinser et al. |
| 2011/0046798 A1 | 2/2011 | Imes et al. |
| 2011/0047102 A1 | 2/2011 | Grider et al. |
| 2011/0049978 A1 | 3/2011 | Sasaki et al. |
| 2011/0050164 A1 | 3/2011 | Partovi et al. |
| 2011/0050168 A1 | 3/2011 | Yoo et al. |
| 2011/0060535 A1 | 3/2011 | Arms et al. |
| 2011/0066515 A1 | 3/2011 | Horvath et al. |
| 2011/0068739 A1 | 3/2011 | Smith |
| 2011/0071923 A1 | 3/2011 | Kende et al. |
| 2011/0071932 A1 | 3/2011 | Agassi et al. |
| 2011/0074231 A1 | 3/2011 | Soderberg |
| 2011/0074346 A1 | 3/2011 | Hall et al. |
| 2011/0074348 A1 | 3/2011 | Villa Gazulla et al. |
| 2011/0074351 A1 | 3/2011 | Bianco et al. |
| 2011/0077805 A1 | 3/2011 | Hyde et al. |
| 2011/0077806 A1 | 3/2011 | Hyde et al. |
| 2011/0077808 A1 | 3/2011 | Hyde et al. |
| 2011/0078092 A1 | 3/2011 | Kim et al. |
| 2011/0082612 A1 | 4/2011 | Ichikawa |
| 2011/0082616 A1 | 4/2011 | Small et al. |
| 2011/0082618 A1 | 4/2011 | Small et al. |
| 2011/0082619 A1 | 4/2011 | Small et al. |
| 2011/0082620 A1 | 4/2011 | Small et al. |
| 2011/0082627 A1 | 4/2011 | Small et al. |
| 2011/0084658 A1 | 4/2011 | Yamamoto et al. |
| 2011/0087399 A1 | 4/2011 | Hyde et al. |
| 2011/0093127 A1 | 4/2011 | Kaplan |
| 2011/0093396 A1 | 4/2011 | Parkos et al. |
| 2011/0095618 A1 | 4/2011 | Schatz et al. |
| 2011/0099111 A1 | 4/2011 | Levy et al. |
| 2011/0099144 A1 | 4/2011 | Levy et al. |
| 2011/0106329 A1 | 5/2011 | Donnelly et al. |
| 2011/0106336 A1 | 5/2011 | Eikeland et al. |
| 2011/0109263 A1 | 5/2011 | Sakoda et al. |
| 2011/0115303 A1 | 5/2011 | Baarman et al. |
| 2011/0118919 A1 | 5/2011 | Park et al. |
| 2011/0121778 A1 | 5/2011 | Oyobe et al. |
| 2011/0127956 A1 | 6/2011 | Mitsutani |
| 2011/0133693 A1 | 6/2011 | Lowenthal et al. |
| 2011/0140656 A1 | 6/2011 | Starr et al. |
| 2011/0140658 A1 | 6/2011 | Outwater et al. |
| 2011/0140835 A1 | 6/2011 | Ishibashi |
| 2011/0144823 A1 | 6/2011 | Muller et al. |
| 2011/0145141 A1 | 6/2011 | Blain |
| 2011/0148350 A1 | 6/2011 | Wegener et al. |
| 2011/0148351 A1 | 6/2011 | Ichikawa |
| 2011/0148353 A1 | 6/2011 | King et al. |
| 2011/0153131 A1 | 6/2011 | Kressner et al. |
| 2011/0153474 A1 | 6/2011 | Tormey et al. |
| 2011/0156642 A1 | 6/2011 | Noguchi et al. |
| 2011/0161143 A1 | 6/2011 | Tajima |
| 2011/0163542 A1 | 7/2011 | Farkas |
| 2011/0163716 A1 | 7/2011 | Gale et al. |
| 2011/0163717 A1 | 7/2011 | Gale et al. |
| 2011/0169447 A1 | 7/2011 | Brown et al. |
| 2011/0172841 A1 | 7/2011 | Forbes, Jr. |
| 2011/0174875 A1 | 7/2011 | Wurzer |
| 2011/0175458 A1 | 7/2011 | Baarman |
| 2011/0175569 A1 | 7/2011 | Austin |
| 2011/0178959 A1 | 7/2011 | Nakajima et al. |
| 2011/0181240 A1 | 7/2011 | Baarman et al. |
| 2011/0184600 A1 | 7/2011 | Kristinsson et al. |
| 2011/0184842 A1 | 7/2011 | Melen |
| 2011/0187320 A1 | 8/2011 | Murayama |
| 2011/0187321 A1 | 8/2011 | Hirayama |
| 2011/0191220 A1 | 8/2011 | Kidston et al. |
| 2011/0191265 A1 | 8/2011 | Lowenthal et al. |
| 2011/0196692 A1 | 8/2011 | Chavez, Jr. et al. |
| 2011/0199047 A1 | 8/2011 | Fujii |
| 2011/0199048 A1 | 8/2011 | Yokoyama et al. |
| 2011/0202192 A1 | 8/2011 | Kempton |
| 2011/0202213 A1 | 8/2011 | Rosendahl |
| 2011/0202219 A1 | 8/2011 | Ishibashi |
| 2011/0202221 A1 | 8/2011 | Sobue et al. |
| 2011/0202418 A1 | 8/2011 | Kempton et al. |
| 2011/0204711 A1 | 8/2011 | Norconk et al. |
| 2011/0204845 A1* | 8/2011 | Paparo et al. .................. 320/108 |
| 2011/0208370 A1 | 8/2011 | Lee |
| 2011/0213656 A1 | 9/2011 | Turner |
| 2011/0213983 A1 | 9/2011 | Staugaitis et al. |
| 2011/0215758 A1 | 9/2011 | Stahlin et al. |
| 2011/0221384 A1 | 9/2011 | Scheucher |
| 2011/0221387 A1 | 9/2011 | Steigerwald et al. |
| 2011/0224841 A1 | 9/2011 | Profitt-Brown et al. |
| 2011/0224852 A1 | 9/2011 | Profitt-Brown et al. |
| 2011/0225105 A1 | 9/2011 | Scholer et al. |
| 2011/0227531 A1 | 9/2011 | Rajakaruna |
| 2011/0227532 A1 | 9/2011 | Niwa |
| 2011/0231029 A1 | 9/2011 | Ichikawa et al. |
| 2011/0231044 A1 | 9/2011 | Fassnacht |
| 2011/0246259 A1 | 10/2011 | Hostyn et al. |
| 2011/0254503 A1 | 10/2011 | Widmer et al. |
| 2011/0254504 A1 | 10/2011 | Haddad et al. |
| 2011/0254505 A1 | 10/2011 | Evander et al. |
| 2011/0258112 A1 | 10/2011 | Eder et al. |
| 2011/0270462 A1 | 11/2011 | Amano et al. |
| 2011/0270476 A1 | 11/2011 | Doppler et al. |
| 2011/0270480 A1 | 11/2011 | Ishibashi et al. |
| 2011/0270487 A1 | 11/2011 | Dickinson et al. |
| 2011/0273137 A1 | 11/2011 | Nakatsuji et al. |
| 2011/0276448 A1 | 11/2011 | Perper et al. |
| 2011/0278940 A1 | 11/2011 | Krishna et al. |
| 2011/0278950 A1 | 11/2011 | Baarman |
| 2011/0279083 A1 | 11/2011 | Asai et al. |
| 2011/0282508 A1 | 11/2011 | Goutard et al. |
| 2011/0282513 A1 | 11/2011 | Son et al. |
| 2011/0285210 A1 | 11/2011 | Lemmens et al. |
| 2011/0285349 A1 | 11/2011 | Widmer et al. |
| 2011/0291491 A1 | 12/2011 | Lemmens et al. |
| 2011/0291612 A1 | 12/2011 | Fujitake |
| 2011/0291615 A1 | 12/2011 | Pandya et al. |
| 2011/0298298 A1 | 12/2011 | Baarman |
| 2011/0298417 A1 | 12/2011 | Stewart et al. |
| 2011/0302108 A1 | 12/2011 | Werner |
| 2011/0304298 A1 | 12/2011 | Gow et al. |
| 2011/0309791 A1 | 12/2011 | Mitake et al. |
| 2011/0316478 A1 | 12/2011 | Lowenthal et al. |
| 2011/0316479 A1 | 12/2011 | Baxter et al. |
| 2011/0320056 A1 | 12/2011 | Brown et al. |
| 2012/0001487 A1 | 1/2012 | Pessina |
| 2012/0004798 A1 | 1/2012 | Sakamoto et al. |
| 2012/0005031 A1 | 1/2012 | Jammer |
| 2012/0005125 A1 | 1/2012 | Jammer |
| 2012/0005126 A1 | 1/2012 | Oh et al. |
| 2012/0007553 A1 | 1/2012 | Ichikawa et al. |
| 2012/0007557 A1 | 1/2012 | Hayashigawa |
| 2012/0010769 A1 | 1/2012 | Sourioux et al. |
| 2012/0013298 A1 | 1/2012 | Prosser et al. |
| 2012/0013299 A1 | 1/2012 | Prosser et al. |
| 2012/0013300 A1 | 1/2012 | Prosser et al. |
| 2012/0013302 A1 | 1/2012 | Genzel et al. |
| 2012/0016546 A1 | 1/2012 | Nilssen et al. |
| 2012/0016551 A1 | 1/2012 | Krause et al. |
| 2012/0019196 A1 | 1/2012 | Fung |
| 2012/0019205 A1 | 1/2012 | Kressner et al. |
| 2012/0019206 A1 | 1/2012 | Sekido et al. |
| 2012/0019215 A1 | 1/2012 | Wenger et al. |
| 2012/0021258 A1 | 1/2012 | Kelty et al. |
| 2012/0025758 A1 | 2/2012 | Bohori et al. |
| 2012/0025759 A1 | 2/2012 | Kressner |
| 2012/0032633 A1 | 2/2012 | Cordes et al. |
| 2012/0032636 A1 | 2/2012 | Bianco |
| 2012/0032637 A1 | 2/2012 | Kotooka et al. |
| 2012/0041855 A1 | 2/2012 | Sterling et al. |
| 2012/0044843 A1 | 2/2012 | Levy et al. |
| 2012/0046795 A1 | 2/2012 | Kelty |
| 2012/0049621 A1 | 3/2012 | Shinoda |
| 2012/0049793 A1 | 3/2012 | Ross et al. |
| 2012/0053771 A1 | 3/2012 | Yoshida |
| 2012/0054125 A1 | 3/2012 | Clifton et al. |
| 2012/0056580 A1 | 3/2012 | Kai et al. |
| 2012/0059775 A1 | 3/2012 | Oh et al. |
| 2012/0068551 A1 | 3/2012 | Pooley et al. |

(56) References Cited

U.S. PATENT DOCUMENTS

| | | |
|---|---|---|
| 2012/0074902 A1 | 3/2012 | Scheucher |
| 2012/0074903 A1 | 3/2012 | Nakashima |
| 2012/0081073 A1 | 4/2012 | Niemann et al. |
| 2012/0083930 A1 | 4/2012 | Ilic et al. |
| 2012/0091832 A1 | 4/2012 | Soderberg |
| 2012/0091949 A1 | 4/2012 | Campanella et al. |
| 2012/0091950 A1 | 4/2012 | Campanella et al. |
| 2012/0091954 A1 | 4/2012 | Matsuki |
| 2012/0091957 A1 | 4/2012 | Masuda |
| 2012/0091958 A1 | 4/2012 | Ichikawa et al. |
| 2012/0091961 A1 | 4/2012 | Hani et al. |
| 2012/0098490 A1 | 4/2012 | Masuda |
| 2012/0104868 A1 | 5/2012 | Baarman et al. |
| 2012/0104998 A1 | 5/2012 | Takada et al. |
| 2012/0105002 A1 | 5/2012 | Eikeland et al. |
| 2012/0106672 A1 | 5/2012 | Shelton et al. |
| 2012/0109401 A1 | 5/2012 | Shelton et al. |
| 2012/0109402 A1 | 5/2012 | Shelton et al. |
| 2012/0109403 A1 | 5/2012 | Shelton et al. |
| 2012/0109797 A1 | 5/2012 | Shelton et al. |
| 2012/0109798 A1 | 5/2012 | Shelton et al. |
| 2012/0112531 A1 | 5/2012 | Kesler et al. |
| 2012/0112532 A1 | 5/2012 | Kesler et al. |
| 2012/0112534 A1 | 5/2012 | Kesler et al. |
| 2012/0112535 A1 | 5/2012 | Karalis et al. |
| 2012/0112536 A1 | 5/2012 | Karalis et al. |
| 2012/0112538 A1 | 5/2012 | Kesler et al. |
| 2012/0112552 A1 | 5/2012 | Baarman et al. |
| 2012/0112553 A1 | 5/2012 | Stoner, Jr. et al. |
| 2012/0112691 A1 | 5/2012 | Kurs et al. |
| 2012/0112694 A1 | 5/2012 | Frisch et al. |
| 2012/0112696 A1 | 5/2012 | Ikeda et al. |
| 2012/0112697 A1 | 5/2012 | Heuer et al. |
| 2012/0112698 A1 | 5/2012 | Yoshimura et al. |
| 2012/0116575 A1 | 5/2012 | Prosser et al. |
| 2012/0119569 A1 | 5/2012 | Karalis et al. |
| 2012/0119575 A1 | 5/2012 | Kurs et al. |
| 2012/0119576 A1 | 5/2012 | Kesler et al. |
| 2012/0119698 A1 | 5/2012 | Karalis et al. |
| 2012/0126747 A1 | 5/2012 | Kiko et al. |
| 2012/0133324 A1 | 5/2012 | Baarman et al. |
| 2012/0133326 A1 | 5/2012 | Ichikawa et al. |
| 2012/0139489 A1 | 6/2012 | Gaul et al. |
| 2012/0139490 A1 | 6/2012 | Ishii |
| 2012/0143423 A1 | 6/2012 | Theisen et al. |
| 2012/0146581 A1 | 6/2012 | Tu |
| 2012/0146582 A1 | 6/2012 | Lei et al. |
| 2012/0146583 A1 | 6/2012 | Gaul et al. |
| 2012/0150360 A1 | 6/2012 | Kirchner et al. |
| 2012/0150670 A1 | 6/2012 | Taylor et al. |
| 2012/0153893 A1 | 6/2012 | Schatz et al. |
| 2012/0153894 A1 | 6/2012 | Widmer |
| 2012/0153895 A1 | 6/2012 | Gale et al. |
| 2012/0153896 A1 | 6/2012 | Rossi |
| 2012/0158229 A1 | 6/2012 | Schaefer |
| 2012/0161696 A1 | 6/2012 | Cook et al. |
| 2012/0161704 A1 | 6/2012 | Gaul et al. |
| 2012/0161925 A1 | 6/2012 | Gale et al. |
| 2012/0166011 A1 | 6/2012 | Oba et al. |
| 2012/0166012 A1 | 6/2012 | Lee et al. |
| 2012/0166240 A1 | 6/2012 | Jones et al. |
| 2012/0166269 A1 | 6/2012 | Payne et al. |
| 2012/0169282 A1 | 7/2012 | Helnerus et al. |
| 2012/0169283 A1 | 7/2012 | Lowenthal et al. |
| 2012/0173061 A1 | 7/2012 | Hanley et al. |
| 2012/0173074 A1 | 7/2012 | Yasko et al. |
| 2012/0173292 A1 | 7/2012 | Solomon et al. |
| 2012/0175967 A1 | 7/2012 | Dibben et al. |
| 2012/0179311 A1 | 7/2012 | Skaff et al. |
| 2012/0179323 A1 | 7/2012 | Profitt-Brown et al. |
| 2012/0181876 A1 | 7/2012 | Baarman et al. |
| 2012/0181981 A1 | 7/2012 | Wechlin et al. |
| 2012/0181983 A1 | 7/2012 | Khan et al. |
| 2012/0184338 A1 | 7/2012 | Kesler et al. |
| 2012/0185379 A1 | 7/2012 | Tu |
| 2012/0187757 A1 | 7/2012 | Wechlin et al. |
| 2012/0191524 A1 | 7/2012 | Ambrosio et al. |
| 2012/0191600 A1 | 7/2012 | Boot |
| 2012/0193929 A1 | 8/2012 | Karner |
| 2012/0194127 A1 | 8/2012 | Kobayashi et al. |
| 2012/0197693 A1 | 8/2012 | Karner et al. |
| 2012/0200260 A1 | 8/2012 | Karner et al. |
| 2012/0203410 A1 | 8/2012 | Wechlin et al. |
| 2012/0206092 A1 | 8/2012 | Yukizane |
| 2012/0206096 A1 | 8/2012 | John |
| 2012/0206098 A1 | 8/2012 | Kim |
| 2012/0206100 A1 | 8/2012 | Brown et al. |
| 2012/0209465 A1 | 8/2012 | Dehmann |
| 2012/0215725 A1 | 8/2012 | Imes et al. |
| 2012/0221160 A1 | 8/2012 | Hafner et al. |
| 2012/0228952 A1 | 9/2012 | Hall et al. |
| 2012/0228953 A1 | 9/2012 | Kesler et al. |
| 2012/0228954 A1 | 9/2012 | Kesler et al. |
| 2012/0234971 A1 | 9/2012 | Bugash et al. |
| 2012/0235474 A1 | 9/2012 | Mannino et al. |
| 2012/0235501 A1 | 9/2012 | Kesler et al. |
| 2012/0235502 A1 | 9/2012 | Kesler et al. |
| 2012/0235503 A1 | 9/2012 | Kesler et al. |
| 2012/0235504 A1 | 9/2012 | Kesler et al. |
| 2012/0235505 A1 | 9/2012 | Schatz et al. |
| 2012/0235566 A1 | 9/2012 | Karalis et al. |
| 2012/0235633 A1 | 9/2012 | Kesler et al. |
| 2012/0235634 A1 | 9/2012 | Hall et al. |
| 2012/0239117 A1 | 9/2012 | Kesler et al. |
| 2012/0242159 A1 | 9/2012 | Lou et al. |
| 2012/0248886 A1 | 10/2012 | Kesler et al. |
| 2012/0248887 A1 | 10/2012 | Kesler et al. |
| 2012/0248888 A1 | 10/2012 | Kesler et al. |
| 2012/0248981 A1 | 10/2012 | Karalis et al. |
| 2012/0249066 A1 | 10/2012 | Ichikawa |
| 2012/0249068 A1 | 10/2012 | Ishida |
| 2012/0249097 A1 | 10/2012 | Baarman |
| 2012/0256494 A1 | 10/2012 | Kesler et al. |
| 2012/0256586 A1 | 10/2012 | Becker et al. |
| 2012/0256589 A1 | 10/2012 | Ichikawa |
| 2012/0259735 A1 | 10/2012 | Taylor et al. |
| 2012/0259749 A1 | 10/2012 | Park et al. |
| 2012/0262115 A1 | 10/2012 | Ichikawa et al. |
| 2012/0274277 A1 | 11/2012 | Masuda et al. |
| 2012/0274278 A1 | 11/2012 | Igata |
| 2012/0277945 A1 | 11/2012 | Ichikawa |
| 2012/0280655 A1 | 11/2012 | Schneider et al. |
| 2012/0286571 A1 | 11/2012 | Baarman et al. |
| 2012/0286723 A1 | 11/2012 | Ukita et al. |
| 2012/0286728 A1 | 11/2012 | Bella et al. |
| 2012/0290159 A1 | 11/2012 | McGee et al. |
| 2012/0293122 A1 | 11/2012 | Murawaka |
| 2012/0299537 A1 | 11/2012 | Kikuchi |
| 2012/0306439 A1 | 12/2012 | Ichikawa et al. |
| 2012/0313449 A1 | 12/2012 | Kurs et al. |
| 2012/0313742 A1 | 12/2012 | Kurs et al. |
| 2012/0319649 A1 | 12/2012 | Billmaier |
| 2012/0319651 A1 | 12/2012 | Outwater et al. |
| 2013/0006461 A1 | 1/2013 | Kim |
| 2013/0007949 A1 | 1/2013 | Kurs et al. |
| 2013/0009593 A1 | 1/2013 | Takahashi et al. |
| 2013/0020878 A1 | 1/2013 | Karalis et al. |
| 2013/0020983 A1 | 1/2013 | Ishikawa et al. |
| 2013/0024046 A1 | 1/2013 | Toriya et al. |
| 2013/0025751 A1 | 1/2013 | Dassano et al. |
| 2013/0026988 A1 | 1/2013 | Igata |
| 2013/0033118 A1 | 2/2013 | Karalis et al. |
| 2013/0033230 A1 | 2/2013 | Falk et al. |
| 2013/0038272 A1 | 2/2013 | Sagata |
| 2013/0038282 A1 | 2/2013 | Shimokawa |
| 2013/0038402 A1 | 2/2013 | Karalis et al. |
| 2013/0041854 A1 | 2/2013 | Littrell |
| 2013/0049689 A1 | 2/2013 | Hayashigawa et al. |
| 2013/0049971 A1 | 2/2013 | Hermann |
| 2013/0057206 A1 | 3/2013 | Takahashi et al. |
| 2013/0057214 A1 | 3/2013 | Stevens |
| 2013/0057364 A1 | 3/2013 | Kesler et al. |
| 2013/0062966 A1 | 3/2013 | Verghese et al. |
| 2013/0063075 A1 | 3/2013 | Miller et al. |

(56) References Cited

U.S. PATENT DOCUMENTS

| | | |
|---|---|---|
| 2013/0069441 A1 | 3/2013 | Verghese et al. |
| 2013/0069492 A1 | 3/2013 | Rippel et al. |
| 2013/0069590 A1 | 3/2013 | Niemann et al. |
| 2013/0069753 A1 | 3/2013 | Kurs et al. |
| 2013/0073350 A1 | 3/2013 | Blustein |
| 2013/0076154 A1 | 3/2013 | Baarman et al. |
| 2013/0079962 A1 | 3/2013 | Ishikawa et al. |
| 2013/0082645 A1 | 4/2013 | Fukada |
| 2013/0093393 A1 | 4/2013 | Shimotani et al. |
| 2013/0095758 A1 | 4/2013 | Baarman |
| 2013/0099563 A1 | 4/2013 | Partovi et al. |
| 2013/0099587 A1 | 4/2013 | Lou et al. |
| 2013/0099743 A1 | 4/2013 | Zyren |
| 2013/0113423 A1 | 5/2013 | Baarman et al. |
| 2013/0119933 A1 | 5/2013 | Flack et al. |
| 2013/0124320 A1 | 5/2013 | Karner |
| 2013/0127416 A1 | 5/2013 | Karner et al. |
| 2013/0127417 A1 | 5/2013 | Karner et al. |
| 2013/0131900 A1 | 5/2013 | Yu et al. |
| 2013/0138542 A1 | 5/2013 | Sirton, IV |
| 2013/0141042 A1 | 6/2013 | Kilb |
| 2013/0141043 A1 | 6/2013 | Rossi |
| 2013/0141044 A1 | 6/2013 | Solomon et al. |
| 2013/0151293 A1 | 6/2013 | Karner et al. |
| 2013/0159956 A1 | 6/2013 | Verghese et al. |
| 2013/0175083 A1 | 7/2013 | Bonwit et al. |
| 2013/0175874 A1 | 7/2013 | Lou et al. |
| 2013/0175983 A1 | 7/2013 | Partovi et al. |
| 2013/0175989 A1 | 7/2013 | Bonwit et al. |
| 2013/0179061 A1 | 7/2013 | Gadh et al. |
| 2013/0181670 A1 | 7/2013 | Bonwit et al. |
| 2013/0184886 A1 | 7/2013 | Pollack et al. |
| 2013/0187474 A1 | 7/2013 | De Boodt |
| 2013/0193918 A1 | 8/2013 | Sarkar et al. |
| 2013/0193919 A1 | 8/2013 | Hill et al. |
| 2013/0200721 A1 | 8/2013 | Kurs et al. |
| 2013/0207607 A1 | 8/2013 | Sugiyama et al. |
| 2013/0217409 A1 | 8/2013 | Bridges et al. |
| 2013/0218402 A1 | 8/2013 | Hoshihara et al. |
| 2013/0221744 A1 | 8/2013 | Hall et al. |
| 2013/0221918 A1 | 8/2013 | Hill et al. |
| 2013/0221920 A1 | 8/2013 | Sugiyama et al. |
| 2013/0221921 A1 | 8/2013 | Ang |
| 2013/0234532 A1 | 9/2013 | Fells et al. |
| 2013/0241483 A1 | 9/2013 | Karch et al. |
| 2013/0241485 A1 | 9/2013 | Snyder |
| 2013/0245870 A1 | 9/2013 | Mineta |
| 2013/0245873 A1 | 9/2013 | Basir |
| 2013/0249480 A1 | 9/2013 | Paparo et al. |
| 2013/0253745 A1 | 9/2013 | Booth et al. |
| 2013/0257370 A1 | 10/2013 | Ichikawa |
| 2013/0257375 A1 | 10/2013 | Ang et al. |
| 2013/0265004 A1 | 10/2013 | Iizuka et al. |
| 2013/0265007 A1 | 10/2013 | Leary |
| 2013/0271072 A1 | 10/2013 | Lee et al. |
| 2013/0278201 A1 | 10/2013 | Retti |
| 2013/0278210 A1 | 10/2013 | Cook et al. |
| 2013/0285603 A1 | 10/2013 | Zeinstra et al. |
| 2013/0300353 A1 | 11/2013 | Kurs et al. |
| 2013/0300358 A1 | 11/2013 | Kirby et al. |
| 2013/0300362 A1 | 11/2013 | Turner |
| 2013/0307349 A1 | 11/2013 | Hall et al. |
| 2013/0311247 A1 | 11/2013 | Wass et al. |
| 2013/0314040 A1 | 11/2013 | Tanaka |
| 2013/0325323 A1 | 12/2013 | Breed |
| 2013/0334892 A1 | 12/2013 | Hall et al. |
| 2014/0012431 A1 | 1/2014 | Breed |
| 2014/0015487 A1 | 1/2014 | Brown et al. |
| 2014/0039726 A1 | 2/2014 | Profitt-Brown et al. |
| 2014/0042824 A1 | 2/2014 | Fells et al. |
| 2014/0044281 A1 | 2/2014 | Ganem et al. |
| 2014/0045405 A1 | 2/2014 | Baarman et al. |
| 2014/0070767 A1 | 3/2014 | Morris et al. |
| 2014/0077615 A1 | 3/2014 | Stevens et al. |
| 2014/0084703 A1 | 3/2014 | Hall et al. |
| 2014/0084859 A1 | 3/2014 | Hall et al. |
| 2014/0097795 A1 | 4/2014 | Turner et al. |
| 2014/0103867 A1 | 4/2014 | Baarman |
| 2014/0117760 A1 | 5/2014 | Baarman et al. |

FOREIGN PATENT DOCUMENTS

| | | |
|---|---|---|
| JP | 2001008380 | 1/2001 |
| JP | 2008042985 | 2/2008 |
| WO | 9319435 | 9/1993 |
| WO | 9930412 | 6/1999 |
| WO | 0125056 | 4/2001 |
| WO | 0128017 | 4/2001 |
| WO | 0171882 | 9/2001 |
| WO | 2004009397 | 1/2004 |
| WO | 2004062959 | 7/2004 |
| WO | 2005/015766 | 2/2005 |
| WO | 2005015766 | 2/2005 |
| WO | 2007108586 | 9/2007 |
| WO | 2009014543 | 1/2009 |

OTHER PUBLICATIONS

U.S. Notice of Allowance, U.S. Appl. No. 13/016,017, mailed Nov. 12, 2013.
U.S. Office Action, U.S. Appl. No. 13/015,957, mailed Apr. 2, 2012.
U.S. Office Action, U.S. Appl. No. 13/015,957, mailed Nov. 21, 2012.
U.S. Office Action, U.S. Appl. No. 13/016,017, mailed Jul. 9, 2013.
U.S. Office Action, U.S. Appl. No. 13/016,017, mailed May 8, 2013.
Brooks et al., "Integration of Electric Drive Vehicles with the Electric Power Grid—A New Value Stream," from http://citeseerx.ist.psu.edu/viewdoc/download?doi=10.1.1.201.6658&rep=rep1&type=pdf, 2001.
Brooks, Alec, "Electric Drive Vehicles: A Huge New Distributed Energy Resource," from http://www.udel.edu/V2G/resources/A-Brooks-ETI-conf.pdf, 2001.
Brooks, Alec, "Vehicle-to-Grid Demonstration Project: Grid Regulation Ancillary Service with a Battery Electric Vehicle," from http://www.udel.edu/V2G/docs/V2G-Demo-Brooks-02-R5.pdf, Dec. 10, 2002.
Gage, Thomas, "Development and Evaluation of a Plug-in HEV with Vehicle-to-Grid Power Flow," from http://www.udel.edu/V2G/docs/ICAT%2001-2-V2G-Plug-Hybrid.pdf, Dec. 17, 2003.
Hawkins, David, "Vehicle to Grid—A Control Area Operators Perspective," from http://www.udel.edu/V2G/resources/Hawkins_ETI.pdf, Dec. 13, 2001.
ISL6296 Datasheet, Intersil, Mar. 21, 2008.
ISL6296A Datasheet, Intersil, Apr. 15, 2010.
Kempton et al., "Vehicle-to-Grid Power: Battery, Hybrid, and Fuel Cell Vehicles as Resources for Distributed Electric Power in California," from http://www.udel.edu/V2G/docs/V2G-Cal-2001.pdf, Jun. 2001.
Qian, Jinrong, "Battery authentication improves battery security," from http://www.enribedded.com/print/4011596, Oct. 24, 2005.

* cited by examiner

Graphical User Interface 800

| Name: | 810 | Phone Number: | 812 |
| Address: | 811 | Email: | 813 |
| Organization: | 814 | Username: | 830 |
| | | Password: | 831 |

| Define Set(s) Of Components: | 840 | Plug/Cable Interface Configuration: | 844 |
| Attribute(s) Configuration: | 841 | Inductive Interface Configuration: | 845 |
| Charge Cost Configuration: | 842 | Wireless Interface Configuration: | 846 |
| Discharge Cost Configuration: | 843 | Charge/Discharge Configuration: | 847 |
| | | Power Management Configuration: | 848 |

Signal Communication Configuration: 850

Surveillance Configuration: 851

Display Configuration: 852

Sound Configuration: 853

Payment Interface Configuration: 854

Dispenser Configuration: 855

Submit 805

FIGURE 8

Graphical User Interface 900

| Name: | 910 | Phone Number: | 912 |
| --- | --- | --- | --- |
| Address: | 911 | Email: | 913 |
| Vehicle Year: | 920 | Username: | 930 |
| Vehicle Make: | 921 | Password: | 931 |
| Vehicle Model: | 922 | User Authentication Code: | 940 |
| | | Payment Information: | 941 |
| GUI Configuration: | 950 | Attribute(s) Configuration: | 960 |
| GUI Presentation Configuration: | 951 | Charge Cost Configuration: | 961 |
| Email Notification Configuration: | 952 | Discharge Cost Configuration: | 962 |
| Text Notification Configuration: | 953 | Plug/Cable Interface Configuration: | 963 |
| Phone Notification Configuration: | 954 | Inductive Interface Configuration: | 964 |
| | | Wireless Interface Configuration: | 965 |
| Signal Communication Configuration: | 970 | Charge/Discharge Configuration: | 966 |
| Surveillance Configuration: | 971 | Power Management Configuration: | 967 |
| Display Configuration: | 972 | | |
| Sound Configuration: | 973 | Submit 905 | |

| Energy Transfer System | Energy Transfer Rate | Voltage | Profile |
|---|---|---|---|
| A | 200 | 220 | A |
| A | 200 | 220 | B |
| A | 200 | 220 | C |
| A | 200 | 110 | A |
| A | 200 | 50 | A |
| A | 150 – 75 | 220 | A |
| A | 150 – 75 | 110 | C |
| A | 50 – 15 | 220 | A |
| A | 5 | 220 | A |
| A | 5 | 110 | B |
| A | Trickle | 220 | D |
| A | Trickle | 110 | D |
| A | Trickle | 50 | D |
| B | 300 - 200 | 220 | A |
| B | 300 - 200 | 110 | C |
| B | 250 – 150 | 220 | A |
| B | 250 – 150 | 110 | C |
| B | 100 | 110 | A |
| B | 100 | 50 | B |
| B | 50 | 220 | A |
| B | 50 | 110 | A |
| B | 5 | 110 | B |
| B | Trickle | 110 | D |

| Vehicle | Energy Transfer Rate | Voltage | Profile |
|---|---|---|---|
| X | 300 – 150 | 220 | A |
| X | 300 – 150 | 220 | B |
| X | 300 – 150 | 110 | A |
| X | 300 – 150 | 110 | B |
| X | 100 | 220 | A |
| X | 100 | 220 | B |
| X | 100 | 110 | C |
| X | Trickle | 220 | D |
| X | Trickle | 110 | D |
| Y | 250 – 50 | 220 | A |
| Y | 250 – 50 | 220 | C |
| Y | 250 – 50 | 220 | A |
| Y | 250 – 50 | 220 | C |
| Y | 25 | 110 | B |
| Y | Trickle | 110 | D |

FIGURE 12B

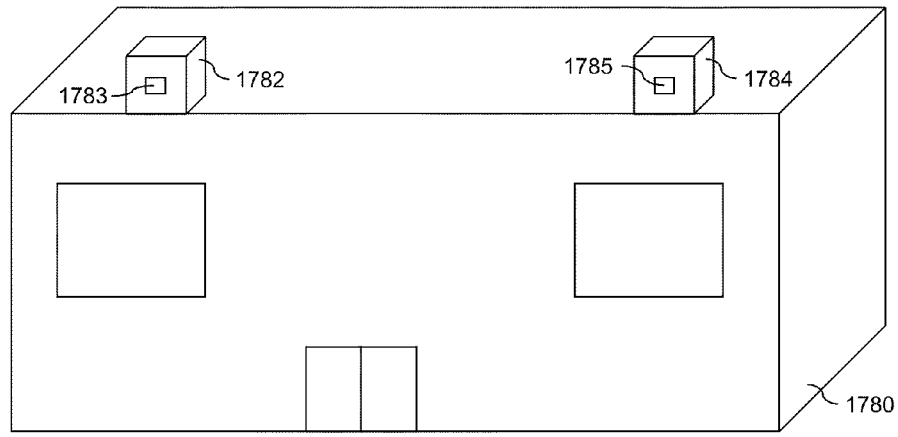
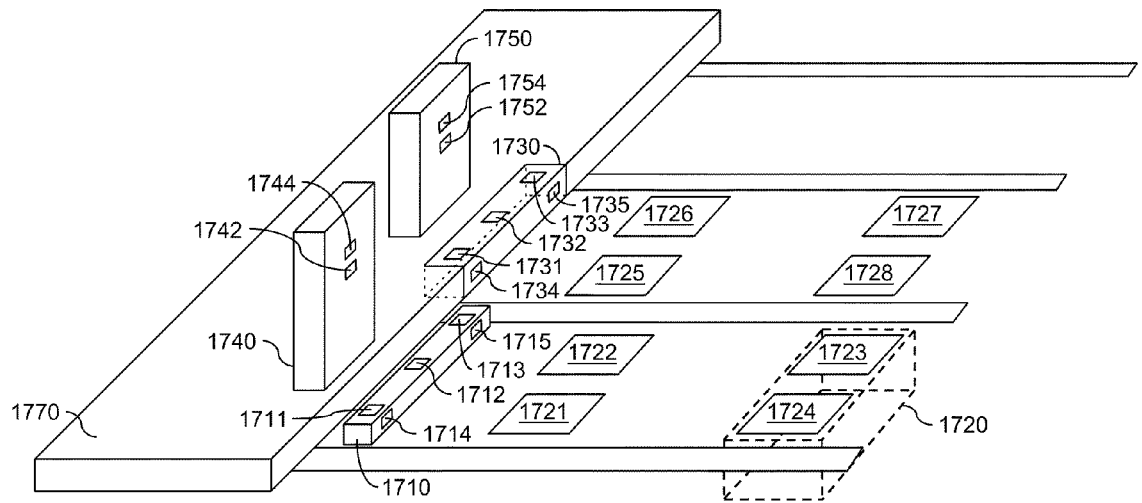
FIGURE 17

ENERGY TRANSFER WITH VEHICLES

RELATED APPLICATIONS

The present application is related to U.S. patent application Ser. No. 13/015,957, filed Jan. 28, 2011, entitled "MANAGING AN ENERGY TRANSFER BETWEEN A VEHICLE AND AN ENERGY TRANSFER SYSTEM," naming Bryan Marc Failing as the inventor, which claims the benefit of U.S. Provisional Patent Application No. 61/350,771, filed Jun. 2, 2010, entitled "MANAGING A TRANSFER OF ENERGY AND INCREASING VEHICLE SECURITY." Those applications are incorporated herein by reference in their entirety and for all purposes.

The present application is related to U.S. patent application Ser. No. 13/016,017, filed Jan. 28, 2011, entitled "INCREASING VEHICLE SECURITY," naming Bryan Marc Failing as the inventor, which claims the benefit of U.S. Provisional Patent Application No. 61/350,771, filed Jun. 2, 2010, entitled "MANAGING A TRANSFER OF ENERGY AND INCREASING VEHICLE SECURITY." Those applications are incorporated herein by reference in their entirety and for all purposes.

BACKGROUND OF THE INVENTION

Conventional solutions for charging automobiles require a user to manually plug the automobile into a wall socket or connect the vehicle to an external charging system via a plug. The charge rate is usually low, thereby requiring the vehicle to remain stationary at the conventional charge station for an extended period of time. As such, if the vehicle is accidently unplugged by another user or another problem occurs related to the charging of the automobile, the user may be unaware of the problem for some time. The user would then be required to execute another lengthy charge process during which further problems may occur. As such, conventional solutions for charging automobiles are inconvenient and inefficient.

SUMMARY OF THE INVENTION

Accordingly, a need exists for a more convenient way to perform an energy transfer with a vehicle. A need also exists for a more efficient way to perform an energy transfer with a vehicle. Embodiments of the present invention provide novel solutions to these needs and others as described below.

Embodiments of the present invention are directed to a method, computer-readable medium, system, and apparatus for improving energy transfer with a vehicle.

In one embodiment, a method of managing at least one transfer of energy may include determining a plurality of interfaces operable to transfer energy between a vehicle and an energy transfer system. The method may also include determining a selection associated with an interface of the plurality of interfaces. The method may further include generating a request to perform an energy transfer over the interface between the vehicle and the energy transfer system.

In one embodiment, a computer-readable medium may have computer-readable program code embodied therein for causing a computer system to perform a method of managing at least one transfer of energy, where the method may include determining a plurality of interfaces operable to transfer energy between a vehicle and an energy transfer system. The method may also include determining a selection associated with an interface of the plurality of interfaces. The method may further include generating a request to perform an energy transfer over the interface between the vehicle and the energy transfer system.

In one embodiment, a system may include a processor and a memory, wherein the memory includes instructions that when executed by the system implement a method of managing at least one transfer of energy, where the method may include determining a plurality of interfaces operable to transfer energy between a vehicle and an energy transfer system. The method may also include determining a selection associated with an interface of the plurality of interfaces. The method may further include generating a request to perform, using the interface, an energy transfer over the interface between the vehicle and the energy transfer system.

In one embodiment, a wheel may include a first portion operable to accept at least one energy transfer component. The wheel may also include a second portion operable to accept at least one interface, wherein the at least one energy transfer component and the at least one interface are operable to transfer energy between a vehicle and an energy transfer system.

The at least one energy transfer component may be a coil disposed in a plane selected from a group consisting of: an axial plane of the wheel; and a radial plane of the wheel.

The first portion of the wheel may be sized to accept the at least one energy transfer component. The first portion of the wheel may be shaped to accept the at least one energy transfer component. The wheel may further include at least one feature operable to secure the at least one energy transfer component to the first portion, where the at least one feature may be selected from a group consisting of a hole, a threaded hole, a bracket, a strap, an adhesive, a hook-and-loop fastener, a channel, and a groove.

The second portion of the wheel may be sized to accept the at least one interface. The second portion of the wheel may be shaped to accept the at least one interface. The wheel may further include at least one feature operable to secure the at least one interface to the second portion, where the at least one feature may be selected from a group consisting of a hole, a threaded hole, a bracket, a strap, an adhesive, a hook-and-loop fastener, a channel, and a groove.

In one embodiment, a tire may include at least one energy transfer component. The tire may also include at least one interface coupled to the at least one energy transfer component, wherein the at least one energy transfer component and the at least one interface are operable to transfer energy between a vehicle and an energy transfer system.

The tire may further include an inner portion and an outer portion including a tread, wherein the at least one energy transfer component may be disposed between the inner portion and the outer portion. The at least one energy transfer component may be a coil disposed in a plane selected from a group consisting of: an axial plane of the tire; and a radial plane of the tire. The at least one energy transfer component may be operable to improve at least one mechanical property of the tire.

The tire may further include at least one feature operable to direct air over a surface of the tire and remove heat generated by the at least one energy transfer component.

In one embodiment, a method of transferring energy may include performing an energy transfer over an interface. The method may also include converting heat associated with the energy transfer into electrical energy.

The method may further include combining the electrical energy with energy transferred over the interface to improve an efficiency of the energy transfer.

The performing may further include performing an energy transfer between a vehicle and an energy transfer system using at least one energy transfer component, and wherein the converting may further include converting, using a component coupled with the at least one energy transfer component, heat generated by the at least one energy transfer component into electrical energy. The at least one energy transfer component may be selected from a group consisting of at least one energy transfer component of the vehicle and at least one energy transfer component of the energy transfer system.

The interface may include an interface coupled to an energy storage medium, and wherein the converting may further include converting, using a component coupled with the energy storage medium, heat generated by the energy storage medium into electrical energy. The energy storage medium may be selected from a group consisting of an energy storage medium of the vehicle and an energy storage medium of the energy transfer system.

In one embodiment, a method of transferring heat may include performing an energy transfer, between a vehicle and an energy transfer system, over an interface including at least one energy transfer component. The method may also include transferring, using a component coupled with the at least one energy transfer component, heat from the at least one energy transfer component using energy from the interface.

The component may include a thermoelectric cooler. The component may include a fan controllable to direct air over the at least one energy transfer component.

In one embodiment, a vehicle may include an energy transfer component operable to implement an interface with another energy transfer component, wherein the interface is operable to transfer energy between the vehicle and an energy transfer system. The vehicle may also include a first component disposed between the energy transfer component and a second component of the vehicle, wherein the first component is operable to perform at least one operation associated with a transfer of the energy.

The at least one operation may include shielding the second component from interference associated with the transfer of the energy. The at least one operation may be selected from a group consisting of reflecting a portion of the energy, concentrating the energy near the energy transfer component, changing a shape of a magnetic field generated by the another energy transfer component, concentrating the magnetic field near the energy transfer component, and reducing a magnitude of the magnetic field near the second component.

The first component may be disposed on at least two sides of the energy transfer component. The first component may be applied to a surface of the vehicle using a process selected from a group consisting of spraying, chemical vapor deposition, and physical vapor deposition.

In one embodiment, an energy transfer system may include an energy transfer component operable to implement an interface with another energy transfer component, wherein the interface is operable to transfer energy between the energy transfer system and a vehicle. The energy transfer system may also include a first component disposed between the energy transfer component and a second component of the energy transfer system, wherein the first component is operable to perform at least one operation associated with a transfer of the energy.

The at least one operation may include shielding the second component from interference associated with the transfer of the energy. The at least one operation may be selected from a group consisting of reflecting a portion of the energy, concentrating the energy near the energy transfer component, changing a shape of a magnetic field generated by the another energy transfer component, concentrating the magnetic field near the energy transfer component, and reducing a magnitude of the magnetic field near the second component.

The first component may be disposed on at least two sides of the energy transfer component. The first component may be applied to a surface of the energy transfer system using a process selected from a group consisting of spraying, chemical vapor deposition, and physical vapor deposition.

BRIEF DESCRIPTION OF THE DRAWINGS

The present invention is illustrated by way of example, and not by way of limitation, in the figures of the accompanying drawings and in which like reference numerals refer to the same or similar elements.

FIG. 8 shows a graphical user interface for registering an energy transfer system in accordance with one embodiment of the present invention.

FIG. 9 shows a graphical user interface for registering a vehicle in accordance with one embodiment of the present invention.

FIG. 12A shows data associated with at least one energy transfer system in accordance with one embodiment of the present invention.

FIG. 12B shows data associated with at least one vehicle in accordance with one embodiment of the present invention.

FIG. 17 shows a diagram of components for performing one or more energy transfers with a vehicle in accordance with one embodiment of the present invention.

DETAILED DESCRIPTION OF THE INVENTION

Figure 1A:
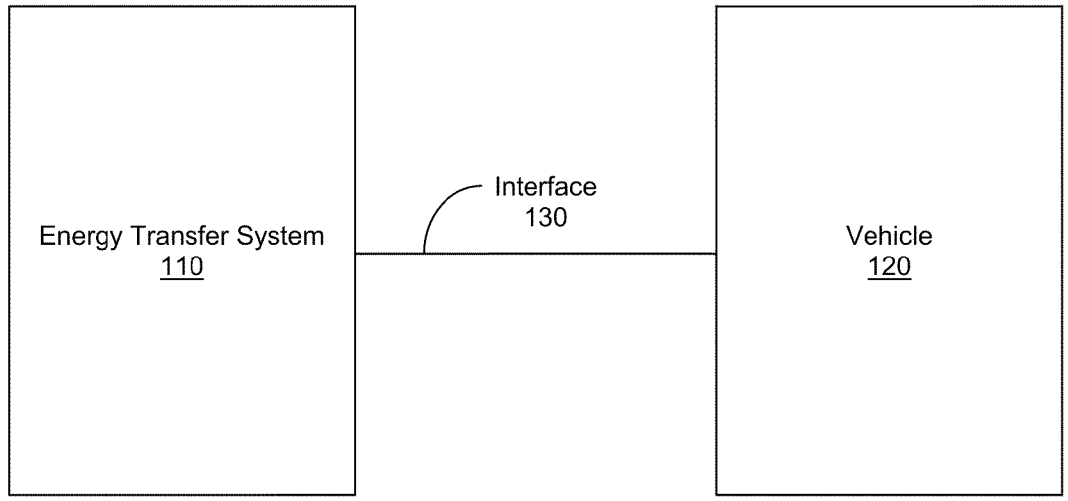
FIG. 1A shows a system for managing one or more energy transfers in accordance with one embodiment of the present invention.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some regions of the detailed descriptions which follow are presented in terms of procedures, logic blocks, processing and other symbolic representations of operations on data bits within a computer memory. These descriptions and representations are the means used by those skilled in the art to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "aborting," "accepting," "accessing," "activating," "adding," "adjusting," "allocating," "analyzing," "applying," "assembling," "assigning," "authenticating," "authorizing," "balancing," "blocking," "calculating," "capturing," "causing," "charging," "combining," "comparing," "collecting," "communicating," "configuring," "controlling," "converting," "creating," "deactivating," "debugging," "decreasing," "defining," "delivering," "depicting," "detecting," "determining," "discharging," "displaying," "downloading," "enabling," "establishing," "executing," "forwarding," "flipping," "generating," "grouping," "hiding," "identifying," "increasing," "initiating," "instantiating," "interacting," "measuring," "modifying," "monitoring," "moving," "outputting," "parsing," "performing," "placing," "presenting," "processing," "programming," "providing," "provisioning," "querying," "receiving," "regulating," "removing," "rendering," "repeating," "resuming," "retaining," "sampling," "simulating," "sending," "sorting," "storing," "subtracting," "suspending," "tracking," "transcoding," "transforming," "transmitting," "unblocking," "using," "verifying," or the like, may refer to the action and/or processes of a computer system, or similar electronic computing device, that manipulates and transforms data represented as physical (electronic) quantities within the computer system's registers and memories into other data similarly represented as physical quantities within the computer system memories or registers or other such information storage, transmission and/or display devices.

As used herein, the term "coupled with" may refer to an arrangement of objects where at least two objects are in physical contact with one another (e.g., touching) or where at least two objects are separated by at least one other object (e.g., two objects that are coupled with one another may have at least one other object positioned between the two objects).

Embodiments of the Invention

FIG. 1A shows system 100A for managing one or more energy transfers in accordance with one embodiment of the present invention. As shown in FIG. 1A, energy transfer system 110 and vehicle 120 are coupled by interface 130, where interface 130 may carry an energy transfer signal to enable a transfer of energy (e.g., electricity) between energy transfer system 110 and vehicle 120 (e.g., from energy transfer system 110 to vehicle 120, from vehicle 120 to energy transfer system 110, etc.). Energy transfer system 110 may be separate or located remotely from vehicle 120 in one embodiment. And in one embodiment, energy transfer system 110 and vehicle 120 may be owned or affiliated with different individuals, business entities, etc.

Vehicle 120 may be a vehicle with at least one wheel (e.g., an automobile, a bus, a motorcycle, a scooter, a personal transportation vehicle such as the Segway™, a golf cart, etc.), a vehicle configured to move on at least one rail or at least one track (e.g., a train, a trolley, a shuttle, etc.), a boat (e.g., a cruise liner, a ship, a yacht, a sailboat, a fishing boat, a speedboat, a houseboat, a dinghy, etc.), an aircraft (e.g., an airplane or fixed-wing aircraft, a rotary-wing aircraft such as a helicopter, a glider, an aerostat such as a balloon or blimp, etc.), etc. Vehicle 120 may be an all-electric vehicle (e.g., using only electricity to move the vehicle), a hybrid vehicle (e.g., using electricity and/or another source of energy to move the vehicle), a vehicle which uses a source of energy other than electricity to move the vehicle, etc. Energy transfer system 110 may be any system, device, component, etc. capable of performing an energy transfer with vehicle 120 (e.g., transferring energy to and/or transferring energy from vehicle 120). In one embodiment, energy transfer system 110 may be capable of communicating data with vehicle 120, communicating a clock signal (e.g., used to extract data transmitted over interface 130, used to synchronize circuits of energy transfer system 110 and/or vehicle 120, etc.) or other type of signal with vehicle 120, etc.

Figure 2:
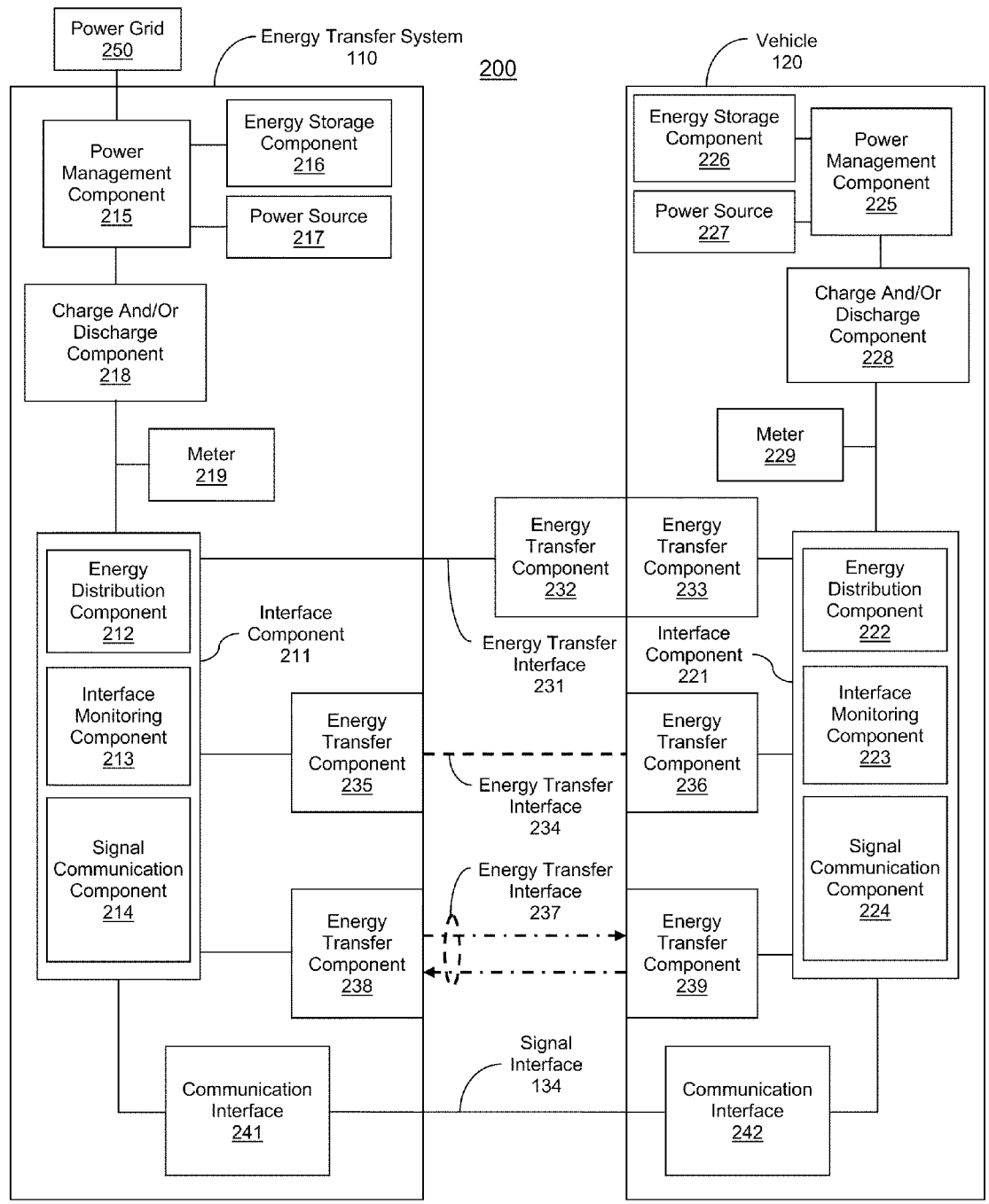
FIG. 2 shows a system for managing one or more energy transfers using different types of interfaces in accordance with one embodiment of the present invention.

The energy transfer signal carried by interface 130 may be sufficient to charge an energy storage component of energy transfer system 110 (e.g., energy storage component 216 of FIG. 2) and/or an energy storage component of vehicle 120 (e.g., energy storage component 226 of FIG. 2). In one embodiment, interface 130 may support energy transfers at low energy transfer rates (e.g., down to approximately 0.5 kW or less) to implement "trickle charging" or charging using a low energy transfer rate, to comply with limits on the energy transfer (e.g., set by energy transfer system 110, vehicle 120, interface system 550 of FIG. 5, a user, some combination thereof, etc.), or otherwise enable energy transfer at low energy transfer rates. Interface 130 may support energy transfers at high energy transfer rates (e.g., up to approximately 500 kW or more) to enable "fast charging" or charging using a high energy transfer rate, to comply with limits on the energy transfer (e.g., set by energy transfer system 110, vehicle 120, interface system 550 of FIG. 5, a user, some combination thereof, etc.), or otherwise enable energy transfer at high energy transfer rates.

The term "energy transfer rate" as used herein may be an amount of energy per unit time. For example, an energy transfer rate may be a current (e.g., measured or expressed in units of amps, etc.), a power (e.g., measured or expressed in units of watts, kilowatts, etc.), etc. In one embodiment, an energy transfer rate may be calculated or determined at a particular time or instant (e.g., an instantaneous energy transfer rate), and therefore, may be distinguishable from an average energy transfer rate which can be calculated by dividing an amount of energy by a duration (e.g., a length of time during which the amount of energy is transferred).

Figure 1B:
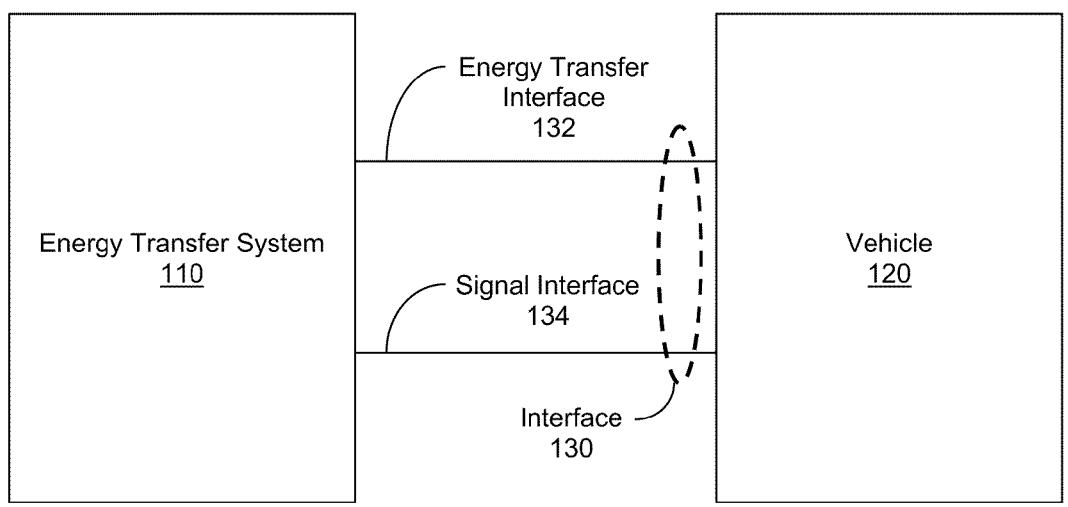
FIG. 1B shows a system for managing one or more energy transfers using an energy transfer interface that is separate from a signal interface in accordance with one embodiment of the present invention.

As shown in FIG. 1A, interface 130 may be used to communicate signals (e.g., data signals, clock signals, etc.) between energy transfer system 110 and vehicle 120. In one embodiment, the signals may be transmitted over the same interface used to perform the energy transfer. For example, the signals (e.g., data signals, clock signals, etc.) may be communicated over interface 130 using modulation (e.g., amplitude modulation, frequency modulation, phase modulation, some combination thereof, etc.) and demodulation (e.g., amplitude demodulation, frequency demodulation, phase demodulation, some combination thereof, etc.), where the energy transfer signal functions as the carrier wave. As another example, the signals (e.g., data signals, clock signals, etc.) may be communicated over interface 130 using an electromagnetic field surrounding at least one conductor of interface 130 (e.g., similar to communication using a power line area network or the like). In one embodiment, interface 130 may include a plurality of interfaces, where the signals (e.g., data signals, clock signals, etc.) may be communicated over a separate interface (e.g., signal interface 134 of system 100B as shown in FIG. 1B) than that used to perform the energy transfer (e.g., energy transfer interface 132 of system 100B as shown in FIG. 1B). In this manner, interface 130 may enable communication of signals over an energy transfer interface (e.g., 132), over a separate interface (e.g., 134), or over both an energy transfer interface (e.g., 132) and a separate interface (e.g., 134).

In one embodiment, signals communicated over energy transfer interface 132 may be analog signals, digital signals, pulse width modulated signals, some combination thereof, etc. Energy transfer interface 132 may be capable of implementing unidirectional signal communication and/or bidirectional signal communication. Energy transfer interface 132 may utilize single-ended signaling and/or differential signaling. And in one embodiment, signals communicated over signal interface 134 may be analog signals, digital signals, pulse width modulated signals, some combination thereof, etc. Signal interface 134 may be capable of implementing unidirectional signal communication and/or bidirectional signal communication. Signal interface 134 may utilize single-ended signaling and/or differential signaling.

Utilizing an energy transfer interface (e.g., 132, etc.) to communicate signals may reduce cost in one embodiment. For example, where an existing system does not include a dedicated signal interface capable of communicating signals between an energy transfer system and a vehicle, embodiments of the present invention can enable the use of existing components and interfaces (e.g., energy transfer interface 132) to communicate signals. In this manner, cost can be reduced since the system does not have to be redesigned and/or retrofitted to include the dedicated signal interface.

As shown in FIGS. 1A and 1B, interface 130 may be a wired interface (e.g., including one or more conductors, trace, lines, lanes, etc.) and/or a wireless interface (e.g., using radio waves, microwaves, infrared waves, visible light waves, ultraviolet waves, x-rays, gamma rays, etc.). In one embodiment, interface 130 may operate in accordance with a wireless standard such as 802.11x, Bluetooth, or the like. In this manner, an energy transfer may be performed using one or more interfaces (e.g., 132, etc.) which are wired, wireless, or some combination thereof (e.g., using at least one wired interface and at least one wireless interface). In one embodiment, a communication of signals (e.g., a data signal, clock signal, etc.) may be performed using one or more interfaces (e.g., 132, 134, etc.) which are wired, wireless, or some combination thereof (e.g., using at least one wired interface and at least one wireless interface).

As shown in FIG. 1A, interface 130 may include one or more interfaces capable of transferring energy and/or one or more interfaces capable of communicating signals (e.g., data signals, clock signals, etc.) in one embodiment. As shown in FIG. 1B, energy transfer interface 132 may include one or more interfaces capable of transferring energy in one embodiment. Additionally, as shown in FIG. 1B, signal interface 134 may include one or more interfaces capable of communicating signals (e.g., data signals, clock signals, etc.) in one embodiment.

Although FIGS. 1A and 1B show only one energy transfer system (e.g., 110), it should be appreciated that system 100A and/or system 100B may include more than one energy transfer system in other embodiments. Although FIGS. 1A and 1B show only vehicle (e.g., 120), it should be appreciated that system 100A and/or system 100B may include more than one vehicle in other embodiments. Although FIGS. 1A and 1B show a specific number of interfaces (e.g., 130, 132, 134, etc.), it should be appreciated that system 100A and/or system 100B may include any number of interfaces in other embodiments. For example, system 100A and/or system 100B may include one or more interfaces similar to interface 130, one or more energy transfer interfaces (e.g., similar to energy transfer interface 132), one or more signal interfaces (e.g., similar to signal interface 134), etc.

FIG. 2 shows system 200 for managing one or more energy transfers using different types of interfaces in accordance with one embodiment of the present invention. As shown in FIG. 2, energy transfer system 110 and vehicle 120 can be coupled by energy transfer interface 231, energy transfer interface 234, energy transfer interface 237, some combination thereof, etc. In one embodiment, system 200 may include at least two different types of interfaces (e.g., a wired energy transfer interface, an inductive energy transfer interface, a wireless energy transfer interface, some combination thereof, etc.). In one embodiment, energy transfer interface 132 as shown in FIG. 1B may be implemented in accordance with (e.g., include components of, function similarly to, etc.) one or more of the energy transfer interfaces of system 200 (e.g., 231, 244, 237, etc.). Since the type and/or number of interfaces may vary from vehicle to vehicle and/or from energy transfer system to energy transfer system, embodiments of the present invention can improve compatibility between energy transfer systems and vehicles by providing an energy transfer system (e.g., 110) and/or a vehicle (e.g., 120) with multiple types of interfaces.

In one embodiment, signals communicated between energy transfer system 110 and vehicle 120 (e.g., over interface 130, energy transfer interface 132, energy transfer interface 231, energy transfer interface 234, energy transfer interface 237, signal interface 134, etc.) may be analog signals, digital signals, pulse width modulated signals, some combination thereof, etc. An interface (e.g., 130, 132, 231, 234, 237, 134, etc.) coupling energy transfer system 110 and vehicle 120 may implement unidirectional signal communication and/or bidirectional signal communication in one embodiment. And in one embodiment, signals may be communicated between energy transfer system 110 and vehicle 120 (e.g., over interface 130, energy transfer interface 132, energy transfer interface 231, energy transfer interface 234, energy transfer interface 237, signal interface 134, etc.) using single-ended signaling and/or differential signaling.

Energy may be transferred over one or more of the interfaces of system 200 between energy transfer system 110 and vehicle 120 (e.g., from energy transfer system 110 to vehicle 120, from vehicle 120 to energy transfer system 110, etc.) using at least one energy transfer component. For example, energy may be transferred over energy transfer interface 231 using energy transfer components 232 and 233, energy may be transferred over energy transfer interface 234 using energy transfer components 235 and 236, and energy may be transferred over energy transfer interface 237 using energy transfer components 238 and 239.

In one embodiment, energy transfer components 232 and 233 may include electrical contacts that are capable of implementing a wired interface for transferring energy when brought into physical contact with one another. For example, energy transfer component 232 may be a first electrical contact (e.g., disposed in or coupled with a plug) and energy transfer component 233 may be a second electrical contact (e.g., disposed in or coupled with a receptacle), where energy transfer component 232 may be brought into physical contact with energy transfer component 233 (e.g., responsive to the plug being plugged into the receptacle or otherwise mated to one another) to enable energy transfer over energy transfer interface 231. Alternatively, energy transfer component 233 may be a first electrical contact (e.g., disposed in or coupled with a plug) and energy transfer component 232 may be a second electrical contact (e.g., disposed in or coupled with a plug receptacle), where energy transfer component 233 may be brought into physical contact with energy transfer component 232 (e.g., responsive to the plug being plugged into the receptacle or otherwise mated to one another) to enable energy transfer over energy transfer interface 231. Energy transfer components 232 and 233 may include a respective plurality of electrical contacts that when brought into contact with one another enable a flow of electricity over energy transfer interface 231. Energy transfer components 232 and 233 may also include one or more respective features for aligning the electrical contacts (e.g., for positioning the plug with respect to the receptacle for aligning the respective electrical contacts of each energy transfer component), enabling the energy transfer components to remain secured to one another (e.g., during the energy transfer), to reduce the ability of a user to touch an energized component and be shocked or otherwise injured, some combination thereof, etc. And in one embodiment, energy transfer component 232 and/or energy transfer component 233 may be disposed in or coupled with a component (e.g., plug, receptacle, etc.) which also houses or is coupled with at least one other electrical contact configured to communicate a signal (e.g., a data signal, a clock signal, etc.).

Energy transfer components 235 and 236 may enable an inductive energy transfer between energy transfer system 110 and vehicle 120 over energy transfer interface 234 in one embodiment. For example, energy transfer component 235 may be capable of creating a magnetic field that enables an energy transfer over energy transfer interface 234 when energy transfer component 236 is disposed at least partially within the magnetic field created by energy transfer component 235. Energy transfer component 236 may be capable of creating a magnetic field that enables an energy transfer over energy transfer interface 234 when energy transfer component 235 is disposed at least partially within the magnetic field created by energy transfer component 236. In one embodiment, energy transfer component 235 may include at least one coil, energy transfer component 236 may include at least one coil, or both energy transfer components 235 and 236 may include at least one respective coil. Energy transfer components 235 and 236 may enable an energy transfer and/or signal communication between energy transfer system 110 and vehicle 120 without a wire directly connecting energy transfer component 235 to energy transfer component 236.

In one embodiment, energy transfer components 238 and 239 may be any components capable of sending and/or receiving wireless energy transmission signals. For example, energy transfer component 238 may convert electricity (e.g., from energy transfer system 110) into a wireless energy transmission signal for transmission to energy transfer component 239, where energy transfer component 239 may receive the wireless energy transmission signal and convert it into electricity for use by vehicle 120. As another example, energy transfer component 239 may convert electricity (e.g., from vehicle 120) into a wireless energy transmission signal for transmission to energy transfer component 238, where energy transfer component 238 may receive the wireless energy transmission signal and convert it into electricity for use by energy transfer system 110. The wireless energy transmission signals communicated between energy transfer components 238 and 239 may include radio waves, microwaves, infrared waves, visible light waves, ultraviolet waves, x-rays, gamma rays, some combination thereof, etc. In this manner, energy transfer components 238 and 239 may enable a wireless energy transfer between energy transfer system 110 and vehicle 120 over energy transfer interface 237.

As shown in FIG. 2, interface component 211 of energy transfer system 110 may be coupled to one or more energy transfer interfaces (e.g., 231, 234, 237, etc.), thereby enabling interface component 211 to supply and/or receive energy transferred over any of the interfaces (e.g., 231, 234, 237, etc.). Energy distribution component 212 of interface component 211 may control how energy is transferred over any of the interfaces (e.g. 231, 234, 237, etc.) between energy transfer system 110 and vehicle 120. For example, energy distribution component 212 may control which interface or interfaces are active (e.g., in a state enabling an energy transfer), which interface or interfaces are not active (e.g., not able to transfer energy, capable of transferring energy at a lower energy transfer rate, able to communicate signals but not able to transfer energy, etc.), whether the energy transfer is to occur sequentially or simultaneously (e.g., at least partially overlapping in time) over multiple interfaces between energy transfer system 110 and vehicle 120, which direction energy is transferred between energy transfer system 110 and vehicle 120, at least one attribute of the energy transfer (e.g., an energy transfer type, an interface type, an energy transfer type, an interface type, a power, a current, a voltage, an energy transfer profile, a duration, a waveform, a temperature, etc.), some combination thereof, etc. Energy distribution component 212 may control the energy transfer alone or in combination with at least one other component (e.g., at least one other component of energy transfer system 110, energy distribution component 222 of vehicle 120, at least one other component of vehicle 120, etc.).

Interface monitoring component 213 may monitor the interfaces coupled to interface component 211. For example, interface monitoring component 213 may detect a problem with one or more of the interfaces, determine which interface or interfaces are active and/or not active, determine whether the energy transfer is occurring sequentially or simultaneously over multiple interfaces between energy transfer system 110 and vehicle 120, determine which direction energy is transferred between energy transfer system 110 and vehicle 120, determine at least one attribute of the energy transfer (e.g., an energy transfer type, an interface type, a power, a current, a voltage, an energy transfer profile, a duration, a waveform, a temperature, etc.), some combination thereof, etc. In one embodiment, interface monitoring component 213 may communicate the results of the monitoring to energy distribution component 212, thereby providing feedback and enabling energy distribution component 212 to adjust or configure the energy transfer between energy transfer system 110 and vehicle 120. For example, if interface monitoring component 213 detects a problem with an interface, energy distribution component 212 may disable (e.g., stop energy transfer over) the interface. As another example, if interface monitoring component 213 detects that an attribute of an energy transfer over an interface (e.g., 231, 234, 237, etc.) exceeds a threshold or limit, then energy distribution component 212 may adjust the energy transfer accordingly (e.g., adjust the energy transfer so that the attribute is brought below the limit or threshold, disable the interface, etc.). In one embodiment, if a temperature of an energy transfer component (e.g., as measured by component 2664 of FIG. 26, component 2684 of FIG. 26, etc.) is determined to be above a predetermined threshold, then energy distribution component 212 may adjust an attribute (e.g., the energy transfer rate, etc.) of the energy transfer to reduce the temperature of the energy transfer component.

As shown in FIG. 2, interface component 221 of vehicle 120 may be coupled to one or more energy transfer interfaces (e.g., 231, 234, 237, etc.), thereby enabling interface component 221 to supply and/or receive energy transferred over any of the interfaces (e.g., 231, 234, 237, etc.). Energy distribution component 222 of interface component 221 may control how energy is transferred over any of the interfaces (e.g. 231, 234, 237, etc.) between energy transfer system 110 and vehicle 120. For example, energy distribution component 222 may control which interface or interfaces are active (e.g., in a state enabling an energy transfer), which interface or interfaces are not active (e.g., not able to transfer energy, capable of transferring energy at a lower energy transfer rate, able to communicate signals but not able to transfer energy, etc.), whether the energy transfer is to occur sequentially or simultaneously over multiple interfaces between energy transfer system 110 and vehicle 120, which direction energy is transferred between energy transfer system 110 and vehicle 120, at least one attribute of the energy transfer (e.g., an energy transfer type, an interface type, a power, a current, a voltage, an energy transfer profile, a duration, a waveform, a temperature, etc.), some combination thereof, etc. Energy distribution component 222 may control the energy transfer alone or in combination with at least one other component (e.g., at least one other component of vehicle 120, energy distribution component 212 of energy transfer system 110, at least one other component of energy transfer system 110, etc.).

Interface monitoring component 223 may monitor the interfaces coupled to interface component 221. For example, interface monitoring component 223 may detect a problem with one or more of the interfaces, determine which interface or interfaces are active and/or not active, determine whether the energy transfer is occurring sequentially or simultaneously over multiple interfaces between energy transfer system 110 and vehicle 120, determine which direction energy is transferred between energy transfer system 110 and vehicle 120, determine at least one attribute of the energy transfer (e.g., an energy transfer type, an interface type, a power, a current, a voltage, an energy transfer profile, a duration, a waveform, a temperature, etc.), some combination thereof, etc. In one embodiment, interface monitoring component 223 may communicate the results of the monitoring to energy distribution component 222, thereby providing feedback and enabling energy distribution component 222 to adjust or configure the energy transfer between energy transfer system 110 and vehicle 120. For example, if interface monitoring component 223 detects a problem with an interface (e.g., 231, 234, 237, etc.), energy distribution component 222 may disable (e.g., stop energy transfer over) the interface. As another example, if interface monitoring component 223 detects that an attribute of an energy transfer over an interface (e.g., 231, 234, 237, etc.) exceeds a threshold or limit, then energy distribution component 222 may adjust the energy transfer accordingly (e.g., adjust the energy transfer so that the attribute is brought below the limit or threshold, disable the interface, etc.). In one embodiment, if a temperature of an energy transfer component (e.g., as measured by component 2462 of FIG. 24, component 2463 of FIG. 24, component 2634 of FIG. 26, component 2644 of FIG. 26, etc.) is determined to be above a predetermined threshold, then energy distribution component 222 may adjust an attribute (e.g., the energy transfer rate, etc.) of the energy transfer to reduce the temperature of the energy transfer component.

As shown in FIG. 2, interface component 211 includes signal communication component 214 for enabling the communication of various signals (e.g., data signals, clock signals, etc.) over one or more energy transfer interfaces (e.g., 132, 231, 234, 237, etc.) between energy transfer system 110 and vehicle 120. In one embodiment, signal communication component 214 may transmit a signal (e.g., a data signal, a clock signal, etc.) over one or more energy transfer interfaces (e.g., 132, 231, 234, 237, etc.) using modulation (e.g., amplitude modulation, frequency modulation, phase modulation, some combination thereof, etc.), where the energy transfer signal (e.g., transmitted using at least one energy transfer interface coupled to interface component 211) functions as the carrier wave. Upon receipt of the energy transfer signal, the signals (e.g., data signals, clock signals, etc.) carried by the energy transfer signal may be demodulated (e.g., using amplitude demodulation, frequency demodulation, phase demodulation, some combination thereof, etc.) by signal communication component 224 (e.g., for use by vehicle 120).

In one embodiment, signals (e.g., data signals, clock signals, etc.) may be communicated over an energy transfer interface (e.g., 132, 231, 234, 237, etc.) using an electromagnetic field surrounding at least one conductor of the energy transfer interface. For example, signal communication component 214 may alter (e.g., change the strength or amplitude over time) an electromagnetic field surrounding at least one conductor of an energy transfer interface to transmit the signals (e.g., data signals, clock signals, etc.) over the energy transfer interface. A component of vehicle 120 (e.g., signal communication component 224) may detect the changes in the electromagnetic field and recreate the signals (e.g., data signals, clock signals, etc.) based on the changes in the electromagnetic field (e.g., for use by vehicle 120).

The signal (e.g., a data signal, a clock signal, etc.) communicated using the energy transfer interface may be supplied by communication interface 241 in one embodiment, where communication interface 241 is capable of communicating with vehicle 120 (e.g., over signal interface 134, over at least one energy transfer interface via signal communication component 214, etc.), with a component of energy transfer system 110, with another system or device located remotely from energy transfer system 110, etc. Communication interface 241 may be capable of sending and/or receiving communications over a cellular network (e.g., cellular data network, cellular phone network, etc.), thereby enabling communication between energy transfer system 110 and an external system (e.g., vehicle 120, interface system 550 of FIG. 5, payment system 560 of FIG. 5, a computer system located remotely from energy transfer system 110, etc.) over the cellular network. In one embodiment, communication interface 241 may be implemented in accordance with (e.g., include components of, function similarly to, etc.) communication interface 4170 of FIG. 41. In this manner, a signal (e.g., a data signal, a clock signal, etc.) may be communicated over an energy transfer interface (e.g., 132, 231, 234, 237, etc. using signal communication component 214) and/or over a separate signal interface (e.g., 134 using communication interface 241).

As shown in FIG. 2, interface component 221 includes signal communication component 224 for enabling the communication of various signals (e.g., data signals, clock signals, etc.) over one or more energy transfer interfaces (e.g., 132, 231, 234, 237, etc.) between energy transfer system 110 and vehicle 120. In one embodiment, signal communication component 224 may transmit a signal (e.g., a data signal, a clock signal, etc.) over one or more energy transfer interfaces (e.g., 132, 231, 234, 237, etc.) using modulation (e.g., amplitude modulation, frequency modulation, phase modulation, some combination thereof, etc.), where the energy transfer signal (e.g., transmitted using at least one energy transfer interface coupled to interface component 221) functions as the carrier wave. Upon receipt of the energy transfer signal, the signals (e.g., data signals, clock signals, etc.) carried by the energy transfer signal may be demodulated (e.g., using amplitude demodulation, frequency demodulation, phase demodulation, some combination thereof, etc.) by signal communication component 214 (e.g., for use by energy transfer system 110).

In one embodiment, signals (e.g., data signals, clock signals, etc.) may be communicated over an energy transfer interface (e.g., 132, 231, 234, 237, etc.) using an electromagnetic field surrounding at least one conductor of the energy transfer interface. For example, signal communication component 224 may alter (e.g., change the strength or amplitude over time) an electromagnetic field surrounding at least one conductor of an energy transfer interface to transmit the signals (e.g., data signals, clock signals, etc.) over the energy transfer interface. A component of energy transfer system 110 (e.g., signal communication component 214) may detect the changes in the electromagnetic field and recreate the signals (e.g., data signals, clock signals, etc.) based on the changes in the electromagnetic field (e.g., for use by energy transfer system 110).

The signal (e.g., a data signal, a clock signal, etc.) communicated using the energy transfer interface may be supplied by communication interface 242 in one embodiment, where communication interface 242 is capable of communicating with energy transfer system 110 (e.g., over signal interface 134, over at least one energy transfer interface via signal communication component 224, etc.), with a component of vehicle 120, with another system or device located remotely from vehicle 120, etc. Communication interface 242 may be capable of sending and/or receiving communications over a cellular network (e.g., cellular data network, cellular phone network, etc.), thereby enabling communication between a vehicle (e.g., 120) and an external system (e.g., energy transfer system 110, interface system 550 of FIG. 5, payment system 560 of FIG. 5, a computer system located remotely from energy transfer system 110, etc.) over the cellular network. In one embodiment, communication interface 242 may be implemented in accordance with (e.g., include components of, function similarly to, etc.) communication interface 4170 of FIG. 41. In this manner, a signal (e.g., a data signal, a clock signal, etc.) may be communicated over an energy transfer interface (e.g., 132, 231, 234, 237, etc. using signal communication component 224) and/or over a separate signal interface (e.g., 134 using communication interface 242).

In one embodiment, signals (e.g., data signals, clock signals, etc.) communicated between energy transfer system 110 and vehicle 120 may be encrypted. For example, a component of energy transfer system 110 (e.g., communication interface 241, signal communication component 214, etc.) may encrypt a signal which may be decrypted by a component of vehicle 120 (e.g., communication interface 242, signal communication component 224, etc.). As another example, a component of vehicle 120 (e.g., communication interface 242, signal communication component 224, etc.) may encrypt a signal which may be decrypted by a component of energy transfer system 110 (e.g., communication interface 241, signal communication component 214, etc.).

Different types of signals may be communicated simultaneously or contemporaneously over different interfaces (e.g., 132, 231, 234, 237, 134, etc.) in one embodiment. For example, one interface may be used to communicate data signals while another interface is used to communicate clock signals. As another example, one interface may be used to communicate signals in one direction while another interface is used to communicate signals in the other direction. As yet another example, a plurality of interfaces (e.g., 132, 231, 234, 237, 134, some combination thereof, etc.) may be used to implement parallel data communication. As a further example, one or more interfaces (e.g., 132, 231, 234, 237, 134, some combination thereof, etc.) may each be used to implement serial data communication. In this manner, system 200 may offer improved signal transfer capabilities over conventional systems.

In one embodiment, a clock signal and a data signal may be communicated over the same interface. For example, the clock signal may be encoded into the data signal by the transmitting device (e.g., communication interface 241, signal communication component 214, communication interface 242, signal communication component 224, etc.) and then extracted from the data signal by the receiving device (e.g., communication interface 241, signal communication component 214, communication interface 242, signal communication component 224, etc.). The combined data and clock signal may be communicated over an energy transfer interface (e.g., 132, 231, 234, 237, etc.) and/or over a separate signal interface (e.g., 134).

The length of the energy transfer interface (e.g., 130, 132, 231, 234, 237, etc.) coupling energy transfer system 110 and vehicle 120 may be variable or fixed. For example, a wired energy transfer interface may have a fixed length (e.g., the length of cabling, traces, etc. from interface component 211 to interface component 221, etc.) which may not vary responsive to a change in relative position or distance between the vehicle and the energy transfer system. As another example, an inductive energy transfer interface and/or wireless energy transfer interface may have a variable length, where the length may be based on the distance between the energy transfer system and the vehicle, the distance between an energy transfer component of the energy transfer system and an energy transfer component of the vehicle, etc. In one embodiment, an energy transfer interface may be less than 2 miles in length. In one embodiment, an energy transfer interface may be shorter (e.g., less than 1000 feet in length). And in one embodiment, an energy transfer interface may be even shorter (e.g., less than 100 feet in length, less than 20 feet in length, less than 10 feet in length, less than a foot in length, etc.).

As shown in FIG. 2, interface component 211 and/or interface component 221 may include at least one component capable of at least partially isolating an energy transfer interface from a signal interface (e.g., 134, etc.) and/or a component coupled to a signal interface (e.g., communication interface 241, communication interface 242, etc.). For example, interface component 211 and/or interface component 221 may include at least one transformer, at least one optocoupler, at least one capacitor, at least one component capable of providing galvanic isolation, some combination thereof, etc. In one embodiment, the signal (e.g., data signal, clock signal, etc.) accessed by interface component 211 (e.g., from communication interface 241 and/or another component of energy transfer system 110) may pass through the component (e.g., at least one transformer, at least one optocoupler, at least one capacitor, at least one component capable of providing galvanic isolation, some combination thereof, etc.) before being communicated using an energy transfer interface (e.g., 130, 132, 231, 234, 237, etc.), thereby at least partially isolating the energy transfer interface from the component communicating the signal (e.g., communication interface 241 and/or another component of energy transfer system 110). In one embodiment, the signal (e.g., data signal, clock signal, etc.) accessed by interface component 221 (e.g., from communication interface 242 and/or another component of vehicle 120) may pass through the component (e.g., at least one transformer, at least one optocoupler, at least one capacitor, at least one component capable of providing galvanic isolation, some combination thereof, etc.) before being communicated using an energy transfer interface (e.g., 130, 132, 231, 234, 237, etc.), thereby at least partially isolating the energy transfer interface from the component communicating the signal (e.g., communication interface 242 and/or another component of vehicle 120). Improving isolation between an energy transfer interface and another component (e.g., of energy transfer system 110, vehicle 120, etc.) may increase safety, increase component lifetime and/or reliability (e.g., by reducing voltage spikes, current spikes, etc.), improve signal transfer (e.g., by reducing ground loops, reducing noise and/or other factors which would otherwise degrade signal transfer, etc.), some combination thereof, etc.

As shown in FIG. 2, charge and/or discharge component 218 of energy transfer system 110 may supply an energy transfer signal to enable an energy transfer between energy transfer system 110 and vehicle 120, where the energy transfer signal may be supplied in accordance with an energy transfer profile, in accordance with a voltage, in accordance with an energy transfer rate, in accordance with a current, in accordance with a power, in accordance with another attribute, some combination thereof, etc. In one embodiment, an energy transfer profile (e.g., 1115 of FIG. 11A, 1125 of FIG. 11B, 1135 of FIG. 11C, 1145 of FIG. 11D, etc.) may be a relationship between an energy transfer rate and another energy transfer attribute (e.g., power, current, voltage, temperature, time, etc.). Charge and/or discharge component 218 may convert the energy transfer signal from an alternating current (AC) to a direct current (DC), may convert the energy transfer signal from DC to AC, may alter a waveform of the energy transfer signal, may generate or supply a pulse-width modulated (PWM) energy transfer signal, some combination thereof, etc. In one embodiment, charge and/or discharge component 218 may supply an energy transfer signal sufficient to charge an energy storage component (e.g., energy storage component 216 of energy transfer system 110, energy storage component 226 of vehicle 120, etc.). And in one embodiment, charge and/or discharge component 218 may pass the energy transfer signal with little or no alteration.

Charge and/or discharge component 228 of vehicle 120 may supply an energy transfer signal to enable an energy transfer between energy transfer system 110 and vehicle 120, where the energy transfer signal may be supplied in accordance with an energy transfer profile, in accordance with a voltage, in accordance with an energy transfer rate, in accordance with a current, in accordance with a power, in accordance with another attribute, some combination thereof, etc. Charge and/or discharge component 228 may convert the energy transfer signal from AC to DC, may convert the energy transfer signal from DC to AC, may alter a waveform of the energy transfer signal, may supply a PWM energy transfer signal, some combination thereof, etc. In one embodiment, charge and/or discharge component 228 may supply an energy transfer signal sufficient to charge an energy storage component (e.g., energy storage component 216 of energy transfer system 110, energy storage component 226 of vehicle 120, etc.). And in one embodiment, charge and/or discharge component 228 may pass the energy transfer signal with little or no alteration.

Charge and/or discharge component 218 and/or charge and/or discharge component 228 may be capable of implementing an equalization charge of an energy storage component (e.g., 216, 226, some combination thereof, etc.). For example, charge and/or discharge component 218 and/or charge and/or discharge component 228 may raise the charge level of at least one cell of the energy storage component to make it substantially equal to a charge level of at least one other cell of the energy storage component. In one embodiment, charge and/or discharge component 218 and/or charge and/or discharge component 228 may be able to control the amount of energy transferred to each cell, a group of cells, etc. of an energy storage component (e.g., 216, 226, some combination thereof, etc.) independently of an amount of energy transferred to at least one other cell.

Charge and/or discharge component 218 and/or charge and/or discharge component 228 may be capable of filtering the energy transfer signal. For example, noise (e.g., from power grid 250, a component of energy transfer system 110, a component of vehicle 120, from another component, etc.) may be filtered from the energy transfer signal. In one embodiment, filtering the energy transfer signal may improve the transfer of signals (e.g., data signals, clock signals, etc.) over the energy transfer interface by improving bandwidth, improving data rate, improving the distance that the signals may be communicated, reducing jitter, reducing errors, some combination thereof, etc.

In one embodiment, charge and/or discharge component 218 and charge and/or discharge component 228 may work together to implement an energy transfer between energy transfer system 110 and vehicle 120. For example, when transferring energy from energy transfer system 110 to vehicle 120, charge and/or discharge component 218 may prepare the energy transfer signal for transmission (e.g., by altering the energy transfer signal as discussed above) while charge and/or discharge component 228 may pass the energy transfer signal with little or no alteration (e.g., to enable charging of energy storage component 226). As another example, when transferring energy from vehicle 120 to energy transfer system 110, charge and/or discharge component 228 may prepare the energy transfer signal for transmission (e.g., by altering the energy transfer signal as discussed above) while charge and/or discharge component 218 may pass the energy transfer signal with little or no alteration (e.g., to enable charging of energy storage component 216).

Charge and/or discharge component 218 and charge and/or discharge component 228 may perform multiple energy transfers simultaneously. The simultaneous energy transfers may be from energy transfer system 110 to vehicle 120 over one or more energy transfer interfaces (e.g., 130, 132, 231, 234, 237, etc.). Alternatively, the simultaneous energy transfers may be from vehicle 120 to energy transfer system 110 over one or more energy transfer interfaces (e.g., 130, 132, 231, 234, 237, etc.). In one embodiment, the simultaneous energy transfers may include at least one energy transfer from energy transfer system 110 to vehicle 120 and at least one energy transfer from vehicle 120 to energy transfer system 110. As such, energy may be transferred between energy transfer system 110 and vehicle 120 in different directions simultaneously. In one embodiment, simultaneous energy transfers in different directions may be used to charge energy storage component 226 of vehicle 120 (e.g., in accordance with a first attribute such as a first energy transfer rate, first current, etc.) while power source 227 simultaneously discharges (e.g., in accordance with a second attribute such as a second energy transfer rate, second current, etc.).

As shown in FIG. 2, power management component 215 of energy transfer system 110 is capable of managing one or more energy transfers. For example, power management component 215 may source energy from one or more components (e.g., of energy transfer system 110, of vehicle 120, power grid 250, another component coupled to either energy transfer system 110 or vehicle 120, etc.) and supply the energy to one or more other components (e.g., of energy transfer system 110, of vehicle 120, power grid 250, another component coupled to either energy transfer system 110 or vehicle 120, etc.).

In one embodiment, power management component 215 can enable at least two simultaneous or contemporaneous energy transfers. For example, power management component 215 can enable power source 217 to charge energy storage component 216 while energy from power grid 250 is supplied for transfer to vehicle 120 (e.g., via charge and/or discharge component 218, via interface component 211, etc.). As another example, power management component 215 can enable power grid 250 to charge energy storage component 216 while energy from power source 217 is supplied for transfer to vehicle 120 (e.g., via charge and/or discharge component 218, via interface component 211, etc.). And as yet another example, power management component 215 can enable power source 217 to charge energy storage component 216 while power grid 250 is also used to charge energy storage component 216. It should be appreciated that power management component 215 may source energy from any number of components (e.g., of system 200) and/or supply energy to any number of components (e.g., of system 200), where the sourcing and supplying may occur simultaneously (or contemporaneously) or sequentially.

As shown in FIG. 2, power management component 225 of vehicle 120 is capable of managing one or more energy transfers. For example, power management component 225 may source energy from one or more components (e.g., of energy transfer system 110, of vehicle 120, power grid 250, another component coupled to either energy transfer system 110 or vehicle 120, etc.) and supply the energy to one or more other components (e.g., of energy transfer system 110, of vehicle 120, power grid 250, another component coupled to either energy transfer system 110 or vehicle 120, etc.).

In one embodiment, power management component 225 can enable at least two simultaneous or contemporaneous energy transfers. For example, power management component 225 can enable power source 227 to charge energy storage component 226 while energy from energy transfer system 110 (e.g., received over an energy transfer interface such as 130, 132, 231, 234, 237, etc.) is also supplied to charge energy storage component 226. As another example, power management component 215 can supply energy from both energy storage component 226 and power source 227 for transfer to energy transfer system 110 over an energy transfer interface (e.g., received over an energy transfer interface such as 130, 132, 231, 234, 237, etc.). And as yet another example, power management component 225 can supply energy from energy transfer system 110 (e.g., received over an energy transfer interface such as 130, 132, 231, 234, 237, etc.) to charge energy storage component 226 while power management component 225 simultaneously supplies energy from power source 227 for transfer to energy transfer system 110 over an energy transfer interface (e.g., received over an energy transfer interface such as 130, 132, 231, 234, 237, etc.). It should be appreciated that power management component 225 may source energy from any number of components (e.g., of system 200) and/or supply energy to any number of components (e.g., of system 200), where the sourcing and supplying may occur simultaneously (or contemporaneously) or sequentially.

Energy storage component 216 may be any component capable of storing energy. In one embodiment, energy storage component 216 may include an energy storage medium, where the energy storage medium includes at least one battery, at least one capacitor, at least one ultracapacitor, some combination thereof, etc. In one embodiment, the energy storage medium may include a number of cells, where each cell can be accessed (e.g., by charge and/or discharge component 218, power management component 215, charge and/or discharge component 228, etc.) for charge, discharge, some combination thereof, etc. The cells may be individually accessed (e.g., separately from at least one other cell), accessed as a group which is a subset of all the cells of energy storage component 216, accessed as a group which includes all the cells of energy storage component 216, etc. In one embodiment, the energy storage medium of energy storage component 216 may utilize a chemistry such as lithium ion (e.g., lithium cobalt oxide, lithium nickel oxide, lithium aluminum oxide, lithium iron phosphate, lithium manganese oxide, etc.), lithium ion polymer, nickel metal hydride, nickel cadmium, nickel hydrogen, nickel zinc, silver zinc, lead acid, some combination thereof, etc.

As shown in FIG. 2, energy storage component 226 may be any component capable of storing energy. In one embodiment, energy storage component 226 may include an energy storage medium (e.g., 2810 of FIG. 28), where the energy storage medium includes at least one battery, at least one capacitor, at least one ultracapacitor, some combination thereof, etc. In one embodiment, the energy storage medium (e.g., 2810 of FIG. 28) may include a number of cells, where each cell can be accessed (e.g., by charge and/or discharge component 228, power management component 225, charge and/or discharge component 218, etc.) for charge, discharge, some combination thereof, etc. The cells may be individually accessed (e.g., separately from at least one other cell), accessed as a group which is a subset of all the cells of energy storage component 226, accessed as a group which includes all the cells of energy storage component 226, etc. In one embodiment, the energy storage medium (e.g., 2810 of FIG. 28) of energy storage component 226 may utilize a chemistry such as lithium ion (e.g., lithium cobalt oxide, lithium nickel oxide, lithium aluminum oxide, lithium iron phosphate, lithium manganese oxide, etc.), lithium ion polymer, nickel metal hydride, nickel cadmium, nickel hydrogen, nickel zinc, silver zinc, lead acid, some combination thereof, etc.

Power source 217 may be any component capable of generating energy. For example, power source 217 may supply energy generated using the sun, the wind, the flow of water or another fluid, heat (e.g., from the sun, the earth, etc.), a nuclear reaction, etc. In one embodiment, power source 217 may be located near (e.g., on the same plot of land, on an adjacent plot of land, on a plot of land in the same town, etc.) and/or owned by the same entity as at least one other component of system 200. In one embodiment, power source 217 may supply electricity in the form of AC, where the AC may have a phase (e.g., single-phase, three-phase, etc.), a voltage (e.g., 120 volts, 240 volts, 480 volts, etc.), and a frequency (e.g., 60 Hz, 50 Hz, etc.). It should be appreciated that the voltage and/or frequency may vary over a predetermined range (e.g., determined by a manufacturer of power source 217, determined by energy transfer system 110, etc.). In one embodiment, power source 217 may supply electricity in the form of DC, PWM, etc.

As shown in FIG. 2, power source 227 may be any component capable of generating energy. For example, power source 227 may supply energy generated using the sun, the wind, the flow of water or another fluid, heat (e.g., from the sun, the earth, etc.), a nuclear reaction, etc. In one embodiment, power source 227 may be disposed within vehicle 120 and/or on vehicle 120 (e.g., on an external body panel, a window, etc.). In one embodiment, power source 227 may supply electricity in the form of AC, where the AC may have a phase (e.g., single-phase, three-phase, etc.), a voltage (e.g., 120 volts, 240 volts, 480 volts, etc.), and a frequency (e.g., 60 Hz, 50 Hz, etc.). It should be appreciated that the voltage and/or frequency may vary over a predetermined range (e.g., determined by a manufacturer of power source 217, determined by energy transfer system 110, etc.). In one embodiment, power source 217 may supply electricity in the form of DC, PWM, etc.

As shown in FIG. 2, power grid 250 may include at least one component capable of generating and/or supplying energy to energy transfer system 110. For example, power grid 250 may include at least one power plant, at least one transmission line or power line, at least one transformer, etc. In one embodiment, power grid 250 may supply electricity in the form of AC, where the AC may have a phase (e.g., single-phase, three-phase, etc.), a voltage (e.g., 120 volts, 240 volts, 480 volts, etc.), and a frequency (e.g., 60 Hz, 50 Hz, etc.). It should be appreciated that the voltage and/or frequency may vary over a predetermined range (e.g., determined by the utility providing the electricity). In one embodiment, power grid 250 may supply electricity in the form of DC, PWM, etc.

In one embodiment, an interface (e.g., 130, 132, 231, 234, 237, 134, etc.) used to transfer energy and/or communicate signals between energy transfer system 110 and vehicle 120 may be separate from, isolated from, not directly coupled to, and/or not part of a power line or transmission line (e.g., of power grid 250). In this manner, power grid 250 may be separate from an interface coupling energy transfer system 110 and vehicle 120. In one embodiment, an interface coupling energy transfer system 110 to power grid 250 may be isolated from an energy transfer interface (e.g., 130, 132, etc.) by a component capable of filtering or removing signals communicated between energy transfer system 110 and vehicle 120 from an energy transfer signal. For example, a transformer that supplies electricity to at least one circuit of energy transfer system 110 may be used to attenuate or not pass higher frequency signal components to the interface coupling energy transfer system 110 and power grid 250, where the attenuation of the higher frequency signal components may reduce unauthorized access to signals communicated between energy transfer system 110 and vehicle 120. As another example, a circuit (e.g., disposed on a printed circuit board, disposed within an integrated circuit, etc.) may be used to reduce unauthorized access to signals communicated between energy transfer system 110 and vehicle 120 (e.g., by reducing the ability of the signals to pass outside of energy transfer system 110 and/or vehicle 120, by isolating energy transfer system 110 from power grid 250, by filtering or removing the signals before passing outside of energy transfer system 110 and/or vehicle 120, etc.). As such, the ability of an external component (e.g., a component coupled to power grid 250, a system or device other than energy transfer system 110 and/or vehicle 120, etc.) to access signals communicated between energy transfer system 110 and vehicle 120 (e.g., over an energy transfer interface and/or a separate signal interface) can be advantageously reduced to improve security.

As shown in FIG. 2, meter 219 may be capable of monitoring energy transfers to energy transfer system 110 (e.g., from vehicle 120, power grid 250, etc.), from energy transfer system 110 (e.g., to vehicle 120, power grid 250, etc.), through energy transfer system 110, some combination thereof, etc. Meter 219 may store (or caused to be stored) at least one attribute (e.g., an energy transfer type, an interface type, a power, a current, a voltage, an energy transfer profile, a duration, a waveform, a temperature, etc.) of an energy transfer, where the at least one attribute may be associated with one or more times (e.g., a voltage, current, etc. associated with an energy transfer at a given time or times). The at least one attribute may also include at least one cumulative attribute (e.g., a total amount of energy transferred to vehicle 120 during at least one energy transfer, a total amount of energy transferred from vehicle 120 during at least one energy transfer, etc.) in one embodiment. In this manner, meter 219 may enable data to be collected over time and analyzed to determine trends, patterns, or the like.

Meter 219 may be used to determine the amount of energy received by energy transfer system 110 (e.g., as a result of an energy transfer from vehicle 120 to energy transfer system 110). In one embodiment, energy may be lost during the energy transfer, and therefore, the amount of energy transferred from vehicle 120 (e.g., as measured by meter 229) may be different from the amount of energy received by energy transfer system 110 (e.g., as measured by meter 219). Thus, the amount of energy measured by meter 219 may be advantageously used to more accurately or precisely account for (e.g., during a financial or payment transaction associated with the energy transfer) energy transferred from vehicle 120.

Meter 229 may be capable of monitoring energy transfers to vehicle 120 (e.g., from energy transfer system 110, etc.), from vehicle 120 (e.g., to energy transfer system 110, power grid 250, etc.), through vehicle 120, some combination thereof, etc. Meter 229 may store (or caused to be stored) at least one attribute (e.g., an energy transfer type, an interface type, a power, a current, a voltage, an energy transfer profile, a duration, a waveform, a temperature, etc.) of an energy transfer, where the at least one attribute may be associated with one or more times (e.g., a voltage, current, etc. associated with an energy transfer at a given time or times). The at least one attribute may also include at least one cumulative attribute (e.g., a total amount of energy transferred to vehicle 120 during at least one energy transfer, a total amount of energy transferred from vehicle 120 during at least one energy transfer, etc.) in one embodiment. In this manner, meter 229 may enable data to be collected over time and analyzed to determine trends, patterns, or the like.

Meter 229 may be used to determine the amount of energy received by vehicle 120 (e.g., as a result of an energy transfer from energy transfer system 110 to vehicle 120). In one embodiment, energy may be lost during the energy transfer, and therefore, the amount of energy transferred from energy transfer system 110 (e.g., as measured by meter 219) may be different from the amount of energy received by vehicle 120 (e.g., as measured by meter 229). Thus, the amount of energy measured by meter 229 may be advantageously used to more accurately or precisely account for (e.g., during a financial or payment transaction associated with the energy transfer) energy transferred from energy transfer system 110.

In one embodiment, meter 219 and meter 229 may be used to determine an amount of energy lost during an energy transfer between energy transfer system 110 and vehicle 120.

For example, the difference between an amount of energy measured by meter 219 and an amount of energy measured by meter 229 may be used to determine an amount of energy lost during an energy transfer. And in one embodiment, the difference between an amount of energy measured by meter 219 and an amount of energy measured by meter 229 may be used to determine an efficiency of an energy transfer between energy transfer system 110 and vehicle 120, another attribute or parameter associated with the energy transfer, etc.

Although FIG. 2 shows a specific number of interfaces between energy transfer system 110 and vehicle 120, it should be appreciated that any number of interfaces may exist or be used (e.g., to transfer energy, communicate signals, some combination thereof, etc.) between energy transfer system 110 and vehicle 120 in other embodiments. Additionally, although FIG. 2 shows a specific combination of types of interfaces between energy transfer system 110 and vehicle 120, it should be appreciated that any combination of types of interfaces may exist or be used (e.g., to transfer energy, communicate signals, some combination thereof, etc.) between energy transfer system 110 and vehicle 120 in other embodiments. Further, although FIG. 2 shows a specific number of components (e.g., six energy transfer components, two charge and/or discharge components, etc.), it should be appreciated that system 200 may include a larger or smaller number of components in other embodiments. In one embodiment, two or more components may be combined, a component may be separated into multiple components, some combination thereof, etc. It should also be appreciated that the components depicted in FIG. 2 may be arranged differently (e.g., a sub-component of one component may be a sub-component of another component, a sub-component of a component may exist outside the component as another component, a component may be a sub-component of another component, etc.) in other embodiments.

Figure 3:
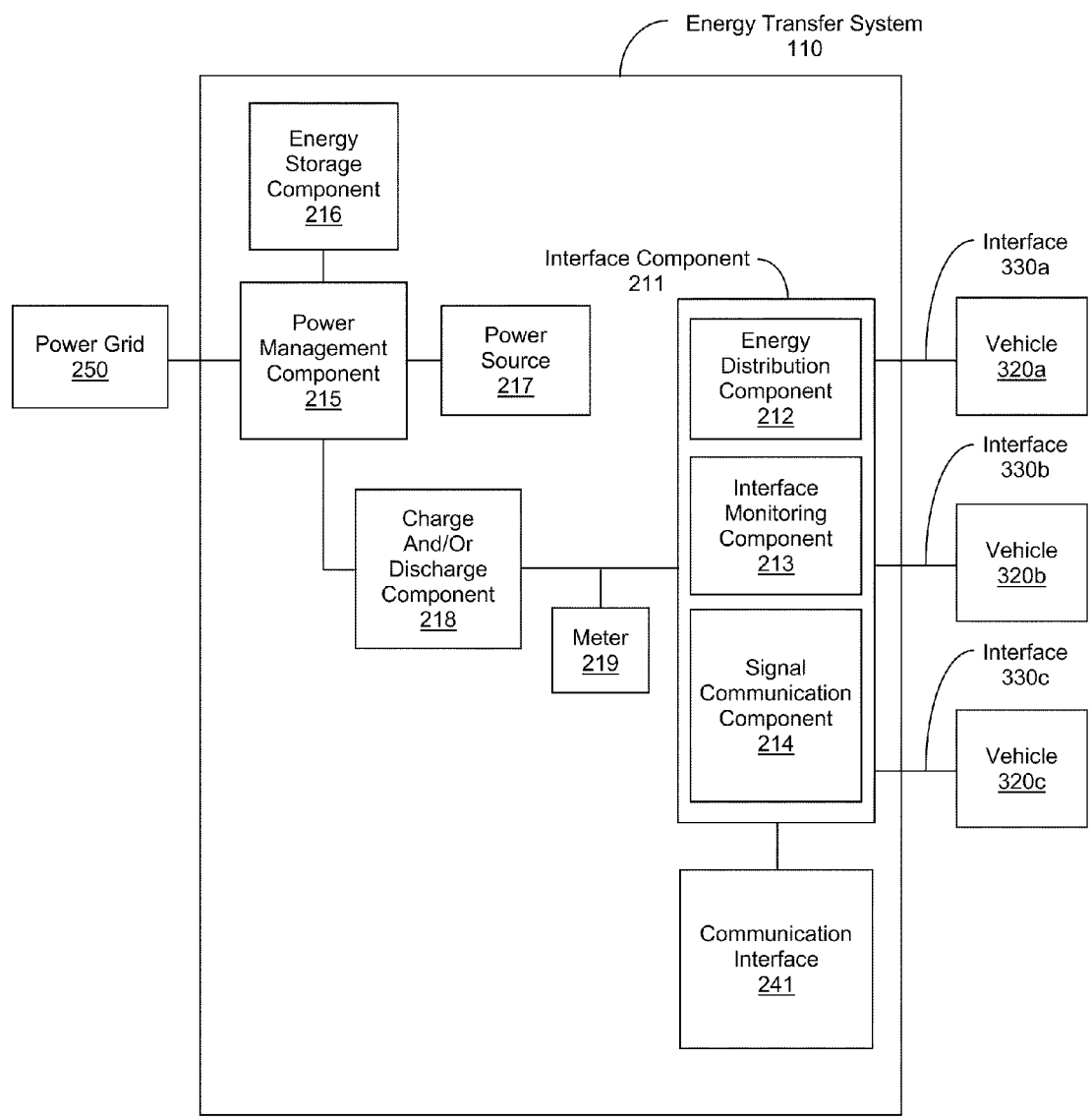
FIG. 3 shows a system for managing one or more energy transfers with a plurality of vehicles in accordance with one embodiment of the present invention.

FIG. 3 shows system 300 for managing one or more energy transfers with a plurality of vehicles in accordance with one embodiment of the present invention. As shown in FIG. 3, energy transfer system 110 is coupled to a plurality of vehicles via a plurality of interfaces. For example, vehicle 320a is coupled to energy transfer system 110 via interface 330a, vehicle 320b is coupled to energy transfer system 110 via interface 330b, and vehicle 320c is coupled to energy transfer system 110 via interface 330c. Accordingly, in one embodiment, interfaces 330a, 330b, and 330c may be used to transfer energy and/or communicate signals between energy transfer system 110 and a plurality of vehicles (e.g., 320a, 320b, and 320c, respectively).

In one embodiment, signals communicated between energy transfer system 110 and a vehicle (e.g., vehicle 320a over interface 330a, vehicle 320b over interface 330b, vehicle 320c over interface 330c, etc.) may be analog signals, digital signals, pulse width modulated signals, some combination thereof, etc. An interface (e.g., 330a, 330b, 330c, etc.) coupling energy transfer system 110 and a vehicle (e.g., 320a, 320b, 320c, etc.) may implement unidirectional signal communication and/or bidirectional signal communication in one embodiment. And in one embodiment, signals may be communicated between energy transfer system 110 and a vehicle (e.g., vehicle 320a over interface 330a, vehicle 320b over interface 330b, vehicle 320c over interface 330c, etc.) using single-ended signaling and/or differential signaling.

In one embodiment, interface 330a may be implemented in accordance with (e.g., include components of, function similarly to, etc.) one or more of the interfaces described herein (e.g., interface 130, 132, 231, 234, 237, 134, etc.). Interface 330b may be implemented in accordance with (e.g., include components of, function similarly to, etc.) one or more of the interfaces described herein (e.g., interface 130, 132, 231, 234, 237, 134, etc.). Interface 330c may be implemented in accordance with (e.g., include components of, function similarly to, etc.) one or more of the interfaces described herein (e.g., interface 130, 132, 231, 234, 237, 134, etc.). And in one embodiment, one or more of the vehicles of system 300 (e.g., vehicle 320a, vehicle 320b, vehicle 320c, etc.) may be implemented in accordance with (e.g., include components of, function similarly to, etc.) vehicle 120.

As shown in FIG. 3, energy distribution component 212 may control energy transfers over one or more of the interfaces (e.g., 330a, 330b, 330c, etc.). Energy distribution component 212 may enable multiple energy transfers to occur over the same interface (e.g., 330a, etc.) or over multiple interfaces (e.g., 330a and 330b, etc.). The multiple energy transfers may occur in the same direction between energy transfer system 110 and a vehicle (e.g., 320a, 320b, 320c, etc.) or in different directions. The multiple energy transfers may take place simultaneously (or contemporaneously) or sequentially.

As shown in FIG. 3, energy distribution component 212 may enable at least one energy transfer between two or more vehicles (e.g., 320a, 320b, 320c, etc.). For example, energy supplied by at least one vehicle (e.g., from one or more energy storage components of the at least one vehicle, from one or more power sources of the at least one vehicle, etc.) may be supplied to one or more other vehicles (e.g., to charge an energy storage component of the one or more other vehicles) by energy distribution component 212. In one embodiment, the at least one energy transfer between two or more vehicles may occur simultaneously or contemporaneously with at least one other energy transfer implemented by energy distribution component 212 (e.g., an energy transfer from charge and/or discharge component 218 to one or more of vehicles 320a through 320c, an energy transfer from another component of energy transfer system 110 to one or more of vehicles 320a through 320c, an energy transfer to charge and/or discharge component 218 from one or more of vehicles 320a through 320c, an energy transfer to another component of energy transfer system 110 from one or more of vehicles 320a through 320c, some combination thereof, etc.). In one embodiment, energy obtained from a vehicle (e.g., 320a, 320b, 320c, etc.) may be less expensive than energy obtained from another source (e.g., a utility company via power grid 250, power source 217, etc.), and therefore, revenue or profit may be increased through the sale of energy to one vehicle which was obtained from at least one other vehicle. As such, in one embodiment, energy obtained from a vehicle (e.g., 320a, 320b, 320c, etc.) may be used (e.g., for transfer to one or more vehicles, to charge energy storage component 216, etc.) before energy obtained from another source (e.g., a utility company via power grid 250, power source 217, etc.).

Signal communication component 214 may enable communication of signals (e.g., data signals, clock signals, etc.) over one or more of the interfaces (e.g., 330a, 330b, 330c, etc.). The multiple communications may occur over the same interface (e.g., 330a, etc.) or over multiple interfaces (e.g., 330a and 330b, etc.). The multiple communications may occur in the same direction between energy transfer system 110 and a vehicle (e.g., 320a, 320b, 320c, etc.) or in different directions. In one embodiment, the multiple communications may take place simultaneously or contemporaneously. The multiple communications may take place sequentially in one embodiment.

As shown in FIG. 3, signal communication component 214 may enable at least one communication between two or more vehicles (e.g., 320a, 320b, 320c, etc.). For example, at least one communication transmitted by at least one vehicle may be transmitted to one or more other vehicles via signal communication component 214. In one embodiment, the at least one communication between two or more vehicles may occur simultaneously or contemporaneously with at least one other communication between a component of energy transfer system 110 (e.g., signal communication component 214, communication interface 241, etc.) and at least one vehicle (e.g., 320a, 320b, 320c, etc.). The at least one signal communication between two or more vehicles may occur simultaneously or contemporaneously with at least one energy transfer between energy transfer system 110 and at least one vehicle (e.g., 320a, 320b, 320c, etc.).

Although FIG. 3 shows only one interface between energy transfer system 110 and a given vehicle (e.g., 320a, 320b, 320c, etc.), it should be appreciated that any number of interfaces may exist or be used (e.g., to transfer energy, communicate signals, some combination thereof, etc.) between energy transfer system 110 and a given vehicle (e.g., 320a, 320b, 320c, etc.) in other embodiments. Additionally, although FIG. 3 shows a specific number of components (e.g., three vehicles, one charge and/or discharge component, etc.), it should be appreciated that system 300 may include a larger or smaller number of components in other embodiments. In one embodiment, two or more components may be combined, a component may be separated into multiple components, some combination thereof, etc. It should also be appreciated that the components depicted in FIG. 3 may be arranged differently (e.g., a sub-component of one component may be a sub-component of another component, a sub-component of a component may exist outside the component as another component, a component may be a sub-component of another component, etc.) in other embodiments.

Figure 4:
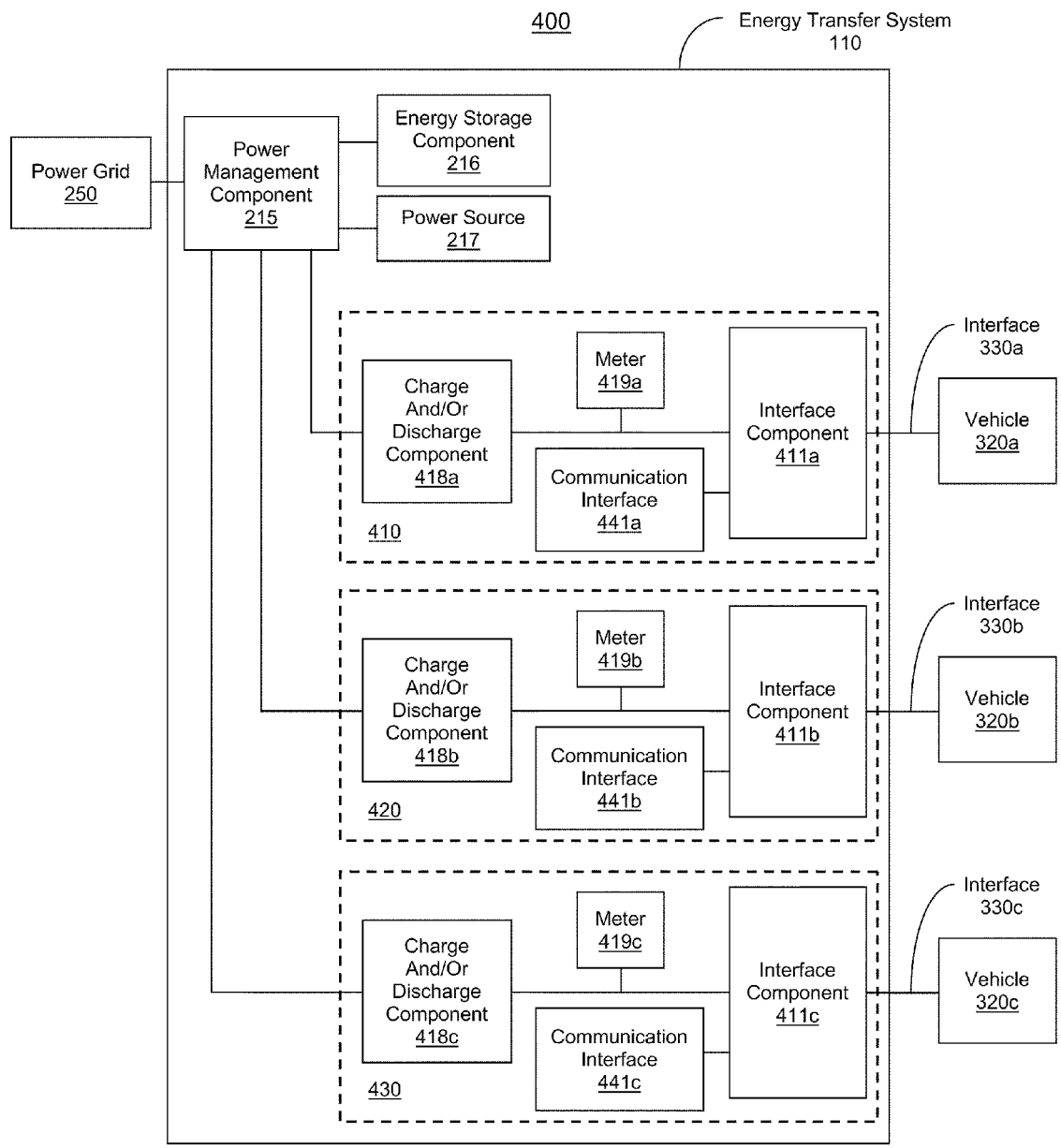
FIG. 4 shows a system for managing one or more energy transfers with a plurality of vehicles using separate components in accordance with one embodiment of the present invention.

FIG. 4 shows system 400 for managing one or more energy transfers with a plurality of vehicles using separate components in accordance with one embodiment of the present invention. As shown in FIG. 4, first set of components 410 (e.g., charge and/or discharge component 418a, meter 419a, interface component 411a, communication interface 441a, etc.) may be controllable to transfer energy and/or communicate signals over a first interface (e.g., 330a) to a first vehicle (e.g., 320a), second set of components 420 (e.g., charge and/or discharge component 418b, meter 419b, interface component 411b, communication interface 441b, etc.) may be controllable to transfer energy and/or communicate signals over a second interface (e.g., 330b) to a second vehicle (e.g., 320b), and third set of components 430 (e.g., charge and/or discharge component 418c, meter 419c, interface component 411c, communication interface 441c, etc.) may be controllable to transfer energy and/or communicate signals over a third interface (e.g., 330c) to a third vehicle (e.g., 320c).

In one embodiment, one or more of the charge and/or discharge components (e.g., 418a, 418b, 418c, etc.) may be implemented in accordance with (e.g., include components of, function similarly to, etc.) charge and/or discharge component 218. One or more of the meters (e.g., 419a, 419b, 419c, etc.) may be implemented in accordance with (e.g., include components of, function similarly to, etc.) meter 219 in one embodiment. In one embodiment, one or more of the interface components (e.g., 411a, 411b, 411c, etc.) may be implemented in accordance with (e.g., include components of, function similarly to, etc.) interface component 211. One or more of the communication interfaces (e.g., 441a, 441b, 441c, etc.) may be implemented in accordance with (e.g., include components of, function similarly to, etc.) communication interface 241 in one embodiment.

As shown in FIG. 4, system 400 may be capable of performing energy transfers between two or more vehicles (e.g., 320a, 320b, 320c, etc.). In one embodiment, the interface components (e.g., 411a, 411b, 411c, etc.) may function as a single interface component (e.g., interface component 211) to control the one or more energy transfers between two or more vehicles. For example, the interface components (e.g., 411a, 411b, 411c, etc.) may communicate with one another (e.g., wirelessly, using a wired interface, via respective interfaces coupling each interface component to power management component 215, etc.) and transfer energy between one another (e.g., via respective interfaces coupling each interface component to power management component 215). Therefore, the interface components may control an energy transfer between two or more vehicles similar to interface component 211 as discussed herein (e.g., with respect to FIG. 3).

In one embodiment, power management component 215, either alone or in combination with at least one other component (e.g., charge and/or discharge component 418a, charge and/or discharge component 418b, charge and/or discharge component 418c, interface component 411a, interface component 411b, interface component 411c, some combination thereof, etc.), may control the one or more energy transfers between two or more vehicles. For example, as shown in FIG. 4, power management component 215 is coupled to each of the charge and/or discharge components (e.g., 418a, 418b, 418c, etc.) and is capable of receiving energy from and/or supplying energy to each of the charge and/or discharge components (e.g., 418a, 418b, 418c, etc.). As such, power management component 215 can direct energy received from one or more vehicles to one or more other vehicles (e.g., via a respective charge and/or discharge component, a respective interface component, etc.).

In one embodiment, the at least one energy transfer between two or more vehicles (e.g., implemented in accordance with power management component 215) may occur simultaneously or contemporaneously with at least one other energy transfer. For example, power management component 215 may be capable of enabling the at least one energy transfer between two or more vehicles simultaneously or contemporaneously with one or more energy transfers between a component (e.g., power grid 250, energy storage component 216, power source 217, etc.) and at least one vehicle (e.g., 320a, 320b, 320c, etc.).

As shown in FIG. 4, signals (e.g., data signals, clock signals, etc.) may be communicated between any two components of system 400. For example, signals may be communicated between a vehicle (e.g., 320a, 320b, 320c, etc.) and a communication interface (e.g., 441a, 441b, 441c, etc.) similar to signal communication using communication interface 241 as discussed herein. The communication interfaces (e.g., 441a, 441b, 441c, etc.) may communicate signals with one another using a wireless interface and/or a wired interface. Additionally, other components of system 400 may be communicatively coupled to at least one of the communication interfaces (e.g., 441a, 441b, 441c, etc.). In this manner, one or more components of system 400 may communicate signals with one or more other components of system 400.

In one embodiment, a communication interface (e.g., 441a, 441b, 441c, etc.) may communicate signals with another component of system 400 using any of the signal communication techniques discussed herein. For example, a communication interface (e.g., 441a, 441b, 441c, etc.) may communicate signals with another component of system 400

(e.g., another communication interface, power management component 215, etc.) via modulation and/or demodulation, where both the communication interface (e.g., using a signal communication component similar to signal communication component 214) and the other component (e.g., using a signal communication component similar to signal communication component 214) are each capable of modulating and demodulating signals transferred over an interface coupling the communication interface and the other component. As another example, a communication interface (e.g., 441a, 441b, 441c, etc.) may communicate signals with another component of system 400 (e.g., another communication interface, power management component 215, etc.) via an electromagnetic field surrounding at least one conductor of an interface coupling the communication interface and the other component, where both the communication interface (e.g., using a signal communication component similar to signal communication component 214) and the other component (e.g., using a signal communication component similar to signal communication component 214) are each capable of altering the electromagnetic field surrounding the at least one conductor of the interface to communicate signals between the communication interface and the other component. Alternatively, a communication interface (e.g., 441a, 441b, 441c, etc.) may communicate signals with another component of system 400 using a separate signal interface (e.g., similar to signal interface 134) coupling the communication interface to the other component.

As shown in FIG. 4, a first set of components (e.g., 410) and a second set of components (e.g., 420) may be disposed in different locations (e.g., remotely from one another, within eyeshot of one another, etc.). For example, components 410 may be disposed near one parking space in a parking lot, while components 420 may be disposed near another parking space in the parking lot. As another example, components 410 may be disposed near one location of a boat dock, while components 420 may be disposed near another location of the boat dock. As yet another example, components 410 may be disposed near one location of an airport, while components 420 may be disposed near another location of an airport. And as a further example, components 410 may be disposed at a first location along a vehicle route (e.g., a roadway, a route for a boat, a taxiway or runway for an aircraft, etc.), while components 420 may be disposed at a second location along the vehicle route (e.g., a roadway, a route for a boat, a taxiway or runway for an aircraft, etc.).

Each of the set of components (e.g., 410, 420, 430, etc.) may be disposed in at least one respective housing in one embodiment. The one or more housings containing each set of components may be disposed at least partially in the ground, in a curb, in the water, in a sign, in a guard rail, in an overpass, in a street light, in a stoplight, etc. In one embodiment, each of the set of components (e.g., 410, 420, 430, etc.) may implement a respective charge station capable of performing an energy transfer with one or more vehicles (e.g., 120, 320a, 320b, 320c, etc.).

Power management component 215 may be located remotely from one or more components of system 400 (e.g., charge and/or discharge component 418a, set of components 410, etc.). In one embodiment, power management component 215 may be located in a first location (e.g., near a utility meter, utility service entrance, breaker box, near a building, near or attached to a building owned by an entity profiting from an energy transfer carried out using system 400, etc.), while the one or more other components are located in a second location (e.g., in or near a parking lot owned by an entity profiting from an energy transfer carried out using system 400, in or near a boat dock owned by an entity profiting from an energy transfer carried out using system 400, in or near an airport owned by an entity profiting from an energy transfer carried out using system 400, in a vehicle route, in an object disposed near a vehicle route, etc.). Power management component 215 may be coupled to a remotely-located component (e.g., charge and/or discharge component 418a, charge and/or discharge component 418b, charge and/or discharge component 418c, set of components 410, set of components 420, set of components 430, etc.) via single interface capable of transferring energy and/or communicating signals. Alternatively, power management component 215 may be coupled to a remotely-located component (e.g., charge and/or discharge component 418a, charge and/or discharge component 418b, charge and/or discharge component 418c, set of components 410, set of components 420, set of components 430, etc.) via a plurality of interfaces, where each interface may be capable of transferring energy and/or communicating signals.

Although FIG. 4 shows only one interface between energy transfer system 110 and a given vehicle (e.g., 320a, 320b, 320c, etc.), it should be appreciated that any number of interfaces may exist or be used (e.g., to transfer energy, communicate signals, some combination thereof, etc.) between energy transfer system 110 and a given vehicle (e.g., 320a, 320b, 320c, etc.) in other embodiments. Additionally, although FIG. 4 shows a specific number of components (e.g., three vehicles, three charge and/or discharge components, three sets of components 410 to 430, etc.), it should be appreciated that system 400 may include a larger or smaller number of components in other embodiments. In one embodiment, two or more components may be combined, a component may be separated into multiple components, some combination thereof, etc. It should also be appreciated that the components depicted in FIG. 4 may be arranged differently (e.g., a sub-component of one component may be a sub-component of another component, a sub-component of a component may exist outside the component as another component, a component may be a sub-component of another component, etc.) in other embodiments.

Figure 5:
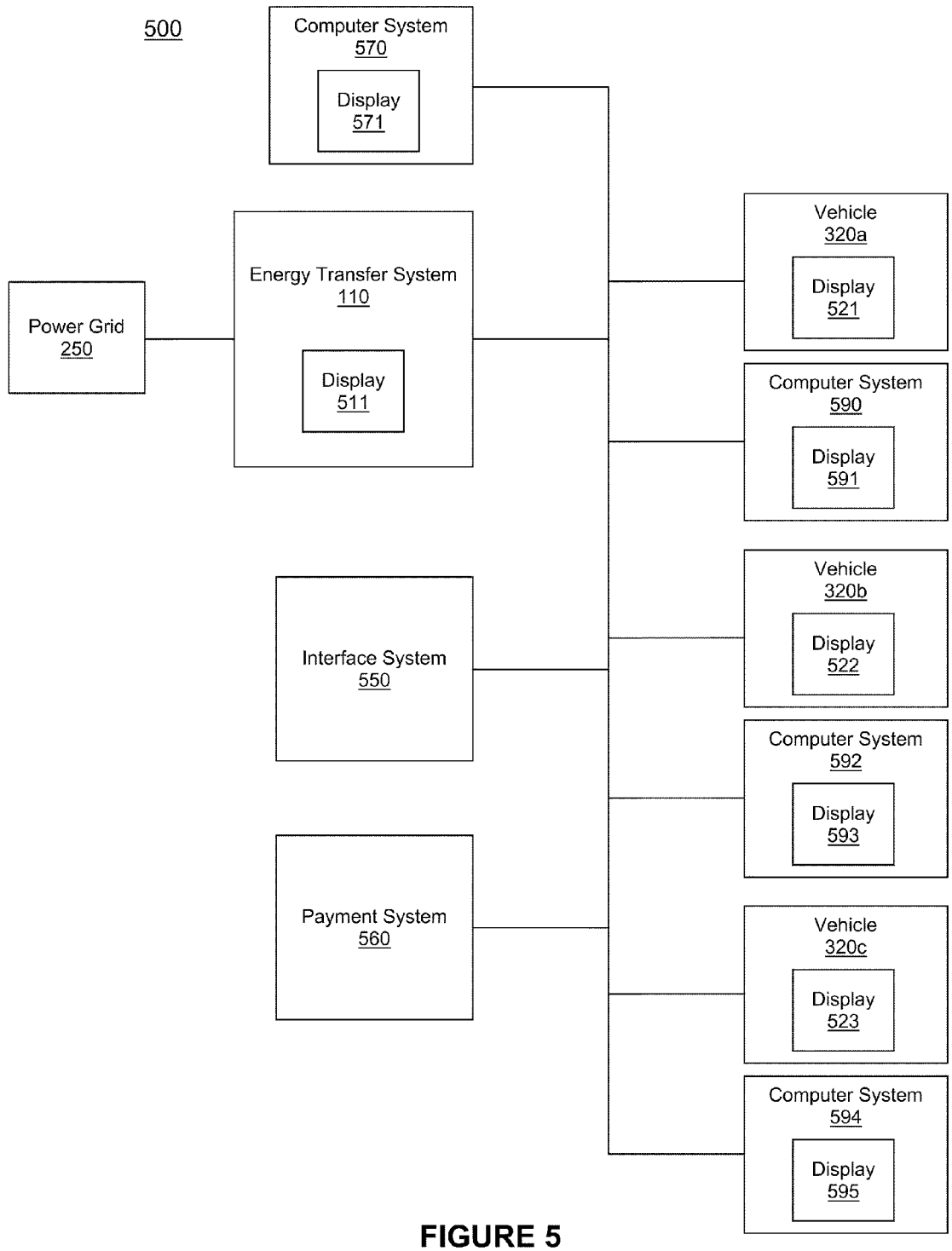
FIG. 5 shows a system for managing one or more energy transfers using an interface system in accordance with one embodiment of the present invention.

FIG. 5 shows system 500 for managing one or more energy transfers using an interface system in accordance with one embodiment of the present invention. As shown in FIG. 5, interface system 550 may communicate with a vehicle (e.g., 320a, 320b, 320c, etc.), a computer system (e.g., 570, 590, 592, 594, etc.), an energy transfer system (e.g., 110), a payment system (e.g., 560), some combination thereof, etc. In one embodiment, computer system 570 may be associated with (e.g., owned by the same entity or individual as, etc.) energy transfer system 110, where computer system 570 and energy transfer system 110 may be located in the same location or located remotely from one another. Each vehicle (e.g., 320a, 320b, 320c, etc.) of system 500 may be associated with (e.g., owned by the same entity or individual as, etc.) a respective computer system (e.g., 590, 592, and 594, respectively), where the associated computer system and vehicle may be located in the same location or located remotely from one another. Each computer system of system 500 (e.g., 570, 590, 592, 594, etc.) may be implemented in accordance with (e.g., include components of, function similarly to, etc.) computer system 4100 of FIG. 41 in one embodiment. Each display of system 500 (e.g., 511, 571, 521, 591, 522, 593, 523, 595, etc.) may be implemented in accordance with (e.g., include components of, function similarly to, etc.) output component 4190 of FIG. 41 in one embodiment. And in one embodiment, each display of system 500 (e.g., 511, 571, 521, 591, 522, 593, 523, 595, etc.) may be any device capable of displaying an image such as a liquid crystal display (LED), light emitting diode (LED) display, organic light emitting diode (OLED) display, plasma display, cathode ray tube (CRT) display, projector, etc.

As shown in FIG. 5, interface system 550 may perform one or more tasks related to an energy transfer between energy transfer system 110 and one or more vehicles (e.g., 320*a*, 320*b*, 320*c*, etc.). For example, interface system 550 may enable registration (e.g., using registration component 610 of FIG. 6) of one or more energy transfer systems (e.g., by one or more users of the one or more energy transfer systems) and/or one or more vehicles (e.g., by one or more users of the one or more vehicles). As another example, interface system 550 may perform tasks prior to an energy transfer (e.g., using pre-transfer processing component 620 of FIG. 6), during an energy transfer (e.g., using energy transfer processing component 630 of FIG. 6), after an energy transfer (e.g., using post-transfer processing component 640 of FIG. 6), some combination thereof, etc. And as yet another example, interface system 550 may store information (e.g., collected during registration, before an energy transfer, during an energy transfer, after an energy transfer, etc.) in a memory or database accessible to interface system 550 (e.g., in database 650, database 660, database 665, database 670, database 675, database 680, database 690, etc.).

Figure 6:
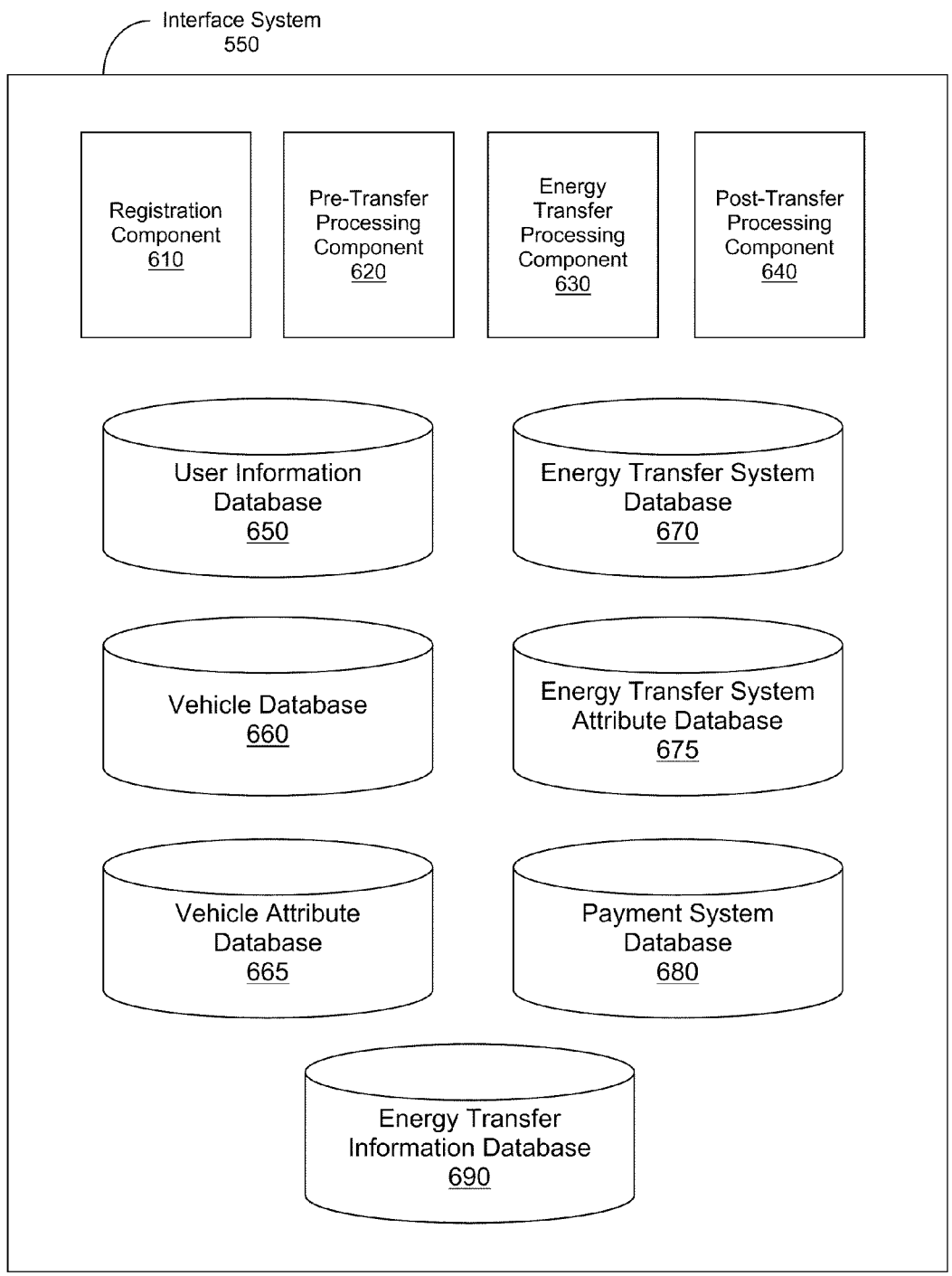
FIG. 6 shows an interface system in accordance with one embodiment of the present invention.

As shown in FIG. 6, registration component 610 may enable registration of one or more energy transfer systems. For example, information may be collected about an energy transfer system (e.g., 110), about a user of an energy transfer system (e.g., an organization or business, an individual, an owner, a lessee, an attendant, etc.), about preferences or attributes related to the energy transfer system, etc. The collected information may be stored in a memory or database (e.g., 650, 670, 675, etc.) accessible to interface system 550. In one embodiment, the information may be collected using a user interface (e.g., graphical user interface (GUI) 800 of FIG. 8), where the user interface may be accessed and displayed on a display device (e.g., 571 of FIG. 5) of a computer system (e.g., 570 of FIG. 5) and/or a display device (e.g., 511 of FIG. 5) of an energy transfer system (e.g., 110). In this manner, an energy transfer system (e.g., 110) may be registered to enable the energy transfer system to participate in energy transfers with one or more vehicles and also participate in transactions related to the energy transfers.

Registration component 610 may enable registration of one or more vehicles. For example, information may be collected about a vehicle (e.g., 120, 320*a*, 320*b*, 320*c*, etc.), about a user of the vehicle (e.g., an owner, lessee, driver, etc.), about preferences or attributes related to the vehicle, etc. The collected information may be stored in a memory or database (e.g., 650, 660, 665, 680, etc.) accessible to interface system 550. In one embodiment, the information may be collected using a user interface (e.g., GUI 900 of FIG. 9), where the user interface may be accessed and displayed on a display device (e.g., 591 of FIG. 5, 593 of FIG. 5, 595 of FIG. 5, etc.) of a computer system (e.g., 590 of FIG. 5, 592 of FIG. 5, 594 of FIG. 5, etc.) and/or a display device (e.g., 521 of FIG. 5, 522 of FIG. 5, 523 of FIG. 5, etc.) of a vehicle (e.g., 120, 320*a*, 320*b*, 320*c*, etc.). In this manner, a vehicle (e.g., 120, 320*a*, 320*b*, 320*c*, etc.) may be registered to enable the vehicle to participate in energy transfers with one or more energy transfer systems and also participate in transactions related to the energy transfers.

As shown in FIG. 6, pre-transfer processing component 620 may perform tasks prior to an energy transfer between an energy transfer system (e.g., 110) and at least one vehicle (e.g., 120, 320*a*, 320*b*, 320*c*, etc.). For example, pre-transfer processing component 620 may access information related to vehicle, related to a user of a vehicle, related to an energy transfer system, related to a user of an energy transfer system, a current state of an energy transfer system, a current state of a vehicle, some combination thereof, etc. In one embodiment, the information may be stored in a database (e.g., 650, 660, 665, 670, 675, 680, etc.) accessible to interface system 550. The information may be used to determine at least one attribute associated with at least one energy transfer between an energy transfer system (e.g., 110) and at least one vehicle (e.g., 120, 320*a*, 320*b*, 320*c*, etc.), where the at least one attribute may include an energy transfer type (e.g., a "charge" or transfer of energy to the vehicle, a "discharge" or transfer of energy from the vehicle, etc.), an interface type (e.g., a wired energy transfer interface including a plug and/or cable, an inductive energy transfer interface, a wireless energy transfer interface, etc.), a power (e.g., measured in watts, kilowatts, etc.), a current (e.g., measured in amps, etc.), a voltage, an energy transfer profile, a duration, a waveform, a temperature, some combination thereof, etc. The information may also be used to determine at least one cost (e.g., billable to an individual and/or entity associated with the vehicle, billable to an individual and/or entity associated with the energy transfer system, etc.) associated with the at least one energy transfer, where the cost may correspond to an energy transfer rate (e.g., different energy transfer rates may have different costs), an energy transfer profile (e.g., different energy transfer profiles may have different costs), a quantity of energy transferred (e.g., different quantities of energy transferred may have different costs), some combination thereof, etc.

In one embodiment, at least one attribute may be determined using information related to an energy transfer system (e.g., 110) and information related to a vehicle (e.g., 120, 320*a*, 320*b*, 320*c*, etc.). For example, attributes compatible with the energy transfer system may be compared to attributes compatible with the vehicle to determine at least one attribute compatible with both the energy transfer system and the vehicle. The at least one attribute may then be filtered using other information (e.g., a state of the energy transfer system, a user preference associated with the energy transfer, etc.). For example, one or more attributes may be filtered which exceed a remaining capacity of the energy transfer system to transfer energy at a particular time, where the remaining capacity may vary over time based on, for example, a load on the energy transfer system due to charging other vehicles, a change in an amount of energy supplied by a component of the energy transfer system (e.g., energy storage component 216, power source 217, etc.), supplying electricity to a building or lights in a parking lot, etc. As another example, one or more attributes may be filtered which correspond to an energy transfer which cannot be performed (e.g., due to a problem with an energy transfer interface, due to a problem with a signal interface, etc.). As yet another example, one or more attributes may be filtered based on a user preference associated with a state of the energy transfer system (e.g., higher energy transfer rates should be filtered as the capacity of the energy transfer system to transfer energy goes down). As a further example, one or more attributes may be filtered based on a user preference associated with an energy transfer system (e.g., entered using GUI 800 of FIG. 8) and/or a vehicle (e.g., entered using GUI 900 of FIG. 9), where the user preference may be a user-specified maximum threshold, a user-specified minimum threshold, a user-specified parameter, etc.

At least one cost (e.g., billable to an individual and/or entity associated with the vehicle, billable to an individual and/or entity associated with the energy transfer system, etc.) may be determined based on a cost of electricity to the energy transfer system (e.g., as determined by the utility providing power, by a cost to purchase and/or install a power source such as power source 217, by a cost to operate a power source such as power source 217, etc.) and/or a cost of electricity to the vehicle (e.g., as determined by a cost to purchase and/or install a power source such as power source 227, by a cost to operate a power source such as power source 227, etc.). For example, a utility may charge more for power during the day than at night (e.g., due to variations in demand for electricity throughout the day), and therefore, the cost may be higher for an energy transfer performed during the day than for an energy transfer performed at night. As another example, a power source (e.g., 217, 227, etc.) which has a higher upfront cost (e.g., the cost to purchase and/or install the power source and any related components) and/or has a higher cost to operate (e.g., higher maintenance costs, higher fees for licensing the equipment, etc.) may result in a higher cost.

In one embodiment, at least one cost (e.g., billable to an individual and/or entity associated with the vehicle, billable to an individual and/or entity associated with the energy transfer system, etc.) may be determined based on supply of and/or demand for electricity. For example, if the demand for energy is low (e.g., caused by a fewer number of vehicles requesting energy from the energy transfer system, a larger number of vehicles requesting to transfer energy to the energy transfer system, etc.), then the cost may be lower. If the demand for energy is high (e.g., caused by a larger number of vehicles requesting energy from the energy transfer system, a smaller number of vehicles requesting to transfer energy to the energy transfer system, etc.), then the cost may be higher. As another example, if the supply of energy is low (e.g., the amount of energy capable of being transferred by the energy transfer system is low, a large number of vehicles requesting to transfer energy from the energy transfer system, a small number of vehicles requesting to transfer energy to the energy transfer system, etc.), then the cost may be higher. If the supply of energy is high (e.g., the amount of energy capable of being transferred by the energy transfer system is high, a small number of vehicles requesting to transfer energy from the energy transfer system, a large number of vehicles requesting to transfer energy to the energy transfer system, etc.), then the cost may be lower.

At least one cost (e.g., billable to an individual and/or entity associated with the vehicle, billable to an individual and/or entity associated with the energy transfer system, etc.) may be determined based on incentives presented to one or more parties to the transaction. For example, if the energy transfer system advertises for another party (e.g., entity, individual, etc.), directs business to the other party, etc., a cost of energy transferred to a vehicle may be lowered in exchange for a kickback (e.g., financial, exchange of services, etc.) to the energy transfer system (e.g., an entity associated therewith, an individual associated therewith, etc.) from the other party. In one embodiment, a region (e.g., 1095) of a GUI (e.g., 1000) may be used to present incentives. As another example, it may be advantageous to receive the energy at a higher energy transfer rate (e.g., an energy transfer system can accumulate a larger amount of energy more quickly that can be transferred to other vehicles for profit, the duration of the energy transfer to a vehicle can be reduced to enable use of the vehicle in a shorter amount of time, etc.), and therefore, the cost may be increased when transferred at a higher rate (e.g., an increase in the energy transfer rate may result in a larger overall cost for the energy transfer even though the same amount of energy may be transferred at both energy transfer rates).

In one embodiment, at least one cost (e.g., billable to an individual and/or entity associated with the vehicle, billable to an individual and/or entity associated with the energy transfer system, etc.) may be determined based on a user preference. For example, a user may input a preference (e.g., using region 842 of GUI 800 of FIG. 8, using region 961 of GUI 900 of FIG. 9) associated an energy transfer to a vehicle (e.g., which defines a relationship between cost and a supply of electricity, which defines a relationship between cost and a demand for electricity, etc.) may be used to determine at least one cost. As another example, a user may input a preference (e.g., using region 843 of GUI 800 of FIG. 8, using region 962 of GUI 900 of FIG. 9) associated with an energy transfer from a vehicle (e.g., which defines a relationship between cost and a supply of electricity, which defines a relationship between cost and a demand for electricity, etc.) may be used to determine at least one cost. As yet another example, a capacity level associated with an energy storage component (e.g., 216, 226, etc.) which is specified or selected by a user (e.g., using region 1050 of GUI 1000 of FIG. 10) may be used to determine at least one cost.

As shown in FIG. 6, pre-transfer processing component 620 may be used to present a user interface (e.g., GUI 1000 of FIG. 10) including at least one attribute and/or at least one cost, where the user interface may be accessed and displayed on a display device (e.g., 591 of FIG. 5, 593 of FIG. 5, 595 of FIG. 5, etc.) of a computer system (e.g., 590 of FIG. 5, 592 of FIG. 5, 594 of FIG. 5, etc.) and/or a display device (e.g., 521 of FIG. 5, 522 of FIG. 5, 523 of FIG. 5, etc.) of a vehicle (e.g., 120, 320*a*, 320*b*, 320*c*, etc.). The user interface may enable a user to make a selection associated with one or more attributes (e.g., of the at least one attribute) and/or one or more costs (e.g., of the at least one cost). For example, the user interface may enable a user to select an energy transfer to be performed in accordance with an attribute at a given cost. A request may be generated, based on the selection, to perform an energy transfer (e.g., in accordance with the one or more attributes associated with the selection) between the energy transfer system (e.g., 110) and the at least one vehicle (e.g., 120, 320*a*, 320*b*, 320*c*, etc.).

Pre-transfer processing component 620 may handle problems which occur prior to performing an energy transfer. For example, pre-transfer processing component 620 may monitor and detect a problem with an interface (e.g., a plug is not properly inserted into a receptacle to enable energy transfer and/or signal communication over the interface, etc.). In one embodiment, pre-transfer processing component 620 may request that corrective action be taken (e.g., instruct a user to properly insert the plug into the receptacle, etc.), attempt corrective action without user participation (e.g., restart or reinitialize the interface to attempt to restore energy transfer capability and/or signal communication ability to the interface, etc.), etc. Pre-transfer processing component 620 may filter one or more attributes which correspond to the problem (e.g., if the problem with an interface cannot be corrected, if the problem is not corrected by a user within a predetermined period of time after notification, etc.), where the filtering may provide one or more attributes to be displayed on a GUI (e.g., 1000) for selection by a user (e.g., to initiate an energy transfer in accordance with at least one attribute selected using the GUI).

As shown in FIG. 6, pre-transfer processing component 620 may communicate with an energy transfer system (e.g., 110) and/or a vehicle (e.g., 120, 320*a*, 320*b*, 320*c*, etc.) to increase security prior to an energy transfer. For example, pre-transfer processing component 620 may communicate information about a location and/or status of a vehicle (e.g., 120, 320a, 320b, 320c, etc.) for presentation to a user (e.g., using GUI 1000 of FIG. 10), thereby enabling a user to locate the vehicle and/or communicate its location to the authorities if the vehicle has been stolen (e.g., using region 1090 of GUI 1000 of FIG. 10). Pre-transfer processing component 620 may enable monitoring of the vehicle by, for example, processing and/or communicating image data (e.g., one or more still images, video, etc.) and/or audio data associated with a vehicle for presentation to a user (e.g., using video surveillance display region 1030 of GUI 1000, etc.). The image data may be captured using a component of the energy transfer system (e.g., camera 1321) and/or a component of the vehicle (e.g., camera 1371). The audio data may be captured using a component of the energy transfer system (e.g., microphone 1323) and/or a component of the vehicle (e.g., microphone 1373). As such, in one embodiment, image data and/or audio data captured by components of an energy transfer system may be communicated to interface system 550 for processing and/or presentation to a user. And in one embodiment, image data and/or audio data captured by components of a vehicle may be communicated to interface system 550 (e.g., directly from the vehicle to interface system 550, via energy transfer system 110, etc.) for processing and/or presentation to a user.

Figure 28:
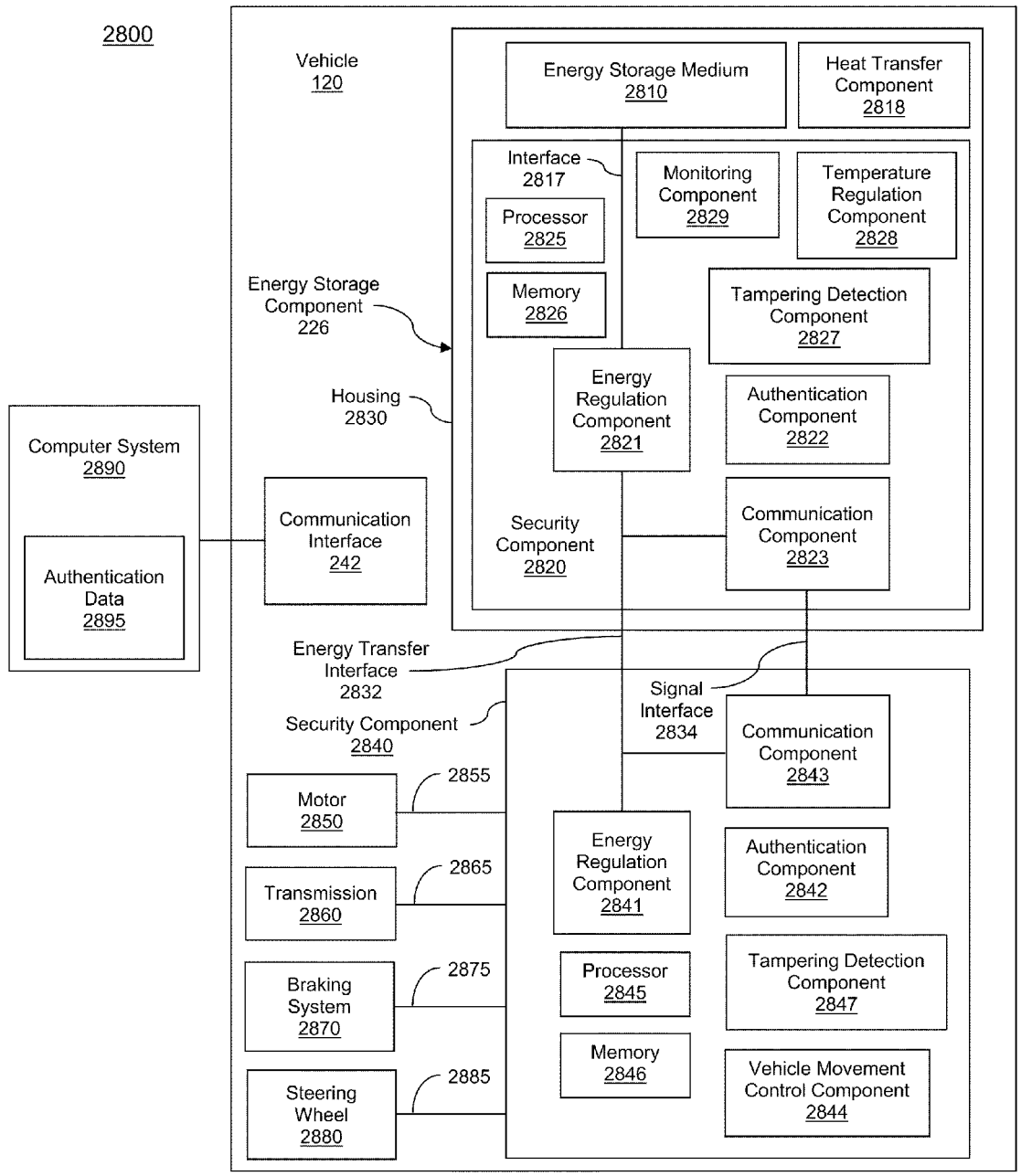
FIG. 28 shows a system for increasing the security of a vehicle and/or at least one component thereof in accordance with one embodiment of the present invention.

In one embodiment, pre-transfer processing component 620 may increase security by communicating authentication results to a user (e.g., using auxiliary display region 1095 of GUI 1000, etc.), where the authentication results may correspond to an authentication of a user (e.g., responsive to a user entering an incorrect code to attempt to charge, discharge, use, and/or move the vehicle), an authentication of one or more components of the vehicle (e.g., authentication of energy storage component 226, authentication of charge and/or discharge component 228, authentication of security component 2820 of FIG. 28, authentication of security component 2840 of FIG. 28, etc.), an authentication of one or more components of energy transfer system 110 (e.g., authentication of interface component 211, authentication of power management component 215, authentication of energy storage component 216, authentication of power source 217, authentication of charge and/or discharge component 218, etc.), some combination thereof, etc. Pre-transfer processing component 620 may enable a user to report the vehicle (e.g., 120, 320a, 320b, 320c, etc.) as stolen by, for example, receiving a request from a user to report the vehicle as stolen (e.g., responsive to an interaction with region 1090 of GUI 1000 of FIG. 10) and reporting the vehicle as stolen to the authorities (e.g. the police) based on the request.

In one embodiment, pre-transfer processing component 620 may be used to perform an authentication. For example, pre-transfer processing component 620 may be used to perform an authentication of a user to enable (e.g., if the authentication is successful) an energy transfer to a vehicle, an energy transfer from a vehicle, use of a vehicle, movement of a vehicle, some combination thereof, etc. As another example, pre-transfer processing component 620 may be used to perform an authentication of a component of a vehicle (e.g., 120) and/or of a component of an energy transfer system (e.g., 110) to enable (e.g., if the authentication is successful) communication between at least two systems (e.g., interface system 550, payment system 560, energy transfer system 110, vehicle 120, etc.), an energy transfer between an energy transfer system and a vehicle, a signal communication between an energy transfer system and a vehicle, some combination thereof, etc. In one embodiment, the authentication may be performed by pre-transfer processing component 620 alone or in combination with at least one other component (e.g., authentication component 1340 of FIG. 13, authentication component 1380 of FIG. 13, authentication component 2822 of FIG. 28, authentication component 2842 of FIG. 28, some combination thereof, etc.).

As shown in FIG. 6, energy transfer processing component 630 may perform tasks during an energy transfer between an energy transfer system (e.g., 110) and at least one vehicle (e.g., 120, 320a, 320b, 320c, etc.). For example, energy transfer processing component 630 may handle problems which occur during an energy transfer, increase security during an energy transfer, process information for an energy transfer, some combination thereof, etc.

In one embodiment, energy transfer processing component 630 may identify an interface corresponding to the problem (e.g., a plug is fully or partially removed from a receptacle during an energy transfer, the vehicle moves during an energy transfer which reduces an ability to transfer energy over an inductive interface or wireless interface, a component of an interface fails or goes offline, etc.). Energy transfer processing component 630 may determine if any interfaces remain to carry out the energy transfer. If at least one other interface is available, then energy transfer processing component 630 may adjust the energy transfer accordingly. For example, energy transfer processing component 630 may confirm the operability of one or more of the at least one interface, begin to transfer energy using an interface which was not being used to transfer energy, adjust at least one attribute of an interface which was being used to transfer energy (e.g., increase the amount of energy transferred over an interface which is already in use to accommodate the reduction in energy transferred caused by the deactivation of the interface associated with the problem, to carry out a request by a user for an increase in the energy transfer, to carry out an automated request for an increase in the energy transfer, etc.), etc. If no interfaces remain to carry out the energy transfer, then energy transfer processing component 630 may notify a user (e.g., using GUI 1000 of FIG. 10).

In one embodiment, energy transfer processing component 630 may identify an attribute of the energy transfer corresponding to the problem (e.g., energy transfer system 110 may not be able to support an energy transfer at a selected power or current due to a problem with energy transfer system 110, due to an unforeseen change in load on energy transfer system 110, etc.). Energy transfer processing component 630 may determine if any attributes remain to carry out the energy transfer. If at least one other attribute is available, then energy transfer processing component 630 may adjust the energy transfer accordingly. For example, energy transfer processing component 630 may confirm the operability of one or more of the at least one attribute, begin to transfer energy in accordance with the one or more remaining attributes, etc. In one embodiment, at least one attribute may be selected from the one or more remaining attributes, where the selection is made automatically (e.g., by energy transfer system 110, by energy transfer processing component 630, etc.) or manually (e.g., by a user via a GUI such as GUI 1000, etc.). If no attributes remain to carry out the energy transfer, then energy transfer processing component 630 may notify a user (e.g., using GUI 1000 of FIG. 10).

As shown in FIG. 6, energy transfer processing component 630 may communicate with an energy transfer system (e.g., 110) and/or a vehicle (e.g., 120, 320a, 320b, 320c, etc.) to increase security during an energy transfer. For example, energy transfer processing component 630 may communicate information about a location and/or status of a vehicle (e.g., 120, 320a, 320b, 320c, etc.) to a user (e.g., for presentation using GUI 1000 of FIG. 10), thereby enabling a user to locate the vehicle and/or communicate its location to the authorities if the vehicle has been stolen (e.g., using region 1090 of GUI 1000 of FIG. 10). Energy transfer processing component 630 may enable monitoring of the vehicle by, for example, processing and/or communicating image data (e.g., one or more still images, video, etc.) and/or audio data associated with the vehicle for presentation to a user (e.g., using video surveillance display region 1030 of GUI 1000). The image data may be captured using a component of the energy transfer system (e.g., camera 1321) and/or a component of the vehicle (e.g., camera 1371). The audio data may be captured using a component of the energy transfer system (e.g., microphone 1323) and/or a component of the vehicle (e.g., microphone 1373). As such, in one embodiment, image data and/or audio data captured by components of an energy transfer system may be communicated to interface system 550 for processing and/or presentation to a user. And in one embodiment, image data and/or audio data captured by components of a vehicle may be communicated to interface system 550 (e.g., directly from the vehicle to interface system 550, via energy transfer system 110, etc.) for processing and/or presentation to a user.

In one embodiment, energy transfer processing component 630 may increase security by communicating authentication results to a user (e.g., for presentation using auxiliary display region 1095 of GUI 1000), where the authentication results may correspond to an authentication of a user (e.g., responsive to a user entering an incorrect code to attempt to charge, discharge, use and/or move the vehicle), an authentication of one or more components of the vehicle (e.g., authentication of energy storage component 226, authentication of charge and/or discharge component 228, authentication of security component 2820 of FIG. 28, authentication of security component 2840 of FIG. 28, etc.), an authentication of one or more components of energy transfer system 110 (e.g., authentication of interface component 211, authentication of power management component 215, authentication of energy storage component 216, authentication of power source 217, authentication of charge and/or discharge component 218, etc.), some combination thereof, etc. Energy transfer processing component 630 may enable a user to report the vehicle (e.g., 120, 320*a*, 320*b*, 320*c*, etc.) as stolen by, for example, receiving a request from a user to report the vehicle as stolen (e.g., responsive to an interaction with region 1090 of GUI 1000 of FIG. 10) and communicating the request to the authorities.

Energy transfer processing component 630 may process information for an energy transfer. For example, energy transfer processing component 630 may collect and store information (e.g. in database 690), where the information may include the value or level of one or more attributes sampled at one or more times during the energy transfer. Energy transfer processing component 630 may process the stored information to determine trends, patterns, or the like for the energy transfer. In one embodiment, energy transfer processing component 630 may process the stored information by comparing data for one or more energy transfers associated with a particular vehicle (e.g., 120, 320*a*, 320*b*, 320*c*, etc.), comparing data for one or more energy transfers associated with a particular energy transfer system (e.g., 110), comparing data for one or more energy transfers associated with a particular vehicle (e.g., 120, 320*a*, 320*b*, 320*c*, etc.) against data for one or more energy transfers associated with at least one other vehicle, comparing data for one or more energy transfers associated with a particular energy transfer system (e.g., 110) against data for one or more energy transfers associated with at least one other energy transfer system, etc.

As shown in FIG. 6, post-transfer processing component 640 may perform tasks after an energy transfer between an energy transfer system (e.g., 110) and at least one vehicle (e.g., 120, 320*a*, 320*b*, 320*c*, etc.). For example, post-transfer processing component 640 may execute a payment transaction for at least one energy transfer and/or increase security after the at least one energy transfer.

In one embodiment, post-transfer processing component 640 may execute a payment transaction between two or more parties for at least one energy transfer. For example, responsive to receiving an indication that the at least one energy transfer has been concluded and/or responsive to receiving a cost for the at least one energy transfer, post-transfer processing component 640 may implement a funds transfer from a first account (e.g., held by or otherwise accessible using payment system 560 or another payment system, selected or identified by a user using region 1080 of GUI 1000, etc.) associated with a vehicle and/or at least one user thereof to a second account (e.g., held by or otherwise accessible using payment system 560 or another payment system, selected or identified by a user using region 941 of GUI 900, etc.) associated with an energy transfer system and/or at least one user thereof. As another example, responsive to receiving an indication that the at least one energy transfer has been concluded and/or responsive to receiving a cost for the at least one energy transfer, post-transfer processing component 640 may implement a funds transfer from a first account (e.g., held by or otherwise accessible using payment system 560 or another payment system, selected or identified by a user using region 941 of GUI 900, etc.) associated with an energy transfer system and/or at least one user thereof to a second account (e.g., held by or otherwise accessible using payment system 560 or another payment system, selected or identified by a user using region 1080 of GUI 1000, etc.) associated with a vehicle and/or at least one user thereof. In one embodiment, the term "payment system" (e.g., with reference to payment system 560, another payment system, etc.) as used herein may be a bank or other financial institution, a credit card company, an online payment service such as Paypal, etc.

In one embodiment, post-transfer processing component 640 may implement a funds transfer using a component of energy transfer system 110. For example, a payment interface (e.g., payment interface 1330 of FIG. 13) may be used to implement a funds transfer (e.g., alone or in combination with payment system 560, another payment system, at least one other component of the energy transfer system, at least one component of a vehicle, etc.). As another example, a dispenser (e.g., dispenser 1331 of FIG. 13) may be used to implement a funds transfer (e.g., alone or in combination with payment system 560, another payment system, at least one other component of the energy transfer system, at least one component of a vehicle, etc.).

Post-transfer processing component 640 may communicate with an energy transfer system (e.g., 110) and/or a vehicle (e.g., 120, 320*a*, 320*b*, 320*c*, etc.) to increase security after an energy transfer. For example, post-transfer processing component 640 may communicate information about a location and/or status of a vehicle (e.g., 120, 320*a*, 320*b*, 320*c*, etc.) to a user (e.g., for presentation using GUI 1000 of FIG. 10), thereby enabling a user to locate the vehicle and/or communicate its location to the authorities if the vehicle has been stolen (e.g., using region 1090 of GUI 1000 of FIG. 10). Post-transfer processing component 640 may enable monitoring of the vehicle by, for example, processing and/or communicating image data (e.g., one or more still images, video, etc.) and/or audio data associated with the vehicle for presentation to a user (e.g., using video surveillance display region 1030 of GUI 1000). The image data may be captured using a component of the energy transfer system (e.g., camera 1321)

and/or a component of the vehicle (e.g., camera 1371). The audio data may be captured using a component of the energy transfer system (e.g., microphone 1323) and/or a component of the vehicle (e.g., microphone 1373). As such, in one embodiment, image data and/or audio data captured by components of an energy transfer system may be communicated to interface system 550 for processing and/or presentation to a user. And in one embodiment, image data and/or audio data captured by components of a vehicle may be communicated to interface system 550 (e.g., directly from the vehicle to interface system 550, via energy transfer system 110, etc.) for processing and/or presentation to a user.

In one embodiment, post-transfer processing component 640 may increase security by communicating authentication results to a user (e.g., using GUI 1000 of FIG. 10, using auxiliary display region 1095 of GUI 1000, etc.), where the authentication results may correspond to an authentication of a user (e.g., responsive to a user entering an incorrect code to attempt to charge, discharge, use, and/or move the vehicle), an authentication of one or more components of the vehicle (e.g., authentication of energy storage component 226, authentication of charge and/or discharge component 228, authentication of security component 2820 of FIG. 28, authentication of security component 2840 of FIG. 28, etc.), an authentication of one or more components of energy transfer system 110 (e.g., authentication of interface component 211, authentication of power management component 215, authentication of energy storage component 216, authentication of power source 217, authentication of charge and/or discharge component 218, etc.), some combination thereof, etc. Post-transfer processing component 640 may enable a user to report the vehicle (e.g., 120, 320*a*, 320*b*, 320*c*, etc.) as stolen by, for example, receiving a request from a user to report the vehicle as stolen (e.g., responsive to an interaction with region 1090 of GUI 1000 of FIG. 10) and communicating the request to the authorities.

In one embodiment, post-transfer processing component 640 may implement a securing of one or more energy transfer interfaces after the energy transfer. After the one or more energy transfer interfaces are secured, an authentication procedure (e.g., an authentication of a user, an authentication of a component of an energy transfer system, an authentication of a component of a vehicle, some combination thereof, etc.) may be conducted (e.g., using pre-transfer processing component 620, authentication component 1340 of FIG. 13, authentication component 1380 of FIG. 13, authentication component 2822 of FIG. 28, authentication component 2842 of FIG. 28, some combination thereof, etc.) to enable (e.g., if the authentication is successful) communication between at least two systems (e.g., interface system 550, payment system 560, energy transfer system 110, vehicle 120, etc.), an energy transfer between a vehicle and an energy transfer system, communication of signals between a vehicle and an energy transfer system, movement and/or use of a vehicle, some combination thereof, etc. In this manner, post-transfer processing component 640 may increase vehicle security.

In one embodiment, registration component 610 may access, generate, process and/or communicate any information presented using GUI 800 of FIG. 8 and/or GUI 900 of FIG. 9. Pre-transfer processing component 620 may access, generate, process and/or communicate any information presented using GUI 1000 of FIG. 10 in one embodiment. In one embodiment, energy transfer processing component 630 may access, generate, process and/or communicate any information presented using GUI 1000 of FIG. 10 in one embodiment. Post-transfer processing component 640 may access, generate, process and/or communicate any information presented using GUI 1000 of FIG. 10 in one embodiment.

As shown in FIGS. 5 and 6, interface system 550 may increase security by reducing unauthorized access to information about an energy transfer system (e.g., 110) and/or a vehicle (e.g., 120, 320*a*, 320*b*, 320*c*, etc.). For example, information associated with an energy transfer system (e.g., 110) and/or a vehicle (e.g., 120, 320*a*, 320*b*, 320*c*, etc.) may be communicated to interface system 550 (e.g., registration component 610) in a secure manner (e.g., using a secure socket layer (SSL), using secure HTTP (HTTPS), using a VPN, using encryption, etc.), where interface system 550 can store the information (e.g., in database 650, 660, 665, 670, 675, 680, 690, etc.) in a secure manner (e.g., limiting access by other systems to the information, encrypting the information, etc.). In one embodiment, one or more communications between interface system 550 and an external system (e.g., payment system 560) may be conducted in a secure manner (e.g., using a secure socket layer (SSL), using secure HTTP (HTTPS), using a VPN, using encryption, etc.). In one embodiment, interface system 550 may advantageously enable an energy transfer to be setup and performed where only less-secure information (e.g., a vehicle identifier, a license plate number, an energy transfer system identifier, etc.) is communicated between a vehicle (e.g., 120, 320*a*, 320*b*, 320*c*, etc.) and an energy transfer system (e.g., 110), thereby further increasing security by reducing access to more secure information (e.g., managed, processed, stored, etc. by interface system 550).

In one embodiment, interface system 550 may enable an energy transfer system (e.g., 110) to more efficiently and conveniently perform an energy transfer with one or more vehicles (e.g., 120, 320*a*, 320*b*, 320*c*, etc.). For example, interface system 550 may coordinate an energy transfer between an energy transfer system and a vehicle regardless of the type of vehicle (e.g., make of vehicle, model of vehicle, year of manufacture of the vehicle, user modifications to the vehicle, etc.), the type of energy transfer interface or energy transfer interfaces used by the vehicle, the number of energy transfer interfaces used by the vehicle, etc. Interface system 550 may handle one or more aspects of the transaction (e.g., contacting a user of the vehicle, presenting one or more energy transfer options to the user, initiating the energy transfer based on a user selection of at least one of the options, communicating notifications to the user, handling or assisting in the handling of problems encountered during the energy transfer, collecting payment from the user, sending payment to the user, some combination thereof, etc.), thereby reducing the work or number of tasks performed by the energy transfer system (or a user of the energy transfer system) to conduct one or more energy transfers. In one embodiment, interface system 550 may communicate with a user (e.g., of the vehicle) who is not physically present at the vehicle and/or not physically present at the energy transfer system, thereby enabling an energy transfer to be setup and initiated regardless of the location of the user (e.g., of the vehicle).

Although FIG. 5 shows only one energy transfer system (e.g., 110), it should be appreciated that system 500 may include more than one energy transfer system in other embodiments. Although FIG. 5 shows only three vehicles (e.g., 320*a*, 320*b*, and 320*c*) and three computer systems (e.g., 590, 592, and 594), it should be appreciated that system 500 may include any number of vehicles and/or any number of computer systems in other embodiments. In one embodiment, two or more components of system 500 may be combined (e.g., interface system 550 may be incorporated, either in whole or in part, within energy transfer system 110, etc.), a component of system 500 may be separated into multiple components, some combination thereof, etc. It should also be appreciated that the components depicted in FIG. 5 may be arranged differently (e.g., a sub-component of one component may be a sub-component of another component, a sub-component of a component may exist outside the component as another component, a component may be a sub-component of another component, etc.) in other embodiments.

Although FIG. 6 shows only four processing components (e.g., registration component 610, pre-transfer processing component 620, energy transfer processing component 630, and post-transfer processing component 640), it should be appreciated that interface system 550 may include any number of processing components in other embodiments. Although FIG. 6 shows only seven memories or databases (e.g., 650, 660, 665, 670, 675, 680, and 690), it should be appreciated that interface system 550 may include any number of memories or databases in other embodiments. In one embodiment, two or more components of interface system 550 may be combined, a component of interface system 550 may be separated into multiple components, some combination thereof, etc. It should also be appreciated that the components depicted in FIG. 6 may be arranged differently (e.g., a sub-component of one component may be a sub-component of another component, a sub-component of a component may exist outside the component as another component, a component may be a sub-component of another component, etc.) in other embodiments.

Figure 7:
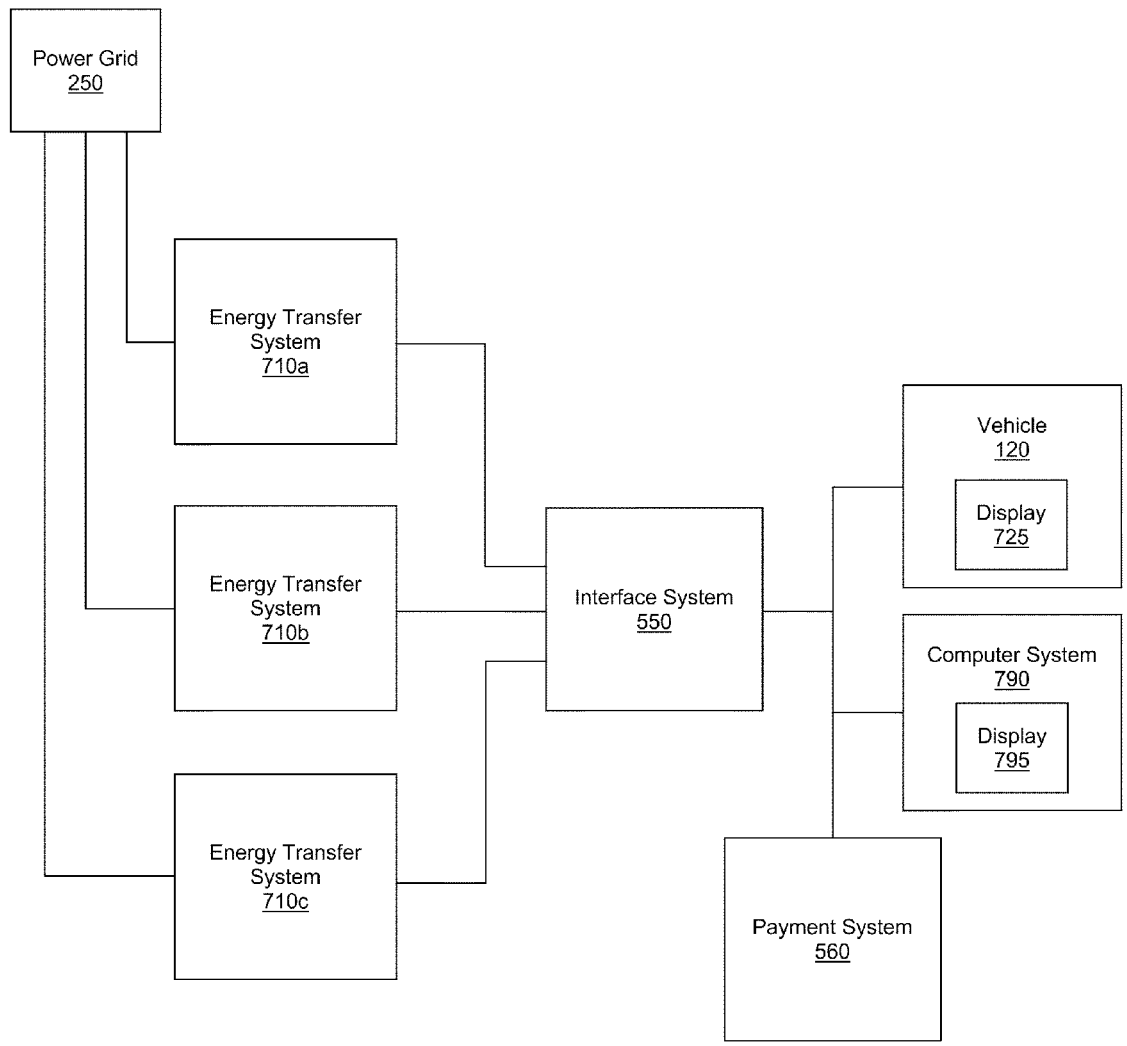
FIG. 7 shows a system for enabling a vehicle to interface with any number of a plurality of energy transfer systems in accordance with one embodiment of the present invention.

FIG. 7 shows system 700 for enabling a vehicle to interface with any number of a plurality of energy transfer systems in accordance with one embodiment of the present invention. As shown in FIG. 7, interface system 550 may communicate with a vehicle (e.g., 120), a computer system (e.g., 790), an energy transfer system (e.g., 710a, 710b, 710c, etc.), a payment system (e.g., 560), some combination thereof, etc. In one embodiment, computer system 790 may be associated with (e.g., owned by the same entity or individual as, etc.) vehicle 120, where computer system 790 and vehicle 120 may be located in the same location or located remotely from one another. One or more of the energy transfer systems of system 700 (e.g., energy transfer system 710a, energy transfer system 710b, energy transfer system 710c, etc.) may be implemented in accordance with (e.g., include components of, function similarly to, etc.) energy transfer system 110 in one embodiment. Computer system 790 may be implemented in accordance with (e.g., include components of, function similarly to, etc.) computer system 4100 of FIG. 41 in one embodiment. Each display of system 700 (e.g., 725, 795, etc.) may be implemented in accordance with (e.g., include components of, function similarly to, etc.) output component 4190 of FIG. 41 in one embodiment. And in one embodiment, each display of system 700 (e.g., 725, 795, etc.) may be any device capable of displaying an image such as a liquid crystal display (LED), light emitting diode (LED) display, organic light emitting diode (OLED) display, plasma display, cathode ray tube (CRT) display, projector, etc.

The energy transfer systems of system 700 (e.g., 710a, 710b, 710c, etc.) may be located near one another in one embodiment. Alternatively, at least one of the energy transfer systems may be remotely located from at least one other energy transfer system. In one embodiment, the energy transfer systems of system 700 (e.g., 710a, 710b, 710c, etc.) may be associated with or owned by the same user (e.g. an organization or business, an individual, an owner, a lessee, an attendant, etc.). Alternatively, at least one of the energy transfer systems may be associated with or owned by a user (e.g., an organization or business, an individual, an owner, a lessee, an attendant, etc.) which is different from that of at least one other energy transfer system.

As shown in FIG. 7, interface system 550 may be used to present a user interface (e.g., GUI 1000 of FIG. 10) which provides a consistent "look and feel" and/or user experience across any number of different energy transfer systems (e.g., 110, 710a, 710b, 710c, etc.). For example, a user interface presented to enable an energy transfer with a first energy transfer system may use regions, an arrangement of the regions, a theme, colors, etc. that are similar to that of a user interface presented to enable an energy transfer with a second energy transfer system. In one embodiment, the user (e.g., an organization or business, an individual, an owner, a lessee, an attendant, etc.) associated with the energy transfer system may be hidden or not displayed. As another example, a user interface presented to enable an energy transfer with a first energy transfer system may provide a user experience (e.g., associated with a response of the user interface to a user interaction, associated with navigation through a menu hierarchy of the user interface, etc.) that is similar to that of a user interface presented to enable an energy transfer with a second energy transfer system. As such, confusion, frustration, and the like associated with setting up, conducting, paying for, etc. an energy transfer can be reduced (e.g., since the number of user interface configurations that a user has to learn and/or become familiar with is reduced). Additionally, by providing user interfaces that look and/or function similarly, embodiments of the present invention can increase sales and/or revenue (e.g., by establishing brand loyalty, by providing users with a product and/or service that the user is familiar with, etc.).

In one embodiment, interface system 550 may be used to present a user interface (e.g., GUI 1000 of FIG. 10) which provides a more standardized presentation of terms for energy transfers performed with different energy transfer systems (e.g., 110, 710a, 710b, 710c, etc.). For example, the arrangement of attributes associated with different energy transfers can be similar from one user interface (e.g., associated with one energy transfer system) to another user interface (e.g., associated with another energy transfer system). As another example, the relationship between a cost and another attribute (e.g., an energy transfer rate, a quantity of energy, etc.) can be indicated in a similar fashion (e.g., by consistently arranging costs associated with one attribute with respect to costs associated with another attribute, by consistently labeling costs associated with each type of attribute, etc.) from one user interface (e.g., associated with one energy transfer system) to another user interface (e.g., associated with another energy transfer system). As yet another example, the units for the attributes associated with different energy transfers can be similar from one user interface (e.g., associated with one energy transfer system) to another user interface (e.g., associated with another energy transfer system). In this manner, confusion with respect to terms associated with an energy transfer can be reduced, thereby resulting in increased sales and/or revenue.

In one embodiment, communications between a vehicle (e.g., 120, 320a, 320b, 320c, etc.) and an external system may be sent over a cellular network (e.g., cellular data network, cellular phone network, etc.) using a component of the vehicle (e.g., communication interface 242). For example, communication interface 242 may be used to transmit and receive communications over a cellular network with an external system, where the external system may be an energy transfer system (e.g., 110, 710a, 710b, 710c, etc.), an interface system (e.g., 550), a payment system (e.g., 560), etc.

In one embodiment, communications between a vehicle (e.g., 120, 320*a*, 320*b*, 320*c*, etc.) and an external system may be sent over a cellular network (e.g., cellular data network, cellular phone network, etc.) using a computer system (e.g., 790, 590, 592, 594, etc.) disposed in proximity to or within the vehicle. For example, a communication from the vehicle may be sent over an interface (e.g., a wired interface, a wireless interface which operates in accordance with a wireless standard such as 802.11x, Bluetooth, etc.) to a computer system (e.g., 790, 590, 592, 594, etc.), where the computer system may then transmit the communication to the external system using a cellular network. As another example, a communication may be sent to a computer system (e.g., 790, 590, 592, 594, etc.) over a cellular network, where the computer system may then transmit the communication to the vehicle over an interface (e.g., a wired interface, a wireless interface which operates in accordance with a wireless standard such as 802.11x, Bluetooth, etc.). In one embodiment, access to the cellular network may be granted or enabled by an application executed by the computer system (e.g., 790, 590, 592, 594, etc.), where the application may be used to register a vehicle (e.g., by causing GUI 900 of FIG. 9 to be rendered on a display device of the computer system), select and/or initiate an energy transfer with the vehicle (e.g., by causing GUI 1000 of FIG. 10 to be rendered on a display device of the computer system), some combination thereof, etc. In this manner, embodiments can increase connectivity with a vehicle, reduce cost associated with vehicle communication (e.g., by utilizing an existing communication network, by enabling communication without the installation or utilization of additional communication components such as cellular transmitters or cellular receivers, etc.), increase the bandwidth of other vehicle communication interfaces by offloading data communication to a cellular network, etc.

Although FIG. 7 shows only three energy transfer systems (e.g., 710*a*, 710*b*, and 710*c*), it should be appreciated that system 700 may include any number of energy transfer systems in other embodiments. Although FIG. 7 shows only one vehicle (e.g., 120) and one computer system (e.g., 790), it should be appreciated that system 700 may include any number of vehicles and/or any number of computer systems in other embodiments. In one embodiment, two or more components of system 700 may be combined, a component of system 700 may be separated into multiple components, some combination thereof, etc. It should also be appreciated that the components depicted in FIG. 7 may be arranged differently (e.g., a sub-component of one component may be a sub-component of another component, a sub-component of a component may exist outside the component as another component, a component may be a sub-component of another component, etc.) in other embodiments.

FIG. 8 shows graphical user interface 800 for registering an energy transfer system in accordance with one embodiment of the present invention. As shown in FIG. 8, GUI 800 enables a user to communicate information used to register an energy transfer system (e.g., 110, 710*a*, 710*b*, 710*c*, etc.) and/or configure features of the energy transfer system. GUI 800 can be displayed on a display device (e.g., 511) of an energy transfer system (e.g., 110), a display device (e.g., 571, 591, 593, 595, etc.) of a computer system (e.g., 570, 590, 592, 594, etc.), a display device of a vehicle (e.g., display 725, display 521, display 522, display 523, etc.), another display device, etc. Information collected using GUI 800 may be communicated (e.g., to registration component 610 of interface system 550) in a secure manner (e.g., using a secure socket layer (SSL), using secure HTTP (HTTPS), using a VPN, using encryption, etc.). And in one embodiment, the information may be communicated responsive to an interaction (e.g., a touch of a touch screen, a click of a mouse, a depression of a physical button, etc.) associated with region 805 of GUI 800.

As shown in FIG. 8, GUI 800 may enable input of information associated with an energy transfer system (e.g., 110, 710*a*, 710*b*, 710*c*, etc.). For example, region 810 may be used to input a name associated with a user (e.g., an organization or business, an individual, an owner, a lessee, an attendant, etc.) of the energy transfer system, region 811 may be used to input an address associated with the user, region 812 may be used to input a phone number associated with the user, and region 813 may be used to input an email address associated with the user. Region 814 may be used to input a name of an organization or business associated with the user.

GUI 800 may enable input of authentication information (e.g., credentials) associated with an energy transfer system (e.g., 110, 710*a*, 710*b*, 710*c*, etc.). For example, region 830 may be used to input a username. Region 831 may be used to input a password. In one embodiment, the authentication information (e.g., entered using regions 830 and 831) may be used to perform an authentication of the energy transfer system (or a user of the energy transfer system) to enable (e.g., if the authentication is successful) communication with another system (e.g., interface system 550, payment system 560, vehicle 120, etc.), an energy transfer between the energy transfer system and a vehicle, communication of signals between the energy transfer system and a vehicle, some combination thereof, etc. The authentication information may be used to gain access to GUI 800 to make changes to a configuration of an energy transfer system or further configure an energy transfer system in one embodiment. And in one embodiment, authentication using information entered using GUI 800 (e.g., region 830, region 831, etc.) may be performed by a component of a vehicle (e.g., authentication component 1380 of FIG. 13, authentication component 2822 of FIG. 28, authentication component 2842 of FIG. 28, etc.), a component of an energy transfer system (e.g., authentication component 1340 of FIG. 13, etc.), a component of interface system 550 (e.g., pre-transfer processing component 620, energy transfer processing component 630, post-transfer processing component 640, etc.), some combination thereof, etc.

As shown in FIG. 8, GUI 800 (e.g., any of regions 840 to 855) may enable input of information used to configure an energy transfer system (e.g., 110, 710*a*, 710*b*, 710*c*, etc.) to perform an energy transfer (e.g., with one or more vehicles such as vehicle 120, 320*a*, 320*b*, 320*c*, etc.). In one embodiment, region 840 may be used to define one or more sets of components (e.g., 410, 420, 430, etc.) associated with the energy transfer system. For example, region 840 may be used to input a number of the sets of components, a name for each set of components, a location of each set of components, etc.

Region 841 may be used to input or configure one or more attributes (e.g., an energy transfer type, an interface type, a power, a current, a voltage, an energy transfer profile, a duration, a waveform, a temperature, etc.) associated with an energy transfer performed by the energy transfer system, where the attributes may be configured for the energy transfer system as a whole, for each set of components defined using region 840, for a plurality of components, for individual components, etc. For example, region 841 may be used to define a minimum value of an attribute (e.g., such that an energy transfer below the minimum value of the attribute will not be performed, energy transfers below the minimum value of the attribute will not be displayed for selection by a user on GUI 1000 of FIG. 10, etc.) and/or a maximum value of an attribute (e.g., such that an energy transfer above the maximum value of the attribute will not be performed, energy transfers above the maximum value of the attribute will not be displayed for selection by a user on GUI 1000 of FIG. 10, etc.). As another example, region 841 may be used to specify specific values for one or more attributes (e.g., at least one specific energy transfer rate, at least one specific voltage, etc.), where specified values of the one or more attributes may be used to form a list of energy transfers (e.g., to be displayed for selection by a user on GUI 1000, etc.).

In one embodiment, region 841 may be used to configure one or more attributes based on a variation in supply of energy. The supply of energy may be determined based upon a state of an energy transfer system (e.g., 110), where the state may include a remaining capacity of the energy transfer system to transfer energy (e.g., measured in units of a current, power, etc.). In one embodiment, the remaining capacity of the energy transfer system to transfer energy may be calculated by subtracting a current energy transfer rate of energy transferred to the energy transfer system (e.g., from power grid 250) from a maximum energy transfer rate of energy transferred to the energy transfer system (e.g., determined by power grid 250, a utility supplying power to the energy transfer system, a rating of an electrical service entrance supplying energy to the energy transfer system, a local building code, etc.) and then adding the result to a cumulative energy transfer rate (if any exists) supplied by components of the energy transfer system (e.g., energy storage component 216, power source 217, etc.) and/or supplied by one or more vehicles (e.g., 120, 320a, 320b, 320c, etc.). For example, region 841 may be used to define a first configuration (e.g., a value, range of values, etc.) of one or more attributes for a first supply level and a second configuration (e.g., a value, range of values, etc.) of one or more attributes for a second supply level. As such, in one embodiment, higher energy transfer rates may be excluded or prevented as the capacity of the energy transfer system to transfer energy decreases (e.g., as more vehicles request or receive energy from the energy transfer system).

Region 841 may be used to configure one or more attributes based on a variation in demand for energy. The demand for energy may be determined based upon a number of vehicles requesting or performing an energy transfer with the energy transfer system, an amount of energy being requested or transferred from the energy transfer system at a particular time, etc. For example, region 841 may be used to define a first configuration (e.g., a value, range of values, etc.) of one or more attributes for a first demand level and a second configuration (e.g., a value, range of values, etc.) of one or more attributes for a second demand level. As such, in one embodiment, lower energy transfer rates may be excluded or prevented as the capacity of the energy transfer system to transfer energy increases (e.g., as fewer vehicles request or receive energy from the energy transfer system).

As shown in FIG. 8, region 842 may be used to input information for configuring one or more costs associated with a charge (e.g., a transfer of energy from the energy transfer system to one or more vehicles). For example, a minimum cost and/or maximum cost may be defined using region 842, where the minimum cost and/or maximum cost may be associated with a total cost for a charge, an energy transfer rate cost, an energy transfer profile cost, some combination thereof, etc. As another example, costs for one or more charges may be defined based upon an ability of an energy transfer system (e.g., 110) to supply energy and/or a demand for energy from the energy transfer system. In one embodiment, the relationship between cost (e.g., associated with at least one charge) and supply may be input using an interactive feature (e.g., a table, graph, pie chart, or the like) displayed in region 842. The relationship between cost (e.g., associated with at least one charge) and demand may be input using an interactive feature (e.g., a table, graph, pie chart, or the like) displayed in region 842 in one embodiment. Accordingly, costs for a charge may be conveniently, efficiently and/or effectively configured using region 842.

Region 843 may be used to input information for configuring one or more costs associated with a discharge (e.g., a transfer of energy to the energy transfer system from one or more vehicles). For example, a minimum cost and/or maximum cost may be defined using region 843, where the minimum cost and/or maximum cost may be associated with a total cost for a discharge, an energy transfer rate cost, an energy transfer profile cost, some combination thereof, etc. As another example, costs for one or more discharges may be defined based upon an ability of a vehicle (e.g., 120, 320a, 320b, 320c, etc.) to supply energy and/or a demand for energy from the vehicle. In one embodiment, the relationship between cost (e.g., associated with at least one discharge) and supply may be input using an interactive feature (e.g., a table, graph, pie chart, or the like) displayed in region 843. The relationship between cost (e.g., associated with at least one discharge) and demand may be input using an interactive feature (e.g., a table, graph, pie chart, or the like) displayed in region 843 in one embodiment. Accordingly, costs for a discharge may be conveniently, efficiently and/or effectively configured using region 843.

As shown in FIG. 8, region 844 may be used to configure one or more wired interfaces (e.g., interface 231), region 845 may be used to configure one or more inductive interfaces (e.g., 234), and region 846 may be used to configure one or more wireless interfaces (e.g., 237). For example, regions 844, 845, and/or 846 may be used to change a state of an interface (e.g., enabled, disabled, etc.), configure interface-specific attributes, configure problem resolution options (e.g., notify a user if a plug is not connected properly, instruct a user to relocate vehicle if energy transfer components are misaligned, use an alternative interface if a problem occurs with an interface, etc.), etc.

Region 847 may be used to configure charges and/or discharges between the energy transfer system and one or more vehicles. For example, region 847 may be used to specify a chronological ordering of one or more charges and/or one or more discharges. Region 847 may be used to enable and/or disable a charge, enable and/or disable a discharge, etc. Region 847 may be used to configure how the energy transfer system adapts to an addition of one or more vehicles (e.g., the energy transfer rate for at least one vehicle is lowered to enable an energy transfer to the additional vehicle or vehicles, etc.) and/or a removal of one of more vehicles (e.g., the energy transfer rate for at least one vehicle is increased after at least one energy transfer with at least one vehicle is completed, etc.).

As shown in FIG. 8, region 848 may be used to configure a power management component (e.g., 215) of an energy transfer system (e.g., 110). For example, region 848 may be used to define where energy is sourced from (e.g., a component of energy transfer system 110, a component of vehicle 120, power grid 250, another component coupled to energy transfer system 110 and/or vehicle 120, etc.) and/or where energy is supplied to (e.g., a component of energy transfer system 110, a component of vehicle 120, power grid 250, another component coupled to energy transfer system 110 and/or vehicle 120, etc.). Region 848 may be used to define how simultaneous (or contemporaneous) transfers of energy are handled (e.g., by power management component 215) and/or how sequential transfers of energy are handled (e.g., by power management component 215).

Region 850 may be used to configure signal communication of an energy transfer system (e.g., 110). In one embodiment, region 850 may be used to define how signals are communicated between the energy transfer system and an external system (e.g., interface system 550, one or more vehicles, a computer system such as computer system 570, etc.). For example, region 850 may be used to define which interfaces are used to communicate signals (e.g., using a signal interface such as interface 134, using an energy transfer interface such as energy transfer interface 231, 234, 237, etc.), how the signals are communicated over each type of interface (e.g., by configuring components used to communicate signals such as communication interface 241, signal communication component 214, power management component 215, etc.), etc. As another example, region 850 may be used to define parameters or attributes of signal communication (e.g., techniques used to secure data, a bandwidth, a data rate, jitter reduction techniques, synchronization techniques, error correction, etc.).

Region 850 may be used to define how signals are communicated within the energy transfer system (e.g., between communication interface 241 and power management component 215, between signal communication component 214 and power management component 215, etc.). For example, region 850 may be used to define which interfaces are used to communicate signals (e.g., using an energy transfer interface, using a separate signal communication interface, etc.) within the energy transfer system, how the signals are communicated over each type of interface (e.g., by configuring components used to communicate signals such as communication interface 241, signal communication component 214, power management component 215, etc.), etc. As another example, region 850 may be used to define parameters or attributes of signal communication (e.g., techniques used to secure data, a bandwidth, a data rate, jitter reduction techniques, synchronization techniques, error correction, etc.) within the energy transfer system.

Figure 13:
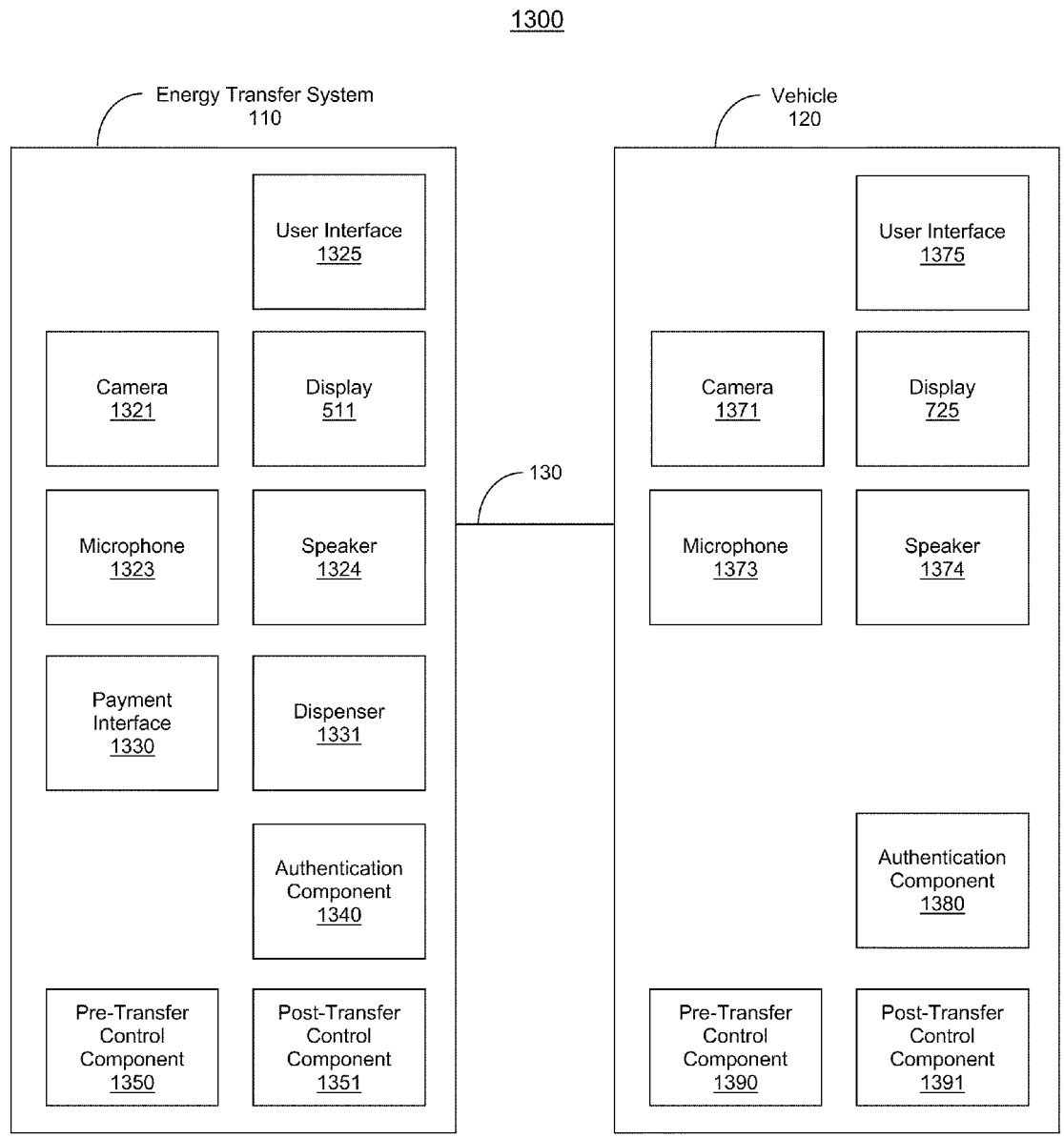
FIG. 13 shows a system including components used to perform operations associated with an energy transfer in accordance with one embodiment of the present invention.

As shown in FIG. 8, region 851 may be used to configure surveillance associated with an energy transfer system (e.g., 110), where the surveillance may utilize at least one component of an energy transfer system (e.g., camera 1321 of FIG. 13, microphone 1323 of FIG. 13, etc.) and/or at least one component of a vehicle (e.g., camera 1371 of FIG. 13, microphone 1373 of FIG. 13, etc.). For example, the type of surveillance (e.g., using images, video, sound, some combination thereof, etc.) may be defined using region 851. Region 851 may be used to configure parameters or attributes of the surveillance (e.g., a frame rate of the video, a resolution of an image or video, an encoding format of the video, an encoding format of the sound, etc.). And in one embodiment, the state of the surveillance (e.g., enabled, disabled, whether or not to communicate the captured data to a user, etc.) may be changed or configured using region 851.

Region 852 may be used to configure a display of an energy transfer system (e.g., display device 511). For example, region 852 may be used to configure a state (e.g., enabled, disabled, etc.) of the display. A parameter or attribute of the display (e.g., a brightness, contrast, automatic dimming or powering off of the display after a predetermined time, etc.) may be configured using region 852. Region 852 may also be used to configure a parameter or attribute of a touch screen (e.g., sensitivity, x and y position calibration, etc.) corresponding to (e.g., overlaying) the display.

As shown in FIG. 8, region 853 may be used to configure sound output (e.g., from speaker 1324 of FIG. 13) and/or sound input (e.g., to microphone 1323 of FIG. 13) of an energy transfer system. For example, region 853 may be used to configure a state (e.g., enabled, disabled, etc.) of the sound output and/or sound input. A parameter or attribute of the sound (e.g., an encoding format, a volume, a sensitivity of the microphone, etc.) may be configured using region 853.

Region 854 may be used to configure a payment interface (e.g., 1330 of FIG. 13) of an energy transfer system (e.g., 110). For example, region 854 may be used to configure a state (e.g., enabled, disabled, etc.) of the payment interface. A parameter or attribute of the payment interface (e.g., a type of credit card that the payment interface will accept, a denomination of currency that the payment interface will accept, a type of gift card that the payment interface will accept, etc.) may be configured using region 854.

As shown in FIG. 8, region 855 may be used to configure a dispenser (e.g., 1331 of FIG. 13) of an energy transfer system (e.g., 110). For example, region 855 may be used to configure a state (e.g., enabled, disabled, etc.) of the dispenser. A parameter or attribute of the dispenser (e.g., a denomination of currency that the dispenser will output, information about a gift card that the dispenser will output, information about a coupon that the dispenser will output, etc.) may be configured using region 855.

In one embodiment, each of the regions (e.g., 805, 810, 811, 812, 813, 814, 830, 831, 840, 841, 842, 843, 844, 845, 846, 847, 848, 850, 851, 852, 853, 854, 855, etc.) of GUI 800 may be a field enabling entry of at least one character, a radio button, a menu, drop-down menu, an interactive image (e.g., enabling a user to make a selection using the image, modify the image, etc.), or any other element enabling the input of information.

Although FIG. 8 has been described with respect to the entry of particular information, it should be appreciated that GUI 800 may enable the entry of different information in other embodiments. Additionally, although FIG. 8 shows a specific number of regions, it should be appreciated that GUI 800 may include any number of regions in other embodiments. Further, it should be appreciated that information entered using GUI 800 may be entered into a smaller number of regions (e.g., two or more types of information may be entered into the same region) in other embodiments.

FIG. 9 shows graphical user interface 900 for registering a vehicle in accordance with one embodiment of the present invention. As shown in FIG. 9, GUI 900 enables a user to input information used to register a vehicle (e.g., 120, 320a, 320b, 320c, etc.) and/or configure features of the vehicle. GUI 900 can be displayed on a display device (e.g., 725, 521, 522, 523, etc.) of a vehicle (e.g., 120, 320a, 320b, 320c, etc.), a display device (e.g., 795, 591, 593, 595, etc.) of a computer system (e.g., 790, 590, 592, 594, etc.), a display device of an energy transfer system (e.g., 511, etc.), another display device, etc. Information collected using GUI 900 may be communicated (e.g., to registration component 610 of interface system 550) in a secure manner (e.g., using a secure socket layer (SSL), using secure HTTP (HTTPS), using a VPN, using encryption, etc.). And in one embodiment, the information may be communicated responsive to an interaction (e.g., a touch of a touch screen, a click of a mouse, a depression of a physical button, etc.) associated with region 905 of GUI 900.

As shown in FIG. 9, GUI 900 may enable input of information associated with a vehicle (e.g., 120, 320a, 320b, 320c, etc.). For example, region 910 may be used to input a name associated with a user (e.g., an organization or business, an individual, an owner, a lessee, an attendant, etc.) of the vehicle, region 911 may be used to input an address associated with the user, region 912 may be used to input a phone number associated with the user, and region 913 may be used to input an email address associated with the user. Region 920 may enable input of a year of the vehicle, region 921 may enable input of a make of the vehicle, and region 922 may enable input of a model of the vehicle.

GUI 900 may enable input of authentication information (e.g., credentials) associated with a vehicle (e.g., 120, 320a, 320b, 320c, etc.). For example, region 930 may be used to input a username. Region 931 may be used to input a password. In one embodiment, the authentication information (e.g., entered using regions 930 and 931) may be used to perform an authentication of the vehicle (or a user of the vehicle) to enable (e.g., if the authentication is successful) communication with another system (e.g., interface system 550, payment system 560, energy transfer system 110, etc.), an energy transfer between the vehicle and an energy transfer system, communication of signals between the vehicle and an energy transfer system, some combination thereof, etc. The authentication information may be used to gain access to GUI 900 to make changes to a configuration of a vehicle or further configure a vehicle in one embodiment. And in one embodiment, authentication using information entered using GUI 900 (e.g., region 930, 931, etc.) may be performed by a component of a vehicle (e.g., authentication component 1380 of FIG. 13, authentication component 2822 of FIG. 28, authentication component 2842 of FIG. 28, etc.), a component of an energy transfer system (e.g., authentication component 1340 of FIG. 13, etc.), a component of interface system 550 (e.g., pre-transfer processing component 620, energy transfer processing component 630, post-transfer processing component 640, etc.), some combination thereof, etc.

As shown in FIG. 9, region 940 enables input of a code for use in authenticating a user of the vehicle. For example, a code entered using region 940 may enable authentication of a user attempting to transfer energy to the vehicle, transfer energy from the vehicle, use the vehicle, move the vehicle, etc. In one embodiment, the code entered using region 940 may be compared to a code entered at a later time (e.g., using region 1040 of GUI 1000 of FIG. 10) to determine if a user is authorized to perform an energy transfer to and/or from the vehicle. The code entered using region 940 may be compared to a code entered at a later time (e.g., using region 1040 of GUI 1000 of FIG. 10) to determine if a user is authorized to use and/or move the vehicle. In this manner, embodiments of the present invention can improve vehicle security.

Region 941 may enable information associated with a payment system (e.g., 560) to be entered. For example, a user may use region 941 to indicate a payment system (e.g., a name, website, etc.), to enter authentication information (e.g., username, password, etc.) associated with the payment system, to enter other information (e.g., account number, credit card number, etc.) used to execute a transaction with the payment system, etc. In one embodiment, entry of information using region 941 may enable more efficient payment for an energy transfer (e.g., as a user need not re-enter payment information for each energy transfer).

Region 950 may enable configuration of a graphical user interface (e.g., GUI 1000 of FIG. 10) associated with an energy transfer to and/or from a vehicle. For example, region 950 may enable the appearance or "look and feel" of the user interface (e.g., the number of regions, an arrangement of the regions, a theme, colors, etc.) to be changed. Region 950 may enable the user experience of the user interface (e.g., associated with a response of the user interface to a user interaction, associated with navigation through a menu hierarchy of the user interface, etc.) to be changed in one embodiment.

As shown in FIG. 9, region 951 may enable configuration of a presentation of a graphical user interface (e.g., GUI 1000 of FIG. 10) associated with an energy transfer to and/or from a vehicle. For example, a display device or location at which the user interface is presented (e.g., a display device of a vehicle such as display device 725, a display device of a computer system such as display device 795, etc.) may be configured using region 951. Region 951 may also enable the time at which the user interface is presented (e.g., responsive to the vehicle stopping, responsive to the vehicle shutting off, responsive to a determination of at least one interface capable of transferring energy from and/or to the vehicle, etc.) to be configured.

Region 952 may be used to configure email notifications associated with an energy transfer to and/or from a vehicle. For example, region 952 may be used to enable and/or disable notifications sent via email. Region 952 may be used to specify at least one email address to which notifications can be sent.

As shown in FIG. 9, region 953 may be used to configure notifications sent via text (e.g., short messaging service text messages, multimedia messaging service text messages, etc.) associated with an energy transfer to and/or from a vehicle. For example, region 953 may be used to enable and/or disable notifications sent via text. Region 953 may be used to specify at least one location (e.g., a phone number, a portable electronic device, etc.) to which notifications may be sent.

Region 954 may be used to configure notifications sent via phone (e.g., as an automated call communicating the notification using sound) associated with an energy transfer to and/or from a vehicle. For example, region 954 may be used to enable and/or disable notifications sent via phone. Region 954 may be used to specify at least one recipient (e.g., a phone number, a portable electronic device, etc.) to which notifications may be sent.

As shown in FIG. 9, region 960 may be used to input or configure one or more attributes (e.g., an energy transfer type, an interface type, a power, a current, a voltage, an energy transfer profile, a duration, a waveform, a temperature, etc.) associated with an energy transfer performed by the vehicle. For example, region 960 may be used to define a minimum value of an attribute (e.g., an energy transfer below the minimum value of the attribute will not be performed, energy transfers below the minimum value of the attribute will not be displayed for selection by a user on GUI 1000 of FIG. 10, etc.) and/or a maximum value of an attribute (e.g., an energy transfer above the maximum value of the attribute will not be performed, energy transfers above the maximum value of the attribute will not be displayed for selection by a user on GUI 1000 of FIG. 10, etc.). As another example, region 960 may be used to specify specific values for one or more attributes (e.g., at least one specific energy transfer rate, at least one specific voltage, etc.), where specified values of the one or more attributes may be used to form a list of energy transfers (e.g., to be displayed for selection by a user on GUI 1000, etc.).

In one embodiment, region 960 may be used to configure one or more attributes based on a variation in supply of energy. The supply of energy may be determined based upon a remaining capacity (e.g., a remaining current, a remaining power, etc.) of the vehicle to transfer energy. For example, region 960 may be used to define a first configuration (e.g., a value, range of values, etc.) of one or more attributes for a first supply level and a second configuration (e.g., a value, range of values, etc.) of one or more attributes for a second supply level. As such, in one embodiment, higher energy transfer rates may be excluded or prevented as the capacity of the vehicle to transfer energy decreases (e.g., as more energy is requested from or transferred to an energy transfer system, as more energy is requested from or transferred to at least one other vehicle, as the ability of a power source of the vehicle to produce energy is reduced, etc.).

Region 960 may be used to configure one or more attributes based on a variation in demand for energy. The demand for energy may be determined based upon a number of systems (e.g., energy transfer systems, other vehicles, etc.) requesting or performing an energy transfer with the vehicle, an amount of energy being requested or transferred from the vehicle at a particular time, etc. For example, region 960 may be used to define a first configuration (e.g., a value, range of values, etc.) of one or more attributes for a first demand level and a second configuration (e.g., a value, range of values, etc.) of one or more attributes for a second demand level. As such, in one embodiment, lower energy transfer rates may be excluded or prevented as the capacity of the vehicle to transfer energy increases (e.g., as less energy is requested from or transferred to an energy transfer system, as less energy is requested from or transferred to at least one other vehicle, etc.).

As shown in FIG. 9, region 961 may be used to input information for configuring one or more costs associated with a charge (e.g., a transfer of energy to the vehicle). For example, a minimum cost and/or maximum cost may be defined using region 961, where the minimum cost and/or maximum cost may be associated with a total cost for a charge, an energy transfer rate cost, an energy transfer profile cost, some combination thereof, etc. As another example, costs for one or more charges may be defined based upon an ability of an energy transfer system (e.g., 110) to supply energy and/or a demand for energy from the energy transfer system. In one embodiment, the relationship between cost (e.g., associated with at least one charge) and supply may be input using an interactive feature (e.g., a table, graph, pie chart, or the like) displayed in region 961. The relationship between cost (e.g., associated with at least one charge) and demand may be input using an interactive feature (e.g., a table, graph, pie chart, or the like) displayed in region 961 in one embodiment. Accordingly, costs for a charge may be conveniently, efficiently and/or effectively configured using region 961.

Region 962 may be used to input information for configuring one or more costs associated with a discharge (e.g., a transfer of energy from the vehicle). For example, a minimum cost and/or maximum cost may be defined using region 962, where the minimum cost and/or maximum cost may be associated with a total cost for a discharge, an energy transfer rate cost, an energy transfer profile cost, some combination thereof, etc. As another example, costs for one or more discharges may be defined based upon an ability of a vehicle (e.g., 120, 320*a*, 320*b*, 320*c*, etc.) to supply energy and/or a demand for energy from the vehicle. In one embodiment, the relationship between cost (e.g., associated with at least one discharge) and supply may be input using an interactive feature (e.g., a table, graph, pie chart, or the like) displayed in region 962. The relationship between cost (e.g., associated with at least one discharge) and demand may be input using an interactive feature (e.g., a table, graph, pie chart, or the like) displayed in region 962 in one embodiment. Accordingly, costs for a discharge may be conveniently, efficiently and/or effectively configured using region 962.

As shown in FIG. 9, region 963 may be used to configure one or more wired interfaces (e.g., interface 231), region 964 may be used to configure one or more inductive interfaces (e.g., 234), and region 965 may be used to configure one or more wireless interfaces (e.g., 237). For example, regions 963, 964, and/or 965 may be used to change a state of an interface (e.g., enabled, disabled, etc.), configure interface-specific attributes, configure problem resolution options (e.g., notify a user if a plug is not connected properly, instruct a user to relocate vehicle if energy transfer components are misaligned, use an alternative interface if a problem occurs with an interface, etc.), etc.

Region 966 may be used to configure charges and/or discharges between the vehicle and another system (e.g., energy transfer system 110, one or more other vehicles, etc.). For example, region 966 may be used to specify a chronological ordering of one or more charges and/or one or more discharges. Region 966 may be used to enable and/or disable a charge, enable and/or disable a discharge, etc. Region 966 may be used to configure how the vehicle adapts to an addition or removal of one or more systems (e.g., energy transfer system 110, one or more other vehicles, etc.) receiving energy from the vehicle (e.g., lowering or increasing the energy transfer rate to accommodate the larger or smaller number of systems, etc.).

As shown in FIG. 9, region 967 may be used to configure a power management component (e.g., 225) of a vehicle (e.g., 120, 320*a*, 320*b*, 320*c*, etc.). For example, region 967 may be used to define where energy is sourced from (e.g., a component of vehicle 120, a component of energy transfer system 110, another component coupled to either energy transfer system 110 or vehicle 120, etc.) and/or where energy is supplied to (e.g., a component of vehicle 120, a component of energy transfer system 110, another component coupled to either energy transfer system 110 or vehicle 120, etc.). Region 967 may be used to define how simultaneous (or contemporaneous) transfers of energy are handled (e.g., by power management component 225) and/or how sequential transfers of energy are handled (e.g., by power management component 225).

Region 970 may be used to configure signal communication of a vehicle. In one embodiment, region 970 may be used to define how signals are communicated between the vehicle (e.g., 120, 320*a*, 320*b*, 320*c*, etc.) and an external system (e.g., interface system 550, energy transfer system 110, a computer system such as computer system 790, etc.). For example, region 970 may be used to define which interfaces are used to communicate signals (e.g., using a signal interface such as interface 134, using an energy transfer interface such as energy transfer interface 231, 234, 237, etc.), how the signals are communicated over each type of interface (e.g., by configuring components used to communicate signals such as communication interface 242, signal communication component 224, etc.), etc. As another example, region 970 may be used to define parameters or attributes of signal communication (e.g., techniques used to secure data, a bandwidth, a data rate, jitter reduction techniques, synchronization techniques, error correction, etc.).

Region 970 may be used to define how signals are communicated within the vehicle (e.g., between communication interface 242 and power management component 225, between signal communication component 224 and power management component 225, etc.). For example, region 970 may be used to define which interfaces are used to communicate signals (e.g., using an energy transfer interface, using a separate signal communication interface, etc.) within the vehicle, how the signals are communicated over each type of interface (e.g., by configuring components used to communicate signals such as communication interface 242, signal communication component 224, power management component 225, etc.), etc. As another example, region 970 may be used to define parameters or attributes of signal communication (e.g., techniques used to secure data, a bandwidth, a data rate, jitter reduction techniques, synchronization techniques, error correction, etc.) within the vehicle.

As shown in FIG. 9, region 971 may be used to configure surveillance associated with a vehicle (e.g., 120, 320a, 320b, 320c, etc.), where the surveillance may utilize at least one component of an energy transfer system (e.g., camera 1321 of FIG. 13, microphone 1323 of FIG. 13, etc.) and/or at least one component of a vehicle (e.g., camera 1371 of FIG. 13, microphone 1373 of FIG. 13, etc.). For example, the type of surveillance (e.g., using images, video, sound, some combination thereof, etc.) may be defined using region 971.

Region 971 may be used to configure parameters or attributes of the surveillance (e.g., a frame rate of the video, a resolution of an image or video, an encoding format of the video, an encoding format of the sound, etc.). And in one embodiment, the state of the surveillance (e.g., enabled, disabled, whether or not to communicate the captured data to a user, etc.) may be changed or configured using region 971.

Region 972 may be used to configure a display of a vehicle (e.g., display device 725, 521, 522, 523, etc.). For example, region 972 may be used to configure a state (e.g., enabled, disabled, etc.) of the display. A parameter or attribute of the display (e.g., a brightness, contrast, automatic dimming or powering off of the display after a predetermined time, etc.) may be configured using region 972. Region 972 may also be used to configure a parameter or attribute of a touch screen (e.g., sensitivity, x and y position calibration, etc.) corresponding to (e.g., overlaying) the display.

As shown in FIG. 9, region 973 may be used to configure sound output (e.g., from speaker 1374 of FIG. 13) and/or sound input (e.g., to microphone 1373 of FIG. 13) of a vehicle. For example, region 973 may be used to configure a state (e.g., enabled, disabled, etc.) of the sound output and/or sound input. A parameter or attribute of the sound (e.g., an encoding format, a volume, a sensitivity of the microphone, etc.) may be configured using region 973.

In one embodiment, each of the regions (e.g., 905, 910, 911, 912, 913, 920, 921, 922, 930, 931, 940, 941, 950, 951, 952, 953, 954, 960, 961, 962, 963, 964, 965, 966, 967, 970, 971, 972, 973, etc.) of GUI 900 may be a field enabling entry of at least one character, a radio button, a menu, drop-down menu, an interactive image (e.g., enabling a user to make a selection using the image, modify the image, etc.), or any other element enabling the input of information.

Although FIG. 9 has been described with respect to the entry of particular information, it should be appreciated that GUI 900 may enable the entry of different information in other embodiments. Additionally, although FIG. 9 shows a specific number of regions, it should be appreciated that GUI 900 may include any number of regions in other embodiments. Further, it should be appreciated that information entered using GUI 900 may be entered into a smaller number of regions (e.g., two or more types of information may be entered into the same region) in other embodiments.

Figure 10:
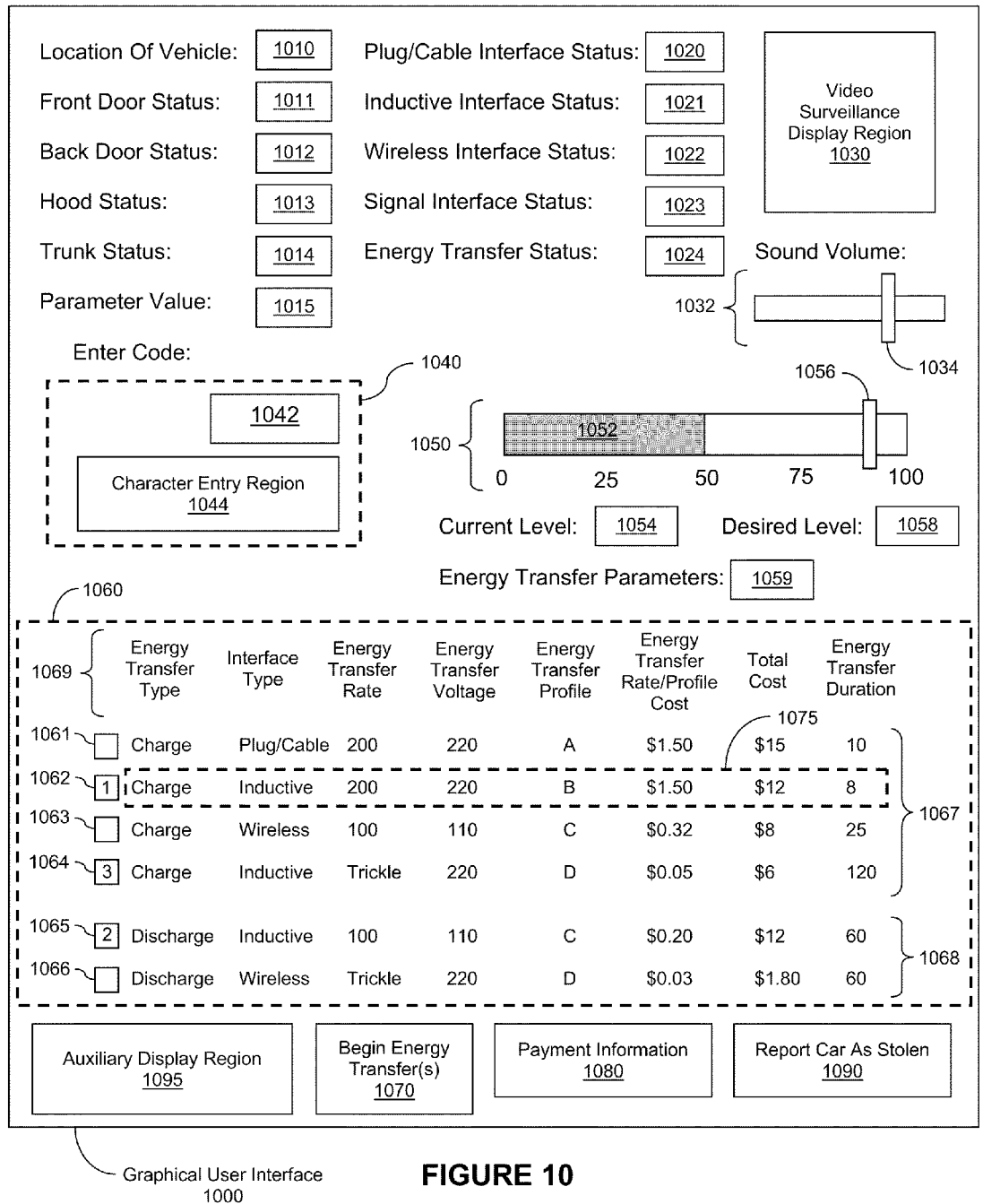
FIG. 10 shows a graphical user interface for managing one or more energy transfers in accordance with one embodiment of the present invention.

FIG. 10 shows graphical user interface 1000 for managing one or more energy transfers in accordance with one embodiment of the present invention. As shown in FIG. 10, GUI 1000 can be displayed on a display device (e.g., 725, 521, 522, 523, etc.) of a vehicle (e.g., 120, 320a, 320b, 320c, etc.), a display device (e.g., 795, 591, 593, 595, etc.) of a computer system (e.g., 790, 590, 592, 594, etc.), a display device (e.g., 511, etc.) of an energy transfer system (e.g., 110), another display device, etc. Information collected using GUI 1000 (e.g., a selection of at least one energy transfer, etc.) may be communicated (e.g., to pre-transfer processing component 620 of interface system 550, energy transfer processing component 630 of interface system 550, etc.) in a secure manner (e.g., using a secure socket layer (SSL), using secure HTTP (HTTPS), using a VPN, using encryption, etc.). And in one embodiment, the information may be communicated responsive to an interaction (e.g., a touch of a touch screen, a click of a mouse, a depression of a physical button, etc.) with region 1070 of GUI 1000.

As shown in FIG. 10, GUI 1000 may be used to indicate the status of one or more components of a vehicle (e.g., 120, 320a, 320b, 320c, etc.). For example, region 1010 may be used to indicate a location of the vehicle (e.g., in a particular parking lot, at a particular address, at a particular set of coordinates, etc.), region 1011 may be used to indicate the status of a front door of the vehicle (e.g., open, closed, etc.), region 1012 may be used to indicate the status of a back door of the vehicle (e.g., open, closed, etc.), region 1013 may be used to indicate the status of a hood of the vehicle (e.g., open, closed, etc.), and region 1014 may be used to indicate the status of a trunk of the vehicle (e.g., open, closed, etc.).

GUI 1000 may be used to indicate the value of a parameter of the vehicle in one embodiment. For example, region 1015 may be used to indicate a temperature of the vehicle (e.g., an interior temperature, a water temperature, an oil temperature, etc.), a pressure of the vehicle (e.g., a manifold pressure, etc.), a fluid level (e.g., oil, coolant, washer fluid, etc.), a voltage (e.g., of energy storage component 226, of a battery of a key fob, etc.), another parameter, etc.

Region 1020 may be used to indicate the status (e.g., connected, disconnected, currently transferring energy, unable to transfer energy due to problem, able to communicate signals, unable to communicate signals, etc.) of at least one wired interface (e.g. 231), region 1021 may be used to indicate the status (e.g., connected, disconnected, currently transferring energy, unable to transfer energy due to problem, able to communicate signals, unable to communicate signals, etc.) of at least one inductive interface (e.g., 234), and region 1022 may be used to indicate the status (e.g., connected, disconnected, currently transferring energy, unable to transfer energy due to problem, able to communicate signals, unable to communicate signals, etc.) of at least one wireless interface (e.g., 237). Region 1023 may be used to indicate the status (e.g., connected, disconnected, currently transferring energy, unable to transfer energy due to problem, able to communicate signals, unable to communicate signals, etc.) of at least one signal interface (e.g., 134).

Region 1024 may be used to indicate a status of at least one energy transfer. For example, region 1024 may list one or more energy transfers currently being performed, one or more attributes of the one or more energy transfers, whether any problems have occurred with respect to the one or more energy transfers, etc. In one embodiment, region 1024 may include information (e.g., one or more attributes of the energy transfer, whether any problems have occurred with respect to the energy transfer, whether the energy transfer was completed successfully, etc.) about at least one energy transfer already performed. Region 1024 may include information about at least one energy transfer to be performed in the future (e.g., one or more attributes of the energy transfer, whether any problems have been identified which may impact the performance of the energy transfer, etc.). In one embodiment, region 1024 may list a plurality of energy transfers in a chronological ordering (e.g., an order in which the energy transfers are scheduled to be performed).

As shown in FIG. 10, region 1060 of GUI 1000 includes information associated with at least one energy transfer. Each row of the information in region 1060 may correspond to a respective energy transfer, and each column of the information in region 1060 may correspond to either a respective attribute (e.g., an energy transfer type, an interface type, an energy transfer rate, a voltage, an energy transfer profile, etc.), a respective cost (e.g., for a particular attribute such as energy transfer rate and/or energy transfer profile, for a quantity of energy transferred as a result of the energy transfer, etc.), or a respective duration of the energy transfer as indicated by each column header in row 1069. In this manner, region 1060 may include at least one respective attribute and at least one respective cost (e.g., billable to an individual and/or entity associated with the vehicle, billable to an individual and/or entity associated with the energy transfer system, etc.) for each energy transfer.

In one embodiment, selection of one or more energy transfers using region 1060 may cause the one or more energy transfers to be performed. In one embodiment, one or more energy transfers selected using region 1060 may be performed responsive to an interaction with region 1070 of GUI 1000.

The at least one attribute (e.g., as indicated by row 1069) may include an energy transfer type (e.g., a "charge" or transfer of energy to the vehicle, a "discharge" or transfer of energy from the vehicle, etc.), an interface type (e.g., a wired interface including a plug and/or cable, an inductive interface, a wireless energy transfer interface, etc.), an energy transfer rate (e.g., a power measured in kilowatts, a current measured in amps, etc.), an energy transfer voltage (e.g., measured in volts, kilovolts, etc.), an energy transfer profile (e.g., 1115 of FIG. 11A, 1125 of FIG. 11B, 1135 of FIG. 11C, 1145 of FIG. 11D, etc.), an energy transfer duration (e.g., a period of time to complete the energy transfer, to bring an energy storage component to a user-defined or predetermined level, etc.), etc. The at least one cost (e.g., as indicated by row 1069) may include an energy transfer rate cost (e.g., a cost corresponding to and/or determined based on a particular energy transfer rate), an energy transfer profile cost (e.g., a cost corresponding to and/or determined based on a particular energy transfer profile), a total cost (e.g., a cost for the energy transfer determined based upon an energy transfer rate and/or energy transfer profile), etc.

It should be appreciated that a total cost determined based on an energy transfer rate may be distinguishable from a total cost determined based on a quantity of energy transferred. For example, where two different energy transfers are used to transfer the same quantity of energy at two different energy transfer rates, determining the total cost based on the quantity of energy transferred may result in the same total cost for the two energy transfers (e.g., since the same quantity of energy was transferred in each energy transfer). However, if the total cost is determined based upon an energy transfer rate, each energy transfer may have a different total cost (e.g., since each energy transfer is performed using a different energy transfer rate).

Figure 11A:
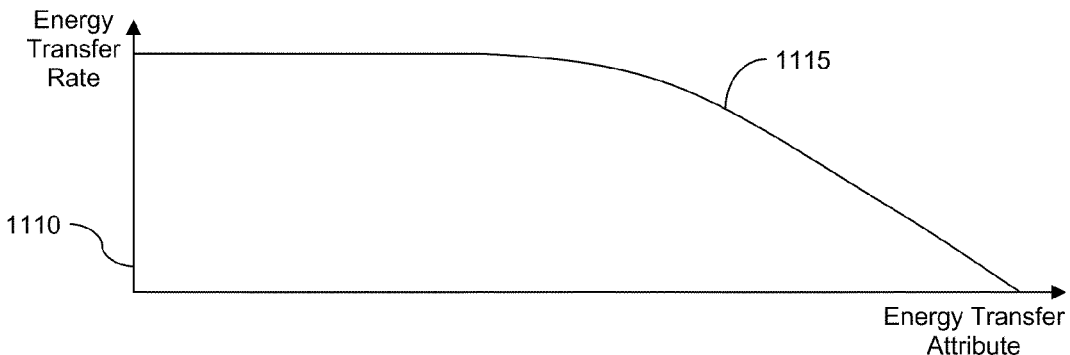
FIG. 11A shows a graph of a first energy transfer profile in accordance with one or more embodiments of the present invention.
Figure 11B:
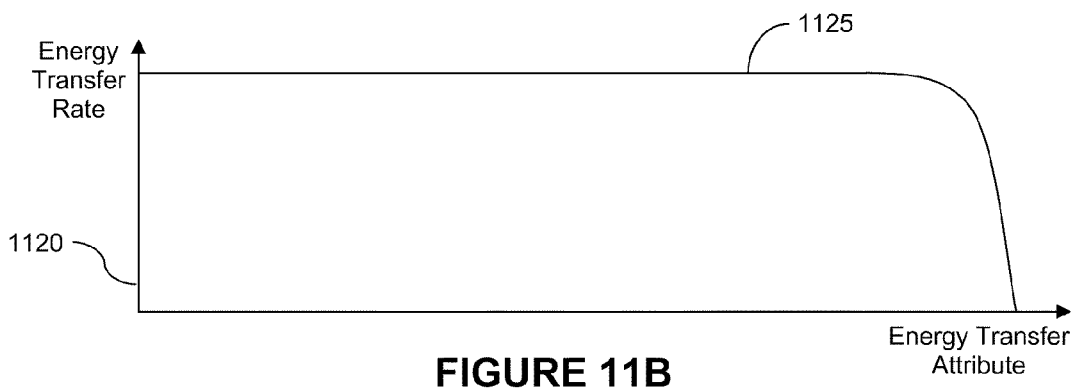
FIG. 11B shows a graph of a second energy transfer profile in accordance with one or more embodiments of the present invention.
Figure 11C:
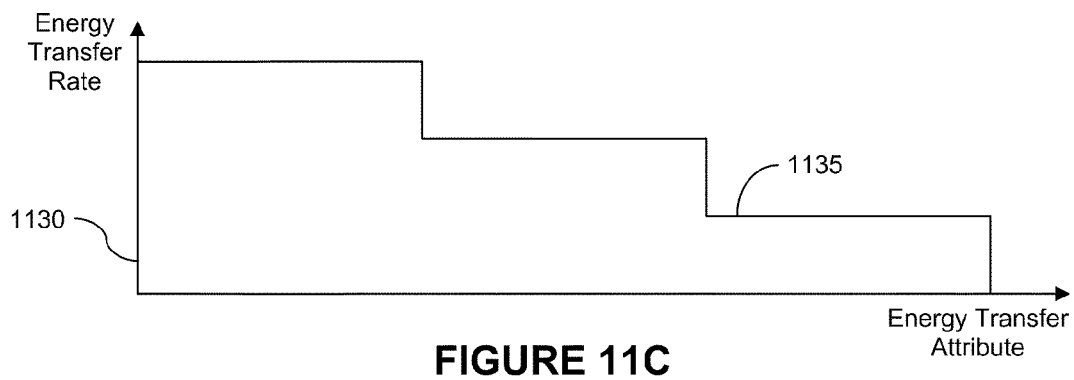
FIG. 11C shows a graph of a third energy transfer profile in accordance with one or more embodiments of the present invention.
Figure 11D:
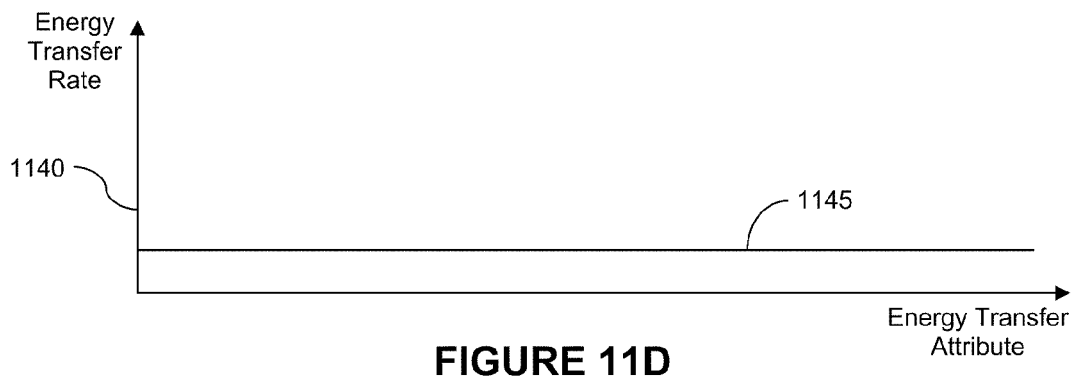
FIG. 11D shows a graph of a fourth energy transfer profile in accordance with one or more embodiments of the present invention.

FIGS. 11A, 11B, 11C, and 11D show graphs of different energy transfer profiles in accordance with one or more embodiments of the present invention. For example, FIG. 11A shows graph 1110 of energy transfer profile 1115, FIG. 11B shows graph 1120 of energy transfer profile 1125, FIG. 11C shows graph 1130 of energy transfer profile 1135, and FIG. 11D shows graph 1140 of energy transfer profile 1145. Each of the energy transfer profiles (e.g., 1115, 1125, 1135, 1145, etc.) may represent a different relationship between an energy transfer rate and another energy transfer attribute (e.g., power, current, voltage, temperature of an energy storage component, time, etc.). For example, an energy transfer rate may be substantially constant and then slowly taper off (e.g., as shown by energy transfer profile 1115), an energy transfer rate may be substantially constant and then more quickly taper off (e.g., as shown by energy transfer profile 1125), an energy transfer rate may be substantially constant at different values for a different ranges of attribute values (e.g., as shown by energy transfer profile 1135), an energy transfer rate may be substantially constant at a single value (e.g., as shown by energy transfer profile 1145), etc.

Each of the energy transfer profiles (e.g., 1115, 1125, 1135, 1145, etc.) may have different advantages and/or applications. For example, energy transfer profile 1115 may enable a more complete charge of an energy storage component (e.g., 216, 226, etc.) in a relatively low energy transfer duration. Energy transfer profile 1125 may result in a small energy transfer duration. Energy transfer profile 1135 may be used for interval charging or in applications where an energy storage component (e.g., 216, 226, etc.) requires or may benefit from being charged at different energy transfer rates. Energy transfer profile 1145 may result in a more complete charge of an energy storage component (e.g., 216, 226, etc.) when used with a lower energy transfer rate for a longer energy transfer duration (e.g., to implement a "trickle charge" or the like).

As shown in FIGS. 11A through 11D, each of the energy transfer profiles (e.g., 1115, 1125, 1135, 1145, etc.) may correspond to a charge (e.g., an energy transfer to a vehicle) or a discharge (e.g., an energy transfer from a vehicle). In this manner, each of the vertical axes of the graphs (e.g., 1110, 1120, 1130, 1140, etc.) may be either a positive axis (e.g., associated with a charge) or a negative axis (e.g., associated with a discharge).

Turning back to FIG. 10, an energy transfer profile cost (e.g., billable to an individual and/or entity associated with the vehicle, billable to an individual and/or entity associated with the energy transfer system, etc.) may be cost for performing an energy transfer using an energy transfer profile for a unit of time. For example, an energy transfer profile cost of $1.50 per minute would result in a total cost of $15 if the energy transfer is performed for 10 minutes (e.g., as shown in the first row below row 1069 of the information presented in region 1060 of GUI 1000). As shown in FIG. 10, the labels of "A," "B," "C," and "D" may be used to represent different energy transfer profiles (e.g., 1115, 1125, 1135, 1145, etc.) associated with different energy transfers. As such, in one embodiment, energy transfers with different energy transfer profiles may have or be assigned different energy transfer profile costs (e.g., the first row below row 1069 shows an energy transfer with an energy transfer profile "A" and an energy transfer profile cost of $1.50, whereas the third row below row 1069 shows an energy transfer profile "C" and an energy transfer profile cost of $0.32).

In one embodiment, energy transfers with different energy transfer rates may have or be assigned different energy transfer rate costs. For example, the first row below row 1069 shows an energy transfer with an energy transfer rate of "200" and an energy transfer rate cost of $1.50, whereas the third row below row 1069 shows an energy transfer rate of "100" and an energy transfer rate cost of $0.32.

In one embodiment, a total cost (e.g., billable to an individual and/or entity associated with the vehicle, billable to an individual and/or entity associated with the energy transfer system, etc.) for an energy transfer may be determined based upon an energy transfer rate and an energy transfer profile. For example, considering the energy transfers associated with the first two rows of information in region 1060 below row 1069, each of the energy transfers use the same energy transfer rates (e.g., 200) and have the same energy transfer rate cost (e.g., $1.50). However, each of the energy transfers uses a different energy transfer profile (e.g., "A" versus "B"), thereby resulting in different energy transfer durations (e.g., 10 minutes versus eight minutes) and different total costs (e.g., $15 versus $12). As such, the total cost for each energy transfer may be determined based upon the energy transfer profile (e.g., which may affect or be used to determine the energy transfer duration) and the energy transfer rate (e.g., the total cost may be calculated by multiplying the energy transfer rate by the energy transfer duration).

The information displayed in region 1060 may be organized or sorted based on at least one attribute and/or at least one cost in one embodiment. For example, an interaction with GUI 1000 (e.g., an interaction with the column header labeled "Energy Transfer Type" in row 1069) may organize or sort the information based on an energy transfer type (e.g., producing a first grouping of energy transfers in region 1067 associated with a charge, producing a second grouping of energy transfers in region 1068 associated with a discharge, etc.). As another example, an interaction with GUI 1000 (e.g., an interaction with the column header labeled "Total Cost" in row 1069) may organize or sort the information based on a total cost (e.g., ordering the energy transfers within each of regions 1067 and 1068 from highest-to-lowest total cost). As yet another example, an interaction with GUI 1000 (e.g., a subsequent interaction with the column header labeled "Total Cost" in row 1069) may reorganize or re-sort the information based on a total cost (e.g., ordering the energy transfers within each of regions 1067 and 1068 from lowest-to-highest total cost).

As shown in FIG. 10, GUI 1000 may enable a selection of at least one energy transfer. For example, a user interaction with at least one region (e.g., 1061, 1062, 1063, 1064, 1065, 1066, etc.) corresponding to at least one energy transfer may be used to select the at least one energy transfer. For example, a user interaction with region 1061 may indicate a selection of an energy transfer associated with at least one attribute and/or at least one cost associated with the first row of information below row 1069 in region 1060, a user interaction with region 1062 may indicate a selection of an energy transfer associated with at least one attribute and/or at least one cost associated with the second row of information below row 1069 in region 1060, etc. Alternatively, a user interaction with another region of GUI 1000 (e.g., a region such as region 1075, a region associated with an attribute of the energy transfer to be selected, a region associated with a cost of the energy transfer to be selected, etc.) may be used to select an energy transfer.

In one embodiment, GUI 1000 may enable a chronological ordering of a plurality of energy transfers. For example, a user may enter numbers in regions associated with energy transfers to indicate an order that the energy transfers should be performed in. As such, entering a "1" in region 1062, a "2" in region 1065, and a "3" in region 1064 may result in the following chronological ordering of energy transfers: an energy transfer associated with region 1062; then an energy transfer associated with region 1065; and then an energy transfer associated with region 1064. It should be appreciated that GUI 1000 may enable a chronological ordering of charges (e.g., an energy transfer to a vehicle) and/or discharges (e.g., an energy transfer from a vehicle).

A plurality of energy transfers selected using GUI 1000 may be performed simultaneously or contemporaneously (e.g., at least partially overlapping in time). In one embodiment, the plurality of energy transfers performed simultaneously or contemporaneously may be part of a chronological ordering defined using GUI 1000. For example, where three energy transfers are ordered using GUI 1000 and the first two energy transfers are capable of being performed simultaneously or contemporaneously, the first two energy transfers may be performed simultaneously or contemporaneously before performing the third energy transfer may be performed (e.g., the third energy transfer may begin during performance of the first two energy transfers or after the conclusion of one or both of the first two energy transfers).

In one embodiment, a plurality of energy transfers selected using GUI 1000 may be performed sequentially (e.g., one after another). The sequential energy transfers may be performed contiguously (e.g., with little or no time between energy transfers) and/or with a period of time in between two or more of the energy transfers. The period of time in between two or more of the energy transfers may be short (e.g., less than a second, less than a minute, etc.).

In one embodiment, the at least one energy transfer selected using GUI 1000 may be performed during a window of time. For example, the at least one energy transfer may be performed in a less than five hours. As another example, the at least one energy transfer may be performed in another time window (e.g., less than two hours, less than an hour, etc.). In one embodiment, the at least one energy transfer selected using GUI 1000 may be performed while a cost of energy (e.g., determined by a utility company and paid by a user of an energy transfer system) is constant or varies no more than a predetermined amount (e.g., by no more than 5%, by no more than 1%, etc.). And in one embodiment, a plurality of energy transfers with different energy transfer rates (e.g., listed in region 1060 for selection by a user) may be performed while a cost of energy (e.g., determined by a utility company and paid by a user of an energy transfer system) is constant or varies no more than a predetermined amount (e.g., by no more than 5%, by no more than 1%, etc.).

As shown in FIG. 10, at least one attribute displayed in region 1060 may be determined based on information related to an energy transfer system (e.g., 110) and information related to a vehicle (e.g., 120, 320*a*, 320*b*, 320*c*, etc.). For example, attributes compatible with the energy transfer system (e.g., data 1200A as shown in FIG. 12A) may be compared to attributes compatible with the vehicle (e.g., data 1200B as shown in FIG. 12B) to determine at least one attribute (e.g., an energy transfer rate, voltage, energy transfer profile, etc.) compatible with both the energy transfer system and the vehicle.

FIG. 12A shows data 1200A associated with at least one energy transfer system (e.g., 110) in accordance with one embodiment of the present invention. As shown in FIG. 12A, data 1200A may include at least one attribute (e.g., an energy transfer rate, voltage, energy transfer profile, etc.) for one or more energy transfer systems. Data 1200A may be stored in a database (e.g., energy transfer system attribute database 675 of FIG. 6) in one embodiment.

FIG. 12B shows data 1200B associated with at least one vehicle (e.g., 120, 320*a*, 320*b*, 320*c*, etc.) in accordance with one embodiment of the present invention. As shown in FIG. 12B, data 1200B may include at least one attribute (e.g., an energy transfer rate, voltage, energy transfer profile, etc.) for one or more vehicles. Data 1200B may be stored in a database (e.g., vehicle attribute database 665 of FIG. 6) in one embodiment.

Figure 14:
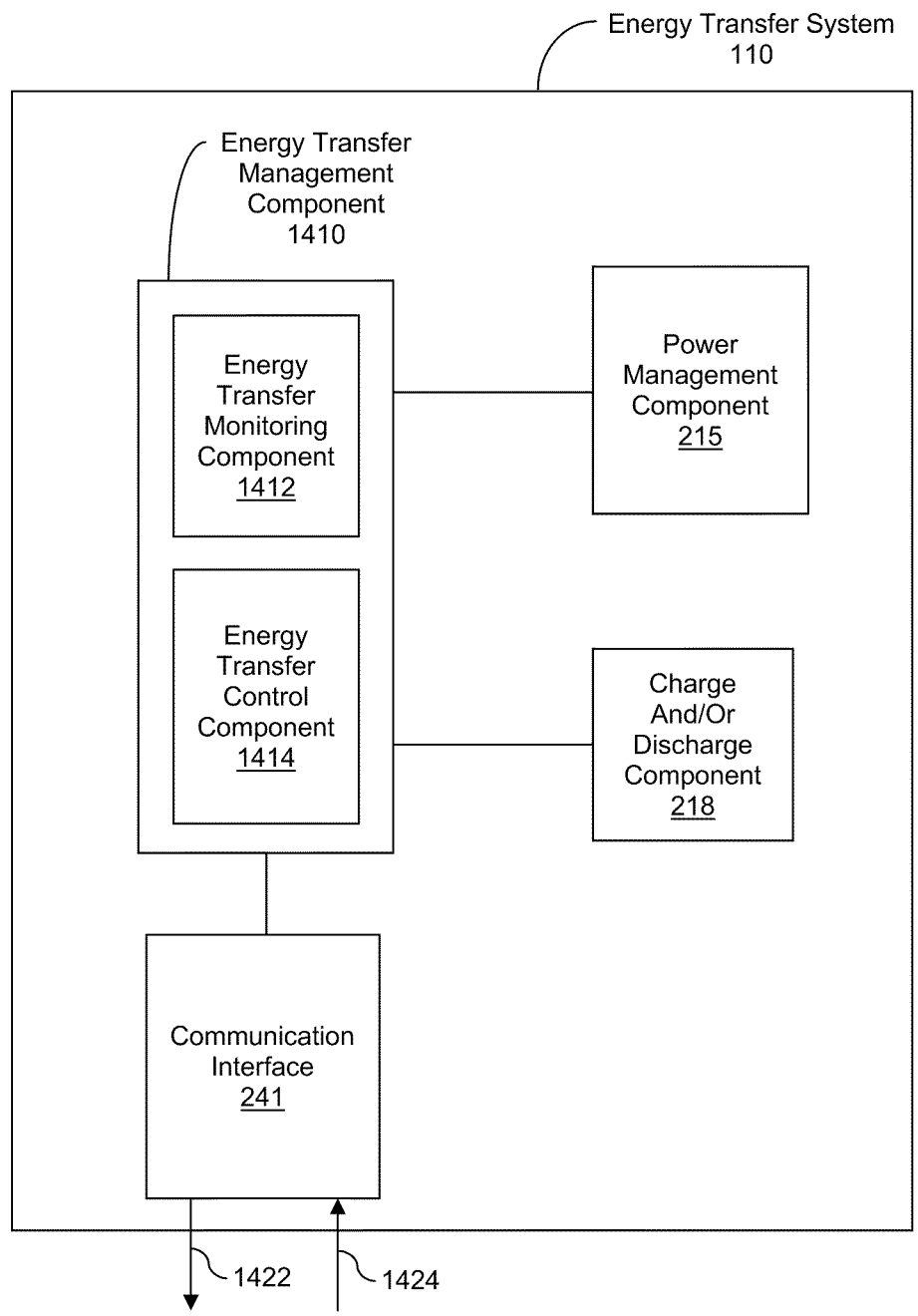
FIG. 14 shows an energy transfer management component for managing an energy transfer in accordance with one embodiment of the present invention.

Turning back to FIG. 10, at least one attribute displayed in region 1060 may be determined based on a state of the energy transfer system (e.g., one or more attributes may be filtered based on a state of the energy transfer system as monitored by energy transfer monitoring component 1412 of FIG. 14). For example, one or more attributes (e.g., which are compatible with an energy transfer system and a vehicle) may be filtered (e.g., and therefore not displayed in region 1060) which exceed a remaining capacity of the energy transfer system to transfer energy. The remaining capacity may vary over time based on, for example, a load on the energy transfer system due to charging other vehicles, a change in an amount of energy supplied by a component of the energy transfer system (e.g., energy storage component 216, power source 217, etc.), supplying electricity to a building or lights in a parking lot, etc. As another example, one or more attributes (e.g., which are compatible with an energy transfer system and a vehicle) may be filtered which correspond to an energy transfer which cannot be performed (e.g., due to a problem with an energy transfer interface, due to a problem with a signal interface, etc.).

At least one attribute displayed in region 1060 may be determined based on a user preference associated with the energy transfer. In one embodiment, one or more attributes (e.g., which are compatible with an energy transfer system and a vehicle) may be filtered (e.g., and therefore not displayed in region 1060) based on a user preference associated with an energy transfer system (e.g., entered using GUI 800 of FIG. 8) and/or a vehicle (e.g., entered using GUI 900 of FIG. 8). For example, an attribute which exceeds a user-specified maximum threshold, falls below a user-specified minimum threshold, conflicts with a user-specified parameter, etc. may be filtered. It should be appreciated that the user preference may be associated with an attribute and/or a cost. For example, if a user specifies that a charge for an energy transfer should not exceed a particular value, then an energy transfer (and any corresponding attributes) associated with a cost that exceeds the particular value may be filtered (e.g., and therefore not displayed in region 1060).

At least one cost displayed in region 1060 may be determined based on a cost of electricity to the energy transfer system (e.g., as determined by the utility providing power, as determined by an upfront cost and/or cost to operate a power source such as power source 217, etc.) and/or a cost of electricity to the vehicle (e.g., as determined by an upfront cost and/or cost to operate a power source such as power source 227, etc.). In one embodiment, at least one cost displayed in region 1060 may be determined based on supply of and/or demand for electricity. At least one cost displayed in region 1060 may be determined based on incentives presented to one or more parties to the transaction (e.g., using region 1095 of GUI 1000). And in one embodiment, at least one cost displayed in region 1060 may be determined based on a user preference (e.g., entered using region 842 of GUI 800, region 961 of GUI 900, region 843 of GUI 800, region 962 of GUI 900, etc.) associated with a transfer of energy to and/or from a vehicle, where the user preference may define a relationship between cost and a supply of electricity, between cost and a demand for electricity, etc.

In one embodiment, a cost (e.g., an energy transfer rate cost, an energy transfer profile cost, etc.) displayed in region 1060 may be determined by a user (e.g., an organization or business, an individual, an owner, a lessee, an attendant, etc.) of an energy transfer system (e.g., 110). And in one embodiment, a cost (e.g., an energy transfer rate cost, an energy transfer profile cost, etc.) displayed in region 1060 may be independent or (e.g., not based on) a cost for electricity charged by a utility company to a user (e.g., an organization or business, an individual, an owner, a lessee, an attendant, etc.) of an energy transfer system (e.g., 110).

As shown in FIG. 10, region 1050 may display a capacity level associated with an energy storage component (e.g., 216, 226, etc.), where a capacity level may be an amount of energy stored by the energy storage component at any given time. For example, region 1052 may indicate a capacity level measured in percent (e.g., 50 percent). As another example, region 1052 may be used to indicate a capacity level measured in units of energy (e.g., 50 units of energy), where the units of energy may be amp-hours (Ah), kilowatt-hours (kWh), or the like. In one embodiment, region 1054 may indicate a capacity level at a particular instant in time (e.g., before one or more energy transfers, during one or more energy transfers, after one or more energy transfers, etc.), in real-time (e.g., varying over time based upon changes in the capacity level of an energy storage component), etc.

Region 1050 may enable a capacity level associated with an energy storage component (e.g., 216, 226, etc.) to be specified or selected, where the specified capacity level may be achieved by one or more energy transfers. For example, if the specified capacity level is above a current capacity level (e.g., indicated by region 1052 and/or region 1054), then one or more energy transfers may be performed to increase the capacity level of the energy storage component to the specified capacity level. As another example, if the specified capacity level is below a current capacity level (e.g., indicated by region 1052 and/or region 1054), then one or more energy transfers may be performed to decrease the capacity level of the energy storage component to the specified capacity level.

In one embodiment, the one or more energy transfers used to achieve the specified capacity level may include any combination and ordering of energy transfers to the energy storage component (e.g., 216, 226, etc.) and/or energy transfers from the energy storage component (e.g., 216, 226, etc.). For example, where the capacity level is to be increased, the capacity level may decreased, then increased a certain amount, then decreased, then finally increased to the specified level. As another example, where the capacity level is to be decreased, the capacity level may increased, then decreased a certain amount, then increased, then finally decreased to the specified level.

A capacity level may be specified using slider 1056 in one embodiment. For example, slider 1056 may be moved (e.g., to the left, to the right, etc.) to specify a capacity level measured in percent, a unit of energy, etc. In one embodiment, region 1058 may indicate the capacity level specified using slider 1056.

In one embodiment, region 1058 may be used to specify a capacity level. For example, a user may enter a capacity level using region 1058, where specified capacity level is measured in percent, a unit of energy, etc. In one embodiment, slider 1056 may indicate the capacity level specified using region 1058. For example, responsive to a user specifying a capacity level using region 1058, the position of slider 1056 may be automatically updated to indicate the capacity level specified using region 1058.

As shown in FIG. 10, the information displayed in region 1060 may be determined based on a capacity level specified using region 1050. In one embodiment, an energy transfer duration (e.g., displayed in region 1060) may be determined based on amount of energy used to increase a capacity level to the specified capacity level. For example, the energy transfer duration may be determined by calculating the difference between the specified capacity level and the current capacity level (e.g., associated with region 1052), and then dividing the result by an energy transfer rate associated with the energy transfer. As another example, the energy transfer duration may be determined based upon the time it takes to complete an energy transfer using an energy transfer profile (e.g., associated with the energy transfer and displayed in region 1060), where the energy transfer profile may vary based on a capacity level (e.g., indicated by region 1052 and/or region 1054) and/or a specified capacity level (e.g., entered using slider 1056, region 1058, etc.). In one embodiment, an energy transfer profile may be determined based on amount of energy used to increase a capacity level to the specified capacity level. For example, parameters of the energy transfer profile (e.g., one or more values of the curve of the energy transfer profile, one or more slopes of the curve of the energy transfer profile, a scaling factor applied to the profile, etc.) may be determined by equating the difference between the specified capacity level and the current capacity level (e.g., associated with region 1052) with the area under the curve of the energy transfer profile. In this manner, a curve of an energy transfer profile may be determined which makes the area under the curve (e.g., representing an amount of energy) approximately equivalent to the amount of energy needed to bring an energy storage component up or down to a specified capacity level in one embodiment, thereby enabling the energy transfer duration to be determined from the resulting energy transfer profile (e.g., the time it takes to complete an energy transfer using the determined energy transfer profile). And in one embodiment, another attribute (e.g., a power, a current, a voltage, a waveform, a temperature, etc.) may be determined based on amount of energy used to increase a capacity level to the specified capacity level.

In one embodiment, a cost (e.g., displayed in region 1060) may be determined based on an amount of energy used to increase a capacity level to the specified capacity level. For example, a cost (e.g., displayed in region 1060) may be a function of or otherwise determined based on at least one attribute (e.g., an energy transfer type, an interface type, a power, a current, a voltage, an energy transfer profile, a duration, a waveform, a temperature, etc.), where the at least one attribute may be determined based on amount of energy used to increase a capacity level to the specified capacity level.

As shown in FIG. 10, the information displayed in region 1060 may be determined based on an energy generation capability of a power source (e.g., 217, 227, etc). For example, an energy transfer duration (e.g., displayed in region 1060) may be calculated by solving for "t" in the equation $$E = (R_{ET} \times t) + (R_{EG} \times t)$$

where "E" may represent an amount of energy to be transferred (e.g., the difference between the specified capacity and the current capacity of an energy storage component), $R_{ET}$ may represent an energy transfer rate, and $R_{EG}$ may represent an energy generation rate (e.g., a rate at which a power source is capable of generating energy). As another example, a cost (e.g., displayed in region 1060) associated with an energy transfer may be determined based upon an energy transfer duration, where the energy transfer duration may be determined based on an energy generation rate of a power source. As yet another example, a capacity level (e.g., indicated by region 1052 and/or region 1054) may include or be determined based on an energy generation capability of a power source (e.g., a capacity level may be determined by a current capacity level of an energy storage component and an energy generation capability of a power source), and therefore, at least one attribute (e.g., displayed in region 1060) and/or at least one cost (e.g., displayed in region 1060) may be determined based on an energy generation capability of a power source (e.g., since the information displayed in region 1060 may be determined based on a capacity level specified using region 1050 as discussed herein).

As shown in FIG. 10, the information displayed in region 1060 may be updated based on a capacity level specified using region 1050. For example, responsive to a specification of a capacity level (e.g., using slider 1056, region 1058, etc.), the information displayed in region 1060 may be updated. In one embodiment, at least one attribute (e.g., an energy transfer type, an interface type, a power, a current, a voltage, an energy transfer profile, a duration, a waveform, a temperature, etc.) and/or at least one cost (e.g., a total cost of an energy transfer, an energy transfer rate cost, an energy transfer profile cost, etc.) may be updated responsive to a specification of a capacity level. In one embodiment, responsive to a specification of a capacity level, at least one energy transfer may be added or removed. In one embodiment, interface system 550 (e.g., pre-transfer processing component 620) may access a capacity level (e.g., specified using slider 1056, region 1058, etc.) and determine updated information (e.g., including at least one attribute associated with an energy transfer, at least one cost associated with an energy transfer, some combination thereof, etc.) to be displayed in region 1060.

In one embodiment, the information displayed in region 1060 may be updated based on data entered in region 1059. For example, where region 1059 is used to enter a distance (e.g., a distance to be traveled on a next trip), one or more energy transfers capable of transferring an amount of energy sufficient to enable the vehicle to travel the specified distance (e.g., entered using region 1059) may be displayed in region 1060. As another example, where region 1059 is used to enter an amount of money (e.g., an amount a user wishes to spend on one or more energy transfers), one or more energy transfers with a total cost less than or equal to the specified amount of money may be displayed in region 1060. As yet another example, where region 1059 is used to enter an amount of time (e.g., a duration or window of time during which the one or more energy transfers can be performed), one or more energy transfers capable of being performed in the specified amount of time may be displayed in region 1060.

In one embodiment, a recommendation associated with one or more energy transfers may be communicated using GUI 1000. The recommendation may be communicated by displaying a border (e.g., similar to the dotted line of region 1075) around a cost or attribute of an energy transfer, by displaying an image (e.g., an arrow, etc.) in proximity to a cost or attribute of an energy transfer, by shading or highlighting a region associated with an energy transfer, by displaying a number in a region (e.g., 1061-1066) to recommend a chronological ordering of energy transfers, etc. The one or more energy transfers associated with the recommendation may be determined based on a threshold associated with an attribute (e.g., one or more energy transfers associated with an energy transfer rate above a predetermined energy transfer rate threshold, etc.), a threshold associated with a cost (e.g., one or more energy transfers associated with an cost below a predetermined cost threshold, etc.), a user preference (e.g., one or more energy transfers associated with a user preference input using GUI 800, GUI 900, etc.), an incentive (e.g., one or more energy transfers associated with an incentive, etc.), etc.

The recommendation communicated using GUI 1000 may be determined based upon a time of day in one embodiment. For example, if it is determined that a power source (e.g., 227) of a vehicle (e.g., 120) can only generate energy for a particular duration (e.g., using a time of day to estimate an amount of remaining sunlight, using a solar sensor to estimate an amount of remaining sunlight, etc.), the recommendation may suggest to a user that a discharge be performed (e.g., for all or part of the particular duration). As another example, if it is determined that the cost of energy (e.g., to the energy transfer system as set by the utility) will reduce at a particular time (e.g., at night when the cost of energy is usually lower from a utility), the recommendation may suggest to a user that a charge be initiated at or after the particular time.

As shown in FIG. 10, region 1040 may be used to perform an authentication of a user. For example, a user may enter a code using character entry region 1044 (e.g., including one or more "soft keys" enabling the input of a character such as a letter, number, symbol, etc.), an input device of a vehicle (e.g., one or more physical buttons or keys, a touch screen, an audio input system, a voice recognition system, an optical recognition system capable of recognizing a fingerprint or eye, etc.), an input device of an energy transfer system (e.g., one or more physical buttons or keys, a touch screen, a voice recognition system, an optical recognition system capable of recognizing a fingerprint or eye, etc.), etc. In one embodiment, the code (e.g., entered using region 1044) may be displayed in region 1042. In one embodiment, the code entered using region 1040 may be compared to other information (e.g., a code entered using region 940 of FIG. 9) to determine if a user is authorized to perform an energy transfer associated with the vehicle (e.g., transfer energy to the vehicle, transfer energy from the vehicle, etc.), use the vehicle, move the vehicle, etc. User authentication using information entered using region 1040 may be performed by a component of a vehicle (e.g., authentication component 1380 of FIG. 13, authentication component 2822 of FIG. 28, authentication component 2842 of FIG. 28, etc.), a component of an energy transfer system (e.g., authentication component 1340 of FIG. 13, etc.), a component of interface system 550 (e.g., pre-transfer processing component 620, energy transfer processing component 630, post-transfer processing component 640, etc.), computer system 2890, some combination thereof, etc.

In one embodiment, if the code entered using region 1040 does not match the other information (e.g., a code entered using region 940 of FIG. 9), a user may be prompted to re-enter a code using region 1040 and the newly-entered code may be compared to the other information (e.g., a code entered using region 940 of FIG. 9) to determine if a user is authorized. If the number of unsuccessful attempts to enter the code reaches a predetermined number, then the user may be determined to be unauthorized and/or the further attempts to enter a code in region 1040 may be prevented (e.g., by reducing the ability to enter a code using region 1044 or another user interface component).

In one embodiment, a user may be authenticated (e.g., using authentication component 1340, authentication component 1380, authentication component 2822, authentication component 2842, computer system 2890, interface system 550, another component, some combination thereof, etc.) using other information associated with the user. For example, user authentication may involve comparing audio captured of a user's voice (e.g., captured using microphone 1323 of FIG. 13, microphone 1373 of FIG. 13, etc.) to audio captured of an authorized user's voice to determine if the user is authorized to perform one or more actions (e.g., an energy transfer associated with the vehicle, use the vehicle, move the vehicle, etc.). As another example, user authentication may involve comparing a retinal scan of the user's eye (e.g., captured using camera 1321 of FIG. 13, camera 1371 of FIG. 13, etc.) to an image captured of an authorized user's eye to determine if the user is authorized to perform one or more actions (e.g., an energy transfer associated with the vehicle, use the vehicle, move the vehicle, etc.). As another example, user authentication may involve comparing an image of a fingerprint (e.g., captured using camera 1321 of FIG. 13, camera 1371 of FIG. 13, etc.) to an image captured of an authorized user's fingerprint to determine if the user is authorized to perform one or more actions (e.g., an energy transfer associated with the vehicle, use the vehicle, move the vehicle, etc.).

Region 1040 may be displayed using a separate GUI (e.g., separate from a GUI used to display other information depicted in FIG. 10) in one embodiment. For example, region 1040 may be displayed in one location (e.g., on a display of vehicle 120, etc.), while the other information of GUI 1000 may be displayed in a second location (e.g., on a display of a portable electronic device or other computer system, on a display of energy transfer system 110, etc.).

In one embodiment, region 1040 may be displayed sequentially with other information of GUI 1000. For example, region 1040 may be displayed while the rest of the information of GUI 1000 is hidden or not displayed, where the rest of the information of GUI 1000 may be displayed responsive to (e.g., after) an authentication of a user (e.g., using information entered using region 1040). As another example, region 1040 may be displayed using a first GUI before the display of any other information of GUI 1000, where the rest of the information of GUI 1000 may be displayed using a second GUI responsive to (e.g., after) an authentication of a user (e.g., using information entered using region 1040). In this manner, security may be increased by reducing the amount of information (e.g., displayed using GUI 1000) accessible to an unauthorized user (e.g., who is not authorized to perform an energy transfer associated with the vehicle, who is not authorized to use and/or move the vehicle, etc.).

As shown in FIG. 10, GUI 1000 may enable monitoring of a vehicle before an energy transfer, during an energy transfer, after an energy transfer, some combination thereof, etc. For example, region 1030 may be used to display one or more images (e.g., a still image, video, etc.) captured using a camera of an energy transfer system (e.g., 1321 of FIG. 13), a camera of a vehicle (e.g., 1371 of FIG. 13), etc. The images may include at least one vehicle (e.g., 120, 320*a*, 320*b*, 320*c*, etc.) and/or at least one energy transfer system (e.g., 110, 710*a*, 710*b*, 710*c*, etc). As another example, sound may be presented to a user (e.g., using a speaker in proximity to a display used to present GUI 1000, a speaker of a device which also displays GUI 1000, a speaker of a vehicle such as speaker 1374, a speaker of an energy transfer system such as speaker 1324, etc.) captured using a microphone of an energy transfer system (e.g., 1323 of FIG. 13), a microphone of a vehicle (e.g., 1373 of FIG. 13), etc. The volume of the sound may be adjusted using region 1032 of GUI 1000 (e.g., by moving slider 1034, etc.).

In one embodiment, interface system 550 may enable monitoring of a vehicle. For example, image data (e.g., one or more still images, video, etc.) and/or audio data associated with a monitoring of a vehicle (e.g., 120, 320*a*, 320*b*, 320*c*, etc.) may be communicated to interface system 550. In one embodiment, the image data may be captured using a camera (e.g., 1321, 1371, etc.), and the audio data may be captured using a microphone (e.g., 1323, 1373, etc.). Interface system 550 (e.g., pre-transfer processing component 620, energy transfer processing component 630, post-transfer processing component 640, etc.) may process the received data (e.g., image data, audio data, etc.), where the processing may include decoding, encoding, decrypting, encrypting, filtering, changing at least one parameter of image data (e.g., brightness, contrast, saturation, hue, resolution, sharpness, bit depth, bit rate, sampling frequency, size when stored on a computer-readable medium, etc.), changing at least one parameter of audio data (e.g., volume, frequency response, tone, bit rate, sampling frequency, size when stored on a computer-readable medium, etc.), adapting the data for rendering by a component of a remote system (e.g., energy transfer system 110, vehicle 120, another computer system, a computer system capable of rendering GUI 1000, etc.), some combination thereof, etc. In one embodiment, interface system 550 may perform little or no processing of the received data. Interface system 550 may communicate image data and/or audio data back for rendering (e.g., using GUI 1000, a display, a speaker, etc.) by another system such as an energy transfer system (e.g., 110, 710a, 710b, 710c, etc.), a computer system associated with an energy transfer system (e.g., computer system 570, etc.), a vehicle (e.g., 120, 320a, 320b, 320c, etc.), a computer system associated with a vehicle (e.g., computer system 590, computer system 592, computer system 594, etc.), another computer system, some combination thereof, etc.

As shown in FIG. 10, GUI 1000 may enable a vehicle to be reported as stolen. For example, region 1090 may be used to send a request to report a vehicle (e.g., 120, 320a, 320b, 320c, etc.) as stolen. In one embodiment, interface system 550 may receive the request (e.g., responsive to a user interaction with region 1090) and report the vehicle as stolen to the authorities (e.g. the police) based on the request. Information about the situation (e.g., the location of the vehicle, a time at which the vehicle arrived at this location, an identification of the vehicle, a vehicle identifier such as the license plate number of the vehicle, image data of the vehicle, audio data associated with the vehicle, etc.) may be automatically accessed and communicated as part of the report to the authorities. In this manner, GUI 1000 may increase security by enabling a user to report the vehicle as stolen. In one embodiment, region 1090 may be used to report that a vehicle has been stolen responsive to information presented (e.g., using region 1030, region 1032, etc.) as a result of monitoring the vehicle.

In one embodiment, region 1095 may be used to display results of a user authentication. For example, if a user authentication is unsuccessful (e.g., incorrect authentication information is entered using region 1040, audio captured of a voice does not match that of an authorized user, an image captured of an eye does not match that of an authorized user, an image captured of a fingerprint does not match that of an authorized user, some combination thereof, etc.), a user may be notified (e.g., using a message displayed in region 1095) that the authentication was unsuccessful. GUI 1000 may be advantageously displayed using a display device (e.g., 511, 571, 591, 593, 595, 795, etc.) located remotely from a vehicle, thereby enabling a user (e.g., the owner of the vehicle, a user authorized to use and/or move the vehicle, etc.) who is also located remotely from the vehicle to be made aware that the vehicle has been stolen. In one embodiment, region 1090 may be used to report that a vehicle has been stolen responsive to information presented (e.g., using region 1095) as a result of performing a user authentication associated with the vehicle.

Region 1095 may be used to display results of an authentication of a component. For example, results of an authentication of a component (e.g., energy storage component 216, charge and/or discharge component 218, power management component 215, power source 217, interface component 211, etc.) of an energy transfer system (e.g., 110) and/or a component (e.g., energy storage component 226, charge and/or discharge component 228, power management component 225, power source 227, interface component 221, etc.) of a vehicle (e.g., 120, 320a, 320b, 320c, etc.) may be displayed using region 1095. Success of the authentication may be a prerequisite to communication between at least two systems (e.g., interface system 550, payment system 560, energy transfer system 110, vehicle 120, etc.), an energy transfer between the energy transfer system and the vehicle, a signal communication between the energy transfer system and the vehicle, some combination thereof, etc. Success of the authentication may be a prerequisite to movement and/or use of the vehicle. In one embodiment, the authentication may be performed using an authentication component of the energy transfer system (e.g., 1340 of FIG. 13) and/or an authentication component of the vehicle (e.g., 1380 of FIG. 13, 2822 of FIG. 28, 2842 of FIG. 28, etc.). In one embodiment, region 1090 may be used to report that a vehicle has been stolen responsive to information presented (e.g., using region 1095) as a result of performing an authentication of a component of an energy transfer system and/or a component of a vehicle.

Region 1095 may be used to display incentives and/or advertisements in one embodiment. For example, an incentive (e.g., displayed using region 1095) may encourage a user to perform an energy transfer in exchange for a benefit to the user. The benefit may be a discount on an item (e.g., from a store affiliated with the energy transfer system, from a store providing a kick back or other reward to a user of the energy transfer system for referring business, etc.), a discount on another energy transfer (e.g., performed with the energy transfer system or another energy transfer system associated with the same user), currency (e.g., provided using dispenser 1331 of FIG. 13), a coupon (e.g., provided using dispenser 1331 of FIG. 13), a gift card (e.g., provided using dispenser 1331 of FIG. 13), etc. As another example, an advertisement may be displayed using region 1095, thereby providing a user of an energy transfer system an alternative source of revenue (e.g., paid to the user of the energy transfer system in exchange for presenting the advertisement).

As shown in FIG. 10, region 1080 may enable information associated with a payment system (e.g., 560) to be entered. For example, a user may use region 1080 to identify or indicate a payment system (e.g., a name, website, etc.), to enter authentication information (e.g., username, password, etc.) associated with the payment system, to enter other information (e.g., an account number, credit card number, etc.) used to execute a transaction with the payment system, etc. In one embodiment, region 1080 may be used to recall and/or confirm information associated with a payment system (e.g., entered previously using region 941 of GUI 900, etc.). And in one embodiment, an interaction with region 1080 may execute a transaction (e.g., associated with an energy transfer between an energy transfer system and a vehicle) between an energy transfer system (e.g., 110, 710a, 710b, 710c, etc.) and a payment system (e.g., 560).

Although FIG. 10 has been described with respect to the entry and/or display of particular information, it should be appreciated that GUI 1000 may enable the entry and/or display of different information in other embodiments. Additionally, although FIG. 10 shows a specific number of regions, it should be appreciated that GUI 1000 may include any number of regions in other embodiments. Further, it should be appreciated that information entered using GUI 1000 may be entered into a smaller number of regions (e.g., two or more types of information may be entered into the same region) in other embodiments. Additionally, although FIG. 10 depicts only a single column for energy transfer rate costs and energy transfer profile costs, it should be appreciated that energy transfer rate costs and energy transfer profile costs may be separated into separate columns (e.g., where values in the energy transfer rate cost and energy transfer profile cost columns for a particular energy transfer may be different or the same) in other embodiments.

Although FIG. 11 has been described with respect to the entry and/or display of particular information, it should be appreciated that GUI 1000 may enable the entry and/or display of different information in other embodiments. Additionally, although FIG. 10 shows a specific number of regions, it should be appreciated that GUI 1000 may include any number of regions in other embodiments. Further, it should be appreciated that information entered using GUI 1000 may be entered into a smaller number of regions (e.g., two or more types of information may be entered into the same region) in other embodiments.

Although FIGS. 11A, 11B, 11C, and 11D show energy transfer profiles (e.g., 1115, 1125, 1135, and 1145, respectively) with specific shapes, it should be appreciated that one or more of energy transfers profiles (e.g., 1115, 1125, 1135, 1145, etc.) may have different shapes in other embodiments. Additionally, it should be appreciated that an energy transfer may include any combination of one or more energy transfer profiles in one embodiment.

Although FIGS. 12A and 12B show data (e.g., 1200A and 1200B, respectively) with specific number of attributes, it should be appreciated that the data (e.g., 1200A, 1200B, etc.) may include a smaller or larger number of attributes in other embodiments. Additionally, although data 1200A is shown in FIG. 12A as including a specific amount and/or type of data (e.g., a specific number of rows of data, a specific number of rows of data for each energy transfer system, a specific number of rows of data for each attribute, etc.), it should be appreciated that data 1200A may include a different amount and/or type of data in other embodiments. Further, although data 1200B is shown in FIG. 12B as including a specific amount and/or type of data (e.g., a specific number of rows of data, a specific number of rows of data for each vehicle, a specific number of rows of data for each attribute, etc.), it should be appreciated that data 1200B may include a different amount and/or type of data in other embodiments.

FIG. 13 shows system 1300 including components used to perform operations associated with an energy transfer in accordance with one embodiment of the present invention. As shown in FIG. 13, energy transfer system 110 may include pre-transfer control component 1350 for performing operations before an energy transfer between the energy transfer system (e.g., 110) and one or more vehicles (e.g., 120, 320a, 320b, 320c, etc.). Pre-transfer control component 1350 may perform operations before an energy transfer (e.g., one or more of steps 2905 to 2960 of process 2900 of FIGS. 29A and 29B) either alone or in combination with at least one other component (e.g., a component of energy transfer system 110, a component of interface system 550, a component of one or more vehicles, etc.). In one embodiment, information transferred between an energy transfer system (e.g., 110) and interface system 550 or information transferred between a vehicle (e.g., 120, 320a, 320b, 320c, etc.) and interface system 550 may be communicated through or using pre-transfer control component 1350. And in one embodiment, information accessed by pre-transfer control component 1350 may be communicated between energy transfer system 110 and a vehicle (e.g., 120, 320a, 320b, 320c, etc.) over an energy transfer interface (e.g., 132, 231, 234, 237, etc.) and/or a signal interface (e.g., 134).

Post-transfer control component 1351 of energy transfer system 110 may be used to perform operations after an energy transfer between the energy transfer system (e.g., 110) and one or more vehicles (e.g., 120, 320a, 320b, 320c, etc.). Post-transfer control component 1351 may perform operations after an energy transfer (e.g., one or more of steps 2980 to 2990 of process 2900 of FIG. 29B) either alone or in combination with at least one other component (e.g., a component of energy transfer system 110, a component of interface system 550, a component of one or more vehicles, etc.). In one embodiment, information transferred between an energy transfer system (e.g., 110) and interface system 550 or information transferred between a vehicle (e.g., 120, 320a, 320b, 320c, etc.) and interface system 550 may be communicated through or using post-transfer control component 1351. And in one embodiment, information accessed by post-transfer control component 1351 may be communicated between energy transfer system 110 and a vehicle (e.g., 120, 320a, 320b, 320c, etc.) over an energy transfer interface (e.g., 132, 231, 234, 237, etc.) and/or a signal interface (e.g., 134).

As shown in FIG. 13, vehicle 120 may include pre-transfer control component 1390 for performing operations before an energy transfer between the vehicle (e.g., 120) and one or more energy transfer systems (e.g., 110, 710a, 710b, 710c, etc.). Pre-transfer control component 1390 may perform operations before an energy transfer (e.g., one or more of steps 2905 to 2960 of process 2900 of FIGS. 29A and 29B) either alone or in combination with at least one other component (e.g., a component of vehicle 120, a component of interface system 550, a component of one or more energy transfer systems, etc.). In one embodiment, information transferred between an energy transfer system (e.g., 110) and interface system 550 or information transferred between a vehicle (e.g., 120) and interface system 550 may be communicated through or using pre-transfer control component 1390. And in one embodiment, information accessed by pre-transfer control component 1390 may be communicated between vehicle 120 and an energy transfer system (e.g., 110, 710a, 710b, 710c, etc.) over an energy transfer interface (e.g., 132, 231, 234, 237, etc.) and/or a signal interface (e.g., 134).

Post-transfer control component 1391 of vehicle 120 may be used to perform operations after an energy transfer between the vehicle (e.g., 120) and one or more energy transfer systems (e.g., 110, 710a, 710b, 710c, etc.). Post-transfer control component 1391 may perform operations after an energy transfer (e.g., one or more of steps 2980 to 2990 of process 2900 of FIG. 29B) either alone or in combination with at least one other component (e.g., a component of vehicle 120, a component of interface system 550, a component of one or more energy transfer systems, etc.). In one embodiment, information transferred between an energy transfer system (e.g., 110) and interface system 550 or information transferred between a vehicle (e.g., 120, 320a, 320b, 320c, etc.) and interface system 550 may be communicated through or using post-transfer control component 1391. And in one embodiment, information accessed by post-transfer control component 1391 may be communicated between vehicle 120 and an energy transfer system (e.g., 110, 710a, 710b, 710c, etc.) over an energy transfer interface (e.g., 132, 231, 234, 237, etc.) and/or a signal interface (e.g., 134).

As shown in FIG. 13, camera 1321 and/or microphone 1323 may be used to monitor the site of an energy transfer system before an energy transfer, during an energy transfer, after an energy transfer, or some combination thereof. For example, camera 1321 may capture one or more images (e.g., at least one still image, at least one frame of video data, etc.) of at least one vehicle (e.g., 120, 320a, 320b, 320c, etc.), at least one other component of energy transfer system 110, at least one component of at least one other energy transfer system (e.g., 710a, 710b, 710c, etc.), a user of a vehicle, a user attempting to perform an energy transfer involving a vehicle, at least one other object at the site of an energy transfer, some combination thereof, etc. As another example, microphone 1323 may capture sound of at least one vehicle (e.g., 120, 320a, 320b, 320c, etc.), at least one other component of energy transfer system 110, at least one component of at least one other energy transfer system (e.g., 710a, 710b, 710c, etc.), a user of a vehicle, a user attempting to perform an energy transfer involving a vehicle, other objects at the site of an energy transfer, some combination thereof, etc. In one embodiment, camera 1321 and/or microphone 1323 may be disposed in or coupled with a housing which encloses components of energy transfer system 110, mounted separate from other components of energy transfer system 110 (e.g., as a standalone unit, in a building associated with a user of the energy transfer system, in an object within eyeshot or earshot of an energy transfer component of energy transfer system 110, etc.).

Camera 1371 and/or microphone 1373 may be used to monitor the site of an energy transfer system before an energy transfer, during an energy transfer, after an energy transfer, or some combination thereof. For example, camera 1371 may capture one or more images (e.g., at least one still image, at least one frame of video data, etc.) of at least one other component of vehicle 120, at least one component of another vehicle (e.g., 320a, 320b, 320c, etc.), at least one component of an energy transfer system (e.g., 110, 710a, 710b, 710c, etc.), a user of vehicle 120, a user attempting to perform an energy transfer involving vehicle 120, other objects at the site of an energy transfer, some combination thereof, etc. As another example, microphone 1373 may capture sound of at least one other component of vehicle 120, at least one other vehicle (e.g., 320a, 320b, 320c, etc.), at least one energy transfer system (e.g., 110, 710a, 710b, 710c, etc.), a user of vehicle 120, a user attempting to perform an energy transfer involving vehicle 120, other objects at the site of an energy transfer, some combination thereof, etc. In one embodiment, camera 1371 and/or microphone 1373 may be disposed in or coupled with a body panel of vehicle 120, a frame member of vehicle 120, a component within an interior of vehicle 120, a trunk of vehicle 120, or another component of vehicle 120. In this manner, events outside or inside one or more compartments of vehicle 120 can be monitored using camera 1371 and/or microphone 1373.

As shown in FIG. 13, speaker 1324 and/or speaker 1374 may be used to output sound associated with an energy transfer. For example, speaker 1324 and/or speaker 1374 may be used to provide instructions to a user (e.g., to plug in the vehicle to the energy transfer system, to relocate the vehicle to enable activation of at least one other energy transfer interface, to pay for at least one energy transfer using payment interface 1330, etc.). As another example, speaker 1324 and/or speaker 1374 may be used to provide information about an energy transfer (e.g., a duration of an energy transfer, at least one attribute of an energy transfer, one or more problems encountered before or during an energy transfer, etc.). Speaker 1324 and/or speaker 1374 may be used to sound an alarm, siren, warning or the like (e.g., responsive to determining that a vehicle has been stolen or that a user is attempting an unauthorized energy transfer involving the vehicle). As another example, speaker 1324 and/or speaker 1374 may be used to present an advertisement, incentive, or the like to a user. As yet another example, speaker 1324 and/or speaker 1374 may be used to provide output to a user (e.g., prompting user input via user interface 1325, user interface 1375, etc.). In one embodiment, speaker 1324 may be disposed in or coupled with a housing which encloses components of energy transfer system 110, mounted separate from other components of energy transfer system 110 (e.g., as a standalone unit, in a building associated with a user of the energy transfer system, in an object within earshot of an energy transfer component of energy transfer system 110, etc.). In one embodiment, speaker 1374 may be disposed in or coupled with a body panel of vehicle 120, a frame member of vehicle 120, a component within an interior of vehicle 120, a trunk of vehicle 120, or another component of vehicle 120.

User interface 1325 may be any component capable of receiving a user input. For example, user interface 1325 may include at least one physical button or key, a touch screen disposed over or otherwise corresponding to one or more regions of display 511, an audio input system, a voice recognition system, an optical recognition system capable of recognizing a fingerprint or eye (e.g., a retina of an eye, some other part of an eye, a distance between two eyes, etc.), some combination thereof, etc. In one embodiment, user interface 1325 may be implemented in accordance with (e.g., include components of, function similarly to, etc.) input component 4180 of FIG. 41. User interface 1325 may be disposed in or coupled with a housing which encloses components of energy transfer system 110, mounted separate from other components of energy transfer system 110 (e.g., as a standalone unit, in a building associated with a user of the energy transfer system, in an object within earshot of an energy transfer component of energy transfer system 110, etc.).

As shown in FIG. 13, user interface 1375 may be any component capable of receiving a user input. For example, user interface 1375 may include at least one physical button or key, a touch screen disposed over or otherwise corresponding to one or more regions of display 725, an audio input system, a voice recognition system, an optical recognition system capable of recognizing a fingerprint or eye (e.g., a retina of an eye, some other part of an eye, a distance between two eyes, etc.), some combination thereof, etc. In one embodiment, user interface 1375 may be implemented in accordance with (e.g., include components of, function similarly to, etc.) input component 4180 of FIG. 41. User interface 1375 may be disposed in or coupled with a body panel of vehicle 120, a frame member of vehicle 120, a component within an interior of vehicle 120, a trunk of vehicle 120, or another component of vehicle 120.

Authentication component 1340 may perform or assist in performing an authentication of a user. For example, authentication component 1340 may compare information associated with a user (e.g., a code entered using region 1040 of GUI 1000, audio captured of the user's voice, an image captured of the user's eye, an image captured of the user's fingerprint, etc.) to other information (e.g., a code entered using region 940 of GUI 900, audio captured of an authorized user's voice, an image captured of an authorized user's eye, an image captured of an authorized user's fingerprint, etc.) to determine if a user is authorized to perform an energy transfer between an energy transfer system (e.g., 110, 710a, 710b, 710c, etc.) and a vehicle (e.g., 120, 320a, 320b, 320c, etc.). As another example, authentication component 1340 may compare information associated with a user (e.g., a code entered using region 1040 of GUI 1000, audio captured of the user's voice, an image captured of the user's eye, an image captured of the user's fingerprint, etc.) to other information (e.g., a code entered using region 940 of GUI 900, audio captured of an authorized user's voice, an image captured of an authorized user's eye, an image captured of an authorized user's fingerprint, etc.) to determine if a user is authorized to use and/or move a vehicle (e.g., 120, 320a, 320b, 320c, etc.). Results of the user authentication may be communicated to interface system 550 (e.g., for presentation to a user via GUI 1000 if the user authentication is unsuccessful, to proceed with selection of an energy transfer using GUI 1000 if the user authentication is successful, etc.), to a vehicle associated with the user undergoing the authentication (e.g., to enable one or more components of the vehicle to allow the user to use and/or move the vehicle, to disable one or more components of the vehicle to reduce the ability of the user to use and/or move the vehicle, etc.), etc.

As shown in FIG. 13, authentication component 1380 may perform or assist in performing an authentication of a user. For example, authentication component 1380 may compare information associated with a user (e.g., a code entered using region 1040 of GUI 1000, audio captured of the user's voice, an image captured of the user's eye, an image captured of the user's fingerprint, etc.) to other information (e.g., a code entered using region 940 of GUI 900, audio captured of an authorized user's voice, an image captured of an authorized user's eye, an image captured of an authorized user's fingerprint, etc.) to determine if a user is authorized to perform an energy transfer between an energy transfer system (e.g., 110, 710a, 710b, 710c, etc.) and vehicle 120. As another example, authentication component 1380 may compare information associated with a user (e.g., a code entered using region 1040 of GUI 1000, audio captured of the user's voice, an image captured of the user's eye, an image captured of the user's fingerprint, etc.) to other information (e.g., a code entered using region 940 of GUI 900, audio captured of an authorized user's voice, an image captured of an authorized user's eye, an image captured of an authorized user's fingerprint, etc.) to determine if a user is authorized to use and/or move vehicle 120. Results of the user authentication may be communicated to interface system 550 (e.g., for presentation to a user via GUI 1000 if the user authentication is unsuccessful, to proceed with selection of an energy transfer using GUI 1000 if the user authentication is successful, etc.), to energy transfer system 110 (e.g., to reduce an ability of a user to transfer energy to and/or from vehicle 120, to report that the vehicle has been stolen, to sound an alarm, siren, warning, or the like, to begin monitoring the vehicle if the monitoring has not already begun, etc.), etc.

Payment interface 1330 may include at least one component configured to accept a payment associated with an energy transfer. For example, payment interface 1330 may include a payment receptacle capable of accepting coins, bills, checks, coupons, some combination thereof, etc. Payment interface may include a card reader capable of accepting payment via a credit card, debit card, gift card, etc., where the card reader may include a sensor capable of reading the card as it is slid through a slot of payment interface 1330, placed in proximity to a surface of payment interface 1330, placed on a surface of payment interface 1330, etc.

As shown in FIG. 13, dispenser 1331 may dispense an object associated with an energy transfer. For example, dispenser 1331 may dispense currency such as coins, bills, etc. (e.g., as payment for energy transferred from a vehicle to an energy transfer system). As another example, dispenser 1331 may dispense gift cards. As yet another example, dispenser 1331 may dispense coupons or other objects associated with an incentive (e.g., encouraging a user to make a purchase at a store owned by the same owner as the energy transfer system, encouraging a user to make a purchase at a store in a business relationship with an owner of the energy transfer system, etc.). In one embodiment, dispenser 1331 may be used to receive payment for one or more energy transfers (e.g., where a user is owed money due to an amount of energy transferred to an energy transfer system exceeding an amount of energy transferred from the energy transfer system).

Payment interface 1330 and/or dispenser 1331 may be used to provide payment for one or more energy transfers (e.g., where a user owes money due to an amount of energy transferred from an energy transfer system exceeding an amount of energy transferred to the energy transfer system) in one embodiment. For example, payment interface 1330 may be used to pay for the one or more energy transfers. As another example, dispenser 1331 may provide a coupon or an object associated with an incentive.

Although FIG. 13 shows energy transfer system 110 and vehicle 120 with a specific number of components, it should be appreciated that energy transfer system 110 and/or vehicle 120 may include a larger or smaller number of components in other embodiments. In one embodiment, two or more components may be combined, a component may be separated into multiple components, some combination thereof, etc. It should also be appreciated that the components depicted in FIG. 13 may be arranged differently (e.g., a sub-component of one component may be a sub-component of another component, a sub-component of a component may exist outside the component as another component, a component may be a sub-component of another component, etc.) in other embodiments. In one embodiment, energy transfer system 110 and/or vehicle 120 may include one or more components of computer system 4100 of FIG. 41.

FIG. 14 shows energy transfer management component 1410 for managing an energy transfer in accordance with one embodiment of the present invention. In one embodiment, energy transfer monitoring component 1412 may monitor a state of energy transfer system 110. For example, energy transfer monitoring component 1412 may monitor parameters of power management component 215, charge and/or discharge component 218, interface component 211, another component of energy transfer system 110, etc., where the parameters may include a number of energy transfers handled by a component at a particular time, a direction of the energy transfers through a component, an attribute (e.g., an energy transfer type, an interface type, a power, a current, a voltage, an energy transfer profile, a duration, a waveform, a temperature, etc.) of one or more energy transfers handled by a component, etc. As another example, energy transfer monitoring component 1412 may monitor at least one energy transfer from one component of energy transfer system 110 to another component of energy transfer system 110, at least one energy transfer between energy transfer system 110 and at least one vehicle (e.g., 120, 320a, 320b, 320c, etc.), at least one energy transfer between energy transfer system 110 and another system, etc. And as yet another example, energy transfer monitoring component 1412 may monitor a remaining capacity of the energy transfer system to transfer energy (e.g., measured in units of a current, power, etc.). In one embodiment, the remaining capacity of the energy transfer system to transfer energy may be calculated by subtracting a current energy transfer rate to the energy transfer system (e.g., from power grid 250) from a maximum energy transfer rate to the energy transfer system (e.g., determined by power grid 250, a utility supplying power to the energy transfer system, a rating of an electrical service entrance supplying energy to the energy transfer system, a local building code, etc.) and then adding the result to a cumulative energy transfer rate (if any exists) supplied by components of the energy transfer system (e.g., energy storage component 216, power source 217, etc.) and/or supplied by one or more vehicles (e.g., 120, 320a, 320b, 320c, etc.). And as another example, energy transfer monitoring component 1412 may monitor problems or interrupts associated with energy transfer system 110 (e.g., associated with one or more components of energy transfer system 110, associated with one or more energy transfer interfaces coupled to energy transfer system 110 and/or at least one vehicle, as detected or monitored by interface monitoring component 213, as detected or monitored by interface monitoring component 223, etc.).

A state of energy transfer system 110 (e.g., monitored and/or determined using energy transfer management component 1410) may be used to determine at least one attribute for an energy transfer. For example, the state of the energy transfer system may be used to filter attributes associated with energy transfers which exceed a capacity of the energy transfer system to transfer energy at a particular time, which cannot be performed (e.g., due to a problem with an energy transfer interface, due to a problem with a signal interface, etc.), etc. As another example, attributes may be filtered based upon a user preference associated with a state of the energy transfer system (e.g., higher energy transfer rates should be filtered as the capacity of the energy transfer system to transfer energy goes down). In one embodiment, the attributes which are not filtered may be displayed to a user for selection (e.g., in region 1060 of GUI 1000), while the attributes which are filtered may be hidden or not displayed to a user for selection. As such, embodiments can provide more efficient user interaction, more efficient data processing, a reduction in an amount of data transferred related to one or more energy transfers, etc.

In one embodiment, a state of energy transfer system 110 (e.g., monitored and/or determined using energy transfer management component 1410) may be used to determine at least one cost for an energy transfer. For example, the state of the energy transfer system may be used to determine a supply of energy and/or a demand for energy, where the supply and/or demand may be used to determine a cost of an energy transfer. As another example, a state of the energy transfer system may be used to determine an attribute for the energy transfer and the attribute may be used to determine a cost for the energy transfer, and therefore, the cost of an energy transfer may be determined based upon a state of the energy transfer system.

Energy transfer monitoring component 1412 may monitor the state of the energy transfer system (e.g., 110) over time. For example, data associated with one or more components or interfaces of the energy transfer system may be sampled or captured at a plurality of times. As such, in one embodiment, energy transfer monitoring component 1412 may provide real-time monitoring (or nearly real-time monitoring due to latencies associated with data reads, data writes, data transfer, etc.) of the energy transfer system. Additionally, in one embodiment, the data may be stored (e.g., in a memory of energy transfer system 110) for subsequent access and/or processing (e.g., to perform analysis used to determine trends, patterns, etc.).

In one embodiment, information associated with the state of the energy transfer system (e.g., monitored and/or determined using energy transfer monitoring component 1412) may be communicated to an external system. For example, communication interface 241 may be used to communicate the information associated with the state (e.g., represented by arrow 1422) to interface system 550 (e.g., for use in presenting one or more energy transfers for selection by a user via a GUI such as GUI 1000). In one embodiment, the information associated with the state may be used (e.g., by interface system 550) to determine at least one attribute associated with an energy transfer, determine at least one cost associated with an energy transfer, to determine a recommendation associated with an energy transfer, etc. In one embodiment, the information associated with the state may be used (e.g., by interface system 550) to determine at least one energy transfer to present to a user for selection (e.g., via a GUI such as GUI 1000).

As shown in FIG. 14, energy transfer control component 1414 may control one or more energy transfers between a plurality of components, where the components are part of energy transfer system 110 (e.g., energy storage component 216, power source 217, power management component 215, charge and/or discharge component 218, charge and/or discharge component 418*a*, charge and/or discharge component 418*b*, charge and/or discharge component 418*c*, etc.) or part of another system (e.g., one or more vehicles coupled to energy transfer system 110, etc.). In one embodiment, energy transfer control component 1414 may control one or more energy transfers by controlling or configuring at least one component of energy transfer system 110 (e.g., energy storage component 216, power source 217, power management component 215, charge and/or discharge component 218, charge and/or discharge component 418*a*, charge and/or discharge component 418*b*, charge and/or discharge component 418*c*, etc.), where the controlling or configuring may involve specifying the number of energy transfers implemented using a particular component of energy transfer system 110 at any given time, one or more components supplying energy for an energy transfer, one or more components receiving energy as a result of an energy transfer, the direction of each energy transfer, some combination thereof, etc. In one embodiment, energy transfer control component 1414 may control one or more energy transfers by controlling or configuring at least one component of another system (e.g., energy storage component 226, power source 227, power management component 225, charge and/or discharge component 228, another component of vehicle 120, a component of another system, etc.), where the controlling or configuring may involve specifying the number of energy transfers implemented using a particular component of the system at any given time, one or more components supplying energy for an energy transfer, one or more components receiving energy as a result of an energy transfer, the direction of each energy transfer, some combination thereof, etc.

In one embodiment, energy transfer control component 1414 may control one or more energy transfers based on at least one communication with another system. For example, information about an energy transfer to be performed (e.g., represented by arrow 1424) may be received by communication interface 241 (e.g., communicated from interface system 550), where the information may include at least one attribute of one or more energy transfers to be performed. In one embodiment, the information may be determined (e.g., by interface system 550) based upon one or more user selections associated with at least one energy transfer (e.g., input using a GUI such as GUI 1000). In this manner, the information received by energy transfer system 110 (e.g., communicated from interface system 550) may be used to control or configure at least one component (e.g., of energy transfer system 110 and/or of another system such as at least one vehicle coupled to energy transfer system 110) to implement the one or more energy transfers.

Figure 15:
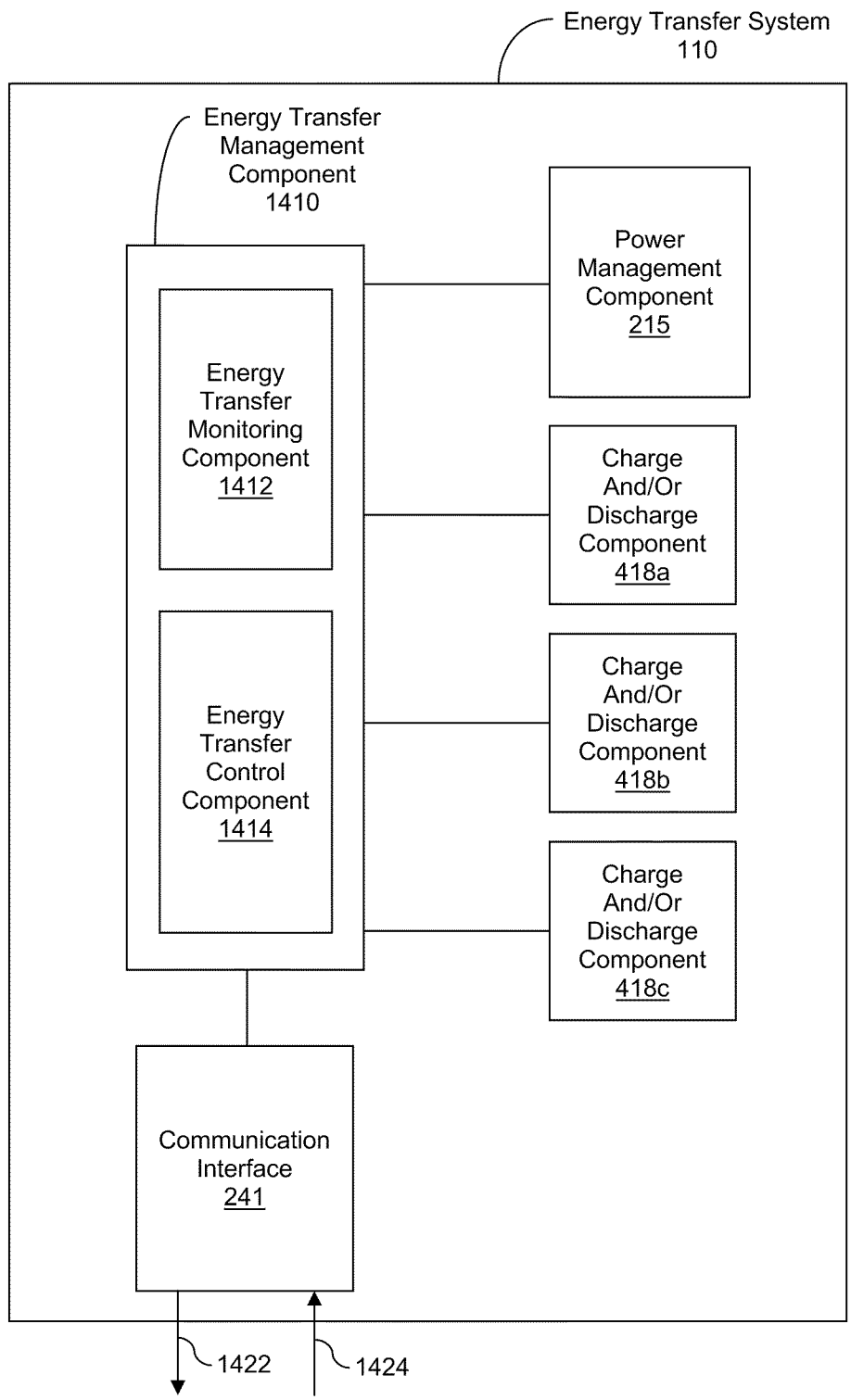
FIG. 15 shows an energy transfer management component including a plurality of charge and/or discharge components in accordance with one embodiment of the present invention.

Although FIG. 14 shows energy transfer system with a specific number of components, it should be appreciated that energy transfer system 110 may include any number of components in other embodiments. For example, although FIG. 14 shows only one charge and/or discharge component (e.g., 218), energy transfer system 110 may include more than one charge and/or discharge component (e.g., three charge and/or discharge components 418*a*, 418*b*, and 418*c* as shown in FIG. 15, another number of charge and/or discharge components, etc.) in other embodiments.

Figure 16:
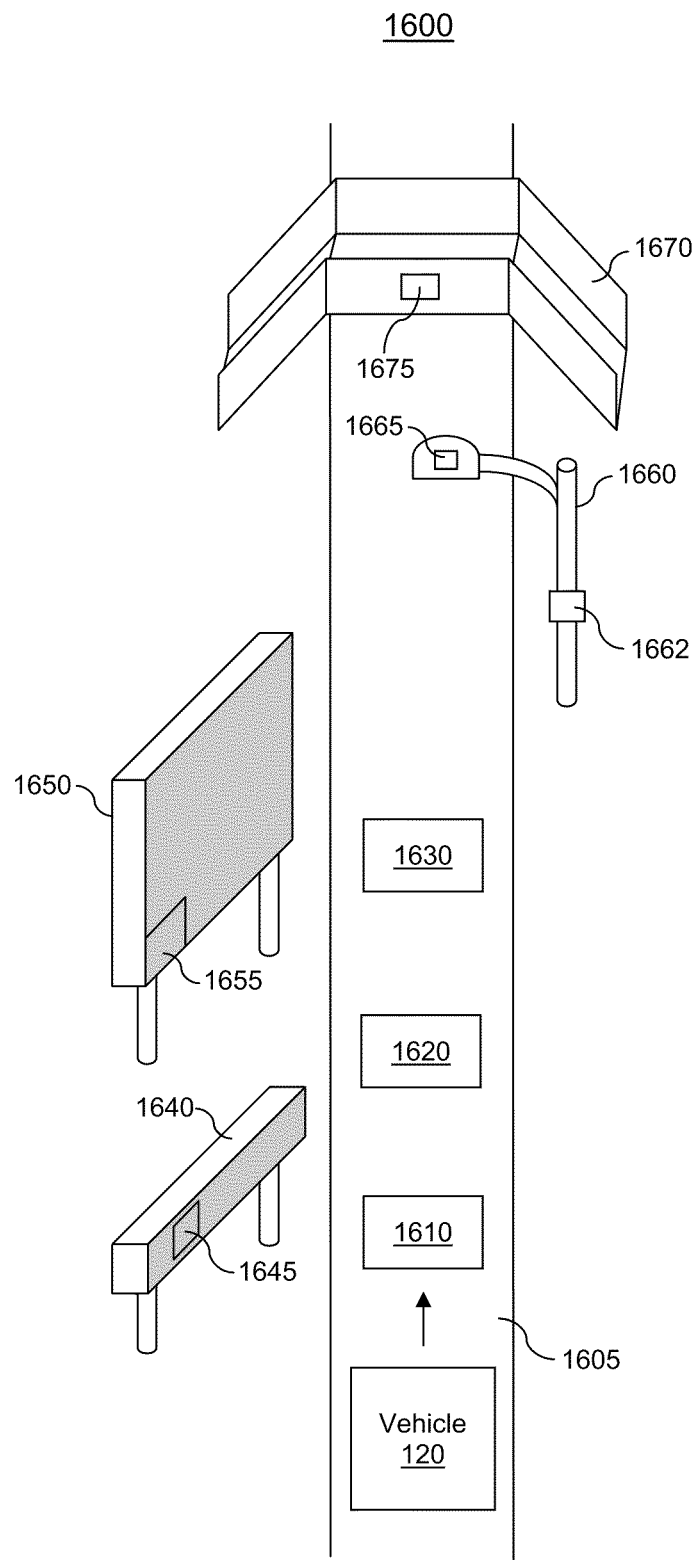
FIG. 16 shows a diagram of energy transfer components disposed at different locations along a vehicle route in accordance with one embodiment of the present invention.

FIG. 16 shows diagram 1600 of energy transfer components (e.g., 1610, 1620, 1630, 1645, 1655, 1662, 1665, 1675, etc.) disposed at different locations along a vehicle route (e.g., 1605) in accordance with one embodiment of the present invention. The vehicle route (e.g., 1605) may be a roadway, a route for a boat, a taxiway or runway for an aircraft, etc. One or more of the energy transfer components (e.g., 1610, 1620, 1630, 1645, 1655, 1662, 1665, 1675, etc.) may be part of or coupled to an energy transfer system (e.g., 110). As such, one or more energy transfers may be performed between a vehicle (e.g., 120) and an energy transfer system (e.g., 110) at a plurality of locations (e.g., while the vehicle is moving or stationary) along the vehicle route (e.g., 1605) using at least one energy transfer component (e.g., 1610, 1620, 1630, 1645, 1655, 1662, 1665, 1675, etc.). And in one embodiment, one or more of the energy transfer components (e.g., 1610, 1620, 1630, 1645, 1655, 1662, 1665, 1675, etc.) depicted in FIG. 16 may be part of or coupled to an energy transfer system (e.g., 110) for performing one or more energy transfers with at least one vehicle (e.g., 120, 320a, 320b, 320c, etc.).

As shown in FIG. 16, at least one energy transfer component (e.g., 1610, 1620, 1630, etc.) may be disposed on a surface of the vehicle route (e.g., 1605), protruding from a surface of the vehicle route (e.g., 1605), or disposed beneath a surface of the vehicle route (e.g., 1605). In one embodiment, the energy transfer component may be disposed within a component that performs another function (e.g., within a reflector coupled with a surface of the vehicle route, within a marker coupled with a surface of the vehicle route, within a light coupled with a surface of the vehicle route, etc.). As such, in one embodiment, energy may be transferred between a vehicle and an energy transfer system using at least one energy transfer component located on the bottom of the vehicle, the front of the vehicle, the rear of the vehicle, a wheel of the vehicle, a tire of the vehicle, another component of the vehicle, etc. Energy may be transferred between the vehicle and the energy transfer system as the vehicle moves toward the energy transfer component, as the vehicle moves over the energy transfer component, as the vehicle moves away from the energy transfer component, some combination thereof, etc.

At least one energy transfer component (e.g., 1645, 1655, 1662, etc.) may be disposed beside the vehicle route (e.g., 1605). For example, one or more energy transfer components (e.g., 1645) may be coupled with and/or disposed at least partially within a guardrail (e.g., 1640) located near or next to a vehicle route. As another example, one or more energy transfer components (e.g., 1655) may be coupled with and/or disposed at least partially within a sign or billboard (e.g., 1650) located near or next to a vehicle route. As yet another example, one or more energy transfer components (e.g., 1662) may be coupled with and/or disposed at least partially within a lamp or pole (e.g., 1660) located near or next to a vehicle route. As such, in one embodiment, energy may be transferred between a vehicle and an energy transfer system using at least one energy transfer component disposed on the side of the vehicle, the bottom of the vehicle, the top of the vehicle, the front of the vehicle, the rear of the vehicle, a wheel of the vehicle, a tire of the vehicle, another component of the vehicle, etc. Energy may be transferred between the vehicle and the energy transfer system as the vehicle moves toward the energy transfer component, as the vehicle passes by the energy transfer component, as the vehicle moves away from the energy transfer component, some combination thereof, etc.

As shown in FIG. 16, at least one energy transfer component (e.g., 1665, 1675, etc.) may be disposed above the vehicle route (e.g., 1605). For example, one or more energy transfer components (e.g., 1665) may be coupled with and/or disposed at least partially within a lamp or streetlight (e.g., 1660) located above a vehicle route. As another example, one or more energy transfer components (e.g., 1675) may be coupled with and/or disposed at least partially within an overpass or footbridge (e.g., 1670) located above a vehicle route. As such, in one embodiment, energy may be transferred between a vehicle and an energy transfer system using at least one energy transfer component disposed on the top of the vehicle, the front of the vehicle, the rear of the vehicle, the side of the vehicle, a wheel of the vehicle, a tire of the vehicle, another component of the vehicle, etc. Energy may be transferred between the vehicle and the energy transfer system as the vehicle moves toward the energy transfer component, as the vehicle passes under the energy transfer component, as the vehicle moves away from the energy transfer component, some combination thereof, etc.

One or more of the energy transfer components (e.g., 1610, 1620, 1630, 1645, 1655, 1662, 1665, 1675, etc.) may be implemented in accordance with (e.g., include components of, function similarly to, etc.) energy transfer component 232, and therefore, the one or more energy transfer components (e.g., 1610, 1620, 1630, 1645, 1655, 1662, 1665, 1675, etc.) may include at least one electrical contact (e.g., disposed in or coupled with a plug, disposed in or coupled with a receptacle, etc.). In one embodiment, one or more energy transfer components (e.g., 1610, 1620, 1630, 1645, 1655, 1662, 1665, 1675, etc.) may be implemented in accordance with (e.g., include components of, function similarly to, etc.) energy transfer component 235, and therefore, the one or more energy transfer components (e.g., 1610, 1620, 1630, 1645, 1655, 1662, 1665, 1675, etc.) may be capable of enabling an inductive energy transfer over an energy transfer interface (e.g., 234) between the vehicle (e.g., 120) and the energy transfer system (e.g., 110). And in one embodiment, one or more energy transfer components (e.g., 1610, 1620, 1630, 1645, 1655, 1662, 1665, 1675, etc.) may be implemented in accordance with (e.g., include components of, function similarly to, etc.) energy transfer component 238, and therefore, the one or more energy transfer components (e.g., 1610, 1620, 1630, 1645, 1655, 1662, 1665, 1675, etc.) may be capable of enabling a wireless energy transfer over an energy transfer interface (e.g., 237) between the vehicle (e.g., 120) and the energy transfer system (e.g., 110).

As shown in FIG. 16, each energy transfer component (e.g., 1610, 1620, 1630, 1645, 1655, 1662, 1665, 1675, etc.) may be coupled to a respective set of components for performing an energy transfer. For example, energy transfer component 1610 may be coupled to a first set of components (e.g., 410), energy transfer component 1620 may be coupled to a second set of components (e.g., 420), energy transfer component 1630 may be coupled to a third set of components (e.g., 430), etc. In one embodiment, at least two energy transfer components may share a common set of components. For example, energy transfer components 1620 and 1630 may be coupled to the same set of components (e.g., 420). The set of components coupled to or supporting an energy transfer component may be co-located with the energy transfer component (e.g., disposed in the same housing), located near the energy transfer component (e.g., disposed in a separate housing in proximity to the energy transfer component, within eyeshot of the energy transfer component, within earshot of the energy transfer component, etc.), or located further away from the energy transfer component (e.g., disposed in a separate housing out of eyeshot and/or earshot from the energy transfer component).

In one embodiment, a group of energy transfer components (e.g., 1610, 1620, 1630, 1645, 1655, 1665, 1675, etc.) may be activated (e.g., by interface component 211) simultaneously or contemporaneously to enable a plurality of energy transfers to be conducted with a vehicle simultaneously or contemporaneously. For example, energy transfer components 1610 and 1620 may be conduct energy transfers with a vehicle (e.g., 120) at a first time, and energy transfer components 1620 and 1630 may be conduct energy transfers with a vehicle (e.g., 120) at a second time. It should be appreciated that any combination of energy transfer components may be used to perform one or more energy transfers with a vehicle at any given time. For example, a first combination of energy transfer components may be used to perform one or more energy transfers with a vehicle at a first time, and a second combination of energy transfer components may be used to perform one or more energy transfers with a vehicle at a second time.

As shown in FIG. 16, use of a plurality of energy transfer components (e.g., 1610, 1620, 1630, 1645, 1655, 1665, 1675, some combination thereof, etc.) to conduct simultaneous or contemporaneous energy transfers with a vehicle may advantageously enable a higher overall energy transfer rate compared to conventional systems. For example, where the energy transfer rate for each energy transfer component is limited (e.g., at a value set by the manufacturer, by mechanical and/or electrical limitations of the energy transfer component, etc.), use of a larger amount of energy transfer components to perform the energy transfer can result in a larger overall rate of energy transfer to the vehicle. Further, by using a plurality of energy transfer components to perform simultaneous or contemporaneous energy transfers, the respective energy transfer rate implemented by each of the energy transfer components can be reduced below that of a conventional energy transfer component of a conventional system (e.g., while still maintaining the same or larger overall rate of energy transfer between the vehicle and the energy transfers system). In this manner, embodiments of the present invention can provide an energy transfer rate which equals or exceeds the energy transfer rate of a conventional system while reducing the heat produced by each of energy transfer components, extending the lifetime of the energy transfer components, increasing the efficiency of the energy transfer (e.g., by operating each energy transfer component at a reduced load where they are more efficient, etc.), etc.

In one embodiment, a group of energy transfer components (e.g., 1610, 1620, 1630, 1645, 1655, 1665, 1675, etc.) may be activated (e.g., by interface component 211) sequentially to enable one or more energy transfers to be conducted with a vehicle. For example, a first energy transfer component (e.g., 1610) may be used to perform a first energy transfer with a vehicle (e.g., 120). After the first energy transfer is completed, a second energy transfer component (e.g., 1620) may be used to perform a second energy transfer with the vehicle. As another example, a first group of energy transfer components (e.g., 1610 and 1645) may be used to perform a first energy transfer with a vehicle (e.g., 120), and a second group of energy transfer components (e.g., 1620 and 1655) may be used to perform a second energy transfer with the vehicle after the first energy transfer is completed.

Although FIG. 16 shows a specific number, arrangement, shape, and size of energy transfer components, it should be appreciated that a different number, arrangement, shape, and/or size of energy transfer components may be used in other embodiments. Additionally, although FIG. 16 shows a specific number, arrangement, shape, and size of objects, it should be appreciated that a different number, arrangement, shape, and/or size of objects may be used in other embodiments. Further, although FIG. 16 shows a specific number, arrangement, shape, and size of energy transfer components in each object, it should be appreciated that an object may include any number, arrangement, shape, and/or size of energy transfer components in other embodiments.

FIG. 17 shows diagram 1700 of components for performing one or more energy transfers with a vehicle in accordance with one embodiment of the present invention. In one embodiment, energy transfer components may be positioned in or around object 1770, where object 1770 may be located in an area where one or more vehicles are parked or otherwise remain stationary for some period of time. For example, object 1770 may be a park strip or curb next to parking spaces for automobiles, motorcycles, or another type of vehicle. As another example, object 1770 may be a boat dock. As yet another example, object 1770 may be a jet bridge (e.g., enabling passengers to board an aircraft), terminal building or other object near where an aircraft can be stopped. And in one embodiment, one or more of the energy transfer components (e.g., 1711-1715, 1721-1728, 1731-1735, 1742, 1744, 1752, 1754, 1783, 1785, etc.) depicted in FIG. 17 may be part of or coupled to an energy transfer system (e.g., 110) for performing one or more energy transfers with at least one vehicle (e.g., 120, 320a, 320b, 320c, etc.).

As shown in FIG. 17, one or more energy transfer components (e.g., 1721, 1722, 1723, 1724, 1725, 1726, 1727, 1728, etc.) may be coupled with or otherwise disposed at least partially within the ground. In one embodiment, a first set of energy transfer components (e.g., 1721, 1722, 1723 and 1724) may be located in a first area (e.g., a parking space, stall, etc.) for transferring energy with a first vehicle (e.g., 120, 320a, 320b, 320c, etc.), and a second set of energy transfer components (e.g., 1725, 1726, 1727 and 1728) may be located in a second area (e.g., a parking space, stall, etc.) for transferring energy with a second vehicle (e.g., 120, 320a, 320b, 320c, etc.). In one embodiment, one or more energy transfer components (e.g., 1721, 1722, 1723, 1724, 1725, 1726, 1727, 1728, etc.) may be coupled with or otherwise disposed at least partially within an enclosure or housing (e.g., 1720), where the enclosure or housing (e.g., 1720) may be coupled with or otherwise disposed at least partially within the ground. As such, in one embodiment, energy may be transferred between a vehicle and an energy transfer system using at least one energy transfer component located on the bottom of the vehicle, the front of the vehicle, the rear of the vehicle, a wheel of the vehicle, a tire of the vehicle, another component of the vehicle, etc. Energy may be transferred between the vehicle and the energy transfer system (e.g., using energy transfer component 1721, 1722, 1723, 1724, 1725, 1726, 1727, 1728, some combination thereof, etc.) while the vehicle is stationary and/or while the vehicle is moving (e.g., toward the energy transfer component, away from the energy transfer component, alternatively moving with respect to the energy transfer component, etc.).

One or more energy transfer components (e.g., 1711, 1712, 1713, 1714, 1715, etc.) may be coupled with or otherwise disposed at least partially within a wheel stop (e.g., 1710). A wheel stop may be any object placed, secured, integrally formed, etc. with the ground and capable of slowing down or stopping a vehicle as a tire or wheel of vehicle comes into contact with the wheel stop. In one embodiment, a first set of energy transfer components (e.g., 1711, 1712, and 1713) may be located on a first side or surface of the wheel stop for transferring energy with one or more energy transfer components located in a first region of a vehicle (e.g., coupled with or disposed within a portion of the body of the vehicle which overlaps one or more of the energy transfer components), and a second set of energy transfer components (e.g., 1714 and 1715) may be located on a second side or surface of the wheel stop for transferring energy with one or more energy transfer components located in a second region of a vehicle (e.g., coupled with or disposed within a wheel or tire of the vehicle). As such, in one embodiment, energy may be transferred between a vehicle and an energy transfer system using at least one energy transfer component located on the bottom of the vehicle, the front of the vehicle, the rear of the vehicle, a wheel of the vehicle, a tire of the vehicle, another component of the vehicle, etc. Energy may be transferred between the vehicle and the energy transfer system (e.g., using energy transfer component 1711, 1712, 1713, 1714, 1715, some combination thereof, etc.) while the vehicle is stationary and/or while the vehicle is moving (e.g., toward the energy transfer component, away from the energy transfer component, alternatively moving with respect to the energy transfer component, etc.).

As shown in FIG. 17, one or more energy transfer components (e.g., 1731, 1732, 1733, 1734, 1735, etc.) may be coupled with or otherwise disposed at least partially within enclosure or housing 1730, where enclosure or housing 1730 may be secured to and/or disposed at least partially within object 1770. In one embodiment, enclosure 1730 may form a curb (e.g., either alone or in combination with object 1770). In one embodiment, one or more surfaces of enclosure or housing 1730 may be flush or substantially flush with one or more surfaces of object 1770, thereby improving aesthetics of the installation, discouraging tampering with the energy transfer components or other components of the energy transfer system, improving cleanliness of the installation (e.g., by reducing ridges or other areas where dirt or other debris can collect), etc. Alternatively, one or more energy transfer components (e.g., 1731, 1732, 1733, 1734, 1735, etc.) may be coupled with or otherwise disposed at least partially within object 1770 in one embodiment.

In one embodiment, a first set of energy transfer components (e.g., 1731, 1732, and 1733) may be located on a first side or surface (e.g., of the curb, of enclosure or housing 1730, etc.) for transferring energy with one or more energy transfer components located in a first region of a vehicle (e.g., coupled with or disposed within a portion of the body of the vehicle which overlaps one or more of the energy transfer components), and a second set of energy transfer components (e.g., 1734 and 1735) may be located on a second side or surface (e.g., of the curb, of enclosure or housing 1730, etc.) for transferring energy with one or more energy transfer components located in a second region of a vehicle (e.g., coupled with or disposed within a wheel or tire of the vehicle). As such, in one embodiment, energy may be transferred between a vehicle and an energy transfer system using at least one energy transfer component located on the bottom of the vehicle, the front of the vehicle, the rear of the vehicle, a wheel of the vehicle, a tire of the vehicle, another component of the vehicle, etc. Energy may be transferred between the vehicle and the energy transfer system (e.g., using energy transfer component 1731, 1732, 1733, 1734, 1735, some combination thereof, etc.) while the vehicle is stationary and/or while the vehicle is moving (e.g., toward the energy transfer component, away from the energy transfer component, alternatively moving with respect to the energy transfer component, etc.).

As shown in FIG. 17, one or more energy transfer components (e.g., 1742, 1744, 1752, 1754, etc.) may be coupled with or otherwise disposed at least partially within an object (e.g., 1740, 1750, etc.). In one embodiment, the object may be located near or within a line of sight of at least one energy transfer component of a vehicle (e.g., coupled with object 1770, located further from the vehicle, etc.). As such, one or more energy transfer components (e.g., 1742, 1744, etc.) may be used to perform an energy transfer with a vehicle when the vehicle is positioned (e.g., stationary, moving, etc.) in a first location (e.g., above or near energy transfer component 1721, 1722, 1723, 1724, another location, etc.), and one or more other energy transfer components (e.g., 1752, 1754, etc.) may be used to perform an energy transfer with a vehicle when the vehicle is positioned (e.g., stationary, moving, etc.) in a second location (e.g., above or near energy transfer component 1725, 1726, 1727, 1728, another location, etc.). Thus, in one embodiment, energy may be transferred between a vehicle and an energy transfer system using at least one energy transfer component located on any side of the vehicle (e.g., top, bottom, front, rear, passenger side, driver side, pilot side, port, starboard, etc.), a wheel of the vehicle, a tire of the vehicle, another component of the vehicle, etc. Energy may be transferred between the vehicle and the energy transfer system (e.g., using energy transfer component 1742, 1744, 1752, 1754, some combination thereof, etc.) while the vehicle is stationary and/or while the vehicle is moving (e.g., toward the energy transfer component, away from the energy transfer component, alternatively moving with respect to the energy transfer component, etc.).

One or more energy transfer components (e.g., 1783, 1785, etc.) may be coupled with or otherwise disposed at least partially within an object (e.g., enclosure or housing 1782, enclosure or housing 1784, etc.) coupled with and/or integrally formed with a building (e.g., 1780). In one embodiment, the object may be located near or within a line of sight of at least one energy transfer component of a vehicle. As such, one or more energy transfer components (e.g., 1783, 1785, etc.) may be used to perform an energy transfer with a vehicle when the vehicle is positioned (e.g., stationary, moving, etc.) in a first location (e.g., above or near energy transfer component 1721, 1722, 1723, 1724, etc.), in a second location (e.g., above or near energy transfer component 1725, 1726, 1727, 1728, etc.), some other location, etc. Thus, in one embodiment, energy may be transferred between a vehicle and an energy transfer system using at least one energy transfer component located on any side of the vehicle (e.g., top, bottom, front, rear, passenger side, driver side, pilot side, port, starboard, etc.), a wheel of the vehicle, a tire of the vehicle, another component of the vehicle, etc. Energy may be transferred between the vehicle and the energy transfer system (e.g., using energy transfer component 1783, 1785, some combination thereof, etc.) while the vehicle is stationary and/or while the vehicle is moving (e.g., toward the energy transfer component, away from the energy transfer component, alternatively moving with respect to the energy transfer component, etc.).

As shown in FIG. 17, one or more of the energy transfer components (e.g., 1711-1715, 1721-1728, 1731-1735, 1742, 1744, 1752, 1754, 1783, 1785, etc.) may be implemented in accordance with (e.g., include components of, function similarly to, etc.) energy transfer component 232, and therefore, the one or more energy transfer components (e.g., 1711-1715, 1721-1728, 1731-1735, 1742, 1744, 1752, 1754, 1783, 1785, etc.) may include at least one electrical contact (e.g., disposed in or coupled with a plug, disposed in or coupled with a receptacle, etc.). In one embodiment, one or more energy transfer components (e.g., 1711-1715, 1721-1728, 1731-1735, 1742, 1744, 1752, 1754, 1783, 1785, etc.) may be implemented in accordance with (e.g., include components of, function similarly to, etc.) energy transfer component 235, and therefore, the one or more energy transfer components (e.g., 1711-1715, 1721-1728, 1731-1735, 1742, 1744, 1752, 1754, 1783, 1785, etc.) may be capable of enabling an inductive energy transfer over an energy transfer interface (e.g., 234) between the vehicle (e.g., 120) and an energy transfer system (e.g., 110). And in one embodiment, one or more energy transfer components (e.g., 1711-1715, 1721-1728, 1731-1735, 1742, 1744, 1752, 1754, 1783, 1785, etc.) may be implemented in accordance with (e.g., include components of, function similarly to, etc.) energy transfer component 238, and therefore, the one or more energy transfer components (e.g., 1711-1715, 1721-1728, 1731-1735, 1742, 1744, 1752, 1754, 1783, 1785, etc.) may be capable of enabling a wireless energy transfer over an energy transfer interface (e.g., 237) between the vehicle (e.g., 120) and the energy transfer system (e.g., 110).

In one embodiment, a group of energy transfer components configured to transfer energy with a particular vehicle (e.g., 1711-1715, 1721-1724, 1742, 1744, etc.) may be capable of implementing a plurality of different types of energy transfer interfaces. For example, energy transfer component 1742 may be capable of implementing a wired energy transfer interface, energy transfer component 1744 may be capable of implementing a wireless energy transfer interface, and energy transfer components 1711-1715 and 1721-1724 may be capable of implementing an inductive energy transfer interface. In this manner, embodiments of the present invention can improve compatibility with different types of vehicles, increase redundancy, enable simultaneous or contemporaneous energy transfers with the particular vehicle, some combination thereof, etc. And in one embodiment, a group of energy transfer components configured to transfer energy with a particular vehicle (e.g., 1711-1715, 1721-1724, 1742, 1744, etc.) may be coupled to a common set of components (e.g., 410) of an energy transfer system (e.g., 110).

As shown in FIG. 17, each energy transfer component (e.g., 1711-1715, 1721-1728, 1731-1735, 1742, 1744, 1752, 1754, 1783, 1785, etc.) may be coupled to a respective set of components for performing an energy transfer. For example, energy transfer component 1721 may be coupled to a first set of components (e.g., 410), energy transfer component 1725 may be coupled to a second set of components (e.g., 420), etc. In one embodiment, at least two energy transfer components may share a common set of components. For example, energy transfer components 1721-1724 and 1711-1715 may be coupled to the same set of components (e.g., 410). The set of components coupled to or supporting an energy transfer component may be co-located with the energy transfer component. For example, a set of components (e.g., 410, 420, 430, etc.) coupled to or supporting a first energy transfer component (e.g., 1723, 1724, etc.) may be disposed in a enclosure or housing (e.g., 1720) of the first energy transfer component, a set of components (e.g., 410, 420, 430, etc.) coupled to or supporting a second energy transfer component (e.g., 1711, 1712, 1713, 1714, 1715, etc.) may be disposed in a enclosure or housing (e.g., wheel stop 1710) of the second energy transfer component, a set of components (e.g., 410, 420, 430, etc.) coupled to or supporting a third energy transfer component (e.g., 1731, 1732, 1733, 1734, 1735, etc.) may be disposed in a enclosure or housing (e.g., 1730) of the third energy transfer component, a set of components (e.g., 410, 420, 430, etc.) coupled to or supporting a fourth energy transfer component (e.g., 1742, 1744, 1752, 1754, etc.) may be disposed in an enclosure or housing (e.g., 1740, 1750, etc.) of the fourth energy transfer component, a set of components (e.g., 410, 420, 430, etc.) coupled to or supporting a fifth energy transfer component (e.g., 1783, 1785, etc.) may be disposed in a enclosure or housing (e.g., 1782, 1784, etc.) of the fifth energy transfer component, etc. Alternatively, the set of components coupled to or supporting an energy transfer component may be located near the energy transfer component (e.g., disposed in a separate housing in proximity to the energy transfer component, within eyeshot of the energy transfer component, etc.) or located further away from the energy transfer component (e.g., disposed in a separate housing out of eyeshot and/or earshot from the energy transfer component).

In one embodiment, a group of energy transfer components (e.g., 1711-1715, 1721-1728, 1731-1735, 1742, 1744, 1752, 1754, 1783, 1785, etc.) may be activated (e.g., by interface component 211) simultaneously or contemporaneously to enable a plurality of energy transfers to be conducted with a vehicle at any given time. For example, energy transfer components 1711, 1721, and 1742 may conduct simultaneous or contemporaneous energy transfers with a first vehicle (e.g., 320*a*), and energy transfer components 1731, 1725, and 1752 may conduct simultaneous or contemporaneous energy transfers with a second vehicle (e.g., 320*b*). It should be appreciated that any combination of energy transfer components may be used to perform one or more energy transfers with a vehicle at any given time. For example, a first combination of energy transfer components may be used to perform one or more energy transfers with a first vehicle at the same time as a second combination of energy transfer components are used to perform one or more energy transfers with a second vehicle.

As shown in FIG. 17, use of a plurality of energy transfer components (e.g., 1711-1715, 1721-1728, 1731-1735, 1742, 1744, 1752, 1754, 1783, 1785, some combination thereof, etc.) to conduct simultaneous or contemporaneous energy transfers with a vehicle may advantageously enable a higher overall energy transfer rate compared to conventional systems. For example, where the energy transfer rate for each energy transfer component is limited (e.g., at a value set by the manufacturer, by mechanical and/or electrical limitations of the energy transfer component, etc.), use of a larger amount of energy transfer components to perform the energy transfer can result in a larger overall rate of energy transfer to the vehicle. Further, by using a plurality of energy transfer components to perform simultaneous or contemporaneous energy transfers, the respective energy transfer rate implemented by each of the energy transfer components can be reduced below that of a conventional energy transfer component of a conventional system (e.g., while still maintaining the same or larger overall rate of energy transfer between the vehicle and the energy transfers system). In this manner, embodiments of the present invention can provide an energy transfer rate which equals or exceeds the energy transfer rate of a conventional system while reducing the heat produced by each of energy transfer components, extending the lifetime of the energy transfer components, increasing the efficiency of the energy transfer (e.g., by operating each energy transfer component at a reduced load where they are more efficient, etc.), etc.

In one embodiment, a group of energy transfer components (e.g., 1711-1715, 1721-1728, 1731-1735, 1742, 1744, 1752, 1754, 1783, 1785, etc.) may be activated (e.g., by interface component 211) sequentially to enable one or more energy transfers to be conducted with a vehicle. For example, a first energy transfer component (e.g., 1711) may be used to perform a first energy transfer with a vehicle (e.g., 120). After the first energy transfer is completed, a second energy transfer component (e.g., 1721) may be used to perform a second energy transfer with the vehicle. As another example, a first group of energy transfer components (e.g., 1711 and 1712) may be used to perform a first energy transfer with a vehicle (e.g., 120), and a second group of energy transfer components (e.g., 1721 and 1722) may be used to perform a second energy transfer with the vehicle after the first energy transfer is completed.

As shown in FIG. 17, the provision of multiple energy transfer components may improve the ability to perform an energy transfer with a vehicle. For example, the spacing of energy transfer components 1711-1715, 1721-1724, 1742 and 1744 may increase the probability of at least one of the energy transfer components being in a position to transfer energy with a vehicle (e.g., aligned with an energy transfer component of the vehicle) regardless of how the vehicle is positioned (e.g., perpendicular to object 1770, at an angle to object 1770, parallel to object 1770, etc.). In one embodiment, where energy transfer components are located in different places on different vehicles, embodiments of the present invention can increase the number of energy transfer interfaces available for transferring energy with any given type of vehicle. Additionally, embodiments of the present invention can improve the compatibility of the energy transfer system (e.g., 110) with different types of vehicles by providing multiple energy transfer components located in different positions.

In one embodiment, energy transfer system 110 may be incorporated into an existing site (e.g., building, parking lot, boat dock, airport, etc.). For example, referring back to FIG. 4, at least one energy transfer component and corresponding components (e.g., set of components 410, power management component 215, etc.) may be disposed inside of an object (e.g., wheel stop 1710, enclosure or housing 1720, enclosure or housing 1730, enclosure or housing 1740, enclosure or housing 1750, enclosure 1782, enclosure 1784, etc.) which can be mounted in most any location on the site (e.g., on the ground, in a curb, on a building, to another object, etc.). Alternatively, the components of the energy transfer system may be spread amongst multiple locations on the site (e.g., within multiple enclosures or housings). In one embodiment, after installing the components of the energy transfer system, the components may be connected to a power grid (e.g., 250) and/or to each other using one or more cables or interfaces (e.g., at least one power line and/or at least one signal line). As such, in one embodiment, an existing site may be retrofitted to include energy transfer system 110 by simply replacing one or more existing objects (e.g., conventional wheel stops made of solid concrete) with at least one new object (e.g., one or more instances of wheel stop 1710) and providing an interface (e.g., at least one power line and/or at least one signal line) to the at least one new object.

Although FIG. 17 shows a specific number, arrangement, shape, and size of energy transfer components, it should be appreciated that a different number, arrangement, shape, and/or size of energy transfer components may be used in other embodiments. Additionally, although FIG. 17 shows a specific number, arrangement, shape, and size of objects, it should be appreciated that a different number, arrangement, shape, and/or size of objects may be used in other embodiments. Further, although FIG. 17 shows a specific number, arrangement, shape, and size of energy transfer components in each object, it should be appreciated that an object may include any number, arrangement, shape, and/or size of energy transfer components in other embodiments.

Figure 18:
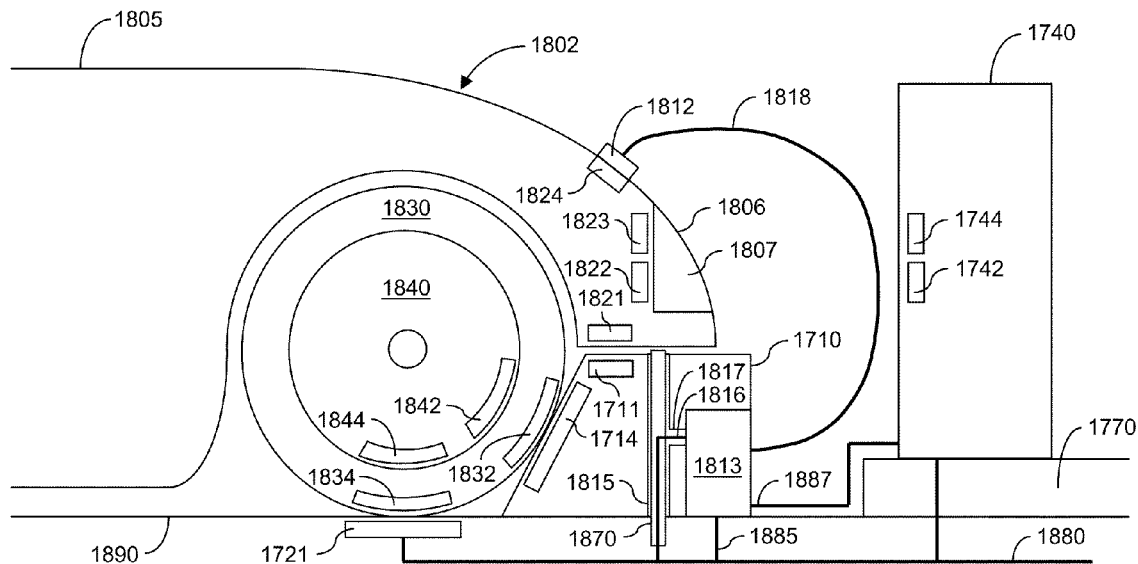
FIG. 18 shows a vehicle in a position for performing an energy transfer in accordance with one embodiment of the present invention.

FIG. 18 shows vehicle 1802 in a position for performing an energy transfer in accordance with one embodiment of the present invention. As shown in FIG. 18, vehicle 1802 includes body 1805, wheel 1840 and tire 1830. Vehicle 1802 also includes at least one energy transfer component (e.g., 1821, 1822, 1823, 1824, 1832, 1834, 1842, 1844, etc.) which may be positioned (e.g., located, oriented, etc.) with respect to at least one other energy transfer component (e.g., 1711, 1714, 1721, 1742, 1744, 1812, etc.) to enable one or more energy transfers between the vehicle (e.g., 1802) and an energy transfer system (e.g., 110).

In one embodiment, vehicle 1802 may be implemented in accordance with vehicle 120 as discussed herein, and therefore, vehicle 1802 may include one or more features of vehicle 120 and/or function similarly to vehicle 120. And in one embodiment, one or more of the energy transfer components (e.g., 1711, 1714, 1721, 1742, 1744, 1812, etc.) depicted in FIG. 18 may be part of or coupled to an energy transfer system (e.g., 110) for performing one or more energy transfers with at least one vehicle (e.g., 120, 320a, 320b, 320c, 1802, etc.).

As shown in FIG. 18, one or more of the energy transfer components (e.g., 1821, 1822, 1823, 1824, 1832, 1834, 1842, 1844, etc.) may be implemented in accordance with (e.g., include components of, function similarly to, etc.) energy transfer component 233, and therefore, the one or more energy transfer components (e.g., 1821, 1822, 1823, 1824, 1832, 1834, 1842, 1844, etc.) may include at least one electrical contact (e.g., disposed in or coupled with a plug, disposed in or coupled with a receptacle, etc.). In one embodiment, one or more energy transfer components (e.g., 1821, 1822, 1823, 1824, 1832, 1834, 1842, 1844, etc.) may be implemented in accordance with (e.g., include components of, function similarly to, etc.) energy transfer component 236, and therefore, the one or more energy transfer components (e.g., 1821, 1822, 1823, 1824, 1832, 1834, 1842, 1844, etc.) may be capable of enabling an inductive energy transfer over an energy transfer interface (e.g., 234) between the vehicle (e.g., 1802) and an energy transfer system (e.g., 110). And in one embodiment, one or more energy transfer components (e.g., 1821, 1822, 1823, 1824, 1832, 1834, 1842, 1844, etc.) may be implemented in accordance with (e.g., include components of, function similarly to, etc.) energy transfer component 239, and therefore, the one or more energy transfer components (e.g., 1821, 1822, 1823, 1824, 1832, 1834, 1842, 1844, etc.) may be capable of enabling a wireless energy transfer over an energy transfer interface (e.g., 237) between the vehicle (e.g., 1802) and the energy transfer system (e.g., 110).

Energy transfer components 1812 and 1824 may implement a wired interface (e.g., 231) in one embodiment. For example, at least one electrical contact of energy transfer component 1812 may be brought into physical contact with, and therefore electrically coupled to, at least one electrical contact of energy transfer component 1824 to enable one or more energy transfers between vehicle 1802 and an energy transfer system (e.g., 110). In one embodiment, energy transfer component 1812 may be housed or disposed within a plug on the end of a cable, where the cable provides an electrical coupling between the at least one electrical contact and at least one component of an energy transfer system (e.g., disposed within compartment 1813 of wheel stop 1710, within another portion of wheel stop 1710, within housing or enclosure 1740, in another location, etc.). In one embodiment, energy transfer component 1824 may be housed or disposed within a receptacle coupled with or disposed within body 1805 of vehicle 1802, where energy transfer component 1824 may be electrically coupled to at least one component of the vehicle (e.g., interface component 221, meter 229, charge and/or discharge component 228, power management component 225, energy storage component 226, power source 227, some other component of vehicle 120, etc.).

In one embodiment, energy transfer components 1812 and 1824 may implement a signal interface (e.g., 134). In this manner, the electrical contacts used to perform an energy transfer may also be configured to communicate signals (e.g., data signals, clock signals, etc.). And in one embodiment, an energy transfer component used to perform an energy transfer (e.g., 1812, 1824, etc.) may be housed with or disposed within the same component (e.g., a plug, a receptacle, etc.) as at least one other electrical contact used to implement a separate signal interface (e.g., 134).

As shown in FIG. 18, at least one energy transfer between vehicle 1802 and an energy transfer system (e.g., 110) may be performed over an energy transfer interface implemented using energy transfer components 1822 and 1742, where the energy transfer interface implemented using energy transfer components 1822 and 1742 may be a wired interface (e.g., 231), an inductive interface (e.g., 234), a wireless interface (e.g., 237), some combination thereof, etc. In one embodiment, at least one energy transfer between vehicle 1802 and an energy transfer system (e.g., 110) may be performed over an energy transfer interface implemented using energy transfer components 1823 and 1744, where the energy transfer interface implemented using energy transfer components 1823 and 1744 may be a wired interface (e.g., 231), an inductive interface (e.g., 234), a wireless interface (e.g., 237), some combination thereof, etc.

In one embodiment, energy transfer component 1822 and/or energy transfer component 1823 may be located towards the front of vehicle 1802. For example, energy transfer component 1822 and/or energy transfer component 1823 may be located behind the front bumper of vehicle 1802. Energy transfer component 1822 and/or energy transfer component 1823 may be located behind or at least partially within compartment 1807 (e.g., which houses at least one other component such as a headlight, parking light, proximity sensor, etc.). And in one embodiment, energy transfer component 1822 and/or energy transfer component 1823 may be located behind surface 1806 (e.g., a transparent or semi-transparent surface through which light from at least one headlight and/or at least one parking light passes, a painted surface such as a front fascia, etc.).

As shown in FIG. 18, at least one energy transfer between vehicle 1802 and an energy transfer system (e.g., 110) may be performed over an energy transfer interface implemented using energy transfer components 1711 and 1821, where the energy transfer interface implemented using energy transfer components 1711 and 1821 may be a wired interface (e.g., 231), an inductive interface (e.g., 234), a wireless interface (e.g., 237), some combination thereof, etc. Energy transfer component 1821 may be located in a portion of vehicle 1802 which extends at least partially beyond wheel 1840 and/or tire 1830. Energy transfer component 1711 may be located toward or at a top surface of wheel stop 1710. As such, energy transfer component 1821 may be brought into alignment with energy transfer component 1711 (e.g., when tire 1830 is brought into proximity of or in contact with wheel stop 1710) to enable at least one energy transfer between vehicle 1802 and an energy transfer system (e.g., 110).

At least one energy transfer between vehicle 1802 and an energy transfer system (e.g., 110) may be performed over an energy transfer interface implemented using energy transfer components 1714 and 1832, where the energy transfer interface implemented using energy transfer components 1714 and 1832 may be a wired interface (e.g., 231), an inductive interface (e.g., 234), a wireless interface (e.g., 237), some combination thereof, etc. Energy transfer component 1832 may be coupled with or disposed at least partially within tire 1830 (e.g., as described with respect to FIGS. 22A, 22B, 24, etc.). Energy transfer component 1714 may be located toward or at a side of wheel stop 1710 (e.g., a different side or surface than energy transfer component 1711 is disposed at or near). As such, energy transfer component 1832 may be brought into alignment with energy transfer component 1714 (e.g., when tire 1830 is brought into proximity of or in contact with wheel stop 1710) to enable at least one energy transfer between vehicle 1802 and an energy transfer system (e.g., 110).

As shown in FIG. 18, at least one energy transfer between vehicle 1802 and an energy transfer system (e.g., 110) may be performed over an energy transfer interface implemented using energy transfer components 1714 and 1842, where the energy transfer interface implemented using energy transfer components 1714 and 1842 may be a wired interface (e.g., 231), an inductive interface (e.g., 234), a wireless interface (e.g., 237), some combination thereof, etc. Energy transfer component 1842 may be coupled with or disposed at least partially within wheel 1840 (e.g., as described with respect to FIGS. 23A, 23B, 24, etc.). Energy transfer component 1714 may be located toward or at a side of wheel stop 1710 (e.g., a different side or surface than energy transfer component 1711 is disposed at or near). As such, energy transfer component 1842 may be brought into alignment with energy transfer component 1714 (e.g., when tire 1830 is brought into proximity of or in contact with wheel stop 1710) to enable at least one energy transfer between vehicle 1802 and an energy transfer system (e.g., 110).

At least one energy transfer between vehicle 1802 and an energy transfer system (e.g., 110) may be performed over an energy transfer interface implemented using energy transfer components 1721 and 1834, where the energy transfer interface implemented using energy transfer components 1721 and 1834 may be a wired interface (e.g., 231), an inductive interface (e.g., 234), a wireless interface (e.g., 237), some combination thereof, etc. Energy transfer component 1834 may be coupled with or disposed at least partially within tire 1830 (e.g., as described with respect to FIGS. 22A, 22B, 24, etc.). Energy transfer component 1721 may be located beneath surface 1890 (e.g., a surface on which vehicle 1802 is capable of moving across), at surface 1890, protruding from surface 1890, or coupled with surface 1890. As such, energy transfer component 1834 may be brought into alignment with energy transfer component 1721 (e.g., when tire 1830 is disposed above energy transfer component 1721 and/or when tire 1830 is brought into proximity of or in contact with wheel stop 1710) to enable at least one energy transfer between vehicle 1802 and an energy transfer system (e.g., 110).

As shown in FIG. 18, at least one energy transfer between vehicle 1802 and an energy transfer system (e.g., 110) may be performed over an energy transfer interface implemented using energy transfer components 1721 and 1844, where the energy transfer interface implemented using energy transfer components 1721 and 1844 may be a wired interface (e.g., 231), an inductive interface (e.g., 234), a wireless interface (e.g., 237), some combination thereof, etc. Energy transfer component 1844 may be coupled with or disposed at least partially within wheel 1840 (e.g., as described with respect to FIGS. 23A, 23B, 24, etc.). Energy transfer component 1721 may be located beneath surface 1890 (e.g., a surface on which vehicle 1802 is capable of moving across), at surface 1890, protruding from surface 1890, or coupled with surface 1890. As such, energy transfer component 1844 may be brought into alignment with energy transfer component 1721 (e.g., when tire 1830 or wheel 1840 is disposed above energy transfer component 1721 and/or when tire 1830 is brought into proximity of or in contact with wheel stop 1710) to enable at least one energy transfer between vehicle 1802 and an energy transfer system (e.g., 110).

In one embodiment, electrical contacts may protrude from a surface to enable an energy transfer with a vehicle. For example, at least one electrical contact may protrude from an energy transfer component of an energy transfer system (e.g.,

1714, 1711, 1721, etc.) to make physical contact with an energy transfer component of a vehicle (e.g., 1821, 1832, 1834, etc.) and enable one or more energy transfers to be performed with a vehicle (e.g., 1802). As another example, at least one electrical contact may protrude from an energy transfer component of a vehicle (e.g., 1821, 1832, 1834, etc.) to make physical contact with an energy transfer component of an energy transfer system (e.g., 1714, 1711, 1721, etc.) and enable one or more energy transfers to be performed with a vehicle (e.g., 1802). As yet another example, an energy transfer with a vehicle may be performed using an electrical contact which protrudes from a surface of a vehicle (e.g., vehicle body 1805, tire 1830, wheel 1840, etc.), from the ground (e.g., surface 1890), from a surface of wheel stop 1710, from another component of an energy transfer system (e.g., 110), etc. In one embodiment, the electrical contact may automatically protrude or extend responsive to detecting that the vehicle or an energy transfer component of the vehicle is in an appropriate position to perform an energy transfer, where position detection (e.g., of the vehicle and/or the energy transfer component of the vehicle) may be performed in accordance with FIG. 19, FIG. 20, FIG. 21, etc.

As shown in FIG. 18, wheel stop 1710 may be made from a polymer (e.g., a thermoplastic, a thermoset, a rubber, another polymer, etc.), concrete, metal, wood, some combination thereof, etc. In one embodiment, wheel stop 1710 may be manufactured using injection molding, casting, or another fabrication technique. Wheel stop 1710 may be secured to surface 1890 using member 1870 which extends through hole 1815 (e.g., defined in a portion of wheel stop 1710, in a surface of wheel stop 1710, etc.), where member 1870 may be a bolt, screw, piece of rebar, pipe, rod, etc. Alternatively, wheel stop 1710 may be secured to surface 1890 using another fastening method (e.g., using an adhesive, using a hook-and-loop fastener such as Velcro®, etc.).

Components of an energy transfer system (e.g., 110) may be located or housed in one or more locations. For example, components may be housed within wheel stop 1710 (e.g., within compartment 1813, within other portions of wheel stop 1710, etc.), within housing or enclosure 1740, in another housing or enclosure, some combination thereof, etc. Components which are located at different locations may be coupled by an above-ground line (e.g., 1887) and/or an underground line (e.g., 1880). The line (e.g., above-ground line 1887, underground line 1880, etc.) may implement an energy transfer interface (e.g., 132) and/or a signal interface (e.g., 134). In one embodiment, the line (e.g., above-ground line 1887, underground line 1880, etc.) may include any number of conductors.

In one embodiment, at least some of the components of an energy transfer system (e.g., 110) may be located within compartment 1813 of wheel stop 1710. For example, compartment 1813 may enclose at least a portion of a set of components (e.g., 410, 420, 430, etc.). As another example, a power management component (e.g., 215) may be housed or enclosed in compartment 1813. And as another example, compartment 1813 may enclose an energy storage component (e.g., 216) and/or a power source (e.g., 217).

Compartment 1813 may be accessed from the bottom of wheel stop 1710 in one embodiment, thereby providing convenient access to components for repair, maintenance, modification, or the like. A door or cover at least partially covering compartment 1813 may reduce access to and/or seal components within compartment 1813 in one embodiment. Components within compartment 1813 may be coupled to and/or receive power from an above-ground line (e.g., 1887) and/or an underground line (e.g., 1880). In one embodiment, an underground line (e.g., 1880) may be routed into compartment 1813 from the bottom of wheel stop 1710 (e.g., as shown by line 1885) and/or through hole 1815 (e.g., shown by line 1816). Where an underground line (e.g., 1880) is routed into compartment 1813 through hole 1815, the line may be extended through hole 1817 (e.g., as shown by line 1816) which connects hole 1815 to compartment 1813. A line extending into or through hole 1815 may run alongside member 1870, through at least a portion of member 1870, etc.

As shown in FIG. 18, energy transfer components may be coupled to other components of an energy transfer system (e.g., 110) through one or more interfaces. For example, energy transfer component 1721 may be coupled to other components (e.g., located in compartment 1813, located in housing or enclosure 1740, located in another enclosure or housing, etc.) via line 1880. As another example, energy transfer component 1812 may be coupled to other components (e.g., located in compartment 1813, located in housing or enclosure 1740, located in another enclosure or housing, etc.) via cable 1818. Cable 1818 may be automatically retracted (e.g., using a spring-loaded reel located in wheel stop 1710 or some other retraction mechanism) in one embodiment. And as yet another example, an energy transfer component disposed at least partially within or coupled with wheel stop 1710 (e.g., 1711, 1712, 1713, 1714, 1715, etc.) may be coupled to other components (e.g., located in compartment 1813, located in housing or enclosure 1740, located in another enclosure or housing, etc.) via one or more lines running through wheel stop 1710, on the outside of wheel stop 1710, or in some other location.

In one embodiment, energy transfer components of wheel stop 1710 (e.g., 1711, 1712, 1713, 1714, 1715, etc.) may be located in cavities (e.g., formed during molding, casting, or the like of wheel stop 1710) and secured using any fastening method (e.g., friction or press fit, using at least one fastener, using an adhesive, etc.). Wheel stop 1710 may have any number of cavities for accepting energy transfer components, thereby enabling wheel stop 1710 to be customized, upgraded (e.g., increasing the number, type, quality, etc. of energy transfer components), downgraded (e.g., decreasing the number, type, quality, etc. of energy transfer components to save cost or for some other reason), offered at various price points (e.g., each wheel stop of a different price includes a different number, type, quality, etc. of energy transfer components), etc. One or more energy transfer components of wheel stop 1710 may be covered (e.g., via a plug or insert placed into the cavity of the energy transfer component, by a door or cover, etc.) and/or manufactured into wheel stop 1710 (e.g., molded, casted, etc. into wheel stop 1710), thereby increasing the lifetime of the energy transfer components (e.g., by reducing exposure to light, moisture, dirt, debris, corrosive materials, contaminants, etc.), reducing vandalism or theft of the energy transfer components (e.g., since they are covered and out of sight), etc.

As such, in one embodiment, an energy transfer system may be installed by simply replacing existing wheel stops with wheel stop 1710 and running a line (e.g., capable of supplying enough power to enable one or more energy transfers with a vehicle and/or capable of communicating signals to and from components of the energy transfer system) to wheel stop 1710. Wheel stop 1710 may include a communication component (e.g., 241) capable of communicating with an external system (e.g., vehicle 1802, interface system 550, payment system 560, computer system 570, computer system 2890 of FIG. 28, another system, etc.) over a wired interface (e.g., over a line connecting wheel stop 1710 to a power grid or another component of the energy transfer system, over an energy transfer interface such as energy transfer interface 132, over a signal interface such as signal interface 134, via energy transfer components 1812 and 1824, etc.) and/or a wireless interface (e.g., over a cellular network, over a wireless interface which operates in accordance with a wireless standard such as 802.11x, over a wireless interface which operates in accordance with a wireless standard such as Bluetooth, over an energy transfer interface such as energy transfer interface 132, over an inductive energy transfer interface such as energy transfer interface 234, over a wireless energy transfer interface such as energy transfer interface 237, over a signal interface such as signal interface 134, etc.). As such, after identification of vehicle 1802 (e.g., performed in accordance with FIG. 19, FIG. 20, FIG. 21, FIG. 28, some combination thereof, etc.), a user interface (e.g., GUI 1000) may be automatically presented to enable a user to setup and/or initiate one or more energy transfers with an energy transfer system (e.g., 110). The GUI may be displayed on a display of the vehicle (e.g., while the vehicle is parked, while a user is in the vehicle, after the vehicle is parked but before the user leaves the vehicle), a display of the energy transfer system, a computer system accessible to the user (e.g., on a mobile phone, other portable electronic device, other computer system, etc. of the user while the user is outside of or remotely located from the vehicle), etc. After one or more energy transfers have been performed (e.g., using at least one energy transfer component of vehicle 1802 and at least one energy transfer component of wheel stop 1710, using at least one energy transfer component of vehicle 1802 and at least one other energy transfer component of the energy transfer system, etc.), a payment transaction may be automatically performed (e.g., based upon information entered using GUI 800, GUI 900, GUI 1000, etc.) for energy transferred between vehicle 1802 and the energy transfer system (e.g., 110). Accordingly, the amount of user interaction involved in setting up, performing, managing, executing a payment transaction for, etc. an energy transfer can be reduced using embodiments of the present invention.

Although FIG. 18 illustrates one position of vehicle 1802 for performing an energy transfer, it should be appreciated that an energy transfer may be performed with vehicle 1802 when vehicle 1802 is in one or more other positions (e.g., a different location with respect to components of an energy transfer system, a different orientation, etc.). Although FIG. 18 may show energy transfer components located toward a particular side (e.g., the front) of vehicle 1802, it should be appreciated that vehicle 1802 may have one or more energy transfer components in one or more other portions (e.g., rear, side, top, bottom, etc.) of vehicle 1802 (e.g., enabling an energy transfer with vehicle 1802 when its rear tires are in proximity to or contact with wheel stop 1710, when a side or rear portion of vehicle 1802 overhangs wheel stop 1710, when vehicle 1802 is alternatively positioned with respect to wheel stop 1710 or other components of the energy transfer system, etc.) in other embodiments. Additionally, it should be appreciated that vehicle 1802 may have a different number, arrangement, shape, and/or size of energy transfer components in other embodiments, where the energy transfer components of vehicle 1802 may be of any type or combination of types. Further, it should be appreciated that the energy transfer system (e.g., including wheel stop 1710, enclosure or housing 1740, etc.) may have a different number, arrangement, shape, and/or size of energy transfer components in other embodiments, where the energy transfer components of the energy transfer system may be of any type or combination of types.

Additionally, although FIG. 18 shows wheel stop 1710 separate from object 1770, it should be appreciated that wheel stop 1710 may be coupled with or at least partially disposed within object 1770. For example, housing or enclosure 1730 may be implemented in accordance with (e.g., include components of, function similarly to, etc.) wheel stop 1710 as described with respect to FIG. 18 in one embodiment.

Figure 19:
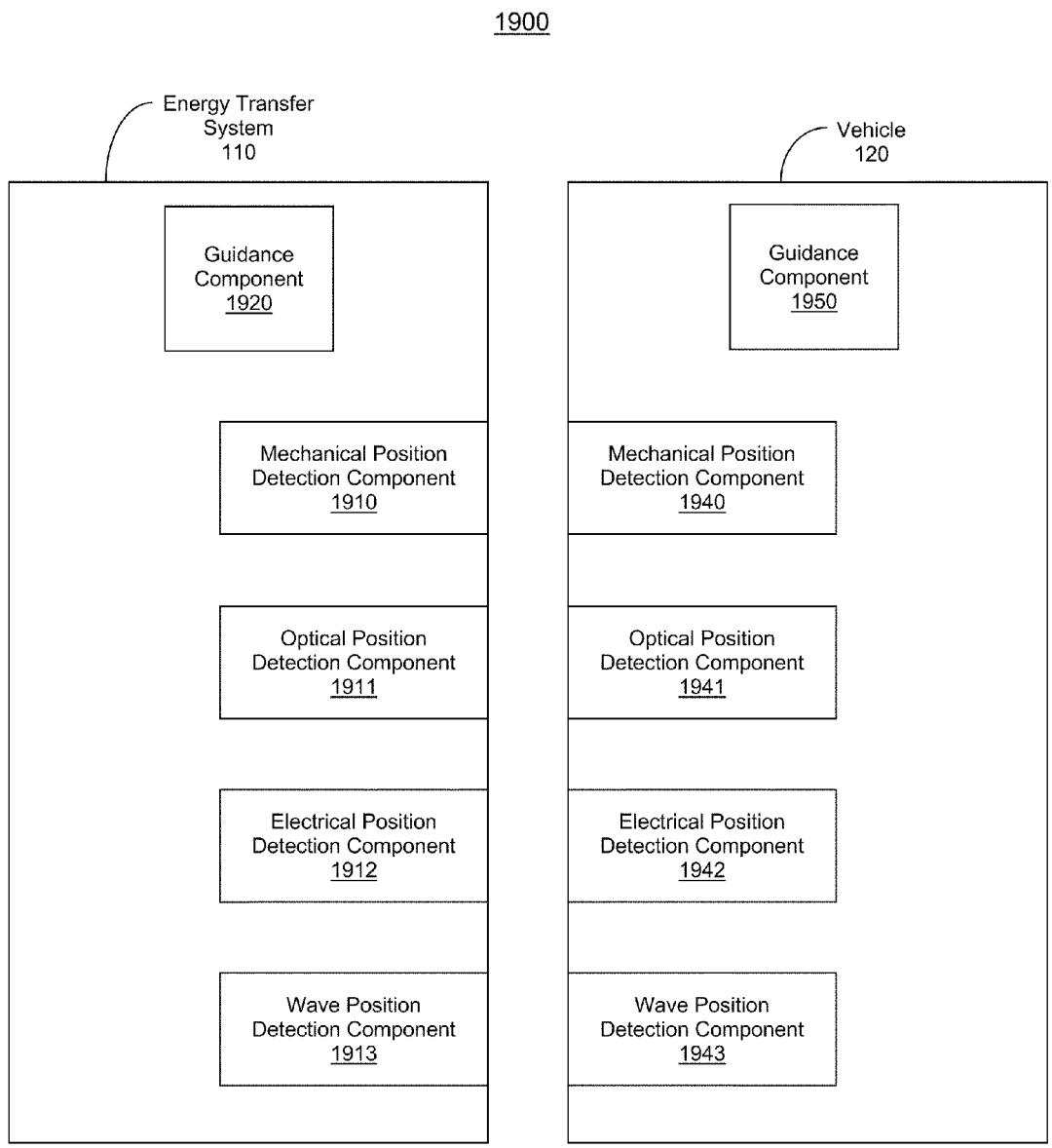
FIG. 19 shows a system for determining the position of a vehicle or a component thereof with respect to an energy transfer system in accordance with one embodiment of the present invention.

FIG. 19 shows system 1900 for determining the position of a vehicle or a component thereof with respect to an energy transfer system in accordance with one embodiment of the present invention. As shown in FIG. 19, energy transfer system 110 and/or vehicle 120 may include one or more components for determining the position of vehicle 120 with respect to energy transfer system 110. For example, energy transfer system 110 may include at least one mechanical position detection component (e.g., 1910), at least one optical position detection component (e.g., 1911), at least one electrical position detection component (e.g., 1912), at least one wave position detection component (e.g., 1913), some combination thereof, etc. As another example, vehicle 120 may include at least one mechanical position detection component (e.g., 1940), at least one optical position detection component (e.g., 1941), at least one electrical position detection component (e.g., 1942), at least one wave position detection component (e.g., 1943), some combination thereof, etc. In this manner, components of the energy transfer system and/or components of the vehicle can be used to determine when the vehicle is in a position to enable one or more energy transfers using at least one energy transfer component of the energy transfer system and at least one energy transfer component of the vehicle.

In one embodiment, components of the energy transfer system (e.g., 1910, 1911, 1912, 1913, etc.) may be used alone (e.g., without components of vehicle 120) to determine the position of vehicle 120 with respect to energy transfer system 110. Components of the vehicle (e.g., 1940, 1941, 1942, 1943, etc.) may be used alone (e.g., without components of energy transfer system 110) to determine the position of vehicle 120 with respect to energy transfer system 110 in one embodiment. And in one embodiment, components of the energy transfer system (e.g., 1910, 1911, 1912, 1913, etc.) may be used in combination with components of the vehicle (e.g., 1940, 1941, 1942, 1943, etc.) to determine the position of vehicle 120 with respect to energy transfer system 110.

As shown in FIG. 19, mechanical position detection component 1910 may include any mechanism capable of detecting position based upon a mechanical actuation. In one embodiment, component 1910 may include a sensor capable of detecting a force or pressure caused by a portion of the vehicle coming into contact with the sensor. For example, the sensor may determine the position of the vehicle by detecting a tire of the vehicle (e.g., where the sensor is coupled with or disposed at least partially within wheel stop 1710, housing or enclosure 1730, the ground, etc.), a side of the vehicle (e.g., where the sensor is mounted in a boat dock, object 1770, housing or enclosure 1740, etc.), or another portion of the vehicle. In one embodiment, component 1910 may detect a position of a vehicle by a physical movement of a mechanism (e.g., a button, lever, wire, spring, or the like) by a portion of the vehicle coming into contact with the mechanism. For example, a mechanism mounted to an object (e.g., wheel stop 1710, housing or enclosure 1730, housing or enclosure 1740, etc.) may be deflected or moved by a portion of vehicle 120, thereby signaling that the vehicle is in a position to perform an energy transfer. And in another embodiment, component 1910 may detect a position of the vehicle with respect to the energy transfer system using another type of mechanical position detection.

Mechanical position detection component 1940 may include any mechanism capable of detecting position based upon a mechanical actuation. In one embodiment, component 1940 may include a sensor capable of detecting a force or pressure caused by a portion of the energy transfer system coming into contact with the sensor. For example, the sensor may determine the position of the vehicle by detecting that a tire of the vehicle has come into contact with another object (e.g., wheel stop 1710, housing or enclosure 1730, etc.), a side of the vehicle has come into contact with another object (e.g., a boat dock, object 1770, housing or enclosure 1740, etc.), or another portion of the vehicle has come into contact with another object. In one embodiment, component 1940 may detect a position of a vehicle by a physical movement of a mechanism (e.g., a button, lever, wire, spring, or the like) by a portion of the energy transfer system coming into contact with the mechanism. For example, a mechanism mounted to vehicle 120 may be deflected or moved as it comes into contact with an object (e.g., wheel stop 1710, housing or enclosure 1730, housing or enclosure 1740, etc.), thereby signaling that the vehicle is in a position to perform an energy transfer. And in another embodiment, component 1940 may detect a position of the vehicle with respect to the energy transfer system using another type of mechanical position detection.

As shown in FIG. 19, optical position detection component 1911 may include any component capable of detecting position using light. In one embodiment, component 1911 may include a sensor (e.g., mounted on or in wheel stop 1710, enclosure or housing 1730, enclosure or housing 1740, etc.) capable of sensing light emitted from a light source (e.g., a bulb, light emitting diode, organic light emitting diode, etc.), where the sensor may detect a position of the vehicle responsive to a portion of the vehicle blocking or interfering with the light generated by the light source. The light source may be mounted on or in wheel stop 1710, enclosure or housing 1730, enclosure or housing 1740, or in some other place. Component 1911 may include a camera (e.g., mounted on or in wheel stop 1710, enclosure or housing 1730, enclosure or housing 1740, etc.) for capturing at least one image (e.g., a still picture, video, etc.) of the vehicle, where analysis of the video may be used to determine a position of the vehicle with respect to the energy transfer system. In one embodiment, component 1911 may include a laser emitter and/or laser detector (e.g., mounted on or in wheel stop 1710, enclosure or housing 1730, enclosure or housing 1740, etc.) for determining a position of the vehicle. And in one embodiment, component 1911 may detect a position of the vehicle with respect to the energy transfer system using another type of optical position detection.

Optical position detection component 1941 may include any component capable of detecting position using light. In one embodiment, component 1941 may include a sensor (e.g., mounted on or in a portion of vehicle 120) capable of sensing light emitted from a light source (e.g., a bulb, light emitting diode, organic light emitting diode, etc.), where the sensor may detect a position of the vehicle responsive to a portion of the energy transfer system (e.g., a portion of wheel stop 1710, enclosure or housing 1730, enclosure or housing 1740, etc.) blocking or interfering with the light generated by the light source. The light source may be mounted on or in a portion of vehicle 120. Component 1941 may include a camera (e.g., mounted on or in a portion of vehicle 120) for capturing at least one image (e.g., a still picture, video, etc.) of a portion of the energy transfer system (e.g., a portion of wheel stop 1710, enclosure or housing 1730, enclosure or housing 1740, etc.), where analysis of the video may be used to determine a position of the vehicle with respect to the energy transfer system. In one embodiment, component 1941 may include a laser emitter and/or laser detector (e.g., mounted on or in a portion of vehicle 120) for determining a position of the vehicle. And in one embodiment, component 1941 may detect a position of the vehicle with respect to the energy transfer system using another type of optical position detection.

As shown in FIG. 19, electrical position detection component 1912 may include any electrical component capable of detecting position. For example, component 1912 may include a capacitive proximity sensor (e.g., coupled with or at least partially disposed beneath surface 1890, mounted on or in wheel stop 1710, enclosure or housing 1730, enclosure or housing 1740, etc.) capable of detecting the proximity of a portion of vehicle 120. As another example, component 1912 may include an inductive proximity sensor (e.g., coupled with or at least partially disposed beneath surface 1890, mounted on or in wheel stop 1710, enclosure or housing 1730, enclosure or housing 1740, etc.) capable of detecting the proximity of a portion of vehicle 120. And as yet another example, component 1912 may include an ultrasonic proximity sensor (e.g., coupled with or at least partially disposed beneath surface 1890, mounted on or in wheel stop 1710, enclosure or housing 1730, enclosure or housing 1740, etc.) capable of detecting the proximity of a portion of vehicle 120. And as another example, component 1912 may detect a position of the vehicle with respect to the energy transfer system using another type of electrical position detection.

Electrical position detection component 1942 may include any electrical component capable of detecting position. For example, component 1912 may include a capacitive proximity sensor (e.g., mounted on or in a portion of vehicle 120) capable of detecting the proximity of a portion of energy transfer system 110 (e.g., wheel stop 1710, enclosure or housing 1730, enclosure or housing 1740, etc.). As another example, component 1942 may include an inductive proximity sensor (e.g., mounted on or in a portion of vehicle 120) capable of detecting the proximity of a portion of energy transfer system 110 (e.g., wheel stop 1710, enclosure or housing 1730, enclosure or housing 1740, etc.). And as yet another example, component 1942 may include an ultrasonic proximity sensor (e.g., mounted on or in a portion of vehicle 120) capable of detecting the proximity of a portion of energy transfer system 110 (e.g., wheel stop 1710, enclosure or housing 1730, enclosure or housing 1740, etc.). And as another example, component 1942 may detect a position of the vehicle with respect to the energy transfer system using another type of electrical position detection.

As shown in FIG. 19, wave position detection component 1913 may include any component capable of detecting position using waves. For example, component 1913 may include a transmitter (e.g., coupled with or at least partially disposed beneath surface 1890, mounted on or in wheel stop 1710, enclosure or housing 1730, enclosure or housing 1740, etc.) capable of emitting waves (e.g., electromagnetic waves, sound waves, etc.) toward vehicle 120 and/or a receiver (e.g., coupled with or at least partially disposed beneath surface 1890, mounted on or in wheel stop 1710, enclosure or housing 1730, enclosure or housing 1740, etc.) capable of detecting waves (e.g., electromagnetic waves, sound waves, etc.) reflected from vehicle 120. In this manner, the distance and/or position of vehicle with respect to component 1913 can be determined. In one embodiment, component 1913 may determine the position of vehicle 120 using radar.

Wave position detection component 1943 may include any component capable of detecting position using waves. For example, component 1943 may include a transmitter (e.g., mounted on or in a portion of vehicle 120) capable of emitting waves (e.g., electromagnetic waves, sound waves, etc.) toward an object (e.g., wheel stop 1710, enclosure or housing 1730, enclosure or housing 1740, etc.) and/or a receiver (e.g., mounted on or in a portion of vehicle 120) capable of detecting waves (e.g., electromagnetic waves, sound waves, etc.) reflected from the object. In this manner, the distance and/or position of the object with respect to component 1943, and therefore vehicle 120, can be determined. In one embodiment, component 1943 may determine the position of the object using radar.

In one embodiment, the position of the vehicle with respect to a portion of the energy transfer system (e.g., determined using component 1910, 1911, 1912, 1913, 1940, 1941, 1942, 1943, etc.) may be used to determine the position of at least one energy transfer component of the vehicle (e.g., 1821, 1822, 1823, 1824, 1832, 1834, 1842, 1844, etc.) with respect to at least one energy transfer component of the energy transfer system (e.g., 1711, 1742, 1744, 1812, 1714, 1721, etc.). For example, where the position of the vehicle with respect to the energy transfer system is determined using a first position (e.g., of a portion of the vehicle) and a second position (e.g., of a portion of the energy transfer system), the distance or relative position of an energy transfer component of the vehicle with respect to an energy transfer component of the energy transfer system may be determined by using a distance or relative position between the first position and the energy transfer component of the vehicle and also by using a distance or relative position between the second position and the energy transfer component of the energy transfer system. The distance or relative position between the first position and the energy transfer component of the vehicle may be relatively consistent across each model of vehicle, and therefore, may be stored as a lookup table or other data structure in a memory (e.g., of energy transfer system 110, of vehicle 120, etc.). Additionally, the distance or relative position between the second position and the energy transfer component of the energy transfer system may be stored as a lookup table or other data structure in a memory (e.g., of energy transfer system 110, of vehicle 120, etc.).

In one embodiment, one or more energy transfer interfaces may be activated and/or deactivated based on the position of a vehicle (e.g., 120) and/or a component thereof with respect to a component an energy transfer system (e.g., 110) and/or component thereof. For example, as a vehicle is moving with respect to an energy transfer system, it may be determined that the vehicle (or an energy transfer component thereof) is in a position to enable an energy transfer via a first energy transfer component (e.g., 1610, 1645, etc.) of an energy transfer system. Responsive thereto, a first interface (e.g., of the energy transfer system which is coupled to or includes the first energy transfer component) may be activated to enable an energy transfer between the vehicle and the energy transfer system via the first energy transfer component. Responsive to determining that the vehicle (or an energy transfer component thereof) is out of position to enable an energy transfer via the first energy transfer component, the first interface may be deactivated (e.g., causing the energy transfer via the first energy transfer component to be altered and/or ceased). Additionally, as the vehicle continues to move with respect to the energy transfer system, it may be determined that the vehicle (or an energy transfer component thereof) is in a position to enable an energy transfer via a second energy transfer component (e.g., 1620, 1655, etc.) of the energy transfer system. Responsive thereto, a second interface (e.g., of the energy transfer system which is coupled to or includes the second energy transfer component) may be activated to enable an energy transfer between the vehicle and the energy transfer system via the second energy transfer component. Responsive to determining that the vehicle (or an energy transfer component thereof) is out of position to enable an energy transfer via the second energy transfer component, the second interface may be deactivated (e.g., causing the energy transfer via the second energy transfer component to be altered and/or ceased). In one embodiment, this may be repeated as the vehicle is alternatively positioned (e.g., as the vehicle continues to move) to enable energy to be transferred with other energy components of the energy transfer system. In this manner, embodiments of the present invention can increase the amount of energy transferred between a vehicle and an energy transfer system (e.g., by transferring energy using more than one energy transfer component which are physically spaced apart), enable energy to be transferred between the vehicle and the energy transfer system while the vehicle is moving, reduce energy loss (e.g., by deactivating at least one energy transfer component which is activated but not used to transfer energy at a particular time), increase the lifetime of an energy transfer component (e.g., by deactivating the energy transfer component when not in use), etc.

As shown in FIG. 19, guidance component 1920 may generate instructions for repositioning a vehicle. In one embodiment, if the relative position of an energy transfer component of the vehicle and an energy transfer component of the energy transfer system indicates that the vehicle can be repositioned to improve one or more energy transfers (e.g., by aligning an energy transfer component of the vehicle with an energy transfer component of the energy transfer system), guidance information may be generated by component 1920 for output using a speaker of the vehicle (e.g., speaker 1374), a display of the vehicle (e.g., 725), etc. The guidance information may include verbal and/or written instructions (e.g., "move the vehicle two feet to the left," "straighten out the vehicle," "reorient the vehicle so that it is more perpendicular to the curb," "turn the wheel one turn to the left and begin to slowly backup," etc.). In one embodiment, the guidance information may include visual instructions. For example, a camera of the vehicle (e.g., camera 1371) may capture one or more images displayed on a display of the vehicle (e.g., display 725), where the guidance information is used to alter the displayed image to instruct a user to maneuver the vehicle in a certain way (e.g., by overlaying on the image a first set of lines indicating a desired path of the vehicle and a second set of lines indicating a path the vehicle will take based upon the current position of the steering wheel). And in one embodiment, the guidance information output by guidance component 1920 may be accessed by a component of the vehicle to automatically reposition the vehicle (e.g., using an automated parking or maneuvering system of the vehicle) to improve one or more energy transfers (e.g., by aligning an energy transfer component of the vehicle with an energy transfer component of the energy transfer system). In one embodiment, an updated relative position of the energy transfer component of the vehicle with respect to the energy transfer component of the energy transfer system may be determined after movement of the vehicle, thereby enabling updated guidance information to be generated and output to enable the vehicle to be moved into a better position for performing an energy transfer.

Although FIG. 19 shows energy transfer system 110 and vehicle 120 with a specific number and type of components, it should be appreciated that energy transfer system 110 and/or vehicle 120 may include a different number and/or type of position detection components in other embodiments. For example, in one embodiment, energy transfer system 110 may include ten mechanical position detection components (e.g., implemented using component 1910), two electrical position detection components (e.g., implemented using component 1912), and no optical position detection components. In one embodiment, two or more components may be combined, a component may be separated into multiple components, some combination thereof, etc. It should also be appreciated that the components depicted in FIG. 19 may be arranged differently (e.g., a sub-component of one component may be a sub-component of another component, a sub-component of a component may exist outside the component as another component, a component may be a sub-component of another component, etc.) in other embodiments.

Figure 20:
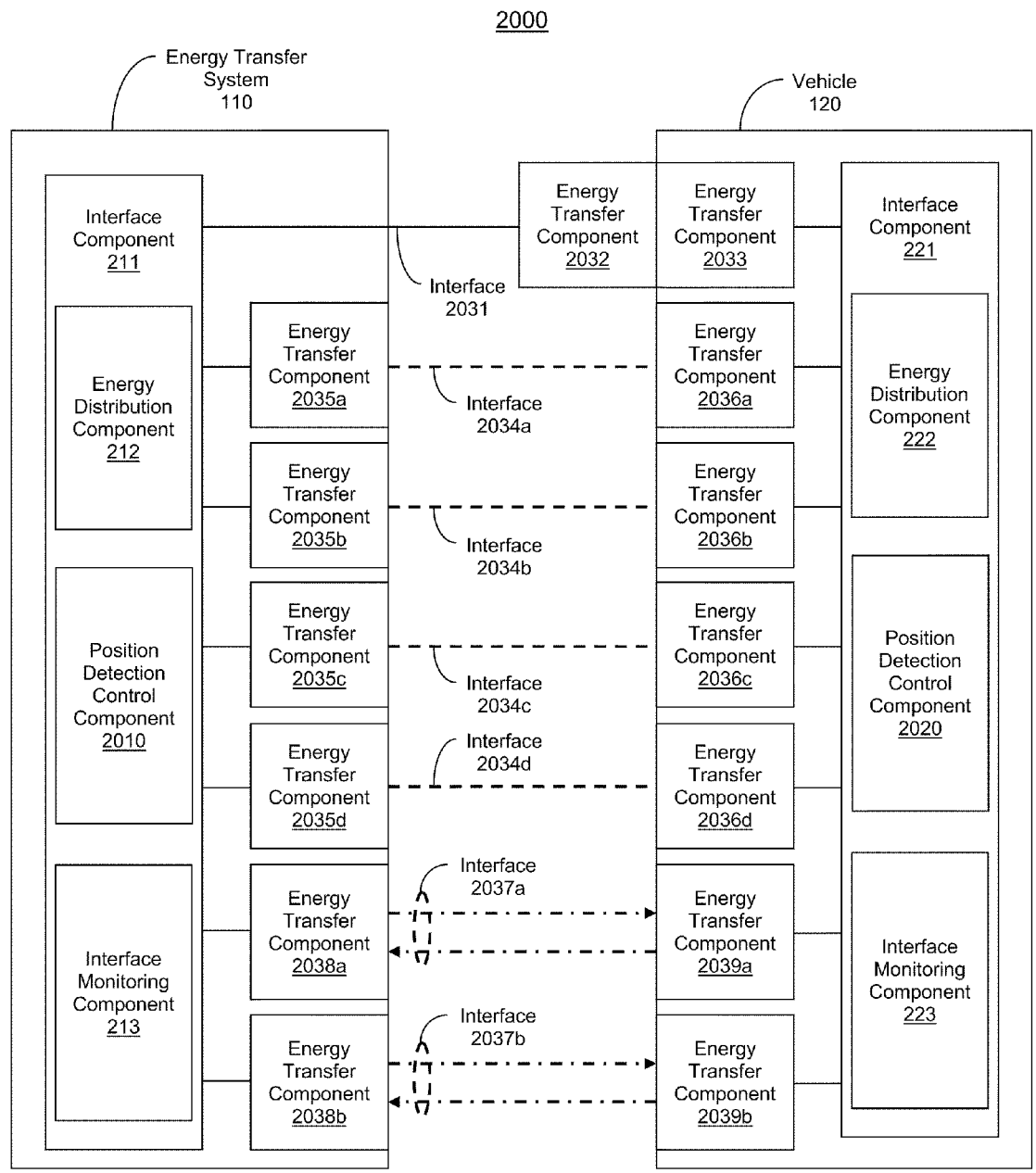
FIG. 20 shows a system for determining the position of a vehicle or a component thereof with respect to an energy transfer system using at least one energy transfer component in accordance with one embodiment of the present invention.

FIG. 20 shows system 2000 for determining the position of a vehicle or a component thereof with respect to an energy transfer system using at least one energy transfer component in accordance with one embodiment of the present invention. As shown in FIG. 20, at least one energy transfer component of an energy transfer system (e.g., 2032, 2035*a*, 2035*b*, 2035*c*, 2035*d*, 2038*a*, 2038*b*, etc.) and at least one energy transfer component of a vehicle (e.g., 2033, 2036*a*, 2036*b*, 2036*c*, 2036*d*, 2039*a*, 2039*b*, etc.) may be used to implement at least one energy transfer interface (e.g., 2031, 2034*a*, 2034*b*, 2034*c*, 2034*d*, 2037*a*, 2037*b*, etc.) for transferring energy and/or communicating signals (e.g., data signals, clock signals, etc.) between an energy transfer system (e.g., 110) and a vehicle (e.g., 120). The plurality of energy transfer components may also be used to determine the position of the vehicle by activating the energy transfer components and analyzing the respective responses corresponding to each of the energy transfer components. In this manner, energy transfer components can be repurposed or used to perform other functions such as determining the position of a vehicle with respect to an energy transfer system, determining the position of an energy transfer component (e.g., an energy transfer component of the vehicle with respect to an energy transfer component of the energy transfer system), determining whether an energy transfer can be performed using a particular energy transfer component, determining at least one possible attribute (e.g., an energy transfer type, an interface type, a power, a current, a voltage, an energy transfer profile, a duration, a waveform, a temperature, etc.) of an energy transfer performed using a particular energy transfer component, etc.

In one embodiment, signals communicated between energy transfer system 110 and vehicle 120 (e.g., over energy transfer interface 2031, energy transfer interface 2034*a*, energy transfer interface 2034*b*, energy transfer interface 2034*c*, energy transfer interface 2034*d*, energy transfer interface 2037*a*, energy transfer interface 2037*b*, etc.) may be analog signals, digital signals, pulse width modulated signals, some combination thereof, etc. An interface (e.g., 2031, 2034*a*, 2034*b*, 2034*c*, 2034*d*, 2037*a*, 2037*b*, etc.) coupling energy transfer system 110 and vehicle 120 may implement unidirectional signal communication and/or bidirectional signal communication in one embodiment. And in one embodiment, signals may be communicated between energy transfer system 110 and vehicle 120 (e.g., over energy transfer interface 2031, energy transfer interface 2034*a*, energy transfer interface 2034*b*, energy transfer interface 2034*c*, energy transfer interface 2034*d*, energy transfer interface 2037*a*, energy transfer interface 2037*b*, etc.) using single-ended signaling and/or differential signaling.

In one embodiment, position detection control component 2010 and/or position detection control component 2020 may determine the position of a vehicle or a component thereof with respect to an energy transfer system by configuring at least one energy transfer component (e.g., 2032, 2035*a*, 2035*b*, 2035*c*, 2035*d*, 2038*a*, 2038*b*, 2031, 2034*a*, 2034*b*, 2034*c*, 2034*d*, 2037*a*, 2037*b*, etc.) to operate in an energy transfer mode in one embodiment. For example, position detection control component 2010 and/or position detection control component 2020 may attempt an energy transfer between at least one energy transfer component of the energy transfer system (e.g., 2032, 2035*a*, 2035*b*, 2035*c*, 2035*d*, 2038*a*, 2038*b*, etc.) and at least one energy transfer component of the vehicle (e.g., 2031, 2034*a*, 2034*b*, 2034*c*, 2034*d*, 2037*a*, 2037*b*, etc.), where a result of the attempted energy transfer (e.g., whether any energy was transferred, a quantity of energy transferred, an efficiency of the energy transfer, a measured attribute of the energy transfer, etc.) may be used to determine whether or not the energy transfer components are in a position to perform an energy transfer. In one embodiment, the result of the attempted energy transfer may be determined by the system transferring the energy and/or by the system receiving the energy, where the result of the attempted energy transfer may be determined by measuring an electrical property associated with the at least one energy transfer component used to implement the attempted energy transfer (e.g., inductance across a coil, amperage of energy transferred via the at least one energy transfer component, another attribute of energy transferred via the at least one energy transfer component, etc.). And in one embodiment, the result of the energy transfer may be communicated between energy transfer system 110 and vehicle 120. In one embodiment, the attempted energy transfer used for position detection in an energy transfer mode may use little or very little energy, thereby reducing the amount of energy expended or wasted as a result of the position detection in an energy transfer mode.

Position detection control component 2010 and/or position detection control component 2020 may determine the position of a vehicle or a component thereof with respect to an energy transfer system by configuring at least one energy transfer component (e.g., 2032, 2035*a*, 2035*b*, 2035*c*, 2035*d*, 2038*a*, 2038*b*, 2031, 2034*a*, 2034*b*, 2034*c*, 2034*d*, 2037*a*, 2037*b*, etc.) to operate in a position detection mode in one embodiment. The position detection mode may be separate or distinct from an energy transfer mode used to transfer energy between energy transfer system 110 and vehicle 120, and may involve the use of different hardware and/or software than is used when the energy transfer component is configured to operate in an energy transfer mode. For example, where the energy transfer component is a coil (e.g., coupled with or disposed at least partially within a component of energy transfer system 110, coupled with or disposed at least partially beneath surface 1890, etc.) capable of implementing an energy transfer over an inductive interface (e.g., with a coil of the vehicle disposed in proximity to the coil of the energy transfer system), the coil may be energized (e.g., coupled to oscillator circuitry of component 2010, coupled to other circuitry of component 2010, etc.) and a response associated with the coil (e.g., a frequency of the oscillation of the oscillator circuitry) may be analyzed to determine if an object (e.g., a portion of energy transfer system 110, a portion of vehicle 120, etc.) is in proximity to the energy transfer component.

In one embodiment, the coil may be energized in the position detection mode by electrically coupling the coil to oscillator circuitry (or activating oscillator circuitry coupled to the coil), where a frequency of the oscillation of the oscillator circuitry may depend upon the inductance value of the coil. Since an object in proximity to the coil can affect its inductance value, component 2010 and/or component 2020 may detect that an object is in proximity to the coil based upon a change in the oscillation frequency (e.g., with respect to an oscillation frequency measured when an object is not in proximity to the coil, with respect to a base or reference oscillation frequency, etc.) or by measuring a particular oscillation frequency (e.g., a predetermined frequency or range of frequencies known to be caused by an object in proximity to the coil).

In one embodiment, component 2010 and/or component 2020 may be able to distinguish between different types of objects. For example, a first object (e.g., a wheel of vehicle 120) may produce a first response which is different from a second response produced by a second object (e.g., a body panel or undercarriage of vehicle 120) in proximity to the energy transfer component. As another example, a third object (e.g., a body panel or undercarriage of vehicle 120) may produce a third response which is different from a fourth response produced by a fourth object (e.g., an energy transfer component of vehicle 120) in proximity to the energy transfer component. In this manner, position detection of objects can be further improved. Additionally, since an energy transfer component can be distinguished from a non-energy transfer component, embodiments can advantageously use an energy transfer component to determine whether an energy transfer can be performed without actually initiating an energy transfer using the energy transfer component (e.g., without placing it in an energy transfer mode which can result in increased energy consumption compared with the position detection mode).

Component 2010 and/or component 2020 may be able to distinguish between objects at different distances from an energy transfer component in one embodiment. For example, a first object at a first distance (e.g., a wheel of vehicle 120) from the energy transfer component may produce a first response which is different from a second response produced by a second object at a second distance (e.g., a body panel or undercarriage of vehicle 120) from the energy transfer component. In this manner, position detection of objects can be further improved.

In one embodiment, component 2010 and/or component 2020 may activate energy transfer components sequentially. For example, component 2010 may activate a first energy transfer component (e.g., 2035*a*), and then component 2010 may activate a second energy transfer component (e.g., 2035*b*). As another example, component 2020 may activate a first energy transfer component (e.g., 2036*a*), and then component 2020 may activate a second energy transfer component (e.g., 2036*b*). In one embodiment, component 2010 and/or component 2020 may activate energy transfer components simultaneously or contemporaneously. For example, component 2010 may activate a first energy transfer component (e.g., 2035*a*) and a second energy transfer component (e.g., 2035*b*) contemporaneously. As another example, component 2020 may activate a first energy transfer component (e.g., 2036*a*) and a second energy transfer component (e.g., 2036*b*) contemporaneously.

A position detection control component (e.g., 2010, 2020, etc.) may activate a plurality of sets of energy transfer components sequentially or contemporaneously, where each of the energy transfer components in a particular set of energy transfer components may be activated sequentially or contemporaneously. In one embodiment, the plurality of sets of energy transfer components may be activated in a predetermined order. For example, one type of energy transfer component may be preferred over another type of energy transfer component (e.g., since it offers higher energy transfer rates, since it is more commonly used on vehicles, etc.), and therefore, component 2010 and/or component 2020 may activate at least one energy transfer component of the preferred type before at least one energy transfer component of a less-preferred type. In one embodiment, the ordering of the activation may be determined dynamically or on-the-fly. For example, responsive to an identification of the vehicle, component 2010 and/or component 2020 may determine which types of energy transfer components are used on the vehicle (e.g., by accessing a memory which stores an index of energy transfer component types for each type of vehicle). Component 2010 and/or component 2020 may then activate energy transfer components which are more commonly used on that type, make, etc. of vehicle. As another example, responsive to identifying a problem affecting one or more energy transfer components, component 2010 and/or component 2020 may activate energy transfer components which are not affected by an identified problem before those that are affected by an identified problem. As yet another example, responsive to determining a position of the vehicle (e.g., 120) and/or at least one energy transfer component of the vehicle, component 2010 and/or component 2020 may activate energy transfer components which are more likely to be in a position to perform an energy transfer (e.g., based on information which indicates a positioning of energy transfer components for a particular type of vehicle).

As shown in FIG. 20, energy transfer component 2032 may be implemented in accordance with (e.g., include components of, function similarly to, etc.) energy transfer component 232, whereas energy transfer component 2033 may be implemented in accordance with (e.g., include components of, function similarly to, etc.) energy transfer component 233. In this manner, interface 2031 may be implemented in accordance with (e.g., include components of, function similarly to, etc.) wired energy transfer interface 231 in one embodiment.

At least one energy transfer component (e.g., 2035*a*, 2035*b*, 2035*c*, 2035*d*, etc.) of energy transfer system 110 may be implemented in accordance with (e.g., include components of, function similarly to, etc.) energy transfer component 235, whereas at least one energy transfer component (e.g., 2036*a*, 2036*b*, 2036*c*, 2036*d*, etc.) of vehicle 120 may be implemented in accordance with (e.g., include components of, function similarly to, etc.) energy transfer component 236. In this manner, an interface (e.g., 2034*a*, 2034*b*, 2034*c*, 2034*d*, etc.) may be implemented in accordance with (e.g., include components of, function similarly to, etc.) inductive energy transfer interface 234 in one embodiment.

As shown in FIG. 20, at least one energy transfer component (e.g., 2038*a*, 2038*b*, etc.) of energy transfer system 110 may be implemented in accordance with (e.g., include components of, function similarly to, etc.) energy transfer component 238, whereas at least one energy transfer component (e.g., 2039*a*, 2039*b*, etc.) of vehicle 120 may be implemented in accordance with (e.g., include components of, function similarly to, etc.) energy transfer component 239. In this manner, an interface (e.g., 2037*a*, 2037*b*, etc.) may be implemented in accordance with (e.g., include components of, function similarly to, etc.) wireless energy transfer interface 237 in one embodiment.

Although FIG. 20 shows a specific number of interfaces between energy transfer system 110 and vehicle 120, it should be appreciated that any number of interfaces may exist or be used (e.g., to transfer energy, communicate signals, some combination thereof, etc.) between energy transfer system 110 and vehicle 120 in other embodiments. Additionally, although FIG. 20 shows a specific combination of types of interfaces between energy transfer system 110 and vehicle 120, it should be appreciated that any combination of types of interfaces may exist or be used (e.g., to transfer energy, communicate signals, some combination thereof, etc.) between energy transfer system 110 and vehicle 120 in other embodiments. Further, although FIG. 20 shows a specific number of components (e.g., 14 energy transfer components, two interface components, etc.), it should be appreciated that system 2000 may include a larger or smaller number of components in other embodiments. In one embodiment, two or more components may be combined, a component may be separated into multiple components, some combination thereof, etc. It should also be appreciated that the components depicted in FIG. 20 may be arranged differently (e.g., a sub-component of one component may be a sub-component of another component, a sub-component of a component may exist outside the component as another component, a component may be a sub-component of another component, etc.) in other embodiments.

Figure 21:
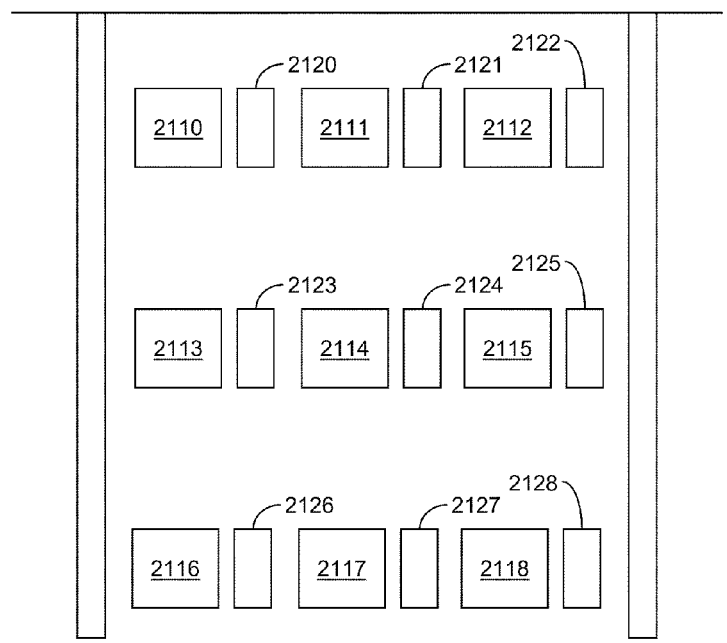
FIG. 21 shows a diagram of at least one position detection component and at least one energy transfer component in accordance with one embodiment of the present invention.

FIG. 21 shows diagram 2100 of at least one position detection component (e.g., 2120, 2121, 2122, 2123, 2124, 2125, 2126, 2127, 2128, etc.) and at least one energy transfer component (e.g., 2110, 2111, 2112, 2113, 2114, 2115, 2116, 2117, 2118, etc.) in accordance with one embodiment of the present invention. As shown in FIG. 21, the energy transfer components (e.g., 2110, 2111, 2112, 2113, 2114, 2115, 2116, 2117, 2118, etc.) may be implemented in accordance with (e.g., include components of, function similarly to, etc.) energy transfer component 232, energy transfer component 235, energy transfer component 238, or some combination thereof. The position detection components (e.g., 2120, 2121, 2122, 2123, 2124, 2125, 2126, 2127, 2128, etc.) may be implemented in accordance with (e.g., include components of, function similarly to, etc.) mechanical position detection component 1910, optical position detection component 1911, electrical position detection component 1912, wave position detection component 1913, or some combination thereof.

In one embodiment, the position detection components may be disposed adjacent to and/or in proximity to the energy transfer components. For example, position detection component 2120 may be disposed adjacent to and/or in proximity to energy transfer component 2110, position detection component 2121 may be disposed adjacent to or in proximity to energy transfer component 2111, etc. Additionally, position detection may be performed using at least one position detection component (e.g., as discussed with respect to FIG. 19) and/or using at least one energy transfer component (e.g., as discussed with respect to FIG. 20). In this manner, embodiments may advantageously improve position detection and energy transfer capabilities by increasing the number and/or type of components capable of being used for position detection (e.g., position detection components and energy transfer components). Further, embodiments may advantageously improve position detection and energy transfer capabilities by positioning the position detection components adjacent to and/or in proximity to the energy transfer components.

As an example, position detection component 2120 and/or energy transfer component 2110 may be used to detect the position of a first wheel of a vehicle (e.g., 120, 320*a*, 320*b*, 320*c*, 1802, etc.), whereas position detection component 2128 and/or energy transfer component 2118 may be used to detect the position of a second wheel of the vehicle. The position of other components of the vehicle (e.g., another wheel, another tire, a body panel, an energy transfer component of the vehicle, etc.) may be determined using other position detection components, other energy transfer components, information about the vehicle (e.g., information about the wheel base and track width of the vehicle which may be used to determine a position of the other two wheels of the vehicle, information about a relative position between a wheel of the vehicle and an energy transfer component of the vehicle, other information, etc.), some combination thereof, etc. In this manner, energy transfer components of the vehicle may be determined for enabling one or more transfers of energy between the vehicle and an energy transfer system (e.g., 110).

In one embodiment, use of position detection components and energy transfer components to detect the position of a vehicle and/or and an energy transfer component may provide redundancy and/or improve the precision of position detection. For example, if position detection component 2120 is unable to detect a first wheel of a vehicle (e.g., because the vehicle is parked at an angle, not perfectly centered in the parking space, position detection component 2120 is malfunctioning or has failed, etc.), energy transfer component 2110 may be used to detect the first wheel. As such, redundancy is provided (e.g., to account for a component which has failed or is otherwise not functioning properly) by increasing the number of components used to perform position detection. Further, the precision of the position detection is improved by using information about which components detect the position of an object and which do not detect the position of an object. For example, if an object (e.g., a wheel of the vehicle) is detected by position detection component 2120 but is not detected by energy transfer components 2110 and 2111, then it may be determined that the object is located between energy transfer components 2110 and 2111.

Position detection components and/or energy transfer components may be used to determine the relative positioning of multiple vehicles with respect to one another in one embodiment. For example, if four objects are detected (e.g., using position detection component 2120 and/or energy transfer component 2110, using position detection component 2122 and/or energy transfer component 2112, using position detection component 2126 and/or energy transfer component 2116, and using position detection component 2128 and/or energy transfer component 2118), it may be unclear whether the four objects are four wheels of the same vehicle or two wheels of one vehicle and two wheels of another vehicle (e.g., parked side-by-side). However, at least one position detection component (e.g., 2121, 2124, 2127, etc.) and/or at least one energy transfer component (e.g., 2111, 2114, 2117, etc.) may be used to determine if an object (e.g., an undercarriage of a vehicle) is disposed above a respective component. As such, if an object is located above a component (e.g., a position detection component and/or an energy transfer component), then it may be determined that the four objects belong to the same vehicle. Alternatively, if an object (e.g., an undercarriage of a vehicle) is not located above a component (e.g., a position detection component and/or an energy transfer component), then it may be determined that the four objects belong to at least two separate vehicles (e.g., parked side-by-side). Thus, position detection of at least one respective energy transfer component of each vehicle can be improved.

Although FIG. 21 shows a specific number, arrangement, shape, and size of position detection components, it should be appreciated that a different number, arrangement, shape, and/or size of position detection components may be used in other embodiments. Additionally, although FIG. 21 shows a specific number, arrangement, shape, and size of energy transfer components, it should be appreciated that a different number, arrangement, shape, and/or size of energy transfer components may be used in other embodiments.

Figure 22A:
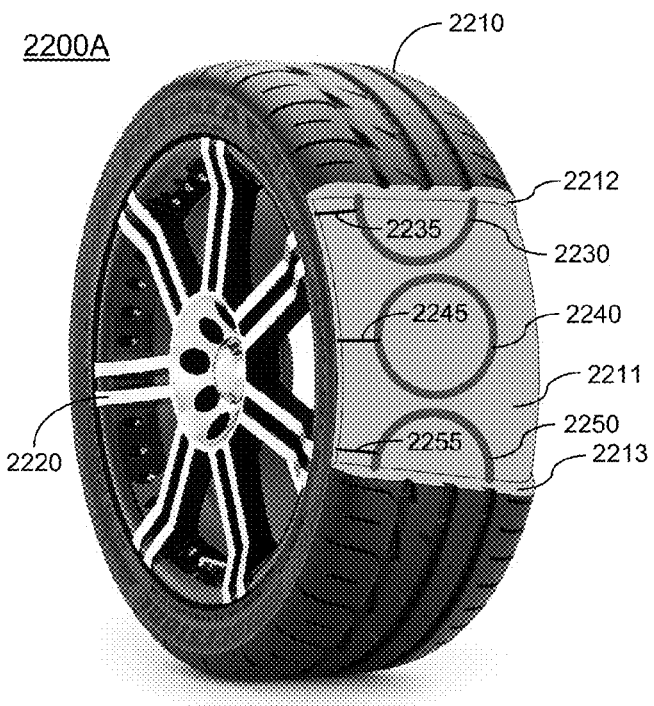
FIG. 22A shows a diagram of a tire including at least one energy transfer component in a first orientation in accordance with one embodiment of the present invention.

FIG. 22A shows diagram 2200A of tire 2210 including at least one energy transfer component in a first orientation in accordance with one embodiment of the present invention. As shown in FIG. 22A, each energy transfer component (e.g., 2230, 2240, 2250, etc.) may be coupled to other components of a vehicle (e.g., interface component 221, charge and/or discharge component 228, power management component 225, energy storage component 226, power source 227, etc.) via a respective interface (e.g., 2235, 2245, and 2255, respectively). In one embodiment, the interfaces may be routed through or along a sidewall of tire 2210. As such, at least one energy transfer component (e.g., 2230, 2240, 2250, etc.) may be used to perform an energy transfer and/or communicate signals between a vehicle (e.g., 120, 320a, 320b, 320c, 1802, etc.) and an energy transfer system (e.g., 110).

As shown in FIG. 22A, an energy transfer component (e.g., 2230, 2240, 2250, etc.) may be coupled with or disposed at least partially within tire 2210. In one embodiment, an energy transfer component (e.g., 2230, 2240, 2250, some combination thereof, etc.) may be exposed or visible from the outside of the tire (e.g., coupled with an outer surface of tire 2210, set in tire 2210 such that one portion is visible and another portion is hidden, etc.). Alternatively, an energy transfer component (e.g., 2230, 2240, 2250, some combination thereof, etc.) may be hidden or not visible from the outside of the tire. For example, an energy transfer component (e.g., 2230, 2240, 2250, some combination thereof, etc.) may be disposed between layers or portions of the tire (e.g., tread, sidewall, liner, bead, filler, chafer, steel belt, nylon belt, cord, body ply, cap ply, edge cover which covers or overlaps a ply, adhesive, etc.). And in one embodiment, an energy transfer component (e.g., 2230, 2240, 2250, some combination thereof, etc.) may be disposed on or coupled with an inner layer or portion (e.g., 2211, 2212, 2213, etc.) of tire 2210.

One or more energy transfer components (e.g., 2230, 2240, 2250, some combination thereof, etc.) may be disposed along a centerline of tire 2210 in one embodiment. In one embodiment, one or more energy transfer components (e.g., 2230, 2240, 2250, some combination thereof, etc.) may be disposed to one side of tire 2210. And in one embodiment, one or more energy transfer components (e.g., 2230, 2240, 2250, some combination thereof, etc.) may be disposed in a zigzag pattern, another pattern, etc.

An energy transfer component (e.g., 2230, 2240, 2250, some combination thereof, etc.) may be oriented in an axial plane (e.g., a plane which is parallel or almost parallel to an axis of rotation of wheel 2220 and/or tire 2210) of tire 2210 and/or wheel 2220 in one embodiment. In one embodiment, an energy transfer component (e.g., 2230, 2240, 2250, some combination thereof, etc.) may be oriented in at least one other plane (e.g., in a non-axial plane, etc.). In one embodiment, at least two of the energy transfer components (e.g., 2230, 2240, 2250, etc.) may be oriented in different planes. In one embodiment, all of the energy transfer components (e.g., 2230, 2240, 2250, etc.) may be oriented in different planes. And in one embodiment, one or more of the energy transfer components (e.g., 2230, 2240, 2250, some combination thereof, etc.) may be disposed circumferentially around tire 2210.

One or more of the energy transfer components (e.g., 2230, 2240, 2250, some combination thereof, etc.) may be used to transfer energy and/or communicate signals over a wired interface (e.g., 231), and therefore, one or more of the energy transfer components (e.g., 2230, 2240, 2250, some combination thereof, etc.) may be implemented in accordance with (e.g., include components of, function similarly to, etc.) energy transfer component 233 in one embodiment. One or more of the energy transfer components (e.g., 2230, 2240, 2250, some combination thereof, etc.) may be used to transfer energy and/or communicate signals over an inductive interface (e.g., 234), and therefore, one or more of the energy transfer components (e.g., 2230, 2240, 2250, some combination thereof, etc.) may be implemented in accordance with (e.g., include components of, function similarly to, etc.) energy transfer component 236 in one embodiment. One or more of the energy transfer components (e.g., 2230, 2240, 2250, some combination thereof, etc.) may be used to transfer energy and/or communicate signals over a wireless interface (e.g., 237), and therefore, one or more of the energy transfer components (e.g., 2230, 2240, 2250, some combination thereof, etc.) may be implemented in accordance with (e.g., include components of, function similarly to, etc.) energy transfer component 239 in one embodiment.

In one embodiment, one or more energy transfer components (e.g., 2230, 2240, 2250, some combination thereof, etc.) may include a coil. A coil of an energy transfer component (e.g., 2230, 2240, 2250, etc.) may be oriented in an axial plane (e.g., a plane which is parallel or almost parallel to an axis of rotation of wheel 2220 and/or tire 2210) of tire 2210 and/or wheel 2220, where the coil may be wound around an axis perpendicular or almost perpendicular to an axis of rotation of wheel 2220 and/or tire 2210. In one embodiment, a coil of an energy transfer component (e.g., 2230, 2240, 2250, etc.) may be oriented in at least one other plane (e.g., in a non-axial plane, etc.), disposed circumferentially around tire 2210, some combination thereof, etc. As such, energy may be transferred and/or signals may be communicated using at least one coil of tire 2210 and another energy transfer component (e.g., 235) in proximity to the at least one coil of tire 2210. For example, where an energy transfer component (e.g., including a coil) of an energy transfer system (e.g., 110) is coupled with or at least partially disposed in the ground, energy may be transferred and/or signals may be communicated between a vehicle (e.g., 120, 320a, 320b, 320c, 1802, etc.) and the energy transfer system as a coil of tire 2210 passes through (e.g., as tire 2210 rolls along the ground near the energy transfer component of the energy transfer system, as tire 2210 sits in proximity to the energy transfer component of the energy transfer system, etc.) a magnetic field created by the energy transfer component of the energy transfer system.

Embodiments of the present invention may advantageously enable an energy transfer component of a vehicle (e.g., 2230, 2240, 2250, etc.) to be positioned relatively close to an energy transfer component of an energy transfer system (e.g., coupled with or at least partially disposed in the ground, positioned near a roadway or other location where a vehicle may be located, positioned in another location near tire 2210, etc.). In one embodiment, an energy transfer component of a vehicle (e.g., 2230, 2240, 2250, etc.) may be positioned less than an inch from an energy transfer component of an energy transfer system (e.g., coupled with or at least partially disposed in the ground, positioned near a roadway or other location where a vehicle may be located, positioned in another location near tire 2210, etc.). In one embodiment, an energy transfer component of a vehicle (e.g., 2230, 2240, 2250, etc.) may be positioned at a different distance (e.g., within a few inches, within a foot, within a longer distance, etc.) from an energy transfer component of an energy transfer system (e.g., coupled with or at least partially disposed in the ground, positioned near a roadway or other location where a vehicle may be located, positioned in another location near tire 2210, etc.). In this manner, embodiments of the present invention can improve energy transfer and/or signal communication between a vehicle (e.g., 120, 320*a*, 320*b*, 320*c*, 1802, etc.) and an energy transfer system (e.g., 110).

In one embodiment, energy transfer components (e.g., 2230, 2240, 2250, etc.) may be sequentially activated (e.g., to enable an energy transfer, communication of signals, etc.) and/or sequentially deactivated based upon an orientation of tire 2210 (e.g., a position of an energy transfer component of tire 2210 with respect to an energy transfer component of an energy transfer system). For example, as tire 2210 rolls along the ground, energy transfer component 2250 may be activated at a first time (e.g., when energy transfer component 2250 comes into proximity with the ground, when energy transfer component 2250 is in a position or otherwise capable of transferring energy and/or communicating signals with an energy transfer component of an energy transfer system, etc.), energy transfer component 2240 may be activated at a second time (e.g., when energy transfer component 2240 comes into proximity with the ground, when energy transfer component 2240 is in a position or otherwise capable of transferring energy and/or communicating signals with an energy transfer component of an energy transfer system, etc.), energy transfer component 2230 may be activated at a third time (e.g., when energy transfer component 2230 comes into proximity with the ground, when energy transfer component 2230 is in a position or otherwise capable of transferring energy and/or communicating signals with an energy transfer component of an energy transfer system, etc.), etc. As another example, as tire 2210 rolls along the ground, energy transfer component 2250 may be deactivated at a fourth time (e.g., when energy transfer component 2250 is no longer in proximity with the ground, when energy transfer component 2250 is no longer in a position or otherwise capable of transferring energy and/or communicating signals with an energy transfer component of an energy transfer system, etc.), energy transfer component 2240 may be deactivated at a fifth time (e.g., when energy transfer component 2240 is no longer in proximity with the ground, when energy transfer component 2240 is no longer in a position or otherwise capable of transferring energy and/or communicating signals with an energy transfer component of an energy transfer system, etc.), energy transfer component 2230 may be deactivated at a sixth time (e.g., when energy transfer component 2230 is no longer in proximity with the ground, when energy transfer component 2230 is no longer in a position or otherwise capable of transferring energy and/or communicating signals with an energy transfer component of an energy transfer system, etc.), etc. In one embodiment, a plurality of energy transfer components may be active at any given time when sequentially activating and/or deactivating the energy transfer components (e.g., a plurality of energy transfer components may be contemporaneously active responsive to sequential activation of the plurality of energy transfer components, where the plurality of energy transfer components may then be sequentially deactivated, deactivated simultaneously or contemporaneously, etc.).

The orientation of the tire (e.g., the position of an energy transfer component of tire 2210 with respect to an energy transfer component of an energy transfer system) may be determined by a sensor coupled with tire 2210, with wheel 2220, with a portion of the vehicle which monitors rotation of tire 2210 and/or wheel 2220, some combination thereof, etc. The activation and deactivation of the energy transfer components may be controlled by interface component 221 (e.g., based on or responsive to information about the orientation of tire 2210) in one embodiment. As such, in one embodiment, sequential activation and/or sequential deactivation of energy transfer components based upon an orientation of the tire (e.g., the position of an energy transfer component of tire 2210 with respect to an energy transfer component of an energy transfer system) can reduce energy loss (e.g., by deactivating one or more energy transfer components which are not used to transfer energy at a particular time) and/or increase the lifetime of an energy transfer component by reducing the amount of time that the energy transfer component is activated and/or by increasing the amount of time that the energy transfer component is deactivated.

In one embodiment, two or more of the energy transfer components of tire 2210 may be simultaneously or contemporaneously activated. For example, energy transfer components 2230, 2240, and 2250 may be simultaneously or contemporaneously activated (e.g., when energy transfer component 2240 is nearest to the ground, when tire 2210 is in another orientation, etc.). In other embodiments, any number of energy transfer components may be simultaneously or contemporaneously activated to enable the performance of one or more energy transfers. As such, multiple energy transfers can be advantageously performed at any given time between a vehicle (e.g., 120, 320*a*, 320*b*, 320*c*, 1802, etc.) and an energy transfer system (e.g., 110) using multiple energy transfer components of tire 2210, thereby enabling a higher overall energy transfer rate, reducing the heat produced by each of energy transfer components, extending the lifetime of the energy transfer components, increasing the efficiency of the energy transfer (e.g., by operating each energy transfer component at a reduced load where they are more efficient, etc.), some combination thereof, etc.

In one embodiment, groups of energy transfer components may be sequentially activated and/or sequentially deactivated (e.g., based upon the orientation of tire 2210). For example, one group of energy transfer components may be activated before another group of energy transfer components, one group of energy transfer components may be deactivated before another group of energy transfer components, etc. Each group may have any number of energy transfer components. In one embodiment, at least one energy transfer component of a particular group may be simultaneously (or contemporaneously) activated and/or simultaneously (or contemporaneously) deactivated. And in one embodiment, at least one energy transfer components of a particular group may be sequentially activated and/or sequentially deactivated.

The energy transfer components (e.g., 2230, 2240, 2250, etc.) and/or associated circuitry may remain in a first state (e.g., in a low-power state) until a request is received to activate one or more of the energy transfer components in one embodiment. The request may be communicated over a signal interface (e.g., 134) and/or over an energy transfer interface (e.g., 132). For example, a component (e.g., signal communication component 224 or another component of interface component 221) coupled to one or more energy transfer components may detect a request to activate at least one energy transfer component, where the request may be communicated over an energy transfer interface which includes an energy transfer component to be activated (e.g., one or more of the at least one energy transfer component associated with the request) and/or over another energy transfer interface which does not include an energy transfer component to be activated (e.g., one or more energy transfer components other than the at least one energy transfer component associated with the request). Responsive to the request, the at least one energy transfer component and/or associated circuitry may be configured (e.g., by interface component 221) in a second state to enable the at least one energy transfer component to transfer energy and/or communicate signals (e.g., data signals, clock signals, etc.). The at least one energy transfer component (e.g., 2230, 2240, 2250, etc.) and/or associated circuitry may be configured in the first state after the energy transfer and/or signal communication is completed. As such, where components of the vehicle consume less power in the first state than the second state, energy may be saved by configuring energy transfer components and/or associated circuitry in a first state when not in use or otherwise not needed to transfer energy and/or communicate signals.

As shown in FIG. 22A, tire 2210 may be inflatable (e.g., able to maintain its shape by holding air or some other fluid at a pressure) in one embodiment. Alternatively, tire 2210 may be non-inflatable. For example, tire 2210 may include a structure (e.g., between the tread of tire 2210 and wheel 2220, etc.) capable of supporting at least a portion of the weight of a vehicle, where the structure may include ribs, hexagonal cells or alternatively shaped cells, or some other structure. And in one embodiment, tire 2210 may be part of a tire-and-wheel combination (e.g., where tire 2210 is permanently coupled with wheel 2220).

In one embodiment, one or more energy transfer components (e.g., 2230, 2240, 2250, etc.) of tire 2210 may improve or enhance at least one mechanical property of tire 2210. For example, one or more energy transfer components (e.g., 2230, 2240, 2250, etc.) of tire 2210 may increase rigidity, strength, resistance to deformation, some combination thereof, etc. As another example, one or more energy transfer components (e.g., 2230, 2240, 2250, etc.) of tire 2210 may increase lateral stiffness, longitudinal stiffness, some combination thereof, etc. As yet another example, one or more energy transfer components (e.g., 2230, 2240, 2250, etc.) of tire 2210 may enable the tire to support circumferential loads. And as a further example, one or more energy transfer components (e.g., 2230, 2240, 2250, etc.) of tire 2210 may be flexible (e.g., able to be deformed or bent, able to return to its original shape after deformation or bending, etc.), thereby enabling tire 2210 to change shape or deform during operation.

Although FIG. 22A depicts tire 2210 with a specific size and shape, it should be appreciated that tire 2210 may have a different size and/or shape in other embodiments. Additionally, although FIG. 22A depicts only three energy transfer components (e.g., 2230, 2240, 2250, etc.) of tire 2210, it should be appreciated that tire 2210 may have any number of energy transfer components. Further, although FIG. 22A depicts the energy transfer components (e.g., 2230, 2240, 2250, etc.) with a specific size, shape, orientation and arrangement, it should be appreciated that the energy transfer components of tire 2210 may have any size, shape, orientation and/or arrangement in other embodiments.

Figure 22B:
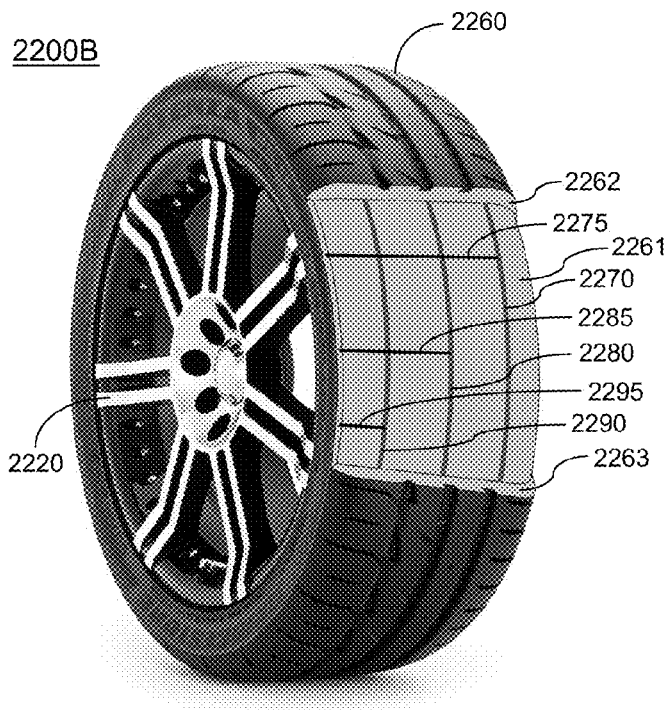
FIG. 22B shows a diagram of a tire including at least one energy transfer component in a second orientation in accordance with one embodiment of the present invention.

FIG. 22B shows diagram 2200B of tire 2260 including at least one energy transfer component in a second orientation in accordance with one embodiment of the present invention. As shown in FIG. 22B, each energy transfer component (e.g., 2270, 2280, 2290, etc.) may be coupled to other components of a vehicle (e.g., interface component 221, charge and/or discharge component 228, power management component 225, energy storage component 226, power source 227, etc.) via a respective interface (e.g., 2275, 2285, and 2295, respectively). In one embodiment, the interfaces may be routed through or along a sidewall of tire 2260. As such, at least one energy transfer component (e.g., 2270, 2280, 2290, etc.) may be used to perform an energy transfer and/or communicate signals between a vehicle (e.g., 120, 320a, 320b, 320c, 1802, etc.) and an energy transfer system (e.g., 110).

As shown in FIG. 22B, an energy transfer component (e.g., 2270, 2280, 2290, etc.) may be coupled with or disposed at least partially within tire 2260. In one embodiment, an energy transfer component (e.g., 2270, 2280, 2290, some combination thereof, etc.) may be exposed or visible from the outside of the tire (e.g., coupled with an outer surface of tire 2260, set in tire 2260 such that one portion is visible and another portion is hidden, etc.). Alternatively, an energy transfer component (e.g., 2270, 2280, 2290, some combination thereof, etc.) may be hidden or not visible from the outside of the tire. For example, an energy transfer component (e.g., 2270, 2280, 2290, some combination thereof, etc.) may be disposed between layers or portions of the tire (e.g., tread, sidewall, liner, bead, filler, chafer, steel belt, nylon belt, cord, body ply, cap ply, edge cover which covers or overlaps a ply, adhesive, etc.). And in one embodiment, an energy transfer component (e.g., 2270, 2280, 2290, some combination thereof, etc.) may be disposed on or coupled with an inner layer or portion (e.g., 2261, 2262, 2263, etc.) of tire 2210.

One or more energy transfer components (e.g., 2270, 2280, 2290, some combination thereof, etc.) may be disposed along a centerline of tire 2260 in one embodiment. In one embodiment, one or more energy transfer components (e.g., 2270, 2280, 2290, some combination thereof, etc.) may be disposed to one side of tire 2260. And in one embodiment, one or more energy transfer components (e.g., 2270, 2280, 2290, some combination thereof, etc.) may be disposed in a zigzag pattern, another pattern, etc.

An energy transfer component (e.g., 2270, 2280, 2290, some combination thereof, etc.) may be oriented in a radial plane (e.g., a plane which is perpendicular or almost perpendicular to an axis of rotation of wheel 2220 and/or tire 2260) of tire 2260 and/or wheel 2220 in one embodiment. In one embodiment, an energy transfer component (e.g., 2270, 2280, 2290, some combination thereof, etc.) may be oriented in at least one other plane (e.g., in a non-radial plane, etc.). In one embodiment, at least two of the energy transfer components (e.g., 2270, 2280, 2290, etc.) may be oriented in different planes. In one embodiment, all of the energy transfer components (e.g., 2270, 2280, 2290, etc.) may be oriented in different planes. And in one embodiment, one or more of the energy transfer components (e.g., 2270, 2280, 2290, some combination thereof, etc.) may be disposed circumferentially around tire 2260.

One or more of the energy transfer components (e.g., 2270, 2280, 2290, some combination thereof, etc.) may be used to transfer energy and/or communicate signals over a wired interface (e.g., 231), and therefore, one or more of the energy transfer components (e.g., 2270, 2280, 2290, some combination thereof, etc.) may be implemented in accordance with (e.g., include components of, function similarly to, etc.) energy transfer component 233 in one embodiment. One or more of the energy transfer components (e.g., 2270, 2280, 2290, some combination thereof, etc.) may be used to transfer energy and/or communicate signals over an inductive interface (e.g., 234), and therefore, one or more of the energy transfer components (e.g., 2270, 2280, 2290, some combination thereof, etc.) may be implemented in accordance with (e.g., include components of, function similarly to, etc.) energy transfer component 236 in one embodiment. One or more of the energy transfer components (e.g., 2270, 2280, 2290, some combination thereof, etc.) may be used to transfer energy and/or communicate signals over a wireless interface (e.g., 237), and therefore, one or more of the energy transfer components (e.g., 2270, 2280, 2290, some combination thereof, etc.) may be implemented in accordance with (e.g., include components of, function similarly to, etc.) energy transfer component 239 in one embodiment.

In one embodiment, one or more energy transfer components (e.g., 2270, 2280, 2290, some combination thereof, etc.) may include a coil. A coil of an energy transfer component (e.g., 2270, 2280, 2290, etc.) may be oriented in a radial plane (e.g., a plane which is perpendicular or almost perpendicular to an axis of rotation of wheel 2220 and/or tire 2260) of tire 2260 and/or wheel 2220, where the coil may be wound around an axis parallel or almost parallel to an axis of rotation of wheel 2220 and/or tire 2260. In one embodiment, a coil of an energy transfer component (e.g., 2270, 2280, 2290, etc.) may be oriented in at least one other plane (e.g., in a non-radial plane, etc.), disposed circumferentially around tire 2260, some combination thereof, etc. As such, energy may be transferred and/or signals may be communicated using at least one coil of tire 2260 and another energy transfer component (e.g., 235) in proximity to the at least one coil of tire 2260. For example, where an energy transfer component (e.g., including a coil) of an energy transfer system (e.g., 110) is coupled with or at least partially disposed in the ground, energy may be transferred and/or signals may be communicated between a vehicle (e.g., 120, 320a, 320b, 320c, 1802, etc.) and the energy transfer system as a coil of tire 2260 passes through (e.g., as tire 2260 rolls along the ground near the energy transfer component of the energy transfer system, as tire 2260 sits in proximity to the energy transfer component of the energy transfer system, etc.) a magnetic field created by the energy transfer component of the energy transfer system.

Embodiments of the present invention may advantageously enable an energy transfer component of a vehicle (e.g., 2270, 2280, 2290, etc.) to be positioned relatively close to an energy transfer component of an energy transfer system (e.g., coupled with or at least partially disposed in the ground, positioned near a roadway or other location where a vehicle may be located, positioned in another location near tire 2260, etc.). In one embodiment, an energy transfer component of a vehicle (e.g., 2270, 2280, 2290, etc.) may be positioned less than an inch from an energy transfer component of an energy transfer system (e.g., coupled with or at least partially disposed in the ground, positioned near a roadway or other location where a vehicle may be located, positioned in another location near tire 2260, etc.). In one embodiment, an energy transfer component of a vehicle (e.g., 2270, 2280, 2290, etc.) may be positioned at a different distance (e.g., within a few inches, within a foot, within a longer distance, etc.) from an energy transfer component of an energy transfer system (e.g., coupled with or at least partially disposed in the ground, positioned near a roadway or other location where a vehicle may be located, positioned in another location near tire 2260, etc.). In this manner, embodiments of the present invention can improve energy transfer and/or signal communication between a vehicle (e.g., 120, 320a, 320b, 320c, 1802, etc.) and an energy transfer system (e.g., 110).

In one embodiment, energy transfer components (e.g., 2270, 2280, 2290, etc.) may be simultaneously (or contemporaneously) activated and/or simultaneously (or contemporaneously) deactivated. As such, in one embodiment, energy loss can be reduced and/or the lifetime of an energy transfer component can be extended by reducing the amount of time that the energy transfer component is activated and/or increasing the amount of time that the energy transfer component is deactivated.

Energy transfer components (e.g., 2270, 2280, 2290, etc.) may be sequentially activated and/or sequentially deactivated in one embodiment. As such, multiple energy transfers can be advantageously performed at any given time between a vehicle (e.g., 120, 320a, 320b, 320c, 1802, etc.) and an energy transfer system (e.g., 110) using multiple energy transfer components of tire 2260, thereby enabling a higher overall energy transfer rate, reducing the heat produced by each of energy transfer components, extending the lifetime of the energy transfer components, increasing the efficiency of the energy transfer (e.g., by operating each energy transfer component at a reduced load where they are more efficient, etc.), some combination thereof, etc.

In one embodiment, groups of energy transfer components of tire 2260 may be sequentially activated and/or sequentially deactivated. For example, one group of energy transfer components may be activated before another group of energy transfer components, one group of energy transfer components may be deactivated before another group of energy transfer components, etc. Each group may have any number of energy transfer components. In one embodiment, at least one energy transfer component of a particular group may be simultaneously (or contemporaneously) activated and/or simultaneously (or contemporaneously) deactivated. And in one embodiment, at least one energy transfer components of a particular group may be sequentially activated and/or sequentially deactivated.

In one embodiment, the energy transfer components (e.g., 2270, 2280, 2290, etc.) and/or associated circuitry may remain in a first state (e.g., in a low-power state) until a request is received to activate one or more of the energy transfer components. The request may be communicated over a signal interface (e.g., 134) and/or over an energy transfer interface (e.g., 132). For example, a component (e.g., signal communication component 224 or another component of interface component 221) coupled to one or more energy transfer components may detect a request to activate at least one energy transfer component, where the request may be communicated over an energy transfer interface which includes an energy transfer component to be activated (e.g., one or more of the at least one energy transfer component associated with the request) and/or over another energy transfer interface which does not include an energy transfer component to be activated (e.g., one or more energy transfer components other than the at least one energy transfer component associated with the request). Responsive to the request, the at least one energy transfer component and/or associated circuitry may be configured (e.g., by interface component 221) in a second state to enable the at least one energy transfer component to transfer energy and/or communicate signals (e.g., data signals, clock signals, etc.). The at least one energy transfer component (e.g., 2270, 2280, 2290, etc.) and/or associated circuitry may be configured in the first state after the energy transfer and/or signal communication is completed. As such, where components of the vehicle consume less power in the first state than the second state, energy may be saved by configuring energy transfer components and/or associated circuitry in a first state when not in use or otherwise not needed to transfer energy and/or communicate signals.

As shown in FIG. 22B, tire 2260 may be inflatable (e.g., able to maintain its shape by holding air or some other fluid at a pressure) in one embodiment. Alternatively, tire 2260 may be non-inflatable. For example, tire 2260 may include a structure (e.g., between the tread of tire 2260 and wheel 2220, etc.) capable of supporting at least a portion of the weight of a vehicle, where the structure may include ribs, hexagonal cells or alternatively shaped cells, or some other structure. And in one embodiment, tire 2260 may be part of a tire-and-wheel combination (e.g., where tire 2260 is permanently coupled with wheel 2220).

In one embodiment, one or more energy transfer components (e.g., 2270, 2280, 2290, etc.) of tire 2260 may improve or enhance at least one mechanical property of tire 2260. For example, one or more energy transfer components (e.g., 2270, 2280, 2290, etc.) of tire 2260 may increase rigidity, strength, resistance to deformation, some combination thereof, etc. As another example, one or more energy transfer components (e.g., 2270, 2280, 2290, etc.) of tire 2260 may increase lateral stiffness, longitudinal stiffness, some combination thereof, etc. As yet another example, one or more energy transfer components (e.g., 2270, 2280, 2290, etc.) of tire 2260 may enable the tire to support circumferential loads. And as a further example, one or more energy transfer components (e.g., 2270, 2280, 2290, etc.) of tire 2260 may be flexible (e.g., able to be deformed or bent, able to return to its original shape after deformation or bending, etc.), thereby enabling tire 2260 to change shape or deform during operation.

In one embodiment, one or more energy transfer components (e.g., 2270, 2280, 2290, etc.) of tire 2260 may implement or replace a bead of tire 2260. One or more energy transfer components (e.g., 2270, 2280, 2290, etc.) of tire 2260 may implement or replace a belt (e.g., steel belt, nylon belt, etc.) of tire 2260. And in one embodiment, one or more energy transfer components (e.g., 2270, 2280, 2290, etc.) of tire 2260 may implement or replace another component of tire 2260.

Although FIG. 22B depicts tire 2260 with a specific size and shape, it should be appreciated that tire 2260 may have a different size and/or shape in other embodiments. Additionally, although FIG. 22B depicts only three energy transfer components (e.g., 2270, 2280, 2290, etc.) of tire 2260, it should be appreciated that tire 2260 may have any number of energy transfer components. Further, although FIG. 22B depicts the energy transfer components (e.g., 2270, 2280, 2290, etc.) with a specific size, shape, orientation and arrangement, it should be appreciated that the energy transfer components of tire 2260 may have any size, shape, orientation and/or arrangement in other embodiments.

Figure 23A:
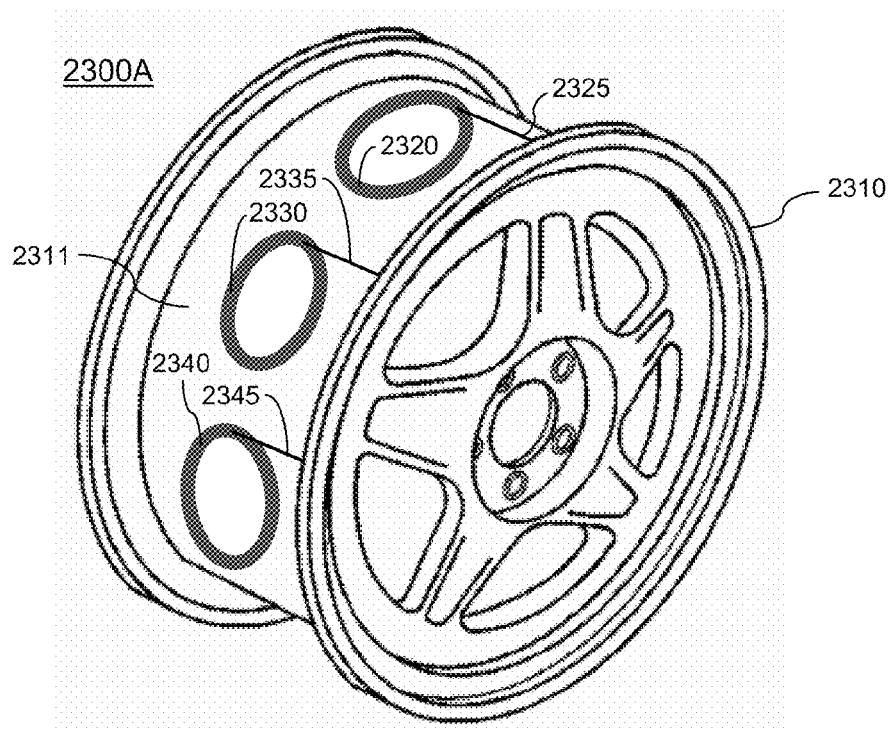
FIG. 23A shows a diagram of a wheel including at least one energy transfer component in a first orientation in accordance with one embodiment of the present invention.

FIG. 23A shows diagram 2300A of wheel 2310 including at least one energy transfer component in a first orientation in accordance with one embodiment of the present invention. As shown in FIG. 23A, each energy transfer component (e.g., 2320, 2330, 2340, etc.) may be coupled to other components of a vehicle (e.g., interface component 221, charge and/or discharge component 228, power management component 225, energy storage component 226, power source 227, etc.) via a respective interface (e.g., 2325, 2335, and 2345, respectively). In one embodiment, the interfaces may be routed through or along a portion of wheel 2310 (e.g., including at least one spoke, a disc with at least one hole formed therein, a disc with no holes formed therein, etc.) which connects a rim of wheel 2310 to a hub of wheel 2310. As such, at least one energy transfer component (e.g., 2320, 2330, 2340, etc.) may be used to perform an energy transfer and/or communicate signals between a vehicle (e.g., 120, 320a, 320b, 320c, 1802, etc.) and an energy transfer system (e.g., 110).

As shown in FIG. 23A, an energy transfer component (e.g., 2320, 2330, 2340, etc.) may be coupled with or disposed at least partially within wheel 2310. In one embodiment, an energy transfer component (e.g., 2320, 2330, 2340, some combination thereof, etc.) may be disposed in a groove, channel, or other recess which is shaped or otherwise able to accept an energy transfer component. An energy transfer component (e.g., 2320, 2330, 2340, etc.) may be secured to wheel 2310 (e.g., surface 2311) using at least one bolt, at least one screw, at least one strap, etc. Alternatively, an energy transfer component (e.g., 2320, 2330, 2340, etc.) may be secured to wheel 2310 (e.g., surface 2311) using another fastening method (e.g., using an adhesive, using a hook-and-loop fastener such as Velcro®, etc.).

One or more energy transfer components (e.g., 2320, 2330, 2340, some combination thereof, etc.) may be disposed along a centerline of wheel 2310 in one embodiment. In one embodiment, one or more energy transfer components (e.g., 2320, 2330, 2340, some combination thereof, etc.) may be disposed to one side of wheel 2310. And in one embodiment, one or more energy transfer components (e.g., 2320, 2330, 2340, some combination thereof, etc.) may be disposed in a zigzag pattern, another pattern, etc.

An energy transfer component (e.g., 2320, 2330, 2340, some combination thereof, etc.) may be oriented in an axial plane (e.g., a plane which is parallel or almost parallel to an axis of rotation of wheel 2310) of wheel 2310 in one embodiment. In one embodiment, an energy transfer component (e.g., 2320, 2330, 2340, some combination thereof, etc.) may be oriented in at least one other plane (e.g., in a non-axial plane, etc.). In one embodiment, at least two of the energy transfer components (e.g., 2320, 2330, 2340, etc.) may be oriented in different planes. In one embodiment, all of the energy transfer components (e.g., 2320, 2330, 2340, etc.) may be oriented in different planes. And in one embodiment, one or more of the energy transfer components (e.g., 2320, 2330, 2340, some combination thereof, etc.) may be disposed circumferentially around wheel 2310.

One or more of the energy transfer components (e.g., 2320, 2330, 2340, some combination thereof, etc.) may be used to transfer energy and/or communicate signals over a wired interface (e.g., 231), and therefore, one or more of the energy transfer components (e.g., 2320, 2330, 2340, some combination thereof, etc.) may be implemented in accordance with (e.g., include components of, function similarly to, etc.) energy transfer component 233 in one embodiment. One or more of the energy transfer components (e.g., 2320, 2330, 2340, some combination thereof, etc.) may be used to transfer energy and/or communicate signals over an inductive interface (e.g., 234), and therefore, one or more of the energy transfer components (e.g., 2320, 2330, 2340, some combination thereof, etc.) may be implemented in accordance with (e.g., include components of, function similarly to, etc.) energy transfer component 236 in one embodiment. One or more of the energy transfer components (e.g., 2320, 2330, 2340, some combination thereof, etc.) may be used to transfer energy and/or communicate signals over a wireless interface (e.g., 237), and therefore, one or more of the energy transfer components (e.g., 2320, 2330, 2340, some combination thereof, etc.) may be implemented in accordance with (e.g., include components of, function similarly to, etc.) energy transfer component 239 in one embodiment.

In one embodiment, one or more energy transfer components (e.g., 2320, 2330, 2340, some combination thereof, etc.) may include a coil. A coil of an energy transfer component (e.g., 2320, 2330, 2340, etc.) may be oriented in an axial plane (e.g., a plane which is parallel or almost parallel to an axis of rotation of wheel 2310) of wheel 2310, where the coil may be wound around an axis perpendicular or almost perpendicular to an axis of rotation of wheel 2310. In one embodiment, a coil of an energy transfer component (e.g., 2320, 2330, 2340, etc.) may be oriented in at least one other plane (e.g., in a non-axial plane, etc.), disposed circumferentially around wheel 2310, some combination thereof, etc. As such, energy may be transferred and/or signals may be communicated using at least one coil of wheel 2310 and another energy transfer component (e.g., 235) in proximity to the at least one coil of wheel 2310. For example, where an energy transfer component (e.g., including a coil) of an energy transfer system (e.g., 110) is coupled with or at least partially disposed in the ground, energy may be transferred and/or signals may be communicated between a vehicle (e.g., 120, 320a, 320b, 320c, 1802, etc.) and the energy transfer system as a coil of wheel 2310 passes through (e.g., as a tire mounted on wheel 2310 rolls along the ground near the energy transfer component of the energy transfer system, as wheel 2310 sits in proximity to the energy transfer component of the energy transfer system, etc.) a magnetic field created by the energy transfer component of the energy transfer system.

Embodiments of the present invention may advantageously enable an energy transfer component of a vehicle (e.g., 2320, 2330, 2340, etc.) to be positioned relatively close to an energy transfer component of an energy transfer system (e.g., coupled with or at least partially disposed in the ground, positioned near a roadway or other location where a vehicle may be located, positioned in another location near wheel 2310, etc.). In one embodiment, an energy transfer component of a vehicle (e.g., 2320, 2330, 2340, etc.) may be positioned less than an inch from an energy transfer component of an energy transfer system (e.g., coupled with or at least partially disposed in the ground, positioned near a roadway or other location where a vehicle may be located, positioned in another location near wheel 2310, etc.). In one embodiment, an energy transfer component of a vehicle (e.g., 2320, 2330, 2340, etc.) may be positioned at a different distance (e.g., within a few inches, within a foot, within a longer distance, etc.) from an energy transfer component of an energy transfer system (e.g., coupled with or at least partially disposed in the ground, positioned near a roadway or other location where a vehicle may be located, positioned in another location near wheel 2310, etc.). In this manner, embodiments of the present invention can improve energy transfer and/or signal communication between a vehicle (e.g., 120, 320a, 320b, 320c, 1802, etc.) and an energy transfer system (e.g., 110).

In one embodiment, energy transfer components (e.g., 2320, 2330, 2340, etc.) may be sequentially activated (e.g., to enable an energy transfer, communication of signals, etc.) and/or sequentially deactivated based upon an orientation of wheel 2310 (e.g., a position of an energy transfer component of wheel 2310 with respect to an energy transfer component of an energy transfer system). For example, as wheel 2310 rolls along the ground, energy transfer component 2340 may be activated at a first time (e.g., when energy transfer component 2340 comes into proximity with the ground, when energy transfer component 2340 is in a position or otherwise capable of transferring energy and/or communicating signals with an energy transfer component of an energy transfer system, etc.), energy transfer component 2330 may be activated at a second time (e.g., when energy transfer component 2330 comes into proximity with the ground, when energy transfer component 2330 is in a position or otherwise capable of transferring energy and/or communicating signals with an energy transfer component of an energy transfer system, etc.), energy transfer component 2320 may be activated at a third time (e.g., when energy transfer component 2320 comes into proximity with the ground, when energy transfer component 2320 is in a position or otherwise capable of transferring energy and/or communicating signals with an energy transfer component of an energy transfer system, etc.), etc. As another example, as wheel 2310 rolls along the ground, energy transfer component 2340 may be deactivated at a fourth time (e.g., when energy transfer component 2340 is no longer in proximity with the ground, when energy transfer component 2340 is no longer in a position or otherwise capable of transferring energy and/or communicating signals with an energy transfer component of an energy transfer system, etc.), energy transfer component 2330 may be deactivated at a fifth time (e.g., when energy transfer component 2330 is no longer in proximity with the ground, when energy transfer component 2330 is no longer in a position or otherwise capable of transferring energy and/or communicating signals with an energy transfer component of an energy transfer system, etc.), energy transfer component 2320 may be deactivated at a sixth time (e.g., when energy transfer component 2320 is no longer in proximity with the ground, when energy transfer component 2320 is no longer in a position or otherwise capable of transferring energy and/or communicating signals with an energy transfer component of an energy transfer system, etc.), etc. In one embodiment, a plurality of energy transfer components may be active at any given time when sequentially activating and/or deactivating the energy transfer components (e.g., a plurality of energy transfer components may be contemporaneously active responsive to sequential activation of the plurality of energy transfer components, where the plurality of energy transfer components may then be sequentially deactivated, deactivated simultaneously or contemporaneously, etc.).

The orientation of the wheel (e.g., the position of an energy transfer component of wheel 2310 with respect to an energy transfer component of an energy transfer system) may be determined by a sensor coupled with a tire (e.g., mounted on wheel 2310), with wheel 2310, with a portion of the vehicle which monitors rotation of wheel 2310 and/or a tire mounted on wheel 2310, some combination thereof, etc. The activation and deactivation of the energy transfer components may be controlled by interface component 221 (e.g., based on or responsive to information about the orientation of wheel 2310) in one embodiment. As such, in one embodiment, sequential activation and/or sequential deactivation of energy transfer components based upon an orientation of the wheel (e.g., the position of an energy transfer component of wheel 2310 with respect to an energy transfer component of an energy transfer system) can reduce energy loss (e.g., by deactivating one or more energy transfer components which are not used to transfer energy at a particular time) and/or increase the lifetime of an energy transfer component by reducing the amount of time that the energy transfer component is activated and/or by increasing the amount of time that the energy transfer component is deactivated.

In one embodiment, two or more of the energy transfer components of wheel 2310 may be simultaneously or contemporaneously activated. For example, energy transfer components 2320, 2330, and 2340 may be simultaneously or contemporaneously activated (e.g., when energy transfer component 2330 is nearest to the ground, when wheel 2310 is in another orientation, etc.). In other embodiments, any number of energy transfer components may be simultaneously or contemporaneously activated to enable the performance of one or more energy transfers. As such, multiple energy transfers can be advantageously performed at any given time between a vehicle (e.g., 120, 320a, 320b, 320c, 1802, etc.) and an energy transfer system (e.g., 110) using multiple energy transfer components of wheel 2310, thereby enabling a higher overall energy transfer rate, reducing the heat produced by each of energy transfer components, extending the lifetime of the energy transfer components, increasing the efficiency of the energy transfer (e.g., by operating each energy transfer component at a reduced load where they are more efficient, etc.), some combination thereof, etc.

In one embodiment, groups of energy transfer components may be sequentially activated and/or sequentially deactivated (e.g., based upon the orientation of wheel 2310). For example, one group of energy transfer components may be activated before another group of energy transfer components, one group of energy transfer components may be deactivated before another group of energy transfer components, etc. Each group may have any number of energy transfer components. In one embodiment, at least one energy transfer component of a particular group may be simultaneously (or contemporaneously) activated and/or simultaneously (or contemporaneously) deactivated. And in one embodiment, at least one energy transfer components of a particular group may be sequentially activated and/or sequentially deactivated.

The energy transfer components (e.g., 2320, 2330, 2340, etc.) and/or associated circuitry may remain in a first state (e.g., in a low-power state) until a request is received to activate one or more of the energy transfer components in one embodiment. The request may be communicated over a signal interface (e.g., 134) and/or over an energy transfer interface (e.g., 132). For example, a component (e.g., signal communication component 224 or another component of interface component 221) coupled to one or more energy transfer components may detect a request to activate at least one energy transfer component, where the request may be communicated over an energy transfer interface which includes an energy transfer component to be activated (e.g., one or more of the at least one energy transfer component associated with the request) and/or over another energy transfer interface which does not include an energy transfer component to be activated (e.g., one or more energy transfer components other than the at least one energy transfer component associated with the request). Responsive to the request, the at least one energy transfer component and/or associated circuitry may be configured (e.g., by interface component 221) in a second state to enable the at least one energy transfer component to transfer energy and/or communicate signals (e.g., data signals, clock signals, etc.). The at least one energy transfer component (e.g., 2320, 2330, 2340, etc.) and/or associated circuitry may be configured in the first state after the energy transfer and/or signal communication is completed. As such, where components of the vehicle consume less power in the first state than the second state, energy may be saved by configuring energy transfer components and/or associated circuitry in a first state when not in use or otherwise not needed to transfer energy and/or communicate signals.

As shown in FIG. 23A, a tire mounted to wheel 2310 may be inflatable (e.g., able to maintain its shape by holding air or some other fluid at a pressure) in one embodiment. Alternatively, a tire mounted to wheel 2310 may be non-inflatable (e.g., able to hold its shape using ribs, a structure of hexagonal cells or alternatively shaped cells, some other structure between the tread of the tire and wheel 2310 capable of supporting at least a portion of the weight of a vehicle, etc.). And in one embodiment, a tire mounted to wheel 2310 may be part of a tire-and-wheel combination (e.g., where the tire is permanently coupled with wheel 2310).

In one embodiment, one or more energy transfer components (e.g., 2320, 2330, 2340, etc.) of wheel 2310 may improve or enhance at least one mechanical property of wheel 2310. For example, one or more energy transfer components (e.g., 2320, 2330, 2340, etc.) of wheel 2310 may increase rigidity, strength, resistance to deformation, some combination thereof, etc. As another example, one or more energy transfer components (e.g., 2320, 2330, 2340, etc.) of wheel 2310 may increase lateral stiffness, longitudinal stiffness, some combination thereof, etc. As yet another example, one or more energy transfer components (e.g., 2320, 2330, 2340, etc.) of wheel 2310 may enable the tire to support circumferential loads. And as a further example, one or more energy transfer components (e.g., 2320, 2330, 2340, etc.) of wheel 2310 may be flexible (e.g., able to be deformed or bent, able to return to its original shape after deformation or bending, etc.), thereby enabling wheel 2310 to change shape or deform during operation.

Although FIG. 23A depicts wheel 2310 with a specific size and shape, it should be appreciated that wheel 2310 may have a different size and/or shape in other embodiments. Additionally, although FIG. 23A depicts only three energy transfer components (e.g., 2320, 2330, 2340, etc.) of wheel 2310, it should be appreciated that wheel 2310 may have any number of energy transfer components. Further, although FIG. 23A depicts the energy transfer components (e.g., 2320, 2330, 2340, etc.) with a specific size, shape, orientation, and arrangement, it should be appreciated that the energy transfer components of wheel 2310 may have any size, shape, orientation and/or arrangement in other embodiments.

Figure 23B:
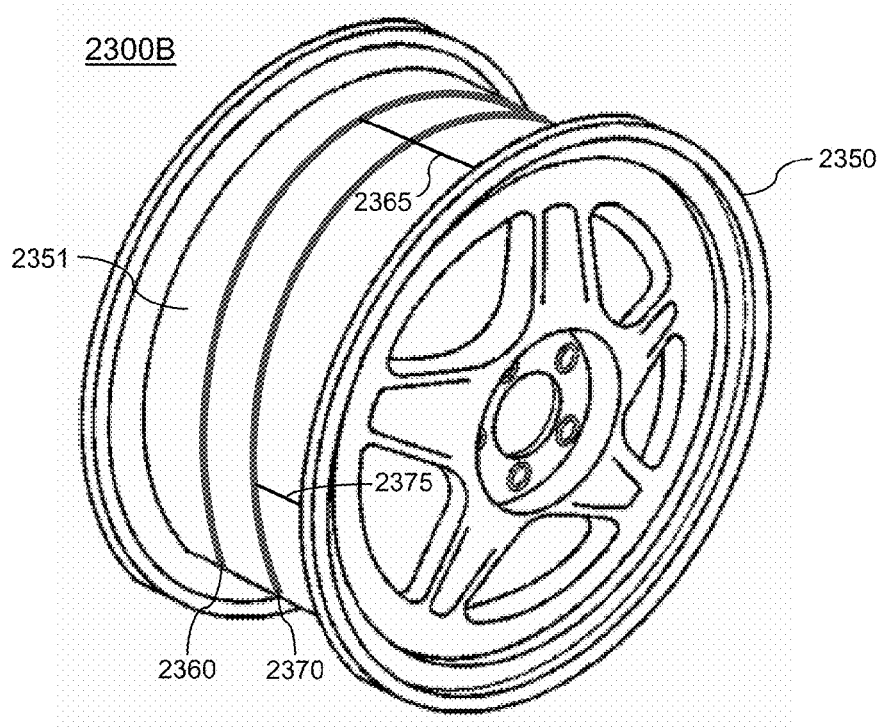
FIG. 23B shows a diagram of a wheel including at least one energy transfer component in a second orientation in accordance with one embodiment of the present invention.

FIG. 23B shows diagram 2300B of wheel 2350 including at least one energy transfer component in a second orientation in accordance with one embodiment of the present invention. As shown in FIG. 23B, each energy transfer component (e.g., 2360, 2370, etc.) may be coupled to other components of a vehicle (e.g., interface component 221, charge and/or discharge component 228, power management component 225, energy storage component 226, power source 227, etc.) via a respective interface (e.g., 2365 and 2375, respectively). In one embodiment, the interfaces may be routed through or along a portion of wheel 2350 (e.g., including at least one spoke, a disc with at least one hole formed therein, a disc with no holes formed therein, etc.) which connects a rim of wheel 2350 to a hub of wheel 2350. As such, at least one energy transfer component (e.g., 2360, 2370, etc.) may be used to perform an energy transfer and/or communicate signals between a vehicle (e.g., 120, 320*a*, 320*b*, 320*c*, 1802, etc.) and an energy transfer system (e.g., 110).

As shown in FIG. 23B, an energy transfer component (e.g., 2360, 2370, etc.) may be coupled with or disposed at least partially within wheel 2350. In one embodiment, an energy transfer component (e.g., 2360, 2370, some combination thereof, etc.) may be disposed in a groove, channel, or other recess which is shaped or otherwise able to accept an energy transfer component. An energy transfer component (e.g., 2360, 2370, etc.) may be secured to wheel 2350 (e.g., surface 2351) using at least one bolt, at least one screw, at least one strap, etc. Alternatively, an energy transfer component (e.g., 2360, 2370, etc.) may be secured to wheel 2350 (e.g., surface 2351) using another fastening method (e.g., using an adhesive, using a hook-and-loop fastener such as Velcro®, etc.).

One or more energy transfer components (e.g., 2360, 2370, some combination thereof, etc.) may be disposed along a centerline of wheel 2350 in one embodiment. In one embodiment, one or more energy transfer components (e.g., 2360, 2370, some combination thereof, etc.) may be disposed to one side of wheel 2350. And in one embodiment, one or more energy transfer components (e.g., 2360, 2370, some combination thereof, etc.) may be disposed in a zigzag pattern, another pattern, etc.

An energy transfer component (e.g., 2360, 2370, some combination thereof, etc.) may be oriented in a radial plane (e.g., a plane which is perpendicular or almost perpendicular to an axis of rotation of wheel 2350) of wheel 2350 in one embodiment. In one embodiment, an energy transfer component (e.g., 2360, 2370, some combination thereof, etc.) may be oriented in at least one other plane (e.g., in a non-radial plane, etc.). In one embodiment, at least two of the energy transfer components (e.g., 2360, 2370, etc.) may be oriented in different planes. In one embodiment, all of the energy transfer components (e.g., 2360, 2370, etc.) may be oriented in different planes. And in one embodiment, one or more of the energy transfer components (e.g., 2360, 2370, some combination thereof, etc.) may be disposed circumferentially around wheel 2350.

One or more of the energy transfer components (e.g., 2360, 2370, some combination thereof, etc.) may be used to transfer energy and/or communicate signals over a wired interface (e.g., 231), and therefore, one or more of the energy transfer components (e.g., 2360, 2370, some combination thereof, etc.) may be implemented in accordance with (e.g., include components of, function similarly to, etc.) energy transfer component 233 in one embodiment. One or more of the energy transfer components (e.g., 2360, 2370, some combination thereof, etc.) may be used to transfer energy and/or communicate signals over an inductive interface (e.g., 234), and therefore, one or more of the energy transfer components (e.g., 2360, 2370, some combination thereof, etc.) may be implemented in accordance with (e.g., include components of, function similarly to, etc.) energy transfer component 236 in one embodiment. One or more of the energy transfer components (e.g., 2360, 2370, some combination thereof, etc.) may be used to transfer energy and/or communicate signals over a wireless interface (e.g., 237), and therefore, one or more of the energy transfer components (e.g., 2360, 2370, some combination thereof, etc.) may be implemented in accordance with (e.g., include components of, function similarly to, etc.) energy transfer component 239 in one embodiment.

In one embodiment, one or more energy transfer components (e.g., 2360, 2370, some combination thereof, etc.) may include a coil. A coil of an energy transfer component (e.g., 2360, 2370, etc.) may be oriented in a radial plane (e.g., a plane which is perpendicular or almost perpendicular to an axis of rotation of wheel 2350) of wheel 2350, where the coil may be wound around an axis parallel or almost parallel to an axis of rotation of wheel 2350. In one embodiment, a coil of an energy transfer component (e.g., 2360, 2370, etc.) may be oriented in at least one other plane (e.g., in a non-radial plane, etc.), disposed circumferentially around wheel 2350, some combination thereof, etc. As such, energy may be transferred and/or signals may be communicated using at least one coil of wheel 2350 and another energy transfer component (e.g., 235) in proximity to the at least one coil of wheel 2350. For example, where an energy transfer component (e.g., including a coil) of an energy transfer system (e.g., 110) is coupled with or at least partially disposed in the ground, energy may be transferred and/or signals may be communicated between a vehicle (e.g., 120, 320*a*, 320*b*, 320*c*, 1802, etc.) and the energy transfer system as a coil of wheel 2350 passes through (e.g., as a tire mounted on wheel 2350 rolls along the ground near the energy transfer component of the energy transfer system, as wheel 2350 sits in proximity to the energy transfer component of the energy transfer system, etc.) a magnetic field created by the energy transfer component of the energy transfer system.

Embodiments of the present invention may advantageously enable an energy transfer component of a vehicle (e.g., 2360, 2370, etc.) to be positioned relatively close to an energy transfer component of an energy transfer system (e.g., coupled with or at least partially disposed in the ground, positioned near a roadway or other location where a vehicle may be located, positioned in another location near wheel 2350, etc.). In one embodiment, an energy transfer component of a vehicle (e.g., 2360, 2370, etc.) may be positioned less than an inch from an energy transfer component of an energy transfer system (e.g., coupled with or at least partially disposed in the ground, positioned near a roadway or other location where a vehicle may be located, positioned in another location near wheel 2350, etc.). In one embodiment, an energy transfer component of a vehicle (e.g., 2360, 2370, etc.) may be positioned at a different distance (e.g., within a few inches, within a foot, within a longer distance, etc.) from an energy transfer component of an energy transfer system (e.g., coupled with or at least partially disposed in the ground, positioned near a roadway or other location where a vehicle may be located, positioned in another location near wheel 2350, etc.). In this manner, embodiments of the present invention can improve energy transfer and/or signal communication between a vehicle (e.g., 120, 320*a*, 320*b*, 320*c*, 1802, etc.) and an energy transfer system (e.g., 110).

In one embodiment, energy transfer components (e.g., 2360, 2370, etc.) may be simultaneously (or contemporaneously) activated and/or simultaneously (or contemporaneously) deactivated. As such, in one embodiment, energy loss can be reduced and/or the lifetime of an energy transfer component can be extended by reducing the amount of time that the energy transfer component is activated and/or increasing the amount of time that the energy transfer component is deactivated.

Energy transfer components (e.g., 2360, 2370, etc.) may be sequentially activated and/or sequentially deactivated in one embodiment. As such, multiple energy transfers can be advantageously performed at any given time between a vehicle (e.g., 120, 320*a*, 320*b*, 320*c*, 1802, etc.) and an energy transfer system (e.g., 110) using multiple energy transfer components of wheel 2350, thereby enabling a higher overall energy transfer rate, reducing the heat produced by each of energy transfer components, extending the lifetime of the energy transfer components, increasing the efficiency of the energy transfer (e.g., by operating each energy transfer component at a reduced load where they are more efficient, etc.), some combination thereof, etc.

In one embodiment, groups of energy transfer components of wheel 2350 may be sequentially activated and/or sequentially deactivated. For example, one group of energy transfer components may be activated before another group of energy transfer components, one group of energy transfer components may be deactivated before another group of energy transfer components, etc. Each group may have any number of energy transfer components. In one embodiment, at least one energy transfer component of a particular group may be simultaneously (or contemporaneously) activated and/or simultaneously (or contemporaneously) deactivated. And in one embodiment, at least one energy transfer components of a particular group may be sequentially activated and/or sequentially deactivated.

In one embodiment, the energy transfer components (e.g., 2360, 2370, etc.) and/or associated circuitry may remain in a first state (e.g., in a low-power state) until a request is received to activate one or more of the energy transfer components. The request may be communicated over a signal interface (e.g., 134) and/or over an energy transfer interface (e.g., 132). For example, a component (e.g., signal communication component 224 or another component of interface component 221) coupled to one or more energy transfer components may detect a request to activate at least one energy transfer component, where the request may be communicated over an energy transfer interface which includes an energy transfer component to be activated (e.g., one or more of the at least one energy transfer component associated with the request) and/or over another energy transfer interface which does not include an energy transfer component to be activated (e.g., one or more energy transfer components other than the at least one energy transfer component associated with the request). Responsive to the request, the at least one energy transfer component and/or associated circuitry may be configured (e.g., by interface component 221) in a second state to enable the at least one energy transfer component to transfer energy and/or communicate signals (e.g., data signals, clock signals, etc.). The at least one energy transfer component (e.g., 2360, 2370, etc.) and/or associated circuitry may be configured in the first state after the energy transfer and/or signal communication is completed. As such, where components of the vehicle consume less power in the first state than the second state, energy may be saved by configuring energy transfer components and/or associated circuitry in a first state when not in use or otherwise not needed to transfer energy and/or communicate signals.

As shown in FIG. 23B, a tire mounted to wheel 2350 may be inflatable (e.g., able to maintain its shape by holding air or some other fluid at a pressure) in one embodiment. Alternatively, a tire mounted to wheel 2350 may be non-inflatable (e.g., able to hold its shape using ribs, a structure of hexagonal cells or alternatively shaped cells, some other structure between the tread of the tire and wheel 2350 capable of supporting at least a portion of the weight of a vehicle, etc.). And in one embodiment, a tire mounted to wheel 2350 may be part of a tire-and-wheel combination (e.g., where the tire is permanently coupled with wheel 2350).

In one embodiment, one or more energy transfer components (e.g., 2360, 2370, etc.) of wheel 2350 may improve or enhance at least one mechanical property of wheel 2350. For example, one or more energy transfer components (e.g., 2360, 2370, etc.) of wheel 2350 may increase rigidity, strength, resistance to deformation, some combination thereof, etc. As another example, one or more energy transfer components (e.g., 2360, 2370, etc.) of wheel 2350 may increase lateral stiffness, longitudinal stiffness, some combination thereof, etc. As yet another example, one or more energy transfer components (e.g., 2360, 2370, etc.) of wheel 2350 may enable the tire to support circumferential loads. And as a further example, one or more energy transfer components (e.g., 2360, 2370, etc.) of wheel 2350 may be flexible (e.g., able to be deformed or bent, able to return to its original shape after deformation or bending, etc.), thereby enabling wheel 2350 to change shape or deform during operation.

Although FIG. 23B depicts wheel 2350 with a specific size and shape, it should be appreciated that wheel 2350 may have a different size and/or shape in other embodiments. Additionally, although FIG. 23B depicts only three energy transfer components (e.g., 2360, 2370, etc.) of wheel 2350, it should be appreciated that wheel 2350 may have any number of energy transfer components. Further, although FIG. 23B depicts the energy transfer components (e.g., 2360, 2370, etc.) with a specific size, shape, orientation, and arrangement, it should be appreciated that the energy transfer components of wheel 2350 may have any size, shape, orientation and/or arrangement in other embodiments.

Figure 24:
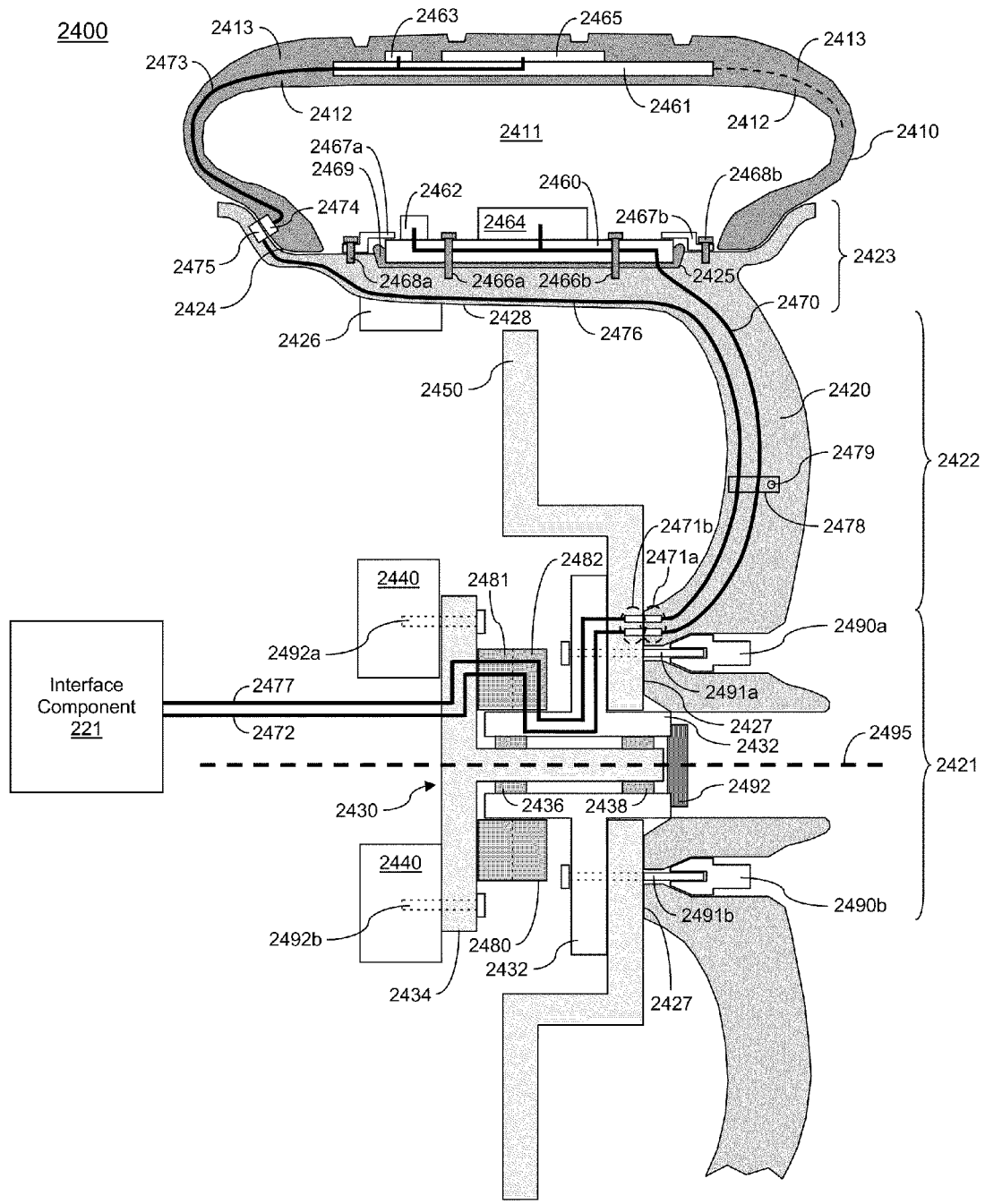
FIG. 24 shows a system including one or more interfaces coupled to an energy transfer component of a tire and/or one or more interfaces coupled to an energy transfer component of a wheel in accordance with one embodiment of the present invention.

FIG. 24 shows system 2400 including one or more interfaces coupled to an energy transfer component of a tire and/or one or more interfaces coupled to an energy transfer component of a wheel in accordance with one embodiment of the present invention. As shown in FIG. 24, energy may be transferred and/or signals may be communicated using a first interface (e.g., formed by lines 2473, 2476 and 2477) which couples an energy transfer component (e.g., 2461) of a tire (e.g., 2410) to a component (e.g., interface component 221) of a vehicle (e.g., 120, 320a, 320b, 320c, 1802, etc.). Energy may be transferred and/or signals may be communicated using a second interface (e.g., formed by lines 2470 and 2472) which couples an energy transfer component (e.g., 2460) of a wheel (e.g., 2420) to a component (e.g., interface component 221) of a vehicle (e.g., 120, 320a, 320b, 320c, 1802, etc.). Line 2472 and/or 2477 may be routed through component 2480 which includes at least two portions (e.g., first portion 2481 and second portion 2482) operable to rotate with respect to one another. In one embodiment, first portion 2481 may be stationary with respect to a component of the vehicle (e.g., component 2440, component 2434, etc.) and second portion 2482 (e.g., stationary with respect to component 2432, wheel 2420, tire 2410, etc.) may rotate with tire 2410 and/or wheel 2420. In this manner, energy may be transferred and/or signals may be communicated between a vehicle (e.g., 120, 320a, 320b, 320c, 1802, etc.) and an energy transfer system (e.g., 110) using an energy transfer component (e.g., 2461) of a tire (e.g., 2410) and/or an energy transfer component (e.g., 2460) of a wheel (e.g., 2420).

As shown in FIG. 24, tire 2410 may be mounted to wheel 2420, where wheel 2420 may be coupled with hub assembly 2430. Hub assembly 2430 may include first component 2432, second component 2434, first bearing 2436, second bearing 2438, some combination thereof, etc. In one embodiment, wheel 2420 may be attached or secured using lug nuts (e.g., 2490a, 2490b, etc.) which screw onto or interface with wheel studs (e.g., 2491a, 2491b, etc.) coupled with and/or passing through first component 2432 of hub assembly 2430. Brake rotor 2450 may be disposed between wheel 2420 and first component 2432 (e.g., as part of a disc braking system) in one embodiment. Hub assembly 2430 may be coupled with component 2440 of a vehicle (e.g., 120, 320a, 320b, 320c, 1802, etc.) using at least one fastener (e.g., 2492a, 2492b, etc.), where component 2440 may be a steering knuckle, frame member, component of a landing gear, or another component of the vehicle. In one embodiment, second component 2434 may be stationary with respect to a component of the vehicle (e.g., component 2440), where first component 2432 may rotate (e.g., about axis of rotation 2495 which may pass through second component 2434) with respect to a component of the vehicle (e.g., component 2440, second component 2434, etc.). As such, tire 2410 and wheel 2420 may rotate with respect to a component of the vehicle (e.g., component 2440) about axis of rotation 2495.

Component 2480 may be any component capable of transferring energy and/or communicating signals between components which rotate with respect to one another. For example, first portion 2481 of component 2480 may be electrically coupled to line 2472 and/or 2477, where first portion 2481 may be coupled with, integrated with or otherwise stationary with respect to a component of a vehicle (e.g., second component 2434 of hub assembly 2430, component 2440, some combination thereof, etc.). Second portion 2482 of component 2480 may be electrically coupled to line 2470 and/or 2476, where second portion 2482 may be coupled with, integrated with or otherwise stationary with respect to another component (e.g., a component of wheel 2420, a component of tire 2410, first component 2432 of hub assembly 2430, some combination thereof, etc.). Since wheel 2420 and tire 2410 rotate with respect to the vehicle (e.g., second component 2434 of hub assembly 2430, component 2440, some combination thereof, etc.), component 2480 may be used to transfer energy and/or communicate signals between a vehicle (e.g., 120, 320a, 320b, 320c, 1802, etc.) and a component (e.g., tire 2410, wheel 2420, etc.) which rotates with respect thereto.

In one embodiment, first portion 2481 and second portion 2482 may include at least one respective electrical contact which may physically contact one another to enable energy to be transferred and/or signals to be communicated between first portion 2481 and second portion 2482. For example, first portion 2481 and second portion 2482 may implement a slip ring or other rotary electrical interface. In one embodiment, first portion 2481 and second portion 2482 may each include at least one respective coil which may implement an inductive interface capable of transferring energy and/or communicating signals between first portion 2481 and second portion 2482. And in one embodiment, first portion 2481 and second portion 2482 may each include at least one respective component of another type (e.g., configured to transmit and/or receive radio waves, microwaves, infrared waves, visible light waves, ultraviolet waves, x-rays, gamma rays, some combination thereof, etc.) capable of transferring energy and/or communicating signals between first portion 2481 and second portion 2482.

As shown in FIG. 24, first bearing 2436 and/or second bearing 2438 may be a ball bearing, roller bearing, tapered roller bearing, spherical roller bearing, needle bearing, another type of bearing, etc. In one embodiment, first bearing 2436 and/or second bearing 2438 may be sealed bearings, and therefore, may include at least one seal capable of reducing the ability of contaminants (e.g., dirt, debris, moisture, etc.) to enter the bearing. Cap 2492 may be installed to reduce the ability of contaminants (e.g., dirt, debris, moisture, etc.) to enter first bearing 2436 and/or second bearing 2438. And in one embodiment, first bearing 2436 and/or second bearing 2438 may be serviceable (e.g., capable of being disassembled, cleaned, re-greased, etc.) or non-serviceable (e.g., not capable of being disassembled, cleaned, re-greased, etc.).

Wheel 2420 may include a plurality of portions. For example, first portion 2421 of wheel 2420 may include surface 2427 which interfaces with a surface of another component (e.g., rotor 2450, hub assembly 2430, etc.) when wheel 2420 mounts to hub assembly 2430. Portion 2422 may connect portion 2421 to portion 2423, where portion 2423 may be configured to accept or otherwise enable mounting of tire 2410. In one embodiment, portion 2422 may include at least one spoke, a disc with at least one hole formed therein, a disc without any holes, or some other type of member. In one embodiment, portion 2421 may be referred to a "hub" and portion 2423 may be referred to as a "rim."

As shown in FIG. 24, tire 2410 may be inflatable (e.g., able to maintain its shape by holding air or some other fluid at a pressure within region 2411) in one embodiment. Alternatively, tire 2410 may be non-inflatable. For example, tire 2410 may include a structure (e.g., within region 2411, between the tread of tire 2410 and rim portion 2423 of wheel 2420, etc.) capable of supporting at least a portion of the weight of a vehicle, where the structure may include ribs, hexagonal cells or alternatively shaped cells, or some other structure. And in one embodiment, tire 2410 may be part of a tire-and-wheel combination (e.g., where tire 2410 is permanently coupled with wheel 2420).

Energy transfer component 2461 and/or line 2473 may be hidden or not visible from the outside of tire 2410 in one embodiment. For example, energy transfer component 2461 and/or line 2473 may be disposed between layers or portions 2412 and 2413 of tire 2410. Portion 2412 and portion 2413 may each include a portion of tire 2410 selected from a group consisting of a tread, a sidewall, a liner, a bead, a filler, a chafer, a steel belt, a nylon belt, a cord, a body ply, a cap ply, an edge cover which covers or overlaps a ply, an adhesive, some combination thereof, etc. In one embodiment, energy transfer component 2461 and/or line 2473 may be exposed or visible from the outside of the tire (e.g., coupled with an outer surface of tire 2410, set in tire 2410 such that one portion is visible and another portion is hidden, etc.).

As shown in FIG. 24, energy transfer component 2460 may be coupled with or disposed at least partially within wheel 2420. For example, energy transfer component 2460 may be secured to wheel 2420 using at least one fastener (e.g., 2466a, 2466b, etc.) such as a screw or bolt, using a bracket or cover (e.g., 2467a, 2467b, etc.), using a fastening mechanism (e.g., material 2469) disposed between energy transfer component 2460 and wheel 2420, some combination thereof, etc. A bracket or cover (e.g., 2467a, 2467b, etc.) used to secure energy transfer component 2460 may be secured to wheel 2420 using a fastener (e.g., 2468a, 2468b, etc.) in one embodiment. Material 2469 may be an adhesive, a hook-and-loop fastener such as Velcro®, or another type of fastening mechanism.

In one embodiment, energy transfer component 2460 may be disposed at least partially within or coupled with region 2425 of wheel 2420. Region 2425 may be a recessed or concave portion of wheel 2420 which is sized to accept energy transfer component 2460. In one embodiment, region 2425 may be shaped similarly to energy transfer component 2460 (e.g., region 2425 and energy transfer component 2460 may both be circular in shape, square in shape, trapezoidal in shape, alternatively shaped, etc.). And in one embodiment, region 2425 may have a different shape than that of energy transfer component 2460 (e.g., energy transfer component 2460 may be circular in shape and region 2425 may be square in shape, etc.).

Line 2470 and/or line 2476 may be routed through or along a portion of wheel 2410. For example, line 2476 may be routed through or along portion 2423 of wheel 2420 (e.g., on the outside of portion 2423, in a channel, in a groove, in a hole or other type of cavity, etc.). As another example, line 2470 and/or line 2476 may be routed through or along portion 2422 (e.g., including at least one spoke, a disc with at least one hole formed therein, a disc with no holes formed therein, etc.) of wheel 2420 (e.g., on the outside of portion 2422, in a channel, in a groove, in a hole or other type of cavity, etc.). And as yet another example, line 2470 and/or line 2476 may be routed through or along portion 2421 of wheel 2420 (e.g., on the outside of portion 2421, in a channel, in a groove, in a hole or other type of cavity, etc.). In one embodiment, an interface or line (e.g., 2470, 2476, etc.) may be routed through or along a portion of wheel 2420 (e.g., in a channel, in a groove, in a hole or other type of cavity, etc.) which is sized and/or shaped to accept the interface or line. And in one embodiment, a line (e.g., 2470 and/or 2476) may be secured to wheel 2420 using mechanism 2478 (e.g., a bracket secured by fastener 2479, a cover secured by fastener 2479, an adhesive, etc.).

As shown in FIG. 24, one or more of the energy transfer components (e.g., 2460, 2461, some combination thereof, etc.) may be used to transfer energy and/or communicate signals over a wired interface (e.g., 231), and therefore, one or more of the energy transfer components (e.g., 2460, 2461, some combination thereof, etc.) may be implemented in accordance with (e.g., include components of, function similarly to, etc.) energy transfer component 233 in one embodiment. One or more of the energy transfer components (e.g., 2460, 2461, some combination thereof, etc.) may be used to transfer energy and/or communicate signals over an inductive interface (e.g., 234), and therefore, one or more of the energy transfer components (e.g., 2460, 2461, some combination thereof, etc.) may be implemented in accordance with (e.g., include components of, function similarly to, etc.) energy transfer component 236 in one embodiment. One or more of the energy transfer components (e.g., 2460, 2461, some combination thereof, etc.) may be used to transfer energy and/or communicate signals over a wireless interface (e.g., 237), and therefore, one or more of the energy transfer components (e.g., 2460, 2461, some combination thereof, etc.) may be implemented in accordance with (e.g., include components of, function similarly to, etc.) energy transfer component 239 in one embodiment.

Line 2473 may electrically couple to line 2476 using contacts 2474 and 2475, where contact 2474 may be coupled with or disposed at least partially within tire 2410 and contact 2475 may be coupled with or disposed at least partially within wheel 2420. As such, in one embodiment, mounting tire 2410 on wheel 2420 may cause contacts 2474 and 2475 to come into physical contact and therefore electrically couple lines 2473 and 2476. In one embodiment, contact 2474 may be visible from an outside of tire 2410 when removed from wheel 2420, and contact 2475 may be visible from an outside of wheel 2420 when tire 2410 is removed from wheel 2420. And in one embodiment, contact 2475 may be located at or in proximity to a bead seat of wheel 2420, another region of portion 2423, etc. In this manner, energy may be transferred and/or signals may be communicated between a vehicle (e.g., 120, 320a, 320b, 320c, 1802, etc.) and an energy transfer system (e.g., 110) using an energy transfer component (e.g., 2461) of a tire (e.g., 2410).

As shown in FIG. 24, at least one contact may be located at or in proximity to surface 2427 of wheel 2420 for enabling energy to be transferred and/or signals to be communicated between a vehicle (e.g., 120, 320a, 320b, 320c, 1802, etc.) and an energy transfer system (e.g., 110). For example, at least one line of wheel 2420 (e.g., line 2470, line 2476, etc.) may couple to at least one line of a vehicle (e.g., line 2472, line 2477, etc.) using at least one contact of wheel 2420 (e.g., one or more of contacts 2471a) and at least one contact of a vehicle (e.g., one or more of contacts 2471b). Contacts 2471b may be coupled with or disposed at least partially within rotor 2450, hub assembly 2430, or another component of the vehicle. In one embodiment, contacts 2471a and/or contacts 2471b may be visible when wheel 2420 is removed from the vehicle. In this manner, energy may be transferred and/or signals may be communicated between a vehicle and an energy transfer system (e.g., using energy transfer component 2461 of tire 2410 and/or using energy transfer component 2460 of wheel 2420) responsive to a mounting of wheel 2420 onto the vehicle.

In one embodiment, the wheel studs (e.g., 2491a and 2491b) and corresponding holes in wheel 2420 may be used to align or locate contacts 2471a and 2471b with respect to one another. In one embodiment, wheel 2420 may be manufactured to fit on hub assembly 2430 in a limited number of orientations (e.g., using a non-uniform spacing of wheel studs 2491a and 2491b, using a key, pin, or other member used to align wheel 2420 with hub assembly 2430, etc.), thereby enabling alignment of contacts 2471a with contacts 2471b when wheel 2420 is mounted to the vehicle. In this manner, energy may be transferred and/or signals may be communicated between a vehicle and an energy transfer system when wheel 2420 is mounted to the vehicle.

In one embodiment, contacts 2471a and 2471b may be located with respect to one another such that contacts 2471a may align with contacts 2471b regardless of the orientation of wheel 2420 with respect to the vehicle (e.g., rotor 2450, hub assembly 2430, etc.). For example, multiple instances of contacts 2471a (e.g., disposed circumferentially around surface 2427) may be coupled to line 2470 and/or line 2476, thereby enabling at least one instance of contacts 2471a to physically contact contacts 2471b when wheel 2420 is mounted to the vehicle. As another example, multiple instances of contacts 2471b (e.g., disposed circumferentially around a surface of rotor 2450, first component 2432, etc.) may be coupled to line 2472 and/or line 2477, thereby enabling at least one instance of contacts 2471b to physically contact contacts 2471a when wheel 2420 is mounted to the vehicle. As yet another example, contacts 2471a may include at least one ring coupled with or disposed at least partially in surface 2427, thereby enabling the at least one ring of contacts 2471a to physically contact contacts 2471b when wheel 2420 is mounted to the vehicle. As a further example, contacts 2471b may include at least one ring coupled with or disposed at least partially in a surface (e.g., of rotor 2450, of first component 2432, etc.), thereby enabling the at least one ring of contacts 2471b to physically contact contacts 2471a when wheel 2420 is mounted to the vehicle. In this manner, energy may be transferred and/or signals may be communicated between a vehicle and an energy transfer system regardless of how wheel 2420 is orientated when mounted.

Line 2472 and/or line 2477 may be routed through or along a component (e.g., rotor 2450, first component 2432, component 2480, second component 2434, component 2440, another component, some combination thereof, etc.) of the vehicle. In one embodiment, line 2472 and/or line 2477 may be routed on the outside of the component (e.g., rotor 2450, first component 2432, component 2480, second component 2434, component 2440, another component, some combination thereof, etc.), in a feature (e.g., a channel, groove, hole, or other type of cavity, etc.) of the component (e.g., rotor 2450, first component 2432, component 2480, second component 2434, component 2440, another component, some combination thereof, etc.), etc. In one embodiment, line 2472 and/or line 2477 may be secured to the component (e.g., rotor 2450, first component 2432, component 2480, second component 2434, component 2440, another component, some combination thereof, etc.) using a mechanism (e.g., a bracket secured by a fastener, a cover secured by a fastener, an adhesive, etc.).

In one embodiment, signals communicated over an interface (e.g., including line 2470, line 2472, line 2473, line 2476, line 2477, some combination thereof, etc.) may be analog signals, digital signals, pulse width modulated signals, some combination thereof, etc. An interface (e.g., including line 2470, line 2472, line 2473, line 2476, line 2477, some combination thereof, etc.) may implement unidirectional signal communication and/or bidirectional signal communication in one embodiment. And in one embodiment, signals may be communicated over an interface (e.g., including line 2470, line 2472, line 2473, line 2476, line 2477, some combination thereof, etc.) using single-ended signaling and/or differential signaling.

As shown in FIG. 24, wheel 2420 may function as a heat sink for one or more energy transfer components (e.g., 2460) coupled with wheel 2420. For example, heat generated by an energy transfer component (e.g., 2460) may be transferred into wheel 2420 (e.g., into portion 2423, into portion 2422, etc.). Heat may then be transferred from wheel 2420 to the environment (e.g., via conduction, convention, radiation, etc.). Material 2469 may be thermally conductive, and therefore, may be used to implement and/or regulate (e.g., increase, decrease, etc.) heat transfer from one or more energy transfer components mounted to wheel 2420.

Wheel 2420 may have at least one feature (e.g., 2426) which is capable of increasing the heat transfer from one or more energy transfer components of wheel 2420. In one embodiment, at least one feature (e.g., 2426) may increase heat transfer by increasing the surface area of wheel 2420 (e.g., similar to a fin of a heat sink). The at least one feature (e.g., 2426) may be shaped or otherwise configured to direct air (e.g., ambient air outside of wheel 2420) over a region of wheel 2420 (e.g. over surface 2428, over a portion of wheel 2420 to which an energy transfer component is attached, etc.), thereby increasing heat transfer from the one or more energy transfer components via convection, conduction, etc. In one embodiment, wheel 2420 may include at least one spoke (e.g., located in portion 2422), where the at least one spoke is shaped or otherwise configured to direct air (e.g., ambient air outside of wheel 2420) over a region of wheel 2420 (e.g. a portion of wheel 2420 to which an energy transfer component is attached), thereby increasing heat transfer from the one or more energy transfer components via convection, conduction, etc.

Figure 25:
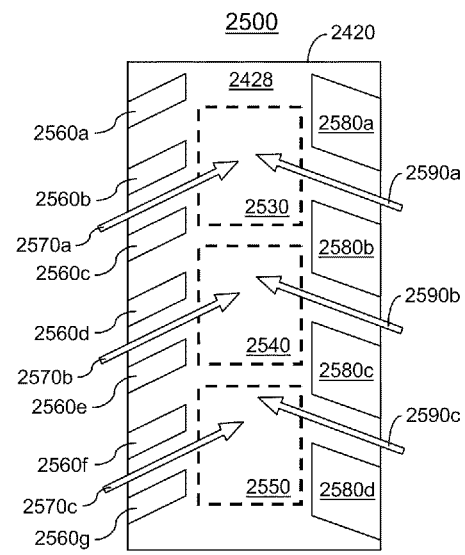
FIG. 25 shows a diagram of a wheel that includes elements for increasing heat transfer from at least one energy transfer component in accordance with one embodiment of the present invention.

FIG. 25 shows diagram 2500 of wheel 2420 that includes elements (e.g., features 2560a through 2560g, spokes 2580a through 2580d, etc.) for increasing heat transfer from at least one energy transfer component in accordance with one embodiment of the present invention. Diagram 2500 may be a projection view of surface 2428 (e.g., as if wheel 2420 were cut and unrolled such that surface 2428 lies in a plane) in one embodiment. As shown in FIG. 25, regions 2530, 2540 and 2550 may be portions of wheel 2420 to which energy transfer components are attached. For example, a first energy transfer component (e.g., 2460, another energy transfer component of wheel 2420, etc.) may be coupled with region 2530 of wheel 2420, a second energy transfer component (e.g., 2460, another energy transfer component of wheel 2420, etc.) may be coupled with region 2540 of wheel 2420, a third energy transfer component (e.g., 2460, another energy transfer component of wheel 2420, etc.) may be coupled with region 2550 of wheel 2420, etc. Features 2560a through 2560g may be coupled with another portion of wheel 2420, formed integrally with wheel 2420, etc., where one or more of features 2560a through 2560g may be implemented in accordance with (e.g., include components of, function similarly to, etc.) feature 2426 in one embodiment. Spokes 2580a through 2580d may be coupled with another portion of wheel 2420, formed integrally with wheel 2420, etc.

At least one feature (e.g., 2560a through 2560g) and/or at least one spoke (e.g., 2580a through 2580d) of wheel 2420 may be capable of increasing the heat transfer from one or more energy transfer components of wheel 2420. In one embodiment, at least one feature (e.g., 2560a through 2560g) and/or at least one spoke (e.g., 2580a through 2580d) of wheel 2420 may increase heat transfer by increasing the surface area of wheel 2420 (e.g., similar to a fin of a heat sink). In one embodiment, at least one feature (e.g., 2560a through 2560g) and/or at least one spoke (e.g., 2580a through 2580d) of wheel 2420 may increase heat transfer from one or more energy transfer components via convection. For example, at least one feature (e.g., 2560a through 2560g) of wheel 2420 may be shaped or otherwise configured to direct air or another fluid (e.g., as shown by arrows 2570a, 2570b, and 2570c) over one or more regions (e.g., 2530, 2540, 2550, etc.) of wheel 2420. As another example, at least one spoke (e.g., 2580a through 2580d) of wheel 2420 may be shaped or otherwise configured to direct air or another fluid (e.g., as shown by arrows 2590a, 2590b, and 2590c) over one or more regions (e.g., 2530, 2540, 2550, etc.) of wheel 2420.

Although FIG. 25 shows a specific number, arrangement, shape, and size of features (e.g., 2560a through 2560g), it should be appreciated that wheel 2420 may include any number, arrangement, shape, and/or size of features in other embodiments. Additionally, although FIG. 25 shows a specific number, arrangement, shape, and size of spokes (e.g., 2580a through 2580d), it should be appreciated that wheel 2420 may include any number, arrangement, shape, and/or size of spokes in other embodiments. Further, although FIG. 25 shows a specific number, arrangement, shape, and/or size of regions (e.g., 2530, 2540, 2550, etc.), it should be appreciated that wheel 2420 may include any number, arrangement, shape, and/or size of regions in other embodiments.

Turning back to FIG. 24, tire 2410 and/or wheel 2420 may include components configured to transfer heat from one or more energy transfer components (e.g., 2460, 2461, etc.). For example, component 2464 may transfer heat from energy transfer component 2460, where component 2464 may be coupled with or otherwise positioned with respect to (e.g., coupled with, disposed on or touching, disposed adjacent to, disposed in proximity to, etc.) energy transfer component 2460 to enable heat to be transferred from energy transfer component 2460. As another example, component 2465 may transfer heat from energy transfer component 2461, where component 2465 may be coupled with or otherwise positioned with respect to (e.g., coupled with, disposed on or touching, disposed adjacent to, disposed in proximity to, etc.) energy transfer component 2461 to enable heat to be transferred from energy transfer component 2461.

As shown in FIG. 24, component 2464 may be capable of transferring heat from an energy transfer component via conduction. For example, component 2464 may be configured to remove heat generated by an energy transfer component (e.g., 2460) responsive to application of an electric potential across electrodes of component 2464. In one embodiment, component 2464 may be electrically coupled to line 2470, and therefore, line 2470 may be used to apply an electric potential across electrodes of component 2464. In one embodiment, component 2464 may be a thermoelectric cooler or Peltier cooler. As another example, component 2464 may be a heat exchanger configured to remove heat from an energy transfer component (e.g., 2460) responsive to a pumping of a fluid through component 2464. And as yet another example, component 2464 may be a heat pipe configured to remove heat from an energy transfer component (e.g., 2460).

In one embodiment, component 2464 may be configured to convert heat generated by an energy transfer component (e.g., 2460) into electrical energy. For example, component 2464 may be a thermoelectric cooler or other component capable of generating electricity responsive to a temperature differential being applied across a first side and a second side of component 2464. Component 2464 may be advantageously positioned with respect to an energy transfer component (e.g., 2460) to create a temperature differential across a first side (e.g., positioned adjacent to energy transfer component 2460) and a second side (e.g., positioned to adjacent to ambient air within region 2411) of component 2464, where the first side may be warmer than the second side in one embodiment. Energy generated by component 2464 may be transferred over an interface (e.g., lines 2470 and 2472) to a component of a vehicle (e.g., interface component 221, power management component 225, etc.), thereby enabling the energy to be accessed (e.g., for use, storage, etc.) by the vehicle and/or transferred to another system (e.g., energy transfer system 110, another vehicle, etc.). In one embodiment, energy generated by component 2464 may be transferred over an interface (e.g., lines 2470 and 2472) contemporaneously with energy from energy transfer component 2460 (e.g., by summing the voltages, summing the currents, etc.). In this manner, electricity may be advantageously generated using component 2464 to improve the efficiency of an energy transfer between a vehicle and an energy transfer system, improve the efficiency of an energy transfer between two or more vehicles, recover energy that would otherwise be lost, etc.

As shown in FIG. 24, component 2465 may be capable of transferring heat from an energy transfer component via conduction. For example, component 2465 may be configured to remove heat generated by an energy transfer component (e.g., 2461) responsive to application of an electric potential across electrodes of component 2465. In one embodiment, component 2465 may be electrically coupled to line 2473, and therefore, line 2473 may be used to apply an electric potential across electrodes of component 2465. In one embodiment, component 2465 may be a thermoelectric cooler or Peltier cooler. As another example, component 2465 may be a heat exchanger configured to remove heat from an energy transfer component (e.g., 2461) responsive to a pumping of a fluid through component 2465. And as yet another example, component 2465 may be a heat pipe configured to remove heat from an energy transfer component (e.g., 2461).

In one embodiment, component 2465 may be configured to convert heat generated by an energy transfer component (e.g., 2461) into electrical energy. For example, component 2465 may be a thermoelectric cooler or other component capable of generating electricity responsive to a temperature differential being applied across a first side and a second side of component 2465. Component 2465 may be advantageously positioned with respect to an energy transfer component (e.g., 2461) to create a temperature differential across a first side (e.g., positioned adjacent to energy transfer component 2461) and a second side (e.g., positioned to adjacent to a portion of tire 2410, ambient air, etc.) of component 2465, where the first side may be warmer than the second side in one embodiment. Energy generated by component 2465 may be transferred over an interface (e.g., lines 2473, 2476, and 2477) to a component of a vehicle (e.g., interface component 221, power management component 225, etc.), thereby enabling the energy to be accessed (e.g., for use, storage, etc.) by the vehicle and/or transferred to another system (e.g., energy transfer system 110, another vehicle, etc.). In one embodiment, energy generated by component 2465 may be transferred over an interface (e.g., lines 2473, 2476, and 2477) contemporaneously with energy from energy transfer component 2461 (e.g., by summing the voltages, summing the currents, etc.). In this manner, electricity may be advantageously generated using component 2465 to improve the efficiency of an energy transfer between a vehicle and an energy transfer system, improve the efficiency of an energy transfer between two or more vehicles, recover energy that would otherwise be lost, etc.

As shown in FIG. 24, component 2464 may be capable of transferring heat from an energy transfer component (e.g., 2460) via convection. For example, component 2464 may include a fan or other device capable of moving a fluid across an energy transfer component (e.g., 2460), across a component (e.g., a portion or surface of wheel 2420, etc.) into which heat from an energy transfer component (e.g., 2460) is transferred, etc. In one embodiment, component 2464 may be powered by energy from line 2470.

Component 2465 may be capable of transferring heat from an energy transfer component (e.g., 2461) via convection. For example, component 2465 may include a fan or other device capable of moving a fluid across an energy transfer component (e.g., 2461), across a component (e.g., a portion or surface of tire 2410, etc.) into which heat from an energy transfer component (e.g., 2461) is transferred, etc. In one embodiment, component 2465 may be powered by energy from line 2473.

As shown in FIG. 24, component 2462 may be any component capable of monitoring or sensing a temperature of energy transfer component 2460. In one embodiment, component 2462 may be or include a thermocouple, thermistor, ultrasonic thermometer, infrared thermometer or pyrometer, laser thermometer or pyrometer, etc. Component 2462 may be powered using energy from line 2470 in one embodiment. In one embodiment, signals generated by component 2462 (e.g., representing or otherwise used to determine the a temperature of energy transfer component 2460) may be transferred to a component of the vehicle (e.g., interface component 221) over an interface (e.g., including lines 2470 and 2472) using at least one conductor used to transfer energy (e.g., between the vehicle and an energy transfer system) and/or at least one other conductor which is separate from at least one conductor used to transfer energy (e.g., between the vehicle and an energy transfer system). In one embodiment, a temperature associated with an energy transfer component (e.g., 2460) may be communicated over an interface (e.g., including lines 2470 and 2472) using analog signals, digital signals, pulse width modulated signals, some combination thereof, etc. In one embodiment, a temperature associated with an energy transfer component (e.g., 2460) may be communicated over an interface (e.g., including lines 2470 and 2472) using unidirectional signal communication, bidirectional signal communication, single-ended signaling, differential signaling, some combination thereof, etc.

Component 2463 may be any component capable of monitoring or sensing a temperature of energy transfer component 2461. In one embodiment, component 2463 may be or include a thermocouple, thermistor, ultrasonic thermometer, infrared thermometer or pyrometer, laser thermometer or pyrometer, etc. Component 2463 may be powered using energy from line 2473 in one embodiment. In one embodiment, signals generated by component 2463 (e.g., representing or otherwise used to determine the a temperature of energy transfer component 2461) may be transferred to a component of the vehicle (e.g., interface component 221) over an interface (e.g., including lines 2473, 2476, and 2477) using at least one conductor used to transfer energy (e.g., between the vehicle and an energy transfer system) and/or at least one other conductor which is separate from at least one conductor used to transfer energy (e.g., between the vehicle and an energy transfer system). In one embodiment, a temperature associated with an energy transfer component (e.g., 2461) may be communicated over an interface (e.g., including lines 2473, 2476, and 2477) using analog signals, digital signals, pulse width modulated signals, some combination thereof, etc. In one embodiment, a temperature associated with an energy transfer component (e.g., 2461) may be communicated over an interface (e.g., including lines 2473, 2476, and 2477) using unidirectional signal communication, bidirectional signal communication, single-ended signaling, differential signaling, some combination thereof, etc.

Figure 38:
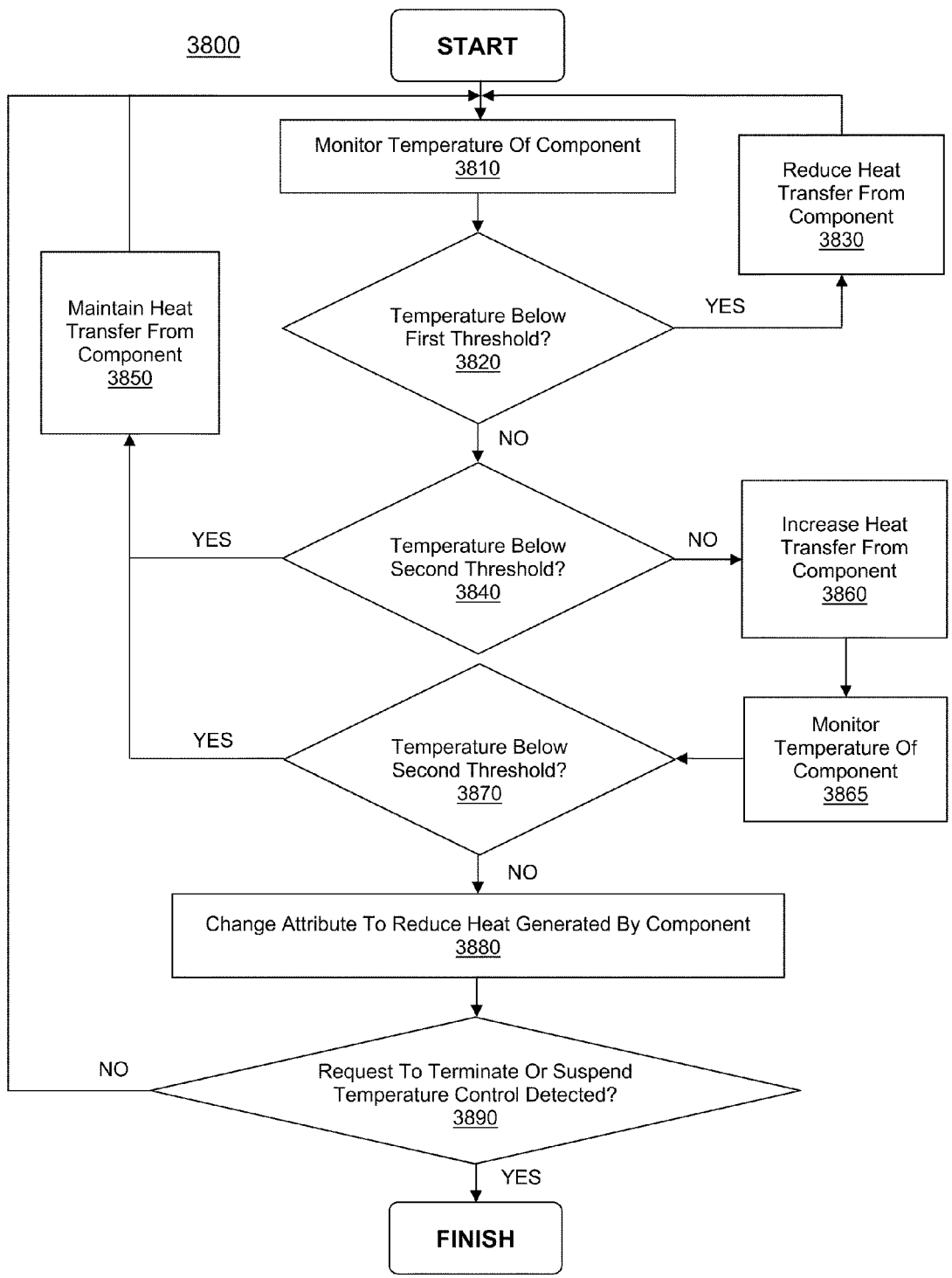
FIG. 38 shows a flowchart of a computer-implemented process for controlling a temperature of a component in accordance with one embodiment of the present invention.

In one embodiment, component 2462 and/or component 2464 may be used to implement a control system for controlling the temperature of energy transfer component 2460 (e.g., in accordance with process 3800 of FIG. 38). For example, component 2464 may be controlled (e.g., by interface component 221 or another component of the vehicle) to increase heat transfer from energy transfer component 2460 responsive to detecting that the temperature (e.g., measured using component 2462) of the energy transfer component has exceeded a first threshold. As another example, component 2464 may be controlled (e.g., by interface component 221 or another component of the vehicle) to reduce or stop heat transfer from energy transfer component 2460 responsive to detecting that the temperature (e.g., measured using component 2462) of the energy transfer component has fallen below a second threshold. In one embodiment, the second threshold may be associated with a lower temperature than a temperature associated with the first threshold.

In one embodiment, component 2463 and/or component 2465 may be used to implement a control system for controlling the temperature of energy transfer component 2461 (e.g., in accordance with process 3800 of FIG. 38). For example, component 2465 may be controlled (e.g., by interface component 221 or another component of the vehicle) to transfer heat from energy transfer component 2461 responsive to detecting that the temperature (e.g., measured using component 2463) of the energy transfer component has exceeded a first threshold. As another example, component 2465 may be controlled (e.g., by interface component 221 or another component of the vehicle) to stop transferring heat from energy transfer component 2461 responsive to detecting that the temperature (e.g., measured using component 2463) of the energy transfer component has fallen below a second threshold. In one embodiment, the second threshold may be associated with a lower temperature than a temperature associated with the first threshold.

Accordingly, embodiments of the present invention can advantageously increase heat transfer from energy transfer components of a wheel (e.g., 2420) and/or a tire (e.g., 2410). Increasing heat transfer from an energy transfer component can extend the lifetime of the component, increase efficiency of energy transfer and/or signal communication, etc. Additionally, by transforming heat generated by an energy transfer component into electricity (e.g., using component 2464, component 2465, etc.), embodiments of the present invention can further increase the efficiency of an energy transfer.

In one embodiment, one or more energy transfer components (e.g., 2461, etc.) of tire 2410 may improve or enhance at least one mechanical property of tire 2410. For example, one or more energy transfer components (e.g., 2461, etc.) of tire 2410 may increase rigidity, strength, resistance to deformation, some combination thereof, etc. As another example, one or more energy transfer components (e.g., 2461, etc.) of tire 2410 may increase lateral stiffness, longitudinal stiffness, some combination thereof, etc. As yet another example, one or more energy transfer components (e.g., 2461, etc.) of tire 2410 may enable the tire to support circumferential loads. And as a further example, one or more energy transfer components (e.g., 2461, etc.) of tire 2410 may be flexible (e.g., able to be deformed or bent, able to return to its original shape after deformation or bending, etc.), thereby enabling tire 2410 to change shape or deform during operation.

In one embodiment, one or more energy transfer components (e.g., 2460, etc.) of wheel 2420 may improve or enhance at least one mechanical property of wheel 2420. For example, one or more energy transfer components (e.g., 2460, etc.) of wheel 2420 may increase rigidity, strength, resistance to deformation, some combination thereof, etc. As another example, one or more energy transfer components (e.g., 2460, etc.) of wheel 2420 may increase lateral stiffness, longitudinal stiffness, some combination thereof, etc. As yet another example, one or more energy transfer components (e.g., 2460, etc.) of wheel 2420 may enable the tire to support circumferential loads. And as a further example, one or more energy transfer components (e.g., 2460, etc.) of wheel 2420 may be flexible (e.g., able to be deformed or bent, able to return to its original shape after deformation or bending, etc.), thereby enabling wheel 2420 to change shape or deform during operation.

Although FIG. 24 shows wheel 2420 used in combination with tire 2410, it should be appreciated that wheel 2420 may be used with other tires (e.g., which do not include energy transfer components, which include different types or configurations of energy transfer components, etc.) in other embodiments. Additionally, although FIG. 24 shows tire 2410 used in combination with wheel 2420, it should be appreciated that tire 2410 may be used with other wheels (e.g., which do not include energy transfer components, which include different types or configurations of energy transfer components, etc.) in other embodiments. Although FIG. 24 shows tire 2410 with a specific number, arrangement, shape, and size of components, it should be appreciated that tire 2410 may have a different number, arrangement, shape, and/or size of components in other embodiments. Additionally, although FIG. 24 shows wheel 2420 with a specific number, arrangement, shape, and size of components, it should be appreciated that wheel 2420 may have a different number, arrangement, shape, and/or size of components in other embodiments.

Further, although FIG. 24 shows other portions of system 2400 with a specific number, arrangement, shape, and size of components, it should be appreciated that system 2400 may have a different number, arrangement, shape, and/or size of components in other embodiments. For example, wheel 2420 may attach directly to hub assembly 2430 in one embodiment. As another example, hub assembly 2430 may include a different number, arrangement, shape, and/or size of components in other embodiments.

Figure 26:
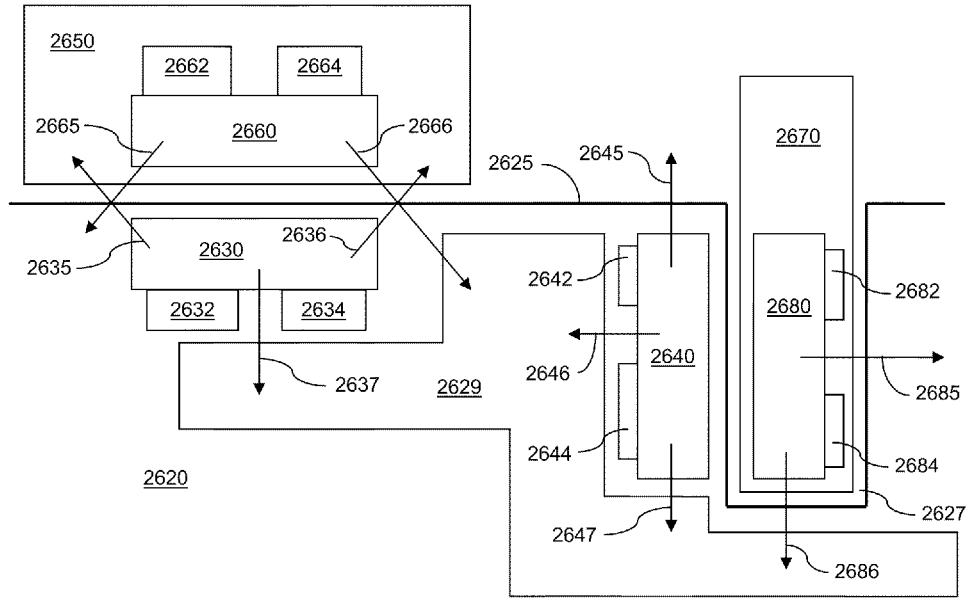
FIG. 26 is a diagram showing heat transfer from at least one energy transfer component of a vehicle and/or at least one energy transfer component of an energy transfer system in accordance with one embodiment of the present invention.

FIG. 26 is a diagram showing heat transfer from at least one energy transfer component of a vehicle and/or at least one energy transfer component of an energy transfer system in accordance with one embodiment of the present invention. As shown in FIG. 26, component 2650 and/or component 2670 may be electrically coupled to and/or part of an energy transfer system (e.g., 110), where component 2650 and component 2670 may include energy transfer component 2660 and energy transfer component 2680, respectively. Vehicle 2620 may be implemented in accordance with (e.g., include components of, function similarly to, etc.) vehicle 120, 320*a*, 320*b*, 320*c*, 2802, some combination thereof, etc., where vehicle 2620 may include energy transfer components 2630 and 2640. In one embodiment, energy may be transferred and/or signals may be communicated between vehicle 2620 and an energy transfer system (e.g., 110) over an interface which includes energy transfer components 2630 and 2660 (e.g., where energy transfer components 2630 and 2660 are positioned with respect to one another such that energy may be transferred and/or signals may be communicated using energy transfer components 2630 and 2660). And in one embodiment, energy may be transferred and/or signals may be communicated between vehicle 2620 and an energy transfer system (e.g., 110) over an interface which includes energy transfer components 2640 and 2680 (e.g., where energy transfer components 2640 and 2680 are positioned with respect to one another such that energy may be transferred and/or signals may be communicated using energy transfer components 2640 and 2680).

In one embodiment, energy transfer component 2660 may be coupled with or at least partially disposed in the ground (e.g., similar to energy transfer components 1610 of FIG. 16, 1620 of FIG. 16, 1630 of FIG. 16, etc.), whereas energy transfer component 2630 may be located at or near the bottom (e.g., undercarriage) of the vehicle, rear of the vehicle, front of the vehicle, side of the vehicle, etc. In one embodiment, energy transfer component 2630 may be coupled with or disposed at least partially within surface 2625 of vehicle 2620, where surface 2625 may be a surface of a body panel, an undercarriage, hull, fuselage, wing, propeller, blade of a helicopter, or some other component of vehicle 2620. Component 2650 may be a housing, enclosure, component configured to perform at least one other function (e.g., a reflector capable of being placed in a roadway, another component, etc.), or the like. In this manner, energy may be transferred between the vehicle (e.g., 2620) and an energy transfer system (e.g., 110) when vehicle is near, located above, located beside, etc. energy transfer component 2660.

As shown in FIG. 26, in one embodiment, energy transfer component 2660 may be coupled with or at least partially disposed in an object (e.g., similar to energy transfer components 1645 of FIG. 16, 1655 of FIG. 16, 1662 of FIG. 16, 1665 of FIG. 16, 1675 of FIG. 16, etc.), whereas energy transfer component 2630 may be located at or near the top of the vehicle, bottom (e.g., undercarriage) of the vehicle, rear of the vehicle, front of the vehicle, side of the vehicle, etc. In one embodiment, energy transfer component 2630 may be coupled with or disposed at least partially within surface 2625 of vehicle 2620, where surface 2625 may be a surface of a body panel, an undercarriage, hull, fuselage, wing, propeller, blade of a helicopter, or some other component of vehicle 2620. Component 2650 may be a housing, enclosure, component configured to perform at least one other function (e.g., a sign, guard rail, overpass, street light, stoplight, boat dock, etc.), or the like. In this manner, energy may be transferred between the vehicle (e.g., 2620) and an energy transfer system (e.g., 110) when vehicle is near, located beside, located below, etc. energy transfer component 2660.

In one embodiment, energy transfer component 2680 may be coupled with or at least partially disposed in component 2670, where component 2670 may be a connector or other member configured to be inserted into receptacle 2627 of vehicle 2620. Energy transfer component 2640 may be located at, adjacent to, etc. receptacle 2627. In this manner, component 2670 may be inserted into receptacle 2627 to align or otherwise position energy transfer components 2640 and 2680 such that energy may be transferred and/or signals may be communicated.

As shown in FIG. 26, one or more of the energy transfer components (e.g., 2630, 2640, some combination thereof, etc.) may be used to transfer energy and/or communicate signals over a wired interface (e.g., 231), and therefore, one or more of the energy transfer components (e.g., 2630, 2640, some combination thereof, etc.) may be implemented in accordance with (e.g., include components of, function similarly to, etc.) energy transfer component 233 in one embodiment. One or more of the energy transfer components (e.g., 2630, 2640, some combination thereof, etc.) may be used to transfer energy and/or communicate signals over an inductive interface (e.g., 234), and therefore, one or more of the energy transfer components (e.g., 2630, 2640, some combination thereof, etc.) may be implemented in accordance with (e.g., include components of, function similarly to, etc.) energy transfer component 236 in one embodiment. One or more of the energy transfer components (e.g., 2630, 2640, some combination thereof, etc.) may be used to transfer energy and/or communicate signals over a wireless interface (e.g., 237), and therefore, one or more of the energy transfer components (e.g., 2630, 2640, some combination thereof, etc.) may be implemented in accordance with (e.g., include components of, function similarly to, etc.) energy transfer component 239 in one embodiment.

In one embodiment, one or more of the energy transfer components (e.g., 2660, 2680, some combination thereof, etc.) may be used to transfer energy and/or communicate signals over a wired interface (e.g., 231), and therefore, one or more of the energy transfer components (e.g., 2660, 2680, some combination thereof, etc.) may be implemented in accordance with (e.g., include components of, function similarly to, etc.) energy transfer component 232 in one embodiment. One or more of the energy transfer components (e.g., 2660, 2680, some combination thereof, etc.) may be used to transfer energy and/or communicate signals over an inductive interface (e.g., 234), and therefore, one or more of the energy transfer components (e.g., 2660, 2680, some combination thereof, etc.) may be implemented in accordance with (e.g., include components of, function similarly to, etc.) energy transfer component 235 in one embodiment. One or more of the energy transfer components (e.g., 2660, 2680, some combination thereof, etc.) may be used to transfer energy and/or communicate signals over a wireless interface (e.g., 237), and therefore, one or more of the energy transfer components (e.g., 2660, 2680, some combination thereof, etc.) may be implemented in accordance with (e.g., include components of, function similarly to, etc.) energy transfer component 238 in one embodiment.

As shown in FIG. 26, one or more energy transfer components may be advantageously positioned to increase heat transfer from the one or more energy transfer components. For example, energy transfer component 2630 may be positioned to enable heat to be transferred into a component of vehicle 2620 which includes surface 2625 (e.g., represented by arrows 2635 and 2636), into the environment outside vehicle 2620 (e.g., represented by arrows 2635 and 2636), into component 2629 of vehicle 2620 (e.g., represented by arrow 2637), into another component or region of vehicle 2620 (e.g., represented by arrow 2637), etc. As another example, energy transfer component 2640 may be positioned to enable heat to be transferred into a component of vehicle 2620 which includes surface 2625 (e.g., represented by arrow 2645), into the environment outside vehicle 2620 (e.g., represented by arrow 2645), into component 2629 of vehicle 2620 (e.g., represented by arrows 2646 and 2647), into another component or region of vehicle 2620 (e.g., represented by arrows 2646 and 2647), etc. As yet another example, energy transfer component 2660 may be positioned to enable heat to be transferred into the environment outside vehicle 2620 (e.g., represented by arrows 2665 and 2666), into a component of vehicle 2620 which includes surface 2625 (e.g., represented by arrows 2665 and 2666), into component 2629 of vehicle 2620 (e.g., represented by arrow 2666), into another component or region of vehicle 2620 (e.g., represented by arrows 2665 and 2666), etc. And as a further example, energy transfer component 2680 may be positioned to enable heat to be transferred into the environment outside vehicle 2620 (e.g., represented by arrows 2685 and 2686), into a component of vehicle 2620 which includes surface 2625 (e.g., represented by arrows 2685 and 2686), into component 2629 of vehicle 2620 (e.g., represented by arrow 2686), into another component or region of vehicle 2620 (e.g., represented by arrows 2685 and 2686), etc.

Component 2629 of vehicle 2620 may be any component disposed at least partially within vehicle 2620. For example, component 2629 may be a structural member (e.g., part of the frame, a body panel, etc.), an aesthetic member (e.g., a body panel or other component used primarily for aesthetic purposes, etc.), an aerodynamic member (e.g., used to direct air or another fluid through or around vehicle 2620), a hardware component (e.g., including circuitry), or any other component of vehicle 2620. In this manner, embodiments of the present invention may advantageously repurpose or use at least one component of a vehicle which is primarily used to perform another function to also transfer heat from one or more energy transfer components.

As shown in FIG. 26, one or more components may be used to transfer heat from one or more energy transfer components.

For example, component 2632 may transfer energy from energy transfer component 2630, where component 2632 may be coupled with or otherwise positioned with respect to (e.g., coupled with, disposed on or touching, disposed adjacent to, disposed in proximity to, etc.) energy transfer component 2630 to enable heat to be transferred from energy transfer component 2630. As another example, component 2642 may transfer energy from energy transfer component 2640, where component 2642 may be coupled with or otherwise positioned with respect to (e.g., coupled with, disposed on or touching, disposed adjacent to, disposed in proximity to, etc.) energy transfer component 2640 to enable heat to be transferred from energy transfer component 2640. As yet another example, component 2662 may transfer energy from energy transfer component 2660, where component 2662 may be coupled with or otherwise positioned with respect to (e.g., coupled with, disposed on or touching, disposed adjacent to, disposed in proximity to, etc.) energy transfer component 2660 to enable heat to be transferred from energy transfer component 2660. And as a further example, component 2682 may transfer energy from energy transfer component 2680, where component 2682 may be coupled with or otherwise positioned with respect to (e.g., coupled with, disposed on or touching, disposed adjacent to, disposed in proximity to, etc.) energy transfer component 2680 to enable heat to be transferred from energy transfer component 2680.

The one or more components (e.g., 2632, 2642, 2662, 2682, etc.) may be capable of transferring heat from an energy transfer component (e.g., 2630, 2640, 2660, 2680, etc.) via conduction. For example, at least one component (e.g., 2632, 2642, 2662, 2682, some combination thereof, etc.) may be configured to remove heat generated by an energy transfer component (e.g., 2630, 2640, 2660, 2680, some combination thereof, etc.) responsive to application of an electric potential across respective electrodes of each of the at least one component (e.g., 2632, 2642, 2662, 2682, some combination thereof, etc.). In one embodiment, at least one component (e.g., 2632, 2642, 2662, 2682, some combination thereof, etc.) may be a thermoelectric cooler or a Peltier cooler. As another example, at least one component (e.g., 2632, 2642, 2662, 2682, some combination thereof, etc.) may be a heat exchanger configured to remove heat from an energy transfer component (e.g., 2630, 2640, 2660, 2680, some combination thereof, etc.) responsive to a pumping of a fluid through the at least one component (e.g., 2632, 2642, 2662, 2682, some combination thereof, etc.). And as yet another example, at least one component (e.g., 2632, 2642, 2662, 2682, some combination thereof, etc.) may be a heat pipe configured to remove heat from an energy transfer component (e.g., 2630, 2640, 2660, 2680, some combination thereof, etc.).

In one embodiment, the one or more components (e.g., 2632, 2642, 2662, 2682, etc.) may be configured to convert heat generated by an energy transfer component (e.g., 2630, 2640, 2660, 2680, etc.) into electrical energy. For example, at least one component (e.g., 2632, 2642, 2662, 2682, some combination thereof, etc.) may be a thermoelectric cooler or other component capable of generating electricity responsive to a temperature differential being applied across a respective first side and a respective second side of the at least one component (e.g., 2632, 2642, 2662, 2682, some combination thereof, etc.). The one or more components (e.g., 2632, 2642, 2662, 2682, some combination thereof, etc.) may be advantageously positioned with respect to an energy transfer component (e.g., 2630, 2640, 2660, 2680, some combination thereof, etc.) to create a temperature differential across a first side (e.g., positioned adjacent to the energy transfer component) and a second side (e.g., positioned to adjacent to ambient air, a component of vehicle 2620, a component of the energy transfer system, etc.) of the one or more components (e.g., 2632, 2642, 2662, 2682, some combination thereof, etc.), where the first side may be warmer than the second side in one embodiment. Energy generated by the one or more components (e.g., 2632, 2642, 2662, 2682, some combination thereof, etc.) may be transferred over an interface to a component of a vehicle (e.g., interface component 221, power management component 225, etc.) and/or to a component of an energy transfer system (e.g., interface component 211, power management component 215, etc.), thereby enabling the energy to be accessed (e.g., for use, storage, etc.) by the vehicle, to be accessed (e.g., for use, storage, etc.) by the energy transfer system, to be transferred to another system (e.g., energy transfer system 110, another vehicle, etc.), some combination thereof, etc. In this manner, electricity may be advantageously generated using the one or more components (e.g., 2632, 2642, 2662, 2682, some combination thereof, etc.) to improve the efficiency of an energy transfer between a vehicle and an energy transfer system, improve the efficiency of an energy transfer between two or more vehicles, recover energy that would otherwise be lost, etc.

As shown in FIG. 26, the one or more components (e.g., 2632, 2642, 2662, 2682, etc.) may be capable of transferring energy from an energy transfer component (e.g., 2630, 2640, 2660, 2680, etc.) via convection. For example, at least one component (e.g., 2632, 2642, 2662, 2682, some combination thereof, etc.) may include a fan or other device capable of moving a fluid across an energy transfer component (e.g., 2630, 2640, 2660, 2680, some combination thereof, etc.), across a component into which heat from an energy transfer component has been transferred, etc.

One or more components (e.g., 2634, 2644, 2664, 2684, etc.) may be used to monitor or sense a temperature of an energy transfer component (e.g., 2630, 2640, 2660, 2680, etc.). The one or more components (e.g., 2634, 2644, 2664, 2684, etc.) may be or include a thermocouple, thermistor, ultrasonic thermometer, infrared thermometer or pyrometer, laser thermometer or pyrometer, etc. In one embodiment, signals (e.g., analog signals, digital signals, pulse width modulated signals, some combination thereof, etc.) generated by the one or more components (e.g., 2634, 2644, 2664, 2684, etc.) may be transferred over an interface to a component (e.g., interface component 211, another component, etc.) of an energy transfer system (e.g., 110) and/or to a component (e.g., interface component 221, another component, etc.) of a vehicle (e.g., 120, 320a, 320b, 320c, 1802, 2620, etc.), where the signals may represent or otherwise be used to determine a temperature of an energy transfer component (e.g., 2630, 2640, 2660, 2680, etc.).

In one embodiment, a temperature of an energy transfer component (e.g., 2630, 2640, 2660, 2680, etc.) may be used to control an energy transfer. For example, if a temperature of an energy transfer component (e.g., as measured by component 2634, component 2644, component 2664, component 2684, etc.) is determined to be above a predetermined threshold, then an attribute (e.g., an energy transfer type, an interface type, a power, a current, a voltage, an energy transfer profile, a duration, a waveform, a temperature, etc.) of the energy transfer may be adjusted to reduce the temperature of the energy transfer component.

In one embodiment, a first component (e.g., 2632, 2642, 2662, 2682, etc.) and/or a second component (e.g., 2634, 2644, 2664, 2684, etc.) may be used to implement a control system for controlling the temperature of an energy transfer component (e.g., 2630, 2640, 2660, 2680, etc.) (e.g., in accordance with process 3800 of FIG. 38). For example, a first component (e.g., 2632, 2642, 2662, 2682, etc.) may be controlled (e.g., by interface component 211, another component of the energy transfer system, interface component 221, another component of the vehicle, etc.) to increase heat transfer from an energy transfer component (e.g., 2630, 2640, 2660, 2680, etc.) responsive to detecting that the temperature (e.g., measured using a second component such as component 2634, component 2644, component 2664, component 2684, etc.) of the energy transfer component has exceeded a first threshold. As another example, a first component (e.g., 2632, 2642, 2662, 2682, etc.) may be controlled (e.g., by interface component 211, another component of the energy transfer system, interface component 221, another component of the vehicle, etc.) to reduce or stop heat transfer from an energy transfer component (e.g., 2630, 2640, 2660, 2680, etc.) responsive to detecting that the temperature (e.g., measured using a second component such as component 2634, component 2644, component 2664, component 2684, etc.) has fallen below a second threshold. In one embodiment, the second threshold may be associated with a lower temperature than a temperature associated with the first threshold.

Accordingly, embodiments of the present invention can advantageously increase heat transfer from at least one energy transfer component (e.g., 2630, 2640, 2660, 2680, etc.). Increasing heat transfer from an energy transfer component can extend the lifetime of the component, increase efficiency of energy transfer and/or signal communication, etc. Additionally, by transforming heat generated by an energy transfer component into electricity, embodiments of the present invention can further increase the efficiency of an energy transfer.

Although FIG. 26 shows a specific number, arrangement, shape, and size of components of vehicle 2620, it should be appreciated that vehicle 2620 may have any number, arrangement, shape, and/or size of components in other embodiments. Additionally, although FIG. 26 shows a specific number, arrangement, shape, and size of other components (e.g., 2650, 2660, 2662, 2664, 2670, 2680, 2682, 2684, etc.), it should be appreciated that any number, arrangement, shape, and/or size of components may be used or exist in other embodiments.

Figure 27:
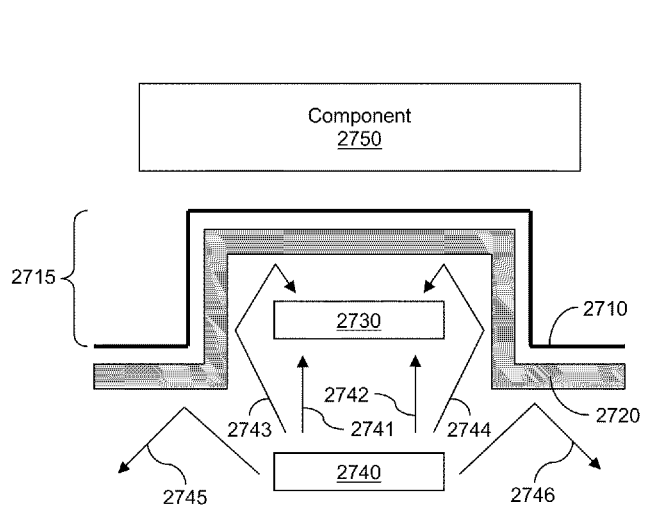
FIG. 27 is a diagram showing a component for performing one or more operations associated with at least one energy transfer component in accordance with one embodiment of the present invention.

FIG. 27 is a diagram showing component 2720 for performing one or more operations associated with at least one energy transfer component in accordance with one embodiment of the present invention. For example, component 2720 may be located between an energy transfer component (e.g., 2730) and at least one other component (e.g., 2750), and therefore, component 2720 may shield or otherwise reduce interference received by (e.g., measured at) component 2750 in one embodiment. As another example, component 2720 may be located in proximity to and/or overlap at least one side of an energy transfer component (e.g., 2730), and therefore, component 2720 may improve energy transfer and/or improve signal communication between a vehicle (e.g., 120, 320a, 320b, 320c, 1802, 2620, etc.) and an energy transfer system (e.g., 110).

In one embodiment, energy transfer component 2730 may be an energy transfer component of a vehicle (e.g., 120, 320a, 320b, 320c, 1802, 2620, etc.), whereas energy transfer component 2740 may be an energy transfer component of an energy transfer system (e.g., 110). In this case, component 2750 may be any component of the vehicle (e.g., any electrical component, mechanical component, etc. that may be affected, operationally or otherwise, by interference). Surface 2710 may be a surface of a body panel, an undercarriage, hull, fuselage, wing, propeller, blade of a helicopter, or some other component of a vehicle (e.g., 120, 320a, 320b, 320c, 1802, 2620, etc.) in one embodiment. Component 2750 may be coupled with or disposed at least partially within surface 2710. In one embodiment, component 2720 and/or energy transfer component 2730 may be coupled with or disposed at least partially within a surface of the vehicle (e.g., surface 2710).

Alternatively, energy transfer component 2730 may be an energy transfer component of an energy transfer system (e.g., 110), whereas energy transfer component 2740 may be an energy transfer component of a vehicle (e.g., 120, 320a, 320b, 320c, 1802, 2620, etc.). In this case, component 2750 may be any component of the energy transfer system (e.g., any electrical component, mechanical component, etc. that may be affected, operationally or otherwise, by interference). Surface 2710 may be a surface of an enclosure, housing, or the like of an energy transfer system in one embodiment. Component 2750 may be coupled with or disposed at least partially within surface 2710. In one embodiment, component 2720 and/or energy transfer component 2730 may be coupled with or disposed at least partially within a surface of the energy transfer system (e.g., surface 2710).

In one embodiment, component 2720 may shield or otherwise reduce interference received by component 2750. For example, where energy transfer components 2730 and 2740 may be capable of implementing an inductive interface (e.g., 234), component 2720 may shield or otherwise reduce a magnetic field received by (e.g., measured at) component 2750. As such, at least a portion of a magnetic field (e.g., represented by arrows 2741, 2742, 2743 and 2744) generated by energy transfer component 2740 may be received by energy transfer component 2730, where the magnetic field may be stopped or attenuated by component 2720 (e.g., thereby reducing a magnitude of the magnetic field measured at or nearby component 2750) to reduce interference received by component 2750. In one embodiment, a portion of the magnetic field (e.g., represented by arrows 2745 and 2746) generated by energy transfer component 2740 may be stopped or attenuated by component 2720 (e.g., thereby reducing a magnitude of the magnetic field measured at or nearby component 2750) to reduce interference received by component 2750, where the other portions of the magnetic field (e.g., represented by arrows 2745 and 2746) may not be usable or received by energy transfer component 2730 in one embodiment. Component 2720 may stop or attenuate a magnetic field (e.g., generated by energy transfer component 2740) by absorbing at least a portion of the magnetic field, reflecting at least a portion of the magnetic field, changing a shape of the magnetic field (e.g., of a plurality of magnetic field lines which define the magnetic field), some combination thereof, etc.

As another example, where energy transfer components 2730 and 2740 are capable of implementing a wireless interface (e.g., 237), component 2720 may shield or otherwise reduce energy (e.g., in the form of radio waves, microwaves, infrared waves, visible light waves, ultraviolet waves, x-rays, gamma rays, some combination thereof, etc. which can be used to transfer energy and/or communicate signals between a vehicle and an energy transfer system) received by (e.g., measured at) component 2750. As such, at least a portion of the energy (e.g., represented by arrows 2741, 2742, 2743 and 2744) generated by energy transfer component 2740 may be received by energy transfer component 2730, where the energy may be stopped or attenuated by component 2720 (e.g., thereby reducing a magnitude of the energy measured at or nearby component 2750) to reduce interference received by component 2750. In one embodiment, a portion of the energy (e.g., represented by arrows 2745 and 2746) generated by energy transfer component 2740 may be stopped or attenuated by component 2720 (e.g., thereby reducing a magnitude of the energy measured at or nearby component 2750) to reduce interference received by component 2750, where the other portions of the energy (e.g., represented by arrows 2745 and 2746) may not be usable or received by energy transfer component 2730 in one embodiment. Component 2720 may stop or attenuate energy (e.g., generated by energy transfer component 2740) by absorbing at least a portion of the energy, reflecting at least a portion of the energy, changing a shape of the energy, some combination thereof, etc.

In one embodiment, component 2720 may shield or otherwise reduce other types of interference received by (e.g., measured at) component 2750 regardless of the type of interference and/or the component emitting or generating the interference. For example, component 2720 may shield or otherwise reduce electromagnetic interference, radio frequency interference, etc. As another example, component 2720 may shield or otherwise reduce interference emitted or generated by component 2740 and/or another component. Component 2720 may stop or attenuate interference by absorbing at least a portion of the interference, reflecting at least a portion of the interference, some combination thereof, etc.

Component 2720 may improve energy transfer and/or improve signal communication between a vehicle (e.g., 120, 320*a*, 320*b*, 320*c*, 1802, 2620, etc.) and an energy transfer system (e.g., 110) in one embodiment. For example, where energy transfer components 2730 and 2740 are capable of implementing an inductive interface (e.g., 234), component 2720 may change the size and/or shape of a magnetic field (e.g., generated by energy transfer component 2740) received by (e.g., measured at) energy transfer component 2730. In one embodiment, a portion of the magnetic field (e.g., represented by arrows 2743 and 2744) may be reflected or redirected (e.g., toward energy transfer component 2730 as shown by the bends in arrows 2743 and 2744). The portion of the magnetic field may be reflected and/or redirected off one or more surfaces of component 2720. Component 2720 may overlap at least two sides (e.g., two sides, three sides, four sides, five sides, etc.) of energy transfer component 2730 in one embodiment. In one embodiment, where energy transfer component 2730 is disposed at least partially within cavity 2715, a magnetic field that might otherwise include magnetic field lines which extended outside of cavity 2715 may be reshaped within cavity 2715 and in proximity to energy transfer component 2730. In this manner, a density of a magnetic field (e.g., generated by energy transfer component 2740) may be increased (e.g., the magnetic field may be concentrated) around energy transfer component 2730 to improve energy transfer and/or signal communication between a vehicle (e.g., 120, 320*a*, 320*b*, 320*c*, 1802, 2620, etc.) and an energy transfer system (e.g., 110).

As another example, where energy transfer components 2730 and 2740 are capable of implementing a wireless interface (e.g., 237), component 2720 may reflect or redirect (e.g., toward energy transfer component 2730 as shown by the bends in arrows 2743 and 2744) energy (e.g., in the form of radio waves, microwaves, infrared waves, visible light waves, ultraviolet waves, x-rays, gamma rays, some combination thereof, etc. which can be used to transfer energy and/or communicate signals between a vehicle and an energy transfer system). Energy may be reflected and/or redirected off one or more surfaces of component 2720. In this manner, the strength and/or amount of the energy received by (e.g., measured at) energy transfer component 2730 may be increased to improve energy transfer and/or signal communication between a vehicle (e.g., 120, 320*a*, 320*b*, 320*c*, 1802, 2620, etc.) and an energy transfer system (e.g., 110).

In one embodiment, component 2720 may be disposed on an underside (e.g., an undercarriage) of a vehicle (e.g., 120, 320*a*, 320*b*, 320*c*, 1802, 2620, etc.), on a side of the vehicle, on the front of the vehicle, on a back of the vehicle, on the top of the vehicle, within a compartment (e.g., cabin, trunk, engine compartment, cockpit, storage bay, etc.) of the vehicle, some combination thereof, etc.

In one embodiment, component 2720 may be a layer disposed on or above surface 2710. In one embodiment, at least one other layer (e.g., an adhesive, some other material or component, etc.) may be disposed between surface 2710 and component 2720. In one embodiment, component 2720 may be a contiguous layer (e.g., without any gaps, holes, etc.). Alternatively, component 2720 may include a portion or surface with a gap, hole, or the like defined therein.

In one embodiment, component 2720 may be a homogenous material, a composite material, etc. Component 2720 may be relatively formable or shapeable (e.g., including woven material, flexible material, etc.), thereby enabling component 2720 to be fit or applied to surfaces with a variety of different shapes and sizes. In one embodiment, component 2720 may be applied using a process such as spraying, chemical vapor deposition, physical vapor deposition, or the like.

As shown in FIG. 27, one or more of the energy transfer components (e.g., 2730, 2740, etc.) may be implemented in accordance with (e.g., include components of, function similarly to, etc.) energy transfer component 232 and/or energy transfer component 233, and therefore, the one or more energy transfer components (e.g., 2730, 2740, etc.) may include at least one electrical contact (e.g., disposed in or coupled with a plug, disposed in or coupled with a receptacle, etc.). In one embodiment, one or more energy transfer components (e.g., 2730, 2740, etc.) may be implemented in accordance with (e.g., include components of, function similarly to, etc.) energy transfer component 235 and/or energy transfer component 236, and therefore, the one or more energy transfer components (e.g., 2730, 2740, etc.) may be capable of enabling an inductive energy transfer over an energy transfer interface (e.g., 234) between a vehicle (e.g., 120, 320*a*, 320*b*, 320*c*, 1802, 2620, etc.) and an energy transfer system (e.g., 110). And in one embodiment, one or more energy transfer components (e.g., 2730, 2740, etc.) may be implemented in accordance with (e.g., include components of, function similarly to, etc.) energy transfer component 238 and/or energy transfer component 239, and therefore, the one or more energy transfer components (e.g., 2730, 2740, etc.) may be capable of enabling a wireless energy transfer over an energy transfer interface (e.g., 237) between a vehicle (e.g., 120, 320*a*, 320*b*, 320*c*, 1802, 2620, etc.) and an energy transfer system (e.g., 110).

Although FIG. 27 shows a specific shape, size and location of component 2720, it should be appreciated that component 2720 may have any shape, size and/or location in other embodiments. Additionally, although FIG. 27 shows a specific number, arrangement, shape, and size of other components (e.g., 2730, 2740, 2750, etc.), it should be appreciated that any number, arrangement, shape, and/or size of components may be used or exist in other embodiments.

FIG. 28 shows system 2800 for increasing the security of vehicle 120 and/or at least one component thereof in accordance with one embodiment of the present invention. As shown in FIG. 28, security component 2820 may reduce unauthorized use of and/or access to energy storage component 226 (e.g., by reducing the ability or ease of using energy storage component 226 in a vehicle other than vehicle 120, by reducing unauthorized transfers of energy to and/or from energy storage component 226, etc.). Security component 2840 may reduce unauthorized access to vehicle 120 (e.g., by reducing the ability or ease of using an unauthorized device or system to power, move, use or otherwise access vehicle 120). In one embodiment, security component 2820 and/or security component 2840 may be used to perform an authentication of a user of vehicle 120, thereby reducing unauthorized use of vehicle 120 and/or at least one component thereof. Accordingly, embodiments of the present invention advantageously provide one or more layers of security which may be used alone or in conjunction with one another to increase vehicle security (e.g., the security of vehicle 120 and/or at least one component thereof).

Security component 2820 may be used to perform an authentication of another component in one embodiment. For example, authentication component 2822 may be used to perform an authentication of a component (e.g., authentication component 2842, interface component 221, power management component 225, power source 227, another component of vehicle 120, a component of energy transfer system 110, a component of an external system or external device, etc.) responsive to an interaction with the vehicle (e.g., an attempt to gain access to a compartment or region of the vehicle, an attempt to start the vehicle, an attempt to use or move the vehicle, an attempt to turn on a radio or other component of the vehicle, an attempt to transfer energy to and/or from an energy storage component, an attempt to transfer energy to and/or from another component of the vehicle, some combination thereof, etc.). In one embodiment, the interaction with the vehicle may be an attempt to transfer energy to and/or transfer energy from energy storage component 226, where the attempt to transfer energy to and/or from energy storage component 226 may be performed by the component undergoing authentication, a device which includes the component undergoing authentication, a system which includes the component undergoing authentication, or some combination thereof. The authentication may be performed using authentication component 2822 alone or in combination with processor 2825, where instructions or code used to carry out the authentication may be stored in memory 2826 for execution by authentication component 2822 and/or processor 2825. Accordingly, in one embodiment, security component 2820 may reduce unauthorized use of energy storage component 226 (e.g., by reducing the ability to use energy storage component 226 in a vehicle other than vehicle 120).

In one embodiment, security component 2820 may be used to perform one or more operations if an authentication is successful. For example, if the authentication is successful, then energy regulation component 2821 may be controlled (e.g., by authentication component 2822, by processor 2825, etc.) to enable energy to be transferred to and/or from energy storage medium 2810 (e.g., over energy transfer interface 2832 and/or interface 2817). In one embodiment, the energy transferred to energy storage medium 2810 via energy regulation component 2821 may be sufficient to charge energy storage medium. In one embodiment, the energy transferred from energy storage medium 2810 (e.g., over energy transfer interface 2832 and/or interface 2817) via energy regulation component 2821 may be sufficient to power another component of vehicle 120 (e.g., a radio or navigation system, dashboard, lights, any of the components of vehicle 120 depicted in FIG. 2, motor 2850, transmission 2860, braking system 2870, steering wheel 2880, another component of vehicle 120, etc.) and/or perform an energy transfer with another system (e.g., energy transfer system 110, another vehicle, etc.). As another example, if the authentication is successful, then a communication may be sent (e.g., using communication component 2823 over energy transfer interface 2832 and/or signal interface 2834) to vehicle movement control component 2844 of security component 2840 to enable use and/or movement of the vehicle (e.g., by enabling an activation of energy storage component 226, motor 2850, transmission 2860, braking system 2870, steering wheel 2880, some combination thereof, etc.).

As shown in FIG. 28, energy transfer interface 2832 may couple energy storage component 226 to at least one other component of vehicle 120. For example, energy transfer interface 2832 may couple energy storage component 226 to power management component 225, to power source 227, to charge and/or discharge component 228, to meter 229, to interface component 221, to an energy transfer component (e.g., 233, 236, 239, etc.), to communication interface 242, to another component of vehicle 120, etc.

And as yet another example, if the authentication is successful, then a communication may be sent (e.g., using communication component 2823 over energy transfer interface 2832 and/or signal interface 2834) to security component 2840 to control (e.g., using authentication component 2842, using processor 2845, etc.) energy regulation component 2841 to enable energy to be transferred to and/or from a component of vehicle 120 (e.g., over energy transfer interface 2832, over interface 2855, over interface 2865, over interface 2875, over interface 2885, over another interface, etc.). In one embodiment, the energy transferred via energy regulation component 2841 may be sufficient to power motor 2850 to move vehicle 120. In one embodiment, the energy transferred via energy regulation component 2841 may be sufficient to power another component of vehicle 120 (e.g., a radio or navigation system, dashboard, lights, any of the components of vehicle 120 depicted in FIG. 2, transmission 2860, braking system 2870, steering wheel 2880, another component of vehicle 120, etc.) and/or perform an energy transfer with another system (e.g., energy transfer system 110, another vehicle, etc.).

In one embodiment, security component 2820 may be used to perform one or more operations if an authentication is unsuccessful. For example, if the authentication is unsuccessful, energy regulation component 2821 may be controlled (e.g., by authentication component 2822, by processor 2825, etc.) to reduce the ability to perform (or to prevent altogether) an energy transfer to and/or from energy storage medium 2810 (e.g., over energy transfer interface 2832 and/or interface 2817). As another example, if the authentication is unsuccessful, energy regulation component 2821 may be controlled (e.g., by authentication component 2822, by processor 2825, etc.) to reduce the ability to move or to prevent movement of vehicle 120 (e.g., by limiting the current, voltage, or another parameter of electricity transferred over energy transfer interface 2832 to, for example, motor 2850).

As yet another example, if the authentication is unsuccessful, energy regulation component 2821 may be advantageously controlled (e.g., by authentication component 2822, by processor 2825, etc.) to provide a reduced amount of energy (e.g., from energy storage medium 2810) which is insufficient to perform an operation (e.g., moving vehicle 120 using motor 2850, performing an energy transfer between vehicle 120 and an energy transfer system, performing an energy transfer between vehicle 120 and another vehicle, etc.) yet sufficient to enable a component (e.g., a radio or navigation system, an instrument located in a dashboard or other location of vehicle 120, interior lights, exterior lights, hazard lights, any of the components of vehicle 120 depicted in FIG.

2, motor 2850, transmission 2860, braking system 2870, steering wheel 2880, another component of vehicle 120, security component 2840, another security component of vehicle 120, electronics associated with the door locks of vehicle 120, etc.) of vehicle 120 to function. As another example, if the authentication is unsuccessful, energy regulation component 2821 may be advantageously controlled (e.g., by authentication component 2822, by processor 2825, etc.) to provide a reduced amount of energy (e.g., from energy storage medium 2810) which is insufficient to perform a first operation (e.g., moving vehicle 120 using motor 2850, performing an energy transfer between vehicle 120 and an energy transfer system, performing an energy transfer between vehicle 120 and another vehicle, etc.) yet sufficient to perform a second operation (e.g., retain data stored in a volatile memory of vehicle 120, present a user interface configured to enable input of information associated with an authentication of a user, communicate data with a system external to vehicle 120, communicate a failure of an authentication to a user or another system, present another user interface enabling a user to report that vehicle 120 has been stolen, communicate to another user or another system that vehicle 120 has been stolen, reduce an ability to move vehicle 120 using security component 2840 or another component of vehicle 120, some combination thereof, etc.).

In one embodiment, if the authentication performed using security component 2820 is unsuccessful, then a communication may be sent (e.g., using communication component 2823 over energy transfer interface 2832 and/or signal interface 2834) to security component 2840 to cause or enable security component 2840 to perform one or more operations. For example, responsive to a communication from security component 2820 associated with an unsuccessful authentication, energy regulation component 2841 may be controlled (e.g., by authentication component 2842, by processor 2845, etc.) to reduce an ability to transfer energy (or to prevent altogether an energy transfer) to and/or from a component of vehicle 120 (e.g., over energy transfer interface 2832, over interface 2855, over interface 2865, over interface 2875, over interface 2885, over another interface, etc.). In one embodiment, the energy transferred via energy regulation component 2841 may be insufficient to power motor 2850 to move vehicle 120. In one embodiment, the energy transferred via energy regulation component 2841 may be insufficient to perform an energy transfer with another system (e.g., energy transfer system 110, another vehicle, etc.). In one embodiment, the energy transferred via energy regulation component 2841 may be sufficient to power another component of vehicle 120 (e.g., a radio or navigation system, dashboard, lights, any of the components of vehicle 120 depicted in FIG. 2, transmission 2860, braking system 2870, steering wheel 2880, another component of vehicle 120, etc.).

As another example, if the authentication performed using security component 2820 is unsuccessful, then a communication may be sent (e.g., using communication component 2823 over energy transfer interface 2832 and/or signal interface 2834) to security component 2840 to advantageously control (e.g., using authentication component 2842, using processor 2845, etc.) energy regulation component 2841 to reduce the ability to move or to prevent movement of vehicle 120 (e.g., by limiting the current, voltage, or another parameter of electricity to motor 2850). As yet another example, responsive to a communication from security component 2820 associated with an unsuccessful authentication, energy regulation component 2841 may be advantageously controlled (e.g., by authentication component 2842, by processor 2845, etc.) to provide a reduced amount of energy (e.g., from energy storage component 226) which is insufficient to perform an operation (e.g., moving vehicle 120 using motor 2850, performing an energy transfer between vehicle 120 and an energy transfer system, performing an energy transfer between vehicle 120 and another vehicle, etc.) yet sufficient to enable a component (e.g., a radio or navigation system, an instrument located in a dashboard or other location of vehicle 120, interior lights, exterior lights, hazard lights, any of the components of vehicle 120 depicted in FIG. 2, motor 2850, transmission 2860, braking system 2870, steering wheel 2880, another component of vehicle 120, security component 2820, another security component of vehicle 120, electronics associated with the door locks of vehicle 120, etc.) of vehicle 120 to function.

As a further example, if the authentication performed using security component 2820 is unsuccessful, a communication may be sent (e.g., using communication component 2823 over energy transfer interface 2832 and/or signal interface 2834) to security component 2840 to advantageously control (e.g., using authentication component 2842, using processor 2845, etc.) energy regulation component 2841 to provide a reduced amount of energy (e.g., from energy storage medium 2810) which is insufficient to perform a first operation (e.g., moving vehicle 120 using motor 2850, performing an energy transfer between vehicle 120 and an energy transfer system, performing an energy transfer between vehicle 120 and another vehicle, etc.) yet sufficient to perform a second operation (e.g., retain data stored in a volatile memory of vehicle 120, present a user interface configured to enable input of information associated with an authentication of a user, communicate data with a system external to vehicle 120, communicate a failure of an authentication to a user or another system, present another user interface enabling a user to report that vehicle 120 has been stolen, communicate to another user or another system that vehicle 120 has been stolen, reduce an ability to move vehicle 120 using vehicle movement control component 2844 or another component of vehicle 120, some combination thereof, etc.). As another example, if the authentication is unsuccessful, a communication may be sent (e.g., using communication component 2823 over energy transfer interface 2832 and/or signal interface 2834) to vehicle movement control component 2844 to reduce (or prevent) the ability to use and/or move the vehicle (e.g., by disabling or otherwise changing a state of energy storage component 226, motor 2850, transmission 2860, braking system 2870, steering wheel 2880, etc.). As yet another example, if the authentication is unsuccessful, a communication may be sent (e.g., to interface system 550 for presentation in region 1095 of GUI 1000) to alert a user that the authentication was unsuccessful.

In one embodiment, authentication component 2822 may perform an authentication of a component (e.g., authentication component 2842, interface component 221, power management component 225, power source 227, another component of vehicle 120, etc.) by comparing an identifier (e.g., generated and/or sent from the component undergoing authentication) to authentication data (e.g., stored in memory 2826, a register of processor 2825, another portion of security component 2820, etc.). In one embodiment, the identifier may be a unique identifier which is associated with only the component undergoing authentication and does not correspond to or otherwise identify any other component. In one embodiment, the identifier may be a unique identifier which is associated with only vehicle 120 and does not correspond to or otherwise identify any other vehicle. In one embodiment, the identifier may be a key (e.g., public key, private key, etc.), data encrypted or encoded by a component performing the authentication or by another trusted party, etc. In one embodiment, the identifier may be sent from the component undergoing authentication responsive to a request for identification sent from authentication component 2822. In one embodiment, communications between security component 2820 and the component undergoing authentication may be encrypted (e.g., by the sender) and/or decrypted (e.g., by the recipient). In one embodiment, the authentication may be successful (e.g., the component undergoing authentication is determined to be authorized) if the identifier associated with the component undergoing authentication matches the authentication data (e.g., stored in memory 2826, stored in a register of processor 2825, stored in another portion of security component 2820, etc.). Alternatively, the authentication may be unsuccessful (e.g., the component undergoing authentication is determined not to be authorized) if the identifier associated with the component undergoing authentication does not match the authentication data (e.g., stored in memory 2826, stored in a register of processor 2825, stored in another portion of security component 2820, etc.).

In one embodiment, computer system 2890 may perform an authentication of a component (e.g., security component 2840, authentication component 2842, interface component 221, power management component 225, power source 227, another component of vehicle 120, etc.) by comparing an identifier (e.g., generated and/or sent from the component undergoing authentication) to authentication data. For example, where the authentication data is stored in security component 2820 (e.g., stored in memory 2826, a register of processor 2825, another portion of security component 2820, etc.), the identifier and the authentication data may be sent (e.g., separately, together, sequentially, simultaneously, etc.) to computer system 2890 via communication interface 242 for comparison by computer system 2890.

As another example, where computer system 2890 includes or can otherwise access the authentication data (e.g., 2895), the identifier may be sent to computer system 2890 via communication interface 242 for comparison with authentication data 2895 by computer system 2890. Authentication data 2895 may be part of a data structure or database which includes an index of components (e.g., including energy storage component 226, security component 2820, some combination thereof, etc.) and respective authentication data corresponding to each of the components, where the data structure or database may be indexed using an identifier of a component (e.g., energy storage component 226, security component 2820, some combination thereof, etc.) to access authentication data for comparison to the identifier of the component undergoing authentication. In one embodiment, the identifier of the other component (e.g., energy storage component 226, security component 2820, some combination thereof, etc.) may be sent to computer system 2890 along with (e.g., simultaneously with, contemporaneously with, as part of the same data packet, etc.) or separate from (e.g., sequentially with, at another time than, in a different data packet, etc.) the identifier of the component undergoing authentication.

In one embodiment, the identifier of the component undergoing authentication may be sent (e.g., to computer system 2890) from the component undergoing authentication responsive to a request for identification sent from authentication component 2822. In one embodiment, the identifier sent to computer system 2890 may be a unique identifier which is associated with only the component undergoing authentication and does not correspond to or otherwise identify any other component. In one embodiment, the identifier may be a key (e.g., public key, private key, etc.), data encrypted or encoded by a component performing the authentication or by another trusted party, etc. In one embodiment, communications between security component 2820, the component undergoing authentication, computer system 2890, or some combination thereof, may be encrypted (e.g., by the sender) and/or decrypted (e.g., by the recipient). In one embodiment, the authentication may be successful (e.g., the component undergoing authentication is determined to be authorized) if the identifier associated with the component undergoing authentication matches the authentication data (e.g., 2895, etc.). Alternatively, the authentication may be unsuccessful (e.g., the component undergoing authentication is determined not to be authorized) if the identifier associated with the component undergoing authentication does not match the authentication data (e.g., the component undergoing authentication is determined to be authorized) if the identifier associated with the component undergoing authentication matches the authentication data (e.g., 2895, etc.). Results of the comparison (e.g., performed by computer system 2890) may be communicated to vehicle 120 (e.g., to enable energy regulation component 2821 to regulate energy transferred to and/or from energy storage medium 2810, to enable energy regulation component 2841 to reduce or increase energy supplied to motor 2850, to enable energy regulation component 2841 to reduce or increase energy supplied to another component of vehicle 120, to enable vehicle movement control component 2844 to control use and/or movement of vehicle 120, etc.) in one embodiment.

As shown in FIG. 28, computer system 2890 may be separate or located remotely from vehicle 120. Computer system 2890 may be implemented in accordance with (e.g., include components of, function similarly to, etc.) computer system 4100 of FIG. 41 in one embodiment.

It should be appreciated that the identifier (e.g., of the component undergoing authentication) may be different from the authentication data in one embodiment. For example, the identifier of the component undergoing authentication may be encrypted, whereas the authentication data may not be encrypted. In one embodiment, a hash value generated by performing a hash function on the identifier may be different than a hash value generated by performing the hash function on the authentication data. In this manner, the identifier and/or the authentication data may be processed (e.g., decrypted, altered, etc.) before performing the comparison in one embodiment.

In one embodiment, security component 2820 may be programmed by an authorized party (e.g., a manufacturer of security component 2820, a manufacturer of vehicle 120, a dealership authorized to service vehicle 120, etc.). For example, authentication data associated with a particular component of vehicle 120 (e.g., security component 2840, authentication component 2842, interface component 221, power management component 225, power source 227, another component of vehicle 120, etc.) may be written to security component 2820 (e.g., stored in memory 2826, a register of processor 2825, another portion of security component 2820, etc.). As such, energy storage component 226 may be configured by an authorized party to operate with vehicle 120 and/or a component thereof (e.g., security component 2840, authentication component 2842, interface component 221, power management component 225, power source 227, another component of vehicle 120, etc.), where the programming of security component 2820 may be performed as a manufacturing operation (e.g., during manufacture of vehicle 120), as a service or maintenance operation (e.g., where energy storage component 226 is installed in vehicle 120 to replace another energy storage component which no longer works properly, has failed, has exceeded its lifespan, etc.), etc.

In one embodiment, authentication data 2895 may be updated or written (e.g., to a memory of computer system 2890, to a memory coupled to or otherwise accessible to computer system 2890, etc.) by an authorized party (e.g., a manufacturer of security component 2820, a manufacturer of vehicle 120, a dealership authorized to service vehicle 120, etc.) responsive to a programming of security component 2820. For example, where energy storage component 226 is configured as a manufacturing operation by an authorized party to operate with vehicle 120 and/or a component thereof (e.g., where energy storage component 226 is the first energy storage component to be installed in vehicle 120 during manufacturing), authentication data 2895 may be written which is associated with vehicle 120 and/or the component thereof (e.g., security component 2840, authentication component 2842, interface component 221, power management component 225, power source 227, another component of vehicle 120, etc.). As another example, where energy storage component 226 is configured as a service or maintenance operation by an authorized party to operate with vehicle 120 and/or a component thereof (e.g., where energy storage component 226 is installed in vehicle 120 to replace another energy storage component which no longer works properly, has failed, has exceeded its lifespan, etc.), authentication data 2895 may be updated to reflect the replacement of another energy storage component with energy storage component 226 (e.g., by changing the association of vehicle 120 and/or a component thereof from the other energy storage component to energy storage component 226, security component 2820, authentication component 2822, etc.).

As shown in FIG. 28, energy regulation component 2821 may be disposed between energy storage medium 2810 and at least one other component of vehicle 120, and therefore, energy regulation component 2821 may be used to control electrical access to energy storage medium 2810 in one embodiment. For example, energy regulation component 2821 may act as a switch to electrically disconnect or decouple energy transfer interface 2832 from interface 2817 (e.g., coupling energy storage medium 2810 to energy regulation component 2821). As another example, energy regulation component 2821 may limit current, voltage, or another parameter of energy flowing to and/or from energy storage medium 2810 over interface 2817. Thus, embodiments of the present invention can advantageously increase security by limiting electrical access to energy storage medium 2810 and/or interface 2817 (e.g., responsive to a failure of an authentication of a component, responsive to a failure of an authentication of a user, some combination thereof, etc.).

In one embodiment, security component 2820 may located such that physical access to security component 2820 and/or interface 2817 is limited. For example, security component 2820 may be coupled with and/or disposed at least partially within housing 2830 of energy storage component 226. In one embodiment, security component 2820 may located such that access to security component 2820 and/or interface 2817 may only be obtained by tampering with (e.g., opening, altering, destroying, etc.) housing 2830. In this manner, the ability to bypass energy regulation component 2821 to obtain electrical access to (e.g., by cutting, splicing into, replacing, etc.) energy storage medium 2810 and/or interface 2817 is reduced. Thus, embodiments of the present invention can advantageously increase security by limiting physical access to security component 2820 and/or interface 2817.

As shown in FIG. 28, tampering detection component 2827 may be capable of detecting a tampering with housing 2830 of energy storage component 226. For example, tampering detection component 2827 may include a sensor, switch, etc. (e.g., disposed at or near a panel of housing 2830, a cover of housing 2830, an interface of at least two portions of housing 2830, etc.) operable to detect an unauthorized opening of housing 2830, a cutting of housing 2830, or some other tampering with housing 2830. As another example, tampering detection component 2827 may include a sensor (e.g., accelerometer, gyroscope, magnetometer, ball-in-cage sensor, etc.) capable of detecting an unauthorized movement and/or orientation of housing 2830 (e.g., subjecting housing 2830 to an acceleration in one or more axes above a particular threshold, placing housing 2830 in a particular orientation, etc.). As yet another example, tampering detection component 2827 may include a sensor capable of detecting some other parameter (e.g., temperature, pressure, humidity, proximity, etc.) associated with a tampering with housing 2830.

In one embodiment, at least one operation may be performed responsive to tampering detection component 2827 detecting a tampering with a housing (e.g., 2830), where tampering detection component 2827 may send a communication to another component performing the at least one operation and/or control the other component to perform the at least one operation. For example, responsive to tampering detection component 2827 detecting a tampering with a housing (e.g., 2830), energy regulation component 2821 may be controlled (e.g., by authentication component 2822, by processor 2825, etc.) to reduce the ability to perform (or to prevent altogether) an energy transfer to and/or from energy storage medium 2810 (e.g., over energy transfer interface 2832). As another example, responsive to tampering detection component 2827 detecting a tampering with a housing (e.g., 2830), energy regulation component 2821 may be controlled (e.g., by authentication component 2822, by processor 2825, etc.) to reduce the ability to move or to prevent movement of vehicle 120 (e.g., by limiting the current, voltage, or another parameter of electricity to motor 2850). As yet another example, responsive to tampering detection component 2827 detecting a tampering with a housing (e.g., 2830), energy regulation component 2821 may be advantageously controlled (e.g., by authentication component 2822, by processor 2825, etc.) to provide a reduced amount of energy (e.g., from energy storage medium 2810) which is insufficient to perform an operation (e.g., moving vehicle 120 using motor 2850, performing an energy transfer between vehicle 120 and an energy transfer system, performing an energy transfer between vehicle 120 and another vehicle, etc.) yet sufficient to enable a component (e.g., a radio or navigation system, an instrument located in a dashboard or other location of vehicle 120, interior lights, exterior lights, hazard lights, any of the components of vehicle 120 depicted in FIG. 2, motor 2850, transmission 2860, braking system 2870, steering wheel 2880, another component of vehicle 120, security component 2840, another security component of vehicle 120, electronics associated with the door locks of vehicle 120, etc.) of vehicle 120 to function.

As another example, responsive to tampering detection component 2827 detecting a tampering with a housing (e.g., 2830), energy regulation component 2821 may be advantageously controlled (e.g., by authentication component 2822, by processor 2825, etc.) to provide a reduced amount of energy (e.g., from energy storage medium 2810) which is insufficient to perform a first operation (e.g., moving vehicle 120 using motor 2850, performing an energy transfer between vehicle 120 and an energy transfer system, performing an energy transfer between vehicle 120 and another vehicle, etc.) yet sufficient to perform a second operation (e.g., retain data stored in a volatile memory of vehicle 120, present a user interface configured to enable input of information associated with an authentication of a user, communicate data with a system external to vehicle 120, communicate a failure of an authentication to a user or another system, present another user interface enabling a user to report that vehicle 120 has been stolen, communicate to another user or another system that vehicle 120 has been stolen, reduce an ability to move vehicle 120 using security component 2840 or another component of vehicle 120, some combination thereof, etc.). As a further example, responsive to tampering detection component 2827 detecting a tampering with a housing (e.g., 2830), a communication may be sent (e.g., using communication component 2823 over energy transfer interface 2832 and/or signal interface 2834) to vehicle movement control component 2844 to reduce (or prevent) the ability to use and/or move the vehicle (e.g., by disabling or otherwise changing a state of energy storage component 226, motor 2850, transmission 2860, braking system 2870, steering wheel 2880, etc.). As another example, responsive to tampering detection component 2827 detecting a tampering with a housing (e.g., 2830), a communication may be sent (e.g., to interface system 550 for presentation in region 1095 of GUI 1000) to alert a user to the tampering with the housing (e.g., 2830). And as yet another example, responsive to tampering detection component 2827 detecting a tampering with a housing (e.g., 2830), tampering detection component 2827 may cause secure data (e.g., stored in memory 2826, another memory of security component 2820, another memory of vehicle 120, a memory of an external system, etc.) to be deleted, erased, corrupted, or otherwise be modified to reduce unauthorized access to the secure information.

In one embodiment, responsive to tampering detection component 2827 detecting a tampering with a housing (e.g., 2830), a communication may be sent (e.g., using communication component 2823 over energy transfer interface 2832 and/or signal interface 2834) to security component 2840 to cause or enable security component 2840 to perform one or more operations. For example, responsive to the communication from tampering detection component 2827, energy regulation component 2841 may be controlled (e.g., by authentication component 2842, by processor 2845, etc.) to reduce an ability to transfer energy (or to prevent altogether an energy transfer) to and/or from a component of vehicle 120 (e.g., over energy transfer interface 2832, over interface 2855, over interface 2865, over interface 2875, over interface 2885, over another interface, etc.). In one embodiment, the energy transferred via energy regulation component 2841 may be insufficient to power motor 2850 to move vehicle 120. In one embodiment, the energy transferred via energy regulation component 2841 may be insufficient to perform an energy transfer with another system (e.g., energy transfer system 110, another vehicle, etc.). In one embodiment, the energy transferred via energy regulation component 2841 may be sufficient to power another component of vehicle 120 (e.g., a radio or navigation system, dashboard, lights, any of the components of vehicle 120 depicted in FIG. 2, transmission 2860, braking system 2870, steering wheel 2880, another component of vehicle 120, etc.).

As another example, responsive to tampering detection component 2827 detecting a tampering with a housing (e.g., 2830), a communication may be sent (e.g., using communication component 2823 over energy transfer interface 2832 and/or signal interface 2834) to security component 2840 to advantageously control (e.g., using authentication component 2842, using processor 2845, etc.) energy regulation component 2841 to reduce the ability to move or to prevent movement of vehicle 120 (e.g., by limiting the current, voltage, or another parameter of electricity to motor 2850). As yet another example, responsive to tampering detection component 2827 detecting a tampering with a housing (e.g., 2830) and sending a communication to security component 2840, energy regulation component 2841 may be advantageously controlled (e.g., by authentication component 2842, by processor 2845, etc.) to provide a reduced amount of energy (e.g., from energy storage medium 2810) which is insufficient to perform an operation (e.g., moving vehicle 120 using motor 2850, performing an energy transfer between vehicle 120 and an energy transfer system, performing an energy transfer between vehicle 120 and another vehicle, etc.) yet sufficient to enable a component (e.g., a radio or navigation system, an instrument located in a dashboard or other location of vehicle 120, interior lights, exterior lights, hazard lights, any of the components of vehicle 120 depicted in FIG. 2, motor 2850, transmission 2860, braking system 2870, steering wheel 2880, another component of vehicle 120, security component 2820, another security component of vehicle 120, electronics associated with the door locks of vehicle 120, etc.) of vehicle 120 to function.

As a further example, responsive to tampering detection component 2827 detecting a tampering with a housing (e.g., 2830), a communication may be sent (e.g., using communication component 2823 over energy transfer interface 2832 and/or signal interface 2834) to security component 2840 to advantageously control (e.g., using authentication component 2842, using processor 2845, etc.) energy regulation component 2841 to provide a reduced amount of energy (e.g., from energy storage medium 2810) which is insufficient to perform a first operation (e.g., moving vehicle 120 using motor 2850, performing an energy transfer between vehicle 120 and an energy transfer system, performing an energy transfer between vehicle 120 and another vehicle, etc.) yet sufficient to perform a second operation (e.g., retain data stored in a volatile memory of vehicle 120, present a user interface configured to enable input of information associated with an authentication of a user, communicate data with a system external to vehicle 120, communicate a failure of an authentication to a user or another system, present another user interface enabling a user to report that vehicle 120 has been stolen, communicate to another user or another system that vehicle 120 has been stolen, reduce an ability to move vehicle 120 using vehicle movement control component 2844 or another component of vehicle 120, some combination thereof, etc.).

As shown in FIG. 28, communication component 2823 may be used to communicate with another component of vehicle 120 and/or an external system (e.g., energy transfer system 110, computer system 2890, another system located remotely from vehicle 120, etc.). For example, communication component 2823 may be used to transmit and/or receive communications from security component 2840 (e.g., over signal interface 2834, energy transfer interface 2832, etc.). As another example, communication component 2823 may be used to transmit and/or receive communications from another component of vehicle 120 (e.g., interface component 221, communication interface 241, power management component 225, motor 2850, transmission 2860, braking system 2870, steering wheel 2880, etc.). And as yet another example, communication component 2823 may be used to transmit and/or receive communications from an external system (e.g., directly, via communication interface 242, via another component of vehicle 120, etc.).

In one embodiment, communication component 2823 may communicate over a wired interface (e.g., including one or more conductors, lines, lanes, etc.) and/or a wireless interface (e.g., using radio waves, microwaves, infrared waves, visible light waves, ultraviolet waves, x-rays, gamma rays, etc.). For example, communication component 2823 may communicate over an interface which operates in accordance with a wireless standard such as 802.11x, Bluetooth, etc. As another example, communication component 2823 may communicate over a cellular network (e.g., cellular data network, cellular phone network, etc.).

In one embodiment, a signal (e.g., a data signal, a clock signal, etc.) may be communicated over energy transfer interface 2832 using modulation and/or demodulation. For example, communication component 2823 may transmit a signal over energy transfer interface 2832 using modulation (e.g., amplitude modulation, frequency modulation, phase modulation, some combination thereof, etc.), where the energy transfer signal functions as the carrier wave. Upon receipt of the energy transfer signal, the signals (e.g., data signals, clock signals, etc.) carried by the energy transfer signal may be demodulated (e.g., using amplitude demodulation, frequency demodulation, phase demodulation, some combination thereof, etc.) by another component (e.g., communication component 2843, another component of vehicle 120, a component of an external system accessing the energy transfer signal, etc.). As another example, communication component 2823 may demodulate (e.g., using amplitude demodulation, frequency demodulation, phase demodulation, some combination thereof, etc.) a signal from an energy transfer signal carried by energy transfer interface 2832, where the signal may be modulated (e.g., using amplitude modulation, frequency modulation, phase modulation, some combination thereof, etc.) by another component (e.g., communication component 2843, another component of vehicle 120, a component of an external system accessing the energy transfer signal, etc.).

In one embodiment, a signal (e.g., data signals, clock signals, etc.) may be communicated over energy transfer interface 2832 using an electromagnetic field surrounding at least one conductor of the energy transfer interface. For example, communication component 2823 may alter (e.g., change the strength or amplitude over time of) an electromagnetic field surrounding at least one conductor of energy transfer interface 2832 to transmit the signals (e.g., data signals, clock signals, etc.) over the energy transfer interface. A component receiving the signals (e.g., communication component 2843, another component of vehicle 120, a component of an external system accessing the energy transfer signal, etc.) may detect the changes in the electromagnetic field and recreate the signals (e.g., data signals, clock signals, etc.) based on the changes in the electromagnetic field. As another example, where another component (e.g., communication component 2843, another component of vehicle 120, a component of an external system accessing the energy transfer signal, etc.) alters (e.g., changes the strength or amplitude over time of) an electromagnetic field surrounding at least one conductor of energy transfer interface 2832 to transmit signals (e.g., data signals, clock signals, etc.) over the energy transfer interface, communication component 2823 may detect the changes in the electromagnetic field and recreate the signals (e.g., data signals, clock signals, etc.) based on the changes in the electromagnetic field.

In one embodiment, energy transfer interface 2832 may be coupled to or part of a power system (e.g., a 12 volt power system of an automobile, etc.) of vehicle 120. A plurality of components of vehicle 120 may be coupled to and powered by the power system. In this manner, the number of interfaces required to support security component 2820 (e.g., communication interfaces enabling security component 2820 to communicate with security component 2840, another component of vehicle 120, an external system, etc.) may be reduced, thereby reducing the difficulty and/or cost of retrofitting vehicle 120 to include security component 2820 (e.g., since the existing power system can be used for communication in lieu of separate communication interfaces installed during the retrofit).

In one embodiment, signals (e.g., data signals, clock signals, etc.) communicated to and/or from security component 2820 may be encrypted. For example, a component of security component 2820 (e.g., authentication component 2822, communication component 2823, processor 2825, tampering detection component 2827, etc.) may encrypt a signal for decryption by a receiver of the communication (e.g., a component of security component 2840, communication interface 242, another component of vehicle 120, a component of an external system, etc.). As another example, a sender of a communication (e.g., a component of security component 2840, communication interface 242, another component of vehicle 120, a component of an external system, etc.) may encrypt a signal for decryption by a component of security component 2820 (e.g., authentication component 2822, communication component 2823, processor 2825, tampering detection component 2827, etc.).

In one embodiment, communication component 2823 may communicate via energy transfer interface 2832 using analog signals, digital signals, pulse width modulated signals, some combination thereof, etc. Communication component 2823 may communicate via energy transfer interface 2832 using unidirectional signal communication and/or bidirectional signal communication. In one embodiment, communication component 2823 may communicate via energy transfer interface 2832 using single-ended signaling and/or differential signaling.

In one embodiment, communication component 2823 may communicate via signal interface 2834 using analog signals, digital signals, pulse width modulated signals, some combination thereof, etc. Communication component 2823 may communicate via signal interface 2834 using unidirectional signal communication and/or bidirectional signal communication. In one embodiment, communication component 2823 may communicate via signal interface 2834 using single-ended signaling and/or differential signaling.

As shown in FIG. 28, monitoring component 2829 and/or heat transfer component 2818 may be used to implement a control system for controlling the temperature of energy storage medium 2810 or another component of energy storage component 226 (e.g., in accordance with process 3800 of FIG. 38). For example, heat transfer component 2818 may be controlled by temperature regulation component 2828 to transfer heat to and/or remove heat from energy storage medium 2810. Temperature regulation component 2828 may determine a temperature of energy storage medium 2810 based on a signal accessed from monitoring component 2829. As such, in one embodiment, temperature regulation component 2828 may control heat transfer component 2818 based on a temperature of energy storage medium 2810 (e.g., measured using monitoring component 2829) to regulate or otherwise adjust the temperature of energy storage medium 2810.

In one embodiment, temperature regulation component 2828 may be used to maintain energy storage medium 2810 at a particular temperature or range of temperatures. The temperature or range of temperatures may be determined based upon an attribute (e.g., an energy transfer type, an interface type, a power, a current, a voltage, an energy transfer profile, a duration, a waveform, a temperature, etc.) of an energy transfer (e.g., to and/or from energy storage medium 2810, over interface 2817, etc.) in one embodiment. The temperature or range of temperatures may be determined based upon an ambient temperature outside vehicle 120, a speed of vehicle 120, an operational mode of vehicle 120 selected by a user, a distance which vehicle 120 is to be driven (e.g., selected by a user, automatically selected, etc.), some combination thereof, etc. And in one embodiment, the temperature or range of temperatures may be determined based upon an amount of time since the last movement of vehicle 120, an amount of time since a power state (e.g., on, off, powered, depowered, activated, deactivated, high power, low power, etc.) of vehicle 120 (or a component thereof) has been changed, some combination thereof, etc.

As shown in FIG. 28, heat transfer component 2818 may be any component capable of transferring heat to and/or from energy storage medium 2810 via conduction, convection, radiation, or some combination thereof. In one embodiment, heat transfer component 2818 may be a thermoelectric cooler or Peltier cooler, a heat exchanger configured to remove heat from energy storage medium 2810 responsive to a pumping of a fluid through heat transfer component 2818, a heat pipe configured to remove heat from an energy storage medium 2810, etc. Heat transfer component 2818 may be coupled with or disposed in proximity to energy storage medium 2810 in one embodiment. In one embodiment, signals provided to heat transfer component 2818 (e.g., from temperature regulation component 2828, used to control heat transfer component 2818, etc.) may be analog signals, digital signals, pulse width modulated signals, some combination thereof, etc. And in one embodiment, heat transfer component 2818 may be implemented in accordance with (e.g., include components of, function similarly to, etc.) component 2464 and/or component 2465.

In one embodiment, heat transfer component 2818 may be configured to convert heat generated by an energy storage medium (e.g., 2810) into electrical energy. For example, heat transfer component 2818 may be a thermoelectric cooler or other component capable of generating electricity responsive to a temperature differential being applied across a first side and a second side of heat transfer component 2818. Heat transfer component 2818 may be advantageously positioned with respect to an energy storage medium (e.g., 2810) to create a temperature differential across a first side (e.g., positioned adjacent to energy storage medium 2810) and a second side (e.g., positioned to adjacent to ambient air, housing 2830, another component of energy storage component 226, etc.) of heat transfer component 2818, where the first side may be warmer than the second side in one embodiment. Energy generated by heat transfer component 2818 may be transferred over an interface (e.g., 2817) to a component of a vehicle (e.g., interface component 221, power management component 225, energy regulation component 2821, energy storage medium 2810, etc.), thereby enabling the energy to be accessed (e.g., for use, storage, etc.) by the vehicle and/or transferred to another system (e.g., energy transfer system 110, another vehicle, etc.). In one embodiment, energy generated by heat transfer component 2818 may be transferred over an interface (e.g., lines 2817) contemporaneously with energy transferred to and/or from energy storage medium 2810 (e.g., by summing the voltages, summing the currents, etc.). In this manner, electricity may be advantageously generated using heat transfer component 2818 to improve the efficiency of an energy transfer to and/or from energy storage medium 2810, recover energy that would otherwise be lost, etc.

As shown in FIG. 28, monitoring component 2829 may be any component capable of monitoring or sensing a temperature of energy storage medium 2810. In one embodiment, monitoring component 2829 may be or include a thermocouple, thermistor, ultrasonic thermometer, infrared thermometer or pyrometer, laser thermometer or pyrometer, etc. Monitoring component 2829 may be mounted on a printed circuit board or other substrate to which at least one other component of security component 2820 is mounted. Alternatively, monitoring component 2829 may be coupled with a printed circuit board or at least one other component of security component 2820 by a cable, interface, line, etc. In one embodiment, monitoring component 2829 may be coupled with or disposed in proximity to energy storage medium 2810. Signals corresponding to a temperature of energy storage medium 2810 which are output by monitoring component 2829 may be analog signals, digital signals, pulse width modulated signals, some combination thereof, etc. And in one embodiment, monitoring component 2829 may be implemented in accordance with (e.g., include components of, function similarly to, etc.) component 2462 and/or component 2463.

In one embodiment, energy regulation component 2821 may limit or otherwise adjust an amount of energy transferred to and/or from energy storage medium 2810 responsive to a temperature of energy storage medium 2810 (e.g., measured using monitoring component 2829) and/or a control signal from temperature regulation component 2828. For example, if the temperature of energy storage medium 2810 reaches or exceeds a particular threshold, energy regulation component 2821 may reduce an amount of energy transferred to and/or from energy storage medium 2810 (e.g., until the temperature of energy storage medium 2810 falls below the particular threshold or another threshold). As another example, if temperature regulation component 2828 is no longer able to maintain the temperature of energy storage medium 2810 at a particular temperature or range of temperatures using heat transfer component 2818, energy regulation component 2821 may adjust (e.g., under control of or via input from temperature regulation component 2828) an amount of energy transferred to and/or from energy storage medium 2810 (e.g., until temperature regulation component 2828 is able to regain control of and/or maintain the temperature of energy storage medium 2810 at a particular temperature or range of temperatures using heat transfer component 2818).

In one embodiment, signals associated with temperature (e.g., of energy storage medium 2810, another component of vehicle 120, a component of an external system, the ambient air, etc.) may be communicated by security component 2820 to another component. For example, signals associated with temperature may be communicated by security component 2820 to another component of vehicle 120 (e.g., security component 2840, interface component 221, power management component 225, power source 227, another component of vehicle 120, etc.). And as another example, signals associated with temperature may be communicated by security component 2820 to an external system (e.g., energy transfer system 110, computer system 2890, another vehicle, etc.).

In one embodiment, signals associated with a parameter of one component may be communicated by security component 2820 to another component. For example, security component 2820 may communicate a parameter of motor 2850, where the parameter of motor 2850 may be a voltage, a current, a rotational speed or acceleration, a temperature, an operational status (e.g., enabled or activated, disabled or deactivated), etc. As another example, security component 2820 may communicate a parameter of transmission 2860, where the parameter of transmission 2860 may be a speed of vehicle 120 (e.g., from a vehicle speed sensor coupled with transmission 2860), a currently selected gear, a rotational speed or acceleration of a component of transmission 2860, the state of one or more clutches of transmission 2860, a temperature, an operational status (e.g., enabled or activated, disabled or deactivated), etc. As a further example, security component 2820 may communicate a parameter of braking system 2870, where the parameter of braking system 2870 may be a position or state of a brake pad or caliper, a position or state of a brake shoe or drum, a status or reading from a sensor (e.g., anti-lock braking system sensor, active handling system sensor, stability management system sensor, etc.) associated with braking system 2870, a temperature, an operational status (e.g., enabled or activated, disabled or deactivated), etc. And as yet another example, security component 2820 may communicate a parameter of steering wheel 2880, where the parameter of steering wheel 2880 may be a position of steering wheel 2880, the state of a switch (e.g., for controlling a radio or navigation system, for controlling a Bluetooth speakerphone system, for controlling a cruise control system, etc.) of steering wheel 2880, a rotational speed or acceleration, an operational status (e.g., enabled or activated, disabled or deactivated), etc. And as yet a further example, security component 2820 may communicate a parameter of another component (e.g., a tire pressure monitoring component, an engine management system, security component 2840, an energy transfer component, interface component 221, power management component 225, energy storage component 226, power source 227, charge and/or discharge component 228, meter 229, another component of vehicle 120, etc.).

Operations performed by security component 2820 may be performed using one or more components of security component 2820. For example, authentication (e.g., of a component, of a user, etc.) may be performed using authentication component 2822 and/or processor 2825, where instructions or code used to carry out the authentication may be stored in memory 2826 for execution by authentication component 2822 and/or processor 2825. As another example, one or more operations performed responsive to a successful authentication (e.g., controlling energy regulation component 2821, controlling energy regulation component 2841, controlling vehicle movement control component 2844, sending a communication between security component 2820 and security component 2840, etc.) may be performed using at least one component (e.g., authentication component 2822, communication component 2823, some combination thereof, etc.) and/or processor 2825, where instructions or code used to carry out the one or more operations may be stored in memory 2826 for execution by the at least one component (e.g., authentication component 2822, communication component 2823, some combination thereof, etc.) and/or processor 2825. As yet another example, one or more operations performed responsive to an unsuccessful authentication (e.g., controlling energy regulation component 2821, controlling energy regulation component 2841, controlling vehicle movement control component 2844, sending a communication between security component 2820 and security component 2840, sending a communication to a user, etc.) may be performed using at least one component (e.g., authentication component 2822, communication component 2823, some combination thereof, etc.) and/or processor 2825, where instructions or code used to carry out the one or more operations may be stored in memory 2826 for execution by the at least one component (e.g., authentication component 2822, communication component 2823, some combination thereof, etc.) and/or processor 2825.

As another example, one or more operations performed responsive to detecting a tampering with housing 2830 (e.g., controlling energy regulation component 2821, controlling energy regulation component 2841, sending a communication to vehicle movement control component 2844, sending a communication to a user, etc.) may be performed using at least one component (e.g., tampering detection component 2827, authentication component 2822, communication component 2823, some combination thereof, etc.) and/or processor 2825, where instructions or code used to carry out the one or more operations may be stored in memory 2826 for execution by the at least one component (e.g., tampering detection component 2827, authentication component 2822, communication component 2823, some combination thereof, etc.) and/or processor 2825. As a further example, communication with another component, device, system, etc. may be performed using at least one component (e.g., communication component 2823, authentication component 2822, tampering detection component 2827, some combination thereof, etc.) and/or processor 2825, where instructions or code used to carry out the communication may be stored in memory 2826 for execution by the at least one component (e.g., communication component 2823, authentication component 2822, tampering detection component 2827, some combination thereof, etc.) and/or processor 2825. And as yet another example, temperature regulation of energy storage medium 2810 may be performed using at least one component (e.g., temperature regulation component 2828, monitoring component 2829, some combination thereof, etc.) and/or processor 2825, where instructions or code used to carry out the temperature regulation may be stored in memory 2826 for execution by the at least one component (e.g., temperature regulation component 2828, monitoring component 2829, some combination thereof, etc.) and/or processor 2825.

In one embodiment, security component 2820 may include a plurality of integrated circuits (e.g., at least one application-specific integrated circuit (ASIC), at least one system-on-a-chip (SOC), at least one programmable system-on-a-chip (PSOC), another type of integrated circuit, etc.) attached to a plurality of printed circuit boards. Security component 2820 may include at least one integrated circuit (e.g., at least one application-specific integrated circuit (ASIC), at least one system-on-a-chip (SOC), at least one programmable system-on-a-chip (PSOC), another type of integrated circuit, etc.) attached to a single printed circuit board in one embodiment. In one embodiment, security component 2820 may be implemented by a single integrated circuit (e.g., an application-specific integrated circuit (ASIC), a system on a chip (SOC), programmable system on a chip (PSOC), etc.). And in one embodiment, components of security component 2820 may be implemented using a single die of an integrated circuit, more than one die of an integrated circuit, etc.

As shown in FIG. 28, security component 2840 may be used to perform an authentication of another component in one embodiment. For example, authentication component 2842 may be used to perform an authentication of a component (e.g., authentication component 2822, interface component 221, power management component 225, power source 227, another component of vehicle 120, a component of energy transfer system 110, a component of an external system or external device, etc.) responsive to an interaction with the vehicle (e.g., an attempt to gain access to a compartment or region of the vehicle, an attempt to start the vehicle, an attempt to use or move the vehicle, an attempt to turn on a radio or other component of the vehicle, an attempt to transfer energy to and/or from an energy storage component, an attempt to transfer energy to and/or from another component of the vehicle, some combination thereof, etc.). In one embodiment, the interaction with the vehicle may be an attempt to transfer energy to a component of vehicle 120 (e.g., motor 2850, transmission 2860, braking system 2870, steering wheel 2880, some other component of vehicle 120, etc.), where the attempt to transfer energy to a component of vehicle 120 may be performed by the component undergoing authentication, a device which includes the component undergoing authentication, a system which includes the component undergoing authentication, or some combination thereof. The authentication may be performed using authentication component 2842 alone or in combination with processor 2845, where instructions or code used to carry out the authentication may be stored in memory 2846 for execution by authentication component 2842 and/or processor 2845. Accordingly, in one embodiment, security component 2840 may reduce unauthorized use of vehicle 120 (e.g., by reducing the ability to use an unauthorized device or system to power, move, or otherwise use vehicle 120).

In one embodiment, security component 2840 may be used to perform one or more operations if an authentication is successful. For example, if the authentication is successful, then energy regulation component 2841 may be controlled (e.g., by authentication component 2842, by processor 2845, etc.) to enable energy to be transferred to and/or from a component of vehicle 120 (e.g., over energy transfer interface 2832, over interface 2855, over interface 2865, over interface 2875, over interface 2885, over another interface, etc.). In one embodiment, the energy transferred via energy regulation component 2841 may be sufficient to power motor 2850 to move vehicle 120. In one embodiment, the energy transferred via energy regulation component 2841 may be sufficient to power another component of vehicle 120 (e.g., a radio or navigation system, dashboard, lights, any of the components of vehicle 120 depicted in FIG. 2, transmission 2860, braking system 2870, steering wheel 2880, another component of vehicle 120, etc.) and/or perform an energy transfer with another system (e.g., energy transfer system 110, another vehicle, etc.). As another example, if the authentication is successful, then vehicle movement control component 2844 may be controlled to enable use and/or movement of the vehicle (e.g., by activating energy storage component 226, motor 2850, transmission 2860, braking system 2870, steering wheel 2880, etc.).

In one embodiment, vehicle movement control component 2844 may enable or activate a component (e.g., energy storage component 226, motor 2850, transmission 2860, braking system 2870, steering wheel 2880, etc.) by causing a mechanical stop to be removed or disabled, where the state of the mechanical stop may be changed using a solenoid, stepper motor, or some other component. The mechanical stop may control (e.g., enable, disable, etc.) movement of: portions of motor 2850 (e.g., a rotor and a stator, an inner portion and an outer portion, etc.) with respect to one another; portions of transmission 2860 (e.g., an input shaft and an output shaft, an input shaft and a housing, an output shaft and a housing, one gear and another gear, a shift fork and a housing, a gear shift lever and a housing, etc.) with respect to one another; portions of braking system 2860 (e.g., a piston and a caliper, a brake pad and a caliper, a brake shoe and a drum, etc.) with respect to one another; steering wheel 2880; or some combination thereof. In one embodiment, vehicle movement control component 2844 may enable or activate a component (e.g., energy storage component 226, motor 2850, transmission 2860, braking system 2870, steering wheel 2880, etc.) by changing the state of a clutch or other mechanism capable of engaging and/or disengaging motor 2850 and transmission 2860, at least two portions of transmission 2860, transmission 2860 and at least one wheel, at least two portions of braking system 2870 (e.g., which move a brake pad with respect to a rotor, a brake shoe with respect to a drum, etc.), steering wheel 2880 and a steering column, etc.

In one embodiment, vehicle movement control component 2844 may enable or activate a component (e.g., energy storage component 226, motor 2850, transmission 2860, braking system 2870, steering wheel 2880, etc.) by sending a signal (e.g., analog signal, digital signal, pulse width modulated signal, clock signal, data signal, some combination thereof, etc.) to another component which is configured to control a state (e.g., enabled, activated, disabled, deactivated, etc.) of the component, where the other component may include hardware (e.g., circuitry, etc.) and/or software. In one embodiment, the other component may be disposed within a housing of or otherwise be part of the component.

In one embodiment, vehicle movement control component 2844 may override an attempt (e.g., by a user, by a component of vehicle 120, by another system or device, etc.) to set or change a state of a component (e.g., energy storage component 226, motor 2850, transmission 2860, braking system 2870, steering wheel 2880, etc.) of vehicle 120. For example, vehicle movement control component 2844 may disable or deactivate motor 2850 (e.g., thereby reducing the ability of motor 2850 to move vehicle 120) even though energy is transferred to motor 2850 using energy regulation component 2841.

And as yet another example, if the authentication is successful, then a communication may be sent (e.g., using communication component 2843 over energy transfer interface 2832 and/or signal interface 2834) to security component 2820 to control (e.g., using authentication component 2822, using processor 2825, etc.) energy regulation component 2821 to enable energy to be transferred to and/or from energy storage medium 2810 (e.g., over energy transfer interface 2832). In one embodiment, energy transferred to energy storage medium 2810 via energy regulation component 2821 may be sufficient to charge energy storage medium. In one embodiment, energy transferred from energy storage medium 2810 (e.g., over energy transfer interface 2832) via energy regulation component 2821 may be sufficient to power another component of vehicle 120 (e.g., a radio or navigation system, dashboard, lights, any of the components of vehicle 120 depicted in FIG. 2, motor 2850, transmission 2860, braking system 2870, steering wheel 2880, another component of vehicle 120, etc.) and/or perform an energy transfer with another system (e.g., energy transfer system 110, another vehicle, etc.).

In one embodiment, security component 2840 may be used to perform one or more operations if an authentication is unsuccessful. For example, if the authentication is unsuccessful, then energy regulation component 2841 may be controlled (e.g., by authentication component 2842, by processor 2845, etc.) to reduce an ability to transfer energy (or to prevent altogether an energy transfer) to and/or from a component of vehicle 120 (e.g., over energy transfer interface 2832, over interface 2855, over interface 2865, over interface 2875, over interface 2885, over another interface, etc.). In one embodiment, the energy transferred via energy regulation component 2841 may be insufficient to power motor 2850 to move vehicle 120. In one embodiment, the energy transferred via energy regulation component 2841 may be insufficient to perform an energy transfer with another system (e.g., energy transfer system 110, another vehicle, etc.). And in one embodiment, if the authentication is unsuccessful, the energy transferred via energy regulation component 2841 may be sufficient to power another component of vehicle 120 (e.g., a radio or navigation system, dashboard, lights, any of the components of vehicle 120 depicted in FIG. 2, transmission 2860, braking system 2870, steering wheel 2880, another component of vehicle 120, etc.).

As another example, if the authentication is unsuccessful, energy regulation component 2841 may be controlled (e.g., by authentication component 2842, by processor 2845, etc.) to reduce the ability to move or to prevent movement of vehicle 120 (e.g., by limiting the current, voltage, or another parameter of electricity to motor 2850). As yet another example, if the authentication is unsuccessful, energy regulation component 2841 may be advantageously controlled (e.g., by authentication component 2842, by processor 2845, etc.) to provide a reduced amount of energy (e.g., from energy storage medium 2810) which is insufficient to perform an operation (e.g., moving vehicle 120 using motor 2850, performing an energy transfer between vehicle 120 and an energy transfer system, performing an energy transfer between vehicle 120 and another vehicle, etc.) yet sufficient to enable a component (e.g., a radio or navigation system, an instrument located in a dashboard or other location of vehicle 120, interior lights, exterior lights, hazard lights, any of the components of vehicle 120 depicted in FIG. 2, motor 2850, transmission 2860, braking system 2870, steering wheel 2880, another component of vehicle 120, security component 2820, another security component of vehicle 120, electronics associated with the door locks of vehicle 120, etc.) of vehicle 120 to function.

As a further example, if the authentication is unsuccessful, energy regulation component 2841 may be advantageously controlled (e.g., by authentication component 2842, by processor 2845, etc.) to provide a reduced amount of energy (e.g., from energy storage medium 2810) which is insufficient to perform a first operation (e.g., moving vehicle 120 using motor 2850, performing an energy transfer between vehicle 120 and an energy transfer system, performing an energy transfer between vehicle 120 and another vehicle, etc.) yet sufficient to perform a second operation (e.g., retain data stored in a volatile memory of vehicle 120, present a user interface configured to enable input of information associated with an authentication of a user, communicate data with a system external to vehicle 120, communicate a failure of an authentication to a user or another system, present another user interface enabling a user to report that vehicle 120 has been stolen, communicate to another user or another system that vehicle 120 has been stolen, reduce an ability to move vehicle 120 using vehicle movement control component 2844 or another component of vehicle 120, some combination thereof, etc.). As another example, if the authentication is unsuccessful, then vehicle movement control component 2844 may be controlled to reduce unauthorized use and/or movement of the vehicle (e.g., by disabling or deactivating energy storage component 226, motor 2850, transmission 2860, braking system 2870, steering wheel 2880, etc.). As yet another example, if the authentication is unsuccessful, a communication may be sent (e.g., to interface system 550 for presentation in region 1095 of GUI 1000) to alert a user that the authentication was unsuccessful.

In one embodiment, vehicle movement control component 2844 may disable or deactivate a component (e.g., energy storage component 226, motor 2850, transmission 2860, braking system 2870, steering wheel 2880, etc.) by causing a mechanical stop to be activated or applied, where the state of the mechanical stop may be changed using a solenoid, stepper motor, or some other component. The mechanical stop may control (e.g., enable, disable, etc.) movement of: portions of motor 2850 (e.g., a rotor and a stator, an inner portion and an outer portion, etc.) with respect to one another; portions of transmission 2860 (e.g., an input shaft and an output shaft, an input shaft and a housing, an output shaft and a housing, one gear and another gear, a shift fork and a housing, a gear shift lever and a housing, etc.) with respect to one another; portions of braking system 2860 (e.g., a piston and a caliper, a brake pad and a caliper, a brake shoe and a drum, etc.) with respect to one another; steering wheel 2880; or some combination thereof. In one embodiment, vehicle movement control component 2844 may disable or deactivate a component (e.g., energy storage component 226, motor 2850, transmission 2860, braking system 2870, steering wheel 2880, etc.) by changing the state of a clutch or other mechanism capable of engaging and/or disengaging motor 2850 and transmission 2860, at least two portions of transmission 2860, transmission 2860 and at least one wheel, at least two portions of braking system 2870 (e.g., which move a brake pad with respect to a rotor, a brake shoe with respect to a drum, etc.), steering wheel 2880 and a steering column, etc.

In one embodiment, vehicle movement control component 2844 may disable or deactivate a component (e.g., energy storage component 226, motor 2850, transmission 2860, braking system 2870, steering wheel 2880, etc.) by sending a signal (e.g., analog signal, digital signal, pulse width modulated signal, clock signal, data signal, some combination thereof, etc.) to another component which is configured to control a state (e.g., enabled, activated, disabled, deactivated, etc.) of the component, where the other component may include hardware (e.g., circuitry, etc.) and/or software. In one embodiment, the other component may be disposed within a housing of or otherwise be part of the component.

In one embodiment, vehicle movement control component 2844 may override an attempt (e.g., by a user, by a component of vehicle 120, by another system or device, etc.) to set or change a state of a component (e.g., energy storage component 226, motor 2850, transmission 2860, braking system 2870, steering wheel 2880, etc.) of vehicle 120. For example, vehicle movement control component 2844 may disable or deactivate motor 2850 (e.g., thereby reducing the ability of motor 2850 to move vehicle 120) even though energy is transferred to motor 2850 using energy regulation component 2841.

In one embodiment, if the authentication performed using security component 2840 is unsuccessful, then a communication may be sent (e.g., using communication component 2843 over energy transfer interface 2832 and/or signal interface 2834) to security component 2820 to cause or enable security component 2820 to perform one or more operations. For example, responsive to a communication from security component 2840 associated with an unsuccessful authentication, energy regulation component 2821 may be controlled (e.g., by authentication component 2822, by processor 2825, etc.) to reduce the ability to perform (or to prevent altogether) an energy transfer to and/or from energy storage medium 2810 (e.g., over energy transfer interface 2832). As another example, responsive to a communication from security component 2840, energy regulation component 2821 may be controlled (e.g., by authentication component 2822, by processor 2825, etc.) to reduce the ability to move or to prevent movement of vehicle 120 (e.g., by limiting the current, voltage, or another parameter of electricity to motor 2850).

As yet another example, if the authentication performed using security component 2840 is unsuccessful, a communication may be sent (e.g., using communication component 2843 over energy transfer interface 2832 and/or signal interface 2834) to security component 2820 to advantageously control (e.g., using authentication component 2822, using processor 2825, etc.) energy regulation component 2821 to provide a reduced amount of energy (e.g., from energy storage medium 2810) which is insufficient to perform an operation (e.g., moving vehicle 120 using motor 2850, performing an energy transfer between vehicle 120 and an energy transfer system, performing an energy transfer between vehicle 120 and another vehicle, etc.) yet sufficient to enable a component (e.g., a radio or navigation system, an instrument located in a dashboard or other location of vehicle 120, interior lights, exterior lights, hazard lights, any of the components of vehicle 120 depicted in FIG. 2, motor 2850, transmission 2860, braking system 2870, steering wheel 2880, another component of vehicle 120, security component 2840, another security component of vehicle 120, electronics associated with the door locks of vehicle 120, etc.) of vehicle 120 to function. As another example, responsive to a communication from security component 2840 associated with an unsuccessful authentication, energy regulation component 2821 may be advantageously controlled (e.g., by authentication component 2822, by processor 2825, etc.) to provide a reduced amount of energy (e.g., from energy storage medium 2810) which is insufficient to perform a first operation (e.g., moving vehicle 120 using motor 2850, performing an energy transfer between vehicle 120 and an energy transfer system, performing an energy transfer between vehicle 120 and another vehicle, etc.) yet sufficient to perform a second operation (e.g., retain data stored in a volatile memory of vehicle 120, present a user interface configured to enable input of information associated with an authentication of a user, communicate data with a system external to vehicle 120, communicate a failure of an authentication to a user or another system, present another user interface enabling a user to report that vehicle 120 has been stolen, communicate to another user or another system that vehicle 120 has been stolen, reduce an ability to move vehicle 120 using security component 2840 or another component of vehicle 120, some combination thereof, etc.).

In one embodiment, authentication component 2842 may perform an authentication of a component (e.g., authentication component 2822, interface component 221, power management component 225, power source 227, another component of vehicle 120, etc.) by comparing an identifier (e.g., generated and/or sent from the component undergoing authentication) to authentication data (e.g., stored in memory 2846, a register of processor 2845, another portion of security component 2840, etc.). In one embodiment, the identifier may be a unique identifier which is associated with only the component undergoing authentication and does not correspond to or otherwise identify any other component. In one embodiment, the identifier may be a unique identifier which is associated with only vehicle 120 and does not correspond to or otherwise identify any other vehicle. In one embodiment, the identifier may be a key (e.g., public key, private key, etc.), data encrypted or encoded by a component performing the authentication or by another trusted party, etc. In one embodiment, the identifier may be sent from the component undergoing authentication responsive to a request for identification sent from authentication component 2842. In one embodiment, communications between security component 2840 and the component undergoing authentication may be encrypted (e.g., by the sender) and/or decrypted (e.g., by the recipient).

In one embodiment, the authentication may be successful (e.g., the component undergoing authentication is determined to be authorized) if the identifier associated with the component undergoing authentication matches the authentication data (e.g., stored in memory 2846, stored in a register of processor 2845, stored in another portion of security component 2840, etc.). Alternatively, the authentication may be unsuccessful (e.g., the component undergoing authentication is determined not to be authorized) if the identifier associated with the component undergoing authentication does not match the authentication data (e.g., the component undergoing authentication is determined to be authorized) if the identifier associated with the component undergoing authentication matches the authentication data (e.g., stored in memory 2846, stored in a register of processor 2845, stored in another portion of security component 2840, etc.).

In one embodiment, computer system 2890 may perform an authentication of a component (e.g., security component 2820, authentication component 2822, energy storage component 226, interface component 221, power management component 225, power source 227, another component of vehicle 120, etc.) by comparing an identifier (e.g., generated and/or sent from the component undergoing authentication) to authentication data. For example, where the authentication data is stored in security component 2840 (e.g., stored in memory 2846, a register of processor 2845, another portion of security component 2840, etc.), the identifier and the authentication data may be sent (e.g., separately, together, sequentially, simultaneously, etc.) to computer system 2890 via communication interface 242 for comparison by computer system 2890.

As another example, where computer system 2890 includes or can otherwise access the authentication data (e.g., 2895), the identifier may be sent to computer system 2890 via communication interface 242 for comparison with authentication data 2895 by computer system 2890. Authentication data 2895 may be part of a data structure or database which includes an index of components (e.g., including security component 2840, a component which includes security component 2840, motor 2850, transmission 2860 braking system 2870, steering wheel 2880, some combination thereof, etc.) and respective authentication data corresponding to each of the components, where the data structure or database may be indexed using an identifier of a component (e.g., security component 2840, a component which includes security component 2840, motor 2850, transmission 2860 braking system 2870, steering wheel 2880, some combination thereof, etc.) to access authentication data for comparison to the identifier of the component undergoing authentication. In one embodiment, the identifier of the other component (e.g., security component 2840, a component which includes security component 2840, motor 2850, transmission 2860 braking system 2870, steering wheel 2880, some combination thereof, etc.) may be sent to computer system 2890 along with (e.g., simultaneously with, contemporaneously with, as part of the same data packet, etc.) or separate from (e.g., sequentially with, at another time than, in a different data packet, etc.) the identifier of the component undergoing authentication.

In one embodiment, the identifier of the component undergoing authentication may be sent (e.g., to computer system 2890) from the component undergoing authentication responsive to a request for identification sent from authentication component 2842. In one embodiment, the identifier sent to computer system 2890 may be a unique identifier which is associated with only the component undergoing authentication and does not correspond to or otherwise identify any other component. In one embodiment, the identifier may be a key (e.g., public key, private key, etc.), data encrypted or encoded by a component performing the authentication or by another trusted party, etc. In one embodiment, communications between security component 2840, the component undergoing authentication, computer system 2890, or some combination thereof, may be encrypted (e.g., by the sender) and/or decrypted (e.g., by the recipient). In one embodiment, the authentication may be successful (e.g., the component undergoing authentication is determined to be authorized) if the identifier associated with the component undergoing authentication matches the authentication data (e.g., 2895, etc.). Alternatively, the authentication may be unsuccessful (e.g., the component undergoing authentication is determined not to be authorized) if the identifier associated with the component undergoing authentication does not match the authentication data (e.g., the component undergoing authentication is determined to be authorized) if the identifier associated with the component undergoing authentication matches the authentication data (e.g., 2895, etc.). Results of the comparison (e.g., performed by computer system 2890) may be communicated to vehicle 120 (e.g., to enable energy regulation component 2821 to regulate energy transferred to and/or from energy storage medium 2810, to enable energy regulation component 2841 to reduce or increase energy supplied to motor 2850, to enable energy regulation component 2841 to reduce or increase energy supplied to another component of vehicle 120, to enable vehicle movement control component 2844 to control use and/or movement of vehicle 120, etc.) in one embodiment.

It should be appreciated that the identifier (e.g., of the component undergoing authentication) may be different from the authentication data in one embodiment. For example, the identifier of the component undergoing authentication may be encrypted, whereas the authentication data may not be encrypted. In one embodiment, a hash value generated by performing a hash function on the identifier may be different than a hash value generated by performing the hash function on the authentication data. In this manner, the identifier and/or the authentication data may be processed (e.g., decrypted, altered, etc.) before performing the comparison in one embodiment.

In one embodiment, security component 2840 may be programmed by an authorized party (e.g., a manufacturer of security component 2840, a manufacturer of vehicle 120, a dealership authorized to service vehicle 120, etc.). For example, authentication data associated with a particular component of vehicle 120 (e.g., security component 2820, authentication component 2822, energy storage component 226, interface component 221, power management component 225, power source 227, another component of vehicle 120, etc.) may be written to security component 2840 (e.g., stored in memory 2846, a register of processor 2845, another portion of security component 2840, etc.). As such, energy storage component 2840 may be configured by an authorized party to operate with vehicle 120 and/or a component thereof (e.g., security component 2820, authentication component 2822, energy storage component 226, interface component 221, power management component 225, power source 227, another component of vehicle 120, etc.), where the programming of security component 2840 may be performed as a manufacturing operation (e.g., during manufacture of vehicle 120), as a service or maintenance operation (e.g., where security component 2840 or a component thereof is installed in vehicle 120 to replace another component which no longer works properly, has failed, has exceeded its lifespan, etc.), etc.

In one embodiment, authentication data 2895 may be updated or written (e.g., to a memory of computer system 2890, to a memory coupled to or otherwise accessible to computer system 2890, etc.) by an authorized party (e.g., a manufacturer of security component 2840, a manufacturer of vehicle 120, a dealership authorized to service vehicle 120, etc.) responsive to a programming of security component 2840. For example, where energy storage component 2840 is configured as a manufacturing operation by an authorized party to operate with vehicle 120 and/or a component thereof (e.g., where security component 2840 or a component thereof is installed in vehicle 120 during manufacturing), authentication data 2895 may be written which is associated with vehicle 120 and/or the component thereof (e.g., security component 2820, authentication component 2822, energy storage component 226, interface component 221, power management component 225, power source 227, another component of vehicle 120, etc.). As another example, where energy storage component 2840 is configured as a service or maintenance operation by an authorized party to operate with vehicle 120 and/or a component thereof (e.g., where security component 2840 or a component thereof is installed in vehicle 120 to replace another component which no longer works properly, has failed, has exceeded its lifespan, etc.), authentication data 2895 may be updated to reflect the replacement of another component with security component 2840 or a component thereof (e.g., by changing the association of vehicle 120 and/or a component thereof from the other component to security component 2840, authentication component 2842, etc.).

As shown in FIG. 28, energy regulation component 2841 may be disposed between at least one component (e.g., motor 2850, transmission 2860, braking system 2870, steering wheel 2880, some combination thereof, etc.) and at least one other component of vehicle 120, and therefore, energy regulation component 2841 may be used to control electrical access to at least one component (e.g., motor 2850, transmission 2860, braking system 2870, steering wheel 2880, some combination thereof, etc.) in one embodiment. For example, energy regulation component 2841 may act as a switch to electrically disconnect or decouple energy transfer interface 2832 from at least one component (e.g., motor 2850, transmission 2860, braking system 2870, steering wheel 2880, some combination thereof, etc.). As another example, energy regulation component 2841 may limit current, voltage, or another parameter of energy flowing to and/or from at least one component (e.g., motor 2850, transmission 2860, braking system 2870, steering wheel 2880, some combination thereof, etc.). Thus, embodiments of the present invention can advantageously increase security by limiting electrical access (e.g., responsive to a failure of an authentication of a component, responsive to a failure of an authentication of a user, some combination thereof, etc.) to at least one component (e.g., motor 2850, transmission 2860, braking system 2870, steering wheel 2880, some combination thereof, etc.).

In one embodiment, security component 2840 may located such that physical access to security component 2840 and/or an associated interface (e.g., 2855, 2865, 2875, 2885, etc.) coupling a component (e.g., motor 2850, transmission 2860, braking system 2870, steering wheel 2880, etc.) to security component 2840 is limited. For example, security component 2840 may be coupled with and/or disposed at least partially within a housing of a component (e.g., motor 2850, transmission 2860, braking system 2870, steering wheel 2880, etc.). In one embodiment, security component 2840 may located such that access to security component 2840 and/or an associated interface (e.g., 2855, 2865, 2875, 2885, etc.) may only be obtained by tampering with (e.g., opening, altering, destroying, etc.) the housing of the component (e.g., motor 2850, transmission 2860, braking system 2870, steering wheel 2880, etc.). In this manner, the ability to bypass energy regulation component 2841 to obtain electrical access to (e.g., by cutting, splicing into, replacing, etc.) an associated interface (e.g., 2855, 2865, 2875, 2885, etc.) and/or another component (e.g., motor 2850, transmission 2860, braking system 2870, steering wheel 2880, etc.) is reduced. Thus, embodiments of the present invention can advantageously increase security by limiting physical access to security component 2840 and/or an associated interface (e.g., 2855, 2865, 2875, 2885, etc.).

As shown in FIG. 28, tampering detection component 2847 may be capable of detecting a tampering with a housing of a component (e.g., motor 2850, transmission 2860, braking system 2870, steering wheel 2880, etc.). For example, tampering detection component 2847 may include a sensor, switch, etc. (e.g., disposed at or near a panel of the housing, a cover of the housing, an interface of at least two portions of the housing, etc.) operable to detect an unauthorized opening of the housing, a cutting of the housing, or some other tampering with the housing. As another example, tampering detection component 2847 may include a sensor (e.g., accelerometer, gyroscope, magnetometer, ball-in-cage sensor, etc.) capable of detecting an unauthorized movement and/or orientation of the housing (e.g., subjecting the housing to an acceleration in one or more axes above a particular threshold, placing the housing in a particular orientation, etc.). As yet another example, tampering detection component 2847 may include a sensor capable of detecting some other parameter (e.g., temperature, pressure, humidity, proximity, etc.) associated with a tampering with the housing.

In one embodiment, at least one operation may be performed responsive to tampering detection component 2847 detecting a tampering with a housing of a component (e.g., motor 2850, transmission 2860, braking system 2870, steering wheel 2880, etc.), where tampering detection component 2847 may send a communication to another component performing the at least one operation and/or control the other component to perform the at least one operation. For example, responsive to tampering detection component 2847 detecting a tampering with a housing, energy regulation component 2841 may be controlled (e.g., by authentication component 2842, by processor 2845, etc.) to reduce an ability to transfer energy (or to prevent altogether an energy transfer) to and/or from a component of vehicle 120 (e.g., over energy transfer interface 2832, over interface 2855, over interface 2865, over interface 2875, over interface 2885, over another interface, etc.). In one embodiment, the energy transferred via energy regulation component 2841 may be insufficient to power motor 2850 to move vehicle 120. In one embodiment, the energy transferred via energy regulation component 2841 may be insufficient to perform an energy transfer with another system (e.g., energy transfer system 110, another vehicle, etc.). In one embodiment, the energy transferred via energy regulation component 2841 may be sufficient to power another component of vehicle 120 (e.g., a radio or navigation system, dashboard, lights, any of the components of vehicle 120 depicted in FIG. 2, transmission 2860, braking system 2870, steering wheel 2880, another component of vehicle 120, etc.).

As another example, responsive to tampering detection component 2847 detecting a tampering with a housing (e.g., of motor 2850, transmission 2860, braking system 2870, steering wheel 2880, etc.), energy regulation component 2841 may be controlled (e.g., by authentication component 2842, by processor 2845, etc.) to reduce the ability to move or to prevent movement of vehicle 120 (e.g., by limiting the current, voltage, or another parameter of electricity to motor 2850). As yet another example, responsive to tampering detection component 2847 detecting a tampering with a housing, energy regulation component 2841 may be advantageously controlled (e.g., by authentication component 2842, by processor 2845, etc.) to provide a reduced amount of energy (e.g., from energy storage medium 2810) which is insufficient to perform an operation (e.g., moving vehicle 120 using motor 2850, performing an energy transfer between vehicle 120 and an energy transfer system, performing an energy transfer between vehicle 120 and another vehicle, etc.) yet sufficient to enable a component (e.g., a radio or navigation system, an instrument located in a dashboard or other location of vehicle 120, interior lights, exterior lights, hazard lights, any of the components of vehicle 120 depicted in FIG. 2, motor 2850, transmission 2860, braking system 2870, steering wheel 2880, another component of vehicle 120, security component 2820, another security component of vehicle 120, electronics associated with the door locks of vehicle 120, etc.) of vehicle 120 to function.

As a further example, responsive to tampering detection component 2847 detecting a tampering with a housing (e.g., of motor 2850, transmission 2860, braking system 2870, steering wheel 2880, etc.), energy regulation component 2841 may be advantageously controlled (e.g., by authentication component 2842, by processor 2845, etc.) to provide a reduced amount of energy (e.g., from energy storage medium 2810) which is insufficient to perform a first operation (e.g., moving vehicle 120 using motor 2850, performing an energy transfer between vehicle 120 and an energy transfer system, performing an energy transfer between vehicle 120 and another vehicle, etc.) yet sufficient to perform a second operation (e.g., retain data stored in a volatile memory of vehicle 120, present a user interface configured to enable input of information associated with an authentication of a user, communicate data with a system external to vehicle 120, communicate a failure of an authentication to a user or another system, present another user interface enabling a user to report that vehicle 120 has been stolen, communicate to another user or another system that vehicle 120 has been stolen, reduce an ability to move vehicle 120 using vehicle movement control component 2844 or another component of vehicle 120, some combination thereof, etc.).

As another example, responsive to tampering detection component 2847 detecting a tampering with a housing (e.g., of motor 2850, transmission 2860, braking system 2870, steering wheel 2880, etc.), vehicle movement control component 2844 may be controlled to reduce unauthorized use and/or movement of the vehicle (e.g., by disabling or deactivating energy storage component 226, motor 2850, transmission 2860, braking system 2870, steering wheel 2880, etc.). As yet another example, responsive to tampering detection component 2847 detecting a tampering with a housing, a communication may be sent (e.g., to interface system 550 for presentation in region 1095 of GUI 1000) to alert a user to the tampering with the housing. And as a further example, responsive to tampering detection component 2847 detecting a tampering with a housing, tampering detection component 2847 may cause secure data (e.g., stored in memory 2846, another memory of security component 2840, another memory of vehicle 120, a memory of an external system, etc.) to be deleted, erased, corrupted, or otherwise be modified to reduce unauthorized access to the secure information.

In one embodiment, responsive to tampering detection component 2847 detecting a tampering with a housing (e.g., of motor 2850, transmission 2860, braking system 2870, steering wheel 2880, etc.), a communication may be sent (e.g., using communication component 2843 over energy transfer interface 2832 and/or signal interface 2834) to security component 2820 to cause security component 2820 to perform one or more operations. For example, responsive to the communication from tampering detection component 2847, energy regulation component 2821 may be controlled (e.g., by authentication component 2822, by processor 2825, etc.) to reduce the ability to perform (or to prevent altogether) an energy transfer to and/or from energy storage medium 2810 (e.g., over energy transfer interface 2832). As another example, responsive to the communication from tampering detection component 2847, energy regulation component 2821 may be controlled (e.g., by authentication component 2822, by processor 2825, etc.) to reduce the ability to move or to prevent movement of vehicle 120 (e.g., by limiting the current, voltage, or another parameter of electricity to motor 2850).

As yet another example, responsive to tampering detection component 2847 detecting a tampering with a housing (e.g., of motor 2850, transmission 2860, braking system 2870, steering wheel 2880, etc.), a communication may be sent (e.g., using communication component 2843 over energy transfer interface 2832 and/or signal interface 2834) to security component 2820 to advantageously control (e.g., using authentication component 2822, using processor 2825, etc.) energy regulation component 2821 to provide a reduced amount of energy (e.g., from energy storage medium 2810) which is insufficient to perform an operation (e.g., moving vehicle 120 using motor 2850, performing an energy transfer between vehicle 120 and an energy transfer system, performing an energy transfer between vehicle 120 and another vehicle, etc.) yet sufficient to enable a component (e.g., a radio or navigation system, an instrument located in a dashboard or other location of vehicle 120, interior lights, exterior lights, hazard lights, any of the components of vehicle 120 depicted in FIG. 2, motor 2850, transmission 2860, braking system 2870, steering wheel 2880, another component of vehicle 120, security component 2840, another security component of vehicle 120, electronics associated with the door locks of vehicle 120, etc.) of vehicle 120 to function. As another example, responsive to tampering detection component 2847 detecting a tampering with a housing and sending a communication to security component 2820, energy regulation component 2821 may be advantageously controlled (e.g., by authentication component 2822, by processor 2825, etc.) to provide a reduced amount of energy (e.g., from energy storage medium 2810) which is insufficient to perform a first operation (e.g., moving vehicle 120 using motor 2850, performing an energy transfer between vehicle 120 and an energy transfer system, performing an energy transfer between vehicle 120 and another vehicle, etc.) yet sufficient to perform a second operation (e.g., retain data stored in a volatile memory of vehicle 120, present a user interface configured to enable input of information associated with an authentication of a user, communicate data with a system external to vehicle 120, communicate a failure of an authentication to a user or another system, present another user interface enabling a user to report that vehicle 120 has been stolen, communicate to another user or another system that vehicle 120 has been stolen, reduce an ability to move vehicle 120 using security component 2840 or another component of vehicle 120, some combination thereof, etc.).

As shown in FIG. 28, communication component 2843 may be used to communicate with another component of vehicle 120 and/or an external system (e.g., energy transfer system 110, computer system 2890, another system located remotely from vehicle 120, etc.). For example, communication component 2843 may be used to transmit and/or receive communications from security component 2820 (e.g., over signal interface 2834, energy transfer interface 2832, etc.). As another example, communication component 2843 may be used to transmit and/or receive communications from another component of vehicle 120 (e.g., interface component 221, communication interface 241, power management component 225, motor 2850, transmission 2860, braking system 2870, steering wheel 2880, etc.). And as yet another example, communication component 2843 may be used to transmit and/or receive communications from an external system (e.g., directly, via communication interface 242, via another component of vehicle 120, etc.).

In one embodiment, communication component 2843 may communicate over a wired interface (e.g., including one or more conductors, lines, lanes, etc.) and/or a wireless interface (e.g., using radio waves, microwaves, infrared waves, visible light waves, ultraviolet waves, x-rays, gamma rays, etc.). For example, communication component 2843 may communicate over an interface which operates in accordance with a wireless standard such as 802.11x, Bluetooth, etc. As another example, communication component 2843 may communicate over a cellular network (e.g., cellular data network, cellular phone network, etc.).

In one embodiment, a signal (e.g., a data signal, a clock signal, etc.) may be communicated over energy transfer interface 2832 using modulation and/or demodulation. For example, communication component 2843 may transmit a signal over energy transfer interface 2832 using modulation (e.g., amplitude modulation, frequency modulation, phase modulation, some combination thereof, etc.), where the energy transfer signal functions as the carrier wave. Upon receipt of the energy transfer signal, the signals (e.g., data signals, clock signals, etc.) carried by the energy transfer signal may be demodulated (e.g., using amplitude demodulation, frequency demodulation, phase demodulation, some combination thereof, etc.) by another component (e.g., communication component 2823, another component of vehicle 120, a component of an external system accessing the energy transfer signal, etc.). As another example, communication component 2843 may demodulate (e.g., using amplitude demodulation, frequency demodulation, phase demodulation, some combination thereof, etc.) a signal from an energy transfer signal carried by energy transfer interface 2832, where the signal may be modulated (e.g., using amplitude modulation, frequency modulation, phase modulation, some combination thereof, etc.) by another component (e.g., communication component 2823, another component of vehicle 120, a component of an external system accessing the energy transfer signal, etc.).

In one embodiment, a signal (e.g., data signals, clock signals, etc.) may be communicated over energy transfer interface 2832 using an electromagnetic field surrounding at least one conductor of the energy transfer interface. For example, communication component 2843 may alter (e.g., change the strength or amplitude over time of) an electromagnetic field surrounding at least one conductor of energy transfer interface 2832 to transmit the signals (e.g., data signals, clock signals, etc.) over the energy transfer interface. A component receiving the signals (e.g., communication component 2823, another component of vehicle 120, a component of an external system accessing the energy transfer signal, etc.) may detect the changes in the electromagnetic field and recreate the signals (e.g., data signals, clock signals, etc.) based on the changes in the electromagnetic field. As another example, where another component (e.g., communication component 2823, another component of vehicle 120, a component of an external system accessing the energy transfer signal, etc.) alters (e.g., changes the strength or amplitude over time of) an electromagnetic field surrounding at least one conductor of energy transfer interface 2832 to transmit signals (e.g., data signals, clock signals, etc.) over the energy transfer interface, communication component 2843 may detect the changes in the electromagnetic field and recreate the signals (e.g., data signals, clock signals, etc.) based on the changes in the electromagnetic field.

In one embodiment, energy transfer interface 2832 may be coupled to or part of a power system (e.g., a 12 volt power system of an automobile, etc.) of vehicle 120. A plurality of components of vehicle 120 may be coupled to and powered by the power system. In this manner, the number of interfaces required to support security component 2840 (e.g., communication interfaces enabling security component 2840 to communicate with security component 2820, another component of vehicle 120, an external system, etc.) may be reduced, thereby reducing the difficulty and/or cost of retrofitting vehicle 120 to include security component 2840 (e.g., since the existing power system can be used for communication in lieu of separate communication interfaces installed during the retrofit).

In one embodiment, signals (e.g., data signals, clock signals, etc.) communicated to and/or from security component 2840 may be encrypted. For example, a component of security component 2840 (e.g., authentication component 2842, communication component 2843, processor 2845, tampering detection component 2847, etc.) may encrypt a signal for decryption by a receiver of the communication (e.g., a component of security component 2820, communication interface 242, another component of vehicle 120, a component of an external system, etc.). As another example, a sender of a communication (e.g., a component of security component 2820, communication interface 242, another component of vehicle 120, a component of an external system, etc.) may encrypt a signal for decryption by a component of security component 2840 (e.g., authentication component 2842, communication component 2843, processor 2845, tampering detection component 2847, etc.).

In one embodiment, communication component 2843 may communicate via energy transfer interface 2832 using analog signals, digital signals, pulse width modulated signals, some combination thereof, etc. Communication component 2843 may communicate via energy transfer interface 2832 using unidirectional signal communication and/or bidirectional signal communication. In one embodiment, communication component 2843 may communicate via energy transfer interface 2832 using single-ended signaling and/or differential signaling.

In one embodiment, communication component 2843 may communicate via signal interface 2834 using analog signals, digital signals, pulse width modulated signals, some combination thereof, etc. Communication component 2843 may communicate via signal interface 2834 using unidirectional signal communication and/or bidirectional signal communication. In one embodiment, communication component 2843 may communicate via signal interface 2834 using single-ended signaling and/or differential signaling.

In one embodiment, signals associated with temperature (e.g., of energy storage medium 2810, another component of vehicle 120, a component of an external system, the ambient air, etc.) may be communicated by security component 2840 to another component. For example, signals associated with temperature may be communicated by security component 2840 to another component of vehicle 120 (e.g., security component 2820, interface component 221, power management component 225, power source 227, another component of vehicle 120, etc.). And as another example, signals associated with temperature may be communicated by security component 2840 to an external system (e.g., energy transfer system 110, computer system 2890, another vehicle, etc.).

In one embodiment, signals associated with a parameter of one component may be communicated by security component 2840 to another component. For example, security component 2840 may communicate a parameter of motor 2850, where the parameter of motor 2850 may be a voltage, a current, a rotational speed or acceleration, a temperature, an operational status (e.g., enabled or activated, disabled or deactivated), etc. As another example, security component 2840 may communicate a parameter of transmission 2860, where the parameter of transmission 2860 may be a speed of vehicle 120 (e.g., from a vehicle speed sensor coupled with transmission 2860), a currently selected gear, a rotational speed or acceleration of a component of transmission 2860, the state of one or more clutches of transmission 2860, a temperature, an operational status (e.g., enabled or activated, disabled or deactivated), etc. As a further example, security component 2840 may communicate a parameter of braking system 2870, where the parameter of braking system 2870 may be a position or state of a brake pad or caliper, a position or state of a brake shoe or drum, a status or reading from a sensor (e.g., anti-lock braking system sensor, active handling system sensor, stability management system sensor, etc.) associated with braking system 2870, a temperature, an operational status (e.g., enabled or activated, disabled or deactivated), etc. And as yet another example, security component 2840 may communicate a parameter of steering wheel 2880, where the parameter of steering wheel 2880 may be a position of steering wheel 2880, the state of a switch (e.g., for controlling a radio or navigation system, for controlling a Bluetooth speakerphone system, for controlling a cruise control system, etc.) of steering wheel 2880, a rotational speed or acceleration, an operational status (e.g., enabled or activated, disabled or deactivated), etc. And as yet a further example, security component 2840 may communicate a parameter of another component (e.g., a tire pressure monitoring component, an engine management system, security component 2820, an energy transfer component, interface component 221, power management component 225, energy storage component 226, power source 227, charge and/or discharge component 228, meter 229, another component of vehicle 120, etc.).

Operations performed by security component 2840 may be performed using one or more components of security component 2840. For example, authentication (e.g., of a component, of a user, etc.) may be performed using authentication component 2842 and/or processor 2845, where instructions or code used to carry out the authentication may be stored in memory 2846 for execution by authentication component 2842 and/or processor 2845. As another example, one or more operations performed responsive to a successful authentication (e.g., controlling energy regulation component 2821, controlling energy regulation component 2841, controlling vehicle movement control component 2844, sending a communication between security component 2820 and security component 2840, etc.) may be performed using at least one component (e.g., authentication component 2842, communication component 2843, some combination thereof, etc.) and/or processor 2845, where instructions or code used to carry out the one or more operations may be stored in memory 2846 for execution by the at least one component (e.g., authentication component 2842, communication component 2843, some combination thereof, etc.) and/or processor 2845. As yet another example, one or more operations performed responsive to an unsuccessful authentication (e.g., controlling energy regulation component 2821, controlling energy regulation component 2841, controlling vehicle movement control component 2844, sending a communication between security component 2820 and security component 2840, sending a communication to a user, etc.) may be performed using at least one component (e.g., authentication component 2842, communication component 2843, some combination thereof, etc.) and/or processor 2845, where instructions or code used to carry out the one or more operations may be stored in memory 2846 for execution by the at least one component (e.g., authentication component 2842, communication component 2843, some combination thereof, etc.) and/or processor 2845.

As another example, one or more operations performed responsive to detecting a tampering with a housing (e.g., controlling energy regulation component 2821, controlling energy regulation component 2841, controlling vehicle movement control component 2844, sending a communication between security component 2820 and security component 2840, sending a communication to a user, etc.) may be performed using at least one component (e.g., tampering detection component 2847, authentication component 2842, communication component 2843, some combination thereof, etc.) and/or processor 2845, where instructions or code used to carry out the one or more operations may be stored in memory 2846 for execution by the at least one component (e.g., tampering detection component 2847, authentication component 2842, communication component 2843, some combination thereof, etc.) and/or processor 2845. As a further example, communication with another component, device, system, etc. may be performed using at least one component (e.g., communication component 2843, authentication component 2842, tampering detection component 2847, some combination thereof, etc.) and/or processor 2845, where instructions or code used to carry out the communication may be stored in memory 2846 for execution by the at least one component (e.g., communication component 2843, authentication component 2842, tampering detection component 2847, some combination thereof, etc.) and/or processor 2845.

In one embodiment, security component 2840 may include a plurality of integrated circuits (e.g., at least one application-specific integrated circuit (ASIC), at least one system-on-a-chip (SOC), at least one programmable system-on-a-chip (PSOC), another type of integrated circuit, etc.) attached to a plurality of printed circuit boards. Security component 2840 may include at least one integrated circuit (e.g., at least one application-specific integrated circuit (ASIC), at least one system-on-a-chip (SOC), at least one programmable system-on-a-chip (PSOC), another type of integrated circuit, etc.) attached to a single printed circuit board in one embodiment. In one embodiment, security component 2840 may be implemented by a single integrated circuit (e.g., an application-specific integrated circuit (ASIC), a system on a chip (SOC), programmable system on a chip (PSOC), etc.). And in one embodiment, components of security component 2840 may be implemented using a single die of an integrated circuit, more than one die of an integrated circuit, etc.

As shown in FIG. 28, authentication component 2822 and/or authentication component 2842 may be used to perform an authentication of a user. For example, authentication component 2822 and/or authentication component 2842 may compare information entered by a user (e.g., a code entered using region 1040 of GUI 1000) to other information (e.g., a code, a username, a password, etc. entered using region 940 of GUI 900, information stored in memory 2826, information stored in memory 2846, etc.) to determine if a user is authorized to perform an energy transfer between an energy transfer system (e.g., 110, 710a, 710b, 710c, etc.) and vehicle 120. As another example, authentication component 2822 and/or authentication component 2842 may compare information entered by a user (e.g., a code entered using region 1040 of GUI 1000) to other information (e.g., a code, a username, a password, etc. entered using region 940 of GUI 900, information stored in memory 2826, information stored in memory 2846, etc.) to determine if a user is authorized to use and/or move vehicle 120.

If the authentication of the user is successful, then one or more operations may be performed using authentication component 2822 and/or authentication component 2842. For example, if the authentication of the user is successful, then energy regulation component 2821 may be controlled (e.g., by authentication component 2822, by processor 2825, etc.) to enable energy to be transferred to and/or from energy storage medium 2810 (e.g., over energy transfer interface 2832). In one embodiment, energy transferred to energy storage medium 2810 via energy regulation component 2821 may be sufficient to charge energy storage medium. In one embodiment, energy transferred from energy storage medium 2810 (e.g., over energy transfer interface 2832) via energy regulation component 2821 may be sufficient to power another component of vehicle 120 (e.g., a radio or navigation system, dashboard, lights, any of the components of vehicle 120 depicted in FIG. 2, motor 2850, transmission 2860, braking system 2870, steering wheel 2880, another component of vehicle 120, etc.) and/or perform an energy transfer with another system (e.g., energy transfer system 110, another vehicle, etc.).

As another example, if the authentication of the user is successful, then energy regulation component 2841 may be controlled (e.g., using authentication component 2842, using processor 2845, etc.) to enable energy to be transferred to and/or from a component of vehicle 120 (e.g., over energy transfer interface 2832, over interface 2855, over interface 2865, over interface 2875, over interface 2885, over another interface, etc.). In one embodiment, the energy transferred via energy regulation component 2841 may be sufficient to power motor 2850 to move vehicle 120. In one embodiment, the energy transferred via energy regulation component 2841 may be sufficient to power another component of vehicle 120 (e.g., a radio or navigation system, dashboard, lights, any of the components of vehicle 120 depicted in FIG. 2, transmission 2860, braking system 2870, steering wheel 2880, another component of vehicle 120, etc.) and/or perform an energy transfer with another system (e.g., energy transfer system 110, another vehicle, etc.). As yet another example, if the authentication of the user is successful, then vehicle movement control component 2844 of security component 2840 may enable use and/or movement of the vehicle (e.g., by enabling an activation of energy storage component 226, motor 2850, transmission 2860, braking system 2870, steering wheel 2880, etc.).

If the authentication of the user is unsuccessful, then one or more operations may be performed using authentication component 2822 and/or authentication component 2842. For example, if the authentication of the user is unsuccessful, energy regulation component 2821 may be controlled (e.g., by authentication component 2822, by processor 2825, etc.) to reduce the ability to perform (or to prevent altogether) an energy transfer to and/or from energy storage medium 2810 (e.g., over energy transfer interface 2832). As another example, if the authentication of the user is unsuccessful, energy regulation component 2821 may be controlled (e.g., by authentication component 2822, by processor 2825, etc.) to reduce the ability to move or to prevent movement of vehicle 120 (e.g., by limiting the current, voltage, or another parameter of electricity to motor 2850).

As yet another example, if the authentication of the user is unsuccessful, energy regulation component 2821 may be advantageously controlled (e.g., by authentication component 2822, by processor 2825, etc.) to provide a reduced amount of energy (e.g., from energy storage medium 2810) which is insufficient to perform an operation (e.g., moving vehicle 120 using motor 2850, performing an energy transfer between vehicle 120 and an energy transfer system, performing an energy transfer between vehicle 120 and another vehicle, etc.) yet sufficient to enable a component (e.g., a radio or navigation system, an instrument located in a dashboard or other location of vehicle 120, interior lights, exterior lights, hazard lights, any of the components of vehicle 120 depicted in FIG. 2, motor 2850, transmission 2860, braking system 2870, steering wheel 2880, another component of vehicle 120, security component 2840, another security component of vehicle 120, electronics associated with the door locks of vehicle 120, etc.) of vehicle 120 to function. As a further example, if the authentication of the user is unsuccessful, energy regulation component 2821 may be advantageously controlled (e.g., by authentication component 2822, by processor 2825, etc.) to provide a reduced amount of energy (e.g., from energy storage medium 2810) which is insufficient to perform a first operation (e.g., moving vehicle 120 using motor 2850, performing an energy transfer between vehicle 120 and an energy transfer system, performing an energy transfer between vehicle 120 and another vehicle, etc.) yet sufficient to perform a second operation (e.g., retain data stored in a volatile memory of vehicle 120, present a user interface configured to enable input of information associated with an authentication of a user, communicate data with a system external to vehicle 120, communicate a failure of an authentication to a user or another system, present another user interface enabling a user to report that vehicle 120 has been stolen, communicate to another user or another system that vehicle 120 has been stolen, reduce an ability to move vehicle 120 using security component 2840 or another component of vehicle 120, some combination thereof, etc.).

As another example, if the authentication of the user is unsuccessful, then energy regulation component 2841 may be controlled (e.g., by authentication component 2842, by processor 2845, etc.) to reduce an ability to transfer energy (or to prevent altogether an energy transfer) to and/or from a component of vehicle 120 (e.g., over energy transfer interface 2832, over interface 2855, over interface 2865, over interface 2875, over interface 2885, over another interface, etc.). In one embodiment, the energy transferred via energy regulation component 2841 may be insufficient to power motor 2850 to move vehicle 120. In one embodiment, the energy transferred via energy regulation component 2841 may be insufficient to perform an energy transfer with another system (e.g., energy transfer system 110, another vehicle, etc.). In one embodiment, the energy transferred via energy regulation component 2841 may be sufficient to power another component of vehicle 120 (e.g., a radio or navigation system, dashboard, lights, any of the components of vehicle 120 depicted in FIG. 2, transmission 2860, braking system 2870, steering wheel 2880, another component of vehicle 120, etc.).

As a further example, if the authentication of the user is unsuccessful, energy regulation component 2841 may be advantageously controlled (e.g., using authentication component 2842, using processor 2845, etc.) to reduce the ability to move or to prevent movement of vehicle 120 (e.g., by limiting the current, voltage, or another parameter of electricity to motor 2850). As another example, if the authentication of the user is unsuccessful, energy regulation component 2841 may be advantageously controlled (e.g., by authentication component 2842, by processor 2845, etc.) to provide a reduced amount of energy (e.g., from energy storage medium 2810) which is insufficient to perform an operation (e.g., moving vehicle 120 using motor 2850, performing an energy transfer between vehicle 120 and an energy transfer system, performing an energy transfer between vehicle 120 and another vehicle, etc.) yet sufficient to enable a component (e.g., a radio or navigation system, an instrument located in a dashboard or other location of vehicle 120, interior lights, exterior lights, hazard lights, any of the components of vehicle 120 depicted in FIG. 2, motor 2850, transmission 2860, braking system 2870, steering wheel 2880, another component of vehicle 120, security component 2820, another security component of vehicle 120, electronics associated with the door locks of vehicle 120, etc.) of vehicle 120 to function.

As a further example, if the authentication of the user is unsuccessful, energy regulation component 2841 may be advantageously controlled (e.g., using authentication component 2842, using processor 2845, etc.) to provide a reduced amount of energy (e.g., from energy storage medium 2810) which is insufficient to perform a first operation (e.g., moving vehicle 120 using motor 2850, performing an energy transfer between vehicle 120 and an energy transfer system, performing an energy transfer between vehicle 120 and another vehicle, etc.) yet sufficient to perform a second operation (e.g., retain data stored in a volatile memory of vehicle 120, present a user interface configured to enable input of information associated with an authentication of a user, communicate data with a system external to vehicle 120, communicate a failure of an authentication to a user or another system, present another user interface enabling a user to report that vehicle 120 has been stolen, communicate to another user or another system that vehicle 120 has been stolen, reduce an ability to move vehicle 120 using vehicle movement control component 2844 or another component of vehicle 120, some combination thereof, etc.). As another example, if the authentication of the user is unsuccessful, vehicle movement control component 2844 may reduce (or prevent) the ability to use and/or move the vehicle (e.g., by disabling or otherwise changing a state of energy storage component 226, motor 2850, transmission 2860, braking system 2870, steering wheel 2880, etc.). As yet another example, if the authentication of the user is unsuccessful, a communication may be sent (e.g., to interface system 550 for presentation in region 1095 of GUI 1000) to alert a user that the authentication of the user was unsuccessful.

Accordingly, security component 2820 and/or security component 2840 can increase vehicle security responsive to one or more events. For example, security component 2820 may reduce unauthorized use of energy storage component 226 (e.g., by reducing the ability to use energy storage component 226 in a vehicle other than vehicle 120, by reducing unauthorized transfers of energy to and/or from energy storage component, etc.) responsive to a failure of an authentication of a component (e.g., authentication component 2842, interface component 221, power management component 225, power source 227, another component of vehicle 120, a component of energy transfer system 110, a component of an external system or external device, etc.), a failure of an authentication of a user, a tampering with a housing, some combination thereof, etc. As another example, security component 2840 may reduce unauthorized use of vehicle 120 (e.g., by reducing the ability to use an unauthorized component, device, or system to power, move, or otherwise use vehicle 120) responsive to a failure of an authentication of a component (e.g., authentication component 2822, interface component 221, power management component 225, power source 227, another component of vehicle 120, a component of energy transfer system 110, a component of an external system or external device, etc.), a failure of an authentication of a user, a tampering with a housing, some combination thereof, etc.

Although FIG. 28 shows a specific number of components, it should be appreciated that system 2800 may include a larger or smaller number of components in other embodiments. In one embodiment, two or more components may be combined (e.g., security component 2840 may be integrated with or disposed in a housing of motor 2850, transmission 2860, braking system 2870, steering wheel 2880, some combination thereof, etc.), a component may be separated into multiple components, some combination thereof, etc. It should also be appreciated that the components depicted in FIG. 28 may be arranged differently in other embodiments. For example, a sub-component of one component may be a sub-component of another component (e.g., security component 2820 may be a sub-component of energy storage medium 2810, etc.), a sub-component of a component may exist outside the component as another component (e.g., security component 2820 may be disposed at least partially outside housing 2830 of energy storage component 226, etc.), a component may be a sub-component of another component (e.g., security component 2840 may be a sub-component of security component 2820, security component 2820 may be a sub-component of security component 2840, etc.), etc.

Figure 29A:
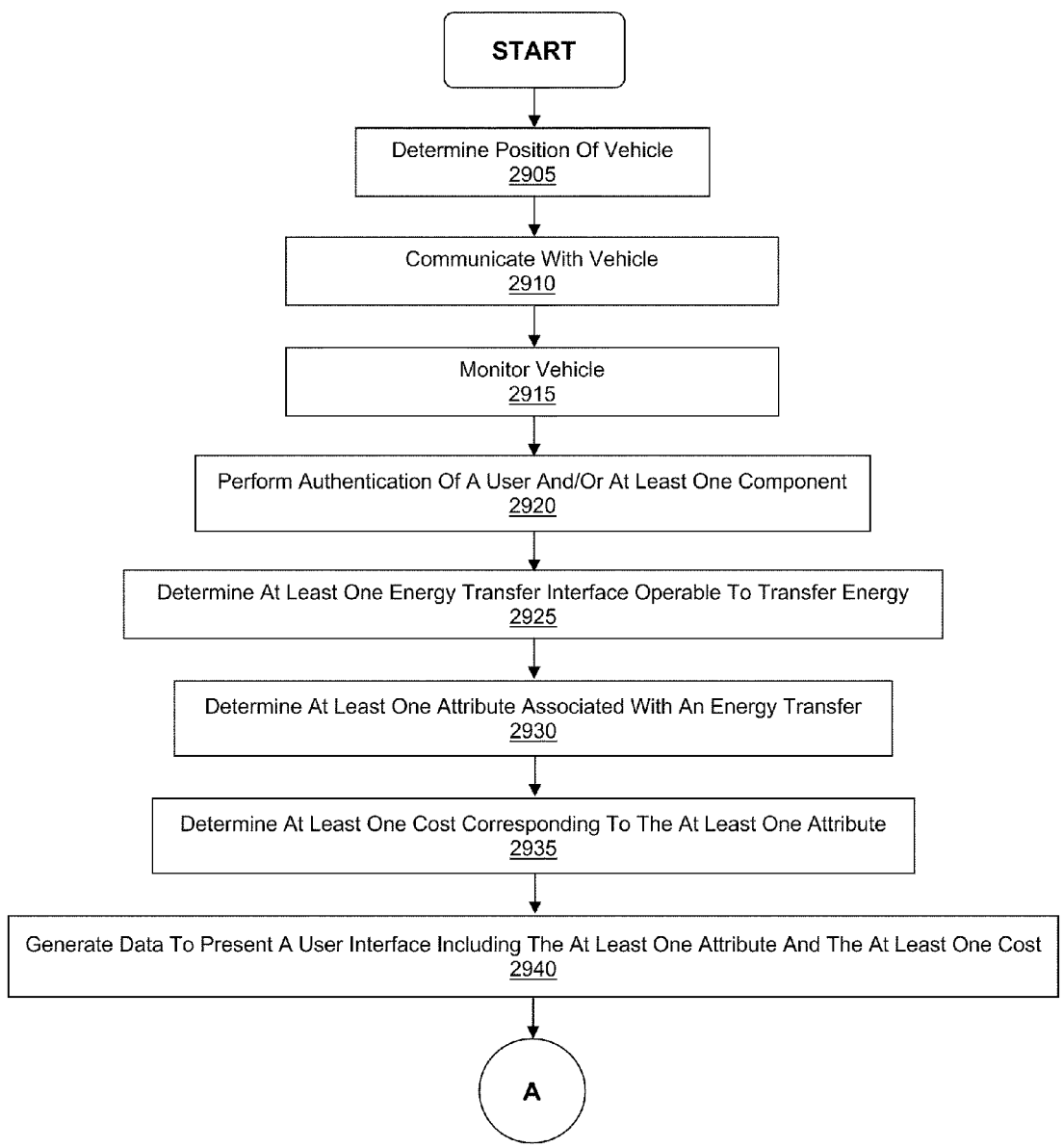
FIG. 29A shows a flowchart of a first portion of a computer-implemented process for managing at least one transfer of energy in accordance with one embodiment of the present invention.
Figure 29B:
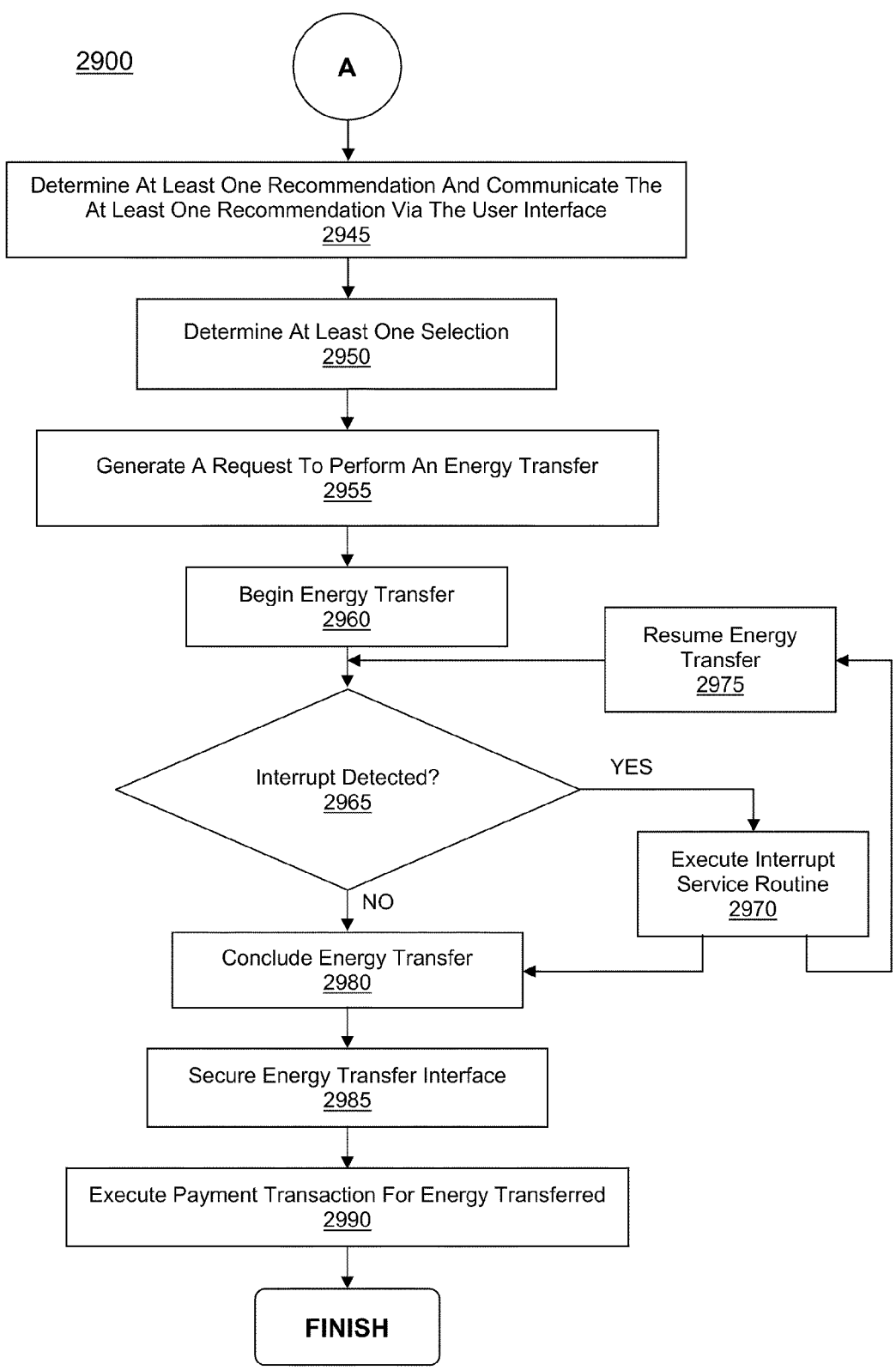
FIG. 29B shows a flowchart of a second portion of a computer-implemented process for managing at least one transfer of energy in accordance with one embodiment of the present invention.

FIGS. 29A and 29B show a flowchart of computer-implemented process 2900 for managing at least one transfer of energy in accordance with one embodiment of the present invention. As shown in FIG. 29A, step 2905 involves determining a position of a vehicle (e.g., 120, 320a, 320b, 320c, 1802, etc.). In one embodiment, step 2905 may involve determining a position of at least one energy transfer component (e.g., 233, 236, 239, 1821, 1822, 1823, 1824, 1832, 1834, 1842, 1844, 2033, 2036a, 2036b, 2036c, 2036d, 2039a, 2039b, 2230, 2240, 2250, 2270, 2280, 2290, 2320, 2330, 2340, 2360, 2370, 2460, 2461, 2630, 2640, 2730, 2740, some combination thereof, etc.) and/or another component (e.g., a body panel, a wheel, a tire, etc.) of the vehicle with respect to the energy transfer system (e.g., 110, 710a, 710b, 710c, etc.) or a component thereof. And in one embodiment, step 2905 may involve determining a position of the vehicle (or a component thereof) with respect to at least one energy transfer component (e.g., 232, 235, 238, 1610, 1620, 1630, 1645, 1655, 1662, 1665, 1675, 1711, 1712, 1713, 1714, 1715, 1721, 1722, 1723, 1724, 1725, 1726, 1727, 1728, 1731, 1732, 1733, 1734, 1735, 1742, 1744, 1752, 1754, 1783, 1785, 1812, 2032, 2035a, 2035b, 2035c, 2035d, 2038a, 2038b, 2110, 2111, 2112, 2113, 2114, 2115, 2116, 2117, 2118, 2660, 2680, 2730, 2740, some combination thereof, etc.) and/or another component (e.g., a housing, etc.) of the energy transfer system.

In one embodiment, step 2905 may be performed using at least one position detection component. For example, step 2905 may be performed using at least one position detection component of a vehicle (e.g., 1940, 1941, 1942, 1943, some combination thereof, etc.) and/or at least one position detection component of an energy transfer system (e.g., 1910, 1911, 1912, 1913, some combination thereof, etc.).

Step 2905 may be performed using one or more types of position detection components in one embodiment. For example, step 2905 may be performed using at least one mechanical position detection component (e.g., 1910, 1940, etc.), at least one optical position detection component (e.g., 1911, 1941, etc.), at least one electrical position detection component (e.g., 1912, 1942, etc.), at least one wave position detection component (e.g., 1913, 1943, etc.), some combination thereof, etc.

In one embodiment, step 2905 may be performed using at least one energy transfer component of a vehicle and/or at least one energy transfer component of an energy transfer system. For example, at least one energy transfer component may be used to determine the position of a vehicle by activating (e.g., using position detection control component 2010, position detection control component 2020, some combination thereof, etc.) the at least one energy transfer component and analyzing the respective responses corresponding to each of the at least one energy transfer component (e.g., as discussed with respect to FIG. 20 and/or FIG. 21). In one embodiment, step 2905 may be performed using at least one energy transfer component configured (e.g., by position detection control component 2010, position detection control component 2020, some combination thereof, etc.) to operate in an energy transfer mode (e.g., as discussed with respect to FIG. 20 and/or FIG. 21). And in one embodiment, step 2905 may be performed using at least one energy transfer component configured (e.g., by position detection control component 2010, position detection control component 2020, some combination thereof, etc.) to operate in a position detection mode (e.g., as discussed with respect to FIG. 20 and/or FIG. 21).

Step 2905 may be performed by determining the type of one or more objects in one embodiment. For example, the position of a vehicle or a component thereof may be determined by distinguishing one component of a vehicle (e.g. a tire, a wheel, an energy transfer component, etc.) from another component of a vehicle (e.g., an undercarriage, a body panel, etc.), by distinguishing a component of a vehicle from another object (e.g., a component of another system or device, a non-metallic object, a person, another type of object, etc.), some combination thereof, etc.

In one embodiment, step 2905 may be performed by determining the distance of one or more objects (e.g., from an energy transfer component and/or a position detection component used to determine the distance or distances). For example, the position of a vehicle or a component thereof may be determined by distinguishing the distance of one component of a vehicle (e.g. a tire, a wheel, an energy transfer component, etc.) from the distance of another component of a vehicle (e.g., an undercarriage, a body panel, etc.), by distinguishing the distance of a component of a vehicle from the distance of another object (e.g., a component of another system or device, a non-metallic object, a person, another type of object, etc.), some combination thereof, etc.

Step 2905 may be performed by activating a plurality of energy transfer components sequentially in one embodiment. In one embodiment, step 2905 may be performed by activating a plurality of energy transfer components simultaneously or contemporaneously. And in one embodiment, step 2905 may be performed by activating a plurality of sets of energy transfer components sequentially and/or contemporaneously.

In one embodiment, step 2905 may be performed using at least one position detection component and at least one energy transfer component (e.g., as discussed with respect to FIG. 19, FIG. 20, FIG. 21, some combination thereof, etc.). The at least one position detection component and the at least one energy transfer component may be disposed adjacent to and/or in proximity to one another. As such, position detection capabilities and/or energy transfer capabilities may be improved by increasing the number and/or type of components capable of being used for position detection, by positioning the position detection components in proximity to the energy transfer components, some combination thereof, etc. Further, use of at least one position detection component and at least one energy transfer components to detect or determine the position of a vehicle (or a component thereof) may provide redundancy and/or improve the precision of position detection. And in one embodiment, step 2905 may involve determining the relative positioning of multiple vehicles with respect to one another, where the relative positioning may be determined using at least one position detection component and/or at least one energy transfer component.

In one embodiment, step 2905 may involve determining the position of an energy transfer component of a vehicle and/or an energy transfer component of an energy transfer system based on an orientation (e.g., angular position, etc.) of a wheel of the vehicle (e.g., 1840, 2220, 2310, 2350, 2420, etc.) and/or a tire of the vehicle (e.g., 1830, 2210, 2260, 2410, etc.). The orientation of a wheel and/or tire may be determined using at least one sensor coupled with the tire, at least one sensor coupled with the wheel, at least one sensor coupled with a portion of the vehicle which monitors rotation of a tire and/or rotation of a wheel, some combination thereof, etc. In one embodiment, the position of an energy transfer component of a wheel and/or an energy transfer component of a tire may be determined based upon an orientation of the wheel and/or tire. For example, responsive to detecting in step 2905 that wheel 1840 and/or tire 1830 are in the orientation depicted in FIG. 18, it may be further determined in step 2905 that energy transfer component 1844 and/or 1834 are within a predetermined distance from surface 1890 and/or in a position to transfer energy with energy transfer component 1721 (e.g., based on information from a manufacturer of wheel 1840, based on information from a manufacturer of tire 1830, based on a calibration performed after installing wheel 1840 and/or tire 1830 on vehicle 1802, etc.). As another example, an energy transfer component of a vehicle (e.g., 1834, 1844, etc.) may be configured (e.g., in a position detection mode, in an energy transfer mode, etc.) to determine the position of an energy transfer component of an energy transfer system (e.g., 1721) responsive to detecting in step 2905 that the energy transfer component of the vehicle is in a particular position or range of positions (e.g., within a predetermined distance from surface 1890, etc.), thereby enabling the determination of a position of an energy transfer component of an energy transfer system based upon an orientation (e.g., angular position, etc.) of a wheel of the vehicle (e.g., 1840, 2220, 2310, 2350, 2420, etc.) and/or a tire of the vehicle (e.g., 1830, 2210, 2260, 2410, etc.).

Step 2905 may be performed before an energy transfer, during an energy transfer, after an energy transfer, or some combination thereof. For example, one or more components (e.g., pre-transfer control component 1350, pre-transfer control component 1390, pre-transfer processing component 620, etc.) may be used to detect, determine or otherwise access the position of the vehicle before an energy transfer to facilitate the initiation or setup of at least one energy transfer, to facilitate the initiation or setup of at least one transaction for the at least one energy transfer, for some other purpose, etc. As another example, one or more components (e.g., interface component 211, energy transfer management component 1410, interface component 221, energy transfer processing component 630, etc.) may be used to detect, determine or otherwise access the position of the vehicle during an energy transfer to facilitate the performance of at least one energy transfer, for some other purpose, etc. And as yet another example, one or more components (e.g., post-transfer control component 1351, post-transfer control component 1391, post-transfer processing component 640, etc.) may be used to detect, determine or otherwise access the position of the vehicle after an energy transfer to facilitate the conclusion of at least one energy transfer, to facilitate the conclusion of at least one transaction for the at least one energy transfer, for some other purpose, etc.

As shown in FIG. 29A, step 2910 involves communicating with the vehicle. At least one communication may be sent between the vehicle and at least one energy transfer system, between the vehicle and at least one other vehicle, between the vehicle and at least one other system (e.g., interface system 550, payment system 560, computer system 2890, etc.), some combination thereof, etc. At least one communication (e.g., including data) may be sent in step 2910 over at least one energy transfer interface (e.g., 132, 231, 234, 237, 2031, 2034a, 2034b, 2034c, 2034d, 2037a, 2037b, 2832, etc.), at least one signal interface (e.g., 134, 2834, etc.) which is separate from an energy transfer interface, over another type of interface (e.g., a cellular network such as a cellular data network, a cellular phone network, etc.), some combination thereof, etc. And in one embodiment, step 2910 may be performed by at least one component of a vehicle (e.g., communication interface 242, communication component 2823, communication component 2843, etc.), at least one component of an energy transfer system (e.g., communication interface 241, communication interface 441a, communication interface 441b, communication interface 441c, etc.), at least one component of another system (e.g., interface system 550, payment system 560, computer system 2890, etc.), some combination thereof, etc.

Step 2910 may be performed before an energy transfer, during an energy transfer, after an energy transfer, or some combination thereof. For example, one or more components (e.g., pre-transfer control component 1350, pre-transfer control component 1390, pre-transfer processing component 620, interface component 211, interface component 221, etc.) may be used to communicate with the vehicle before an energy transfer to facilitate the initiation or setup of at least one energy transfer, to facilitate the initiation or setup of at least one transaction for the at least one energy transfer, for some other purpose, etc. As another example, one or more components (e.g., interface component 211, energy transfer management component 1410, interface component 221, energy transfer processing component 630, etc.) may be used to communicate with the vehicle during an energy transfer to facilitate the performance of at least one energy transfer, for some other purpose, etc. And as yet another example, one or more components (e.g., post-transfer control component 1351, post-transfer control component 1391, post-transfer processing component 640, interface component 211, interface component 221, etc.) may be used to communicate with the vehicle after an energy transfer to facilitate the conclusion of at least one energy transfer, to facilitate the conclusion of at least one transaction for the at least one energy transfer, for some other purpose, etc.

In one embodiment, step 2910 may involve establishing communication with a vehicle by determining at least one interface (e.g., an energy transfer interface, a signal interface, another type of interface, etc.) available to communicate signals, synchronizing components used to perform the communication (e.g., communication interface 241 and communication interface 242, at least one component of an energy transfer system and at least one component of the vehicle, etc.), executing at least one handshake procedure, some combination thereof, etc. Step 2910 may involve identifying the vehicle based on information about the vehicle (e.g., a vehicle identifier or other data used to identify the vehicle, data communicated from the vehicle, data communicated from the energy transfer system, etc.), an image (e.g., captured using camera 1321, camera 1371, etc.) of the license plate or another component of the vehicle, some combination thereof, etc. And in one embodiment, step 2910 may involve communicating information such as at least one attribute of an energy transfer (e.g., an energy transfer type, an interface type, a power, a current, a voltage, an energy transfer profile, a duration, a waveform, a temperature, etc.), at least one cost (e.g., billable to an individual and/or entity associated with the vehicle, billable to an individual and/or entity associated with the energy transfer system, etc.) associated with an energy transfer, authentication information (e.g., credentials, information associated with an authentication of a component, information associated with an authentication of a user, etc.), information associated with vehicle security (e.g., a result of an authentication of a component, a result of an authentication of a user, a detection of a tampering, image data or video data associated with surveillance or monitoring of a vehicle and/or an energy transfer system, audio data associated with surveillance or monitoring of a vehicle and/or an energy transfer system, etc.), any information presented by or input using GUI 800, any information presented by or input using GUI 900, any information presented by or input using GUI 1000, other types of information, some combination thereof, etc.

As shown in FIG. 29A, step 2915 involves monitoring the vehicle. Step 2915 may be performed before an energy transfer (e.g., using pre-transfer control component 1350, pre-transfer control component 1390, pre-transfer processing component 620, interface component 211, interface component 221, etc.), during an energy transfer (e.g., using interface component 211, energy transfer management component 1410, interface component 221, energy transfer processing component 630, etc.), after an energy transfer (e.g., using post-transfer control component 1351, post-transfer control component 1391, post-transfer processing component 640, interface component 211, interface component 221, etc.), or some combination thereof. And in one embodiment, step 2915 may be automatically initiated or performed responsive to step 2910 and/or step 2905.

In one embodiment, the monitoring in step 2915 may be performed using a component of the vehicle. For example, an attribute (e.g., an energy transfer type, an interface type, a power, a current, a voltage, an energy transfer profile, a duration, a waveform, a temperature, etc.) associated with an energy transfer (e.g., between the vehicle and an energy transfer system, between the vehicle and another vehicle, etc.) may be determined or measured in step 2915 using a component of the vehicle (e.g., meter 229, etc.). As another example, a component of the vehicle may be used to determine or measure a status associated with an energy transfer (e.g., between the vehicle and an energy transfer system, between the vehicle and at least one other vehicle, etc.) in step 2915, where the status associated with an energy transfer may be a status associated with an energy transfer interface (e.g., as displayed in region 1020, 1021, 1022, etc. of GUI 1000), a status associated with a signal interface (e.g., as displayed in region 1023 of GUI 1000), a status of at least one energy transfer (e.g., as displayed in region 1024 of GUI 1000), etc. As yet another example, a status (e.g., opened, closed, on, off, activated, deactivated, in a low-power mode, in a higher-power mode, in a location, at a rotational speed, etc.) of one or more components of a vehicle (e.g., a door, a hood, a trunk, a canopy, a headlight, an interior light, a radio, a communication system, a propeller, a rotor, etc.) may be determined or measured in step 2915 using a component of the vehicle (e.g., a sensor or other component configured to determine or measure the status). And as a further example, a parameter of the vehicle (e.g., a temperature, pressure, fluid level, voltage, rotational speed of a component, etc.) may be determined or measured in step 2915 using a sensor of the vehicle.

As another example, step 2915 may involve capturing (e.g., using camera 1371, another image capture device, etc.) one or more images (e.g., at least one still image, at least one frame of video data, etc.) of at least one component of the vehicle, at least one component of at least one energy transfer system, a user of the vehicle, a user attempting to perform an energy transfer involving the vehicle, other objects at the site of an energy transfer, some combination thereof, etc. And as yet another example, step 2915 may involve capturing (e.g., using microphone 1373, another audio capture device, etc.) sound of at least one component of the vehicle, at least one component of at least one energy transfer system, a user of the vehicle, a user attempting to perform an energy transfer involving the vehicle, other objects at the site of an energy transfer, some combination thereof, etc.

In one embodiment, step 2915 may be performed by a component of a system external to or separate from the vehicle (e.g., an energy transfer system, interface system 550, etc.). For example, step 2915 may involve capturing (e.g., using camera 1321, another image capture device, etc.) one or more images (e.g., at least one still image, at least one frame of video data, etc.) of at least one component of the vehicle, at least one component of at least one energy transfer system, a user of the vehicle, a user attempting to perform an energy transfer involving the vehicle, other objects at the site of an energy transfer, some combination thereof, etc. As another example, step 2915 may involve capturing (e.g., using microphone 1323, another audio capture device, etc.) sound of at least one component of the vehicle, at least one component of at least one energy transfer system, a user of the vehicle, a user attempting to perform an energy transfer involving the vehicle, other objects at the site of an energy transfer, some combination thereof, etc.

As yet another example, an attribute (e.g., an energy transfer type, an interface type, a power, a current, a voltage, an energy transfer profile, a duration, a waveform, a temperature, etc.) associated with an energy transfer (e.g., between the vehicle and an energy transfer system, between the vehicle and at least one other vehicle, etc.) may be determined or measured in step 2915 using a component (e.g., meter 219, another component, etc.) of a system external to or separate from the vehicle (e.g., the energy transfer system, interface system 550, etc.). As another example, a component of a system other than the vehicle may be used to determine or measure a status associated with an energy transfer (e.g., between the vehicle and an energy transfer system, between the vehicle and another vehicle, etc.) in step 2915, where the status associated with an energy transfer may be a status associated with an energy transfer interface (e.g., as displayed in region 1020, 1021, 1022, etc. of GUI 1000), a status associated with a signal interface (e.g., as displayed in region 1023 of GUI 1000), a status of at least one energy transfer (e.g., as displayed in region 1024 of GUI 1000), etc. As yet another example, a status (e.g., opened, closed, on, off, activated, deactivated, in a low-power mode, in a higher-power mode, in a certain location, rotational speed, etc.) of one or more components of a vehicle (e.g., a door, a hood, a trunk, a canopy, a headlight, an interior light, a radio, a communication system, a rotor, etc.) may be determined or measured in step 2915 using a component (e.g., a sensor or other component separate from the vehicle and configured to determine or measure the status) of a system other than the vehicle. And as a further example, a parameter of the vehicle (e.g., a temperature, pressure, fluid level, voltage, rotational speed of a component, etc.) may be determined or measured in step 2915 using a component (e.g., a sensor or other component separate from the vehicle and configured to determine or measure the parameter) of a system other than the vehicle.

In one embodiment, step 2915 may be performed using a component of the vehicle in combination with a component of a system external to or separate from the vehicle (e.g., the energy transfer system, interface system 550, etc.). For example, information from the component of the vehicle and information from the component of the system other than the vehicle may be combined in step 2915 (e.g., video data from each source may be merged or otherwise processed for contemporaneous display, audio data from each source may be merged or otherwise processed for contemporaneous playback, etc.), processed to determine a result (e.g., separate values of a parameter may be averaged or otherwise processed to determine a resultant value for the parameter, etc.), etc.

In one embodiment, step 2915 may involve communicating information which is measured or determined. For example, information may be communicated from the vehicle to another system (e.g., an energy transfer system, interface system 550, etc.), from an energy transfer system to another system (e.g., the vehicle, interface system 550, etc.), from one system (e.g., interface system 550) to another system (e.g., the vehicle, an energy transfer system, etc.), etc. As such, in one embodiment, step 2915 may implement remote monitoring of the vehicle, an energy transfer system, another vehicle or system, etc.

As shown in FIG. 29A, step 2920 involves performing an authentication of a user and/or at least one component. In one embodiment, step 2920 may be performed by a component of the vehicle (e.g., authentication component 1380, authentication component 2822, authentication component 2842, etc.) and/or a component of a system other than the vehicle (e.g., authentication component 1340, etc.). And in one embodiment, step 2920 may be performed in accordance with one or more steps of process 3000 of FIG. 30A and/or FIG. 30B.

Figure 30A:
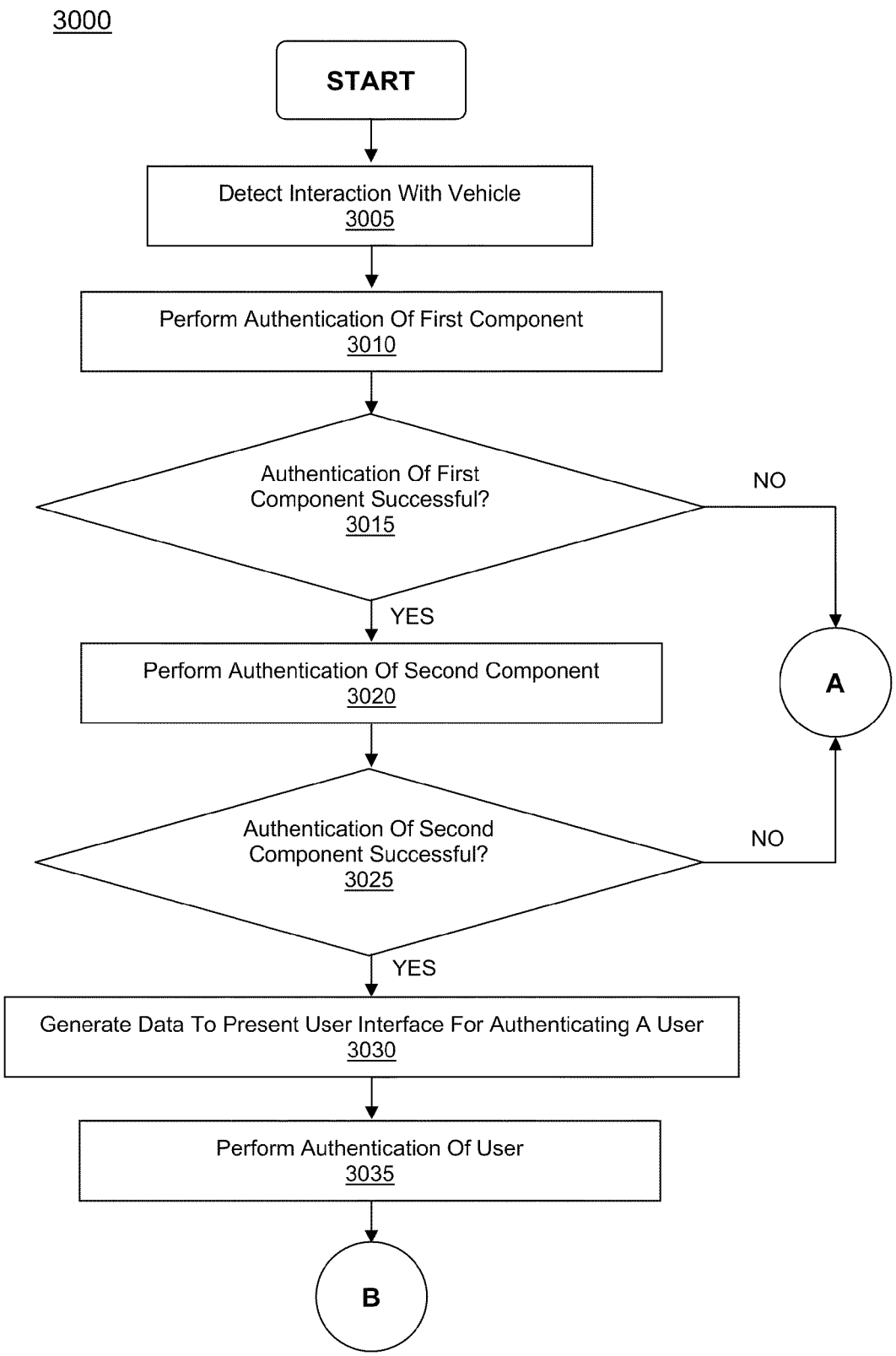
FIG. 30A shows a flowchart of a first portion of a computer-implemented process for increasing vehicle security in accordance with one embodiment of the present invention.
Figure 30B:
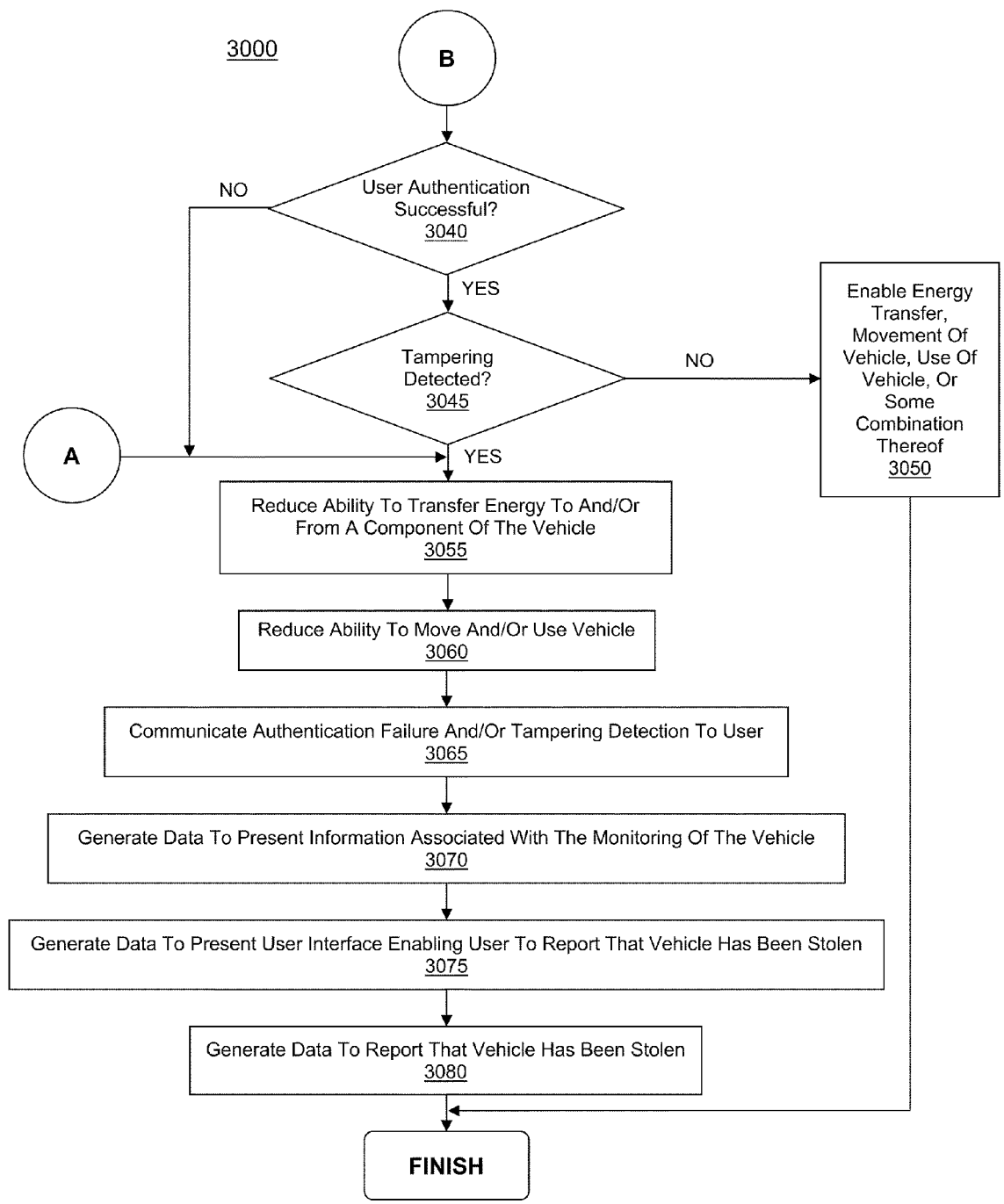
FIG. 30B shows a flowchart of a second portion of a computer-implemented process for increasing vehicle security in accordance with one embodiment of the present invention.

FIGS. 30A and 30B show a flowchart of computer-implemented process 3000 for increasing vehicle security in accordance with one embodiment of the present invention. As shown in FIG. 30A, step 3005 involves detecting an interaction with a vehicle (e.g., 120, 320a, 320b, 320c, 1802, etc.). For example, step 3005 may involve detecting an interaction with a vehicle such as an attempt to gain access to a compartment or region of the vehicle (e.g., by opening a door, hood, trunk, canopy, cover, etc.), an attempt to start the vehicle, an attempt to use or move the vehicle, an attempt to turn on a radio or other component of the vehicle, etc. As another example, step 3005 may involve detecting an attempt to transfer energy to and/or from an energy storage component (e.g., 216, 226, etc.), another component of the vehicle (e.g., security component 2820, security component 2840, motor 2850, transmission 2860, braking system 2870, steering wheel 2880, etc.), some combination thereof, etc.

Step 3010 involves performing an authentication of a first component. In one embodiment, the first component may be a component other than an energy storage component (e.g., 226) or any component thereof (e.g., energy storage medium 2810, security component 2820, authentication component 2822, etc.). For example, the first component may be security component 2840, authentication component 2842, interface component 221, power management component 225, power source 227, motor 2850, transmission 2860, braking system 2870, steering wheel 2880, another component of the vehicle, a component of an energy transfer system (e.g., 110, 710a, 710b, 710c, etc.), a component of a system other than the vehicle, etc. In one embodiment, the first component may be any component attempting to use or otherwise access energy storage component 226 or any component thereof (e.g., energy storage medium 2810, security component 2820, authentication component 2822, etc.). As such, in one embodiment, unauthorized use of and/or access to energy storage component 226 may be reduced (e.g., by reducing the ability or ease of using energy storage component 226 in a vehicle other than vehicle 120, by reducing unauthorized transfers of energy to and/or from energy storage component 226, etc.).

In one embodiment, the authentication in step 3010 may be performed by authentication component 2822. For example, authentication component 2822 may compare an identifier (e.g., generated and/or sent from the component undergoing authentication) to authentication data (e.g., stored in memory 2826, a register of processor 2825, another portion of security component 2820, etc.). In one embodiment, the identifier may be a unique identifier which is associated with only the component undergoing authentication and does not correspond to or otherwise identify any other component. In one embodiment, the identifier may be a unique identifier which is associated with only the vehicle (e.g., 120, 320a, 320b, 320c, 1802, etc.) and does not correspond to or otherwise identify any other vehicle. In one embodiment, the identifier may be a key (e.g., public key, private key, etc.), data encrypted or encoded by a component performing the authentication or by another trusted party, etc. In one embodiment, the identifier may be sent in step 3010 from the component undergoing authentication responsive to a request for identification sent from authentication component 2822. In one embodiment, communications sent in step 3010 between security component 2820 and the component undergoing authentication may be encrypted (e.g., by the sender) and/or decrypted (e.g., by the recipient).

In one embodiment, the authentication in step 3010 may be performed by computer system 2890. For example, computer system 2890 may compare an identifier (e.g., generated and/or sent from the component undergoing authentication) to authentication data. For example, where the authentication data is stored in security component 2820 (e.g., stored in memory 2826, a register of processor 2825, another portion of security component 2820, etc.), the identifier and the authentication data may be sent (e.g., separately, together, sequentially, simultaneously or contemporaneously, etc.) in step 3010 to computer system 2890 via communication interface 242 for comparison by computer system 2890.

As another example, where computer system 2890 includes or can otherwise access the authentication data (e.g., 2895), the identifier may be sent in step 3010 to computer system 2890 via communication interface 242 for comparison with authentication data 2895 by computer system 2890. Authentication data 2895 may be part of a data structure or database which includes an index of components (e.g., including energy storage component 226, security component 2820, some combination thereof, etc.) and respective authentication data corresponding to each of the components, where the data structure or database may be indexed in step 3010 using an identifier of a component (e.g., energy storage component 226, security component 2820, some combination thereof, etc.) to access authentication data for comparison to the identifier of the component undergoing authentication. In one embodiment, the identifier of the other component (e.g., energy storage component 226, security component 2820, some combination thereof, etc.) may be sent in step 3010 to computer system 2890 along with (e.g., simultaneously with, contemporaneously with, as part of the same data packet, etc.) or separate from (e.g., sequentially with, at another time than, in a different data packet, etc.) the identifier of the component undergoing authentication.

In one embodiment, the identifier of the component undergoing authentication may be sent (e.g., to computer system 2890) in step 3010 from the component undergoing authentication responsive to a request for identification sent from authentication component 2822. In one embodiment, the identifier sent in step 3010 to computer system 2890 may be a unique identifier which is associated with only the component undergoing authentication and does not correspond to or otherwise identify any other component. In one embodiment, the identifier may be a key (e.g., public key, private key, etc.), data encrypted or encoded by a component performing the authentication or by another trusted party, etc. In one embodiment, communications sent in step 3010 between security component 2820, the component undergoing authentication, computer system 2890, or some combination thereof, may be encrypted (e.g., by the sender) and/or decrypted (e.g., by the recipient).

In one embodiment, step 3010 may involve processing the identifier (e.g., of the component undergoing authentication) and/or the authentication data before comparison. For example, the identifier (e.g., of the component undergoing authentication) and/or the authentication data may be decrypted before comparison, alternatively processed or altered before comparison, etc.

As shown in FIG. 30A, step 3015 involves determining whether the authentication of the first component (e.g., performed in step 3010) is successful. In one embodiment, the authentication performed in step 3010 may be successful (e.g., the component undergoing authentication is determined to be authorized) if the identifier associated with the component undergoing authentication matches the authentication data (e.g., stored in memory 2826, stored in a register of processor 2825, stored in another portion of security component 2820, authentication data 2895, etc.). Alternatively, the authentication performed in step 3010 may be unsuccessful (e.g., the component undergoing authentication is determined not to be authorized) if the identifier associated with the component undergoing authentication does not match the authentication data (e.g., stored in memory 2826, stored in a register of processor 2825, stored in another portion of security component 2820, authentication data 2895, etc.). If the authentication is not successful, then step 3055 of FIG. 30B may be performed. Alternatively, if the authentication is successful, then step 3020 may be performed.

Step 3020 involves performing an authentication of a second component. In one embodiment, the second component may be an energy storage component (e.g., 226) or some component thereof (e.g., security component 2820, authentication component 2822, etc.). In one embodiment, the second component may be any component (of the vehicle, of another vehicle, of an energy transfer system, of another system or device, etc.) attempting to use or otherwise access a component of the vehicle (e.g., security component 2840, authentication component 2842, interface component 221, power management component 225, power source 227, motor 2850, transmission 2860, braking system 2870, steering wheel 2880, another component of the vehicle, etc.). As such, in one embodiment, unauthorized access to vehicle 120 may be reduced (e.g., by reducing the ability or ease of using an unauthorized device or system to power, move, use or otherwise access to the vehicle or a component thereof).

In one embodiment, the authentication in step 3020 may be performed by authentication component 2842. For example, authentication component 2842 may compare an identifier (e.g., generated and/or sent from the component undergoing authentication) to authentication data (e.g., stored in memory 2846, a register of processor 2845, another portion of security component 2840, etc.). In one embodiment, the identifier may be a unique identifier which is associated with only the component undergoing authentication and does not correspond to or otherwise identify any other component. In one embodiment, the identifier may be a unique identifier which is associated with only the vehicle (e.g., 120, 320*a*, 320*b*, 320*c*, 1802, etc.) and does not correspond to or otherwise identify any other vehicle. In one embodiment, the identifier may be a key (e.g., public key, private key, etc.), data encrypted or encoded by a component performing the authentication or by another trusted party, etc. In one embodiment, the identifier may be sent in step 3020 from the component undergoing authentication responsive to a request for identification sent from authentication component 2842. In one embodiment, communications sent in step 3020 between security component 2840 and the component undergoing authentication may be encrypted (e.g., by the sender) and/or decrypted (e.g., by the recipient).

In one embodiment, the authentication in step 3020 may be performed by computer system 2890. For example, computer system 2890 may compare an identifier (e.g., generated and/or sent from the component undergoing authentication) to authentication data. For example, where the authentication data is stored in security component 2840 (e.g., stored in memory 2846, a register of processor 2845, another portion of security component 2840, etc.), the identifier and the authentication data may be sent (e.g., separately, together, sequentially, simultaneously, contemporaneously, etc.) in step 3020 to computer system 2890 via communication interface 242 for comparison by computer system 2890.

As another example, where computer system 2890 includes or can otherwise access the authentication data (e.g., 2895), the identifier may be sent in step 3020 to computer system 2890 via communication interface 242 for comparison with authentication data 2895 by computer system 2890. Authentication data 2895 may be part of a data structure or database which includes an index of components (e.g., including security component 2840, a component which includes security component 2840, motor 2850, transmission 2860 braking system 2870, steering wheel 2880, some combination thereof, etc.) and respective authentication data corresponding to each of the components, where the data structure or database may be indexed in step 3020 using an identifier of a component (e.g., security component 2840, a component which includes security component 2840, motor 2850, transmission 2860 braking system 2870, steering wheel 2880, some combination thereof, etc.) to access authentication data for comparison to the identifier of the component undergoing authentication. In one embodiment, the identifier of the other component (e.g., security component 2840, a component which includes security component 2840, motor 2850, transmission 2860 braking system 2870, steering wheel 2880, some combination thereof, etc.) may be sent in step 3020 to computer system 2890 along with (e.g., simultaneously with, contemporaneously with, as part of the same data packet, etc.) or separate from (e.g., sequentially with, at another time than, in a different data packet, etc.) the identifier of the component undergoing authentication.

In one embodiment, the identifier of the component undergoing authentication may be sent (e.g., to computer system 2890) in step 3020 from the component undergoing authentication responsive to a request for identification sent from authentication component 2842. In one embodiment, the identifier sent in step 3020 to computer system 2890 may be a unique identifier which is associated with only the component undergoing authentication and does not correspond to or otherwise identify any other component. In one embodiment, the identifier may be a key (e.g., public key, private key, etc.), data encrypted or encoded by a component performing the authentication or by another trusted party, etc. In one embodiment, communications sent in step 3020 between security component 2840, the component undergoing authentication, computer system 2890, or some combination thereof, may be encrypted (e.g., by the sender) and/or decrypted (e.g., by the recipient).

In one embodiment, step 3020 may involve processing the identifier (e.g., of the component undergoing authentication) and/or the authentication data before comparison. For example, the identifier (e.g., of the component undergoing authentication) and/or the authentication data may be decrypted before comparison, alternatively processed or altered before comparison, etc.

As shown in FIG. 30A, step 3025 involves determining whether the authentication of the second component (e.g., performed in step 3020) is successful. In one embodiment, the authentication performed in step 3020 may be successful (e.g., the component undergoing authentication is determined to be authorized) if the identifier associated with the component undergoing authentication matches the authentication data (e.g., stored in memory 2846, stored in a register of processor 2845, stored in another portion of security component 2840, authentication data 2895, etc.). Alternatively, the authentication performed in step 3020 may be unsuccessful (e.g., the component undergoing authentication is determined not to be authorized) if the identifier associated with the component undergoing authentication does not match the authentication data (e.g., stored in memory 2846, stored in a register of processor 2845, stored in another portion of security component 2840, authentication data 2895, etc.). If the authentication is not successful, then step 3055 of FIG. 30B may be performed. Alternatively, if the authentication is successful, then step 3030 may be performed.

Step 3030 involves generating data to present a user interface for authenticating a user. For example, data may be generated in step 3030 to present a GUI (e.g., 1000) with a region (e.g., 1040) enabling a user to enter information (e.g., a code, a username, a password, etc.) used to authenticate the user (e.g., to determine if the user is authorized to perform an energy transfer associated with the vehicle, use the vehicle, move the vehicle, etc.). The information (e.g., a code, a username, a password, etc.) used to authenticate the user may be entered using a region of the GUI (e.g., character entry region 1044 including one or more "soft keys" enabling the input of a character such as a letter, number, symbol, etc.), an input device of the vehicle (e.g., one or more physical buttons or keys, a touch screen, an audio input system, a voice recognition system, an optical recognition system capable of recognizing a fingerprint or eye, etc.), an input device of an energy transfer system (e.g., one or more physical buttons or keys, a touch screen, a voice recognition system, an optical recognition system capable of recognizing a fingerprint or eye, etc.), etc. The user interface may be displayed on a display device (e.g., 725, 521, 522, 523, etc.) of the vehicle (e.g., 120, 320*a*, 320*b*, 320*c*, 1802, etc.), a display device (e.g., 795, 591, 593, 595, etc.) of a computer system (e.g., 790, 590, 592, 594, etc.), a display device (e.g., 511, etc.) of an energy transfer system (e.g., 110, 710*a*, 710*b*, 710*c*, etc.), another display device, etc. The data may be generated in step 3030 to display the user interface responsive to an interaction with the vehicle (e.g., in step 3005), a change in speed of the vehicle, a change in acceleration of the vehicle, a stopping of the vehicle, a change in status of a component of the vehicle (e.g., an opening of a door, a closing of a door, a setting of a parking brake, a release of a parking brake, a placement of a gear shift lever in a "park" setting, a gear change implemented within the transmission, etc.), some combination thereof, etc.

As shown in FIG. 30A, step 3035 involves performing an authentication of a user. For example, the information entered by the user (e.g., via the GUI displayed using the data generated in step 3030) may be compared to other information (e.g., a code, a username, a password, etc. entered using region 940 of FIG. 9) to determine if a user is authorized to perform an energy transfer associated with the vehicle (e.g., transfer energy to the vehicle, transfer energy from the vehicle, etc.), use the vehicle, move the vehicle, etc. The authentication may be performed in step 3035 by a component of the vehicle (e.g., authentication component 1380, authentication component 2822, authentication component 2842, etc.), a component of an energy transfer system (e.g., authentication component 1340, etc.), a component of interface system 550 (e.g., pre-transfer processing component 620, energy transfer processing component 630, post-transfer processing component 640, etc.), computer system 2890, some combination thereof, etc. In one embodiment, step 3035 may involve communicating the information entered by the user from one system (e.g., interface system 550) to another system (e.g., the system performing the comparison). And in one embodiment, step 3035 may involve communicating the other information (e.g., a code, a username, a password, etc. entered using region 940 of FIG. 9) from one system (e.g., the system or device presenting the user interface based on data generated in step 3030, the system or device which stores the information entered via the user interface presented using data generated in step 3030, etc.) to another system (e.g., the system performing the comparison).

As shown in FIG. 30B, step 3040 involves determining whether the authentication of the user (e.g., performed in step 3035) is successful. In one embodiment, the authentication performed in step 3035 may be successful (e.g., the user is determined to be authorized) if the information entered by the user (e.g., via the GUI displayed using data generated in step 3030) matches the other information (e.g., a code, a username, a password, etc. entered using region 940 of FIG. 9). Alternatively, the authentication performed in step 3035 may be unsuccessful (e.g., the user is determined to be unauthorized) if the information entered by the user (e.g., via the GUI displayed using data generated in step 3030) does not match the other information (e.g., a code, a username, a password, etc. entered using region 940 of FIG. 9). If the authentication is not successful, then step 3055 may be performed. Alternatively, if the authentication is successful, then step 3045 may be performed.

Step 3045 involves determining whether any tampering is detected. For example, step 3045 may involve determining whether any tampering is detected (e.g., by tampering detection component 2827) with a housing (e.g., 2830) of an energy storage component (e.g., 226). As another example, step 3045 may involve determining whether any tampering is detected (e.g., by tampering detection component 2847) with a housing of another component (e.g., motor 2850, transmission 2860, braking system 2870, steering wheel 2880, etc.). In one embodiment, step 3045 may be performed by tampering detection component 2827, tampering detection component 2847, processor 2825, processor 2845, a component of an energy transfer system, a component of interface system 550 (e.g., pre-transfer processing component 620, energy transfer processing component 630, post-transfer processing component 640, etc.), computer system 2890, some combination thereof, etc.

If tampering is not detected in step 3045, then step 3050 may be performed. Alternatively, if tampering is detected in step 3045, then step 3055 may be performed.

As shown in FIG. 30B, step 3050 involves enabling an energy transfer associated with the vehicle (e.g., from one component of the vehicle to another component of the vehicle, between the vehicle and an energy transfer system, between the vehicle and another vehicle, etc.), movement of the vehicle, use of the vehicle, or some combination thereof. For example, an energy transfer associated with the vehicle may be enabled in step 3050 by a component of the vehicle (e.g., energy regulation component 2821, energy regulation component 2841, interface component 221, power management component 225, charge and/or discharge component 228, meter 229, some combination thereof, etc.), a component of an energy transfer system (e.g., interface component 211, power management component 215, charge and/or discharge component 218, meter 219, energy transfer management component 1410, some combination thereof, etc.), a component of another system (e.g., interface system 550, computer system 2890, etc.), some combination thereof, etc. As another example, movement of the vehicle may be enabled in step 3050 by enabling energy to be transferred to and/or from a component (e.g., energy storage component 226, motor 2850, transmission 2860, braking system 2870, steering wheel 2880, etc.) of the vehicle (e.g., by controlling or otherwise using energy regulation component 2821, energy regulation component 2841, some combination thereof, etc.), by enabling or activating a component (e.g., energy storage component 226, motor 2850, transmission 2860, braking system 2870, steering wheel 2880, etc.) of the vehicle (e.g., by controlling or otherwise using vehicle movement control component 2844), some combination thereof, etc. As yet another example, use of the vehicle may be enabled in step 3050 by enabling energy to be transferred to and/or from a component (e.g., energy storage component 226, motor 2850, transmission 2860, braking system 2870, steering wheel 2880, etc.) of the vehicle (e.g., by controlling or otherwise using energy regulation component 2821, energy regulation component 2841, some combination thereof, etc.), by enabling or activating a component (e.g., energy storage component 226, motor 2850, transmission 2860, braking system 2870, steering wheel 2880, etc.) of the vehicle (e.g., by controlling or otherwise using vehicle movement control component 2844), some combination thereof, etc.

As shown in FIG. 30B, step 3055 involves reducing an ability to transfer energy to and/or from a component (e.g., energy storage component 226, motor 2850, transmission 2860, braking system 2870, steering wheel 2880, another component of the vehicle, some combination thereof, etc.) of the vehicle. Step 3055 may be performed by controlling or otherwise using a component of the vehicle (e.g., energy regulation component 2821, energy regulation component 2841, interface component 221, power management component 225, charge and/or discharge component 228, meter 229, some combination thereof, etc.), a component of an energy transfer system (e.g., interface component 211, power management component 215, charge and/or discharge component 218, meter 219, energy transfer management component 1410, some combination thereof, etc.), a component of another system (e.g., interface system 550, computer system 2890, etc.), some combination thereof, etc.

Step 3060 involves reducing the ability to move and/or use the vehicle. Step 3060 may be performed by providing a reduced amount of energy to and/or from a component (e.g., energy storage component 226, motor 2850, transmission 2860, braking system 2870, steering wheel 2880, etc.) of the vehicle (e.g., by controlling or otherwise using energy regulation component 2821, energy regulation component 2841, some combination thereof, etc.), by altering at least one parameter (e.g., by limiting the current, voltage, or another parameter) of energy transferred to and/or from a component (e.g., energy storage component 226, motor 2850, transmission 2860, braking system 2870, steering wheel 2880, etc.) of the vehicle (e.g., by controlling or otherwise using energy regulation component 2821, energy regulation component 2841, some combination thereof, etc.), by disabling or deactivating a component (e.g., energy storage component 226, motor 2850, transmission 2860, braking system 2870, steering wheel 2880, etc.) of the vehicle (e.g., by controlling or otherwise using vehicle movement control component 2844), some combination thereof, etc.

As shown in FIG. 30B, step 3065 involves communicating a failure of an authentication (e.g., determined in step 3015, step 3025, step 3040, some combination thereof, etc.) and/or a tampering detection (e.g., determined in step 3045) to a user (e.g., an authenticated or authorized user associated with information entered using GUI 900, a user other than the user causing the authentication failure and tampering, etc.). The failure of the authentication (e.g., determined in step 3015, step 3025, step 3040, some combination thereof, etc.) and/or the tampering detection (e.g., determined in step 3045) may be displayed using a region (e.g., 1095) of a GUI (e.g., 1000) responsive to the communication sent in step 3065 in one embodiment. In one embodiment, the authentication failure and/or tampering detection may be presented using a component of the vehicle (e.g., display device 521, display device 522, display device 523, display device 725, speaker 1374, etc.) responsive to the communication sent in step 3065 in one embodiment. In one embodiment, the authentication failure and/or tampering detection may be presented (e.g., responsive to the communication sent in step 3065) using a component (e.g., an audio output component, a display device, etc.) of a system (e.g., computer system 590, computer system 592, computer system 594, computer system 790, energy transfer system 110, another energy transfer system, etc.) which is located remotely from the vehicle, thereby providing remote notifications to inform users of unauthorized activity associated with the vehicle without requiring the user to be physically at (e.g., outside of, inside of, etc.) or near the vehicle. And in one embodiment, data associated with the authentication failure and/or tampering detection may be sent in step 3065 via interface system 550 (e.g., from the system performing the authentication and/or determining that tampering is detected to interface system 550, from interface system 550 to the system presenting the authentication failure and/or tampering detection, etc.).

Step 3070 involves generating data to present information associated with the monitoring of the vehicle (e.g., as performed in step 2915 of process 2900). The information associated with the monitoring of the vehicle may be presented (e.g., based on data generated in step 3070) using a region (e.g., 1030) of a GUI (e.g., 1000) in one embodiment. And in one embodiment, the information associated with the monitoring of the vehicle may be presented (e.g., based on data generated in step 3070) to an authenticated or authorized user (e.g., associated with information entered using GUI 900), a user other than the user causing the authentication failure and tampering, etc.

In one embodiment, the information associated with the monitoring of the vehicle may be presented (e.g., based on data generated in step 3070) using a component of the vehicle (e.g., display device 521, display device 522, display device 523, display device 725, speaker 1374, etc.). In one embodiment, the information associated with the monitoring of the vehicle may be presented (e.g., based on data generated in step 3070) using a component (e.g., an audio output component, a display device, etc.) of a system (e.g., computer system 590, computer system 592, computer system 594, computer system 790, energy transfer system 110, another energy transfer system, etc.) which is located remotely from the vehicle, thereby enabling remote monitoring of the vehicle without requiring the user to be physically at (e.g., outside of, inside of, etc.) or near the vehicle.

In one embodiment, step 3070 may involve communicating the data to the system presenting the information associated with the monitoring of the vehicle. And in one embodiment, step 3070 may involve communicating the data to the system presenting the information associated with the monitoring of the vehicle via interface system 550 (e.g., from the system performing the monitoring of the vehicle to interface system 550, from interface system 550 to the system presenting the information associated with the monitoring of the vehicle, etc.).

As shown in FIG. 30B, step 3075 involves generating data to present a user interface enabling a user (e.g., an authenticated or authorized user associated with information entered using GUI 900, a user other than the user causing the authentication failure and tampering, etc.) to report that the vehicle has been stolen. In one embodiment, a GUI (e.g., 1000) may be presented which includes a region (e.g., 1090) enabling a user to report that the vehicle has been stolen, where an interaction with the region (e.g., 1090) may automatically generate data in step 3080 to report to the authorities (e.g. the police) that the vehicle has been stolen. For example, an interaction with the region (e.g., 1090) may generate a request to report the vehicle as stolen and communicate the request to a system for processing the request (e.g., interface system 550, a system associated with the authorities, etc.) in step 3080, where the system may communicate the request to the authorities and/or generate a report (e.g., including information about the vehicle, the user of the vehicle, information about a failure of an authentication, information about a tampering detection, information accessible to interface system 550, etc.) based on the request which can be automatically submitted to the authorities.

In one embodiment, the user interface may be presented (e.g., based on data generated in step 3075) using a component of the vehicle (e.g., display device 521, display device 522, display device 523, display device 725, speaker 1374, etc.). In one embodiment, the user interface may be presented (e.g., based on data generated in step 3075) using a component (e.g., an audio output component, a display device, etc.) of a system (e.g., computer system 590, computer system 592, computer system 594, computer system 790, energy transfer system 110, another energy transfer system, etc.) which is located remotely from the vehicle, thereby enabling a user to report that the vehicle has been stolen without requiring the user to be physically at (e.g., outside of, inside of, etc.) or near the vehicle. And in one embodiment, data associated with the reporting that the vehicle has been stolen may be sent in step 3080 via interface system 550 (e.g., from the system presenting the user interface to interface system 550, from interface system 550 to a system associated with the authorities and/or a system configured to process the request to report the vehicle as stolen, etc.).

Although FIGS. 30A and 30B depict process 3000 with a particular number of steps, it should be appreciated that process 3000 may have a different number of steps in other embodiments. For example, one or more of the steps of process 3000 may be optional and not performed in one embodiment. Additionally, although FIGS. 30A and 30B depict process 3000 with a particular ordering of steps, it should be appreciated that the steps of process 3000 may occur in a different order in other embodiments.

Turning back to FIG. 29A, step 2925 involves determining at least one energy transfer interface operable to transfer energy. In one embodiment, step 2925 may involve determining at least one energy transfer interface (e.g., 132, 231, 234, 237, 2031, 2034a, 2034b, 2034c, 2034d, 2037a, 2037b, 2832, etc.) operable to transfer energy (e.g., able to be made active and/or placed in an energy transfer mode) between at least one vehicle (e.g., 120, 320a, 320b, 320c, 1802, etc.) and at least one energy transfer system (e.g., 110, 710a, 710b, 710c, etc.). In one embodiment, step 2925 may involve determining at least one energy transfer interface operable to transfer energy (e.g., able to be made active and/or placed in an energy transfer mode) between at least one vehicle and at least one other vehicle. Step 2925 may involve determining at least one energy transfer interface operable to transfer energy based on a relative positioning between a plurality of energy transfer components, where the plurality of energy transfer components may include: at least one energy transfer component of a vehicle (e.g., 233, 236, 239, 1821, 1822, 1823, 1824, 1832, 1834, 1842, 1844, 2033, 2036a, 2036b, 2036c, 2036d, 2039a, 2039b, 2230, 2240, 2250, 2270, 2280, 2290, 2320, 2330, 2340, 2360, 2370, 2460, 2461, 2630, 2640, 2730, 2740, some combination thereof, etc.) and at least one energy transfer component of an energy transfer system (e.g., 232, 235, 238, 1610, 1620, 1630, 1645, 1655, 1662, 1665, 1675, 1711, 1712, 1713, 1714, 1715, 1721, 1722, 1723, 1724, 1725, 1726, 1727, 1728, 1731, 1732, 1733, 1734, 1735, 1742, 1744, 1752, 1754, 1783, 1785, 1812, 2032, 2035a, 2035b, 2035c, 2035d, 2038a, 2038b, 2110, 2111, 2112, 2113, 2114, 2115, 2116, 2117, 2118, 2660, 2680, 2730, 2740, some combination thereof, etc.); at least one energy transfer component of a vehicle and at least one energy transfer component of another vehicle; some combination thereof; etc. In one embodiment, step 2925 may involve determining at least one interface which utilizes a first type of energy transfer (e.g., wired using a plug and/or receptacle, inductive, wireless, etc.) and at least one other interface which utilizes a second type of energy transfer (e.g., different from the first type of energy transfer, the same as the first type of energy transfer, etc.). In one embodiment, step 2925 may involve determining at least one energy transfer interface based on a position of the vehicle (e.g., determined in step 2905). And in one embodiment, step 2925 may be performed by a component of the vehicle (e.g., interface component 221, pre-transfer control component 1390, some combination thereof, etc.), a component of an energy transfer system (e.g., interface component 211, pre-transfer control component 1350, energy transfer management component 1410, some combination thereof, etc.), a component of interface system 550 (e.g., pre-transfer processing component 620, energy transfer processing component 630, etc.), a component of another system, some combination thereof, etc. And in one embodiment, step 2925 may be performed similarly to and/or analogously to one or more steps of process 3100 of FIG. 31.

Figure 31:
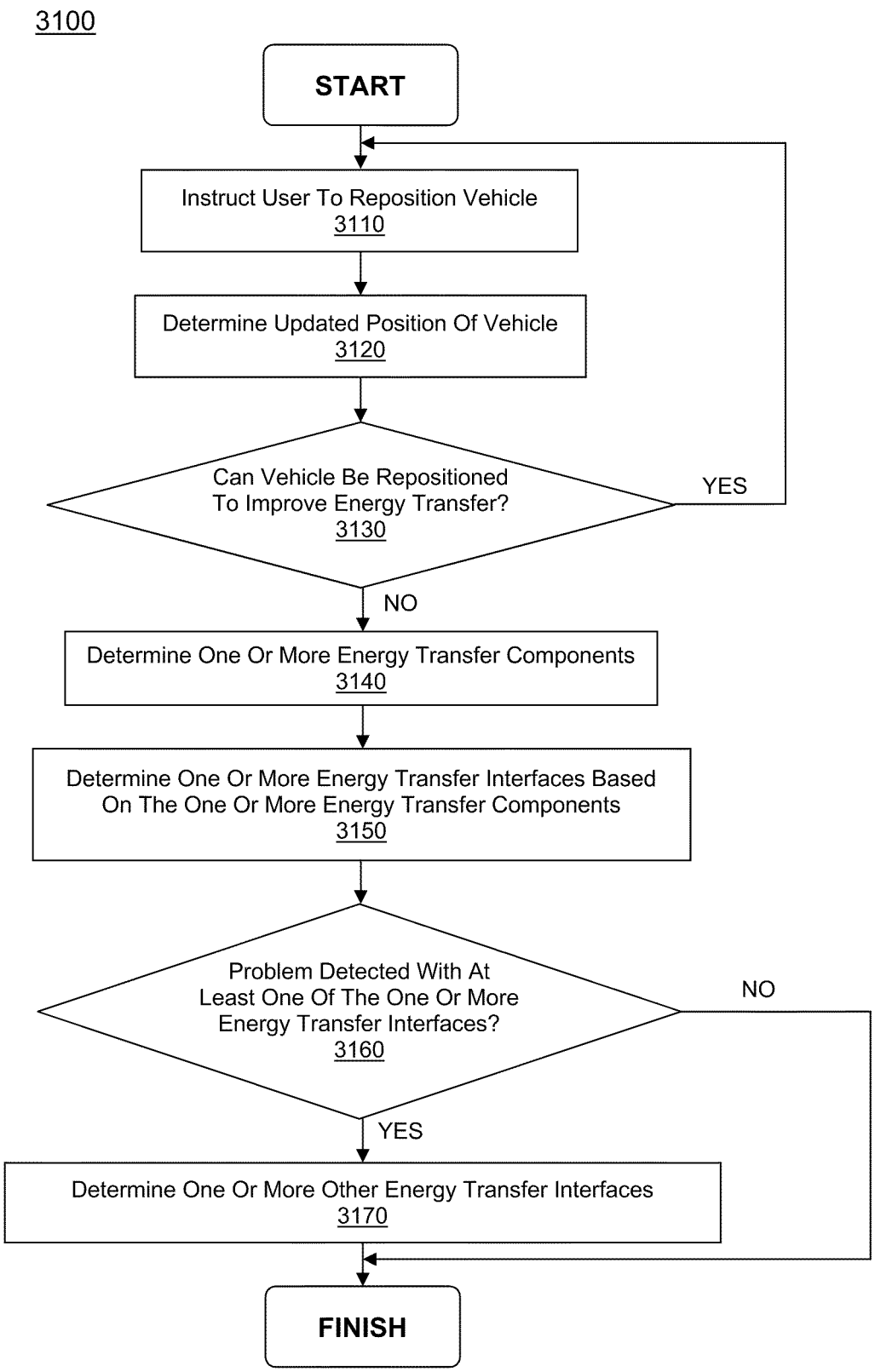
FIG. 31 shows a flowchart of a computer-implemented process for determining at least one energy transfer interface in accordance with one embodiment of the present invention.

FIG. 31 shows a flowchart of computer-implemented process 3100 for determining at least one energy transfer interface in accordance with one embodiment of the present invention. As shown in FIG. 31, step 3110 involves instructing a user to reposition the vehicle. For example, the user may be instructed to reposition the vehicle in step 3110 if it is determined (e.g., based on a position of the vehicle as determined in step 2905 of process 2900) that the vehicle is not in a position to perform an energy transfer or could be alternatively positioned to improve the energy transfer (e.g., to improve an attribute of an energy transfer over one or more energy transfer interfaces, to align energy transfer components to enable an energy transfer over one or more additional energy transfer interfaces, etc.). In one embodiment, step 3110 may involve generating instructions for repositioning a vehicle using at least one guidance component (e.g., 1920, 1950, some combination thereof, etc.), where the instructions may be output using a speaker (e.g., 1324, 1374, etc.), a display (e.g., 511, 521, 522, 523, 591, 593, 595, 725, 795, etc.), some combination thereof, etc. The instructions provided in step 3110 may be verbal instructions, written instructions, visual instructions (e.g., including at least one image), some combination thereof, etc.

Step 3120 involves determining an updated position of the vehicle (e.g., after repositioning the vehicle responsive to the instructions generated in step 3110). Step 3120 may be performed similarly to and/or analogously to step 2905 in one embodiment.

As shown in FIG. 31, step 3130 involves determining whether the vehicle can be repositioned to improve at least one energy transfer. For example, step 3130 may involve determining whether an attribute of an energy transfer over one or more energy transfer interfaces can be improved. As another example, step 3130 may involve determining whether the alignment of energy transfer components can be changed to enable an energy transfer over one or more additional energy transfer interfaces. If it is determined in step 3130 that the vehicle can be repositioned to improve at least one energy transfer, then steps 3110 and 3120 can be repeated. Alternatively, if it is determined in step 3130 that the vehicle need not or should not be repositioned to improve at least one energy transfer (e.g., that the vehicle cannot be repositioned, that the vehicle can be repositioned but without benefitting at least one energy transfer, that the vehicle can be repositioned but the benefit would not justify the effort of repositioning the vehicle and/or the risk that the repositioning may degrade or worsen at least one energy transfer, etc.), then step 3140 may be performed.

Step 3140 involves determining one or more energy transfer components (e.g., capable of implementing an energy transfer between at least one vehicle and at least one energy transfer system, between at least one vehicle and at least one other vehicle, etc.). Step 3140 may be performed by a component of the vehicle (e.g., interface component 221, pre-transfer control component 1390, some combination thereof, etc.), a component of an energy transfer system (e.g., interface component 211, pre-transfer control component 1350, energy transfer management component 1410, some combination thereof, etc.), a component of interface system 550 (e.g., pre-transfer processing component 620, energy transfer processing component 630, etc.), a component of another system, some combination thereof, etc. In one embodiment, step 3140 may be performed similarly to and/or analogously to one or more steps of process 3200 of FIG. 32. And in one embodiment, step 3140 may be performed similarly to and/or analogously to one or more steps of process 3300 of FIG. 33.

Figure 32:
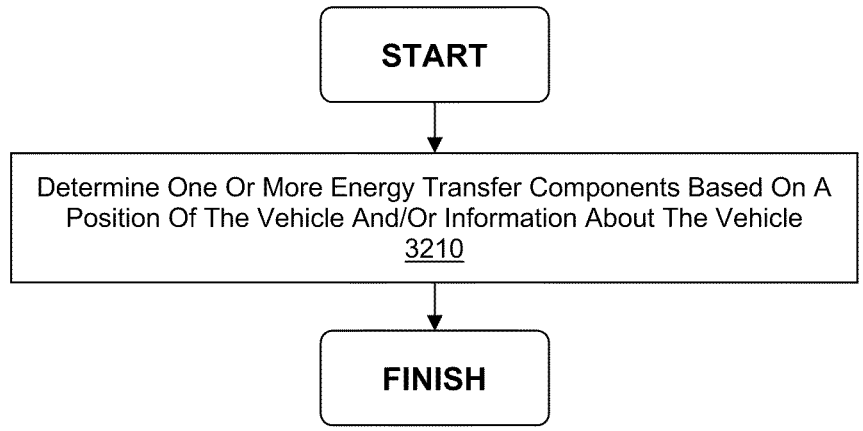
FIG. 32 shows a flowchart of a computer-implemented process for determining at least one energy transfer component in accordance with one embodiment of the present invention.

FIG. 32 shows a flowchart of computer-implemented process 3200 for determining at least one energy transfer component in accordance with one embodiment of the present invention. As shown in FIG. 32, step 3210 involves determining one or more energy transfer components (e.g., capable of implementing an energy transfer between at least one vehicle and at least one energy transfer system, between at least one vehicle and at least one other vehicle, etc.) based on a position of the vehicle and/or information about the vehicle. In one embodiment, a position of the vehicle with respect to a portion of the energy transfer system (e.g., as determined in step 2905 of process 2900, as determined in step 3120 of process 3100, etc.) may be used in step 3210 to determine the position of at least one energy transfer component of a vehicle (e.g., 233, 236, 239, 1821, 1822, 1823, 1824, 1832, 1834, 1842, 1844, 2033, 2036*a*, 2036*b*, 2036*c*, 2036*d*, 2039*a*, 2039*b*, 2230, 2240, 2250, 2270, 2280, 2290, 2320, 2330, 2340, 2360, 2370, 2460, 2461, 2630, 2640, 2730, 2740, some combination thereof, etc.) with respect to at least one energy transfer component of an energy transfer system (e.g., 232, 235, 238, 1610, 1620, 1630, 1645, 1655, 1662, 1665, 1675, 1711, 1712, 1713, 1714, 1715, 1721, 1722, 1723, 1724, 1725, 1726, 1727, 1728, 1731, 1732, 1733, 1734, 1735, 1742, 1744, 1752, 1754, 1783, 1785, 1812, 2032, 2035*a*, 2035*b*, 2035*c*, 2035*d*, 2038*a*, 2038*b*, 2110, 2111, 2112, 2113, 2114, 2115, 2116, 2117, 2118, 2660, 2680, 2730, 2740, some combination thereof, etc.). For example, where the position of the vehicle with respect to the energy transfer system is determined using a first position (e.g., of a portion of the vehicle) and a second position (e.g., of a portion of the energy transfer system), the distance or relative position of an energy transfer component of the vehicle with respect to an energy transfer component of the energy transfer system may be determined by using a distance or relative position between the first position and the position of the energy transfer component of the vehicle and also by using a distance or relative position between the second position and position of the energy transfer component of the energy transfer system. The distance or relative position between the first position and the position of the energy transfer component of the vehicle may be relatively consistent across each model of vehicle, and therefore, may be stored as a lookup table or other data structure in a memory (e.g., of an energy transfer system, of a vehicle, etc.). Additionally, the distance or relative position between the second position and the position of the energy transfer component of the energy transfer system may be stored as a lookup table or other data structure in a memory (e.g., of an energy transfer system, of a vehicle, etc.).

Although FIG. 32 depicts process 3200 with a particular number of steps, it should be appreciated that process 3200 may have a different number of steps in other embodiments. For example, one or more of the steps of process 3200 may be optional and not performed in one embodiment. Additionally, although FIG. 32 depicts process 3200 with a particular ordering of steps, it should be appreciated that the steps of process 3200 may occur in a different order in other embodiments.

Figure 33:
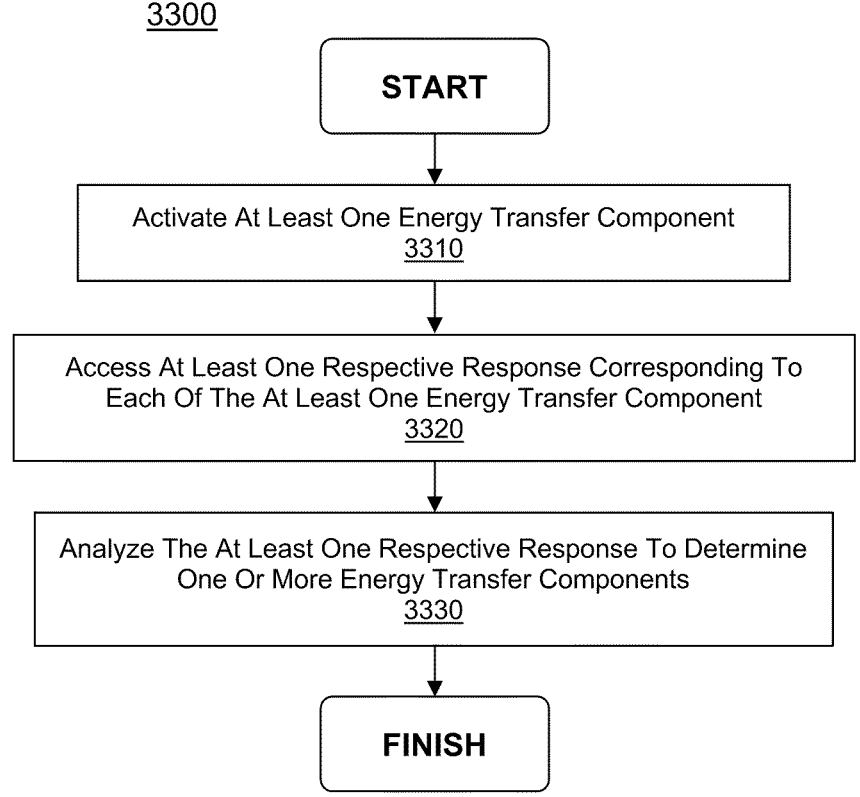
FIG. 33 shows a flowchart of a computer-implemented process for determining at least one energy transfer component by analyzing at least one response to an activation of one or more energy transfer components in accordance with one embodiment of the present invention.

FIG. 33 shows a flowchart of computer-implemented process 3300 for determining at least one energy transfer component by analyzing at least one response to an activation of one or more energy transfer components in accordance with one embodiment of the present invention. As shown in FIG. 33, step 3310 involves activating at least one energy transfer component. In one embodiment, step 3110 may involve configuring and operating the at least one energy transfer component in a position detection mode, in an energy transfer mode, some combination thereof, etc. And in one embodiment, step 3110 may involve attempting one or more energy transfers using the at least one energy transfer component. And in one embodiment, step 3310 may be performed in accordance with the discussion of FIG. 20 and/or FIG. 21.

Step 3320 involves accessing at least one respective response corresponding to each of the at least one energy transfer component. In one embodiment, step 3320 may be performed by a component of a system which also includes one or more of the at least one energy transfer component and/or by a component of a system which does not include one or more of the at least one energy transfer component. In one embodiment, the response accessed in step 3320 may include or otherwise be associated with a value of an attribute (e.g., an energy transfer type, an interface type, an energy transfer type, an interface type, a power, a current, a voltage, an energy transfer profile, a duration, a waveform, a temperature, etc.) and/or another electrical parameter (e.g., an inductance, an impedance, etc.). And in one embodiment, step 3320 may be performed in accordance with the discussion of FIG. 20 and/or FIG. 21.

As shown in FIG. 33, step 3330 involves analyzing the at least one respective response (e.g., accessed in step 3320) to determine one or more energy transfer components (e.g., capable of implementing an energy transfer between at least one vehicle and at least one energy transfer system, between at least one vehicle and at least one other vehicle, etc.). For example, step 3330 may involve determining (e.g., based on the at least one respective response) that at least one energy transfer component is in a position to perform an energy transfer (e.g., between at least one vehicle and at least one energy transfer system, between at least one vehicle and at least one other vehicle, etc.). As another example, step 3330 may involve determining (e.g., based on the at least one respective response) that the one or more energy transfers (e.g., attempted in step 3310) were successful. In one embodiment, step 3330 may be performed in accordance with the discussion of FIG. 20 and/or FIG. 21.

Although FIG. 33 depicts process 3300 with a particular number of steps, it should be appreciated that process 3300 may have a different number of steps in other embodiments. For example, one or more of the steps of process 3300 may be optional and not performed in one embodiment. Additionally, although FIG. 33 depicts process 3300 with a particular ordering of steps, it should be appreciated that the steps of process 3300 may occur in a different order in other embodiments.

Turning back to FIG. 31, step 3150 involves determining one or more energy transfer interfaces based on the one or more energy transfer components (e.g., determined in step 3140). For example, step 3150 may involve identifying one or more energy transfer interfaces which include or are otherwise coupled to the one or more energy transfer components (e.g., determined in step 3140). In this manner, step 3150 may involve determining one or more energy transfer interfaces capable of implementing an energy transfer between at least one vehicle and at least one energy transfer system, between at least one vehicle and at least one other vehicle, etc. Step 3150 may be performed by a component of the vehicle (e.g., interface component 221, pre-transfer control component 1390, some combination thereof, etc.), a component of an energy transfer system (e.g., interface component 211, pre-transfer control component 1350, energy transfer management component 1410, some combination thereof, etc.), a component of interface system 550 (e.g., pre-transfer processing component 620, energy transfer processing component 630, etc.), a component of another system, some combination thereof, etc.

Step 3160 involves determining whether a problem with at least one of the one or more energy transfer interfaces (e.g., determined in step 3150) has been detected. Step 3160 may be performed by a component of the vehicle (e.g., interface component 221, pre-transfer control component 1390, some combination thereof, etc.), a component of an energy transfer system (e.g., interface component 211, pre-transfer control component 1350, energy transfer management component 1410, some combination thereof, etc.), a component of interface system 550 (e.g., pre-transfer processing component 620, energy transfer processing component 630, etc.), a component of another system, some combination thereof, etc. If it is determined in step 3160 that a problem has not been detected, then process 3100 may conclude. Alternatively, if it is determined in step 3160 that a problem has been detected, then step 3170 may be performed.

As shown in FIG. 31, step 3170 involves determining one or more other energy transfer interfaces (e.g., capable of implementing an energy transfer between at least one vehicle and at least one energy transfer system, between at least one vehicle and at least one other vehicle, etc.). In one embodiment, step 3170 may involve identifying or selecting one or more of the interfaces determined in step 3150 (e.g., other than the at least one energy transfer interface associated with the problem) which are functioning correctly and/or which are not associated with a problem (e.g., the problem detected in step 3160, another problem, etc.). In one embodiment, step 3170 may involve repeating step 3140 and/or step 3150 to determine one or more energy transfer interfaces (e.g., other than the at least one energy transfer interface associated with the problem), where the one or more energy transfer interfaces may be functioning correctly and/or may not be associated with a problem (e.g., the problem detected in step 3160, another problem, etc.). It should be appreciated that repeating step 3140 and/or step 3150 may result in one or more additional interfaces being identified or determined (e.g., compared to the one or more interfaces determined by performing step 3140 and/or step 3150 previously), where the one or more additional interfaces may have been previously unavailable (e.g., due to being used to perform at least one energy transfer, due to being used to communicate data, as a result of a problem that has since been corrected or improved, etc.).

Although FIG. 31 depicts process 3100 with a particular number of steps, it should be appreciated that process 3100 may have a different number of steps in other embodiments. For example, one or more of the steps of process 3100 may be optional and not performed in one embodiment. Additionally, although FIG. 31 depicts process 3100 with a particular ordering of steps, it should be appreciated that the steps of process 3100 may occur in a different order in other embodiments.

Turning back to FIG. 29A, step 2930 involves determining at least one attribute (e.g., at least one energy transfer type, at least one interface type, at least one power, at least one current, at least one voltage, at least one energy transfer profile, at least one duration, at least one waveform, at least one temperature, etc.) associated with an energy transfer. In one embodiment, the at least one attribute may be associated with an energy transfer to be performed over at least one energy transfer interface determined in step 2925. And in one embodiment, step 2930 may be performed similarly to and/or analogously to one or more steps of process 3400 of FIG. 34.

Figure 34:
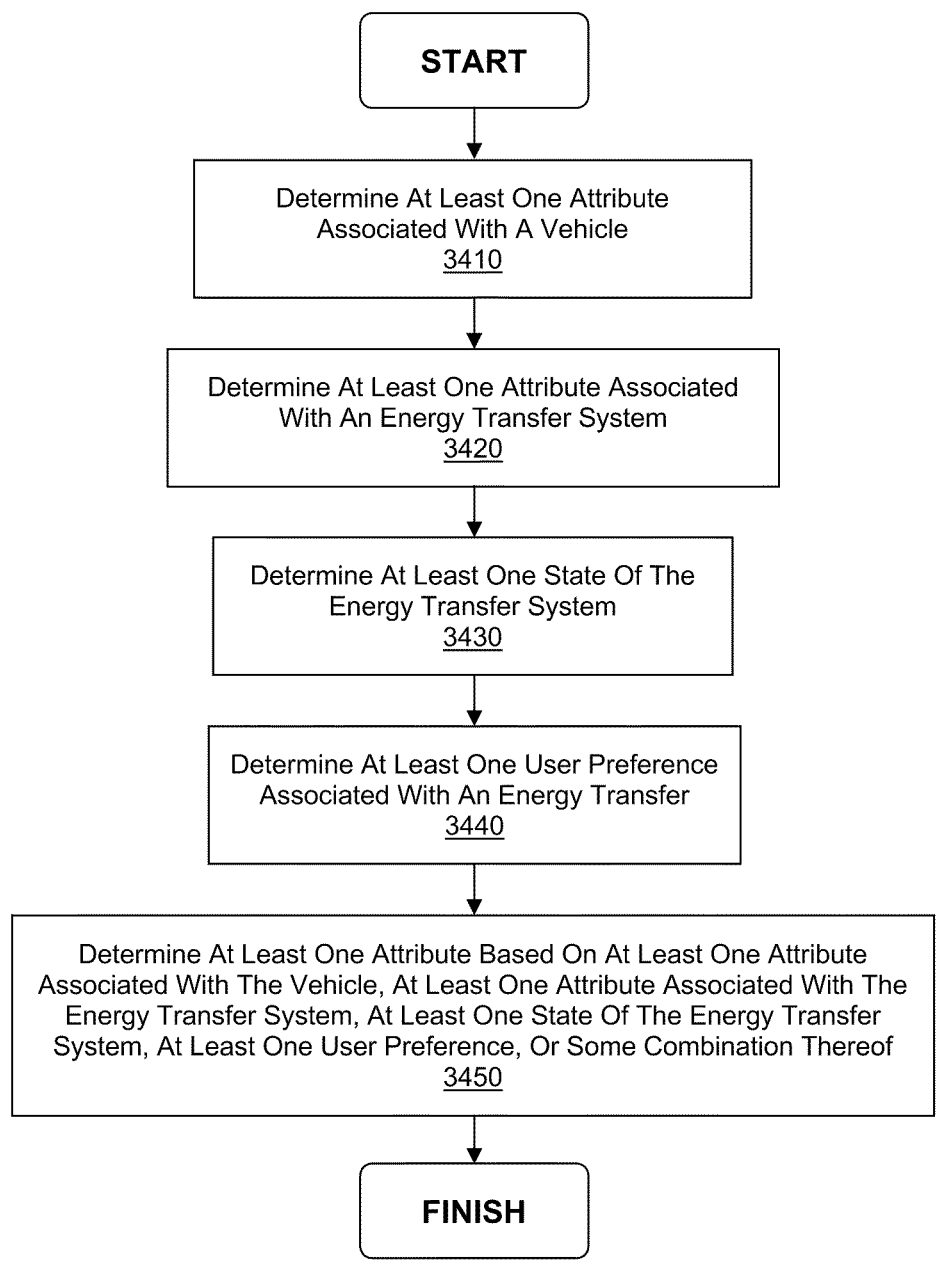
FIG. 34 shows a flowchart of a computer-implemented process for determining at least one attribute in accordance with one embodiment of the present invention.

FIG. 34 shows a flowchart of computer-implemented process 3400 for determining at least one attribute in accordance with one embodiment of the present invention. As shown in FIG. 34, step 3410 involves determining at least one attribute (e.g., at least one energy transfer type, at least one interface type, at least one power, at least one current, at least one voltage, at least one energy transfer profile, at least one duration, at least one waveform, at least one temperature, etc.) associated with a vehicle (e.g., 120, 320a, 320b, 320c, 1802, etc.). In one embodiment, the at least one attribute may be compatible with the vehicle and/or at least one other vehicle of the same type of vehicle (e.g., same make of vehicle, same model of vehicle, same year of manufacture of the vehicle, with the same or similar post-manufacture modifications, etc.).

Step 3420 involves determining at least one attribute (e.g., at least one energy transfer type, at least one interface type, at least one power, at least one current, at least one voltage, at least one energy transfer profile, at least one duration, at least one waveform, at least one temperature, etc.) associated with an energy transfer system (e.g., 110, 710a, 710b, 710c, etc.). In one embodiment, the at least one attribute may be compatible with the energy transfer system.

As shown in FIG. 34, step 3430 involves determining at least one state of the energy transfer system. In one embodiment, the state of the energy transfer system may be associated with or include a parameter (e.g., a number of energy transfers handled by a component at a particular time, a direction of one or more energy transfers through a component, at least one attribute of one or more energy transfers handled by a component, some combination thereof, etc.) of a component (e.g., power management component 215, charge and/or discharge component 218, interface component 211, etc.) of the energy transfer system. In one embodiment, the state of the energy transfer system may be associated with or include information about at least one energy transfer from one component of the energy transfer system to another component of the energy transfer system, at least one energy transfer between the energy transfer system and at least one vehicle, at least one energy transfer between the energy transfer system and another system, etc. In one embodiment, the state of the energy transfer system may be associated with or include a remaining capacity of the energy transfer system to transfer energy (e.g., measured in units of current, power, another attribute, etc.). In one embodiment, the state of the energy transfer system may be associated with or include at least one problem and/or at least one interrupt associated with the energy transfer system (e.g., associated with one or more components of the energy transfer system, associated with one or more energy transfer interfaces coupled to the energy transfer system, associated with one or more energy transfer interfaces coupled to at least one vehicle, as detected or monitored by interface monitoring component 213, as detected or monitored by interface monitoring component 223, etc.).

Step 3440 involves determining at least one user preference associated with an energy transfer. In one embodiment, the user preference may be associated with the energy transfer system (e.g., entered using GUI 800 of FIG. 8) and/or a vehicle (e.g., entered using GUI 900 of FIG. 9). In one embodiment, the user preference may be a user-specified maximum threshold, a user-specified minimum threshold, a user-specified parameter, a user-specified or user-selected capacity level (e.g., input using region 1050 of GUI 1000) associated with an energy storage component (e.g., 216, 226, etc.), etc. And in one embodiment, the user preference determined in step 3440 may be associated with at least one state of the energy transfer system (e.g., determined in step 3430).

As shown in FIG. 34, step 3450 involves determining at least one attribute based on at least one attribute associated with the vehicle (e.g., as determined in step 3410), at least one attribute associated with the energy transfer system (e.g., as determined in step 3420), at least one state of the energy transfer system (e.g., as determined in step 3430), at least one user preference (e.g., as determined in step 3440), some combination thereof, etc. In one embodiment, step 3450 may involve determining at least one attribute which is compatible with the energy transfer system and at least one vehicle (e.g., by performing an "AND" operation on any attributes determined in steps 3410 and 3420 to determine at least one attribute common to or shared by both the at least one attribute determined in step 3410 and the at least one attribute determined in step 3420). In one embodiment, step 3450 may involve filtering at least one attribute (e.g., determined in step 3410, step 3420, step 3440, some combination thereof, etc.) based on a state of the energy transfer system (e.g., determined in step 3430). And in one embodiment, step 3450 may involve filtering at least one attribute (e.g., determined in step 3410, step 3420, step 3430, some combination thereof, etc.) based on a user preference (e.g., determined in step 3440).

Although FIG. 34 depicts process 3400 with a particular number of steps, it should be appreciated that process 3400 may have a different number of steps in other embodiments. For example, one or more of the steps of process 3400 may be optional and not performed in one embodiment. Additionally, although FIG. 34 depicts process 3400 with a particular ordering of steps, it should be appreciated that the steps of process 3400 may occur in a different order in other embodiments.

Turning back to FIG. 29A, step 2935 involves determining at least one cost (e.g., billable to an individual and/or entity associated with the vehicle, billable to an individual and/or entity associated with the energy transfer system, etc.) corresponding to the at least one attribute (e.g., determined in step 2930). In one embodiment, step 2935 may be performed by at least one component of an energy transfer system and/or at least one component of the vehicle. In one embodiment, the at least one cost may include at least one energy transfer rate cost, at least one energy transfer profile cost, at least one total cost, some combination thereof, etc. In one embodiment, the at least one cost may be determined in step 2935 based on supply of and/or demand for electricity. In one embodiment, the at least one cost may be determined in step 2935 based on a cost of electricity to the energy transfer system (e.g., as determined by the utility providing power, by a cost to purchase and/or install a power source such as power source 217, by a cost to operate a power source such as power source 217, etc.) and/or a cost of electricity to the vehicle (e.g., as determined by a cost to purchase and/or install a power source such as power source 227, by a cost to operate a power source such as power source 227, etc.). In one embodiment, the at least one cost may be determined in step 2935 based on incentives presented to one or more parties to the transaction (e.g., using GUI 1000, another user interface, etc.). In one embodiment, the at least one cost may be determined in step 2935 based on a user preference (e.g., input using GUI 800, GUI 900, GUI 1000, etc.). And in one embodiment, step 2935 may involve determining at least one cost based on an amount of energy transferred between two or more systems (e.g., at least one vehicle and at least one energy transfer system, at least one vehicle and at least one other vehicle, etc).

Step 2940 involves generating data to present a user interface including the at least one attribute (e.g., determined in step 2930) and the at least one cost (e.g., determined in step 2935). In one embodiment, the at least one attribute and the at least one cost may be presented (e.g., based on data generated in step 2940) in at least one region (e.g., 1060) of a GUI (e.g., 1000). In one embodiment, the at least one attribute and the at least one cost may be presented (e.g., based on data generated in step 2940) using an audio user interface (e.g., enabling a user to interact with the energy transfer system and/or the vehicle using the user's voice or other sound), where the audio user interface may be implemented using at least one audio output device (e.g., speaker 1324, speaker 1374, etc.) and/or at least one audio input device (e.g., microphone 1323, microphone 1373, etc.). And in one embodiment, the at least one attribute and the at least one cost may be presented (e.g., based on data generated in step 2940) using another type of interface (e.g., including at least one button, at least one key, at least one trackball, at least one joystick, at least one pen, at least one touch input device, another type of mechanical user interface, another type of electrical user interface, another type of optical user interface, another type of wave-based user interface, etc.).

The user interface (e.g., presented based on data generated in step 2940) may enable a user to make a selection, where the selection may be of or associated with at least one energy transfer (e.g., associated with the at least one attribute and/or the at least one cost), of or associated with at least one attribute, of or associated with at least one cost, some combination thereof, etc. In one embodiment, the user interface (e.g., presented based on data generated in step 2940) may enable a user to initiate (e.g., responsive to the selection, responsive to an interaction with another region of a GUI such as region 1070 of GUI 1000, etc.) at least one energy transfer (e.g., associated with the at least one attribute and/or the at least one cost). The user interface (e.g., presented based on data generated in step 2940) may enable the ordering (e.g., a chronological ordering) of a plurality of energy transfers to be performed, where the plurality of energy transfers may include at least one charge of an energy storage component (e.g., 216, 226, etc.) and/or at least one discharge of an energy storage component (e.g., 216, 226, etc.).

In one embodiment, the at least one attribute and the at least one cost may each be presented (e.g., based on data generated in step 2940) as a respective list within the user interface (e.g., within region 1060 of GUI 1000, within another graphical user interface, within an audio user interface, within another type of user interface, etc.).

The user interface may also include a listing of at least one energy transfer interface, where each of the at least one energy transfer interface corresponds to at least one respective attribute of the at least one attribute (e.g., determined in step 2930). The at least one energy transfer interface may include a first interface of a first type and a second interface of a second type, where the first and second types are different from one another.

In one embodiment, the user interface (e.g., GUI 1000) may be displayed (e.g., based on data generated in step 2940) on a display device (e.g., 725, 521, 522, 523, etc.) of the vehicle (e.g., 120, 320a, 320b, 320c, 1802, etc.), a display device (e.g., 795, 591, 593, 595, etc.) of a computer system (e.g., 790, 590, 592, 594, etc.), a display device (e.g., 511, etc.) of an energy transfer system (e.g., 110, 710a, 710b, 710c, etc.), another display device, etc. In one embodiment, the user interface (e.g., GUI 1000) may be displayed (e.g., based on data generated in step 2940) on a display device of a computer system located remotely from the vehicle and said energy transfer system. And in one embodiment, the user interface (e.g., GUI 1000) may be displayed (e.g., displayed based on data generated in step 2940) on a display device of a portable electronic device In one embodiment, step 2940 may be performed responsive to an authentication of a user (e.g., as performed in step 3035), an authentication of a component (e.g., as performed in step 3010, step 3020, etc.), some combination thereof, etc.

And in one embodiment, step 2940 may be performed responsive to any of the preceding steps of process 2900.

As shown in FIG. 29B, step 2945 involves determining at least one recommendation (e.g., associated with the at least one attribute determined in step 2930, associated with the at least one cost determined in step 2935, etc.) and communicating the at least one recommendation via the user interface (e.g., presented using data generated in step 2940). In one embodiment, the recommendation may be a recommendation of one or more energy transfers that a user can or should select, an ordering of energy transfers, another recommendation associated with at least one energy transfer, etc. The recommendation may be determined in step 2945 based on a threshold associated with an attribute (e.g., a recommendation or suggestion of one or more energy transfers associated with an energy transfer rate above a predetermined energy transfer rate threshold, one or more energy transfers associated with an energy transfer rate below a predetermined energy transfer rate threshold, one or more energy transfers associated with a voltage above a predetermined voltage, one or more energy transfers associated with a voltage below a predetermined voltage, etc.), a threshold associated with a cost (e.g., a recommendation or suggestion of one or more energy transfers associated with an cost below a predetermined cost threshold, etc.), a threshold associated with an energy transfer duration (e.g., a recommendation or suggestion of one or more energy transfers associated with an energy transfer duration below a predetermined energy transfer duration threshold, etc.), a user preference (e.g., a recommendation or suggestion of one or more energy transfers associated with a user preference input using GUI 800, GUI 900, GUI 1000, etc.), an incentive (e.g., a recommendation or suggestion of one or more energy transfers associated with an incentive, etc.), some combination thereof, etc.

In one embodiment, the at least one recommendation may be determined in step 2945 based on a time of day. For example, if it is determined that a power source (e.g., 227) of a vehicle (e.g., 120) can only generate energy for a particular duration (e.g., using a time of day to estimate an amount of remaining sunlight, using a solar sensor to estimate an amount of remaining sunlight, etc.), the at least one recommendation may suggest to a user that a discharge be performed (e.g., for all or part of the particular duration). As another example, if it is determined that the cost of energy (e.g., to the energy transfer system as set by the utility) will reduce at a particular time (e.g., at night when the cost of energy is usually lower from a utility), the recommendation may suggest to a user that a charge be initiated at or after the particular time.

Communication of the at least one recommendation in step 2945 may involve displaying an image as part of a GUI (e.g., 1000, the user interface presented based on data generated in step 2940, etc.) and/or changing the appearance of a GUI (e.g., 1000, the user interface presented based on data generated in step 2940, etc.). In one embodiment, the recommendation may be communicated by displaying a border (e.g., similar to the dotted line of region 1075 as shown in FIG. 10) around a cost or attribute of an energy transfer, by displaying an image (e.g., an arrow, another symbol, etc.) in proximity to a cost or attribute of an energy transfer, by shading or highlighting a region associated with an energy transfer, by displaying a number in a region (e.g., 1061-1066, etc.) to recommend a chronological ordering of energy transfers, some combination thereof, etc. In one embodiment, the at least one recommendation may be communicated in step 2945 using an audio user interface (e.g., enabling a user to interact with the energy transfer system and/or the vehicle using the user's voice or other sound), where the audio user interface may be implemented using at least one audio output device (e.g., speaker 1324, speaker 1374, etc.) and/or at least one audio input device (e.g., microphone 1323, microphone 1373, etc.). And in one embodiment, the at least one recommendation may be communicated in step 2945 using another type of interface (e.g., including at least one button, at least one key, at least one trackball, at least one joystick, at least one pen, at least one touch input device, another type of mechanical user interface, another type of electrical user interface, another type of optical user interface, another type of wave-based user interface, etc.).

As shown in FIG. 29B, step 2950 involves determining at least one selection. The selection may be of or associated with at least one energy transfer (e.g., associated with the at least one attribute and/or the at least one cost), of or associated with at least one attribute (e.g., determined in step 2930), of or associated with at least one cost (e.g., determined in step 2935), some combination thereof, etc. In one embodiment, the selection may be a user selection input via an interaction with a user interface (e.g., GUI 1000, another graphical user interface, an audio user interface, another type of user interface, the user interface presented based on data generated in step 2940, a user interface including a listing of the at least one attribute determined in step 2930, a user interface including a listing of the at least one cost determined in step 2935, etc.). In one embodiment, the selection may be an automated selection performed by or using at least one component of a vehicle (e.g., 120, 320a, 320b, 320c, 1802, etc.), at least one component of an energy transfer system (e.g., 110, 710a, 710b, 710c, etc.), at least one component of another system (e.g., interface system 550, payment system 560, computer system 790, computer system 590, computer system 592, computer system 594, etc.), some combination thereof, etc.

Step 2955 involves generating a request (e.g., based on the at least one selection of step 2950) to perform an energy transfer (e.g., between the vehicle and an energy transfer system, between the vehicle and at least one other vehicle, etc.). In one embodiment, the request generated in step 2955 may be a request to perform at least one energy transfer (e.g., between the vehicle and an energy transfer system, between the vehicle and at least one other vehicle, etc.) in accordance with at least one attribute associated with the selection of step 2950. The request may be generated in step 2955 responsive to an interaction (e.g., with a region of a GUI such as region 1070 of GUI 1000, speech or sound input to an audio user interface, etc.) of a user interface (e.g., GUI 1000, another graphical user interface, an audio user interface, another type of user interface, etc.) in one embodiment. The request generated in step 2955 may identify or otherwise be associated with at least one source of energy (e.g., at least one vehicle, at least one energy transfer system, etc.), at least one recipient of energy (e.g., at least one vehicle, at least one energy transfer system, etc.), at least one energy transfer type (e.g., charge, discharge, etc.), at least one interface type (e.g., plug/cable, inductive, wireless, etc.), at least one energy transfer rate, at least one energy transfer voltage, at least one energy transfer profile, at least one energy transfer rate cost, at least one energy transfer profile cost, at least one total cost, at least one energy transfer duration, some combination thereof, etc.

In one embodiment, step 2955 may involve identifying one or more energy transfer interfaces (e.g., 132, 231, 234, 237, 2031, 2034a, 2034b, 2034c, 2034d, 2037a, 2037b, 2832, etc.) used to perform at least one energy transfer associated with the request. In one embodiment, step 2955 may be performed using a component of a vehicle (e.g., interface component 221, pre-transfer control component 1390, etc.), a component of an energy transfer system (e.g., interface component 211, energy transfer management component 1410, pre-transfer control component 1350, etc.), a component of interface system 550 (e.g., pre-transfer processing component 620, energy transfer processing component 630, etc.), a component of another system (e.g., computer system 790, computer system 590, computer system 592, computer system 594, etc.), some combination thereof, etc.

In one embodiment, step 2955 may involve communicating the request from one system to another. For example, step 2955 may involve communicating the request from the system generating the request and/or at which the request originates (e.g., a system used to present the user interface based on data generated in step 2940, computer system 790, computer system 590, computer system 592, computer system 594, some combination thereof, etc.) to a component of a vehicle (e.g., 120, 320a, 320b, 320c, 1802, etc.), a component of an energy transfer system (e.g., 110, 710a, 710b, 710c, etc.), a component of interface system 550, to another system, etc. As another example, step 2955 may involve communicating the request from the system generating the request and/or at which the request originates (e.g., a system used to present the user interface based on data generated in step 2940, computer system 790, computer system 590, computer system 592, computer system 594, some combination thereof, etc.) to a component of a vehicle (e.g., 120, 320a, 320b, 320c, 1802, etc.) and/or a component of an energy transfer system (e.g., 110, 710a, 710b, 710c, etc.), where the request may be communicated via interface system 550 (e.g., from the system generating the request and/or at which the request originates to interface system 550, from interface system 550 to the vehicle and/or the energy transfer system, etc.).

As shown in FIG. 29B, step 2960 involves beginning at least one energy transfer (e.g., between the vehicle and an energy transfer system, between the vehicle and at least one other vehicle, etc.). The at least one energy transfer may be performed in accordance with the request generated in step 2955, at least one attribute associated with the selection of step 2950, some combination thereof, etc. In one embodiment, the at least one energy transfer performed in step 2960 may utilize at least one energy transfer component (e.g., 233, 236, 239, 1821, 1822, 1823, 1824, 1832, 1834, 1842, 1844, 2033, 2036a, 2036b, 2036c, 2036d, 2039a, 2039b, 2230, 2240, 2250, 2270, 2280, 2290, 2320, 2330, 2340, 2360, 2370, 2460, 2461, 2630, 2640, 2730, 2740, some combination thereof, etc.) of a vehicle, at least one energy transfer component (e.g., 232, 235, 238, 1610, 1620, 1630, 1645, 1655, 1662, 1665, 1675, 1711, 1712, 1713, 1714, 1715, 1721, 1722, 1723, 1724, 1725, 1726, 1727, 1728, 1731, 1732, 1733, 1734, 1735, 1742, 1744, 1752, 1754, 1783, 1785, 1812, 2032, 2035a, 2035b, 2035c, 2035d, 2038a, 2038b, 2110, 2111, 2112, 2113, 2114, 2115, 2116, 2117, 2118, 2660, 2680, 2730, 2740, some combination thereof, etc.) of an energy transfer system, some combination thereof, etc. In one embodiment, step 2960 may be performed by activating and/or configuring at least one energy transfer component (e.g., of at least one vehicle, of at least one energy transfers system, etc.) to operate in an energy transfer mode. And in one embodiment, step 2960 may be performed using a component of a vehicle (e.g., interface component 221, pre-transfer control component 1390, etc.), a component of an energy transfer system (e.g., interface component 211, energy transfer management component 1410, pre-transfer control component 1350, etc.), a component of interface system 550 (e.g., pre-transfer processing component 620, energy transfer processing component 630, etc.), a component of another system (e.g., computer system 790, computer system 590, computer system 592, computer system 594, etc.), some combination thereof, etc.

Step 2965 involves determining whether an interrupt is detected. In one embodiment, the interrupt may be associated with at least one component of an energy transfer system, at least one component of a vehicle, at least one energy transfer interface (e.g., coupling an energy transfer system to at least one vehicle, at least one vehicle to at least one other vehicle, etc.), some combination thereof, etc. In one embodiment, the interrupt may be associated with a problem or other condition which is monitored or detected by a component of an energy transfer system (e.g., interface monitoring component 213, energy transfer monitoring component 1412, etc.) and/or a component of a vehicle (e.g., interface monitoring component 223, etc.). In one embodiment, step 2965 may involve detecting a problem with at least one energy transfer interface (e.g., determined in step 2925, used to transfer energy in step 2960, etc.), at least one component of at least one vehicle, at least one component of at least one energy transfer system, some combination thereof, etc. In one embodiment, step 2965 may involve determining whether an interrupt is detected during or responsive to the performance of at least one energy transfer (e.g., performed in step 2960). And in one embodiment, step 2965 may be performed using a component of a vehicle (e.g., interface component 221, etc.), a component of an energy transfer system (e.g., interface component 211, energy transfer management component 1410, etc.), a component of interface system 550 (e.g., energy transfer processing component 630, etc.), a component of another system (e.g., computer system 790, computer system 590, computer system 592, computer system 594, etc.), some combination thereof, etc.

If it is determined that an interrupt is detected in step 2965, then step 2970 may be performed. Alternatively, if it is determined that an interrupt is not detected in step 2965, then step 2980 may be performed.

As shown in FIG. 29B, step 2970 involves executing an interrupt service routine (ISR). In one embodiment, the ISR may be executed to investigate, improve, correct or otherwise respond to the cause of the interrupt (e.g., detected in step 2965). In one embodiment, step 2970 may be performed similarly to and/or analogously to one or more steps of process 3500 of FIG. 35. And in one embodiment, step 2970 may be performed similarly to and/or analogously to one or more steps of process 3600 of FIG. 36.

Figure 35:
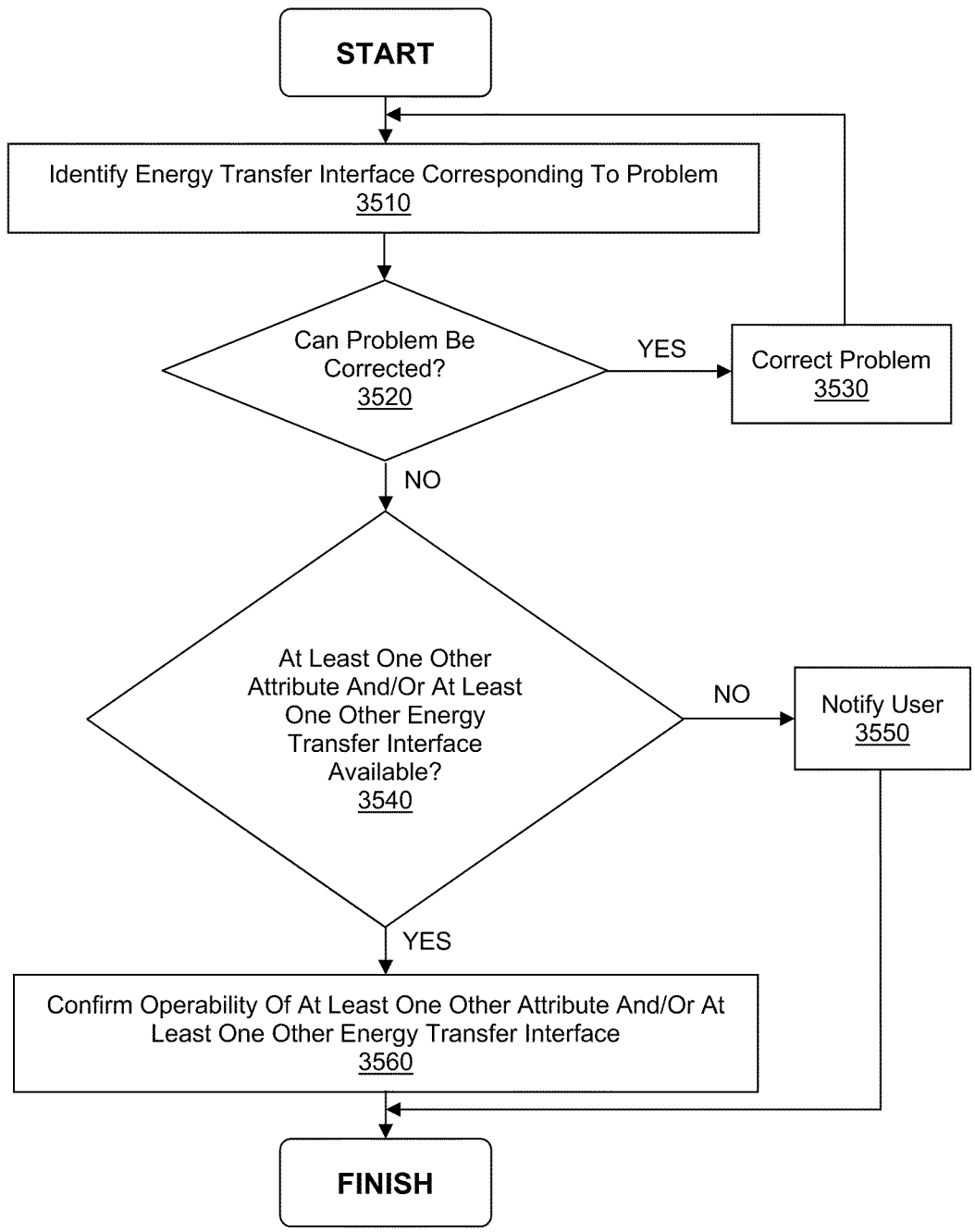
FIG. 35 shows a flowchart of a computer-implemented process for performing an interrupt service routine in accordance with one embodiment of the present invention.

FIG. 35 shows a flowchart of computer-implemented process 3500 for performing an interrupt service routine in accordance with one embodiment of the present invention. As shown in FIG. 35, step 3510 involves identifying an energy transfer interface (e.g., 132, 231, 234, 237, 2031, 2034*a*, 2034*b*, 2034*c*, 2034*d*, 2037*a*, 2037*b*, 2832, etc.) corresponding to a problem (e.g., causing an interrupt detected in step 2965). The problem may render at least one energy transfer interface and/or at least one component thereof (e.g., at least one energy transfer component, a line or interface coupled to at least one energy transfer component, circuitry or another component of or coupled to the energy transfer component, etc.) completely unusable (e.g., unable to perform an energy transfer in accordance with any attribute without corrective action taken to make it usable), unable to perform an energy transfer in accordance with at least one attribute (e.g., but able to perform an energy transfer in accordance with at least one other attribute), etc. Step 3510 may be performed using a component of a vehicle (e.g., interface component 221, etc.), a component of an energy transfer system (e.g., interface component 211, energy transfer management component 1410, etc.), a component of interface system 550 (e.g., energy transfer processing component 630, etc.), a component of another system (e.g., computer system 790, computer system 590, computer system 592, computer system 594, etc.), some combination thereof, etc.

Step 3520 involves determining whether the problem (e.g., associated with the energy transfer interface identified in step 3510) can be corrected. If the problem can be corrected, then one or more operations may be taken in step 3530 to correct the problem. In one embodiment, correction of the problem in step 3530 may involve performing at least one operation to enable at least one energy transfer interface and/or at least one component thereof (e.g., at least one energy transfer component, a line or interface coupled to at least one energy transfer component, circuitry or another component of or coupled to the energy transfer component, etc.) to perform at least one energy transfer in accordance with at least one additional attribute, where the at least one additional attribute may include one or more attributes that at least one energy transfer may not be performed in accordance with due to the problem (e.g., before correction of the problem).

For example, where a problem can be automatically corrected (e.g., with reduced or no user participation), then one or more operations (e.g., restarting or reinitializing an interface in an attempt to restore thereto an ability to transfer energy and/or communicate signals, restoring or upgrading firmware, initializing another component or circuitry to operate in place of the component or circuitry associated with the problem, etc.) may be performed using at least one component of the vehicle (e.g., energy distribution component 222, another component of interface component 221, another component of the vehicle, etc.) and/or at least one component of the energy transfer system (e.g., energy distribution component 212, another component of interface component 211, energy transfer management component 1410, another component of the energy transfer system, etc.). As another example, where the problem can be corrected with user participation, then the user may be instructed to attempt or perform one or more operations to correct the problem. In one embodiment, where a plug is not properly inserted into a receptacle to enable energy transfer and/or signal communication over the interface, the user may be instructed to properly insert the plug into the receptacle, take some other corrective action, etc. The user may be instructed in step 3530 using a user interface (e.g., GUI 1000, an audio user interface, another type of user interface, etc.), using a speaker (e.g., 1324, 1374, etc.), using a display device (e.g., 725, 521, 522, 523, etc.) of a vehicle (e.g., 120, 320*a*, 320*b*, 320*c*, 1802, etc.), using a display device (e.g., 795, 591, 593, 595, etc.) of a computer system (e.g., 790, 590, 592, 594, etc.), using a display device (e.g., 511, etc.) of an energy transfer system (e.g., 110, 710*a*, 710*b*, 710*c*, etc.), using another display device, some combination thereof, etc. Alternatively, if the problem cannot be corrected, then step 3540 may be performed.

Step 3540 involves determining whether at least one other attribute (e.g., at least one energy transfer type, at least one interface type, at least one power, at least one current, at least one voltage, at least one energy transfer profile, at least one duration, at least one waveform, at least one temperature, etc.) and/or at least one other energy transfer interface are available (e.g., to perform an energy transfer and/or communicate signals between a vehicle and an energy transfer system, between a vehicle and at least one other vehicle, etc.). Step 3540 may be performed similarly to and/or analogously to step 3170 of process 3100 in one embodiment. If at least one other attribute and at least one other energy transfer interface are not available (e.g., to perform an energy transfer and/or communicate signals), then step 3550 may be performed. Alternatively, if at least one other attribute and/or at least one other energy transfer interface are available (e.g., to perform an energy transfer and/or communicate signals), then step 3560 may be performed.

In one embodiment, step 3540 may involve automatically determining or selecting one or more of the available attributes for performing at least one energy transfer and/or communicating signals (e.g., using at least one energy transfer interface associated with the problem and identified in step 3510, using at energy transfer interface which is not associated with the problem and which is not identified in step 3510, etc.). And in one embodiment, step 3540 may involve automatically determining or selecting one or more of the available energy transfer interfaces for performing at least one energy transfer and/or communicating signals.

As shown in FIG. 35, step 3550 involves notifying a user (e.g., of the problem associated with the energy transfer interface identified in step 3510, of the inability or reduced ability to correct the problem as determined in step 3520, that one or more other attributes are not available to perform an energy transfer and/or to communicate signals as determined in step 3540, that one or more other interfaces are not available to perform an energy transfer and/or to communicate signals as determined in step 3540, etc.). The user may be notified via a user interface (e.g., GUI 1000, an audio user interface, another type of user interface, etc.), via a speaker (e.g., 1324, 1374, etc.), via a display device (e.g., 725, 521, 522, 523, etc.) of a vehicle (e.g., 120, 320*a*, 320*b*, 320*c*, 1802, etc.), via a display device (e.g., 795, 591, 593, 595, etc.) of a computer system (e.g., 790, 590, 592, 594, etc.), via a display device (e.g., 511, etc.) of an energy transfer system (e.g., 110, 710*a*, 710*b*, 710*c*, etc.), via another display device, some combination thereof, etc.

In one embodiment, step 3550 may involve communicating a notification from one system to another. For example, step 3550 may involve communicating a notification from a first system (e.g., the vehicle, the energy transfer system, a system performing one or more steps of process 3500, a system performing one or more steps of process 2900, etc.) to at least one other system (e.g., a system used to present GUI 1000 or another user interface, computer system 790, computer system 590, computer system 592, computer system 594, some combination thereof, etc.). As another example, step 3550 may involve communicating a notification from a first system (e.g., the vehicle, the energy transfer system, a system performing one or more steps of process 3500, a system performing one or more steps of process 2900, etc.) to at least one other system (e.g., a system used to present GUI 1000 or another user interface, computer system 790, computer system 590, computer system 592, computer system 594, some combination thereof, etc.) via interface system 550 (e.g., from the first system to interface system 550, from interface system 550 to the at least one other system, etc.).

As shown in FIG. 35, step 3560 involves confirming the operability of at least one other attribute and/or at least one other energy transfer interface (e.g., determined and/or selected in step 3540). For example, step 3560 may involve performing at least one operation (e.g., activating the at least one energy transfer interface, configuring at least one energy transfer component to operate in an energy transfer mode, attempting an energy transfer in accordance with one or more of the available attributes, attempting an energy transfer over one or more of the available energy transfer interfaces, attempting to communicate signals over one or more of the available energy transfer interfaces, some combination thereof, etc.). In one embodiment, step 3560 may involve measuring and/or analyzing a response to the at least one operation (e.g., an attribute of energy transferred over the at least one energy transfer interface, an amount of energy transferred over the one or more energy transfer interfaces, whether the energy transfer was successful, a parameter of at least one component used to perform the at least one operation, a parameter or attribute of signals communicated over the at least one energy transfer interface, etc.). In one embodiment, step 3560 may be performed using a component of a vehicle (e.g., interface component 221, pre-transfer control component 1390, etc.), a component of an energy transfer system (e.g., interface component 211, energy transfer management component 1410, pre-transfer control component 1350, etc.), a component of interface system 550 (e.g., pre-transfer processing component 620, energy transfer processing component 630, etc.), a component of another system (e.g., computer system 790, computer system 590, computer system 592, computer system 594, etc.), some combination thereof, etc.

Although FIG. 35 depicts process 3500 with a particular number of steps, it should be appreciated that process 3500 may have a different number of steps in other embodiments. For example, one or more of the steps of process 3500 may be optional and not performed in one embodiment. Additionally, although FIG. 35 depicts process 3500 with a particular ordering of steps, it should be appreciated that the steps of process 3500 may occur in a different order in other embodiments.

Figure 36:
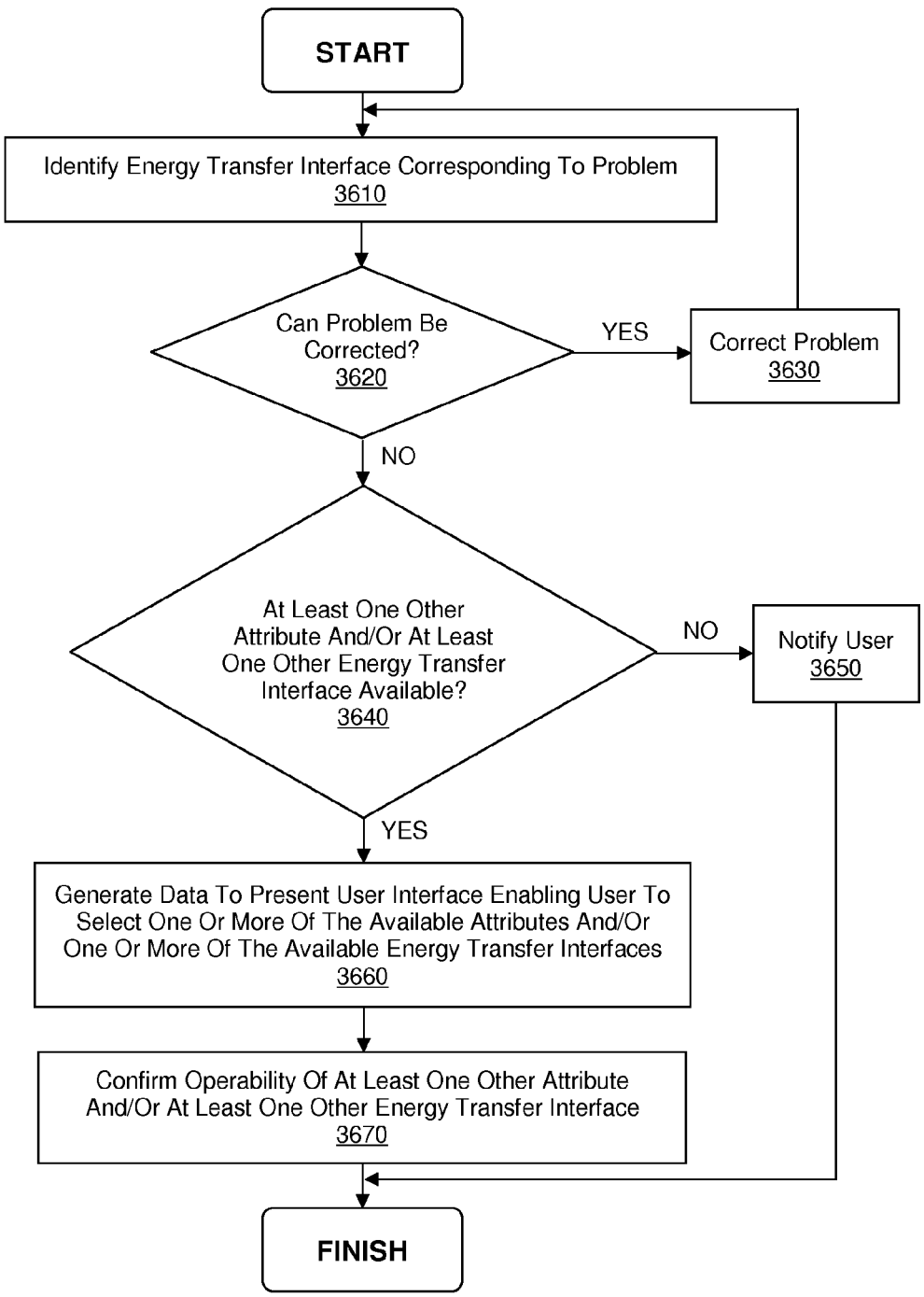
FIG. 36 shows a flowchart of a computer-implemented process for performing an interrupt service routine associated with a user selection in accordance with one embodiment of the present invention.

FIG. 36 shows a flowchart of computer-implemented process 3600 for performing an interrupt service routine associated with a user selection in accordance with one embodiment of the present invention. As shown in FIG. 36, step 3610 involves identifying an energy transfer interface (e.g., 132, 231, 234, 237, 2031, 2034*a*, 2034*b*, 2034*c*, 2034*d*, 2037*a*, 2037*b*, 2832, etc.) corresponding to a problem (e.g., causing an interrupt detected in step 2965). The problem may render at least one energy transfer interface and/or at least one component thereof (e.g., at least one energy transfer component, a line or interface coupled to at least one energy transfer component, circuitry or another component of or coupled to the energy transfer component, etc.) completely unusable (e.g., unable to perform an energy transfer in accordance with any attribute without corrective action taken to make it usable), unable to perform an energy transfer in accordance with at least one attribute (e.g., but able to perform an energy transfer in accordance with at least one other attribute), etc. Step 3610 may be performed using a component of a vehicle (e.g., interface component 221, etc.), a component of an energy transfer system (e.g., interface component 211, energy transfer management component 1410, etc.), a component of interface system 550 (e.g., energy transfer processing component 630, etc.), a component of another system (e.g., computer system 790, computer system 590, computer system 592, computer system 594, etc.), some combination thereof, etc.

Step 3620 involves determining whether the problem (e.g., associated with the energy transfer interface identified in step 3610) can be corrected. If the problem can be corrected, then one or more operations may be taken in step 3630 to correct the problem. In one embodiment, correction of the problem in step 3630 may involve performing at least one operation to enable at least one energy transfer interface and/or at least one component thereof (e.g., at least one energy transfer component, a line or interface coupled to at least one energy transfer component, circuitry or another component of or coupled to the energy transfer component, etc.) to perform at least one energy transfer in accordance with at least one additional attribute, where the at least one additional attribute may include one or more attributes that at least one energy transfer may not be performed in accordance with due to the problem (e.g., before correction of the problem).

For example, where a problem can be automatically corrected (e.g., with reduced or no user participation), then one or more operations (e.g., restarting or reinitializing an interface in an attempt to restore thereto an ability to transfer energy and/or communicate signals, restoring or upgrading firmware, initializing another component or circuitry to operate in place of the component or circuitry associated with the problem, etc.) may be performed using at least one component of the vehicle (e.g., energy distribution component 222, another component of interface component 221, another component of the vehicle, etc.) and/or at least one component of the energy transfer system (e.g., energy distribution component 212, another component of interface component 211, energy transfer management component 1410, another component of the energy transfer system, etc.). As another example, where the problem can be corrected with user participation, then the user may be instructed to attempt or perform one or more operations to correct the problem. In one embodiment, where a plug is not properly inserted into a receptacle to enable energy transfer and/or signal communication over the interface, the user may be instructed to properly insert the plug into the receptacle, take some other corrective action, etc. The user may be instructed in step 3630 using a user interface (e.g., GUI 1000, an audio user interface, another type of user interface, etc.), using a speaker (e.g., 1324, 1374, etc.), using a display device (e.g., 725, 521, 522, 523, etc.) of a vehicle (e.g., 120, 320*a*, 320*b*, 320*c*, 1802, etc.), using a display device (e.g., 795, 591, 593, 595, etc.) of a computer system (e.g., 790, 590, 592, 594, etc.), using a display device (e.g., 511, etc.) of an energy transfer system (e.g., 110, 710*a*, 710*b*, 710*c*, etc.), using another display device, some combination thereof, etc. Alternatively, if the problem cannot be corrected, then step 3640 may be performed.

Step 3640 involves determining whether at least one other attribute (e.g., at least one energy transfer type, at least one interface type, at least one power, at least one current, at least one voltage, at least one energy transfer profile, at least one duration, at least one waveform, at least one temperature, etc.) and/or at least one other energy transfer interface are available (e.g., to perform an energy transfer and/or communicate signals between a vehicle and an energy transfer system, between a vehicle and at least one other vehicle, etc.). Step 3640 may be performed similarly to and/or analogously to step 3170 of process 3100 in one embodiment. If at least one other attribute and at least one other energy transfer interface are not available (e.g., to perform an energy transfer and/or communicate signals), then step 3650 may be performed. Alternatively, if at least one other attribute and/or at least one other energy transfer interface are available (e.g., to perform an energy transfer and/or communicate signals), then step 3660 may be performed.

In one embodiment, step 3640 may involve automatically determining or selecting one or more of the available attributes for performing at least one energy transfer and/or communicating signals (e.g., using at least one energy transfer interface associated with the problem and identified in step 3610, using at least one energy transfer interface which is not associated with the problem and which is not identified in step 3610, etc.). And in one embodiment, step 3640 may involve automatically determining or selecting one or more of the available energy transfer interfaces for performing at least one energy transfer and/or communicating signals.

As shown in FIG. 36, step 3650 involves notifying a user (e.g., of the problem associated with the energy transfer interface identified in step 3610, of the inability or reduced ability to correct the problem as determined in step 3620, that one or more other attributes are not available to perform an energy transfer and/or to communicate signals as determined in step 3640, that one or more other interfaces are not available to perform an energy transfer and/or to communicate signals as determined in step 3640, etc.). The user may be notified via a user interface (e.g., GUI 1000, an audio user interface, another type of user interface, etc.), via a speaker (e.g., 1324, 1374, etc.), via a display device (e.g., 725, 521, 522, 523, etc.) of a vehicle (e.g., 120, 320*a*, 320*b*, 320*c*, 1802, etc.), via a display device (e.g., 795, 591, 593, 595, etc.) of a computer system (e.g., 790, 590, 592, 594, etc.), via a display device (e.g., 511, etc.) of an energy transfer system (e.g., 110, 710*a*, 710*b*, 710*c*, etc.), via another display device, some combination thereof, etc.

In one embodiment, step 3650 may involve communicating a notification from one system to another. For example, step 3650 may involve communicating a notification from a first system (e.g., the vehicle, the energy transfer system, a system performing one or more steps of process 3600, a system performing one or more steps of process 2900, etc.) to at least one other system (e.g., a system used to present GUI 1000 or another user interface, computer system 790, computer system 590, computer system 592, computer system 594, some combination thereof, etc.). As another example, step 3650 may involve communicating a notification from a first system (e.g., the vehicle, the energy transfer system, a system performing one or more steps of process 3600, a system performing one or more steps of process 2900, etc.) to at least one other system (e.g., a system used to present GUI 1000 or another user interface, computer system 790, computer system 590, computer system 592, computer system 594, some combination thereof, etc.) via interface system 550 (e.g., from the first system to interface system 550, from interface system 550 to the at least one other system, etc.).

As shown in FIG. 36, step 3660 involves generating data to present a user interface (e.g., GUI 1000, an audio user interface, another type of user interface, etc.) enabling a user to select one or more of the available attributes (e.g., determined in step 3640) and/or one or more of the available energy transfer interfaces (e.g., determined in step 3640). For example, where a problem prevents or reduces the ability to perform an energy transfer and/or communicate signals in accordance with at least one attribute (e.g., where an energy transfer rate or other attribute cannot be supported or performed using a particular energy transfer interface due to the occurrence of a problem), data may be generated to present and/or update a user interface (e.g., region 1060 of GUI 1000, an audio user interface, another type of user interface, etc.) to enable the user to select one or more other attributes (e.g., an energy transfer rate or other attribute that is supported or capable of being executed using the particular energy transfer interface and/or at least one other energy transfer interface) for performing the energy transfer and/or communicating signals. As another example, where a problem prevents or reduces the ability to perform an energy transfer and/or communicate signals using at least one energy transfer interface, a user interface (e.g., region 1060 of GUI 1000, an audio user interface, another type of user interface, etc.) may be presented and/or updated to enable the user to select one or more other energy transfer interfaces for performing the energy transfer and/or communicating signals.

As shown in FIG. 36, step 3670 involves confirming the operability of at least one other attribute and/or at least one other energy transfer interface (e.g., determined and/or selected in step 3640). For example, step 3670 may involve performing at least one operation (e.g., activating the at least one energy transfer interface, configuring at least one energy transfer component to operate in an energy transfer mode, attempting an energy transfer in accordance with one or more of the available attributes, attempting an energy transfer over one or more of the available energy transfer interfaces, attempting to communicate signals over one or more of the available energy transfer interfaces, some combination thereof, etc.). In one embodiment, step 3670 may involve measuring and/or analyzing a response to the at least one operation (e.g., an attribute of energy transferred over the at least one energy transfer interface, an amount of energy transferred over the one or more energy transfer interfaces, whether the energy transfer was successful, a parameter of at least one component used to perform the at least one operation, a parameter or attribute of signals communicated over the at least one energy transfer interface, etc.). In one embodiment, step 3670 may be performed using a component of a vehicle (e.g., interface component 221, pre-transfer control component 1390, etc.), a component of an energy transfer system (e.g., interface component 211, energy transfer management component 1410, pre-transfer control component 1350, etc.), a component of interface system 550 (e.g., pre-transfer processing component 620, energy transfer processing component 630, etc.), a component of another system (e.g., computer system 790, computer system 590, computer system 592, computer system 594, etc.), some combination thereof, etc.

Although FIG. 36 depicts process 3600 with a particular number of steps, it should be appreciated that process 3600 may have a different number of steps in other embodiments. For example, one or more of the steps of process 3600 may be optional and not performed in one embodiment. Additionally, although FIG. 36 depicts process 3600 with a particular ordering of steps, it should be appreciated that the steps of process 3600 may occur in a different order in other embodiments.

Turning back to FIG. 29B, process 2900 may proceed from step 2970 to step 2980 in one embodiment. For example, if a problem is unable to be corrected (e.g., as determined in step 3520, 3620, etc.) and at least one other attribute is not available for performing at least one energy transfer (e.g., as determined in step 3540, 3640, etc.), then at least one energy transfer (e.g., begun in step 2960) may be concluded in step 2980. As another example, if a problem is unable to be corrected (e.g., as determined in step 3520, 3620, etc.) and at least one other energy transfer interface is not available for performing at least one energy transfer (e.g., as determined in step 3540, 3640, etc.), then at least one energy transfer (e.g., begun in step 2960) may be concluded in step 2980. Alternatively, process 2900 may proceed from step 2970 to step 2975 in one embodiment.

As shown in FIG. 29B, step 2975 involves resuming at least one energy transfer. In one embodiment, step 2975 may involve resuming at least one energy transfer which was begun in step 2960 and interrupted by an interrupt detected in step 2965. In one embodiment, step 2975 may be performed responsive to the execution of an interrupt return or return from interrupt (e.g., included in the ISR performed in step 2970, etc.). And in one embodiment, after step 2975 is performed, step 2965 may be re-performed and/or process 2900 may continue to step 2980.

Step 2980 involves concluding at least one energy transfer. In one embodiment, step 2980 may involve concluding at least one energy transfer which was begun in step 2960. The at least one energy transfer may be concluded in step 2980 in accordance with the request generated in step 2955 (e.g., at the conclusion of at least one energy transfer associated with the request generated in step 2955, etc.), in accordance with at least one attribute associated with the selection of step 2950 (e.g., at the conclusion of at least one energy transfer performed in accordance with at least one attribute associated with the selection of step 2950, etc.), some combination thereof, etc. In one embodiment, step 2960 may be performed by deactivating and/or configuring at least one energy transfer component (e.g., of at least one vehicle, of at least one energy transfers system, etc.) to operate in a mode other than an energy transfer mode (e.g., a position detection mode, an idle mode, a low-power mode, a mode in which at least one energy transfer component is depowered, etc.). And in one embodiment, step 2980 may be performed using a component of a vehicle (e.g., interface component 221, post-transfer control component 1391, etc.), a component of an energy transfer system (e.g., interface component 211, energy transfer management component 1410, post-transfer control component 1351, etc.), a component of interface system 550 (e.g., energy transfer processing component 630, post-transfer processing component 640, etc.), a component of another system (e.g., computer system 790, computer system 590, computer system 592, computer system 594, etc.), some combination thereof, etc.

In one embodiment, step 2980 may involve measuring an amount of energy received by each party to the transaction. For example, where energy is transferred from an energy transfer system (e.g., 110) to a vehicle (e.g., 120) in steps 2960 to 2980, step 2980 may involve measuring an amount of energy received by the vehicle (e.g., using meter 229 and/or meter 219). As another example, where energy is transferred from a vehicle (e.g., 120) to an energy transfer system (e.g., 110) in steps 2960 to 2980, step 2980 may involve measuring an amount of energy received by the energy transfer system (e.g., using meter 219 and/or meter 229).

In one embodiment, step 2980 may involve determining (e.g., using meter 219 and meter 229) an amount of energy lost during an energy transfer between energy transfer system 110 and vehicle 120. For example, the difference between an amount of energy measured by meter 219 and an amount of energy measured by meter 229 may be used in step 2980 to determine an amount of energy lost during an energy transfer. And in one embodiment, the difference between an amount of energy measured by meter 219 and an amount of energy measured by meter 229 may be used in step 2980 to determine an efficiency of an energy transfer between energy transfer system 110 and vehicle 120, another attribute or parameter associated with the energy transfer, etc.

In one embodiment, the at least one energy transfer performed in steps 2960 to 2980 may include a plurality of energy transfers. The plurality of energy transfers may be performed contemporaneously or sequentially. Alternatively, the plurality of energy transfers may be performed contemporaneously and sequentially. For example, a set of energy transfers may be performed contemporaneously, where the set of energy transfers may be followed by at least one other energy transfer. As another example, at least one energy transfer may be performed, where the at least one energy transfer may be followed by a set of energy transfers which are performed contemporaneously. And in one embodiment, the at least one energy transfer performed in steps 2960 to 2980 may be performed in an order selected by a user (e.g. using region 1060 of GUI 1000, another user interface, etc.).

As shown in FIG. 29B, step 2985 involves securing at least one energy transfer interface (e.g., used to perform at least one energy transfer in steps 2960 to 2980). In one embodiment, step 2985 may involve reducing electrical access to a component of a vehicle (e.g., energy storage component 226, motor 2850, transmission 2860, braking system 2870, steering wheel 2880, another component of the vehicle, etc.) and/or reducing the ability to transfer energy over the at least one energy transfer interface, where the reduction in electrical access and/or ability to transfer energy over the at least one energy transfer interface may be implemented by controlling at least one energy regulation component (e.g., 2821, 2841, etc.) of the vehicle. In one embodiment, the at least one energy regulation component may be disposed at least partially within a housing of a component (e.g., housing 2830 of energy storage component 226, a housing of motor 2850, a housing of transmission 2860, a housing of braking system 2870, a housing of steering wheel 2880, a housing of another component of the vehicle, etc.) and/or coupled with a component, where the component may be a component to which electrical access is reduced in step 2985, with which the ability to transfer energy over the at least one energy transfer interface is reduced in step 2985, etc. In one embodiment, step 2985 may involve placing the vehicle and/or at least one component thereof in a secured state (e.g., with reduced access to the vehicle and/or a component thereof) which requires at least one authentication (e.g., of at least one component, of a user, as performed in step 2920, some combination thereof, etc.) before access to the vehicle and/or a component thereof is increased (e.g., to enable use of and/or access to energy storage component 226, to enable the vehicle to be powered, moved, used, otherwise accessed, etc.). And in one embodiment, step 2985 may be performed using a component of a vehicle (e.g., security component 2820 or a component thereof, security component 2840 or a component thereof, post-transfer control component 1391, interface component 221, etc.), a component of an energy transfer system (e.g., interface component 211, energy transfer management component 1410, post-transfer control component 1351, etc.), a component of interface system 550 (e.g., energy transfer processing component 630, post-transfer processing component 640, etc.), a component of another system (e.g., computer system 790, computer system 590, computer system 592, computer system 594, etc.), some combination thereof, etc.

Step 2990 involves executing a payment transaction for energy transferred (e.g., as a result of at least one energy transfer performed in one or more of steps 2960 to 2980). In one embodiment, step 2990 may involve implementing a funds transfer from a first account (e.g., held by or otherwise accessible using payment system 560 or another payment system, selected or identified by a user using region 1080 of GUI 1000, etc.) associated with a vehicle and/or at least one user thereof to a second account (e.g., held by or otherwise accessible using payment system 560 or another payment system, selected or identified by a user using region 941 of GUI 900, etc.) associated with an energy transfer system and/or at least one user thereof. In one embodiment, step 2990 may involve implementing a funds transfer from a first account (e.g., held by or otherwise accessible using payment system 560 or another payment system, selected or identified by a user using region 941 of GUI 900, etc.) associated with an energy transfer system and/or at least one user thereof to a second account (e.g., held by or otherwise accessible using payment system 560 or another payment system, selected or identified by a user using region 1080 of GUI 1000, etc.) associated with a vehicle and/or at least one user thereof. In one embodiment, step 2990 may involve providing an object associated with a benefit (e.g., currency, a coupon, a gift card, an incentive such as a discount, etc.) to a user (e.g., via dispenser 1331). In one embodiment, step 2990 may involve the use of a payment interface (e.g., 1330). And in one embodiment, step 2990 may be performed using a component of a vehicle (e.g., post-transfer control component 1391, interface component 221, etc.), a component of an energy transfer system (e.g., interface component 211, energy transfer management component 1410, post-transfer control component 1351, etc.), a component of interface system 550 (e.g., energy transfer processing component 630, post-transfer processing component 640, etc.), a component of another system (e.g., computer system 790, computer system 590, computer system 592, computer system 594, payment system 560, etc.), some combination thereof, etc.

In one embodiment, step 2990 may involve executing a payment transaction for an amount of energy received by each party to the transaction (e.g., as measured in step 2980). For example, where energy is transferred from an energy transfer system (e.g., 110) to a vehicle (e.g., 120) in steps 2960 to 2980, step 2990 may involve executing a payment transaction for an amount of energy received by the vehicle (e.g., as measured using meter 229 and/or meter 219). As another example, where energy is transferred from a vehicle (e.g., 120) to an energy transfer system (e.g., 110) in steps 2960 to 2980, step 2980 may involve executing a payment transaction for an amount of energy received by the energy transfer system (e.g., as measured using meter 219 and/or meter 229). As yet another example, step 2990 may involve executing a payment transaction for a net amount of energy transferred between at least two parties to a transaction (e.g., where at least one energy transfer is performed from a first party to a second party and where at least one other energy transfer is performed from the second party to the first party).

Although FIGS. 29A and 29B depict process 2900 with a particular number of steps, it should be appreciated that process 2900 may have a different number of steps in other embodiments. For example, one or more of the steps of process 2900 may be optional and not performed in one embodiment. Additionally, although FIGS. 29A and 29B depict process 2900 with a particular ordering of steps, it should be appreciated that the steps of process 2900 may occur in a different order in other embodiments.

Figure 37:
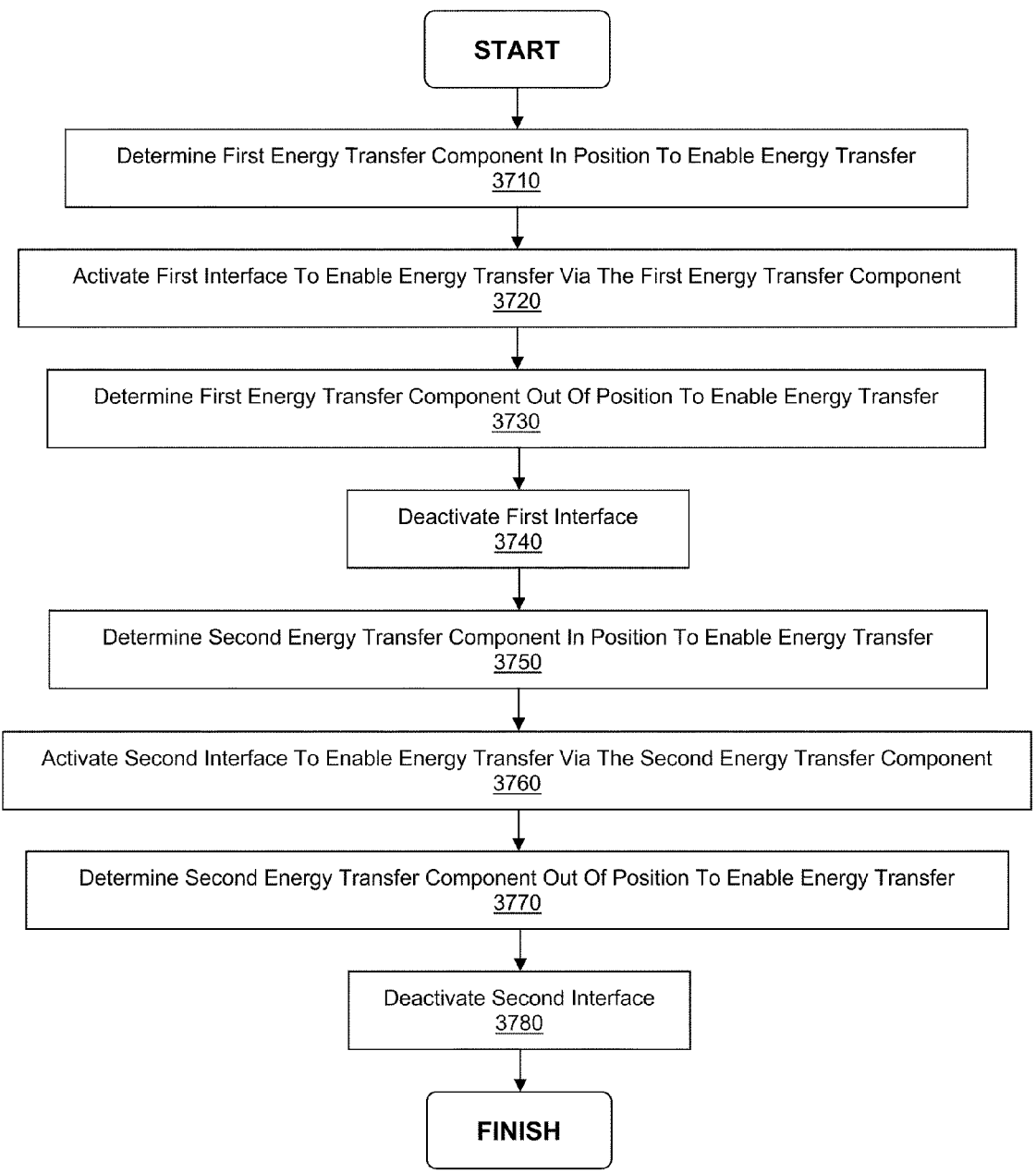
FIG. 37 shows a flowchart of a computer-implemented process for managing at least one energy transfer in accordance with one embodiment of the present invention.

FIG. 37 shows a flowchart of computer-implemented process 3700 for managing at least one energy transfer in accordance with one embodiment of the present invention. In one embodiment, one or more steps of process 3700 may be performed in conjunction with one or more steps of process 2900. In one embodiment, one or more steps of process 3700 may be performed using a component of a vehicle (e.g., interface component 221, pre-transfer control component 1390, post-transfer control component 1391, etc.), a component of an energy transfer system (e.g., interface component 211, energy transfer management component 1410, pre-transfer control component 1350, post-transfer control component 1351, etc.), a component of interface system 550 (e.g., pre-transfer processing component 620, energy transfer processing component 630, post-transfer processing component 640, etc.), a component of another system (e.g., computer system 790, computer system 590, computer system 592, computer system 594, etc.), some combination thereof, etc.

As shown in FIG. 37, step 3710 involves determining a first energy transfer component in position to enable an energy transfer. In one embodiment, step 3710 may be performed while a vehicle is moving (e.g., along a roadway, through the air, in water, etc.) and/or while a component of the vehicle is moving (e.g., a wheel is turning, a tire is turning, etc.). In one embodiment, step 3710 may be performed similarly to and/or analogously to step 2905 of process 2900.

In one embodiment, the first energy transfer component may be an energy transfer component of or coupled with a wheel of a vehicle (e.g., energy transfer component 1844) and/or an energy transfer component of or coupled with a tire of a vehicle (e.g., energy transfer component 1834). In this case, step 3710 may involve determining (e.g., based on an orientation and/or angular position of the wheel and/or tire) that the first energy transfer component is less than a predetermined distance from a surface (e.g., 1890, a surface of a road, etc.) and/or from an energy transfer component of an energy transfer system, in another position (e.g., enabling an energy transfer), etc. Alternatively, the first energy transfer component may be an energy transfer component of an energy transfer system, where step 3710 may involve determining that the first energy transfer component is less than a predetermined distance from a component of a vehicle (e.g., an energy transfer component of and/or coupled with a wheel, an energy transfer component of and/or coupled with a tire, another component of the vehicle, etc.), in another position (e.g., enabling an energy transfer), etc.

In one embodiment, the first energy transfer component may be an energy transfer component of an energy transfer system (e.g., energy transfer component 1610, energy transfer component 1620, energy transfer component 1630, energy transfer component 1645, energy transfer component 1655, energy transfer component 1662, energy transfer component 1665, energy transfer component 1675, etc.) which is located remotely from a vehicle (e.g., 120, 320*a*, 320*b*, 320*c*, 1802, etc.). In this case, step 3710 may involve determining that the vehicle (or at least one energy transfer component thereof) is less than a predetermined distance from the first energy transfer component, in another position (e.g., enabling an energy transfer), etc., where the vehicle may be moving and/or stationary with respect to the first energy transfer component. Alternatively, the first energy transfer component may be an energy transfer component of a vehicle. In this case, step 3710 may involve determining that the first energy transfer component is less than a predetermined distance from a component of an energy transfer system (e.g., energy transfer component 1610, energy transfer component 1620, energy transfer component 1630, energy transfer component 1645, energy transfer component 1655, energy transfer component 1662, energy transfer component 1665, energy transfer component 1675, another component of the energy transfer system, etc.), in another position (e.g., enabling an energy transfer), etc., where the first energy transfer component may be moving and/or stationary with respect to the energy transfer system or a component thereof.

As shown in FIG. 37, step 3720 involves activating a first interface to enable an energy transfer via the first energy transfer component. The first interface may include or be coupled to the first energy transfer component. In one embodiment, the first interface may be a wired energy transfer interface (e.g., 231, 2031, etc.), an inductive energy transfer interface (e.g., 234, 2034*a*, 2034*b*, 2034*c*, 2034*d*, etc.), a wireless energy transfer interface (e.g., 237, 2037*a*, 2037*b*, etc.), some combination thereof, etc. And in one embodiment, step 3720 may be performed by configuring the first energy transfer component to operate in an energy transfer mode.

Step 3730 involves determining the first energy transfer component out of position to enable an energy transfer. In one embodiment, step 3730 may be performed similarly to and/or analogously to step 2905 of process 2900.

In one embodiment, where the first energy transfer component is an energy transfer component of or coupled with a wheel of a vehicle (e.g., energy transfer component 1844) and/or an energy transfer component of or coupled with a tire of a vehicle (e.g., energy transfer component 1834), step 3730 may involve determining (e.g., based on an orientation and/or angular position of the wheel and/or tire) that the first energy transfer component is greater than a predetermined distance from a surface (e.g., 1890, a surface of a road, etc.) and/or from an energy transfer component of an energy transfer system, in another position (e.g., where an ability to perform an energy transfer is reduced or prevented), etc. Alternatively, where the first energy transfer component is an energy transfer component of an energy transfer system, step 3730 may involve determining that the first energy transfer component is greater than a predetermined distance from a component of a vehicle (e.g., an energy transfer component of and/or coupled with a wheel, an energy transfer component of and/or coupled with a tire, another component of the vehicle, etc.), in another position (e.g., where an ability to perform an energy transfer is reduced or prevented), etc.

In one embodiment, where the first energy transfer component is an energy transfer component of an energy transfer system (e.g., energy transfer component 1610, energy transfer component 1620, energy transfer component 1630, energy transfer component 1645, energy transfer component 1655, energy transfer component 1662, energy transfer component 1665, energy transfer component 1675, etc.) which is located remotely from a vehicle (e.g., 120, 320*a*, 320*b*, 320*c*, 1802, etc.), step 3730 may involve determining that the vehicle (or at least one energy transfer component thereof) is greater than a predetermined distance from the first energy transfer component, in another position (e.g., where an ability to perform an energy transfer is reduced or prevented), etc. In this case, the vehicle may be moving and/or stationary with respect to the first energy transfer component. Alternatively, where the first energy transfer component may be an energy transfer component of a vehicle, step 3730 may involve determining that the first energy transfer component is greater than a predetermined distance from a component of an energy transfer system (e.g., energy transfer component 1610, energy transfer component 1620, energy transfer component 1630, energy transfer component 1645, energy transfer component 1655, energy transfer component 1662, energy transfer component 1665, energy transfer component 1675, another component of the energy transfer system, etc.), in another position (e.g., enabling an energy transfer), etc. In this case, the first energy transfer component may be moving and/or stationary with respect to the energy transfer system.

As shown in FIG. 37, step 3740 involves deactivating a first interface (e.g., which is activated in step 3710). In one embodiment, step 3740 may be performed by configuring the first energy transfer component to operate in a mode other than an energy transfer mode (e.g., a position detection mode, an idle mode, a low-power mode, a mode in which the first energy transfer component is depowered, etc.).

Step 3750 involves determining a second energy transfer component in position to enable an energy transfer. In one embodiment, step 3750 may be performed while a vehicle is moving (e.g., along a roadway) and/or while a component of the vehicle is moving (e.g., a wheel is turning, a tire is turning, etc.). In one embodiment, step 3750 may be performed similarly to and/or analogously to step 2905 of process 2900.

In one embodiment, the second energy transfer component may be an energy transfer component of or coupled with a wheel of a vehicle (e.g., energy transfer component 1842) and/or an energy transfer component of or coupled with a tire of a vehicle (e.g., energy transfer component 1832). In this case, step 3750 may involve determining (e.g., based on an orientation and/or angular position of the wheel and/or tire) that the second energy transfer component is less than a predetermined distance from a surface (e.g., 1890, a surface of a road, etc.) and/or from an energy transfer component of an energy transfer system, in another position (e.g., enabling an energy transfer), etc. Alternatively, the second energy transfer component may be an energy transfer component of an energy transfer system, where step 3750 may involve determining that the second energy transfer component is less than a predetermined distance from a component of a vehicle (e.g., an energy transfer component of and/or coupled with a wheel, an energy transfer component of and/or coupled with a tire, another component of the vehicle, etc.), in another position (e.g., enabling an energy transfer), etc.

In one embodiment, the second energy transfer component may be an energy transfer component of an energy transfer system (e.g., energy transfer component 1610, energy transfer component 1620, energy transfer component 1630, energy transfer component 1645, energy transfer component 1655, energy transfer component 1662, energy transfer component 1665, energy transfer component 1675, etc.) which is located remotely from a vehicle (e.g., 120, 320*a*, 320*b*, 320*c*, 1802, etc.). In this case, step 3750 may involve determining that the vehicle (or at least one energy transfer component thereof) is less than a predetermined distance from the second energy transfer component, in another position (e.g., enabling an energy transfer), etc., where the vehicle may be moving and/or stationary with respect to the second energy transfer component. Alternatively, the second energy transfer component may be an energy transfer component of a vehicle. In this case, step 3750 may involve determining that the second energy transfer component is less than a predetermined distance from a component of an energy transfer system (e.g., energy transfer component 1610, energy transfer component 1620, energy transfer component 1630, energy transfer component 1645, energy transfer component 1655, energy transfer component 1662, energy transfer component 1665, energy transfer component 1675, another component of the energy transfer system, etc.), in another position (e.g., enabling an energy transfer), etc., where the second energy transfer component may be moving and/or stationary with respect to the energy transfer system.

As shown in FIG. 37, step 3760 involves activating a second interface to enable an energy transfer via the second energy transfer component. The second interface may include or be coupled to the second energy transfer component. In one embodiment, the second interface may be a wired energy transfer interface (e.g., 231, 2031, etc.), an inductive energy transfer interface (e.g., 234, 2034*a*, 2034*b*, 2034*c*, 2034*d*, etc.), a wireless energy transfer interface (e.g., 237, 2037*a*, 2037*b*, etc.), some combination thereof, etc. And in one embodiment, step 3760 may be performed by configuring the second energy transfer component to operate in an energy transfer mode.

Step 3770 involves determining the second energy transfer component out of position to enable an energy transfer. In one embodiment, step 3770 may be performed similarly to and/or analogously to step 2905 of process 2900.

In one embodiment, where the second energy transfer component is an energy transfer component of or coupled with a wheel of a vehicle (e.g., energy transfer component 1844) and/or an energy transfer component of or coupled with a tire of a vehicle (e.g., energy transfer component 1834), step 3770 may involve determining (e.g., based on an orientation and/or angular position of the wheel and/or tire) that the second energy transfer component is greater than a predetermined distance from a surface (e.g., 1890, a surface of a road, etc.) and/or from an energy transfer component of an energy transfer system, in another position (e.g., where an ability to perform an energy transfer is reduced or prevented), etc. Alternatively, where the second energy transfer component is an energy transfer component of an energy transfer system, step 3770 may involve determining that the second energy transfer component is greater than a predetermined distance from a component of a vehicle (e.g., an energy transfer component of and/or coupled with a wheel, an energy transfer component of and/or coupled with a tire, another component of the vehicle, etc.), in another position (e.g., where an ability to perform an energy transfer is reduced or prevented), etc.

In one embodiment, where the second energy transfer component is an energy transfer component of an energy transfer system (e.g., energy transfer component 1610, energy transfer component 1620, energy transfer component 1630, energy transfer component 1645, energy transfer component 1655, energy transfer component 1662, energy transfer component 1665, energy transfer component 1675, etc.) which is located remotely from a vehicle (e.g., 120, 320*a*, 320*b*, 320*c*, 1802, etc.), step 3770 may involve determining that the vehicle (or at least one energy transfer component thereof) is greater than a predetermined distance from the second energy transfer component, in another position (e.g., where an ability to perform an energy transfer is reduced or prevented), etc. In this case, the vehicle may be moving and/or stationary with respect to the second energy transfer component. Alternatively, where the second energy transfer component may be an energy transfer component of a vehicle, step 3770 may involve determining that the second energy transfer component is greater than a predetermined distance from a component of an energy transfer system (e.g., energy transfer component 1610, energy transfer component 1620, energy transfer component 1630, energy transfer component 1645, energy transfer component 1655, energy transfer component 1662, energy transfer component 1665, energy transfer component 1675, another component of the energy transfer system, etc.), in another position (e.g., enabling an energy transfer), etc. In this case, the second energy transfer component may be moving and/or stationary with respect to the energy transfer system.

As shown in FIG. 37, step 3780 involves deactivating a second interface (e.g., which is activated in step 3760). In one embodiment, step 3780 may be performed by configuring the second energy transfer component to operate in a mode other than an energy transfer mode (e.g., a position detection mode, an idle mode, a low-power mode, a mode in which the second energy transfer component is depowered, etc.).

Accordingly, embodiments of the present invention may enable one or more energy transfer interfaces to be activated and/or deactivated based on the position of a vehicle (e.g., 120, 320*a*, 320*b*, 320*c*, 1802, etc.) and/or a component thereof with respect to a component an energy transfer system (e.g., 110, 710*a*, 710*b*, 710*c*, etc.) and/or component thereof. For example, as a vehicle moves with respect to an energy transfer system (e.g., along vehicle route 1605, in a parking lot, in another location and/or manner, etc.), at least one energy transfer interface may be activated and/or deactivated (e.g., in accordance with one or more steps of process 3700) to enable one or more energy transfers (e.g., each associated with the same financial transaction between the same parties) to be performed (e.g., as the relative positioning between the vehicle and the energy transfer system changes, as the vehicle is located in different positions with respect to the energy transfer system, as the energy transfer system is located in different positions with respect to the vehicle, etc.). As another example, as a component of a vehicle (e.g., a tire, a wheel, an energy transfer component, another component, etc.) moves with respect to an energy transfer system (e.g., as a tire rolls along a surface of a roadway, as a wheel rotates, as another component of the vehicle rotates or alternatively moves with respect to the energy transfer system, etc.), at least one energy transfer interface may be activated and/or deactivated (e.g., in accordance with one or more steps of process 3700) to enable one or more energy transfers (e.g., associated with the same financial transaction between the same parties) to be performed (e.g., as the relative positioning between the vehicle and the energy transfer system changes, as the relative positioning between at least one energy transfer component of the vehicle and at least one energy transfer component of the energy transfer system changes, as the vehicle and/or at least one component thereof is located in different positions with respect to the energy transfer system and/or at least one component thereof, as the energy transfer system and/or at least one component thereof is located in different positions with respect to the vehicle and/or at least one component thereof, etc.). In this manner, embodiments of the present invention can increase the amount of energy transferred between a vehicle and an energy transfer system (e.g., by transferring energy using more than one energy transfer component which are physically spaced apart), enable energy to be transferred between the vehicle and the energy transfer system while the vehicle is moving, reduce energy loss (e.g., by deactivating at least one energy transfer component which is activated but not used to transfer energy at a particular time), increase the lifetime of an energy transfer component (e.g., by deactivating the energy transfer component when not in use, by using at least one other energy transfer component to contemporaneously perform the energy transfer and thereby enabling the energy transfer rate and/or at least one other attribute of energy transferred via the energy transfer component to be reduced, etc.), etc.

In one embodiment, one or more steps of process 3700 may be performed contemporaneously. For example, the second interface may be activated in step 3760 contemporaneously with the deactivation of the first interface in step 3740.

Although FIG. 37 depicts process 3700 with a particular number of steps, it should be appreciated that process 3700 may have a different number of steps in other embodiments. For example, one or more of the steps of process 3700 may be optional and not performed in one embodiment. Additionally, although FIG. 37 depicts process 3700 with a particular ordering of steps, it should be appreciated that the steps of process 3700 may occur in a different order in other embodiments. For example, the second interface may be activated in step 3760 before the deactivation of the first interface in step 3740.

FIG. 38 shows a flowchart of computer-implemented process 3800 for controlling a temperature of a component in accordance with one embodiment of the present invention. In one embodiment, step 3810 may be performed by or using at least one component of a vehicle (e.g., temperature regulation component 2828, processor 2825, processor 2845, interface component 221, etc.), at least one component of an energy transfer system (e.g., interface component 211, etc.), at least one component of another system (e.g., interface system 550, computer system 2890, computer system 570, computer system 590, computer system 592, computer system 594, computer system 790, etc.), some combination thereof, etc.

As shown in FIG. 38, step 3810 involves monitoring the temperature of a component. The component may be an energy transfer component (e.g., 233, 236, 239, 1821, 1822, 1823, 1824, 1832, 1834, 1842, 1844, 2033, 2036*a*, 2036*b*, 2036*c*, 2036*d*, 2039*a*, 2039*b*, 2230, 2240, 2250, 2270, 2280, 2290, 2320, 2330, 2340, 2360, 2370, 2460, 2461, 2630, 2640, 2730, 2740, 232, 235, 238, 1610, 1620, 1630, 1645, 1655, 1662, 1665, 1675, 1711, 1712, 1713, 1714, 1715, 1721, 1722, 1723, 1724, 1725, 1726, 1727, 1728, 1731, 1732, 1733, 1734, 1735, 1742, 1744, 1752, 1754, 1783, 1785, 1812, 2032, 2035*a*, 2035*b*, 2035*c*, 2035*d*, 2038*a*, 2038*b*, 2110, 2111, 2112, 2113, 2114, 2115, 2116, 2117, 2118, 2660, 2680, 2730, 2740, etc.), an energy storage medium (e.g., 2810, etc.), another component of an energy storage component (e.g., 226, 216, etc.), some combination thereof, etc. In one embodiment, step 3810 may be performed by another component (e.g., 2462, 2463, 2634, 2644, 2664, 2684, 2829, some combination thereof, etc.) capable of monitoring a temperature of the component (e.g., associated with the temperature monitored in step 3810).

Step 3820 involves determining whether the temperature (e.g., monitored in step 3810) is below a first threshold (e.g., corresponding to a particular temperature or range of temperatures). In one embodiment, the first threshold may be predetermined (e.g., specified during manufacture by a manufacturer, specified by a dealership, specified by a service center, specified by another party or entity, some combination thereof, etc.) in one embodiment. In one embodiment, the first threshold may be determined on-the-fly (e.g., based on a state of a vehicle or a component thereof, based on a state of an energy transfer system or a component thereof, some combination thereof, etc.). The first threshold may be specified automatically (e.g., by a component of a vehicle, by a component of an energy transfer system, by a component of interface system 550 and/or another system, some combination thereof, etc.) and/or specified by a user (e.g., using GUI 800, GUI 900, another user interface, etc.).

If it is determined that the temperature (e.g., monitored in step 3810) is below the first threshold, then heat transfer from the component may be reduced in step 3830. Step 3830 may involve configuring and/or controlling another component (e.g., 2464, 2465, 2632, 2642, 2662, 2682, 2818, some combination thereof, etc.) to reduce an amount of heat transferred from the component (e.g., associated with the temperature monitored in step 3810). In one embodiment, the temperature of the component may remain the same or increase as a result of step 3830. Alternatively, if it is determined in step 3820 that the temperature (e.g., monitored in step 3810) is not below the first threshold, then step 3840 may be performed.

As shown in FIG. 38, step 3840 involves determining whether the temperature (e.g., monitored in step 3810) is below a second threshold (e.g., corresponding to a particular temperature or range of temperatures). In one embodiment, the second threshold may correspond to a particular temperature or range of temperatures which is higher than a particular temperature or range of temperatures corresponding to the first threshold (e.g., used in step 3820). In one embodiment, the second threshold may be predetermined (e.g., specified during manufacture by a manufacturer, specified by a dealership, specified by a service center, specified by another party or entity, some combination thereof, etc.) in one embodiment. In one embodiment, the second threshold may be determined on-the-fly (e.g., based on a state of a vehicle or a component thereof, based on a state of an energy transfer system or a component thereof, some combination thereof, etc.). The second threshold may be specified automatically (e.g., by a component of a vehicle, by a component of an energy transfer system, by a component of interface system 550 and/or another system, some combination thereof, etc.) and/or specified by a user (e.g., using GUI 800, GUI 900, another user interface, etc.).

If it is determined that the temperature (e.g., monitored in step 3810) is below the second threshold, then heat transfer from the component may be maintained in step 3850. Step 3850 may involve configuring and/or controlling another component (e.g., 2464, 2465, 2632, 2642, 2662, 2682, 2818, some combination thereof, etc.) to maintain an amount of heat transferred from the component (e.g., associated with the temperature monitored in step 3810). In one embodiment, the temperature of the component may remain the same as a result of step 3850. In one embodiment, the temperature of the component may increase or decrease as a result of step 3850.

Alternatively, if it is determined in step 3840 that the temperature (e.g., monitored in step 3810) is not below the second threshold, then heat transfer from the component may be increased in step 3860. Step 3860 may involve configuring and/or controlling another component (e.g., 2464, 2465, 2632, 2642, 2662, 2682, 2818, some combination thereof, etc.) to increase an amount of heat transferred from the component (e.g., associated with the temperature monitored in step 3810). In one embodiment, the temperature of the component may remain the same as a result of step 3860. In one embodiment, the temperature of the component may increase or decrease as a result of step 3860.

As shown in FIG. 38, step 3865 involves monitoring the temperature of the component (e.g., associated with the temperature monitored in step 3810). In one embodiment, step 3865 may be performed similarly to and/or analogously to step 3810. The temperature monitored in step 3865 may be different from the temperature monitored in step 3810 in one embodiment. In one embodiment, the temperature monitored in step 3865 may be the same as the temperature monitored in step 3810.

Step 3870 involves determining whether the temperature (e.g., monitored in step 3810, step 3865, an average thereof, some combination thereof, etc.) is below the second threshold (e.g., used in step 3840). If it is determined that the temperature (e.g., monitored in step 3865) is below the second threshold, then heat transfer from the component may be maintained in step 3850. Step 3850 may involve configuring and/or controlling another component (e.g., 2464, 2465, 2632, 2642, 2662, 2682, 2818, some combination thereof, etc.) to maintain an amount of heat transferred from the component (e.g., associated with the temperature monitored in step 3810 and/or step 3865). In one embodiment, the temperature of the component may remain the same as a result of step 3850. In one embodiment, the temperature of the component may increase or decrease as a result of step 3850.

Alternatively, if it is determined in step 3870 that the temperature (e.g., monitored in step 3810, step 3865, an average thereof, some combination thereof, etc.) is not below the second threshold, then at least one attribute (e.g., at least one energy transfer type, at least one interface type, at least one power, at least one current, at least one voltage, at least one energy transfer profile, at least one duration, at least one waveform, at least one temperature, some combination thereof, etc.) may be changed or adjusted to reduce heat transfer from the component. In this manner, the temperature of the component can be reduced by reducing the heat generated by the component (e.g., alone or in combination with heat being transferred from the component by the other component). In one embodiment, step 3880 may be performed responsive to a determination that the other component (e.g., 2464, 2465, 2632, 2642, 2662, 2682, 2818, some combination thereof, etc.) is unable to increase heat transfer from the component and/or the heat transfer capability of the other component is maximized. In one embodiment, step 3880 may be performed responsive to a determination that the component is in thermal runaway (e.g., despite heat transfer from the other component) and/or the component is in an unstable state associated to a temperature thereof.

As shown in FIG. 38, step 3890 involves determining whether a request to terminate or suspend the temperature control (e.g., performed in one or more other steps of process 3800) is detected. If a request to terminate or suspend the temperature control is not detected, then process 3800 may return to step 3810. Alternatively, if a request to terminate or suspend the temperature control is detected in step 3890, then process 3800 may finish.

Accordingly, process 3800 may be used to control the temperature of a component. For example, where the second threshold is higher than the first threshold (e.g., a temperature or range of temperatures corresponding to the second threshold is higher than a temperature or range of temperatures corresponding to the first threshold), process 3800 may be used to control the temperature of the component to stay substantially within the first and second thresholds (e.g., although the temperature of the component may temporarily rise above the second threshold and/or temporarily fall below the first threshold, the temperature may be adjusted to return to a temperature between the first and second thresholds).

In one embodiment, the first threshold (e.g., used in step 3820) and/or the second threshold (e.g., used in step 3840, step 3870, etc.) may be dynamically adjusted (e.g., during operation of the component) to vary the temperature of the component. For example, the temperature of an energy storage medium (e.g., 2810) may be changed (e.g., by adjusting the first threshold used in step 3820 and/or the second threshold used in step 3840 and/or step 3870) responsive to or while energy is transferred to and/or from the energy storage medium. As another example, the temperature of an energy transfer component (e.g., 233, 236, 239, 1821, 1822, 1823, 1824, 1832, 1834, 1842, 1844, 2033, 2036a, 2036b, 2036c, 2036d, 2039a, 2039b, 2230, 2240, 2250, 2270, 2280, 2290, 2320, 2330, 2340, 2360, 2370, 2460, 2461, 2630, 2640, 2730, 2740, 232, 235, 238, 1610, 1620, 1630, 1645, 1655, 1662, 1665, 1675, 1711, 1712, 1713, 1714, 1715, 1721, 1722, 1723, 1724, 1725, 1726, 1727, 1728, 1731, 1732, 1733, 1734, 1735, 1742, 1744, 1752, 1754, 1783, 1785, 1812, 2032, 2035a, 2035b, 2035c, 2035d, 2038a, 2038b, 2110, 2111, 2112, 2113, 2114, 2115, 2116, 2117, 2118, 2660, 2680, 2730, 2740, etc.) may be changed (e.g., by adjusting the first threshold used in step 3820 and/or the second threshold used in step 3840 and/or step 3870) responsive to or while energy is transferred via the energy transfer component (e.g., to perform one or more energy transfers between at least one vehicle and at least one energy transfer system, between at least one vehicle and at least one other vehicle, etc.). In one embodiment, the first threshold (e.g., used in step 3820) and/or the second threshold (e.g., used in step 3840 and/or step 3870) may be adjusted based on a user input and/or user preference (e.g., entered using a GUI such as GUI 800, GUI 900, GUI 1000, etc.), based on an automated input and/or automated request (e.g., by a vehicle or a component thereof, by an energy transfer system or a component thereof, by interface system 550 or a component thereof, by another system, etc.).

Although FIG. 38 depicts process 3800 with a particular number of steps, it should be appreciated that process 3800 may have a different number of steps in other embodiments. For example, one or more of the steps of process 3800 may be optional and not performed in one embodiment. Additionally, although FIG. 38 depicts process 3800 as utilizing only two thresholds, it should be appreciated that any number of thresholds may be used to control the temperature of a component. Further, although FIG. 38 depicts process 3800 with a particular ordering of steps, it should be appreciated that the steps of process 3800 may occur in a different order in other embodiments.

Figure 39:
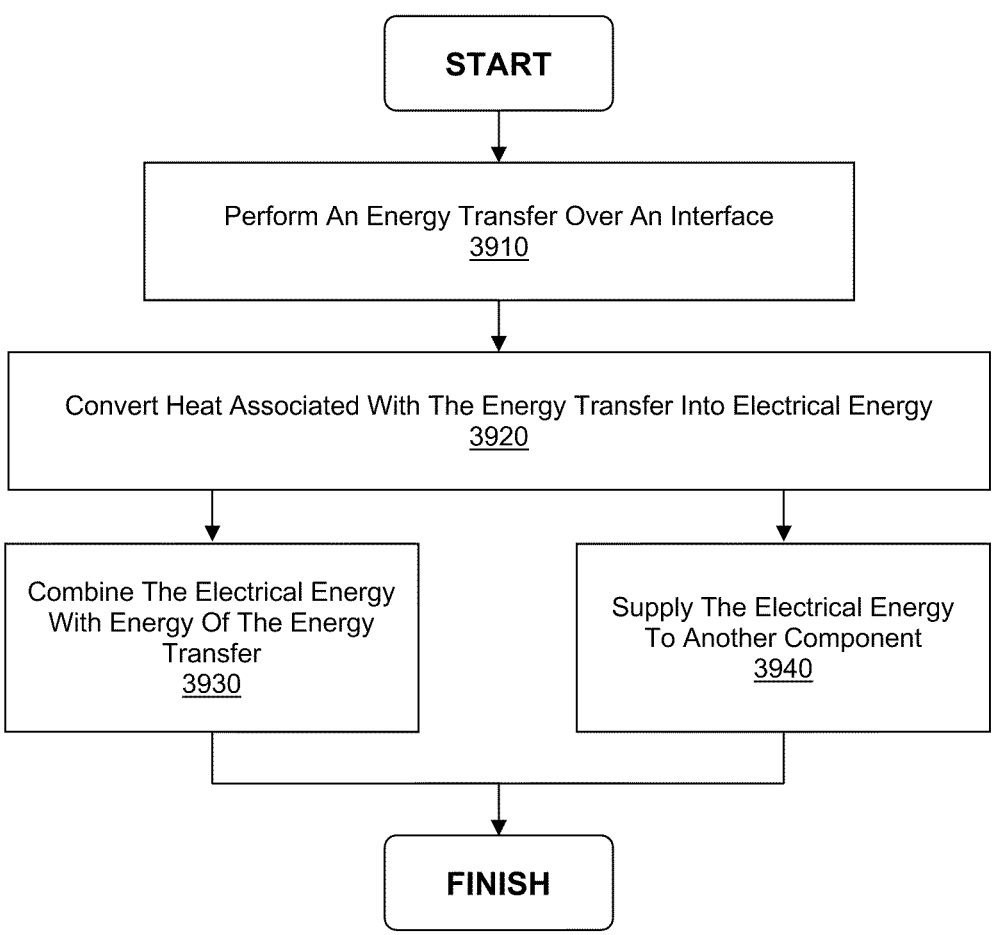
FIG. 39 shows a flowchart of a computer-implemented process for transferring energy in accordance with one embodiment of the present invention.

FIG. 39 shows a flowchart of computer-implemented process 3900 for transferring energy in accordance with one embodiment of the present invention. As shown in FIG. 39, step 3910 involves performing an energy transfer over an interface. In one embodiment, the interface may be an interface coupled to an energy storage medium (e.g., 2817, 2832, another interface coupled to energy storage medium 2810, an interface coupling energy storage component 226 to power management component 225, another interface of a vehicle, an interface coupling energy storage component 216 to power management component 215, another interface of an energy transfer system, etc.), where the energy transfer over the interface may be to the energy storage medium or from the energy storage medium. In one embodiment, the interface may be an energy transfer interface (e.g., 132, 231, 234, 237, 2031, 2034a, 2034b, 2034c, 2034d, 2037a, 2037b, 2832, 2470, 2472, 2473, 2476, 2477, etc.) coupled to an energy transfer component of a vehicle (e.g., 233, 236, 239, 1821, 1822, 1823, 1824, 1832, 1834, 1842, 1844, 2033, 2036a, 2036b, 2036c, 2036d, 2039a, 2039b, 2230, 2240, 2250, 2270, 2280, 2290, 2320, 2330, 2340, 2360, 2370, 2460, 2461, 2630, 2640, 2730, 2740, some combination thereof, etc.) and/or an energy transfer component of an energy transfer system (e.g., 232, 235, 238, 1610, 1620, 1630, 1645, 1655, 1662, 1665, 1675, 1711, 1712, 1713, 1714, 1715, 1721, 1722, 1723, 1724, 1725, 1726, 1727, 1728, 1731, 1732, 1733, 1734, 1735, 1742, 1744, 1752, 1754, 1783, 1785, 1812, 2032, 2035a, 2035b, 2035c, 2035d, 2038a, 2038b, 2110, 2111, 2112, 2113, 2114, 2115, 2116, 2117, 2118, 2660, 2680, 2730, 2740, some combination thereof, etc.), where the energy transfer may be an energy transfer between at least one vehicle and at least one energy transfer system, between at least one vehicle and at least one other vehicle, etc.

Step 3920 involves converting heat associated with the energy transfer into electrical energy. In one embodiment, step 3920 may be performed by a component (e.g., heat transfer component 2818, a component of an energy transfer system which operates analogously or similarly to heat transfer component 2818, etc.) positioned with respect to (e.g., coupled with, disposed on or touching, disposed adjacent to, disposed in proximity to, etc.) an energy storage medium (e.g., 2810, an energy storage medium of an energy transfer system, etc.) such that heat generated by the energy storage medium can be converted into electrical energy by the component (e.g., heat transfer component 2818, a component of an energy transfer system which operates analogously or similarly to heat transfer component 2818, etc.). In one embodiment, step 3920 may be performed by a component (e.g., 2464, 2465, 2632, 2642, 2662, 2682, etc.) positioned with respect to (e.g., coupled with, disposed on or touching, disposed adjacent to, disposed in proximity to, etc.) an energy transfer component (e.g., of a vehicle, of an energy transfer system, etc.) such that heat generated by the energy transfer component can be converted into electrical energy by the component (e.g., 2464, 2465, 2632, 2642, 2662, 2682, etc.).

As shown in FIG. 39, step 3930 involves combining the electrical energy (e.g., generated in step 3920) with the energy of the energy transfer (e.g., performed in step 3910). The electrical energy (e.g., generated in step 3920) may be combined with the energy of the energy transfer (e.g., performed in step 3910) using voltage summing, current summing, or any other technique for combining or storing electricity from multiple sources. For example, where the heat is generated by an energy transfer component (e.g., of a vehicle, of an energy transfer system, etc.) transmitting energy to another system (e.g., a vehicle, energy transfer system, another system, etc.), electrical energy generated from the heat may be combined in step 3930 with energy of the energy transfer (e.g., energy transferred via the energy transfer component over the energy transfer interface as part of the energy transfer performed in step 3910) and transferred contemporaneously over the energy transfer interface. In this manner, energy that would otherwise be lost as heat may be converted into electrical energy and transferred over the energy transfer interface, thereby increasing the amount of energy transferred over the energy transfer interface (e.g., from the system including the energy transfer component to another system) and/or improving the efficiency of the energy transfer over the energy transfer interface (e.g., from the system including the energy transfer component to another system).

As another example, where the heat is generated by an energy transfer component (e.g., of a vehicle, of an energy transfer system, etc.) receiving energy from another system (e.g., a vehicle, energy transfer system, another system, etc.), electrical energy generated from the heat may be combined in step 3930 with energy of the energy transfer (e.g., energy received by the energy transfer component over the energy transfer interface as part of the energy transfer performed in step 3910). In this manner, energy that would otherwise be lost as heat may be converted into electrical energy (e.g., for use by the system including the energy transfer component, for transfer to and use by another system, etc.), thereby increasing the amount of energy accessible via the energy transfer component (e.g., accessible to the system including the energy transfer component, accessible to another system, etc.) and/or improving the efficiency of the energy transfer over the energy transfer interface (e.g., to the system including the energy transfer component from another system).

As a further example, where the heat is generated by an energy storage medium (e.g., 2810, of a vehicle, of an energy transfer system, etc.) receiving energy (e.g., as part of a charge of the energy storage medium, etc.) from another component or system (e.g., a vehicle, energy transfer system, another system, etc.), electrical energy generated from the heat may be combined in step 3930 with energy of the energy transfer (e.g., energy transferred over the energy transfer interface to the energy storage medium as part of the energy transfer performed in step 3910). In one embodiment, step 3930 may involve energy regulation component 2821 combining electrical energy from heat transfer component 2818 with energy received over energy transfer interface 2832, where the electrical energy and energy received over energy transfer interface 2832 may be transferred to energy storage medium 2810 over interface 2817 (e.g., to charge energy storage medium). In this manner, energy that would otherwise be lost as heat may be converted into electrical energy and accessed by the energy storage medium (e.g., for charging thereof, etc.), thereby increasing the amount of energy transferred to the energy storage medium and/or improving the efficiency of the energy transfer to the energy storage medium.

As yet another example, where the heat is generated by an energy storage medium (e.g., 2810, of a vehicle, of an energy transfer system, etc.) transferring or transmitting energy (e.g., as part of a discharge of the energy storage medium, etc.) to another component or system (e.g., a vehicle, energy transfer system, another system, etc.), electrical energy generated from the heat may be combined in step 3930 with energy of the energy transfer (e.g., energy transferred or transmitted over the energy transfer interface from the energy storage medium as part of the energy transfer performed in step 3910). In one embodiment, step 3930 may involve energy regulation component 2821 combining electrical energy from heat transfer component 2818 with energy received over interface 2817 (e.g., from energy storage medium 2810), where the electrical energy and energy received over interface 2817 may be transferred to another component (e.g., of the energy storage component including the energy storage medium, of a vehicle including the energy storage medium, of an energy transfer system, to another system, etc.) over energy transfer interface 2832. In this manner, energy that would otherwise be lost as heat may be converted into electrical energy and transferred over the energy transfer interface, thereby increasing the amount of energy transferred over the energy transfer interface and/or improving the efficiency of the energy transfer over the energy transfer interface.

As shown in FIG. 39, step 3940 involves supplying the electrical energy (e.g., generated in step 3920) to another component. In one embodiment, step 3940 may involve supplying the electrical energy over an interface without combining the electrical energy with (e.g., independently of and/or separately from) the energy of the energy transfer (e.g., transferred over the energy transfer interface in step 3910). In one embodiment, step 3940 may involve supplying the electrical energy over an interface separate from the energy transfer interface (e.g., used to perform the energy transfer in step 3910). And in one embodiment, step 3940 may involve supplying the electrical energy to a component other than the component that receives the energy of the energy transfer (e.g., performed in step 3910).

In one embodiment, steps 3930 and 3940 may be performed contemporaneously. Alternatively, steps 3930 and 3940 may be performed sequentially. In one embodiment, step 3930 may be optional and not performed. In one embodiment, step 3940 may be optional and not performed. And in one embodiment, steps 3930 and 3940 may be mutually exclusive.

Although FIG. 39 depicts process 3900 with a particular number of steps, it should be appreciated that process 3900 may have a different number of steps in other embodiments. For example, one or more of the steps of process 3900 may be optional and not performed in one embodiment. Additionally, although FIG. 39 depicts process 3900 with a particular ordering of steps, it should be appreciated that the steps of process 3900 may occur in a different order in other embodiments.

Figure 40:
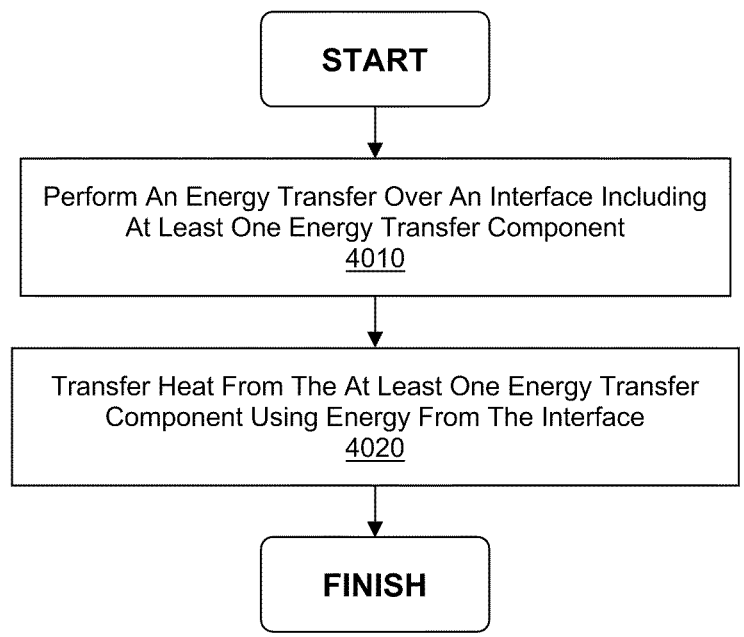
FIG. 40 shows a flowchart of a computer-implemented process for transferring heat in accordance with one embodiment of the present invention.

FIG. 40 shows a flowchart of computer-implemented process 4000 for transferring heat in accordance with one embodiment of the present invention. As shown in FIG. 40, step 4010 involves performing an energy transfer over an interface including at least one energy transfer component. In one embodiment, the interface may be an energy transfer interface (e.g., 132, 231, 234, 237, 2031, 2034*a*, 2034*b*, 2034*c*, 2034*d*, 2037*a*, 2037*b*, 2832, 2470, 2472, 2473, 2476, 2477, etc.). The at least one energy transfer component may be an energy transfer component of a vehicle (e.g., 233, 236, 239, 1821, 1822, 1823, 1824, 1832, 1834, 1842, 1844, 2033, 2036*a*, 2036*b*, 2036*c*, 2036*d*, 2039*a*, 2039*b*, 2230, 2240, 2250, 2270, 2280, 2290, 2320, 2330, 2340, 2360, 2370, 2460, 2461, 2630, 2640, 2730, 2740, some combination thereof, etc.) and/or an energy transfer component of an energy transfer system (e.g., 232, 235, 238, 1610, 1620, 1630, 1645, 1655, 1662, 1665, 1675, 1711, 1712, 1713, 1714, 1715, 1721, 1722, 1723, 1724, 1725, 1726, 1727, 1728, 1731, 1732, 1733, 1734, 1735, 1742, 1744, 1752, 1754, 1783, 1785, 1812, 2032, 2035*a*, 2035*b*, 2035*c*, 2035*d*, 2038*a*, 2038*b*, 2110, 2111, 2112, 2113, 2114, 2115, 2116, 2117, 2118, 2660, 2680, 2730, 2740, some combination thereof, etc.). And in one embodiment, the energy transfer may be an energy transfer between at least one vehicle and at least one energy transfer system, between at least one vehicle and at least one other vehicle, etc.

Step 4020 involves transferring heat from the at least one energy transfer component using energy from the interface (e.g., using energy transferred in step 4010 as part of the energy transfer). In one embodiment, step 4020 may involve supplying the energy from the interface to a component (e.g., 2464, 2465, 2632, 2642, 2662, 2682, etc.) positioned with respect to (e.g., coupled with, disposed on or touching, disposed adjacent to, disposed in proximity to, etc.) the energy transfer component (e.g., of a vehicle, of an energy transfer system, etc.) such that heat can be transferred from the at least one energy transfer component by the component (e.g., 2464, 2465, 2632, 2642, 2662, 2682, etc.), where the component may be configured to transfer heat from the at least one energy transfer component responsive to supplying energy to the component. In this manner, the lifetime of the at least one energy transfer component can be extended, the efficiency of energy transfer and/or signal communication using the at least one energy transfer component can be increased (e.g., by reducing a temperature of the energy transfer component to enable energy to be transferred and/or signals to be communicated more efficiently), etc. Additionally, embodiments of the present invention can advantageously reduce the number of components in the system (e.g., by utilizing an energy transfer interface to supply energy to the component instead of using a separate interface), thereby reducing the cost of the system, reducing the cost to retrofit to the system if the component is added after manufacturing, reducing the failure rate of the system, etc.

Although FIG. 40 depicts process 4000 with a particular number of steps, it should be appreciated that process 4000 may have a different number of steps in other embodiments. For example, one or more of the steps of process 4000 may be optional and not performed in one embodiment. Additionally, although FIG. 40 depicts process 4000 with a particular ordering of steps, it should be appreciated that the steps of process 4000 may occur in a different order in other embodiments.

Figure 41:
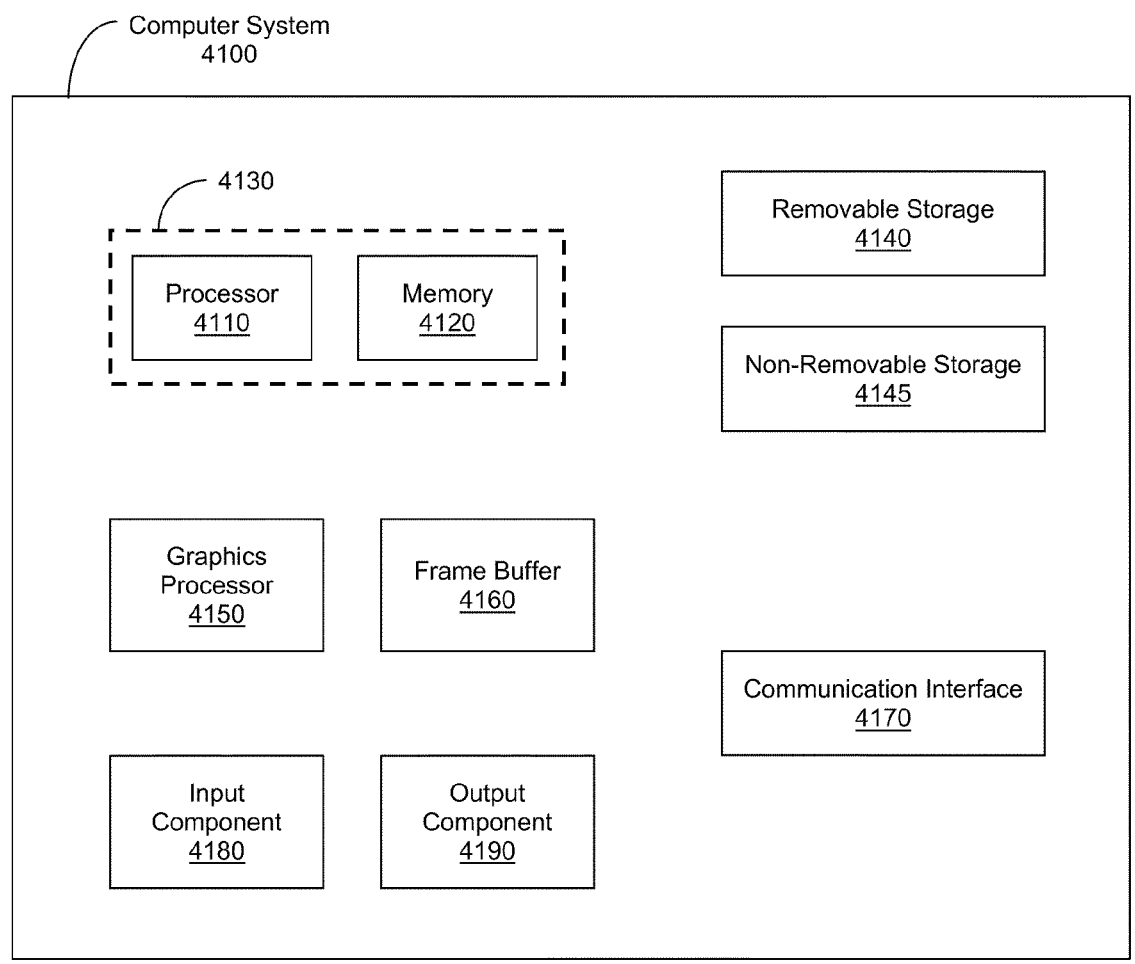
FIG. 41 shows a computer system upon which embodiments of the present invention may be implemented.

FIG. 41 shows computer system 4100 upon which embodiments of the present invention may be implemented. As shown in FIG. 41, computer system 4100 may include processor 4110, memory 4120, removable storage 4140, non-removable storage 4145, graphics processor 4150, frame buffer 4160, communication interface 4170, input component 4180, and output component 4190. In one embodiment, embodiments of the present invention may be implemented by execution of computer-readable instructions or computer-executable instructions that may reside in components of computer system 4100 and which may be used as a part of a general purpose computer network. In one embodiment, computer system 4100 may be a general-purpose computer system, an embedded computer system, a laptop computer system, a hand-held computer system, a portable computer system and/or portable electronic device, a stand-alone computer system, etc.

In one embodiment, computer system 4100 may be used to implement computer system 570, computer system 590, computer system 592, computer system 594, computer system 790, computer system 2890, at least one component of at least one vehicle (e.g., 120, 320*a*, 320*b*, 320*c*, 1802, etc.), at least one component of at least one energy transfer system (e.g., 110, 710a, 710b, 710c, etc.), interface system 550, payment system 560, some combination thereof, etc. And in one embodiment, one or more components of computer system 4100 may be disposed in and/or coupled with a housing or enclosure.

In one embodiment, depicted by dashed lines 4130, computer system 4100 may include at least one processor (e.g., 4110) and at least one memory (e.g., 4120). Processor 4110 may be or include a central processing unit (CPU) or other type of processor. Depending on the configuration and/or type of computer system environment, memory 4120 may be or include volatile memory (e.g., RAM), non-volatile memory (e.g., ROM, flash memory, etc.), some combination thereof, etc. Additionally, memory 4120 may be removable, non-removable, etc.

In one embodiment, computer system 4100 may include additional storage (e.g., removable storage 4140, non-removable storage 4145, etc.). Removable storage 4140 and/or non-removable storage 4145 may include volatile memory, non-volatile memory, some combination thereof, etc. Additionally, removable storage 4140 and/or non-removable storage 4145 may include CD-ROM, digital versatile disks (DVD), other optical storage, magnetic cassettes, magnetic tape, magnetic disk storage, other magnetic storage devices, or any other medium which can be used to store information for access by computer system 4100.

As shown in FIG. 41, computer system 4100 may communicate with other systems, components, or devices via communication interface 4170. Communication interface 4170 may embody computer-readable instructions, data structures, program modules or other data in a modulated data signal (e.g., a carrier wave) or other transport mechanism. By way of example, and not limitation, communication interface 4170 may couple to wired media (e.g., a wired network, direct-wired connection, etc.) and/or wireless media (e.g., a wireless network, a wireless connection utilizing acoustic, RF, infrared, or other wireless signaling, etc.).

Communication interface 4170 may also couple computer system 4100 to one or more external input components (e.g., a keyboard, a mouse, a trackball, a joystick, a pen, a voice input device, a touch input device, etc.). In one embodiment, communication interface 4170 may couple computer system 4100 to one or more external output components (e.g., a display, a speaker, a printer, etc.). And in one embodiment, communication interface 4170 may include a plug, receptacle, cable, slot or any other component capable of coupling to and/or communicating with another component, device, system, etc.

Input component 4180 may include any component capable of receiving or enabling the input of information. For example, input component 4180 may be or include a keyboard, at least one button or key, a mouse, a trackball, a joystick, a pen, a voice input device, a touch input device, another type of input component, etc. Output component 4190 may include any component capable of transmitting or enabling the output of information. For example, output component 4190 may be or include a display, a speaker, a printer, another type of output component, etc.

As shown in FIG. 41, graphics processor 4150 may perform graphics processing operations on graphical data stored in frame buffer 4160 or another memory (e.g., 4120, 4140, 4145, etc.) of computer system 4100. Graphical data stored in frame buffer 4160 may be accessed, processed, and/or modified by components (e.g., graphics processor 4150, processor 4110, some combination thereof, etc.) of computer system 4100 and/or components of other systems, other devices, etc. Additionally, the graphical data may be accessed (e.g., by graphics processor 4150) and displayed on an output device coupled to computer system 4100 in one embodiment.

In one embodiment, a memory of computer system 4100 (e.g., memory 4120, removable storage 4140, non-removable storage 4145, frame buffer 4160, some combination thereof, etc.) may be a computer-readable medium (or computer-usable medium, or computer-readable storage medium, etc.) and may include instructions that when executed by a processor (e.g., 4110, 4150, etc.) implement a method of managing at least one transfer of energy (e.g., in accordance with process 2900 of FIGS. 29A and 29B), increasing vehicle security (e.g., in accordance with process 2900 of FIGS. 30A and 30B), determining at least one energy transfer interface (e.g., in accordance with process 3100 of FIG. 31), determining at least one energy transfer component (e.g., in accordance with process 3200 of FIG. 32), determining at least one energy transfer component by analyzing at least one response to an activation of one or more energy transfer components (e.g., in accordance with process 3300 of FIG. 33), determining at least one attribute (e.g., in accordance with process 3400 of FIG. 34), performing an interrupt service routine (e.g., in accordance with process 3500 of FIG. 35), performing an interrupt service routine associated with a user selection (e.g., in accordance with process 3600 of FIG. 36), managing at least one energy transfer (e.g., in accordance with process 3700 of FIG. 37), controlling a temperature of a component (e.g., in accordance with process 3800 of FIG. 38), transferring energy (e.g., in accordance with process 3900 of FIG. 39), transferring heat (e.g., in accordance with process 4000 of FIG. 40), some combination thereof, etc. And in one embodiment, a memory of computer system 4100 (e.g., memory 4120, removable storage 4140, non-removable storage 4145, frame buffer 4160, some combination thereof, etc.) may be a computer-readable medium (or computer-usable medium, or computer-readable storage medium, etc.) having computer-readable program code embodied therein for causing a computer system (e.g., computer system 4100 or a component thereof such as processor 4110, graphics processor 4150, etc.) to perform a method of managing at least one transfer of energy (e.g., in accordance with process 2900 of FIGS. 29A and 29B), increasing vehicle security (e.g., in accordance with process 2900 of FIGS. 30A and 30B), determining at least one energy transfer interface (e.g., in accordance with process 3100 of FIG. 31), determining at least one energy transfer component (e.g., in accordance with process 3200 of FIG. 32), determining at least one energy transfer component by analyzing at least one response to an activation of one or more energy transfer components (e.g., in accordance with process 3300 of FIG. 33), determining at least one attribute (e.g., in accordance with process 3400 of FIG. 34), performing an interrupt service routine (e.g., in accordance with process 3500 of FIG. 35), performing an interrupt service routine associated with a user selection (e.g., in accordance with process 3600 of FIG. 36), managing at least one energy transfer (e.g., in accordance with process 3700 of FIG. 37), controlling a temperature of a component (e.g., in accordance with process 3800 of FIG. 38), transferring energy (e.g., in accordance with process 3900 of FIG. 39), transferring heat (e.g., in accordance with process 4000 of FIG. 40), some combination thereof, etc. And in one embodiment, a computer-readable medium of computer system 4100 may be implemented in and/or using at least one die of at least one integrated circuit (e.g., at least one application-specific integrated circuit (ASIC), at least one system-on-a-chip (SOC), at least one programmable system-on-a-chip (PSOC), another type of integrated circuit, etc.).

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction thereto. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method of managing at least one transfer of energy, said method comprising:
   determining a selection associated with an interface of a plurality of interfaces, wherein each interface of said plurality of interfaces is configured to transfer energy between an energy storage medium of a vehicle and at least one component of an energy transfer system, wherein said energy transfer system is separate from said vehicle;
   performing an energy transfer, via said interface, between said energy storage medium of said vehicle and said at least one component of said energy transfer system;
   responsive to a problem associated with performance of said energy transfer, determining another interface as an alternative to said interface; and
   resuming said energy transfer using said another interface.

2. The method of claim 1, wherein said problem is selected from a group consisting of a problem with said vehicle, a problem with said energy transfer system, and a problem with said interface.

3. The method of claim 1 further comprising:
   confirming an operability of said another interface.

4. The method of claim 1, wherein said interface and said another interface are each selected from a group consisting of a wired interface, an inductive interface, and a wireless interface.

5. The method of claim 1, wherein said interface is a first type of interface, wherein said another interface is a second type of interface, and wherein said first type of interface is different from said second type of interface.

6. The method of claim 1, wherein said interface is a first type of interface, wherein said another interface is a second type of interface, and wherein said first type of interface is the same as said second type of interface.

7. The method of claim 1 further comprising:
   outputting a notification associated with said problem.

8. The method of claim 1, wherein said selection is a user selection input via a user interface.

9. The method of claim 1, wherein said selection is an automated selection performed by a component selected from a group consisting of a component of said energy transfer system and a component of said vehicle.

10. The method of claim 1, wherein said energy storage medium is configured to power a motor of said vehicle to move said vehicle.

11. A system comprising:
    a first component;
    a second component coupled to said first component; and
    a plurality of interfaces coupled to said first component, wherein each interface of said plurality of interfaces is configured to transfer energy with an energy storage medium of a vehicle,
    wherein said first component is configured to allow, responsive to a selection associated with an interface of said plurality of interfaces, performance of an energy transfer via said interface,
    wherein said second component is configured to determine, responsive to a problem associated with performance of said energy transfer, another interface as an alternative to said interface, and
    wherein said first component is further configured to allow resumption of said energy transfer using said another interface.

12. The system of claim 11, wherein said problem is selected from a group consisting of a problem with said vehicle, a problem with at least one other component of said system, and a problem with said interface.

13. The system of claim 11, wherein said interface and said another interface are each selected from a group consisting of a wired interface, an inductive interface, and a wireless interface.

14. The system of claim 11, wherein said interface is a first type of interface, wherein said another interface is a second type of interface, and wherein said first type of interface is different from said second type of interface.

15. The system of claim 11, wherein said interface is a first type of interface, wherein said another interface is a second type of interface, and wherein said first type of interface is the same as said second type of interface.

16. The system of claim 11 further comprising:
    a communication interface configured to communicate data with said vehicle.

17. The system of claim 11 further comprising:
    a user interface, and
    wherein said selection is a user selection input via said user interface.

18. The system of claim 11, wherein said selection is an automated selection performed by a component selected from a group consisting of a component of said system and a component of said vehicle.

19. The system of claim 11, wherein said energy storage medium is configured to power a motor of said vehicle to move said vehicle.

20. The system of claim 11 further comprising:
    a plurality of energy transfer components, wherein each energy transfer component of said plurality of energy transfer components is coupled to a respective interface of said plurality of interfaces.

21. A method of managing at least one transfer of energy, said method comprising:
    determining a position of a vehicle;
    determining, based on said position of said vehicle, a plurality of interfaces configured to transfer energy between an energy storage medium of said vehicle and at least one component of an energy transfer system, wherein said energy transfer system is separate from said vehicle;
    determining a selection associated with an interface of said plurality of interfaces; and
    performing an energy transfer, via said interface, between said energy storage medium of said vehicle and said at least one component of said energy transfer system.

22. The method of claim 21, wherein said determining said position further comprises determining said position of said vehicle using at least one energy transfer component of said energy transfer system.

23. The method of claim 22, wherein said determining said position further comprises determining said position of said vehicle responsive to configuring said at least one energy transfer component in a first mode, and wherein said performing said energy transfer further comprises performing said energy transfer responsive to configuring said at least one energy transfer component in a second mode.

24. The method of claim 21, wherein said determining said position further comprises determining said position of said vehicle using a position detection component.

25. The method of claim 21, wherein said determining said position further comprises determining a position of an energy transfer component of said vehicle.

26. The method of claim 21, wherein said selection is a user selection input via a user interface.

27. The method of claim 21, wherein said selection is an automated selection performed by a component selected from a group consisting of a component of said energy transfer system and a component of said vehicle.

28. The method of claim 21 further comprising:
selecting said interface based on a position of an energy transfer component with respect to at least one component of said vehicle, wherein said energy transfer component is coupled to said interface, and
wherein said performing said energy transfer further comprises performing said energy transfer via said energy transfer component.

29. A system comprising:
a first component configured to determine a position of a vehicle; and
a second component configured to determine, based on said position of said vehicle, a plurality of interfaces, wherein each interface of said plurality of interfaces is configured to transfer energy with an energy storage medium of said vehicle, and wherein said second component is configured to allow, responsive to a selection associated with an interface of said plurality of interfaces, performance of an energy transfer via said interface.

30. The system of claim 29 further comprising:
said plurality of interfaces, wherein each interface of said plurality of interfaces is coupled to said second component.

31. The system of claim 29 further comprising:
at least one energy transfer component coupled to at least one interface of said plurality of interfaces, and
wherein said first component is configured to determine said position of said vehicle using said at least one energy transfer component.

32. The system of claim 31, wherein said first component is configured to determine said position of said vehicle responsive to a configuration of said at least one energy transfer component in a first mode, and wherein said second component is configured to allow performance of said energy transfer responsive to a configuration of said at least one energy transfer component in a second mode.

33. The system of claim 29, wherein said first component is a position detection component.

34. The system of claim 29, wherein said first component is configured to determine said position of said vehicle by determining a position of an energy transfer component of said vehicle.

35. The system of claim 29 further comprising:
a communication interface configured to communicate data with said vehicle.

36. The system of claim 29 further comprising:
a user interface, and
wherein said selection is a user selection input via said user interface.

37. The system of claim 29 further comprising:
an energy transfer component coupled to said interface,
wherein said selection is an automated selection based on a position of said energy transfer component with respect to at least one component of said vehicle, and
wherein said second component is configured to allow performance of said energy transfer via said energy transfer component.

38. The system of claim 29, wherein said energy storage medium is configured to power a motor of said vehicle to move said vehicle.

39. The method of claim 1, wherein said performing said energy transfer comprises performing said energy transfer in accordance with a first value of an attribute, wherein said resuming said energy transfer comprises resuming said energy transfer in accordance with a second value of said attribute, and wherein said attribute is selected from a group consisting of an energy transfer type, an interface type, a power, a current, a voltage, an energy transfer profile, a duration, a waveform, and a temperature.

40. The system of claim 11, wherein said first component is configured to allow performance of said energy transfer in accordance with a first value of an attribute, wherein said first component is configured to allow resumption of said energy transfer in accordance with a second value of said attribute, and wherein said attribute is selected from a group consisting of an energy transfer type, an interface type, a power, a current, a voltage, an energy transfer profile, a duration, a waveform, and a temperature.

41. The method of claim 21 further comprising:
determining another interface as an alternative to said interface; and
resuming said energy transfer using said another interface.

42. The system of claim 29, wherein said second component is configured to allow resumption of said energy transfer using another interface of said plurality of interfaces.

* * * * *

UNITED STATES PATENT AND TRADEMARK OFFICE
CERTIFICATE OF CORRECTION

PATENT NO. : 8,841,881 B2  
APPLICATION NO. : 13/015986  
DATED : September 23, 2014  
INVENTOR(S) : Failing Page 1 of 1

It is certified that error appears in the above-identified patent and that said Letters Patent is hereby corrected as shown below:

In the Specification

In column 2, lines 12-13, after "generating a request to perform" delete ", using the interface,".

In column 12, lines 35-37, delete "an energy transfer type, an interface type, an energy transfer type, an interface type," and insert -- an energy transfer type, an interface type, --.

In column 157, lines 54-55, delete "energy storage component 2840" and insert -- security component 2840 --.

In column 158, line 8, delete "energy storage component 2840" and insert -- security component 2840 --.

In column 158, lines 18-19, delete "energy storage component 2840" and insert -- security component 2840 --.

In column 187, lines 14-15, delete "an energy transfer type, an interface type, an energy transfer type, an interface type," and insert -- an energy transfer type, an interface type, --.

In column 191, lines 59-60, delete "said energy transfer system" and insert -- the energy transfer system --.

Signed and Sealed this  
Twenty-seventh Day of October, 2015

Michelle K. Lee  
*Director of the United States Patent and Trademark Office*